United States Patent
Ahlfeld et al.

(10) Patent No.: US 9,721,677 B2
(45) Date of Patent: Aug. 1, 2017

(54) NUCLEAR FISSION REACTOR, A VENTED NUCLEAR FISSION FUEL MODULE, METHODS THEREFOR, AND A VENTED NUCLEAR FISSION FUEL MODULE SYSTEM

(71) Applicant: TerraPower, LLC, Bellevue, WA (US)

(72) Inventors: Charles E. Ahlfeld, LaJolla, CA (US); Pavel Hejzlar, Kirkland, WA (US); Roderick A. Hyde, Redmond, WA (US); Muriel Y. Ishikawa, Livermore, CA (US); David G. McAlees, Bellevue, WA (US); Jon D. McWhirter, Kirkland, WA (US); Nathan P. Myhrvold, Medina, WA (US); Ashok Odedra, Bellevue, WA (US); Clarence T. Tegreene, Mercer Island, WA (US); Joshua C. Walter, Kirkland, WA (US); Kevan D. Weaver, Redmond, WA (US); Thomas Allan Weaver, San Mateo, CA (US); Charles Whitmer, North Bend, WA (US); Lowell L. Wood, Jr., Bellevue, WA (US); George B. Zimmerman, Lafayette, CA (US)

(73) Assignee: TerraPower, LLC, Bellevue, WA (US)

( * ) Notice: Subject to any disclaimer, the term of this patent is extended or adjusted under 35 U.S.C. 154(b) by 237 days.

(21) Appl. No.: 14/284,542

(22) Filed: May 22, 2014

(65) Prior Publication Data

US 2014/0328444 A1 Nov. 6, 2014

Related U.S. Application Data

(63) Continuation of application No. 12/653,205, filed on Dec. 8, 2009, which is a continuation of application
(Continued)

(51) Int. Cl.
*G21C 3/04* (2006.01)
*G21C 3/10* (2006.01)
(Continued)

(52) U.S. Cl.
CPC ........... *G21C 3/3213* (2013.01); *G21C 1/026* (2013.01); *G21C 3/041* (2013.01); *G21C 17/102* (2013.01); *G21C 19/303* (2013.01); *Y02E 30/34* (2013.01)

(58) Field of Classification Search
CPC .......... G21C 1/02; G21C 1/022; G21C 1/026; G21C 3/02; G21C 3/04; G21C 3/041;
(Continued)

(56) References Cited

U.S. PATENT DOCUMENTS 2,669,250 A 2/1954 Brown et al.
2,812,770 A 11/1957 Sullivan
(Continued)

FOREIGN PATENT DOCUMENTS

CN 85105433 A * 1/1987 ............... G21C 3/00
CN 1674161 A 9/2005
(Continued)

OTHER PUBLICATIONS

Japanese Patent Office, Notice of Reasons for Rejection; App. No. 2012-526734; Aug. 29, 2014 (rec'd by our agent Sep. 2, 2014); 22 pages (pp. 1-13 are a machine translation).
(Continued)

*Primary Examiner* — Bernarr Gregory

(57) ABSTRACT

Illustrative embodiments provide a nuclear fission reactor, that includes a reactor vessel, a nuclear fission fuel element capable of generating a gaseous fission product, a valve body defining a plenum for receiving the gaseous fission
(Continued)

product, and a valve in operative communication with the plenum for controllably venting the gaseous fission product from the plenum.

52 Claims, 204 Drawing Sheets

Related U.S. Application Data

No. 12/584,053, filed on Aug. 28, 2009, now Pat. No. 8,488,734.

(51) Int. Cl.
  *G21C 3/32* (2006.01)
  *G21C 1/02* (2006.01)
  *G21C 17/10* (2006.01)
  *G21C 19/303* (2006.01)
  *G21C 3/00* (2006.01)

(58) Field of Classification Search
  CPC .......... G21C 3/30; G21C 3/32; G21C 3/3213;
          G21C 17/10; G21C 17/102; G21C 19/28;
          G21C 19/30; G21C 19/303; Y02E 30/30;
                       Y02E 30/34; Y02E 30/40
  USPC ....... 376/245, 250, 251, 253, 308–316, 347,
           376/353, 354, 356, 357, 409, 412, 413,
                                  376/418, 451, 456
  See application file for complete search history.

(56) References Cited

U.S. PATENT DOCUMENTS

| | | | |
|---|---|---|---|
| 3,039,948 | A | 6/1962 | Krucoff |
| 3,053,650 | A | 9/1962 | Teitel |
| 3,069,339 | A | 12/1962 | Jacobs |
| 3,080,307 | A | 3/1963 | Rinald |
| 3,184,390 | A | 5/1965 | Ellard |
| 3,238,105 | A | 3/1966 | McNelly |
| 3,310,337 | A | 3/1967 | Riemenschneider |
| 3,356,585 | A | 12/1967 | Zebroski |
| 3,357,893 | A | 12/1967 | Gatley et al. |
| 3,406,094 | A | 10/1968 | Beisswenger et al. |
| 3,432,388 | A | 3/1969 | Fortescue |
| 3,454,466 | A | 7/1969 | Pitt et al. |
| 3,459,636 | A | 8/1969 | Germer |
| 3,466,444 | A | 9/1969 | Lusk |
| 3,488,960 | A | 1/1970 | Kirkpatrick |
| 3,573,168 | A | 3/1971 | Campbell |
| 3,578,442 | A | 5/1971 | Anderson |
| 3,592,224 | A | 7/1971 | Bois |
| 3,607,638 | A | 9/1971 | Seim |
| 3,640,336 | A | 2/1972 | Dixon |
| 3,644,174 | A | 2/1972 | Ferrari |
| 3,697,377 | A | 10/1972 | Gauthron |
| 3,724,484 | A | 4/1973 | Turman |
| 3,743,576 | A | 7/1973 | Fortescue |
| 3,772,147 | A | 11/1973 | Bratton |
| 3,801,447 | A | 4/1974 | Heenan |
| 3,813,287 | A | 5/1974 | Malang |
| 3,849,257 | A | 11/1974 | Bevilaqua |
| 3,892,626 | A | 7/1975 | Hirose |
| 3,953,288 | A | 4/1976 | Johnson |
| 3,954,559 | A | 5/1976 | Oguma et al. |
| 3,955,793 | A | 5/1976 | Burkhardt et al. |
| 3,961,748 | A | 6/1976 | McNabney |
| 3,974,859 | A | 8/1976 | McNabney |
| 3,993,540 | A | 11/1976 | Longton et al. |
| 3,996,100 | A | 12/1976 | Oguma et al. |
| 4,010,068 | A | 3/1977 | Cooper |
| 4,022,655 | A | 5/1977 | Gaouditz et al. |
| 4,137,943 | A | 2/1979 | Rath |
| 4,157,248 | A | 6/1979 | Queiser |
| 4,163,689 | A | 8/1979 | Grossman et al. |
| 4,167,194 | A | 9/1979 | Matsuda |
| 4,189,348 | A | 2/1980 | Donck et al. |
| 4,202,732 | A | 5/1980 | Jung et al. |
| 4,204,911 | A | 5/1980 | Cooper |
| 4,231,549 | A | 11/1980 | Visalli |
| 4,299,661 | A | 11/1981 | Campana |
| 4,369,048 | A | 1/1983 | Pence |
| 4,370,091 | A | 1/1983 | Gagliardi |
| 4,371,383 | A | 2/1983 | Rost |
| 4,430,293 | A | 2/1984 | Callaghan et al. |
| 4,473,529 | A | 9/1984 | Boccon-Gibod |
| 4,526,311 | A | 7/1985 | Schröder |
| 4,567,016 | A | 1/1986 | Tong |
| 4,596,690 | A | 6/1986 | Kadambi et al. |
| 4,642,217 | A | 2/1987 | Wilson et al. |
| 4,717,527 | A | 1/1988 | Gjertsen et al. |
| 4,752,433 | A | 6/1988 | Altman et al. |
| 4,756,331 | A | 7/1988 | Stegmaier |
| 4,816,210 | A | 3/1989 | Henry |
| 4,816,211 | A | 3/1989 | Parker et al. |
| 4,826,035 | A | 5/1989 | Suzuki et al. |
| 4,832,903 | A | 5/1989 | Ealing |
| 4,851,181 | A | 7/1989 | Takeda et al. |
| 4,863,677 | A | 9/1989 | Eckardt |
| 4,927,596 | A | 5/1990 | Minnick |
| 5,101,712 | A | 4/1992 | Dean, Jr. |
| 5,116,567 | A | 5/1992 | Fennern |
| 5,198,184 | A | 3/1993 | Hiramoto |
| 5,227,127 | A | 7/1993 | Sato |
| 5,265,133 | A | 11/1993 | Matthews |
| 5,278,876 | A | 1/1994 | Sawabe |
| 5,367,546 | A | 11/1994 | Lau et al. |
| 5,368,633 | A | 11/1994 | Foldyna et al. |
| 5,459,768 | A | 10/1995 | Stockhausen |
| 5,526,385 | A | 6/1996 | Stockhausen et al. |
| 5,539,789 | A | 7/1996 | Wachter |
| 5,544,208 | A | 8/1996 | Pao et al. |
| 5,611,931 | A | 3/1997 | Liu et al. |
| 5,872,825 | A | 2/1999 | Eckardt |
| 5,995,577 | A | 11/1999 | Matzner |
| 6,064,711 | A | 5/2000 | Copson |
| 6,240,154 | B1 | 5/2001 | Matteson et al. |
| 6,570,949 | B2 | 5/2003 | Knecht et al. |
| 6,765,979 | B1 | 7/2004 | Dix et al. |
| 7,067,057 | B2 | 6/2006 | Rosenberger et al. |
| 7,446,289 | B2 | 11/2008 | Staton et al. |
| 7,676,016 | B2 | 3/2010 | Singh |
| 7,886,766 | B2 | 2/2011 | Radomsky et al. |
| 8,488,734 | B2 * | 7/2013 | Ahlfeld ................. G21C 1/026 376/409 |
| 2002/0075984 | A1 | 6/2002 | Knecht et al. |
| 2002/0179545 | A1 | 12/2002 | Rosenberger et al. |
| 2007/0039815 | A1 | 2/2007 | Bartel |
| 2008/0025454 | A1 | 1/2008 | Limback et al. |
| 2008/0156121 | A1 | 7/2008 | Radomsky et al. |
| 2009/0242810 | A1 | 10/2009 | Yanagisawa et al. |

FOREIGN PATENT DOCUMENTS

| | | | |
|---|---|---|---|
| EP | 1248270 A1 * | 10/2002 | ............... G21C 3/06 |
| FR | 2 702 534 A1 | 9/1994 | |
| FR | 2 702 538 A1 | 9/1994 | |
| GB | 2 163 888 A | 3/1986 | |
| JP | 49-27913 | 7/1974 | |
| JP | 52-047196 | 4/1977 | |
| JP | 52-148791 | 12/1977 | |
| JP | 58-170586 | 11/1983 | |
| JP | 03-200095 | 9/1991 | |
| JP | 03-231190 | 10/1991 | |
| JP | 2010-536010 A | 11/2010 | |
| WO | WO 97/09722 A1 | 3/1997 | |

OTHER PUBLICATIONS

Japanese Patent Office, Notice of Reasons for Rejection; App. No. 2012-526735; Aug. 29, 2014 (rec'd by our agent Sep. 2, 2014); 22 pages (pp. 1-13 are a machine translation).

(56) References Cited

OTHER PUBLICATIONS

Japanese Patent Office, Notice of Reasons for Rejection; App. No. 2012-526737; Aug. 29, 2014 (rec'd by our agent Sep. 2, 2014); 24 pages (pp. 1-13 are a machine translation).
Japanese Patent Office, Notice of Reasons for Rejection; App. No. 2012-526738; Aug. 29, 2014 (rec'd by our agent Sep. 2, 2014); 24 pages (pp. 1-13 are a machine translation).
Japanese Patent Office, Notice of Reasons for Rejection; App. No. 2012-526739; Aug. 29, 2014 (rec'd by our agent Sep. 2, 2014); 20 pages (pp. 1-11 are a machine translation).
Chinese State Intellectual Property Office First Office Action; App. No. 201080049233.0; Mar. 21, 2014 (received by our agent on Mar. 24, 2014); 10 pages (no translation available).
Chinese State Intellectual Property Office First Office Action; App. No. 201080049238.3; Mar. 20, 2014 (received by our agent on Mar. 24, 2014); 10 pages (no translation available).
Extended European Search Report; App. No. EP 10 81 5734; Feb. 17, 2014 (received by our agent Feb. 24, 2014); pp. 1-7.
United States Patent and Trademark Office, U.S. Appl. No. 12/653,184, filed Dec. 8, 2009; Office Action Summary, Non-Final Office Action; mailed Jul. 22, 2013; 22 pages.
United States Patent and Trademark Office, U.S. Appl. No. 12/653,184, filed Dec. 8, 2009; applicants' Request for Corrected Office Action; filed Oct. 21, 2013 (filing receipt included); 4 pages.
United States Patent and Trademark Office, U.S. Appl. No. 12/653,184, filed Dec. 8, 2009; Decision on the Petition Regarding Request for New Office Action; mailed Jan. 27, 2014; 3 pages.
European Supplementary Search Report for EP10812440 mailed Oct. 24, 2016.
European Supplementary Search Report for EP10812441 mailed Oct. 25, 2016.
"Webster's Third New International Dictionary" (unabridged); Merriam-Webster, Inc.; 1993; Literature Online Reference Edition; Definition entry for the word "Plenum"; on the Internet at lionrefernce.chadwyck.com.
PCT International Search Report; International App. No. PCT/US10/02407; Oct. 25, 2010; pp. 1-2.
PCT International Search Report; International App. No. PCT/US10/02398; Nov. 12, 2010; pp. 1-2.
PCT International Search Report; International App. No. PCT/US10/02408; Nov. 15, 2010; pp. 1-3.
PCT International Search Report; International App. No. PCT/US10/02403; Dec. 9, 2010; pp. 1-2.
PCT International Search Report; International App. No. PCT/US10/02397; May 20, 2011; pp. 1-3.

* cited by examiner

NUCLEAR FISSION REACTOR, A VENTED NUCLEAR FISSION FUEL MODULE, METHODS THEREFOR, AND A VENTED NUCLEAR FISSION FUEL MODULE SYSTEM

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application constitutes a continuation of U.S. patent application Ser. No. 12/653,205, entitled A NUCLEAR FISSION REACTOR, A VENTED NUCLEAR FISSION FUEL MODULE, METHODS THEREFOR AND A VENTED NUCLEAR FISSION FUEL MODULE SYSTEM, naming Charles E. Ahlfeld, Pavel Hejzlar, Roderick A. Hyde, Muriel Y. Ishikawa, David G. McAlees, Jon D. McWhirter, Nathan P. Myhrvold, Ashok Odedra, Clarence T. Tegreene, Joshua C. Walter, Kevan D. Weaver, Thomas Allan Weaver, Charles Whitmer, Lowell L. Wood, Jr., and George B. Zimmerman as inventors, filed 8 Dec. 2009, now U.S. Pat. No. 9,269,462, which is currently co-pending or is an application of which a currently co-pending application is entitled to the benefit of the filing date, and which is a continuation of U.S. patent application Ser. No. 12/584,053, entitled A NUCLEAR FISSION REACTOR, A VENTED NUCLEAR FISSION FUEL MODULE, METHODS THEREFOR AND A VENTED NUCLEAR FISSION FUEL MODULE SYSTEM, naming Charles E. Ahlfeld, Pavel Hejzlar, Roderick A. Hyde, Muriel Y. Ishikawa, David G. McAlees, Jon D. McWhirter, Nathan P. Myhrvold, Ashok Odedra, Clarence T. Tegreene, Joshua C. Walter, Kevan D. Weaver, Thomas Allan Weaver, Charles Whitmer, Lowell L. Wood, Jr., and George B. Zimmerman as inventors, filed 28 Aug. 2009, now U.S. Pat. No. 8,488,734.

RELATED APPLICATIONS

U.S. patent application Ser. No. 12/653,184, entitled A NUCLEAR FISSION REACTOR, A VENTED NUCLEAR FISSION FUEL MODULE, METHODS THEREFOR AND A VENTED NUCLEAR FISSION FUEL MODULE SYSTEM, naming Charles E. Ahlfeld, Pavel Hejzlar, Roderick A. Hyde, Muriel Y. Ishikawa, David G. McAlees, Jon D. McWhirter, Nathan P. Myhrvold, Ashok Odedra, Clarence T. Tegreene, Joshua C. Walter, Kevan D. Weaver, Thomas Allan Weaver, Charles Whitmer, Lowell L. Wood, Jr., and George B. Zimmerman as inventors, filed 8 Dec. 2009, now abandoned, is related to the present application.

U.S. patent application Ser. No. 12/653,183, entitled A NUCLEAR FISSION REACTOR, A VENTED NUCLEAR FISSION FUEL MODULE, METHODS THEREFOR AND A VENTED NUCLEAR FISSION FUEL MODULE SYSTEM, naming Charles E. Ahlfeld, Pavel Hejzlar, Roderick A. Hyde, Muriel Y. Ishikawa, David G. McAlees, Jon D. Mcwhirter, Nathan P. Myhrvold, Ashok Odedra, Clarence T. Tegreene, Joshua C. Walter, Kevan D. Weaver, Thomas Allan Weaver, Charles Whitmer, Lowell L. Wood, Jr., and George B. Zimmerman as inventors, filed 8 Dec. 2009, now U.S. Pat. No. 8,712,005, is related to the present application.

U.S. patent application Ser. No. 12/653,206, entitled A NUCLEAR FISSION REACTOR, A VENTED NUCLEAR FISSION FUEL MODULE, METHODS THEREFOR AND A VENTED NUCLEAR FISSION FUEL MODULE SYSTEM, naming Charles E. Ahlfeld, Pavel Hejzlar, Roderick A. Hyde, Muriel Y. Ishikawa, David G. McAlees, Jon D. McWhirter, Nathan P. Myhrvold, Ashok Odedra, Clarence T. Tegreene, Joshua C. Walter, Kevan D. Weaver, Thomas Allan Weaver, Charles Whitmer, Lowell L. Wood, Jr., and George B. Zimmerman as inventors, filed 8 Dec. 2009, now U.S. Pat. No. 8,929,505, is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application generally relates to induced nuclear reactions including processes, systems and elements, wherein a fuel component includes a means to release fission products therefrom during normal operation of a nuclear reactor and more particularly relates to a nuclear fission reactor, a vented nuclear fission fuel module, methods therefor and a vented nuclear fission fuel module system.

It is known that, in an operating nuclear fission reactor, neutrons of a known energy are absorbed by nuclides having a high atomic mass. The resulting compound nucleus separates into about 200 fission products (i.e., a residual nucleus formed in fission, including fission fragments and their decay daughters) that include two lower atomic mass fission fragments (i.e., a nucleus formed as a result of fission) and also decay products (a nuclide resulting from radioactive decay of a parent isotope or precursor nuclide). Nuclides known to undergo such fission by neutrons of all energies include uranium-233, uranium-235 and plutonium-239, which are fissile nuclides. For example, thermal neutrons having a kinetic energy of 0.0253 eV (electron volts) can be used to fission U-235 nuclei. Fission of thorium-232 and uranium-238, which are fertile nuclides, will not undergo induced fission, except with fast neutrons that have a kinetic energy of at least 1 MeV (million electron volts). The total kinetic energy released from each fission event is about 200 MeV for U-235 and about 210 MeV for Pu-239. In a commercial nuclear fission power reactor, this energy release is used to generate electricity.

During reactor operation, the aforementioned fission products may be released from a nuclear fuel pellet during the fission process. In the case of U-235 fission, typical fission products include isotopes of the elements of barium, iodine, cesium, krypton, strontium and xenon, among others. Some of these fission products are short-lived, such as I-131 which has a half-life of about eight days before beta decaying to Xe-131. Other fission products are longer-lived, such as Sr-90 which has a half-life of about 30 years. Production of solid and gaseous fission products or decay products thereof can affect operation of the nuclear reactor by having adverse effects on cladding material that house a plurality of the nuclear fuel pellets. These effects typically occur due to stress on the cladding because of increased internal pressure from the fission gases, contact of the fuel with the cladding due to swelling of the fuel (also known as fuel cladding mechanical interaction, FCMI), and chemical interactions of the myriad of fission products and existing or formed actinides with the cladding (also known as fuel cladding chemical interaction, FCCI). As an example of the former, fission product gases may accumulate in fuel rods containing the nuclear fuel and cause the fuel rod cladding to swell or deform plastically because of the increased internal pressure. As an example of FCMI, individual fuel pellets may swell volumetrically either across the entire fuel pellet or at the ends thereof to form an hour-glass shape. The mechanism leading to fuel pellet swelling that can compromise fuel cladding integrity is reasonably well understood by those in the art. In this regard, a gaseous fission product isotope may diffuse into the grain boundary of the fuel to form a gas bubble there, which leads, in part, to swelling of the fuel pellet. Additionally, solid phase fission products may precipitate out of the fuel matrix. Such processes contribute to the swelling of the fuel pellets. In either case, such swollen fuel pellets may bridge a heat transfer gap that is present between the fuel pellets and the cladding surrounding or housing the fuel pellets, thereby allowing the fuel pellets to contact the cladding. Contact of the fuel pellets with the cladding cause stress concentrations on the cladding as fission products continue to be formed leading to further fuel swelling. Fission products may migrate from the fuel pellet, travel into the heat transfer medium in the gap between the fuel pellet and cladding and may be either absorbed, adsorbed, or interact chemically with portions of the cladding, particularly at grain boundaries. In other words, the fission products, gaseous or otherwise, may accelerate stress corrosion cracking of the cladding, which may in turn lead to a breach of the cladding at the locally affected areas. It is understood that fission gas pressure, FCMI, and FCCI may interact upon the cladding in a manner such that the effects are compounded.

As previously mentioned, swelling of the fuel and build-up of fission gases can exert pressure on the fuel rod cladding that encloses the fuel material. Stresses, unless compensated for, might cause the fuel rod cladding to swell to the extent that coolant flow channels are obstructed. Also, such stresses, unless compensated for, might cause the fuel rod cladding to crack or rupture, as mentioned hereinabove. Thus, during the design phase of a nuclear fission reactor, reactor designers may shorten the design life of the nuclear fission reactor to compensate for the effects caused by accumulation of fission product solids and gases. Moreover, during operation of the nuclear fission reactor, reactor operators may be forced to temporarily shut-down the reactor to replace fuel rods that swell, crack or rupture due to effects of fission product gases.

There are various nuclear power reactor designs currently in use. Each of these designs produces fission products. For example, a pressurized water reactor (PWR) design, which uses thermal energy neutrons, includes a pressurizer that is partially filled with water. The water in the pressurizer is heated to create a steam bubble above the water that is in the pressurizer. The pressurizer, which is connected to a primary coolant loop of the reactor, provides an expansion space by means of the steam bubble to accommodate changes in water volume during reactor operation. Pressure is controlled in the primary coolant loop by increasing or decreasing the steam pressure in the pressurizer. Also, heat due to nuclear fission is transferred by conduction through the fuel cladding to water circulating in the primary coolant loop. Due to a relatively high pressure of about 138 bars (i.e., 2000 psi) in the primary coolant loop, coolant boiling is precluded in a PWR. A steam generator, that includes a secondary loop as well as the primary loop passing through it, is provided that allows the heat to transfer from the primary coolant loop to the secondary coolant loop. The secondary coolant loop is separate from the primary coolant loop, so that the coolant flowing through the secondary coolant loop is not radioactively contaminated by the radioactive coolant flowing through the primary coolant loop. Due to the heat transfer occurring in the steam generator, steam that is produced in the steam generator is eventually supplied to a turbine-generator for generating electricity in a manner well known in the art of electricity production from steam.

Moreover, fuel used in PWRs is typically uranium dioxide ($UO_2$) sealed in a cladding made from a zirconium alloy, such as ZIRCALOY™ (trademark of the Westinghouse Electric Corporation, located in Pittsburgh, Pa., U.S.A.). For example, a specific cladding material that is in common use due to its low absorption cross-section for thermal neutrons and known resistance to corrosion and cracking is ZIRCALOY-2™, which contains chromium. A common composition given in the literature for ZIRCALOY-2™ contains about 98.25 weight % (wt %) zirconium (Zr), 0.10 wt % chromium (Cr), 1.45 wt % tin (Sn), 0.135 wt % iron (Fe), 0.055 wt % nickel (Ni) and 0.01 wt % hafnium (Hf). However, chemical interaction between the fission product cesium (Cs) and the chromium in the Zircaloy-2™ cladding may form the corrosion product compound cesium chromate ($Cs_2CrO_4$) that may conceivably attack the cladding. Other fission products, in addition to Cs, known possibly to attack ZIRCALOY-2™ include rubidium, cesium urinates, cesium zirconates, cesium halides, tellurium and other halogens, and fuel pellet impurities such as hydrogen, water and hydrocarbons. On the other hand, the cladding in a PWR may be made from materials other than ZIRCALOY-2™, such as ferritic martensitic steels. For example, Type AISI 304L stainless steel, which also contains chromium, has been used as another cladding material and contains C (0.02 wt %), Si (0.66 wt %), Mn (1.49 wt %), P (0.031 wt %), S (0.007 wt %), Cr (18.47 wt %), Ni (10.49 wt %) and Fe (68.83 wt %). Thus, the corrosion product cesium chromate may also be produced when stainless steel is used. However, it is known by persons of skill in the art of nuclear power reactor design that use of ZIRCALOY™, or ZIRCALOY-2™ or ferritic martensitic steels, even in the presence of fission product solids and gasses, reduces the risk of cladding corrosion, cracking or rupture to manageable levels for a given level of burn-up.

A boiling water reactor (BWR) design, which also uses thermal energy neutrons, allows coolant that acts as a moderator of neutrons to boil in the region of the fuel rods at a pressure of about 60 to about 70 bars (i.e., about 870 psi to about 1015 psi). This steam-water mixture is supplied to a water separator that separates the steam from the water. Thereafter the steam is supplied to a dryer that dries the steam. The "dried" steam is supplied to a turbine-generator for generating electricity in a manner well known in the art of electricity generation from steam. This reactor design does not use a secondary coolant loop or steam generator. In some cases, it may be desirable to remove fission products from the coolant, so that fission products do not contaminate the turbine-generator. The fuel in the fuel rods typically is $UO_2$ and the cladding material typically is Zircaloy-2™. Thus, the pellet-clad interactions mentioned hereinabove for PWRs that might give rise to release of fission products may also obtain for BWRs. In addition, recirculation pumps may be used in BWRs to force recirculation of the coolant in order to control reactor power. The power history of the reactor in turn affects the amount and type of fission products produced.

A fast neutron reactor (FNR), such as a liquid metal fast breeder reactor (LMFBR) design, uses fast energy neutrons rather than thermal energy neutrons in the fission process. It is known that, in such fast neutron reactors, there is a greater excess of neutrons released during the fission process than in thermal neutron reactors. This excess of neutrons is used to breed fissile material through the absorption of the excess neutrons in fertile material. More specifically, the reactor core is surrounded by a blanket of non-fissile fuel materials, such as uranium-238, which is bred, or converted, to fissile fuel material, such as plutonium-239. The plutonium-239 can be reprocessed for use as nuclear fuel. It is known that such a method to operate and reprocess fuel within certain fast breeder reactors can lead to more fuel produced from the system than is consumed. The nuclear fuel present in the reactor core may be a uranium-nitride (UN). On the other hand, the fuel may be a mixed oxide fuel, such as plutonium dioxide ($PuO_2$) and uranium dioxide ($UO_2$). Alternatively, the fuel may be a metal actinide fuel produced by neutron capture during the fission process, such as an alloy of zirconium, uranium, plutonium and minor actinides (e.g., neptunium-237, americium-241, curium-242 through curium-248, berkelium-247, californium-249 through californium-252, einsteinium-252 and fermium-257). The reactor core is cooled by liquid metal, such as liquid sodium (Na) metal, or liquid lead metal, or a metal mixture, such as sodium-potassium (Na—K), or lead-bismuth (Pb—Bi). As is the case with all nuclear fission reactors, fission products are produced. Fission products absorb neutrons. Normally, in the breeder reactor fuel cycle, reprocessed fuel that is relatively free of neutron absorbing fission products is provided to the reactor core to generate heat that, in turn, is used to produce electricity. In this case, the fission products have been previously separated-out of the spent reactor fuel during reprocessing that occurs before the reprocessed fuel can be provided to the reactor core to produce the electricity. Therefore, it may be desirable to separate fission products from the fuel before reprocessing begins in order to more cost effectively reprocess the fuel.

An advanced gas-cooled nuclear fission reactor (AGR) uses a graphite neutron moderator and a carbon dioxide ($CO_2$) coolant. AGRs obtain higher thermal efficiencies of about 40% and achieve higher burnups compared to PWRs and BWRs. The fuel is $UO_2$ pellets clad in stainless steel. The coolant is circulated through the reactor core and then passed through a steam generator outside the core, but still within the pressure vessel. Reactor control of the fission process is by means of control rods and reactor shutdown is achieved by means of nitrogen injection into the reactor core. Injection of balls comprising boron provides a redundant shutdown capability. Fission product production may have similar effects on fuel rod integrity, as previously mentioned for PWRs, BWRs and FNRs. Fission products produced during operation of the AGR include technetium-99, ruthenium-106, cesium-134 and cerium-144, neptunium-237 and others.

There are other reactor designs under consideration in the nuclear industry but are, however, not in wide use. These other reactor designs include a light water cooled graphite-moderated reactor (coolant is boiling water); pressurized heavy water reactor (heavy water moderator, unenriched uranium fuel); sodium-cooled thermal reactor (thermal neutrons and sodium coolant); advanced pressurized water reactor (passive safety systems); simplified boiling water reactor (natural convection and no circulation pumps), among others. However, regardless of the reactor design, all nuclear fission reactors produce fission products that may have deleterious effects.

Thus, ameliorating the presence of fission product solids and gases in nuclear fuel rods for all reactor designs can help reduce risk of fuel rod swelling, cracking and rupture. Such amelioration may also reduce possible undesirable fission product gas and cladding chemical interaction which might lead to a breach of the cladding and release of fission products into the primary coolant system. Various systems are known in the art to prevent uncontrolled release of fission products into the primary coolant system. For example, fission products escaping into the reactor coolant may be scrubbed therefrom by use of filters and demineralizers.

A technique to remove fission gas from nuclear fuel is disclosed in U.S. Pat. No. 3,432,388, issued Mar. 11, 1969 in the name of Peter Fortescue and titled "Nuclear Reactor System With Fission Gas Removal." This patent discloses a fluid-cooled nuclear reactor having a venting system for relieving pressure inside clad fuel pins. According to this patent, a passageway network interconnects the interiors of otherwise sealed clad fuel pins in different fuel elements, and gas is admitted thereto to initially bring the internal pressure to within a given increment of the coolant pressure at startup. When fission products cause the internal pressure to increase, gas is vented to storage vessels to maintain the internal pressure proportional to the coolant pressure.

Another technique to vent gaseous fission products is disclosed in U.S. Pat. No. 3,996,100 issued Dec. 7, 1976 in the names of Masaomi Oguma et al. and titled "Vented Nuclear Fuel Element." This patent discloses a vented nuclear fuel element that comprises a cladding tube containing nuclear fuel therein and a device disposed in the upper portion of the cladding tube for venting gaseous fission products released from the nuclear fuel. The venting device comprises a porous plug for closure of the top end of the venting tube, which plug has a property of getting wet with the surrounding coolant, two plates that in cooperation with the cladding tube define a chamber for holdup of the gaseous fission products, a capillary tube for introducing the gaseous fission products from the nuclear fuel into the upper portion of the chamber, another capillary tube for introducing the gaseous fission products from the lower portion of the chamber to the porous plug, and a check valve for preventing the gaseous fission products within the chamber from flowing back into the interior of the cladding tube. Upon operation of the nuclear reactor, the gaseous fission products released from the nuclear fuel will pass through the check valve and the first mentioned capillary tube to reach the chamber, and from the chamber the gaseous fission products will pass through the second mentioned capillary tube and be vented through the porous plug to the coolant surrounding the nuclear fuel element.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with nuclear fission reactors, vented nuclear fission fuel modules, methods, and vented nuclear fission fuel module systems which are meant to be illustrative, not limiting in scope. In various embodiments, one or more of the problems described above in the Background have been reduced or eliminated, while other embodiments are directed to other improvements.

Illustrative embodiments provide a nuclear fission reactor, a vented nuclear fission fuel module, methods therefore, and a vented nuclear fission fuel module system.

According to an aspect of this disclosure, there is provided a nuclear fission reactor, comprising: a nuclear fission fuel element capable of generating a fission product; and means associated with the nuclear fission fuel element for controllably venting the fission product.

According to another aspect of the disclosure there is provided a nuclear fission reactor, comprising: a nuclear fission fuel element capable of generating a gaseous fission product; a reactor vessel associated with the nuclear fission fuel element for receiving the gaseous fission product; and means associated with the nuclear fission fuel element for controllably venting the gaseous fission product into the reactor vessel.

According to an additional aspect of the disclosure there is provided a nuclear fission reactor, comprising: a nuclear fission fuel element capable of generating a gaseous fission product; a valve body associated with the nuclear fission fuel element, the valve body defining a plenum therein for receiving the gaseous fission product; and a valve in operative communication with the plenum for controllably venting the gaseous fission product from the plenum.

According to a further aspect of the disclosure there is provided a nuclear fission reactor, comprising: a plurality of nuclear fission fuel element bundles capable of generating a gaseous fission product; a plurality of valve bodies associated with respective ones of the plurality of nuclear fission fuel element bundles, at least one of the plurality of valve bodies defining a plenum therein for receiving the gaseous fission product; a valve disposed in the at least one of the plurality of valve bodies and in communication with the plenum for controllably venting the gaseous fission product from the plenum; a flexible diaphragm coupled to the valve for moving the valve; and a removable cap threadably mounted on the valve.

According to still another aspect of the disclosure there is provided a vented nuclear fission fuel module, comprising: a nuclear fission fuel element capable of generating a fission product; and means associated with the nuclear fission fuel element for controllably venting the fission product.

According to yet another aspect of the disclosure there is provided a vented nuclear fission fuel module, comprising: a nuclear fission fuel element capable of generating a gaseous fission product; and means associated with the nuclear fission fuel element for controllably venting the gaseous fission product.

According to another aspect of the disclosure there is provided a vented nuclear fission fuel module, comprising: a nuclear fission fuel element capable of generating a gaseous fission product; a valve body associated with the nuclear fission fuel element, the valve body defining a plenum therein for receiving the gaseous fission product; and a valve in operative communication with the plenum for controllably venting the gaseous fission product from the plenum.

According to an additional aspect of the disclosure there is provided a vented nuclear fission fuel module, comprising: a plurality of nuclear fission fuel element bundles capable of generating a gaseous fission product; a plurality of valve bodies associated with respective ones of the plurality of nuclear fission fuel element bundles, at least one of the plurality of valve bodies defining a plenum therein for receiving the gaseous fission product; a valve disposed in the at least one of the plurality of valve bodies and in communication with the plenum for controllably venting the gaseous fission product from the plenum; a flexible diaphragm coupled to the valve for moving the valve; and a removable cap threadably mounted on the valve.

According to a further aspect of the disclosure there is provided a vented nuclear fission fuel module system, comprising: a nuclear fission fuel element capable of generating a fission product; and means associated with the nuclear fission fuel element for controllably venting the fission product.

According to still another aspect of the disclosure there is provided a vented nuclear fission fuel module system, comprising: a nuclear fission fuel element capable of generating a gaseous fission product; and means associated with the nuclear fission fuel element for controllably venting the gaseous fission product.

According to yet another aspect of the disclosure there is provided a vented nuclear fission fuel module system, comprising: a nuclear fission fuel element capable of generating a gaseous fission product; a valve body associated with the nuclear fission fuel element, the valve body defining a plenum therein for receiving the gaseous fission product; and a valve in operative communication with the plenum for controllably venting the gaseous fission product from the plenum.

According to another aspect of the disclosure there is provided a vented nuclear fission fuel module system, comprising: a plurality of nuclear fission fuel element bundles capable of generating a gaseous fission product; a plurality of valve bodies associated with respective ones of the plurality of nuclear fission fuel element bundles, at least one of the plurality of valve bodies defining a plenum therein for receiving the gaseous fission product; a valve disposed in the at least one of the plurality of valve bodies and in communication with the plenum for controllably venting the gaseous fission product from the plenum; a flexible diaphragm coupled to the valve for moving the valve; and a removable cap threadably mounted on the valve.

According to an additional aspect of the disclosure there is provided a method of operating a nuclear fission reactor, comprising: generating a fission product by activating a nuclear fission fuel element; and controllably venting the fission product by operating venting means associated with the nuclear fission fuel element.

According to a further aspect of the disclosure there is provided a method of operating a nuclear fission reactor, comprising: generating a gaseous fission product by activating a nuclear fission fuel element; receiving the gaseous fission product into a reactor vessel coupled to the nuclear fission fuel element; and operating venting means associated with the nuclear fission fuel element for controllably venting the gaseous fission product into the reactor vessel.

According to still another aspect of the disclosure there is provided a method of operating a nuclear fission reactor, comprising: receiving a gaseous fission product into a plenum defined by a valve body associated with a nuclear fission fuel element; and controllably venting the gaseous fission product from the plenum by operating means in communication with the plenum for venting the gaseous fission product from the plenum.

According to yet another aspect of the disclosure there is provided a method of operating a nuclear fission reactor, comprising: receiving a gaseous fission product into a plenum defined by at least one of a plurality of valve bodies associated with respective ones of a plurality of nuclear fission fuel element bundles; controllably venting the gaseous fission product from the plenum by operating a valve in the at least one of the plurality of valve bodies, the valve being in communication with the plenum; displacing the valve by allowing movement of a flexible diaphragm coupled to the valve; and threadably mounting a cap on the valve.

According to another aspect of the disclosure there is provided a method of assembling a vented nuclear fission fuel module, comprising: receiving a nuclear fission fuel element capable of generating a fission product; and receiving means associated with the nuclear fission fuel element for controllably venting the fission product.

According to an additional aspect of the disclosure there is provided a method of assembling a vented nuclear fission fuel module, comprising: receiving a nuclear fission fuel element capable of generating a gaseous fission product; coupling means to the nuclear fission fuel element for controllably venting the gaseous fission product into a reactor vessel; and coupling means for collecting the gaseous fission product to the venting means.

According to a further aspect of the disclosure there is provided a method of assembling a vented nuclear fission fuel module, comprising: receiving a nuclear fission fuel element capable of generating a gaseous fission product; coupling a valve body to the nuclear fission fuel element, the valve body defining a plenum therein for receiving the gaseous fission product; and disposing a valve in communication with the plenum for controllably venting the gaseous fission product from the plenum.

According to still another aspect of the disclosure there is provided a method of assembling a vented nuclear fission fuel module, comprising: receiving a plurality of nuclear fission fuel element bundles capable of generating a gaseous fission product; coupling a valve body to at least one of the plurality of nuclear fission fuel element bundles, the valve body defining a plenum therein for receiving the gaseous fission product; disposing a valve in the valve body and in communication with the plenum for controllably venting the gaseous fission product from the plenum; coupling a flexible diaphragm to the valve for moving the valve; and threadably mounting a removable cap on the valve.

A feature of some embodiments and aspects of the present disclosure is the provision of means associated with a nuclear fission fuel element for venting a fission product gas from the nuclear fission fuel element.

Another feature of some embodiments and aspects of the present disclosure is the provision of a valve body associated with the nuclear fission fuel element, the valve body defining a plenum therein and a valve in communication with the plenum.

Yet another feature of some embodiments and aspects of the disclosure is the provision of a sensor in communication with the plenum for sensing fission product gas pressure in the plenum.

Yet another feature of some embodiments and aspects of the disclosure is the provision of a sensor in communication with the plenum for sensing type of fission product gas in the plenum.

A further feature of some embodiments and aspects of the disclosure is the provision of a canister surrounding the nuclear fission fuel element, the canister comprising a tube sheet therein having a contour shaped for guiding a coolant along a coolant flow path extending from a first opening defined by the canister and through a second opening defined by the canister.

An additional feature of some embodiments and aspects of the disclosure is the provision of a canister surrounding the nuclear fission fuel element, the canister comprising a ceramic tube sheet therein for dissipating heat and having a contour shaped for guiding a coolant along a coolant flow path extending from a first opening defined by the canister and through a second opening defined by the canister.

In addition to the foregoing, various other method and/or device aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing-out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

DETAILED DESCRIPTION

Figure 1:
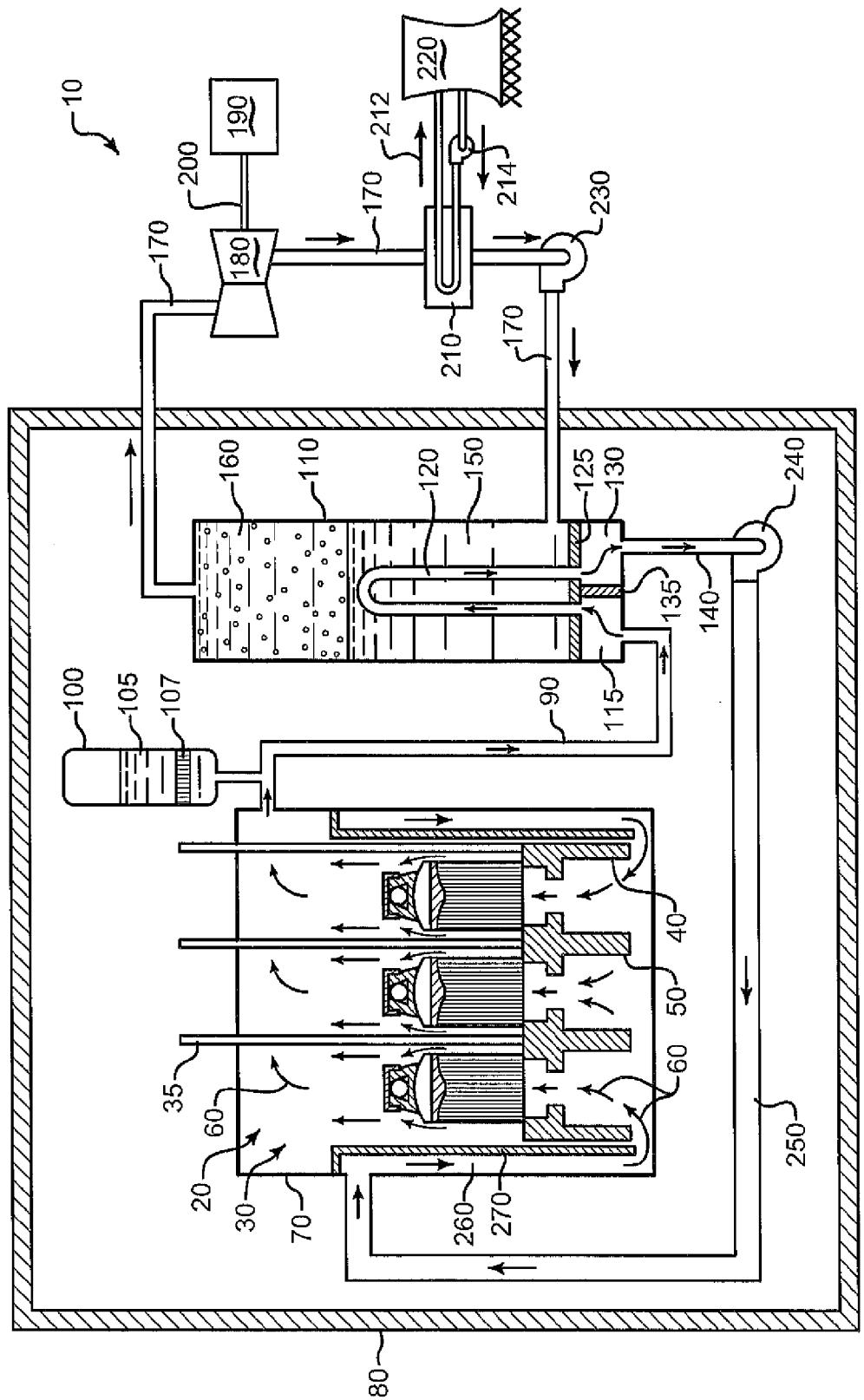
FIG. 1 is a view in partial elevation of an illustrative pressurized water reactor (PWR) including a plurality of vented nuclear fission fuel modules disposed therein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely illustrative, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Therefore, referring to FIG. 1, there is shown a nuclear fission reactor and system, such as a pressurized water reactor (PWR) generally referred to as 10, which is configured to remove fission product gases. Pressurized water reactor 10 comprises a nuclear reactor core, generally referred to as 20, for generating heat due to nuclear fission. Housed in reactor core 20 are a plurality of vented nuclear fission fuel modules, generally referred to as 30 (only three of which are shown) for suitably venting fission product gases, and which are described in detail hereinbelow. A plurality of longitudinally extending and longitudinally movable control rods 35 are associated with respective ones of the plurality of vented nuclear fission fuel modules 30 for controlling the fission chain reaction occurring within vented nuclear fission fuel modules 30. In other words, control rods 35 comprise a suitable neutron absorber material having an acceptably high neutron absorption cross-section that controls the fission chain reaction. In this regard, the absorber material may be a metal or metalloid selected from the group consisting essentially of lithium, silver, indium, cadmium, boron, cobalt, hafnium, dysprosium, gadolinium, samarium, erbium, europium and mixtures thereof. Alternatively, the absorber material may be a compound or alloy selected from the group consisting essentially of silver-indium-cadmium, boron carbide, zirconium diboride, titanium diboride, hafnium diboride, gadolinium titanate, dysprosium titanate and mixtures thereof. Control rods 35 will controllably supply negative reactivity to reactor core 20. Thus, control rods 35 provide a reactivity management capability to reactor core 20. In other words, control rods 35 are capable of controlling the neutron flux profile across nuclear fission reactor core 20 and thus influence various operating characteristics of nuclear fission reactor core 20, including fission product generation.

Referring again to FIG. 1, the plurality of vented nuclear fission fuel modules 30 rest on a lower core support plate 40 for supporting vented nuclear fission fuel modules 30 thereon. Lower core support plate 40 defines a bore 50 therethrough in communication with vented nuclear fission fuel modules 30 for providing coolant to vented nuclear fission fuel modules 30, such as along fluid flow lines 60. The coolant is distilled light water ($H_2O$). Reactor core 20 is disposed within a reactor pressure vessel 70 for preventing leakage of radioactive materials, including fission product gasses, solids or liquids from reactor core 20 to the surrounding biosphere. Pressure vessel 70 may be steel, concrete or other material of suitable size and thickness to reduce risk of such radiation leakage and to support required pressure loads. In addition, there is a containment vessel 80 sealingly surrounding parts of reactor 10 for added assurance that leakage of radioactive materials, including fission product gasses, solids or liquids from reactor core 20 to the surrounding biosphere is prevented.

Still referring again to FIG. 1, a primary coolant loop comprises a first primary loop pipe segment 90 that is coupled to reactor core 20 for reasons disclosed momentarily. A pressurizer 100 is coupled to primary loop pipe segment 90 for pressurizing the primary loop, which pressurizer 100 includes a distilled first body of water 105 and a pressurizer heater 107 for heating first body of water 105. First body of water 105 in pressurizer 100 is heated by pressurizer heater 107 to create a steam bubble above first body of water 105 that is in pressurizer 100. Pressurizer 100 provides an expansion space by means of the steam bubble to accommodate changes in water volume during operation of pressurized water reactor 10. Thus, pressure is controlled in the primary coolant loop by increasing or decreasing the steam pressure in pressurizer 100. First primary loop pipe segment 90 extends from reactor core 20 to an inlet plenum 115 defined by a heat exchanger or steam generator 110. Coolant flows through first primary loop pipe segment 90, into inlet plenum 115 and thereafter through a plurality of inverted U-shaped heat transfer tubes 120 (only one of which is shown) that are in communication with inlet plenum 115. Heat transfer tubes 120 are supported by a horizontally oriented steam generator tube sheet 125 and may be stabilized by a plurality of anti-vibration bars (not shown) connected to heat transfer tubes 120. An exit of each heat transfer tube 120 is in communication with an outlet plenum 130 defined by steam generator 110, which outlet plenum 130 is in communication with a second primary loop pipe segment 140. Outlet plenum 130 is sealingly segregated from inlet plenum 115 by a vertically oriented divider plate 135. Heat transfer tubes 120 are surrounded by a second body of water 150 having a predetermined temperature. The coolant fluid flowing through heat transfer tubes 120 will transfer its heat to second body of water 150, which is at a lower temperature than the fluid flowing through heat transfer tubes 120. As the fluid flowing through heat transfer tubes 120 transfers its heat to second body of water 150, a portion of second body of water 150 will vaporize to steam 160 according to the predetermined temperature within steam generator 110. Steam 160 will then travel through a steam line 170 which has one end thereof in vapor communication with steam 160 and another end thereof in liquid communication with body of water 150. A rotatable turbine 180 is coupled to steam line 170, such that turbine 180 rotates as steam 160 passes therethrough. An electrical generator 190, which is coupled to turbine 180, such as by a rotatable turbine shaft 200, generates electricity as turbine 180 rotates. In addition, a condenser 210 is coupled to steam line 170 and receives the steam passing through turbine 180. Condenser 210 condenses the steam to liquid water and passes any waste heat, via a recirculation flow path 212 and an electro-mechanical first pump 214, to a heat sink, such as a cooling tower 220, which is associated with condenser 210. The liquid water condensed by condenser 210 is pumped along steam line 170 from condenser 210 to steam generator 110 by means of an electro-mechanical second pump 230 interposed between condenser 210 and steam generator 110. It should be understood that steam generator 110, steam line 170, turbine 180, shaft 200, generator 190, condenser 210, cooling tower 220, first pump 214 and second pump 230 define a secondary coolant loop separated from the previously mentioned primary coolant loop.

Referring again to FIG. 1, a third electro-mechanical pump 240 is coupled to a third primary loop pipe segment 250 for allowing a suitable coolant to flow through reactor core 20 in order to cool reactor core 20. First, second and third primary loop coolant pipe segments 90/140/250, respectively, may be made from any suitable material, such as stainless steel. It may be appreciated that, if desired, first, second and third primary loop coolant pipe segments 90/140/250 may be made not only from ferrous alloys, but also from non-ferrous alloys, zirconium-based alloys or other suitable structural materials or composites. Third primary loop coolant pipe segment 250 opens onto a downcomer region 260 defined by a longitudinally extending annular panel 270 disposed between vented nuclear fission fuel modules 30 and an interior wall of reactor pressure vessel 70. Downcomer region 260 is shaped to guide coolant down the downcomer region 260 and into bore 50, so that the coolant can be directed to vented nuclear fission fuel modules 30. Thus, it should be appreciated that pressurized water reactor 10 comprises or includes vented nuclear fission fuel modules 30, which are described in detail hereinbelow.

Figure 2:
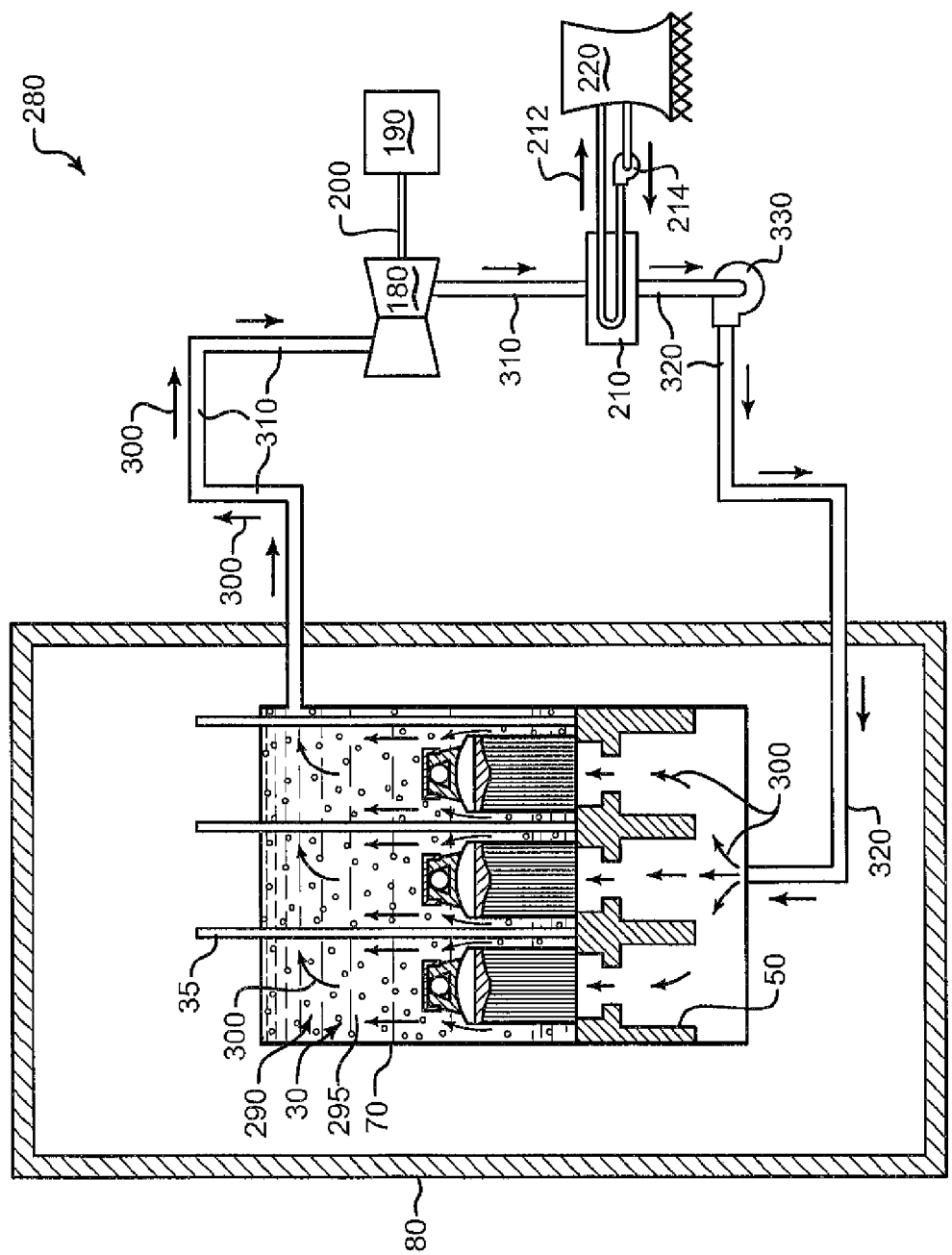
FIG. 2 is a view in partial elevation of an illustrative boiling water reactor (BWR) including the plurality of vented nuclear fission fuel modules disposed therein.

Referring to FIG. 2, there is shown an alternative embodiment nuclear fission reactor and system, which is a boiling water reactor (BWR), generally referred to as 280, that is configured to remove fission product gases. Boiling water reactor 280 comprises a nuclear reactor core, generally referred to as 290, for generating heat due to nuclear fission. Housed in reactor core 290 are a plurality of the previously mentioned vented nuclear fission fuel modules 30 (only three of which are shown), which are described in detail hereinbelow. Vented nuclear fission fuel modules 30 are allowed to heat the coolant in reactor core 290, such that steam 295 is produced in reactor core 290. A plurality of the previously mentioned longitudinally extending and longitudinally movable control rods 35 are associated with respective ones of the plurality of vented nuclear fission fuel modules 30 for controlling the fission chain reaction occurring within vented nuclear fission fuel modules 30. The plurality of vented nuclear fission fuel modules 30 rest on lower core support plate 40 for supporting vented nuclear fission fuel modules 30 thereon. Lower core support plate 40 defines bore 50 therethrough that is in communication with vented nuclear fission fuel modules 30 for providing coolant to vented nuclear fission fuel modules 30, such as along fluid flow lines 300. Reactor core 290 is disposed within reactor pressure vessel 70 for preventing leakage of radioactive materials, including fission product gasses, solids or liquids from reactor core 290 to the surrounding biosphere. Pressure vessel 70 may be steel, concrete or other material of suitable size and thickness to reduce risk of such radiation leakage and to support required pressure loads, as in the case of the previously mention pressurized water reactor 10. In addition, there is a containment vessel 80 sealingly surrounding parts of reactor 280 for added assurance that leakage of radioactive materials, including fission product gasses, solids or liquids from reactor core 290 to the surrounding biosphere is prevented.

Referring again to FIG. 2, a single coolant loop comprises a steam line 310 that is coupled to reactor core 290 for reasons disclosed momentarily. Rotatable turbine 180 is coupled to steam line 310, such that turbine 180 rotates as steam 160 passes therethrough. Electrical generator 190, which is coupled to turbine 180, such as by rotatable turbine shaft 200, generates electricity as turbine 180 rotates. In addition, condenser 210 is coupled to steam line 310 and receives the steam passing through turbine 180. Condenser 210 condenses the steam to liquid water and passes any waste heat via recirculation fluid path 212 and electromechanical first pump 214 to a heat sink, such as cooling tower 220, which is associated with condenser 210. The liquid water condensed by condenser 210 is pumped along a coolant pipe 320 from condenser 210 to reactor pressure vessel 70 by means of an electro-mechanical pump 330 interposed between condenser 210 and reactor pressure vessel 70. It should be understood that steam line 310, turbine 180, shaft 200, generator 190, condenser 210, cooling tower 220, coolant pipe 320 and pump 330 define a coolant loop for circulating coolant through reactor core 290. It may be appreciated that, if desired, steam line 310 and coolant pipe 320 may be made from ferrous alloys (e.g., stainless steel), non-ferrous alloys, zirconium-based alloys or other suitable structural materials or composites. Thus, it should be appreciated that boiling water reactor 280 comprises or includes vented nuclear fission fuel modules 30, which are described in detail hereinbelow.

Figure 3:
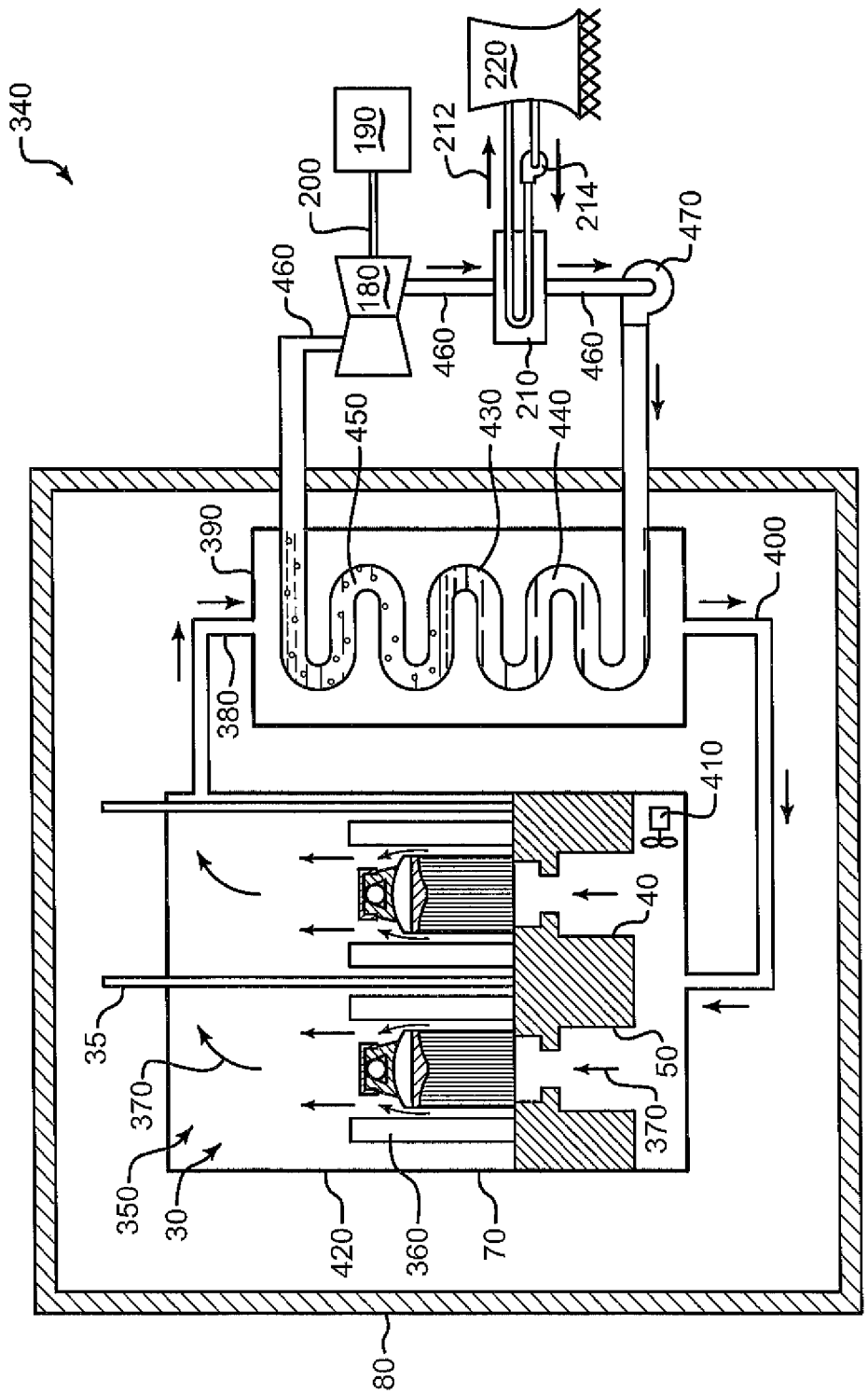
FIG. 3 is view in partial elevation of an illustrative advanced gas-cooled reactor (AGR) including the plurality of vented nuclear fission fuel modules disposed therein.

Referring to FIG. 3, there is shown another alternative embodiment nuclear fission reactor and system, which is an advanced gas-cooled reactor (AGR) generally referred to as 340, that is configured to remove fission product gases. Advanced gas-cooled reactor 340 comprises a nuclear reactor core, generally referred to as 350, for generating heat due to nuclear fission. Housed in reactor core 350 are a plurality of the previously mentioned vented nuclear fission fuel modules 30 (only two of which are shown), which are described in detail hereinbelow. The coolant used to cool nuclear fission fuel modules 30 may be carbon dioxide ($CO_2$), which is circulated through reactor core 350 in a manner described hereinbelow. Neutrons produced by the fission chain reaction occurring in reactor core 350 are moderated by a plurality of vertically oriented graphite blocks 360 (only four of which are shown) disposed adjacent to respective ones of vented nuclear fission fuel modules 30. A plurality of the previously mentioned longitudinally extending and longitudinally movable control rods 35 are associated with respective ones of the plurality of vented nuclear fission fuel modules 30 for controlling the fission chain reaction occurring within vented nuclear fission fuel modules 30. The plurality of vented nuclear fission fuel modules 30 rest on lower core support plate 40 for supporting vented nuclear fission fuel modules 30 thereon. Lower core support plate 40 defines bore 50 therethrough that is in communication with vented nuclear fission fuel modules 30 for providing coolant to vented nuclear fission fuel modules 30, such as along fluid flow lines 370. Reactor core 350 is disposed within reactor pressure vessel 70 for preventing leakage of radioactive materials, including fission product gasses, solids or liquids from reactor core 350 to the surrounding biosphere. As mentioned hereinabove, pressure vessel 70 may be steel, concrete or other material of suitable size and thickness to reduce risk of such radiation leakage and to support required pressure loads, as in the case of the previously mention pressurized water reactor 10. In addition, there is a containment vessel 80 sealingly surrounding parts of reactor 340 for added assurance that leakage of radioactive materials, including fission product gasses, solids or liquids from reactor core 350 to the surrounding biosphere is prevented.

Referring again to FIG. 3, a primary coolant loop comprises a first primary loop pipe segment 380 that is coupled to reactor core 350 for reasons disclosed momentarily. First primary loop pipe segment 380 extends from reactor core 350 to a heat exchanger or steam generator 390. Coolant flows through first primary loop pipe segment 380, into steam generator 390 and thereafter through a second primary loop pipe segment 400 that is coupled steam generator 390 at an end thereof and to a blower or recirculation fan 410 at another end thereof. Recirculation fan 410 is in fluid (i.e., gas) communication with reactor core 350. Recirculation fan 410 circulates the coolant through first primary loop pipe segment 380, through steam generator 390, through second primary loop pipe segment 400, into bore 50 that is formed in core lower support plate 40, and into vented nuclear fission fuel modules 30 and across the surfaces of graphite moderators 360, such as along fluid flow lines 370. The coolant then flows to steam generator 390. In this manner, heat due to fission is transported away from reactor core 350.

Still referring to FIG. 3, steam generator 390 includes a secondary loop passing therethrough. The secondary loop comprises at least one heat transfer tube 430 partially filled by a body of water 440 having a predetermined temperature. The gas flowing across the exterior surface of heat transfer tube 430 will transfer its heat to body of water 440, which is at a lower temperature than the gas flowing across heat transfer tube 430. As the gas flowing across the exterior surface of heat transfer tube 430 transfers its heat to body of water 440, a portion of body of water 440 will vaporize to steam 450 according to the predetermined temperature within heat transfer tube 430. Steam 450 will then travel through a steam line 460 due to pumping action of an electro-mechanical pump 470 coupled to steam line 460. The previously mentioned rotatable turbine 180 is coupled to steam line 460, such that turbine 180 rotates as steam 450 passes therethrough. Previously mentioned electrical generator 190, which is coupled to turbine 180, such as by rotatable turbine shaft 200, generates electricity as turbine 180 rotates. In addition, condenser 210 is coupled to steam line 460 and receives the steam passing through turbine 180. Condenser 210 condenses the steam to liquid water and passes any waste heat via recirculation fluid path 212 and electro-mechanical first pump 214 to a heat sink, such as cooling tower 220, which is associated with condenser 210. The liquid water condensed by condenser 210 is pumped along steam line 460 from condenser 210 to body of water 440 by means of electro-mechanical pump 470 that is interposed between condenser 210 and steam generator 390. It should be understood that steam generator 390, steam line 460, turbine 180, shaft 200, generator 190, condenser 210, cooling tower 220 and pump 470 define a secondary coolant loop that is separate from the primary coolant loop. The primary coolant loop and the secondary coolant loop cooperate to carry heat away from nuclear fission fuel modules 30. Thus, it should be appreciated that advanced gas-cooled reactor 340 comprises or includes vented nuclear fission fuel modules 30, which are described in detail hereinbelow.

Figure 4:
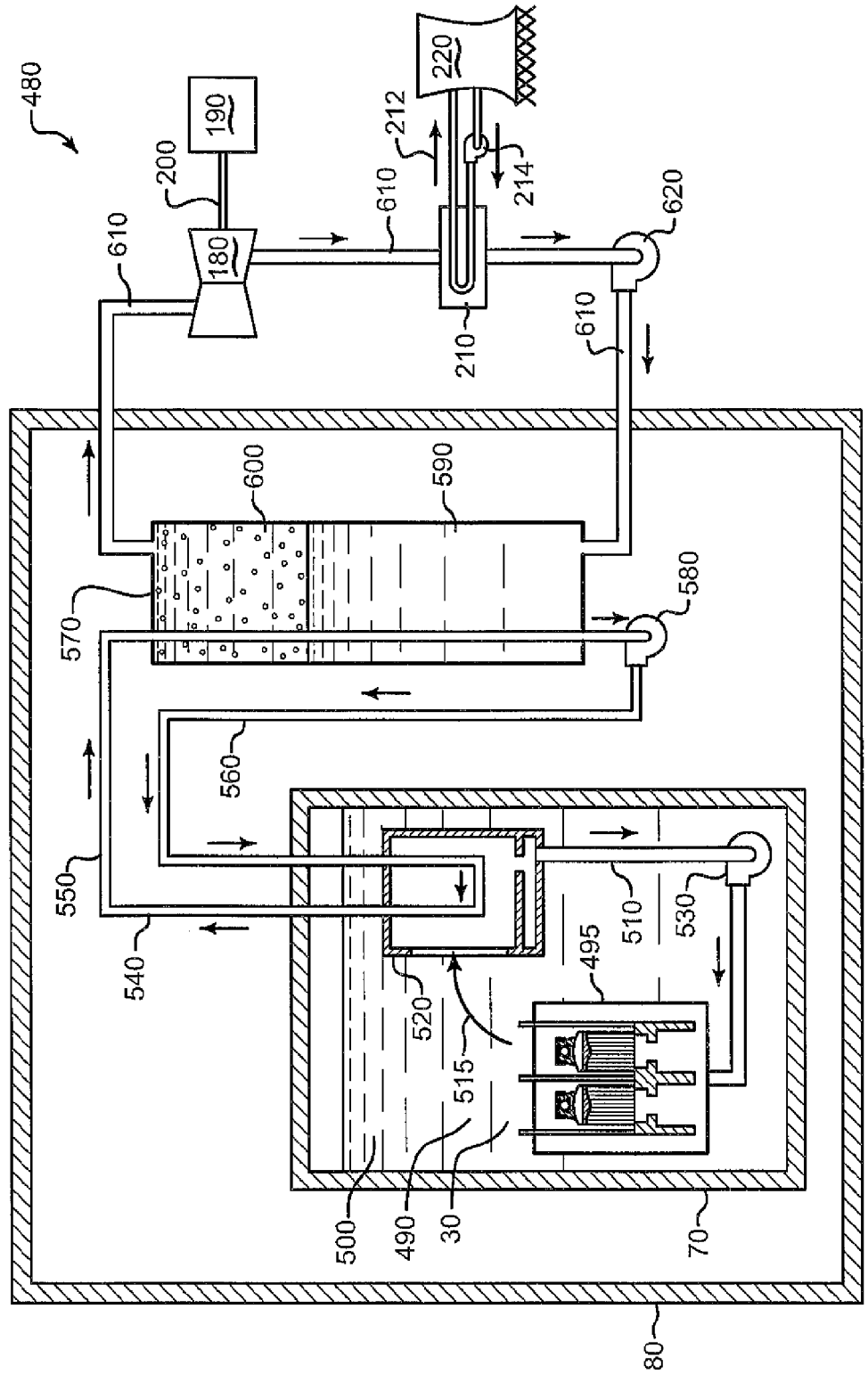
FIG. 4 is view in partial elevation of an illustrative fast neutron reactor (FNR) including the plurality of vented nuclear fission fuel modules disposed therein.

Referring to FIG. 4, there is shown yet another alternative embodiment nuclear fission reactor and system, such as a fast neutron nuclear fission reactor (FNR), generally referred to as 480, which is configured to remove fission product gases. As described more fully presently, reactor 480 may be a traveling wave fast neutron nuclear fission reactor (TWR). In this regard, traveling wave nuclear fission reactor 480 comprises a nuclear fission reactor core, generally referred to as 490, that includes vented nuclear fission fuel modules 30. Nuclear fission reactor core 490 is housed within a reactor core enclosure 495 which acts to maintain vertical coolant flow through the core. Enclosure 495 may also function as a radiation shield to protect in-pool components such as heat exchangers from neutron bombardment. Previously mentioned control rods 35 longitudinally extend into nuclear fission reactor core 490 for controlling the fission process occurring therein.

Referring again to FIG. 4, nuclear fission reactor core 490 is disposed within previously mentioned reactor pressure vessel 70. For reasons provided hereinbelow, pressure vessel 70 is substantially (e.g., about 90%) filled with a pool of coolant 500, such as liquid sodium, to an extent that nuclear fission reactor core 490 is submerged in the pool of coolant. In addition, containment vessel 80 sealingly surrounds parts of traveling wave nuclear fission reactor 480 for reasons previously mentioned.

Still referring to FIG. 4, a primary loop coolant pipe 510 is coupled to nuclear fission reactor core 490 for allowing a suitable coolant to flow through nuclear fission reactor core 490 along a coolant flow stream or flow path 515 in order to cool nuclear fission reactor core 490. Primary loop coolant pipe 510 may be made from stainless steel or from non-ferrous alloys, zirconium-based alloys or other suitable structural materials or composites. The coolant carried by primary loop coolant pipe 510 may be a liquid metal selected from the group consisting essentially of sodium, potassium, lithium, lead and mixtures thereof. On the other hand, the coolant may be a metal alloy, such as lead-bismuth (Pb—Bi). Suitably, in an illustrative embodiment contemplated herein, the coolant is a liquid sodium (Na) metal or sodium metal mixture, such as sodium-potassium (Na—K).

Referring yet again to FIG. 4, the heat-bearing coolant generated by nuclear fission reactor core 490 flows along flow path 515 to an intermediate heat exchanger 520 that is also submerged in coolant pool 500. Intermediate heat exchanger 520 may be made from any convenient material resistant to the heat and corrosive effects of the sodium coolant in coolant pool 500, such as stainless steel. The coolant flowing along coolant flow path 515 flows through intermediate heat exchanger 520 and continues through primary loop coolant pipe 510. It may be appreciated that the coolant leaving intermediate heat exchanger 520 has been cooled due to the heat transfer occurring in intermediate heat exchanger 520, as disclosed more fully hereinbelow. A pump 530, which may be an electro-mechanical pump, is coupled to primary loop pipe 510, and is in fluid communication with the reactor coolant carried by primary loop coolant pipe 510, for pumping the reactor coolant through primary loop pipe 510, through reactor core 490, along coolant flow path 515 and into intermediate heat exchanger 520.

Referring yet again to FIG. 4, a secondary loop pipe 540 is provided for removing heat from intermediate heat exchanger 520. Secondary loop pipe 540 comprises a secondary "hot" leg pipe segment 550 and a secondary "cold" leg pipe segment 560. Secondary hot leg pipe segment 550 and secondary cold leg pipe segment 560 are integrally connected to intermediate heat exchanger 520. Secondary loop pipe 540, which includes hot leg pipe segment 550 and cold leg pipe segment 560, contains a fluid, such as any one of the coolant choices previously mentioned. Secondary hot leg pipe segment 550 extends from intermediate heat exchanger 520 to a steam generator and superheater combination 570 (hereinafter referred to as "steam generator 570"), for reasons described momentarily. In this regard, after passing through steam generator 570, the coolant flowing through secondary loop pipe 540 and exiting steam generator 570 is at a lower temperature and enthalpy than before entering steam generator 570 due to the heat transfer occurring within steam generator 570. After passing through steam generator 570, the coolant is pumped, such as by means of another pump 580, which may be an electro-mechanical pump, along "cold" leg pipe segment 560, which extends into intermediate heat exchanger 520 for providing the previously mentioned heat transfer. The manner in which steam generator 570 generates steam is generally described immediately hereinbelow.

Referring yet again to FIG. 4, disposed in steam generator 570 is a body of water 590 having a predetermined temperature. The fluid flowing through secondary hot leg pipe segment 550 will transfer its heat by means of conduction and convection to body of water 590, which is at a lower temperature than the fluid flowing through secondary hot leg pipe segment 550. As the fluid flowing through secondary hot leg pipe segment 550 transfers its heat to body of water 590, a portion of body of water 590 will vaporize to steam 600 according to the predetermined temperature within steam generator 570. Steam 600 will then travel through a steam line 610, which steam line 610 has one end thereof in vapor communication with steam 600 and another end thereof in liquid communication with body of water 590. Previously mentioned rotatable turbine 180 is coupled to steam line 610, such that turbine 180 rotates as steam 600 passes therethrough. Electrical generator 190, which is coupled to turbine 180 by rotatable turbine shaft 200, generates electricity as turbine 180 rotates. In addition, previously mentioned condenser 210 is coupled to steam line 610 and receives the steam passing through turbine 180. Condenser 210 condenses the steam to liquid water and passes any waste heat via recirculation fluid path 212 and electro-mechanical pump 214 to heat sink or cooling tower 220, which is associated with condenser 210. The liquid water condensed by condenser 210 is pumped along steam line 610 from condenser 210 to steam generator 570 by means of yet another pump 620, which may be an electro-mechanical pump, interposed between condenser 290 and steam generator 570.

Figure 5:
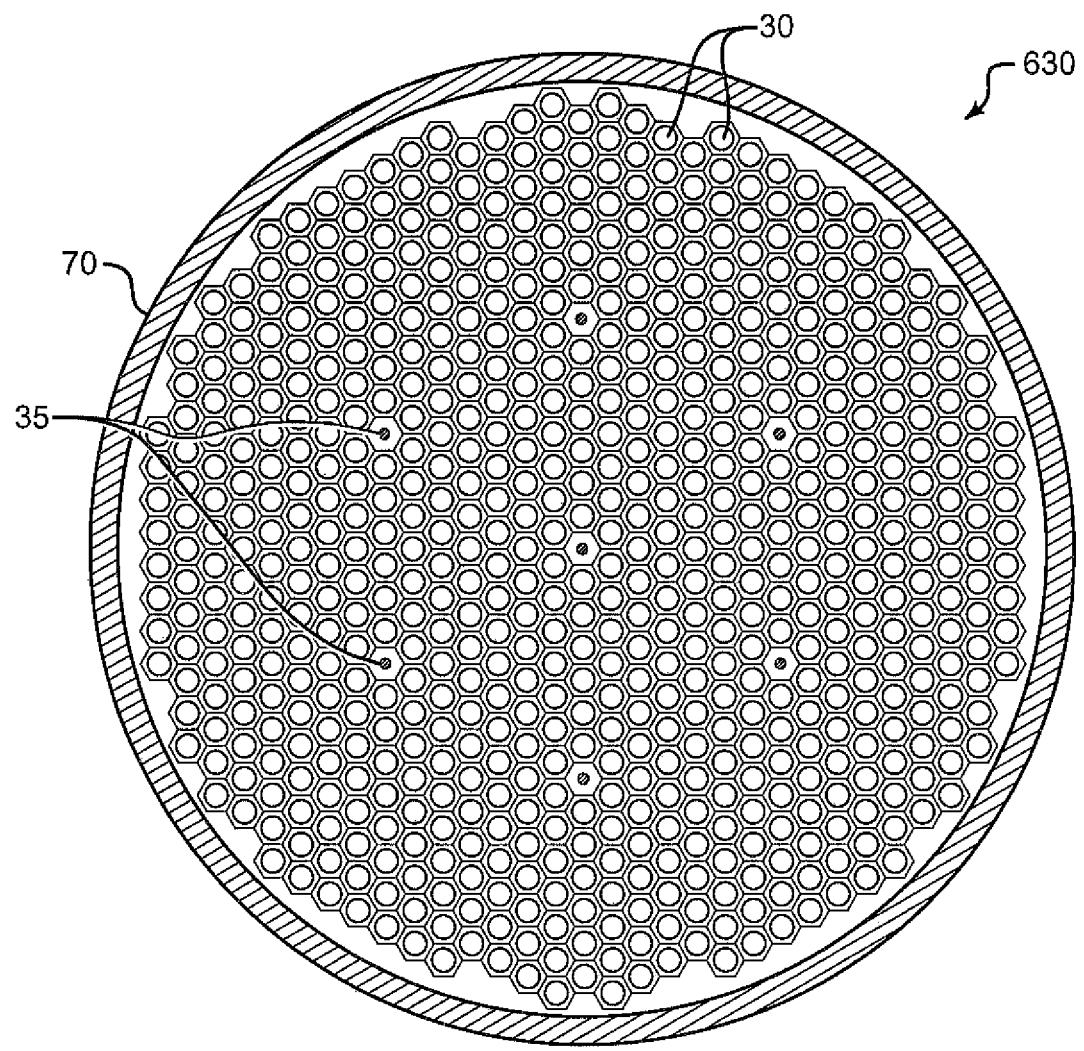
FIG. 5 is a view in transverse cross section of an illustrative cylindrically shaped nuclear fission reactor core including the plurality of vented nuclear fission fuel modules and a plurality of control rods disposed therein.
Figure 6:
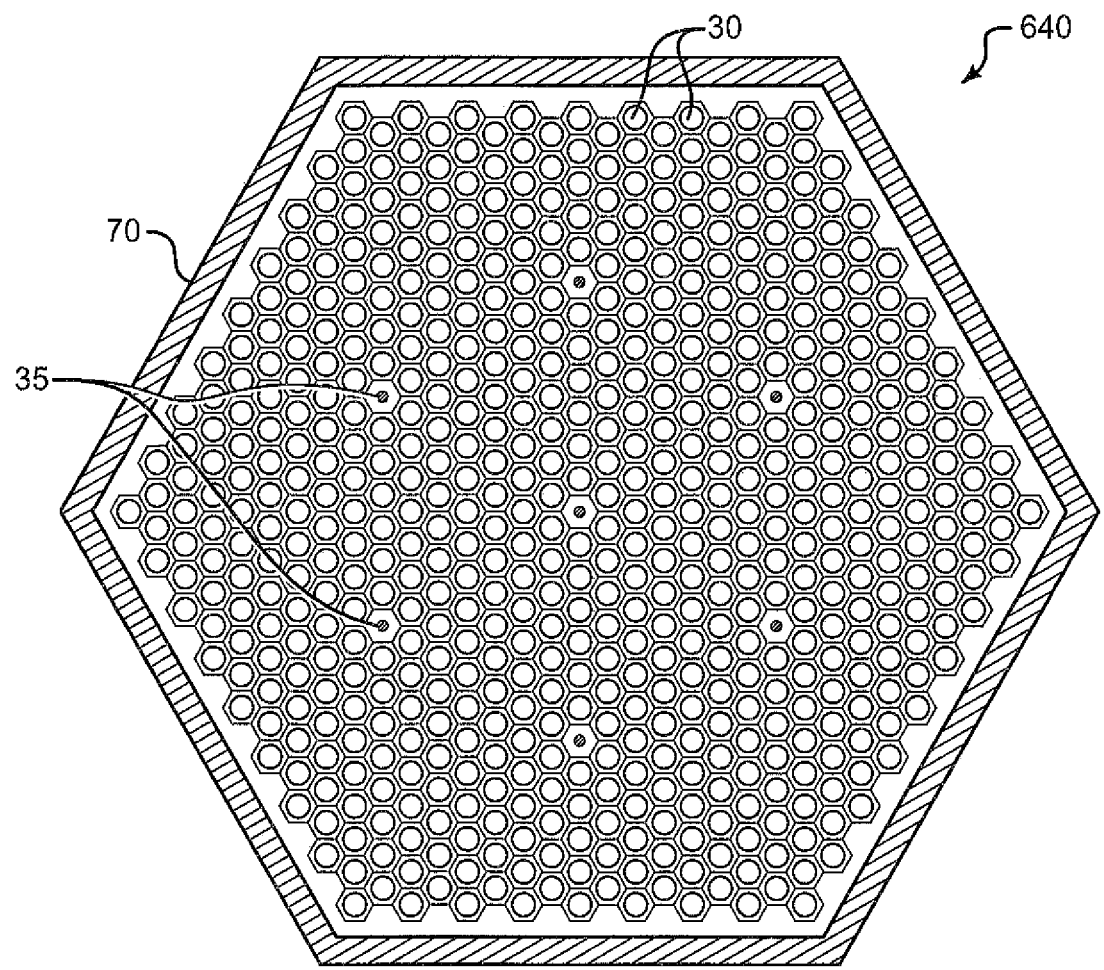
FIG. 6 is a view in transverse cross section of an illustrative hexagonally shaped nuclear fission reactor core including the plurality of vented nuclear fission fuel modules and the plurality of control rods disposed therein.
Figure 7:
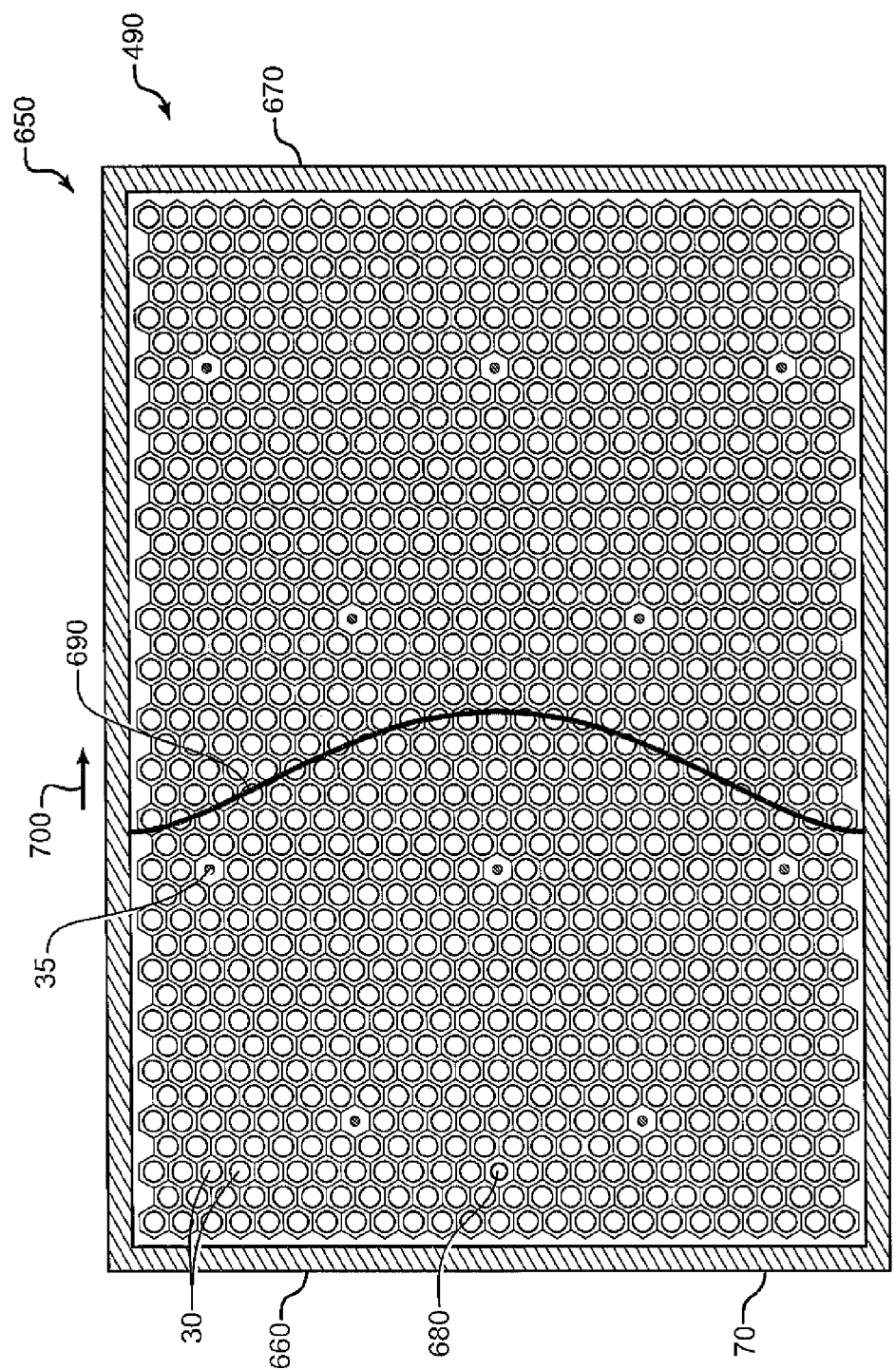
FIG. 7 is a view in transverse cross section of an illustrative parallelepiped shaped traveling wave fast neutron nuclear fission reactor core including the plurality of vented nuclear fission fuel modules and the plurality control rods disposed therein.

Referring to FIGS. 5, 6, and 7, reactor cores 20/290/350/490 may obtain various configurations to accommodate vented nuclear fission fuel modules 30. In this regard, any of nuclear fission reactor cores 20/290/350/490 may be generally cylindrically shaped to obtain a generally circular transverse cross section 630. Alternatively, any of nuclear fission reactor cores 20/290/350/490 may be generally hexagonally shaped to obtain a generally hexagonal transverse cross section 640. As another alternative, any of nuclear fission reactor cores 20/290/350/490 may be generally parallepiped shaped to obtain a generally rectangular transverse cross section 650. The generally rectangular transverse cross section 650 has a first end 660 and a second end 670 that is opposite first end 660, for reasons provided hereinbelow.

Referring to FIGS. 4 and 7, regardless of the configuration or shape selected for the nuclear fission reactor cores, the nuclear fission reactor core may be operated as a traveling wave nuclear fission reactor core, if desired. For example, in the case of nuclear fission reactor core 490, a nuclear fission igniter 680, which includes an isotopic enrichment of nuclear fissionable material, such as, without limitation, U-233, U-235 or Pu-239, is suitably located in nuclear fission reactor core 490. By way of example only and not by way of limitation, igniter 680 may be located near first end 660 that is opposite second end 670 of nuclear fission reactor core 490. Neutrons are released by igniter 680. The neutrons that are released by igniter 680 are captured by fissile and/or fertile material within nuclear fission fuel module 30 to initiate the previously mentioned nuclear fission chain reaction. Igniter 680 may be removed once the fission chain reaction becomes self-sustaining, if desired.

As best seen in FIG. 7, igniter 680 initiates a three-dimensional, traveling deflagration wave or "burn wave" 690. When igniter 680 generates neutrons to cause "ignition", burn wave 690 travels outwardly from igniter 680 that is near first end 660 and toward second end 670 of reactor core 490, so as to form the traveling or propagating burn wave 690. Speed of the traveling burn wave 690 may be constant or non-constant. Thus, the speed at which burn wave 690 propagates can be controlled. For example, longitudinal movement of the previously mentioned control rods 35 in a predetermined or programmed manner can drive down or lower neutronic reactivity of vented nuclear fission fuel modules 30. In this manner, neutronic reactivity of nuclear fuel that is presently being burned behind burn wave 690 or at the location of burn wave 690 is driven down or lowered relative to neutronic reactivity of "unburned" nuclear fuel ahead of burn wave 690. This result gives the burn wave propagation direction indicated by directional arrow 700. Controlling reactivity in this manner maximizes the propagation rate of burn wave 690 subject to operating constraints for reactor core 490, such as amount of permissible fission product production and/or neutron fluence limitations of reactor core structural materials.

The basic principles of such a traveling wave nuclear fission reactor are disclosed in more detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference, now abandoned.

Figure 8:
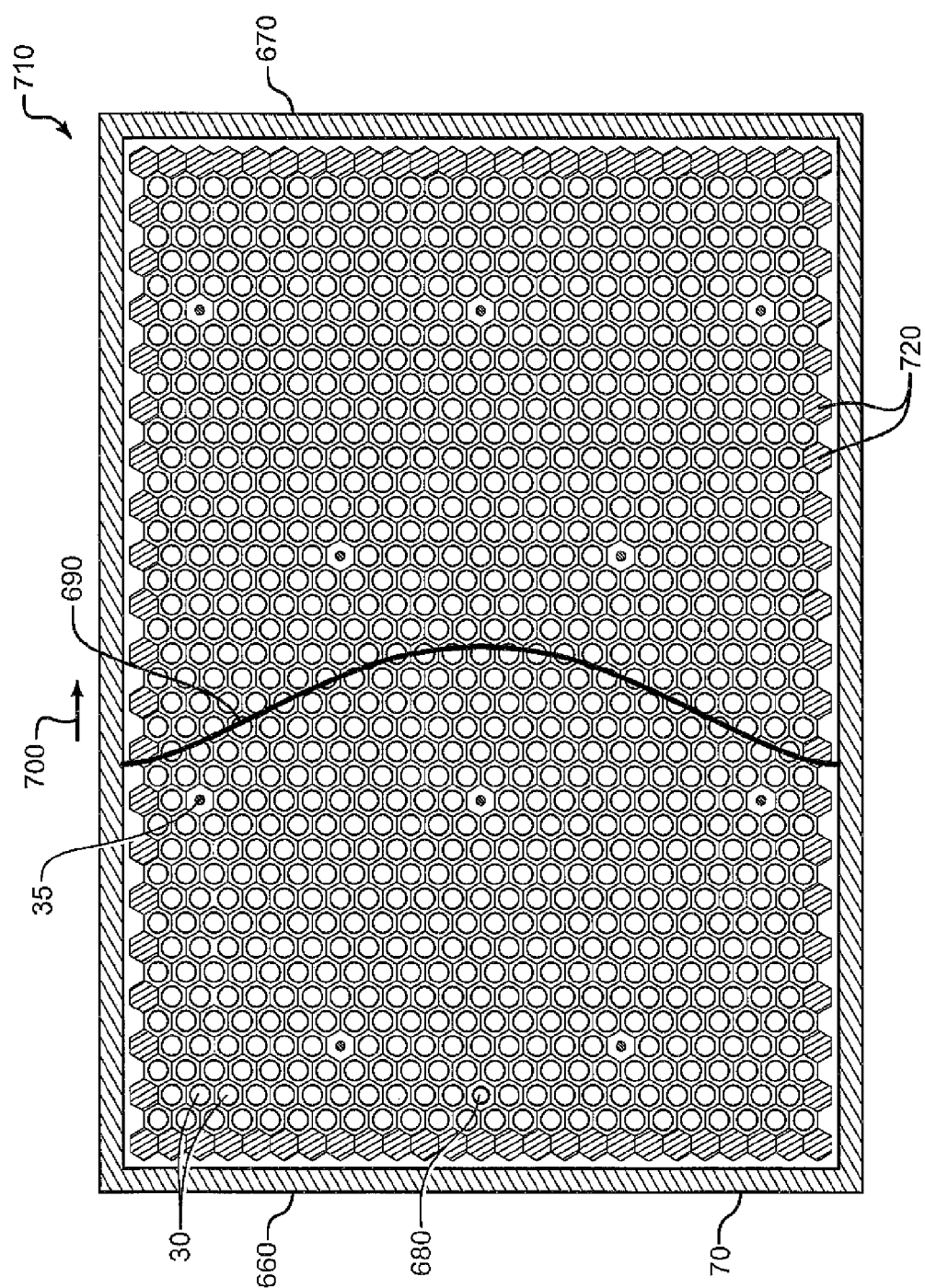
FIG. 8 is view in transverse cross section of an illustrative parallelepiped shaped traveling wave fast neutron breeder nuclear fission reactor core including the plurality of vented nuclear fission fuel modules and the plurality of control rods disposed therein.

Referring to FIG. 8, there is shown a fast neutron breeder reactor core, generally referred to as 710. Fast neutron breeder reactor core 710 is substantially similar to fast neutron reactor core 490, except that breeder fuel modules 720 may be arranged as a "breeding blanket" around the interior periphery or throughout the interior of nuclear fission breeder reactor core 710 for breeding nuclear fuel, as well known in the art of fast neutron breeder reactor design. In this regard, breeder fuel modules 720 house fertile nuclear fuel that will transmute to fissile nuclear fuel. A further alternative is that breeder fission fuel modules 720 and nuclear fission fuel modules 30 may comprise a predetermined mixture of fertile and fissile nuclides.

Figure 9:
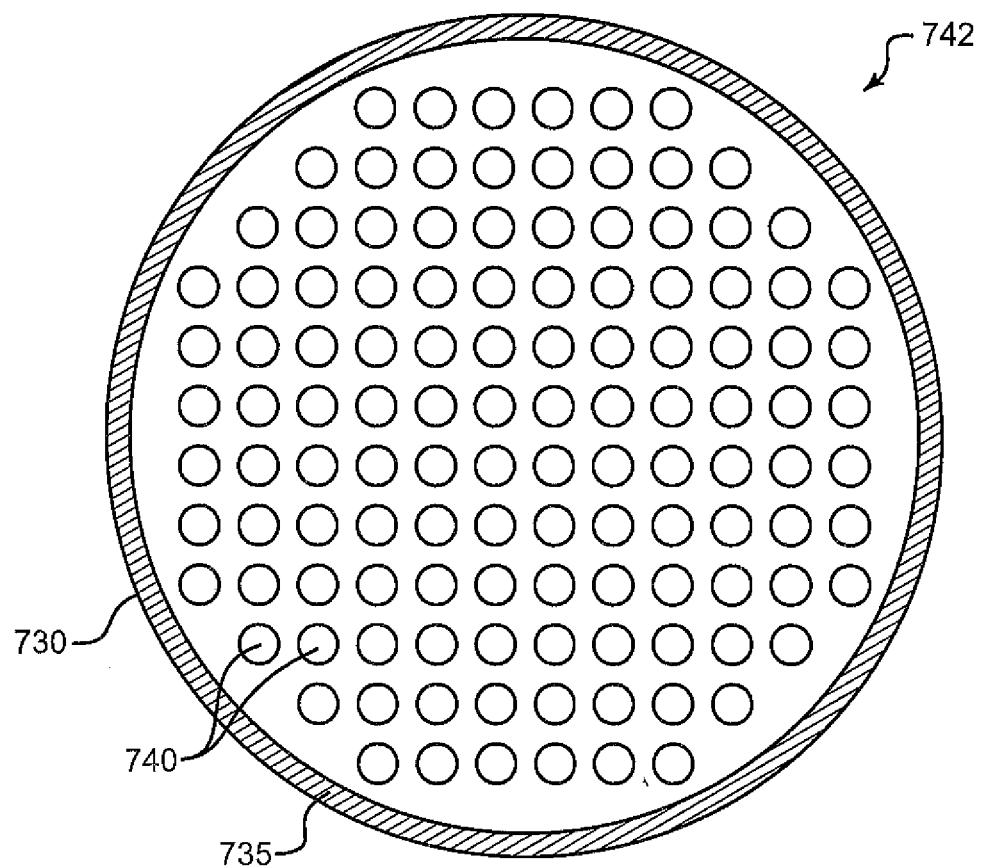
FIG. 9 is a view in transverse cross section of an illustrative cylindrically shaped vented nuclear fission fuel canister having a plurality of nuclear fuel elements disposed therein.
Figure 10:
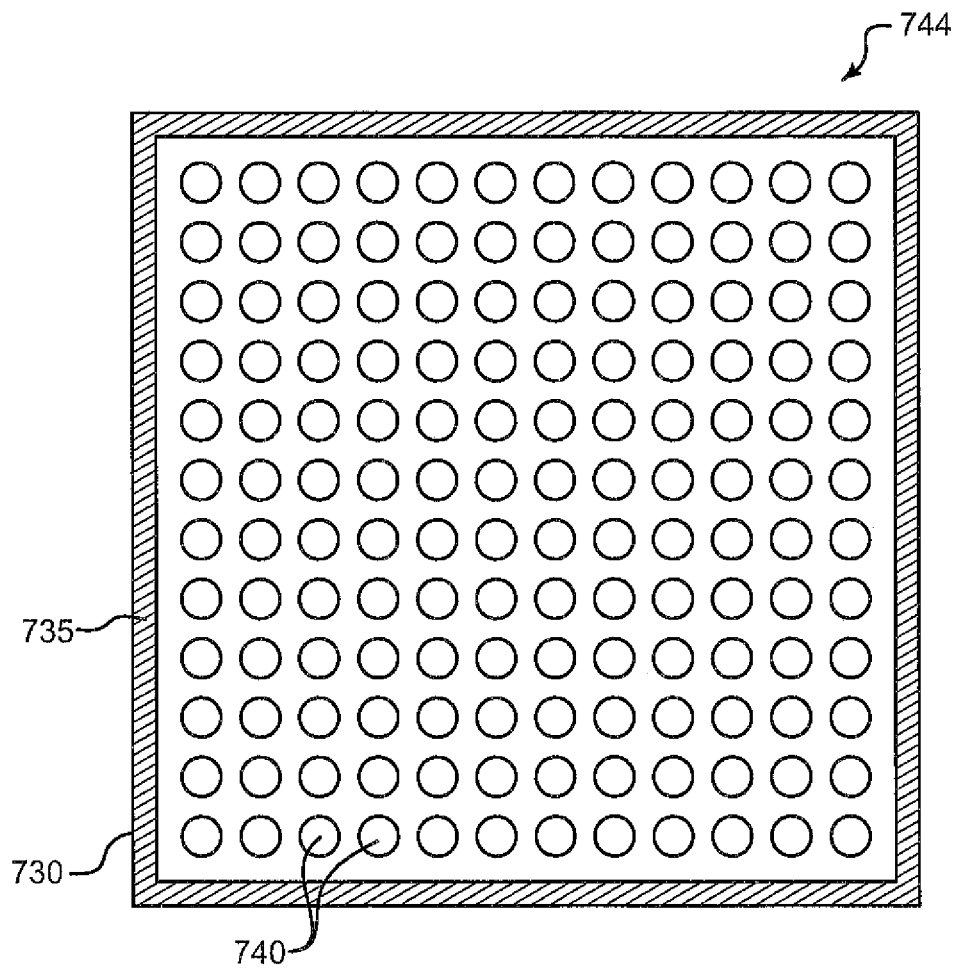
FIG. 10 is a view in transverse cross section of an illustrative parallelepiped shaped vented nuclear fission fuel canister having the plurality of nuclear fuel elements disposed therein.
Figure 11:
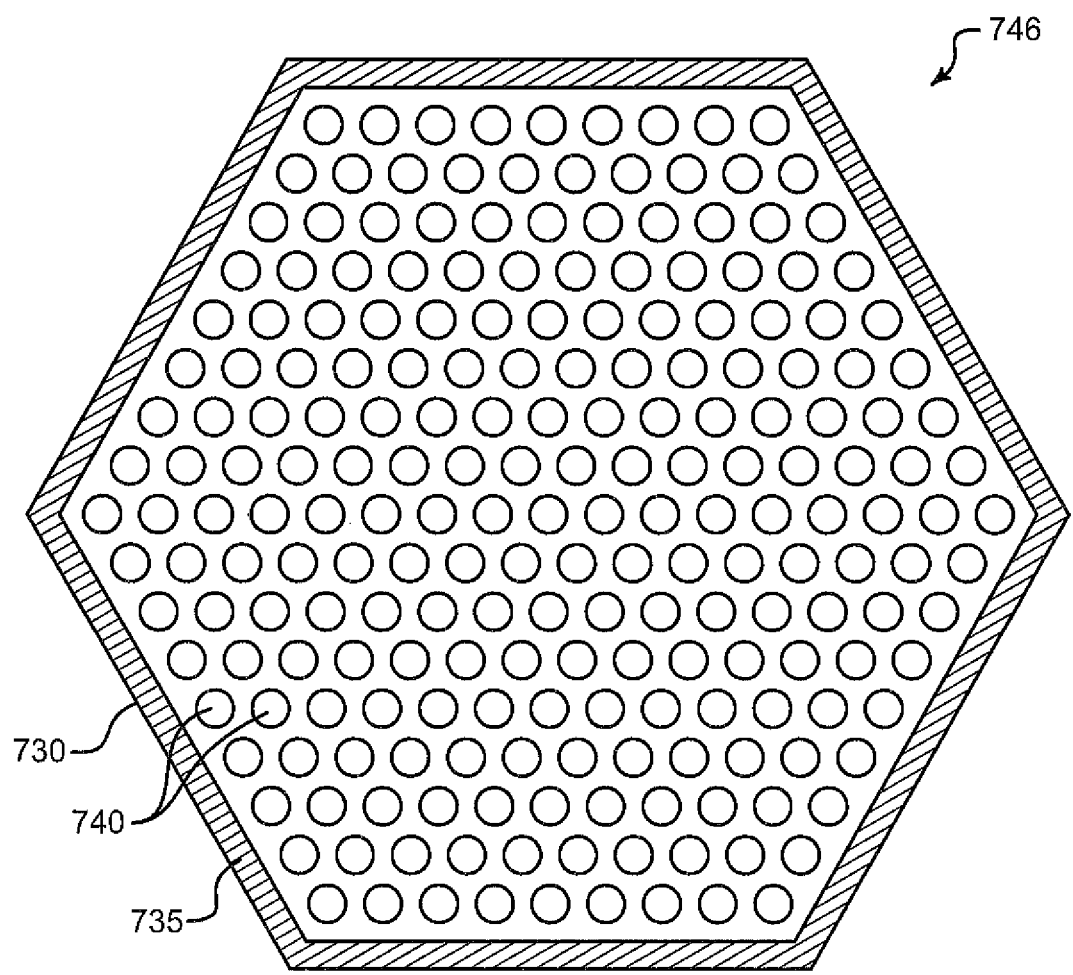
FIG. 11 is a view in transverse cross section of an illustrative hexagonally shaped vented nuclear fission fuel canister having the plurality of nuclear fuel elements disposed therein.

Referring to FIGS. 9, 10, and 11, vented nuclear fission fuel module 30 comprises an upright canister 730 for housing or surrounding a plurality of bundled-together cylindrical fuel pins or fuel elements 740 that are activated by a neutron source. It should be appreciated that nuclear fission fuel module 30 may also comprise a single fuel element 740. Canister 730 comprises a canister shell 735 that may be generally cylindrical having a circular transverse cross section, generally referred to as 742. Alternatively, canister shell 735 may have a parallelepiped shape, such as a rectangle or square shape, generally referred to as 744. As another alternative, canister shell 735 may have a generally hexagonal shape having a hexagonal transverse cross section, generally referred to as 746. Thus, it may be appreciated that canister 730, including canister shell 735, may obtain any suitable shape required by an operator of nuclear fission reactors 10, 280, 340 or 480. In any of the above mentioned embodiments, canister shell 735 may be used to provide structural support to the fuel elements therein or may act to direct a flow of coolant. In some embodiments, the coolant may be directed through openings in the canister shell, 735.

Figure 12:
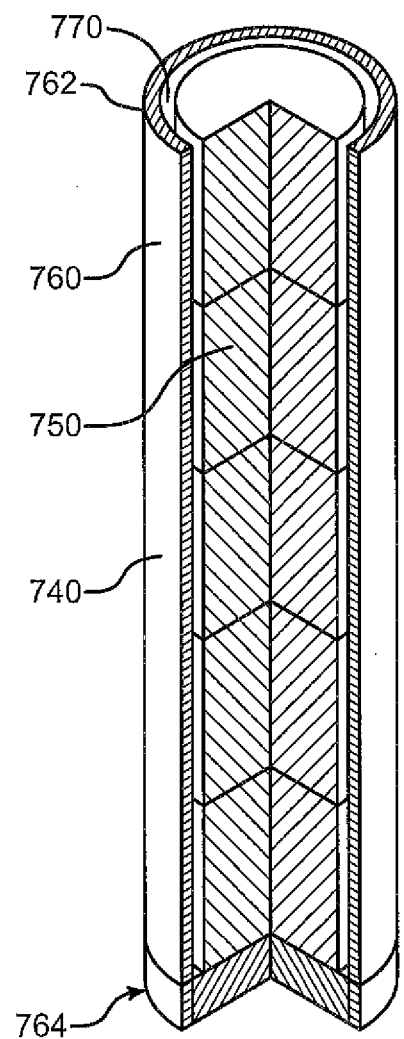
FIG. 12 is an isometric view in vertical section of one of the plurality of nuclear fission fuel elements.

With particular reference to FIG. 12, each fuel element 740 comprises a plurality of nuclear fuel pellets 750 stacked end-to-end therein, which nuclear fuel pellets 750 are housed in a cylindrical fuel rod cladding tube 760. Nuclear fuel pellets 750 are neutronically activated during the nuclear fission process, such as by an initial source of neutrons. Fuel rod cladding tube 760 has an open end 762 and a closed end 764. In addition, diameters of cladding 762 and fuel pellets 750 are sized such that a gap 770 is defined therebetween for escape of gaseous fission products from nuclear fuel pellets 750, which gaseous fission products travel into and upwardly through gap 770. Nuclear fuel pellets 750 comprise the afore-mentioned fissile nuclide, such as uranium-235, uranium-233 or plutonium-239. Alternatively, nuclear fuel pellets 750 may comprise a fertile nuclide, such as thorium-232 and/or uranium-238, which may be transmuted via neutron capture during the fission process into the fissile nuclides mentioned immediately hereinabove. Such fertile nuclide material may be housed in breeder rods (not shown) disposed in the previously mentioned breeder fuel modules 720. Nuclear fuel pellets 750 comprising fissile and/or fertile nuclear fuel will generate the fission products mentioned hereinabove.

In this regard, by way of example only and not by way of limitation, and still referring to FIG. 12, nuclear fuel pellets 750 may be made from an oxide selected from the group consisting essentially of uranium monoxide (UO), uranium dioxide ($UO_2$), thorium dioxide ($ThO_2$) (also referred to as thorium oxide), uranium trioxide ($UO_3$), uranium oxide-plutonium oxide (UO—PuO), triuranium octoxide ($U_3O_8$) and mixtures thereof. Alternatively, nuclear fuel pellets 750 may substantially comprise uranium either alloyed or unalloyed with other metals, such as, but not limited to, zirconium or thorium metal. As yet another alternative, nuclear fuel pellets 750 may substantially comprise a carbide of uranium ($UC_x$) or a carbide of thorium ($ThC_x$). For example, nuclear fuel pellets 750 may be made from a carbide selected from the group consisting essentially of uranium monocarbide (UC), uranium dicarbide ($UC_2$), uranium sesquicarbide ($U_2C_3$), thorium dicarbide ($ThC_2$), thorium carbide (ThC) and mixtures thereof. As another non-limiting example, nuclear fuel pellets 750 may be made from a nitride selected from the group consisting essentially of uranium nitride ($U_3N_2$), uranium nitride-zirconium nitride ($U_3N_2Zr_3N_4$), uranium-plutonium nitride ((U—Pu)N), thorium nitride (ThN), uranium-zirconium alloys ($U_xZr_y$), and mixtures thereof. Fuel rod cladding material 760, which longitudinally surrounds the stack of nuclear fuel pellets 750, may be a suitable zirconium alloy, such as ZIRCOLOY™ (trademark of the Westinghouse Electric Corporation located in Pittsburgh, Pa., U.S.A.), which has known resistance to corrosion and cracking Cladding tube 760 may be made from other materials, as well, such as ferritic martensitic steels.

Referring to FIGS. 13, 14, 15 and 16, the structure and operation of vented nuclear fission fuel module 30 will now be described. Disposed within canister 730 and connected thereto, such as by welding or press-fit, is a tube sheet 780 oriented transversely with respect to a longitudinal axis of canister 730. Tube sheet 780 having a plurality of vertically oriented bores 790 for receiving respective ones of the plurality of cladding tubes 760 extending therethrough. It may be appreciated that, as cladding tubes 760 that belong to fuel elements 740 extend through bores 790, fuel elements 740 may be affixed to tube sheet 780 thereat, such as by a press-fit or welding. However, it should be appreciated that the coolant will not contact that portion of fuel elements 740 residing in bores 790. In other words, that portion of fuel elements 740 residing in bores 790 may tend to experience a higher than desired temperature due to presence of tube sheet 780 surrounding the portion of fuel elements 740 residing in bores 790. That is, the coolant is blocked or prevented from reaching that portion of fuel elements 740 residing in bores 790 due to presence of tube sheet 780. Blocking or preventing coolant from reaching that portion of fuel elements 740 residing in bores 790 creates higher temperatures at that region of cladding 760. Such high temperatures may, in turn, compromise the structural integrity of cladding 760. To solve this problem, tube sheet 780 may be made from a silicon-carbon (SiC), alumina ($Al_2O_3$) or aluminum nitride (AlN) ceramic or ceramic composite material, if desired. Such a material is known to resist high temperatures, fracture and corrosion, and has low neutron absorption and superior heat dissipation capability. Alternatively, tube sheet 780 may be stainless steel or ZIRCALOY™. As an alternative, fuel elements 740 may be formed so as to contain void or non-fissionable material in the vicinity of tube sheet 780 so as not to generate heat during reactor operation. Fuel elements may be supported such that expansion of the elements in the axial direction due to thermal expansion or radiation induced expansion is permitted. Tube sheet 780 has a generally arcuate-shaped surface 800 extending around an underside of tube sheet 780, for reasons presented hereinbelow. In addition, open ends 762 of fuel elements 740 suitably extend above tube sheet 780 for reasons provided hereinbelow.

Referring again to FIGS. 13, 14, 15 and 16, canister 730 defines a plenum volume 810 above tube sheet 780, for reasons provided presently. Plenum volume 810 includes a lower plenum portion 812. Canister 730 further comprises a valve body 820 associated with fuel elements 740. Valve body 820 comprises a riser portion 830 integrally connected to canister shell 735, the riser portion 830 defining an upper plenum portion 835 that is in intimate communication with lower plenum portion 812. Riser portion 830 has external threads surrounding an exterior surface thereof for reasons provided hereinbelow. Open ends 762 of fuel elements 740 are exposed to plenum volume 810 such that gaseous fission products rising through gap 770 of fuel element 740 are received in plenum volume 810 and collected therein.

Referring yet again to FIGS. 13, 14, 15 and 16, a flexible or resilient disk-shaped diaphragm 840 is interposed between lower plenum portion 812 and upper plenum portion 835. Diaphragm 840 defines a plurality of apertures 850 therethrough for allowing the gaseous fission products to travel from lower plenum portion 812 to upper plenum portion 835. Diaphragm 840 may be made from any suitable resilient material resistant to heat, corrosion and radiation effects. By way of example only, and not by way of limitation, diaphragm 840 may be made from a NEOPRENE® (i.e., chloroprene rubber) material, which is a registered trademark of DupontDow, Incorporated, located in Wilmington, Del., U.S.A. Diaphragm 840 may also be made from a butyl rubber material. As another example, diaphragm 840 may be made from "spring steel", which is a carbon steel alloy having high yield strength. Spring steel returns to its original shape after bending. Valve body 820 also defines a vent opening 860 in communication with upper plenum portion 835 for allowing the fission product gas to exit or vent from vented nuclear fission module 30 along gas flow path 865 and into the surrounding coolant (see FIG. 19).

Still referring to FIGS. 13, 14, 15 and 16, a ball 870 is disposed in upper plenum portion 835 and rests on resilient diaphragm 840. Ball 870 is aligned with vent opening 860 and resides between vent opening 860 and resilient diaphragm 840. In this manner, ball 870 is in operative condition to block, obstruct and otherwise close-off vent opening 860 when gaseous fission products are not being vented from vented nuclear fission fuel module 30. Ball 870 may be made from any suitable material resistant to heat and corrosion, such as stainless steel or ZIRCALOY™ Mounted on riser portion 830 is a cap 880 having internal threads for threadably engaging the external threads surrounding riser portion 830. Cap 880 protects riser portion 830 during handling of vented nuclear fission fuel module 30 and also precludes inadvertent venting of gaseous fission products should ball 870 not perfectly block vent opening 860 due to manufacturing imperfections. Moreover, this ball valve may be operable to controllably vent the gaseous fission product according to a predetermined periodic release rate for minimizing size of an associated gaseous fission product clean-up system.

Figure 13:
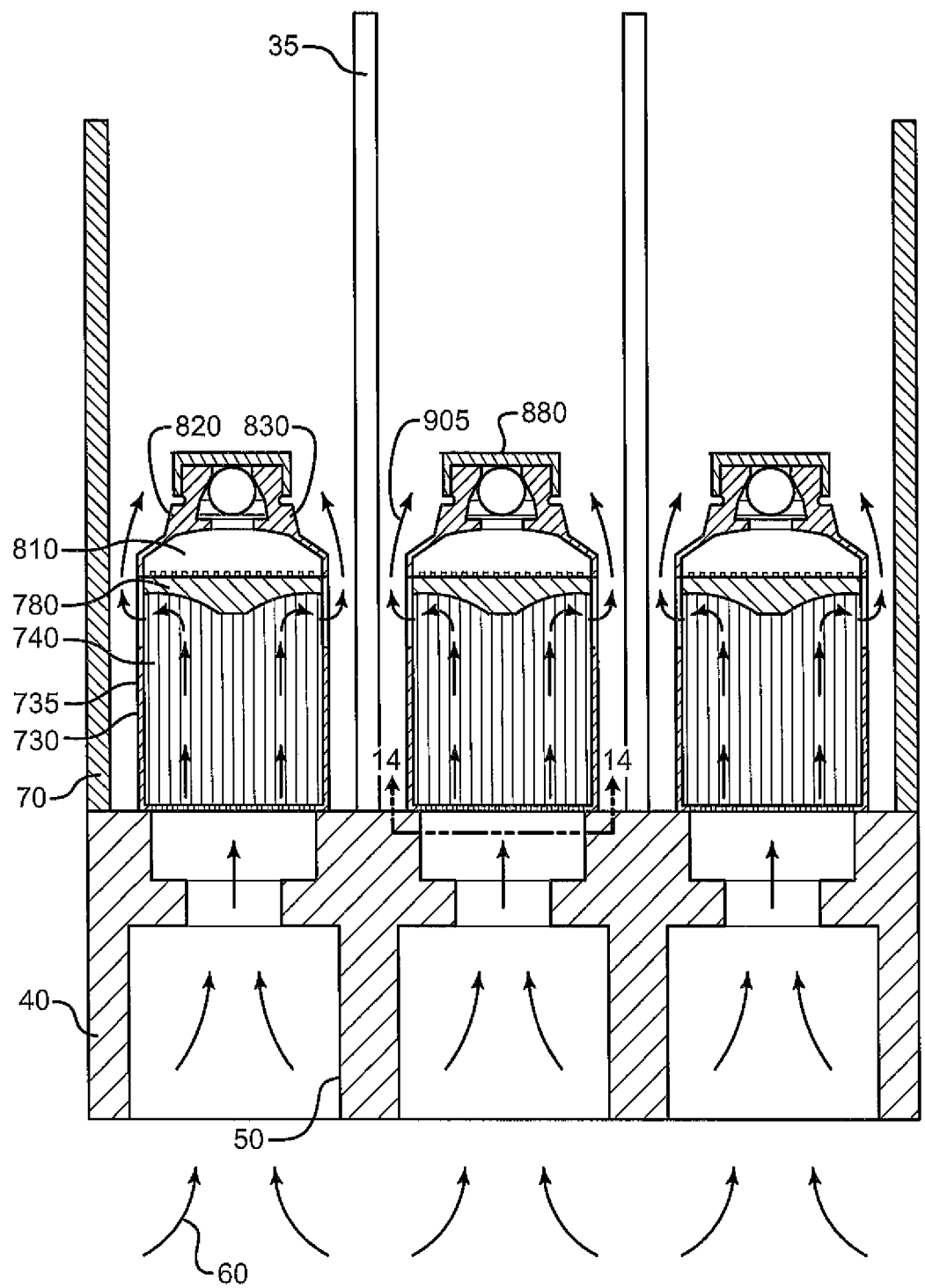
FIG. 13 is a view in partial elevation of the plurality of vented nuclear fission fuel modules disposed on a reactor core lower support plate.
Figure 14:
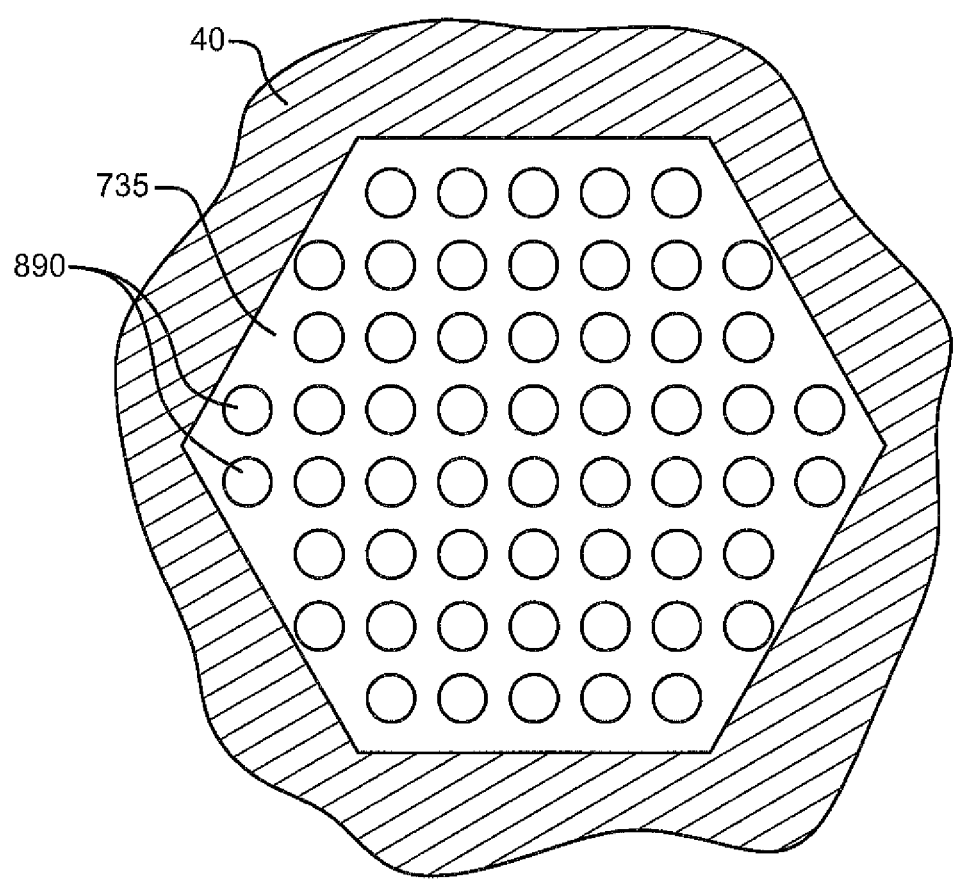
FIG. 14 is a view taken along section line 14-14 of FIG. 13.
Figure 15:
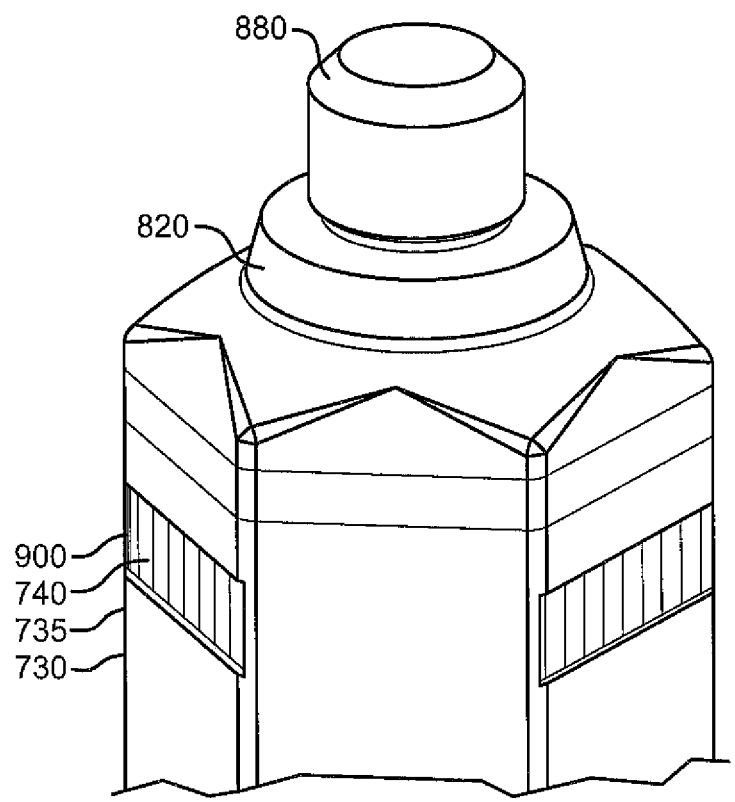
FIG. 15 is a fragmentary view in perspective of an exterior of one of the vented nuclear fission fuel modules.
Figure 16:
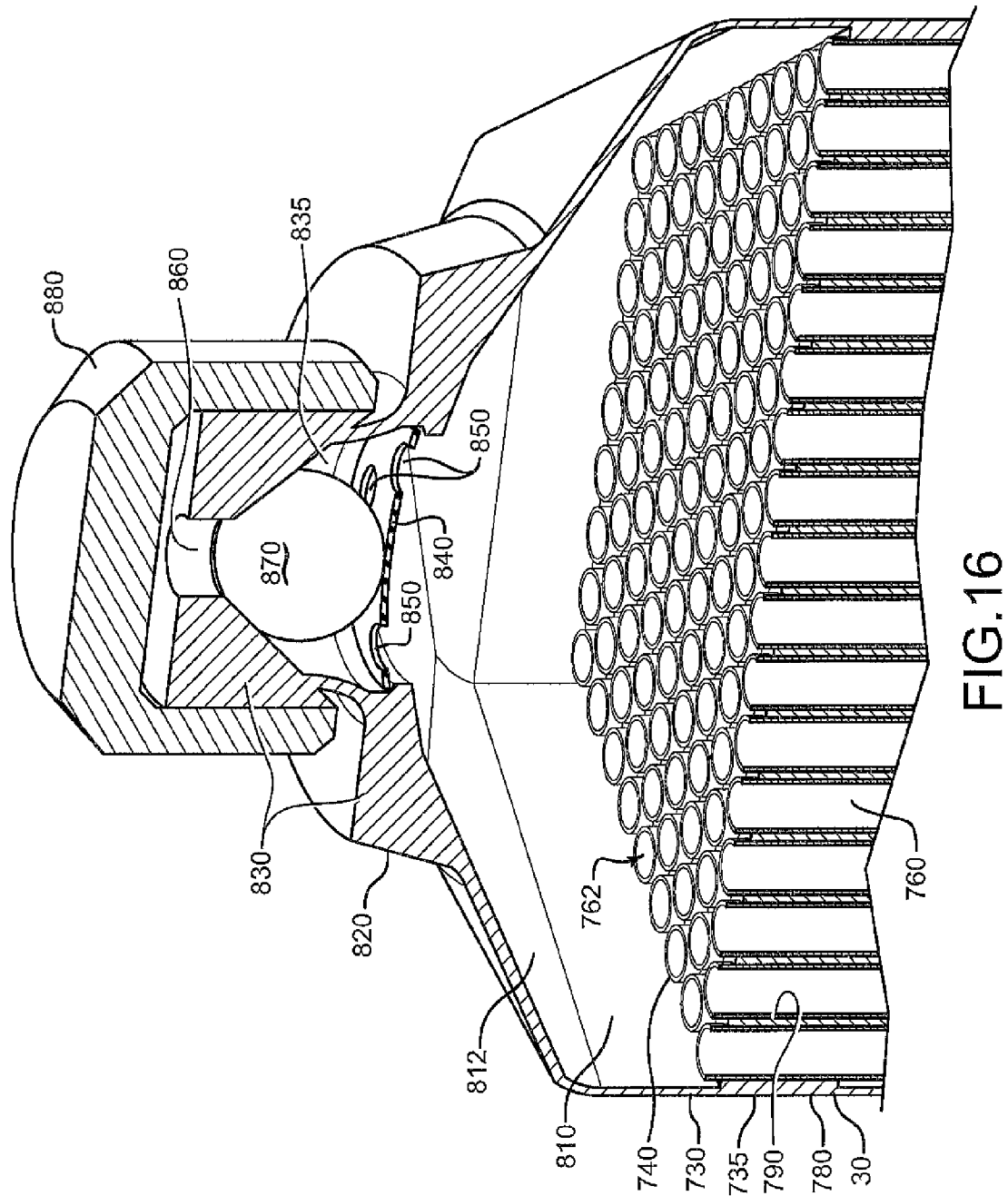
FIG. 16 is a fragmentary view in perspective and partial vertical section of the vented nuclear fission fuel module.

Referring to FIGS. 13 and 14, canister shell 735 has a plurality of flow openings 890 defined by a bottom portion thereof for allowing coolant that flows along flow paths 60, 300, 370 or 515 to enter canister shell 735. The coolant entering canister shell 735 will flow upwardly therein and contact arcuate-shaped surface 800. The contour of arcuate-shaped surface 800 guides the coolant out a plurality of flow ports 900 defined by a side portion of canister shell 735, in order to flow along coolant flow path 905.

Figure 17:
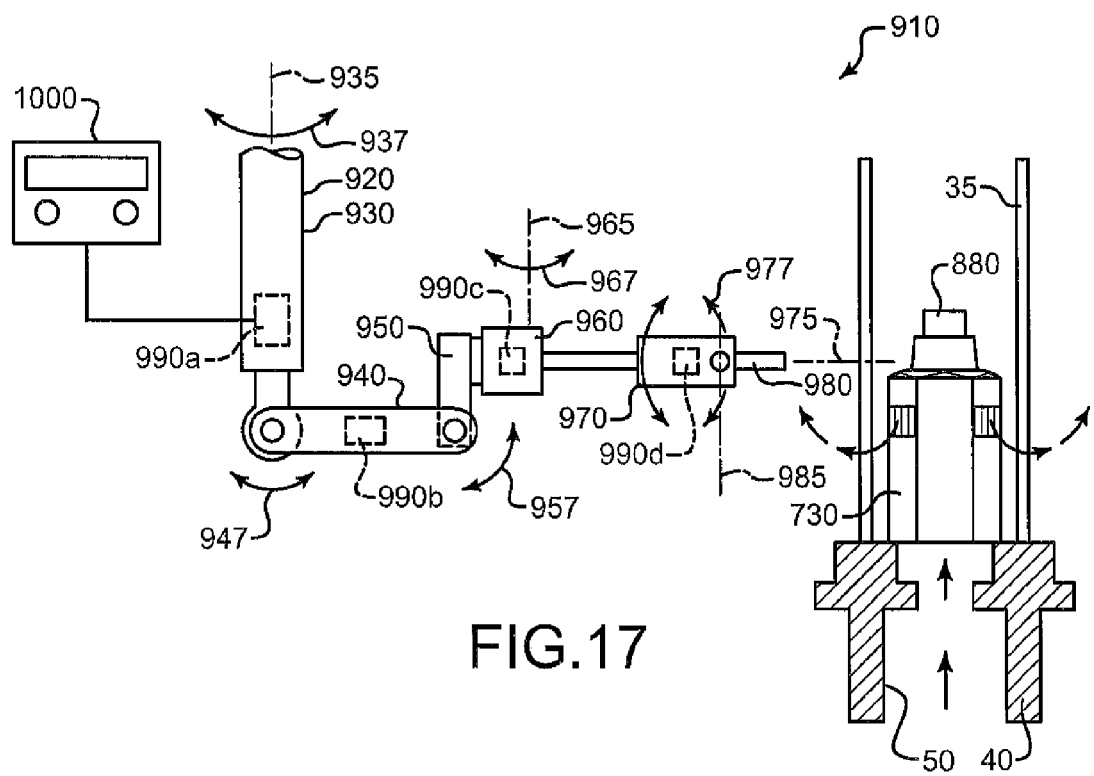
FIG. 17 is a view in elevation of an illustrative articulated manipulator arm in operable position to manipulate a cap belonging to the vented nuclear fission fuel module.
Figure 18:
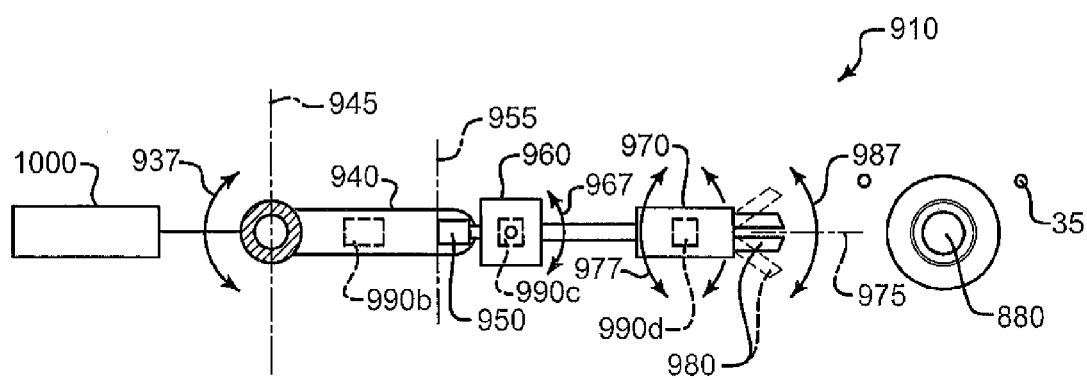
FIG. 18 is a plan view of the articulated manipulator arm in operable position to manipulate the cap belonging to the vented nuclear fission fuel module.

With particular reference to FIGS. 17 and 18, a manipulator, generally referred to as rethreading, is provided for unthreading cap 880 from riser portion 830 and for rethreading cap 880 onto riser portion 830. In this regard, manipulator 910 comprises a remotely operable articulated manipulator arm 920. Manipulator arm 920 comprises a first component 930 rotatable about first axis 935 in the direction of double-headed arrow 937. Manipulator arm 920 further comprises a second component 940 rotatable about a second axis 945 in the direction of double-headed arrow 947. In addition, manipulator arm 920 comprises a third component 950 rotatable about a third axis 955 in the direction of double-headed arrow 957. Further, manipulator arm 920 comprises a fourth component 960 rotatable about a fourth axis 965 in the direction of double headed arrow 967. Moreover, manipulator arm 920 further comprises a fifth component 970 rotatable about a fifth axis 975 in the direction of double-headed arrows 977. A handler or gripper 980 is rotatably coupled to fifth component 970, so as to be rotatable about a sixth axis 985, in the direction of double-headed arrows 987. Gripper 980 is capable of opening and closing in order to grip and unthread cap 880 from riser portion 830 of canister shell 735 and rethread cap 880 onto riser portion 830 of canister shell 735. A plurality of servo-motors 990 a/b/c/d are electrically or pneumatically coupled to respective ones of components 930/940/950/960/970 and gripper 980 for operating components 930/940/950/960/970 and gripper 980. Components 930/940/950/960/970 and gripper 980 are selectively operable, such as by means of a controller 1000 electrically or pneumatically coupled to servo-motors 990a/b/c/d. Manipulator arm 920 may be a robotic device, such as may be available from ABB Automation Technologies AB—Robotics, located in Vasterds, Sweden. Controller 1000 and associated software may be of a type that may be available from ABB Automation Technologies AB—Robotics.

Figure 19:
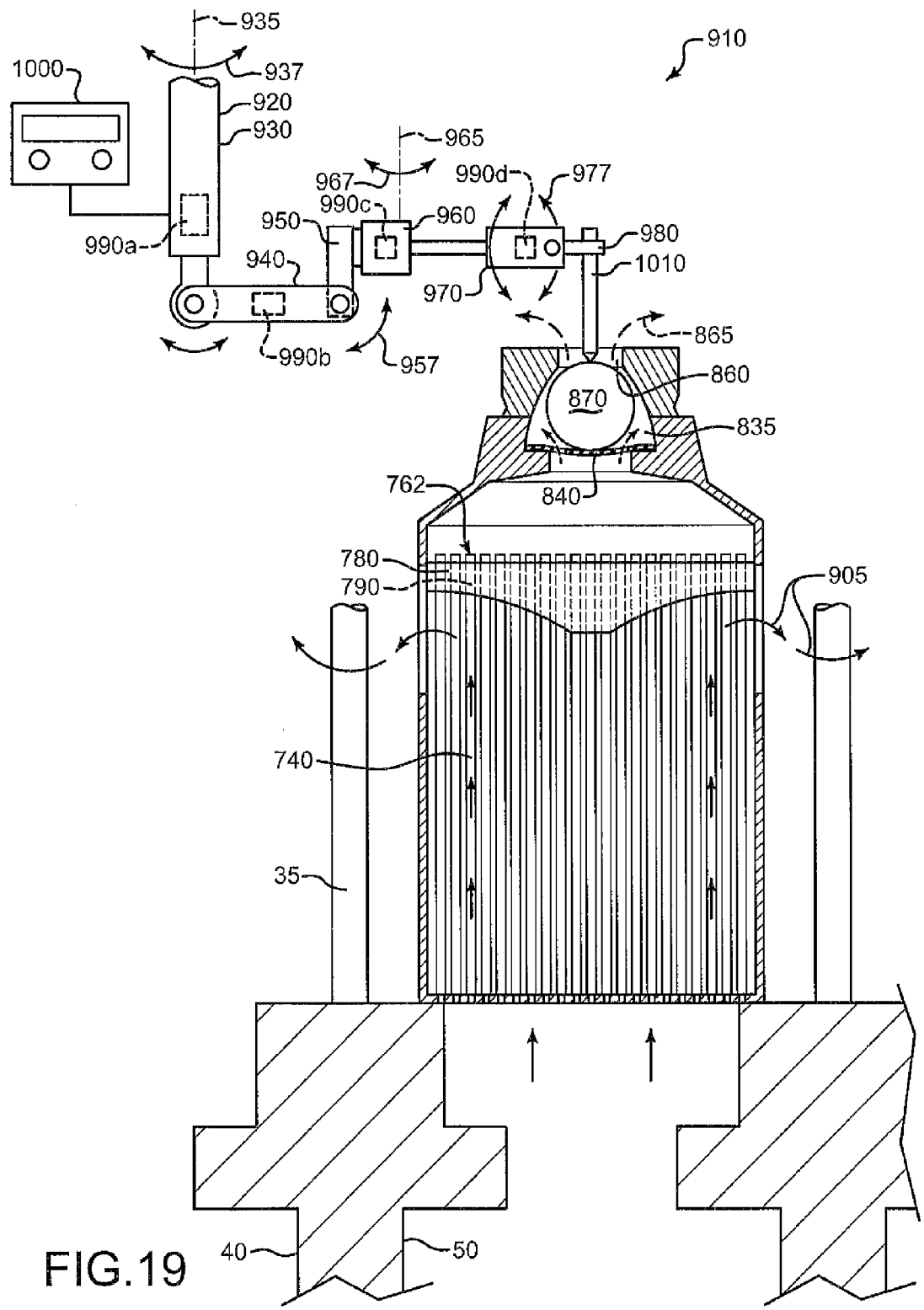
FIG. 19 is a view in elevation of the articulated manipulator arm operating a ball valve belonging to the vented nuclear fission fuel module for releasing a gaseous fission product therefrom.

As best seen in FIG. 19, gripper 980 is capable of holding a plunger or spike 1010 that is used to depress or downwardly translate ball 870 by contact therewith. Ball 870 is allowed to downwardly translate by elastic deflection of resilient diaphragm 840 which supports ball 870. Passageway 860 will then become unobstructed to allow the gaseous fission products to escape through passageway 860, such as along flow lines represented by arrow 865. As passageway 860 becomes unobstructed, the gaseous fission product will escape nuclear fission fuel module 30 and flow into the surrounding coolant. When spike 1010 is removed, ball 870 will return to its initial position to block or obstruct passageway 860 due to an upward contact force exerted by resilient diaphragm 840 as resilient diaphragm 840 returns to its initial position. Thus, manipulator arm 920 cooperates with ball 870 and resilient diaphragm 840 to controllably vent the gaseous fission product from nuclear fission fuel module 30.

Figure 20:
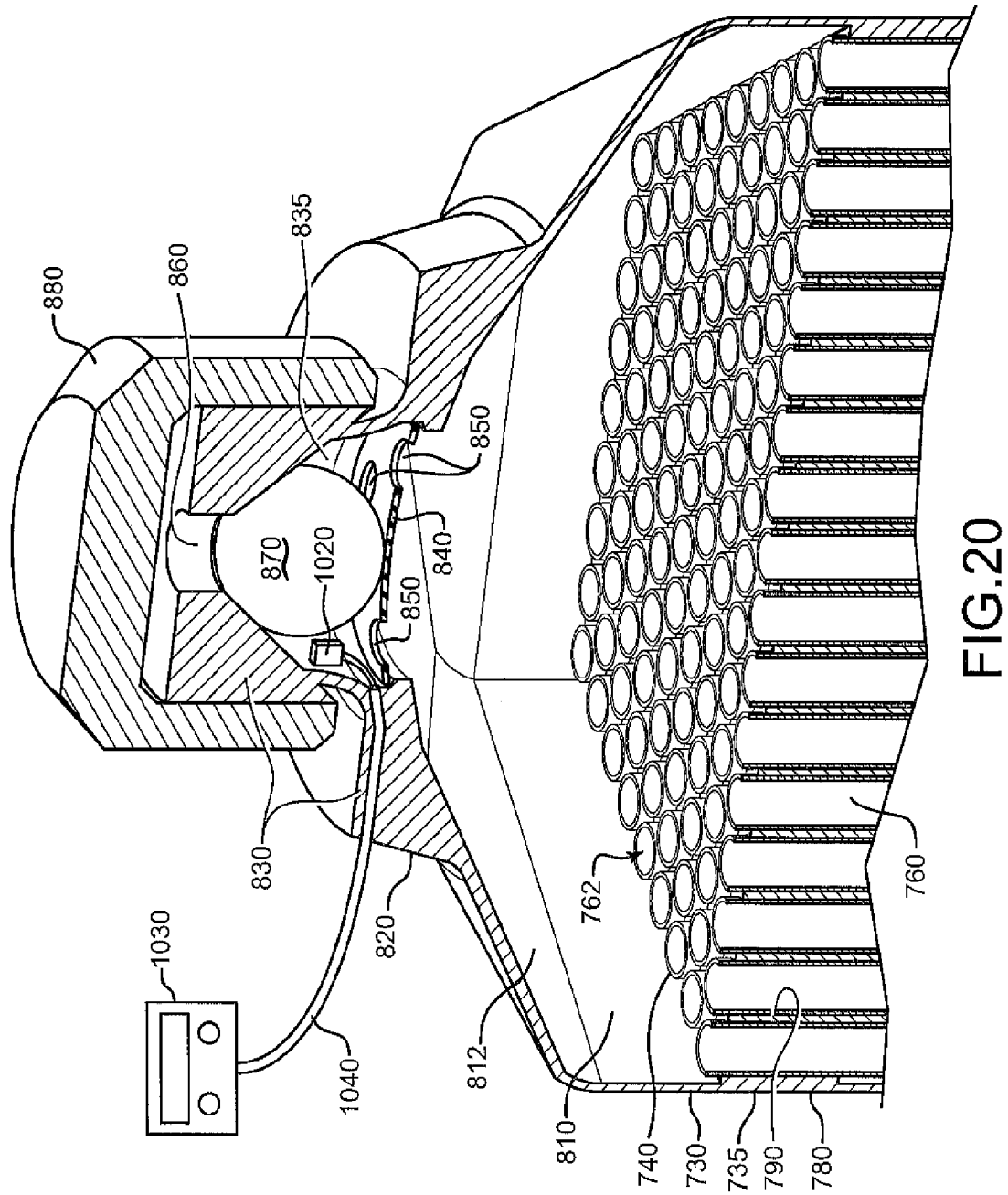
FIG. 20 is a fragmentary view in perspective and partial vertical section of the vented nuclear fission fuel module including a sensor disposed therein, the sensor being coupled to a controller by means of a conduit (e.g., electrical or optical)

Referring to FIG. 20, a sensor or detector 1020 may be disposed in upper plenum portion 835 for detecting presence of gaseous fission products therein. Detector 1020 may be a commercially available pressure detector capable of detecting pressure of any gaseous fission product in upper plenum portion 835, such as a N-E111 or N-E13 pressure transmitter that may be available from Ultra Electronics, Nuclear Sensors and Process Instrumentation, Incorporated located in Round Rock, Tex., U.S.A. Detecting fission gas pressure in upper plenum portion 835 will confirm that a sufficient amount of fission gas is present in upper plenum portion 835, such that the fission gas should be out-gassed or relieved. Alternatively, detector 1020 may be a commercially available radionuclide detector capable of detecting presence of a predetermined radionuclide that is characteristic of a particular gaseous fission product. Such a detector may be a gamma radiation detector of a type that may be available from Fluke Biomedical, Incorporated, located in Everett, Wash., U.S.A. Alternatively, such a detector may be a chemical sensor of a type that may be available from Pacific Northwest National Laboratory, Environmental Technology Division, located in Richland, Wash., U.S.A. Such a chemical sensor would sense certain types of fission products in the gaseous fission product. As another alternative, such a detector may be a commercially available optical sensor for detecting amount and/or type of gaseous fission product by means of light wavelength associated with the amount and/or type of gaseous fission product. In this regard, such a detector may comprise a gas optical spectrometer, which may be part of a suitable controller, such as a controller and power supply combination 1030. Any of the detectors mentioned hereinabove may comprise a signal carrier, such as an electrical signal carrier (e.g., electrically conducting wire) for carrying an electrical signal from the detector to a commercially available measuring device that detects and measures the amount and/or type of gaseous fission product. Such a commercially available measuring device may be a component of controller and power supply combination 1030. As an alternative, the signal carrier may be an optical fiber when detector 1020 is an optical sensor or detector. In any event, controller and power supply combination 1030 may be coupled to detector 1020, such as by means of a conduit 1040 (e.g., electrical or optical), for supplying power to detector 1020 and/or for receiving a gaseous fission product detection signal from detector 1020. Detector 1020 may be calibrated only to transmit a detection signal when a threshold pressure or threshold quantity of gaseous fission products are present in upper plenum portion 835 because pressure and quantity of gaseous fission products may be de minimis at reactor startup as compared to middle of reactor life or end of reactor life. In some other embodiments, for example, upper plenum portion 835 of vented nuclear fission fuel module 30 may contain a mechanism that automatically raises and lowers ball 870 in response to pressure and/or type of gaseous fission products detected by detector 1020. A power supply would continuously supply electrical power to the mechanism and detector 1020. Controller 1030 would interpret the signal generated by detector 1020 to decide when to raise and lower ball 870. In this manner, the manipulator 910 may be eliminated.

Figure 21:
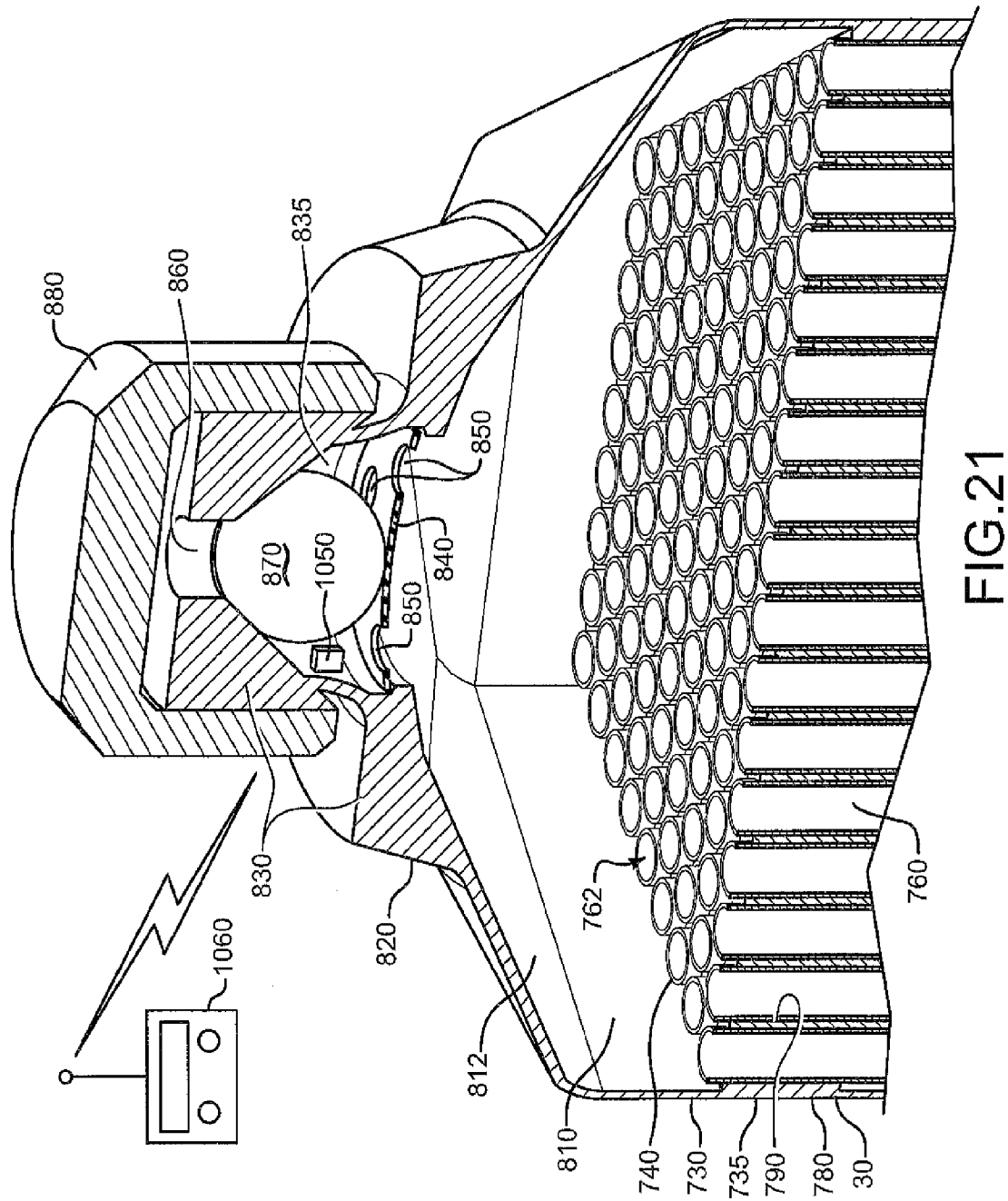
FIG. 21 is a fragmentary view in perspective and partial vertical section of the vented nuclear fission fuel module including a sensor disposed therein, the sensor being coupled to a controller by means of radio frequency transmission.

Referring to FIG. 21, a transmitter 1050 may be disposed in upper plenum portion 835 for transmitting information containing the pressure of, or merely the presence of, a gaseous fission product in upper plenum portion 835. Transmitter 1050 may be calibrated such that the transmission signal also identifies the particular canister 730 causing transmitter 1050 to transmit its signal. A radio frequency receiver 1060 is provided for receiving the transmission signal and for logging information about which canister 730 is transmitting the signal, so that the particular canister 730 is selectively degassed by manipulator 910. Transmitter 1050 is configured to transmit a signal from sensor or detector 1020. Transmitter 1050 may comprise a radio frequency transmitter. Thus, transmitter 1050 may be configured to transmit an identification signal identifying canister 730 and the associated valve body 820.

Figure 22:
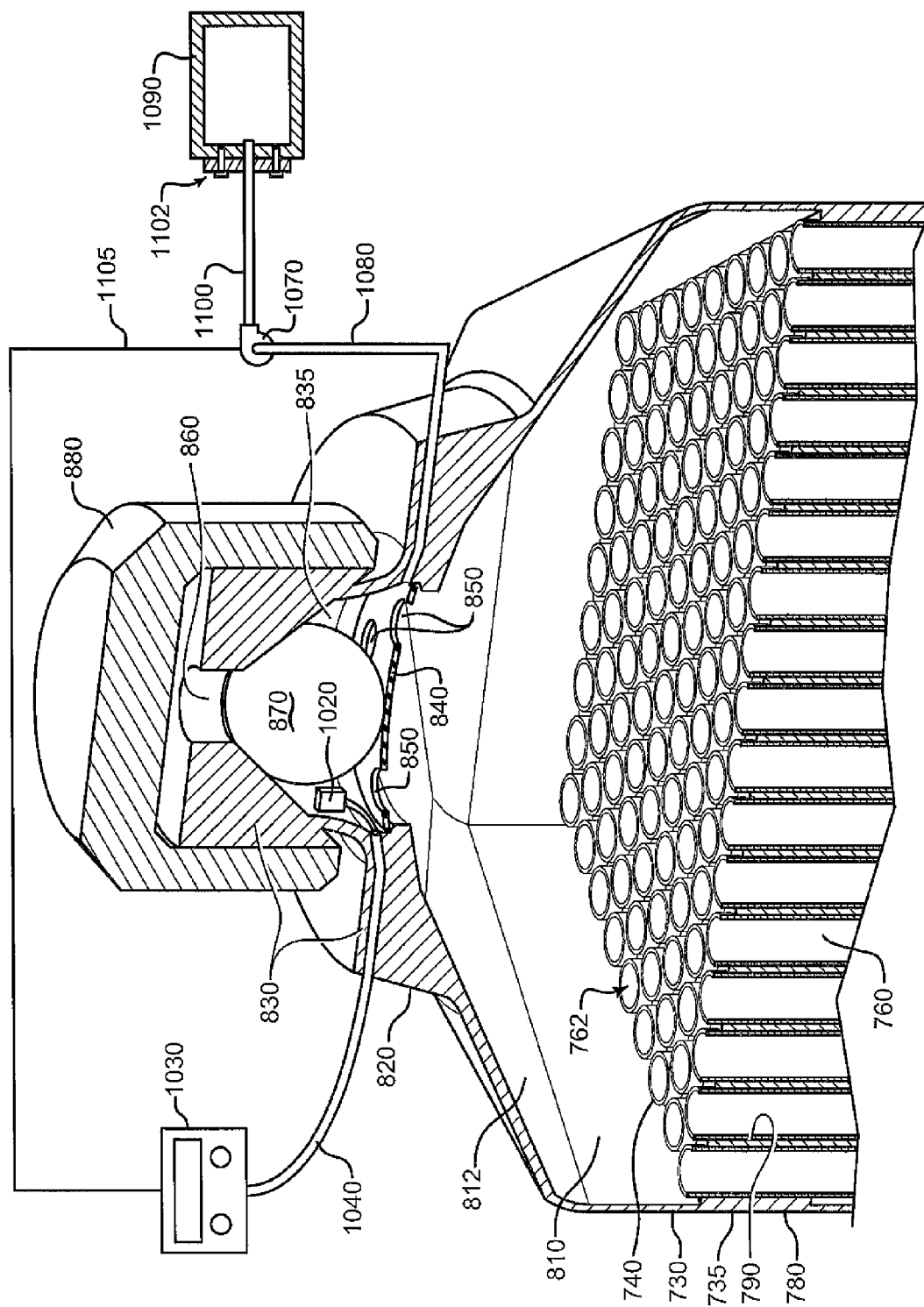
FIG. 22 is a fragmentary view in perspective and partial vertical section of the vented nuclear fission fuel module including a reservoir for collecting fission product gas.

Referring to FIG. 22, there is shown yet another embodiment of vented nuclear fission fuel module 30. In this embodiment, controller 1030, conduit 1040 and detector 1020 are coupled to canister 730, as previously described. In addition, a fan (not shown) or a pump 1070 has a suction side in communication with upper plenum portion 835, such as by means of a first tube 1080. A discharge side of pump 1070 is in communication with a fission gas reservoir 1090, such as by means of a second tube 1100. Fission gas reservoir 1090 is capable of sealably isolating the gaseous fission product therein and may remain in situ or transported off-site for waste disposal. Fission gas reservoir 1090 may be coupled to or decoupled from pump 1070, such as by means of a coupler 1102. In a sense, fission gas reservoir 1090 is capable of being coupled to and decoupled from reactor vessel 70 itself because fission gas reservoir 1090 is at least initially disposed in reactor vessel 70. Pump 1070 is coupled to controller 1030, such as by a wire 1105, so that pump 1070 is operated in response to pressure of, or mere presence of, gaseous fission products detected by detector 1020 that is disposed in upper plenum portion 835. Thus, pump 1070 may be operated periodically depending on the amount of gaseous fission products that may accumulate again in upper plenum portion 835 after periodic venting. Alternatively, pump 1070 may be operated continuously regardless of the amount of gaseous fission products in upper plenum portion 835. This alternative embodiment allows vented nuclear fission fuel module 30 to remove substantially all (i.e., about 98%) of gaseous fission products that would otherwise accumulate in the reactor coolant system. Removal of the gaseous fission products separates (i.e., "takes out") the gaseous fission products from neutronic communication with the reactor coolant system.

Figure 23:
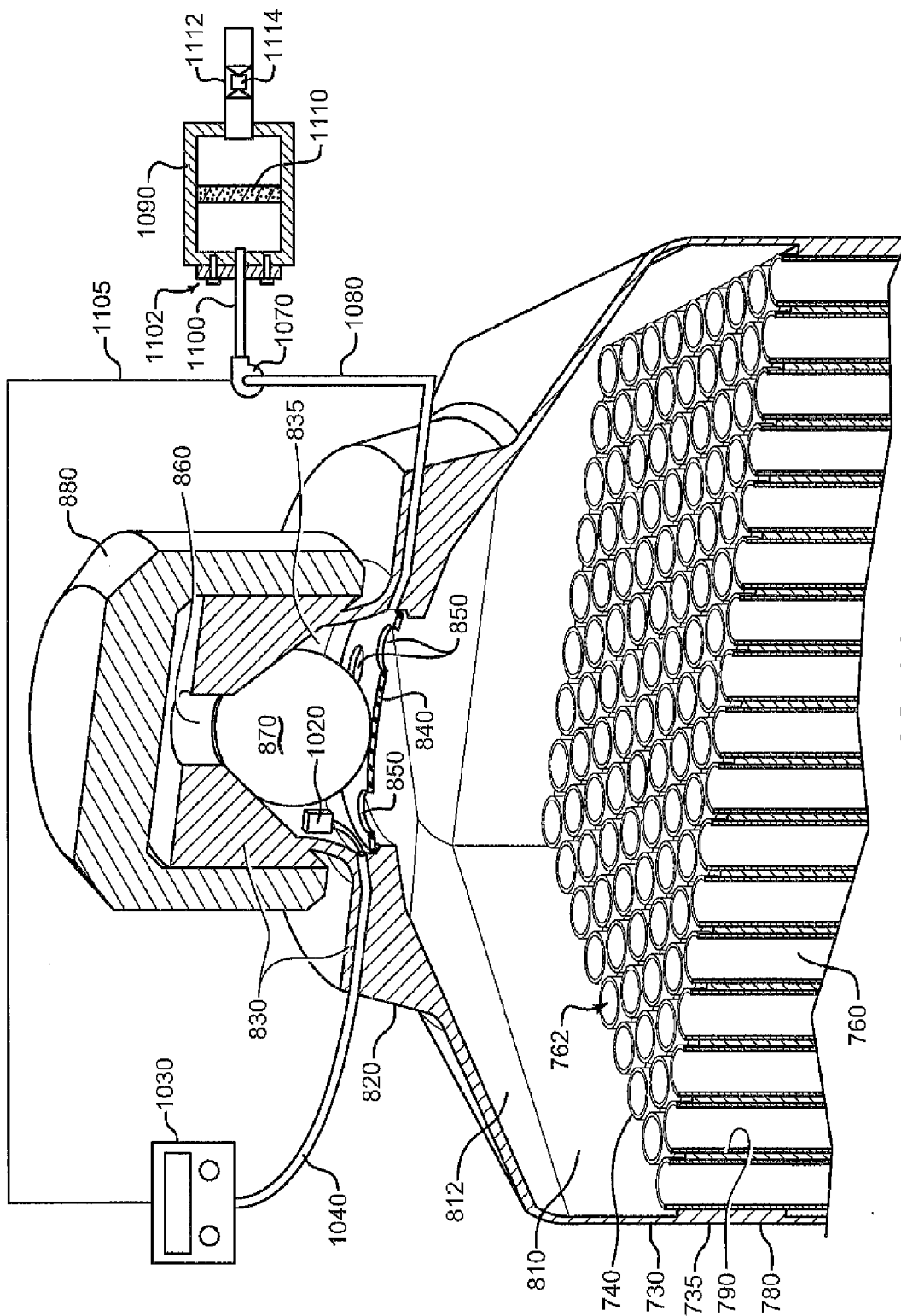
FIG. 23 is a fragmentary view in perspective and partial vertical section of the vented nuclear fission fuel module including a reservoir having a filter therein for separating and/or capturing a condensed (i.e., liquid or solid) fission product from the fission product gas.

Referring to FIG. 23, there is shown another embodiment vented nuclear fission fuel module 30. This embodiment is substantially similar to the embodiment illustrated in FIG. 22, except that a fission product filter 1110 is provided in reservoir 1090 to segregate and/or capture fission product solids and liquids from the gaseous fission products. In other words, fission product filter 1110 separates a condensed phase fission product from the gaseous fission product. In this regard, fission product filter 1110 may be made from suitable activated alumina, activated carbon or zeolite (i.e., aluminosilicate). Alternatively, fission product filter 1110 may be a filter meeting the standards of the Health and Environmental Protection Act (HEPA) of the U.S.A. or a "cold trap". In this regard, the HEPA filter may comprise shredded filler material of glass fiber/acrylic binder, plastics/rubber and aluminum. As another alternative, fission product filter 1110 may be a permeable or semi-permeable membrane. By way of example only, and not by way of limitation, such a permeable or semi-permeable membrane may be made of any suitable material known in the art, have a thickness of between approximately 5 to approximately 10 millimeters and may have a pore size of between approximately 100 to approximately 1,000 angstroms. As another alternative, fission product filter 1110 may comprise any suitable commercially available electrostatic collector. On the other hand, fission product filter 1110 may be a "cold trap". A cold trap produces nucleation sites for gathering and retaining impurities from a fluid in order to clean the fluid. In this regard, the fluid to be cleaned is fed into a tank (e.g., reservoir 1090) where the temperature of the fluid is reduced. As the temperature decreases, impurities in solution reach saturation. Further cooling produces supersaturation. This causes impurities to nucleate and precipitate at nucleation sites in the cold trap. The purified fluid is caused to then leave the tank. In addition, nucleation and precipitation can be enhanced by presence of a wire mesh, if desired. Regardless of the form of fission product filter 1110, fission product filter 1110 may be removable from reservoir 1090 for off-site disposal of the fission products separated and captured thereby. An exit conduit 1112 having a backflow prevention valve 1114 therein may be provided for exit of gas that is free of fission products. Backflow prevention valve 1114 prevents either backflow of the fission product-free gas or backflow of coolant into reservoir 1090.

Figure 24:
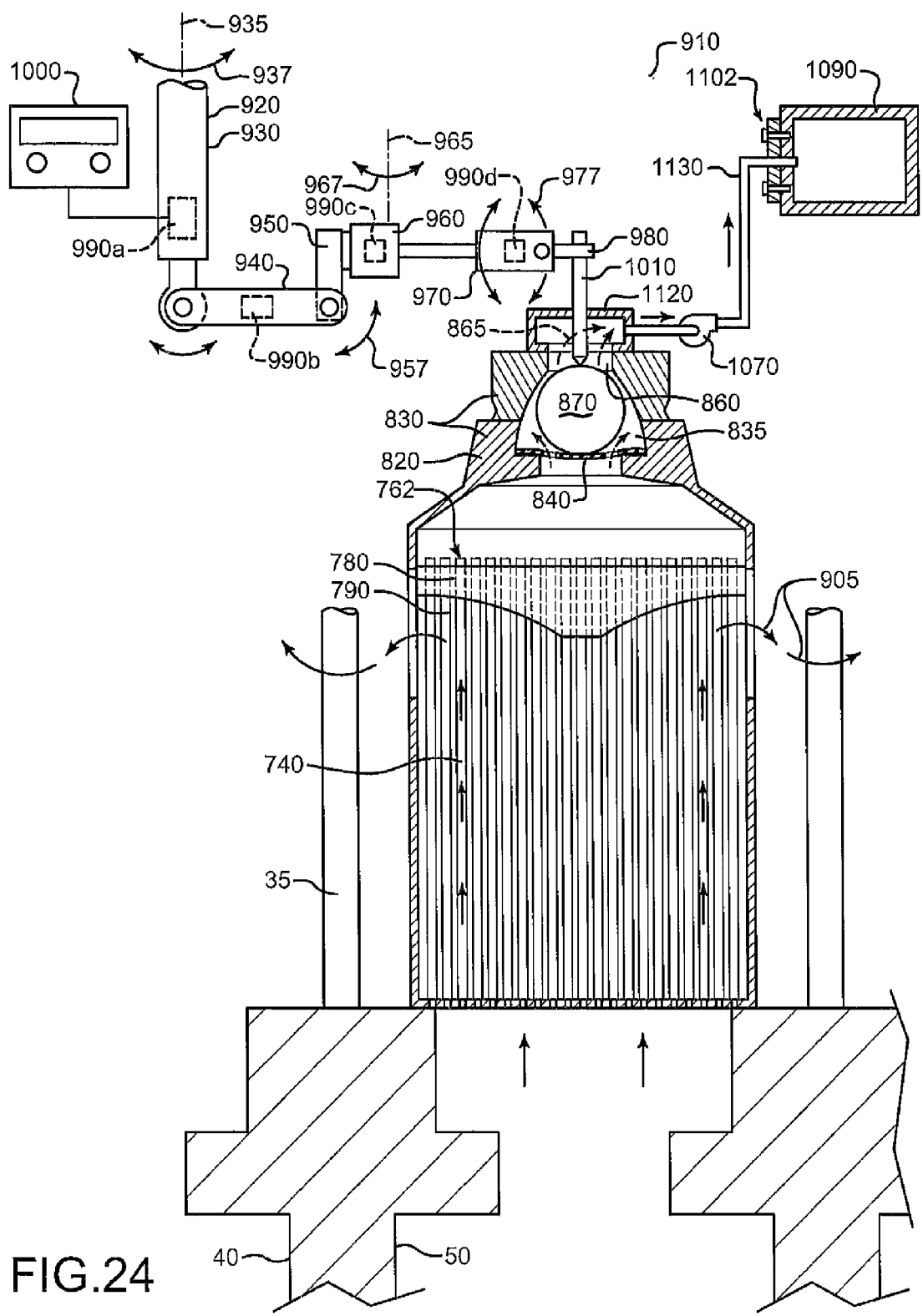
FIG. 24 is a view in partial elevation of a suction device carried by the articulated manipulator arm for suctioning the fission product gas from the vented nuclear fission fuel module.

Referring to FIG. 24, there is shown another embodiment vented nuclear fission fuel module 30. This embodiment is substantially similar to the embodiment illustrated in FIG. 22, except that a suction device 1120 that is carried by articulated manipulator arm 920 is mounted on valve body 820 so as to sealingly cover vent opening 860. Ball 870 is depressed by spike 1010 in the manner previously mentioned to release the fission product gas. Pump 1070 is operated to draw the fission product gas from suction device 1120, along a tube 1130 and into reservoir 1090.

Illustrative Methods

Illustrative methods associated with illustrative embodiments of a nuclear fission reactor and vented nuclear fission fuel module will now be described.

Referring to FIGS. 25-72, illustrative methods are provided for operating a nuclear fission reactor.

Figure 25:
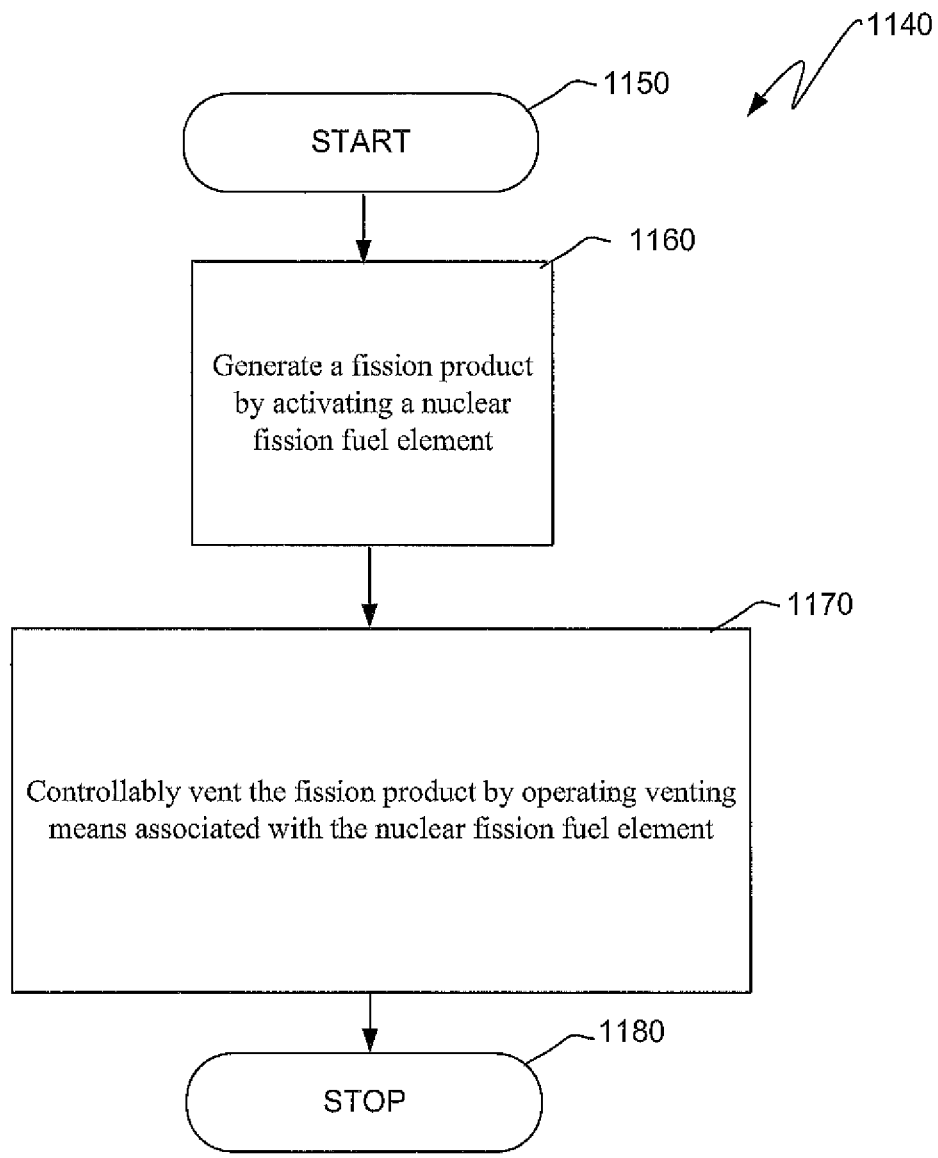
FIGS. 25-72 are flowcharts of illustrative methods of operating a nuclear fission reactor comprising a vented nuclear fission fuel module.

Turning now to FIG. 25, an illustrative method 1140 of operating a nuclear fission reactor starts at a block 1150. At a block 1160, the method comprises generating a fission product by activating a nuclear fission fuel element. At a block 1170 the fission product is controllably vented by operating venting means associated with the nuclear fission fuel element. The method stops at a block 1180.

Figure 26:
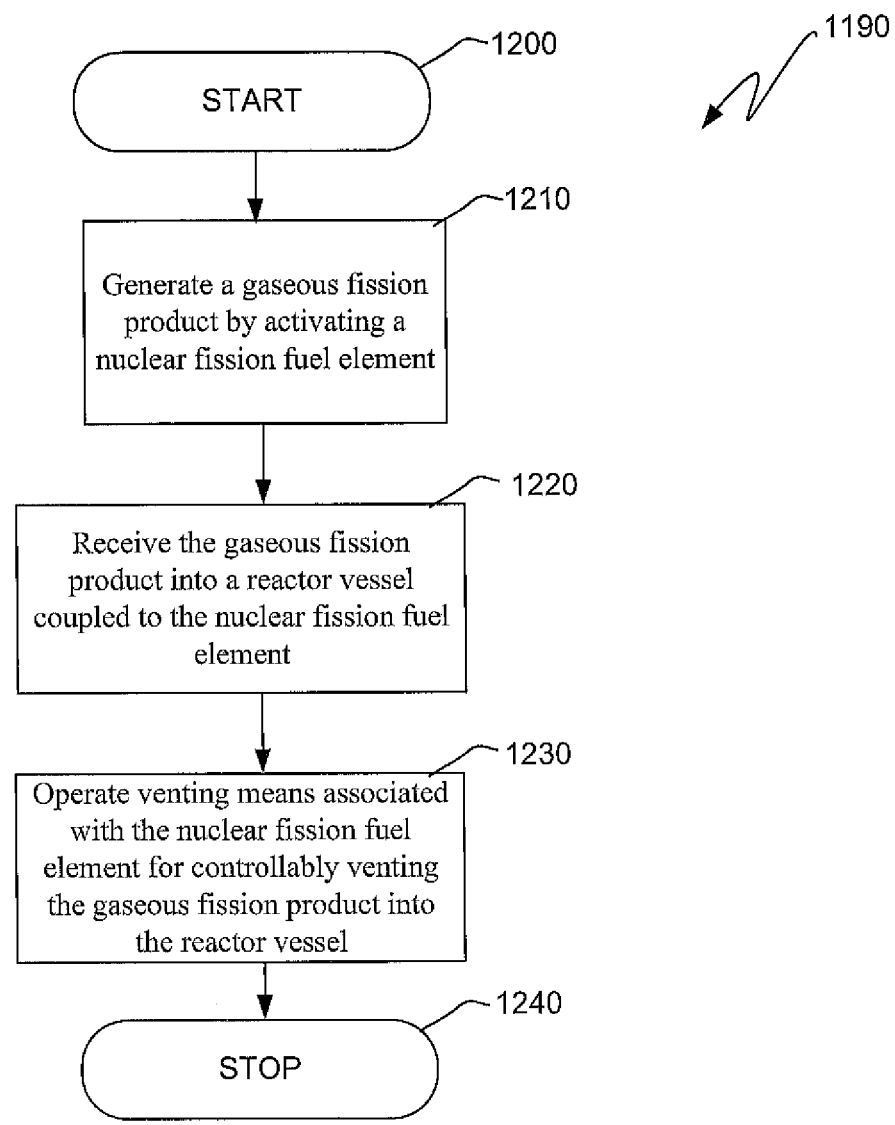

In FIG. 26, an illustrative method 1190 of operating a nuclear fission reactor starts at a block 1200. At a block 1210, the method comprises generating a gaseous fission product by activating a nuclear fission fuel element. At a block 1220, the gaseous fission product is received into a reactor vessel coupled to the nuclear fission fuel element. At a block 1230, venting means associated with the nuclear fission fuel element is operated for controllably venting the gaseous fission product into the reactor vessel. The method stops at a block 1240.

Figure 26A:
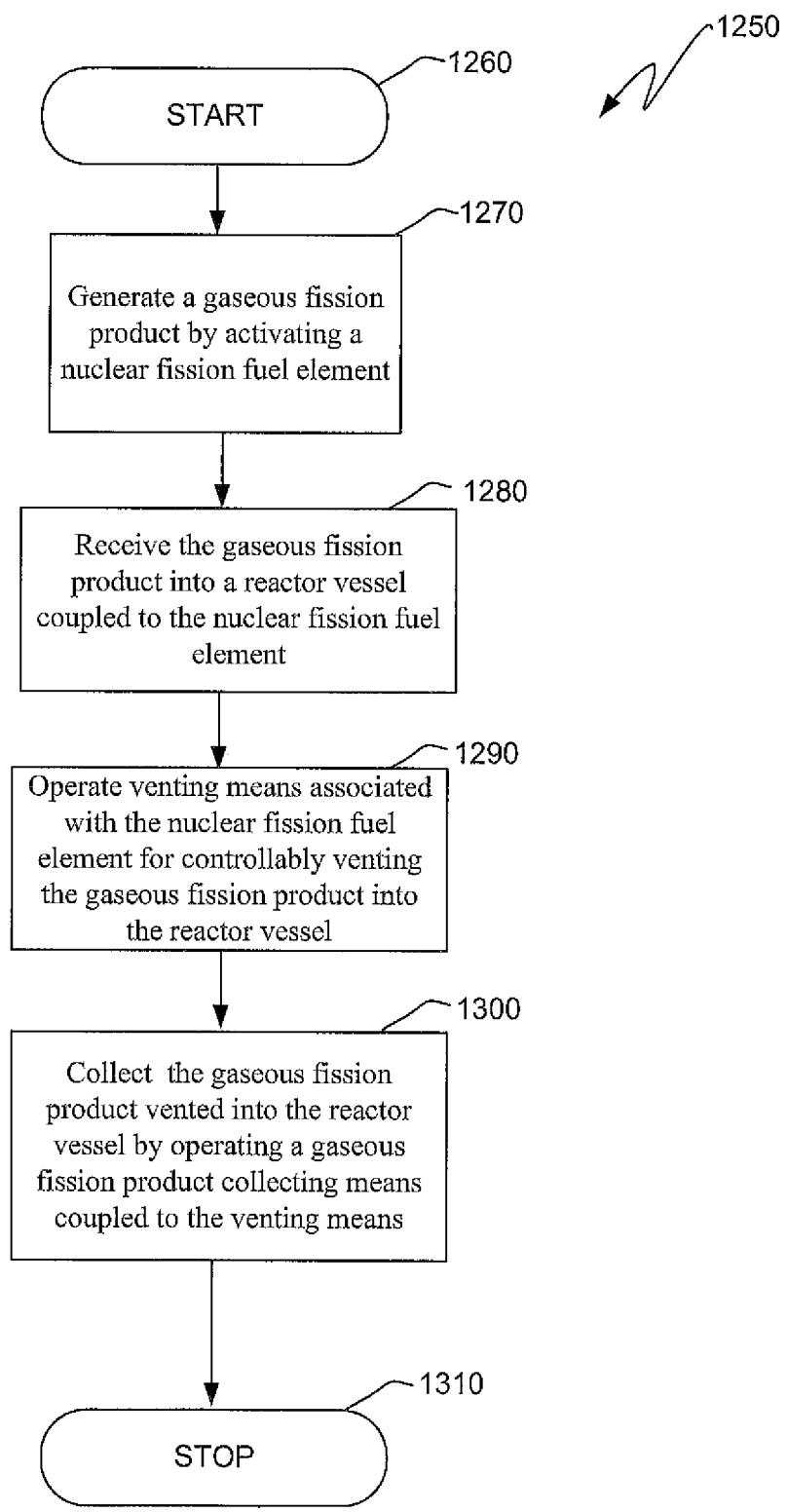

In FIG. 26A, an illustrative method 1250 of operating a nuclear fission reactor starts at a block 1260. At a block 1270, the method comprises generating a gaseous fission product by activating a nuclear fission fuel element. At a block 1280, the gaseous fission product is received into a reactor vessel coupled to the nuclear fission fuel element. At a block 1290, venting means associated with the nuclear fission fuel element is operated for controllably venting the gaseous fission product into the reactor vessel. At a block 1300, the gaseous fission product vented into the reactor vessel is collected by operating a gaseous fission product collecting means coupled to the venting means. The method stops at a block 1310.

Figure 26B:
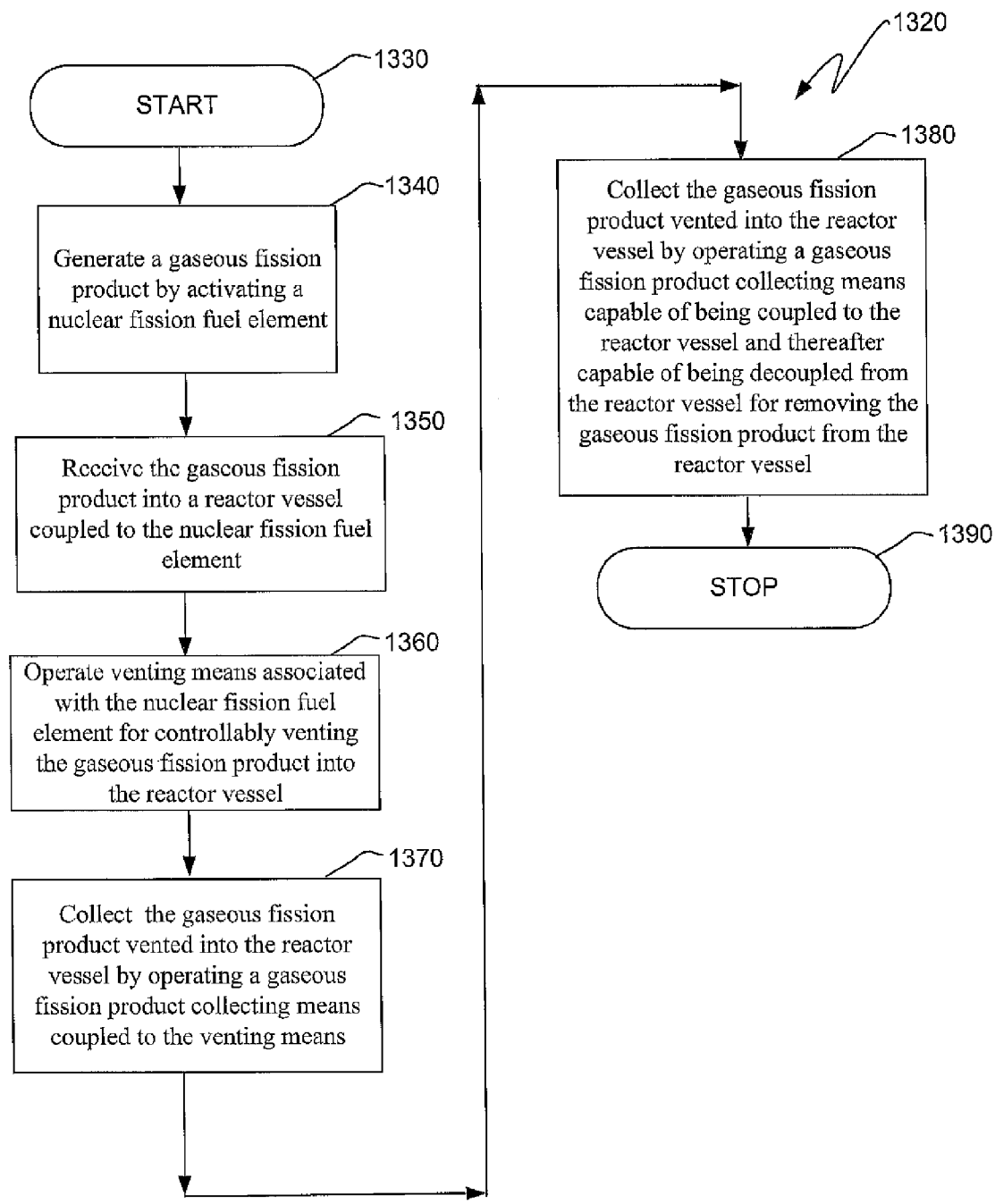

In FIG. 26B, an illustrative method 1320 of operating a nuclear fission reactor starts at a block 1330. At a block 1340, the method comprises generating a gaseous fission product by activating a nuclear fission fuel element. At a block 1350, the gaseous fission product is received into a reactor vessel coupled to the nuclear fission fuel element. At a block 1360, venting means associated with the nuclear fission fuel element is operated for controllably venting the gaseous fission product into the reactor vessel. At a block 1370, the gaseous fission product vented into the reactor vessel is collected by operating a gaseous fission product collecting means coupled to the venting means. At a block 1380, the gaseous fission product vented into the reactor vessel is collected by operating a gaseous fission product collecting means capable of being coupled to the reactor vessel and thereafter capable of being decoupled from the reactor vessel for removing the gaseous fission product from the reactor vessel. The method stops at a block 1390.

Figure 26C:
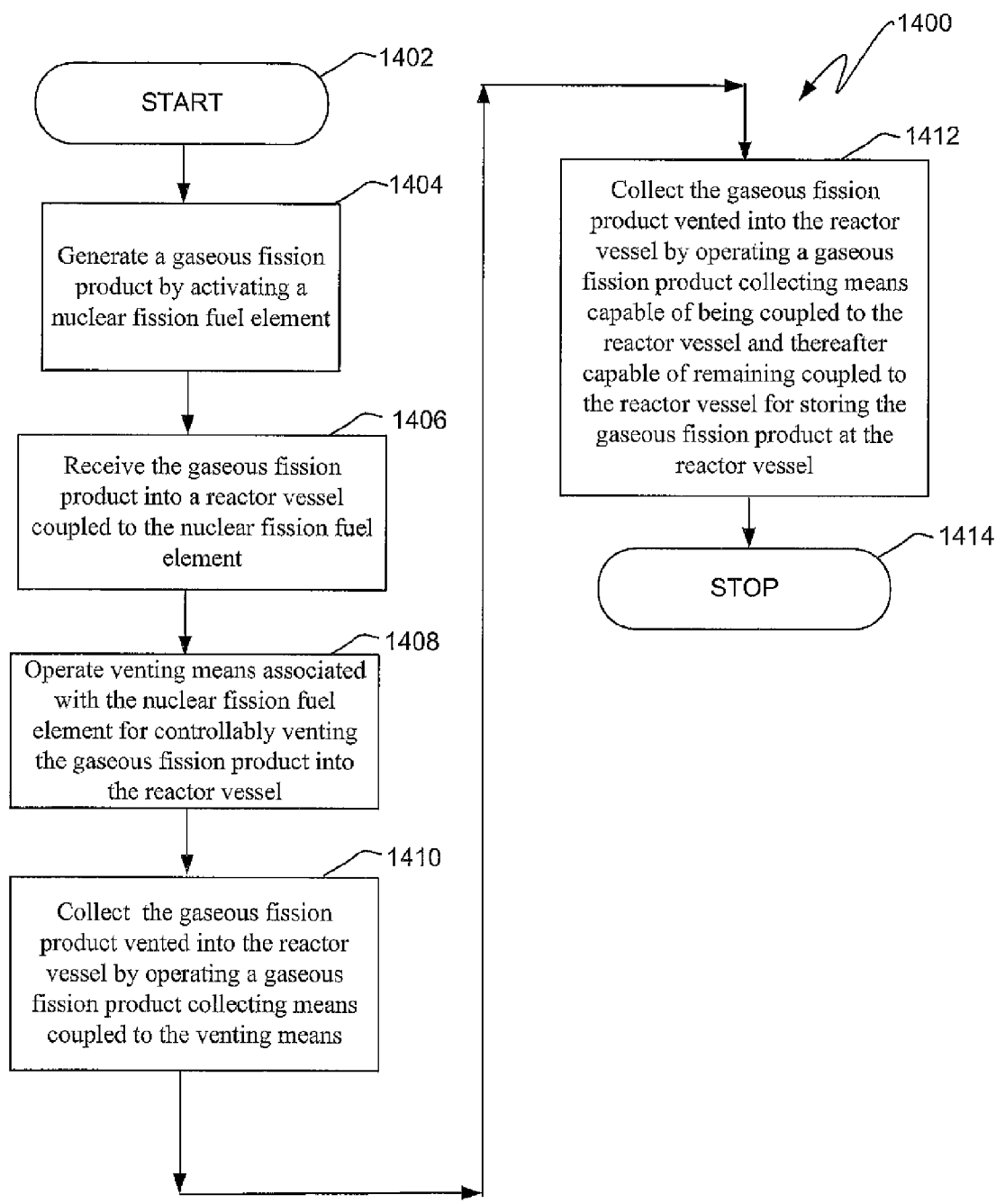

In FIG. 26C, an illustrative method 1400 of operating a nuclear fission reactor starts at a block 1402. At a block 1404, the method comprises generating a gaseous fission product by activating a nuclear fission fuel element. At a block 1406, the gaseous fission product is received into a reactor vessel coupled to the nuclear fission fuel element. At a block 1408, venting means associated with the nuclear fission fuel element is operated for controllably venting the gaseous fission product into the reactor vessel. At a block 1410, the gaseous fission product vented into the reactor vessel is collected by operating a gaseous fission product collecting means coupled to the venting means. At a block 1412, the gaseous fission product vented into the reactor vessel is collected by operating a gaseous fission product collecting means capable of being coupled to the reactor vessel and thereafter capable of remaining coupled to the reactor vessel for storing the gaseous fission product at the reactor vessel. The method stops at a block 1414.

Figure 26D:
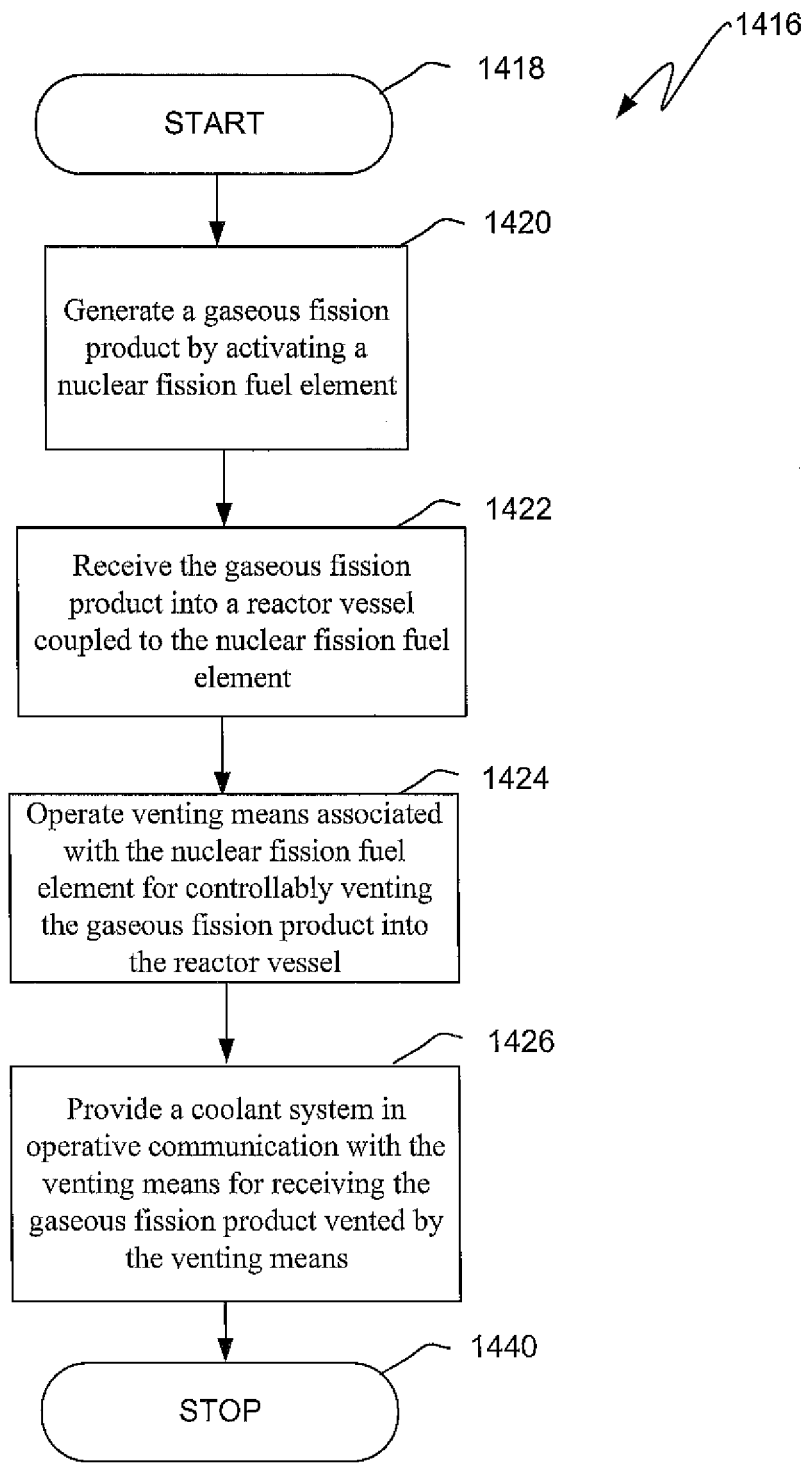

In FIG. 26D, an illustrative method 1416 of operating a nuclear fission reactor starts at a block 1418. At a block 1420, the method comprises generating a gaseous fission product by activating a nuclear fission fuel element. At a block 1422, the gaseous fission product is received into a reactor vessel coupled to the nuclear fission fuel element. At a block 1424, venting means associated with the nuclear fission fuel element is operated for controllably venting the gaseous fission product into the reactor vessel. At a block a 1426, a coolant system in operative communication with the venting means is provided for receiving the gaseous fission product vented by the venting means. The method stops at a block 1440.

Figure 26E:
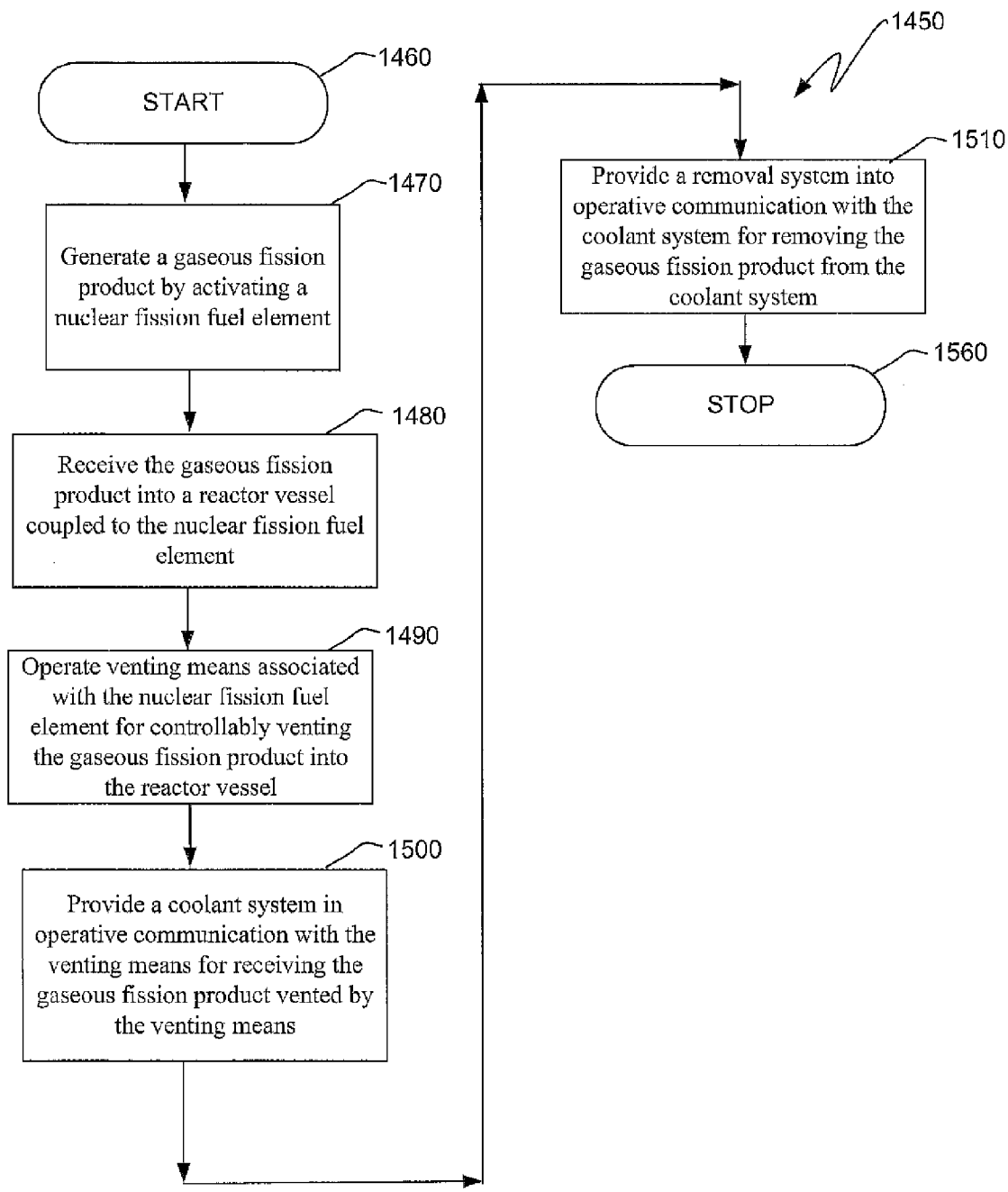

In FIG. 26E, an illustrative method 1450 of operating a nuclear fission reactor starts at a block 1460. At a block 1470, the method comprises generating a gaseous fission product by activating a nuclear fission fuel element. At a block 1480, the gaseous fission product is received into a reactor vessel coupled to the nuclear fission fuel element. At a block 1490, venting means associated with the nuclear fission fuel element is operated for controllably venting the gaseous fission product into the reactor vessel. At a block 1500, a coolant system in operative communication with the venting means is provided for receiving the gaseous fission product vented by the venting means. At a block 1510, a removal system in operative communication with the coolant system is provided for removing the gaseous fission product from the coolant system. The method stops at a block 1560.

Figure 26F:
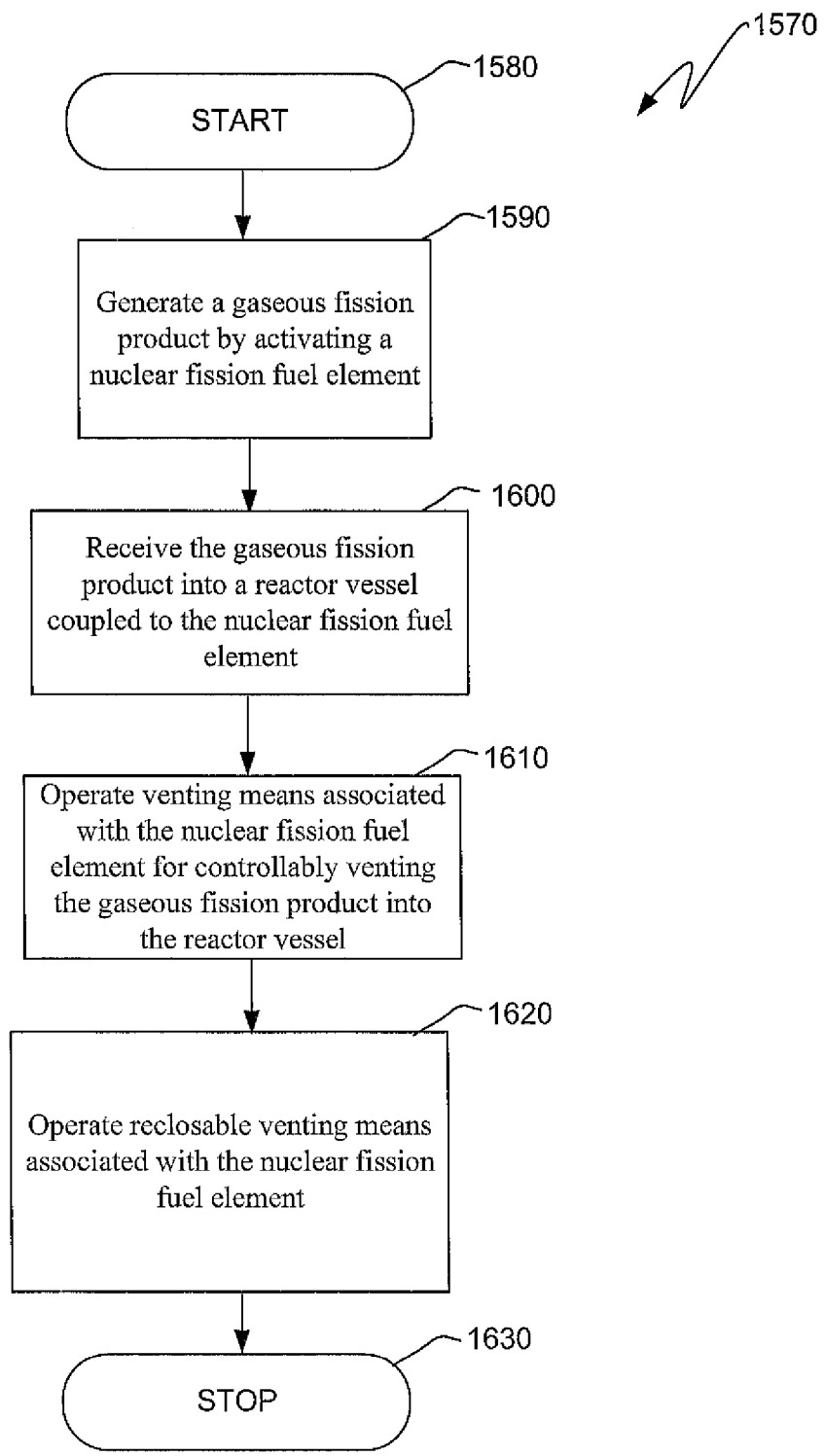

In FIG. 26F, an illustrative method 1570 of operating a nuclear fission reactor starts at a block 1580. At a block 1590, the method comprises generating a gaseous fission product by activating a nuclear fission fuel element. At a block 1600, the gaseous fission product is received into a reactor vessel coupled to the nuclear fission fuel element. At a block 1610, venting means associated with the nuclear fission fuel element is operated for controllably venting the gaseous fission product into the reactor vessel. At a block 1620, reclosable venting means associated with the nuclear fission fuel element is operated. The method stops at a block 1630.

Figure 26G:
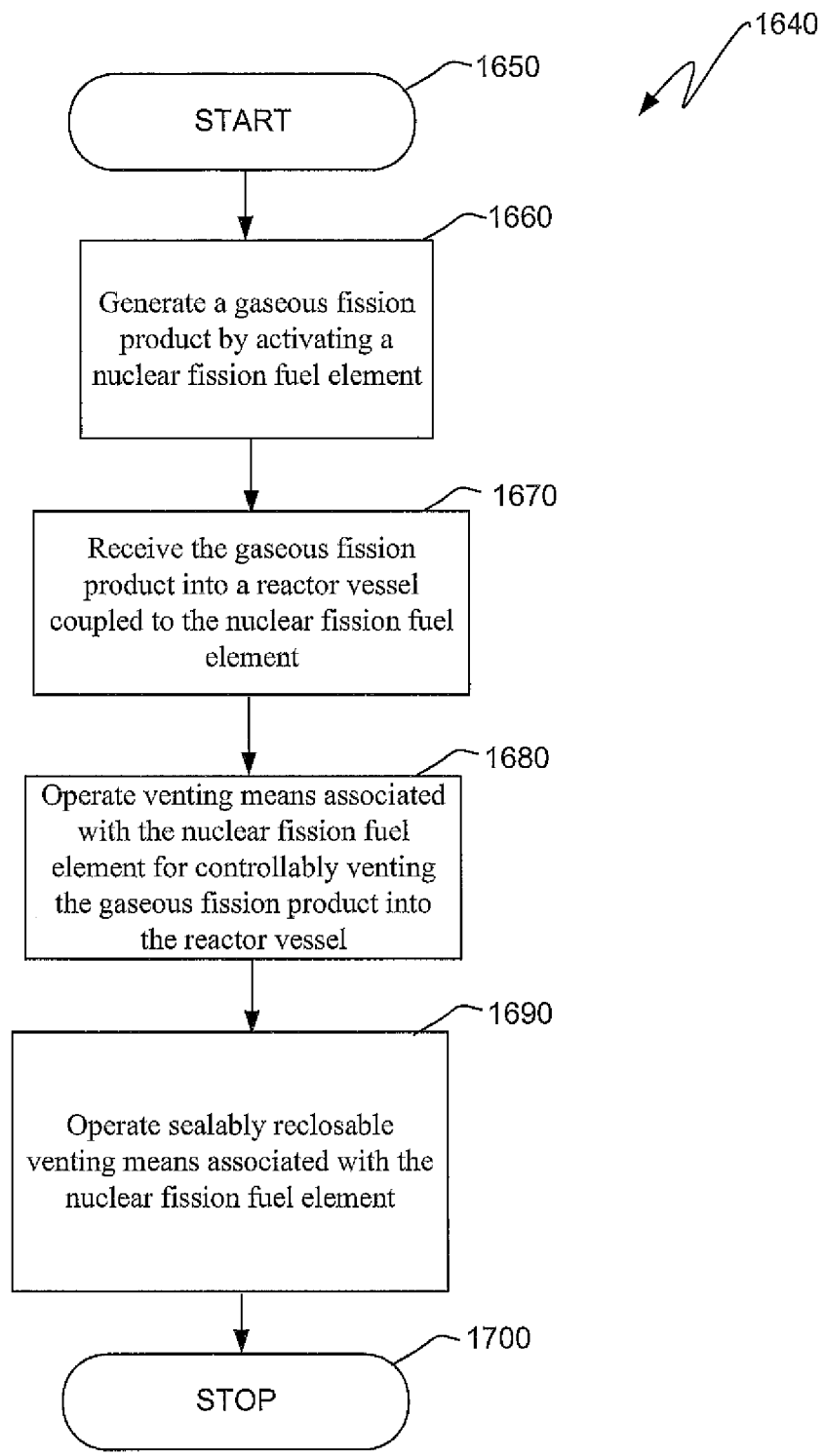

In FIG. 26G, an illustrative method 1640 of operating a nuclear fission reactor starts at a block 1650. At a block 1660, the method comprises generating a gaseous fission product by activating a nuclear fission fuel element. At a block 1670, the gaseous fission product is received into a reactor vessel coupled to the nuclear fission fuel element. At a block 1680, venting means associated with the nuclear fission fuel element is operated for controllably venting the gaseous fission product into the reactor vessel. At a block 1690, sealably reclosable venting means associated with the nuclear fission fuel element is operated. The method stops at a block 1700.

Figure 27:
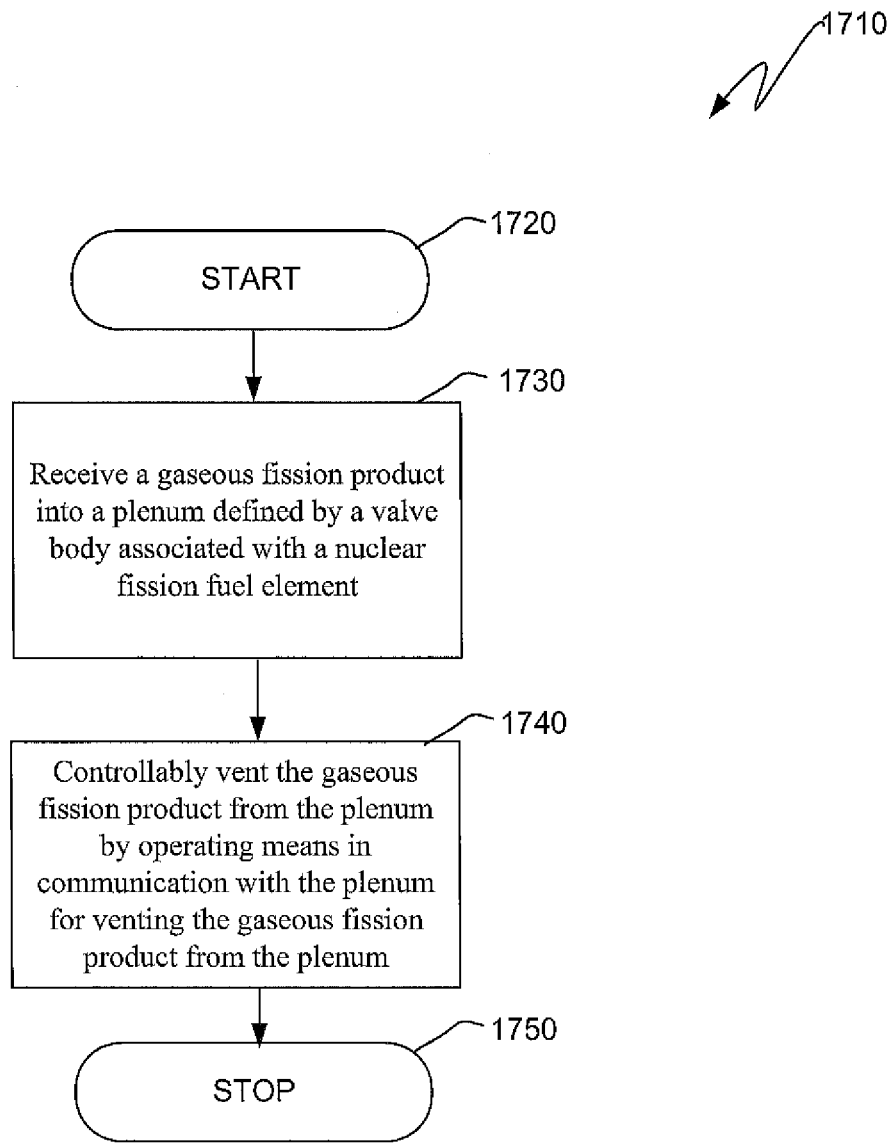

In FIG. 27, an illustrative method 1710 of operating a nuclear fission reactor starts at a block 1720. At a block 1730, the method comprises receiving a gaseous fission product into a plenum defined by a valve body associated with a nuclear fission fuel element. At a block 1740, the gaseous fission product is controllably vented from the plenum by operating means in communication with the plenum for venting the gaseous fission product from the plenum. The method stops at a block 1750.

Figure 28:
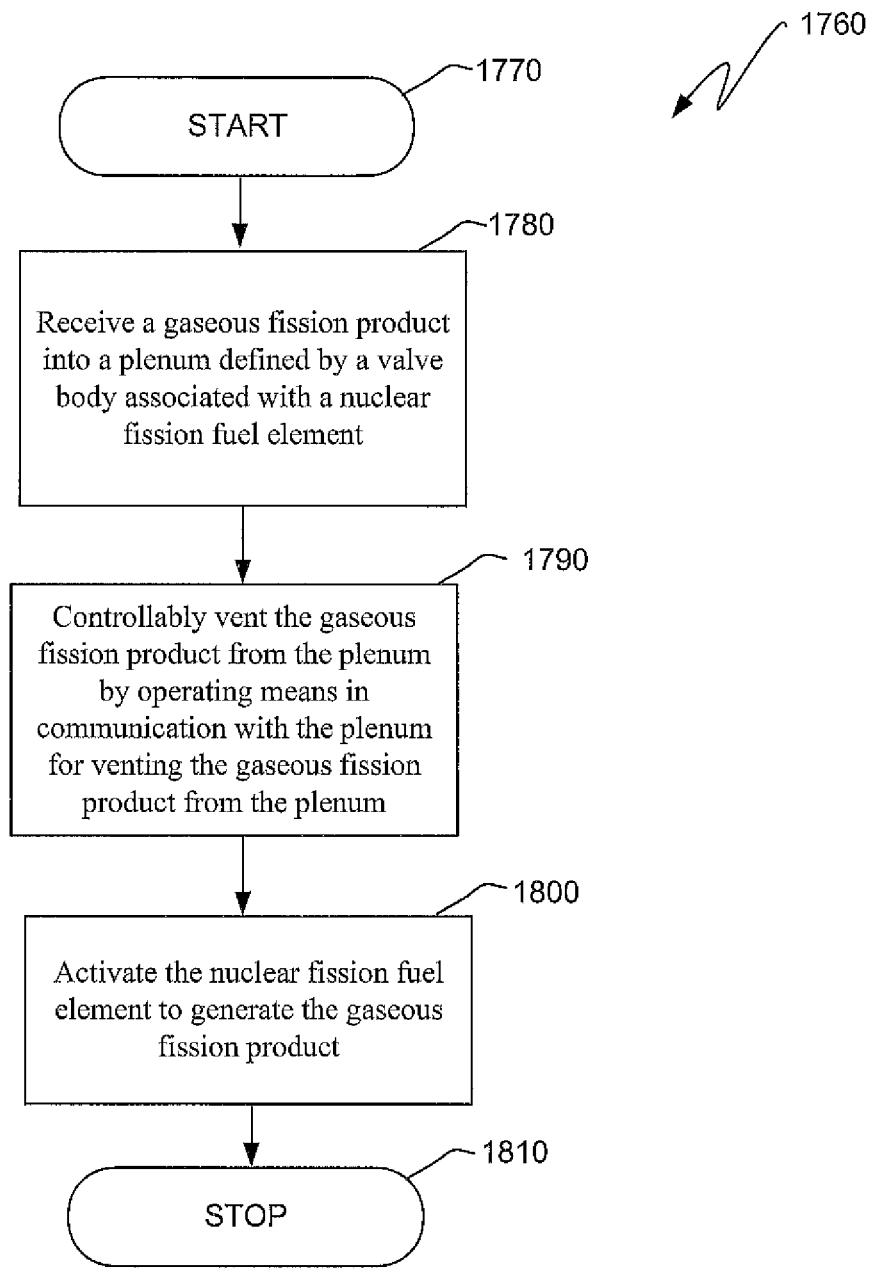

In FIG. 28, an illustrative method 1760 of operating a nuclear fission reactor starts at a block 1770. At a block 1780, the method comprises receiving a gaseous fission product into a plenum defined by a valve body associated with a nuclear fission fuel element. At a block 1790, the gaseous fission product is controllably vented from the plenum by operating means in communication with the plenum for venting the gaseous fission product from the plenum. At a block 1800, the nuclear fission fuel element is activated to generate the gaseous fission product. The method stops at a block 1810.

Figure 28A:
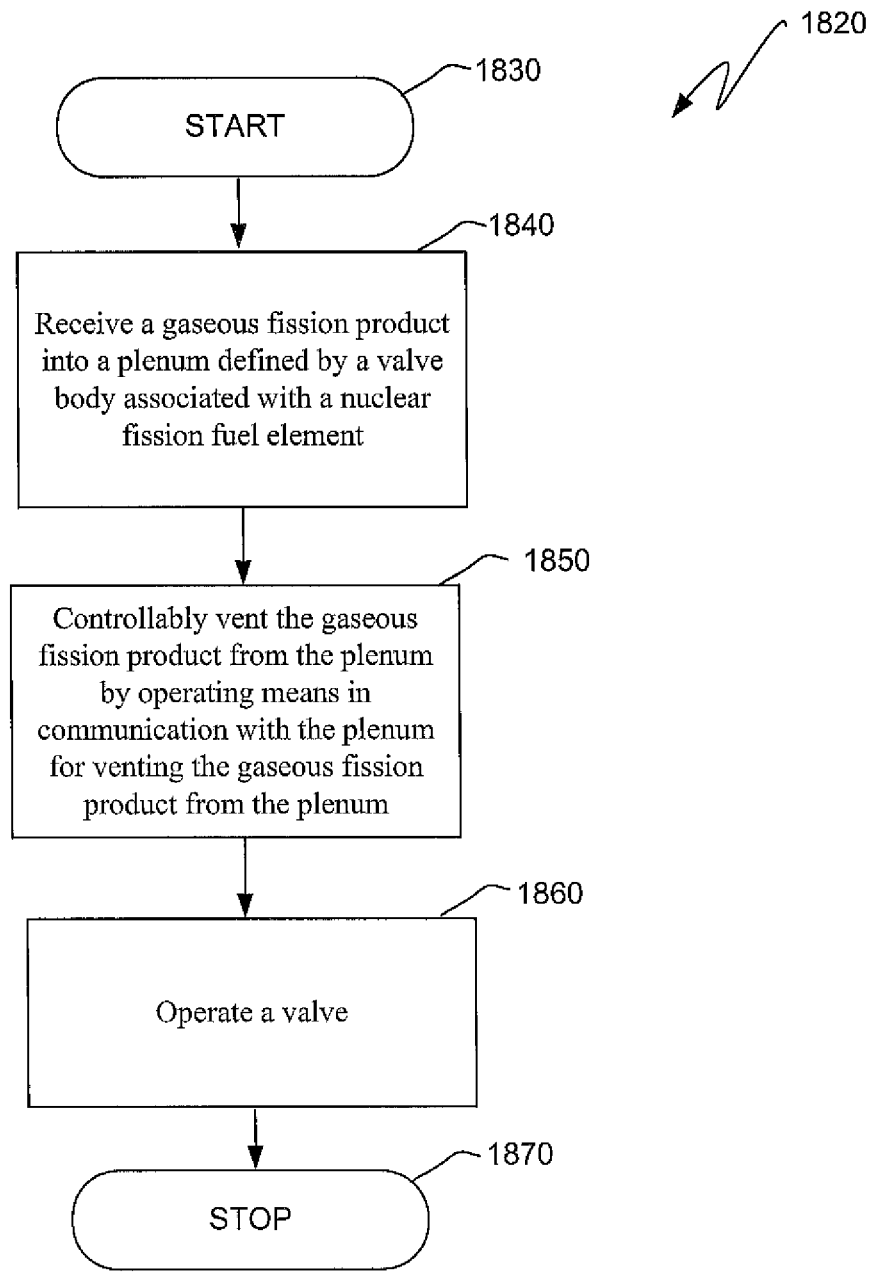

In FIG. 28A, an illustrative method 1820 of operating a nuclear fission reactor starts at a block 1830. At a block 1840, the method comprises receiving a gaseous fission product into a plenum defined by a valve body associated with a nuclear fission fuel element. At a block 1850, the gaseous fission product is controllably vented from the plenum by operating means in communication with the plenum for venting the gaseous fission product from the plenum. At a block 1860, a valve is operated. The method stops at a block 1870.

Figure 28B:
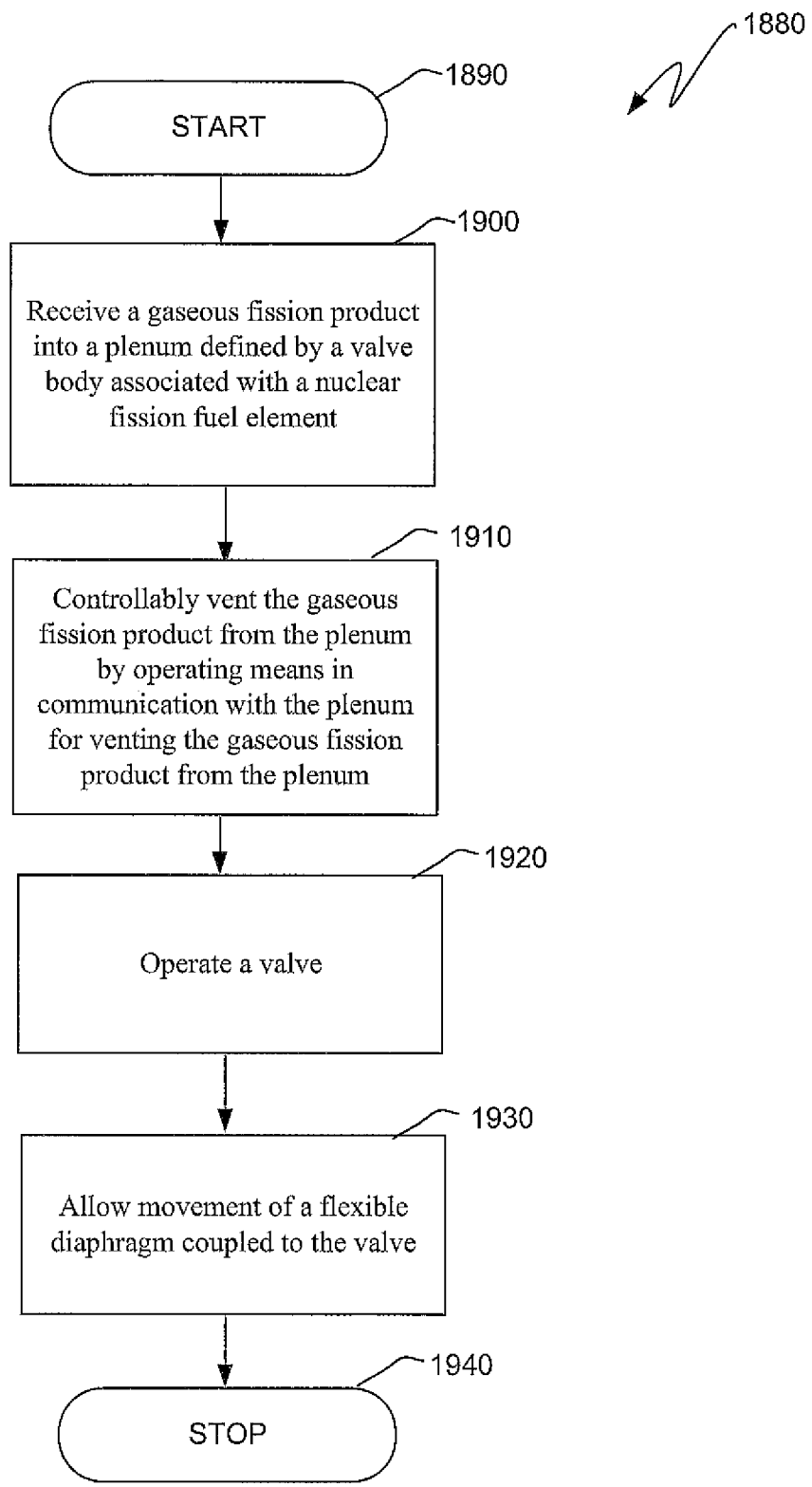

In FIG. 28B, an illustrative method 1880 of operating a nuclear fission reactor starts at a block 1890. At a block 1900, the method comprises receiving a gaseous fission product into a plenum defined by a valve body associated with a nuclear fission fuel element. At a block 1910, the gaseous fission product is controllably vented from the plenum by operating means in communication with the plenum for venting the gaseous fission product from the plenum. At a block 1920, a valve is operated. At a block 1930, movement of a flexible diaphragm coupled to the valve is allowed. The method stops at a block 1940.

Figure 29:
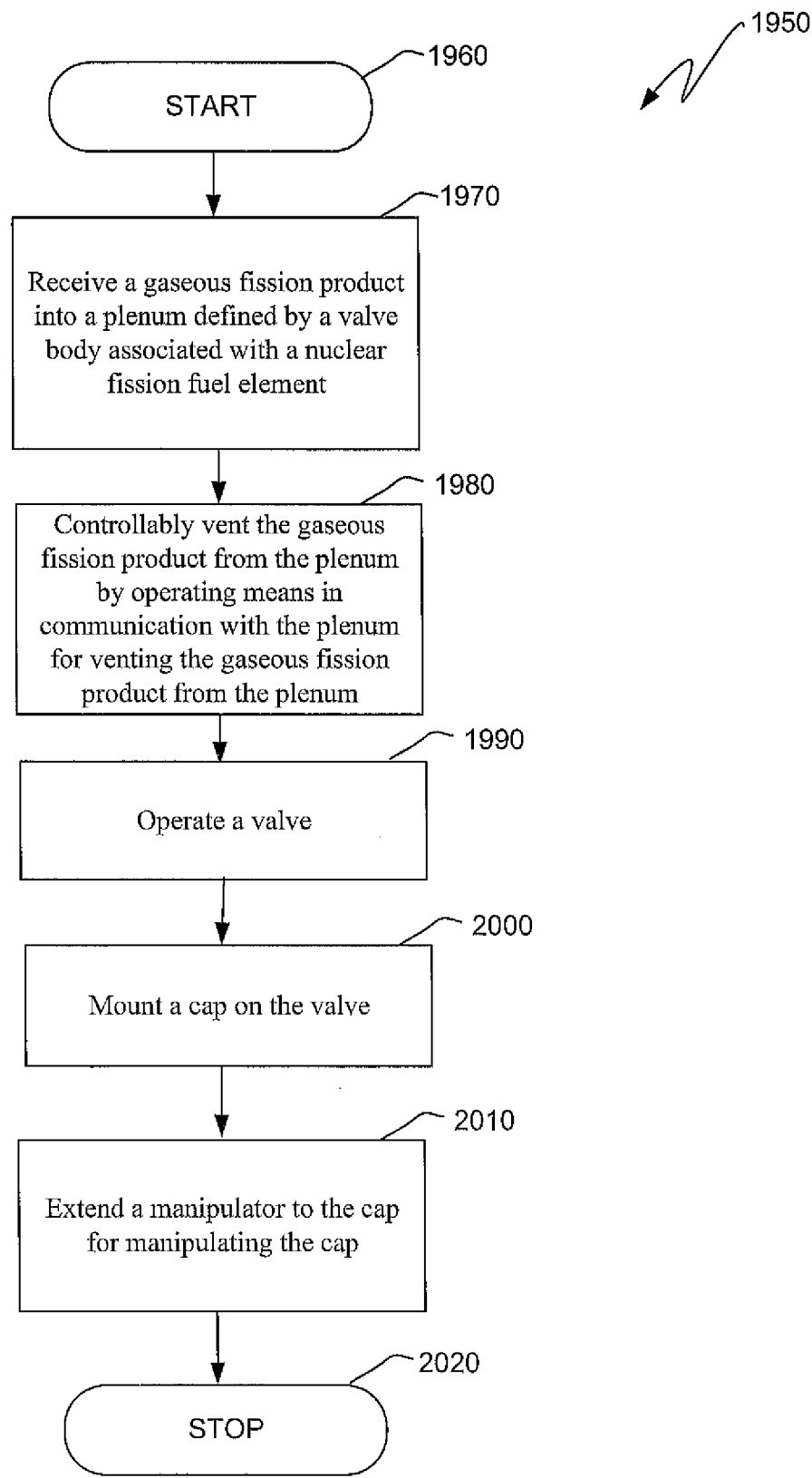

In FIG. 29, an illustrative method 1950 of operating a nuclear fission reactor starts at a block 1960. At a block 1970, the method comprises receiving a gaseous fission product into a plenum defined by a valve body associated with a nuclear fission fuel element. At a block 1980 the gaseous fission product is controllably vented from the plenum by operating means in communication with the plenum for venting the gaseous fission product from the plenum. At a block 1990, a valve is operated. At a block 2000 a cap is mounted on the valve. At a block 2010 a manipulator is extended to the cap for manipulating the cap. The method stops at a block 2020.

Figure 30:
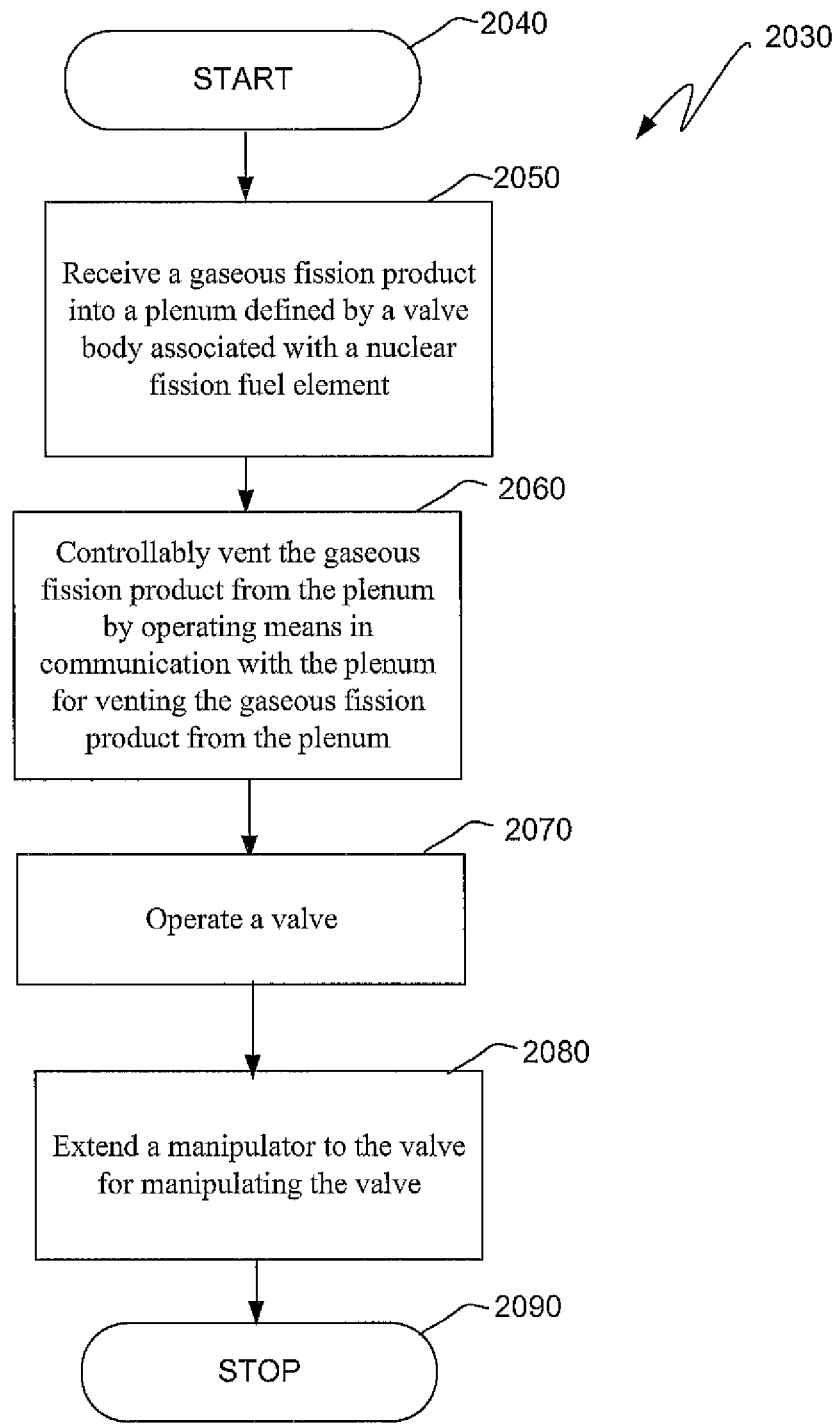

In FIG. 30, an illustrative method 2030 of operating a nuclear fission reactor starts at a block 2040. At a block 2050, the method comprises receiving a gaseous fission product into a plenum defined by a valve body associated with a nuclear fission fuel element. At a block 2060, the gaseous fission product is controllably vented from the plenum by operating means in communication with the plenum for venting the gaseous fission product from the plenum. At a block 2070, a valve is operated. At a block 2080, a manipulator is extended to the valve for manipulating the valve. The method stops at a block 2090.

Figure 30A:
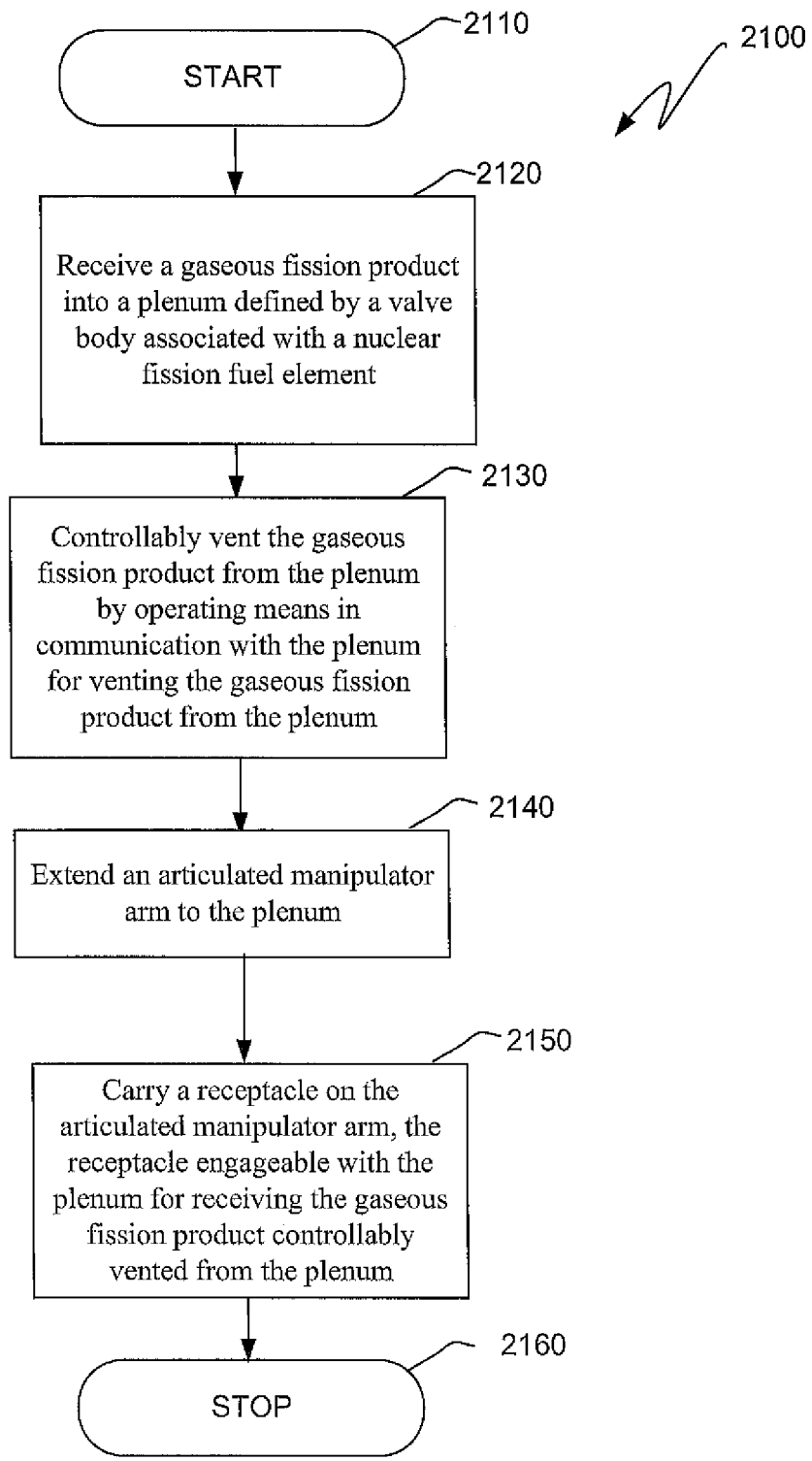

In FIG. 30A, an illustrative method 2100 of operating a nuclear fission reactor starts at a block 2110. At a block 2120, the method comprises receiving a gaseous fission product into a plenum defined by a valve body associated with a nuclear fission fuel element. At a block 2130, the gaseous fission product is controllably vented from the plenum by operating means in communication with the plenum for venting the gaseous fission product from the plenum. At a block 2140, an articulated manipulator arm is extended to the plenum. At a block 2150, a receptacle is carried on the articulated manipulator arm, the receptacle being engageable with the plenum for receiving the gaseous fission product controllably vented from the plenum. The method stops at a block 2160.

Figure 31:
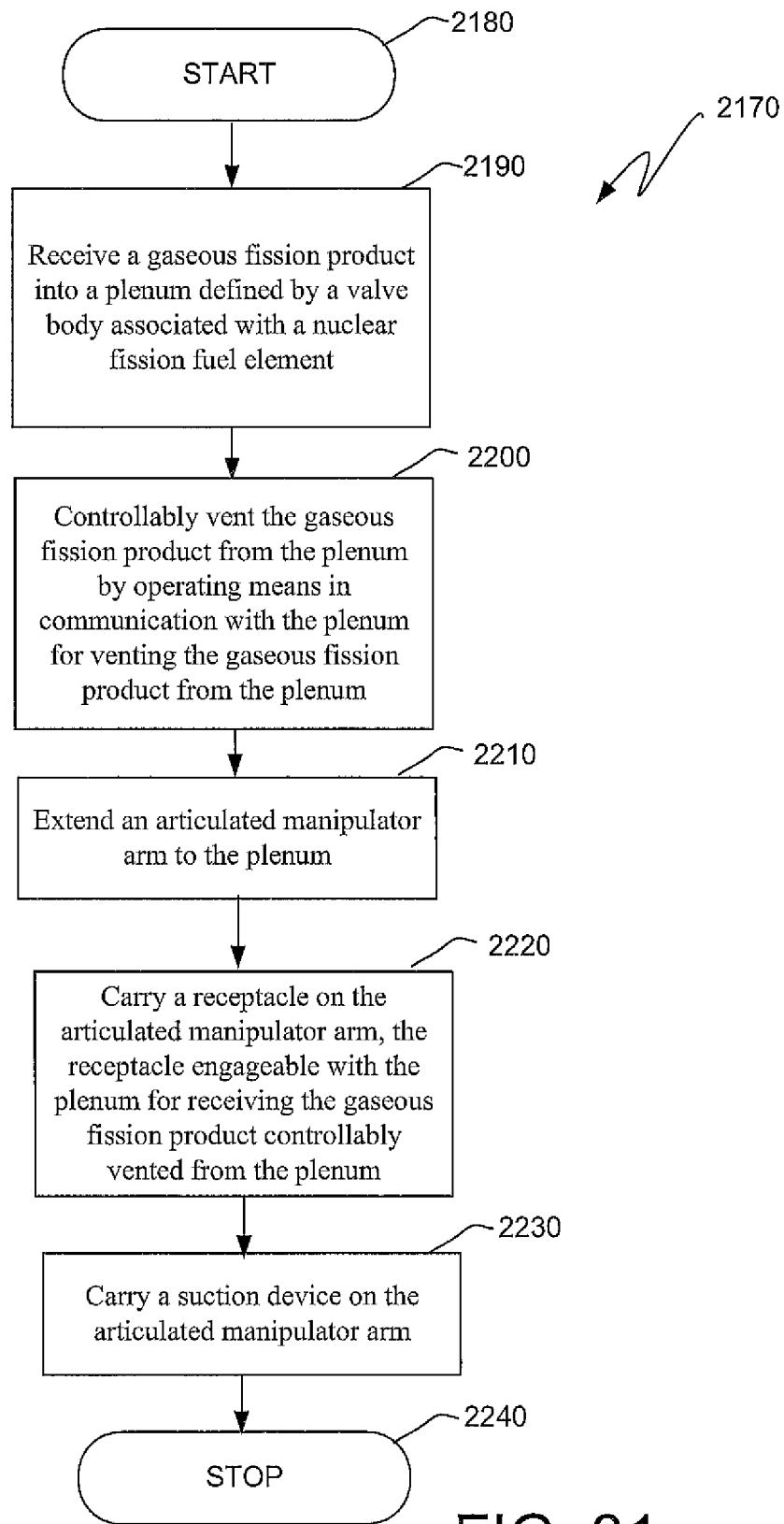

In FIG. 31, an illustrative method 2170 of operating a nuclear fission reactor starts at a block 2180. At a block 2190, the method comprises receiving a gaseous fission product into a plenum defined by a valve body associated with a nuclear fission fuel element. At a block 2200, the gaseous fission product is controllably vented from the plenum by operating means in communication with the plenum for venting the gaseous fission product from the plenum. At a block 2210, an articulated manipulator arm is extended to the plenum. At a block 2220, a receptacle is carried on the articulated manipulator arm, the receptacle being engageable with the plenum for receiving the gaseous fission product controllably vented from the plenum. At a block 2230, a suction device is carried on the articulated manipulator arm. The method stops at a block 2240.

Figure 31A:
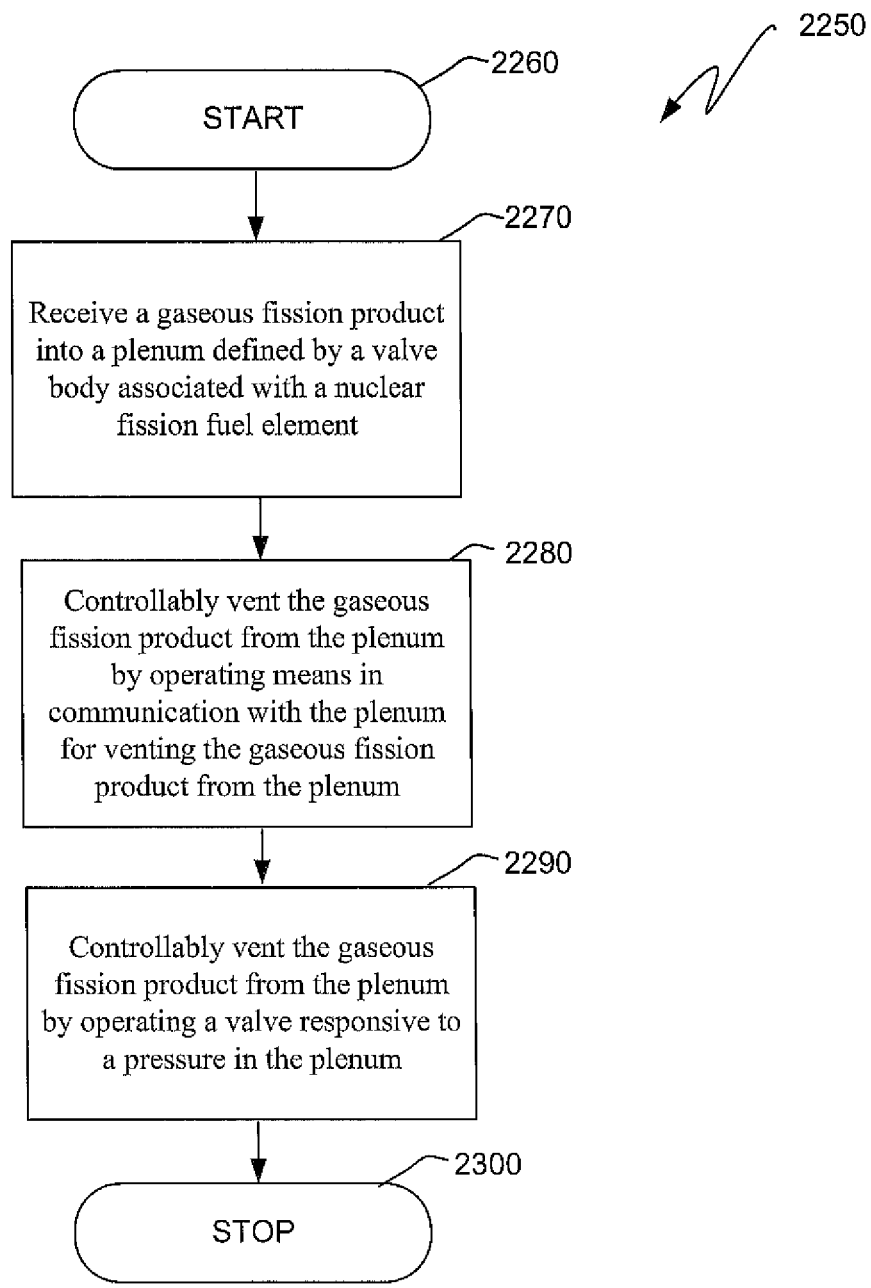

In FIG. 31A, an illustrative method 2250 of operating a nuclear fission reactor starts at a block 2260. At a block 2270, the method comprises receiving a gaseous fission product into a plenum defined by a valve body associated with a nuclear fission fuel element. At a block 2280, the gaseous fission product is controllably vented from the plenum by operating means in communication with the plenum for venting the gaseous fission product from the plenum. At a block 2290, the gaseous fission product is controllably vented from the plenum by operating a valve responsive to a pressure in the plenum. The method stops at a block 2300.

Figure 31B:
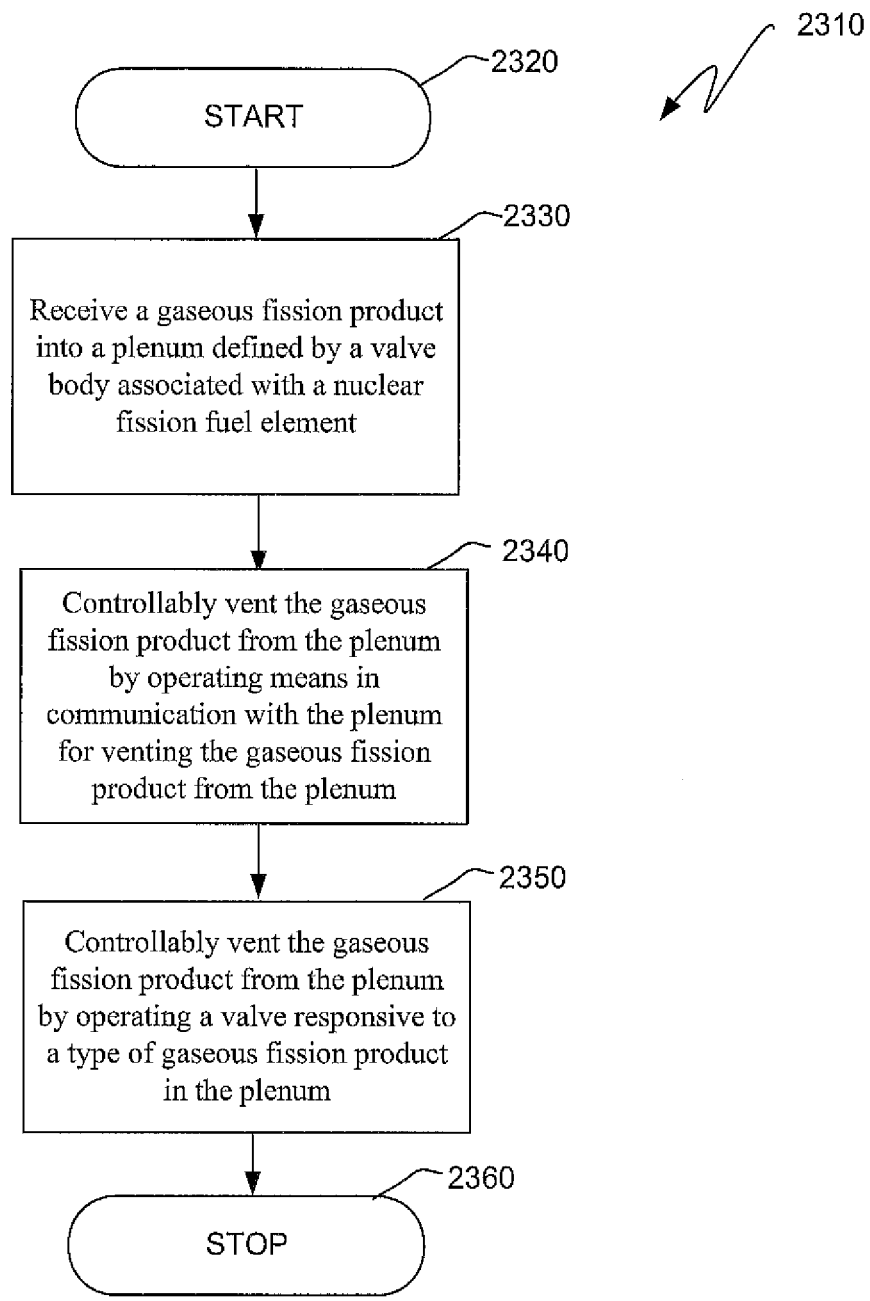

In FIG. 31B, an illustrative method 2310 of operating a nuclear fission reactor starts at a block 2320. At a block 2330, the method comprises receiving a gaseous fission product into a plenum defined by a valve body associated with a nuclear fission fuel element. At a block 2340, the gaseous fission product is controllably vented from the plenum by operating means in communication with the plenum for venting the gaseous fission product from the plenum. At a block 2350, the gaseous fission product is controllably vented from the plenum by operating a valve responsive to a type of gaseous fission product in the plenum. The method stops at a block 2360.

Figure 32:
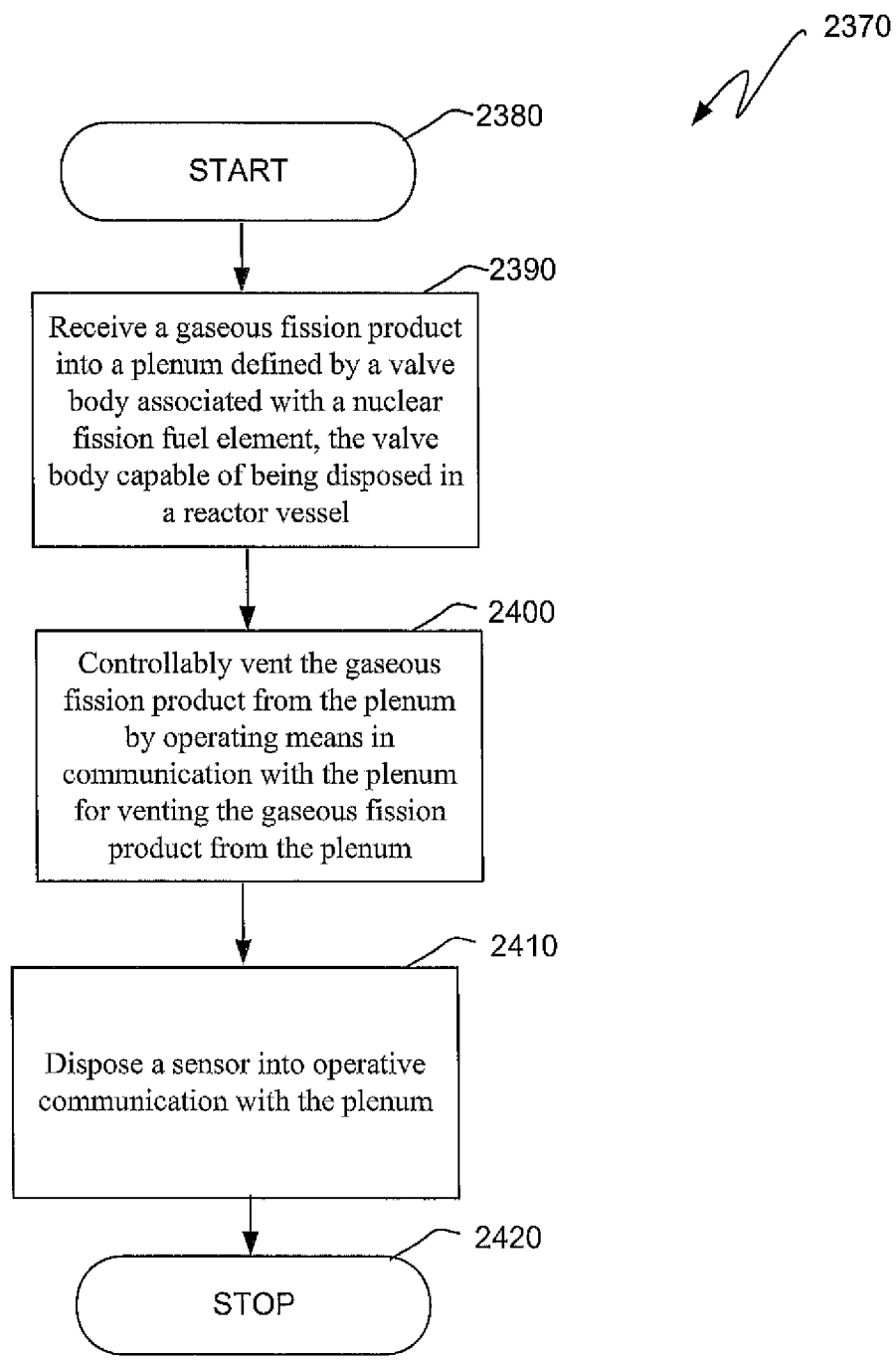

In FIG. 32, an illustrative method 2370 of operating a nuclear fission reactor starts at a block 2380. At a block 2390, the method comprises receiving a gaseous fission product into a plenum defined by a valve body associated with a nuclear fission fuel element, the valve body capable of being disposed in a reactor vessel. At a block 2400, the gaseous fission product is controllably vented from the plenum by operating means in communication with the plenum for venting the gaseous fission product from the plenum. At a block 2410, a sensor is disposed into operative communication with the plenum. The method stops at a block 2420.

Figure 33:
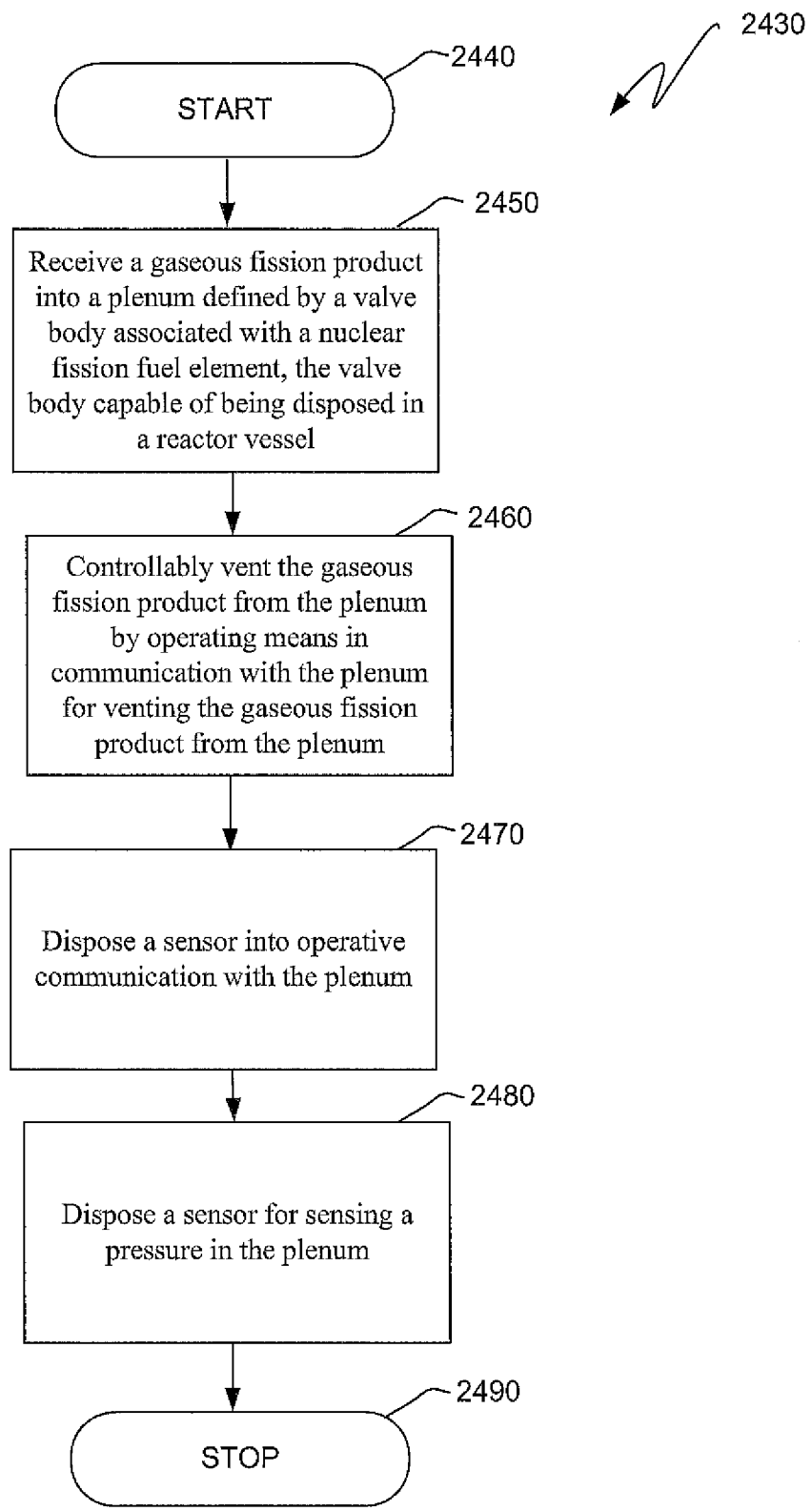

In FIG. 33, an illustrative method 2430 of operating a nuclear fission reactor starts at a block 2440. At a block 2450, the method comprises receiving a gaseous fission product into a plenum defined by a valve body associated with a nuclear fission fuel element, the valve body capable of being disposed in a reactor vessel. At a block 2460, the gaseous fission product is controllably vented from the plenum by operating means in communication with the plenum for venting the gaseous fission product from the plenum. At a block 2470, a sensor is disposed into operative communication with the plenum. At a block 2480, a sensor is disposed for sensing pressure in the plenum. The method stops at a block 2490.

Figure 34:
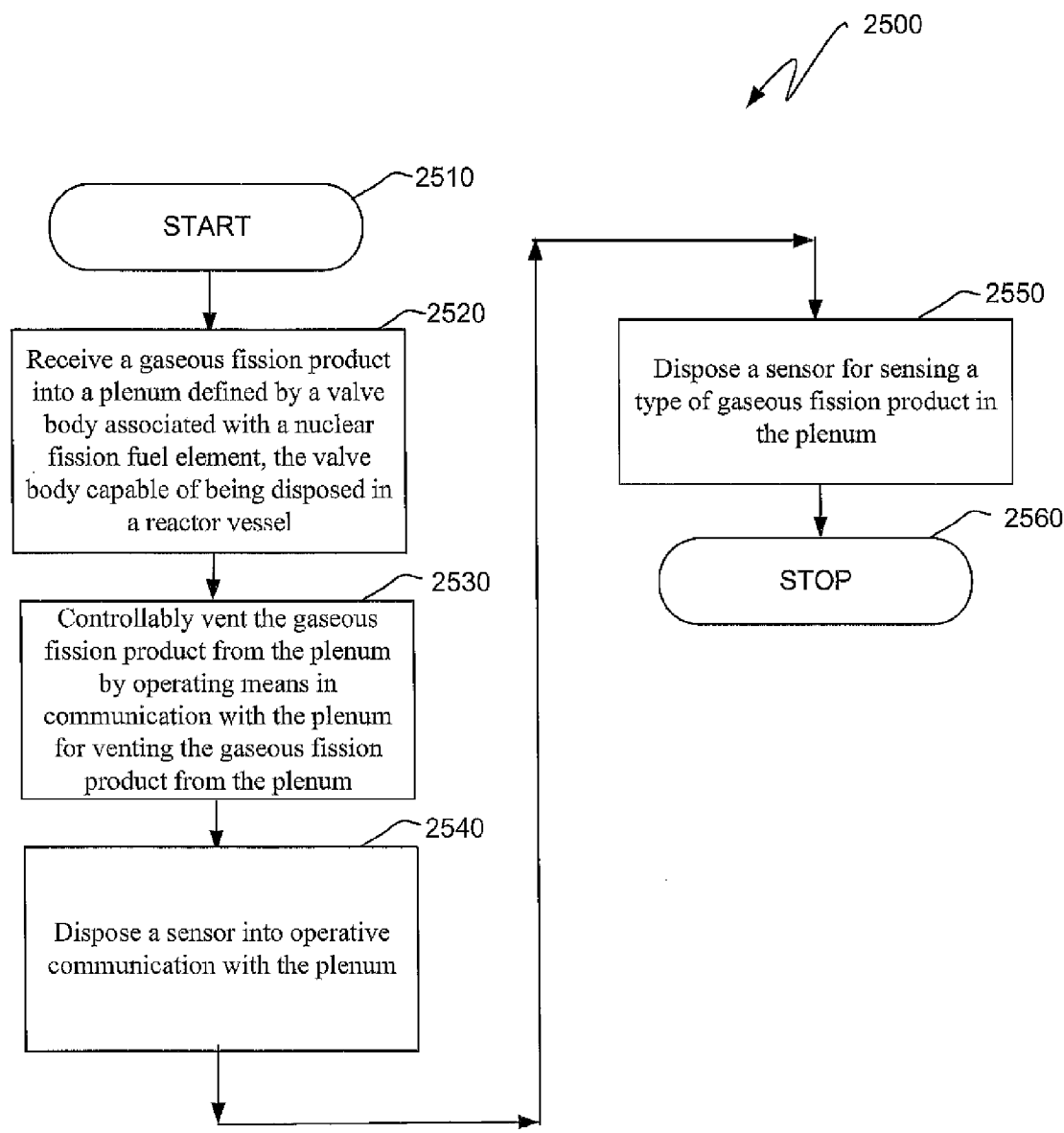

In FIG. 34, an illustrative method 2500 of operating a nuclear fission reactor starts at a block 2510. At a block 2520, the method comprises receiving a gaseous fission product into a plenum defined by a valve body associated with a nuclear fission fuel element, the valve body capable of being disposed in a reactor vessel. At a block 2530, the gaseous fission product is controllably vented from the plenum by operating means in communication with the plenum for venting the gaseous fission product from the plenum. At a block 2540, a sensor is disposed into operative communication with the plenum. At a block 2550, a sensor is disposed for sensing a type of gaseous fission product in the plenum. The method stops at a block 2560.

Figure 34A:
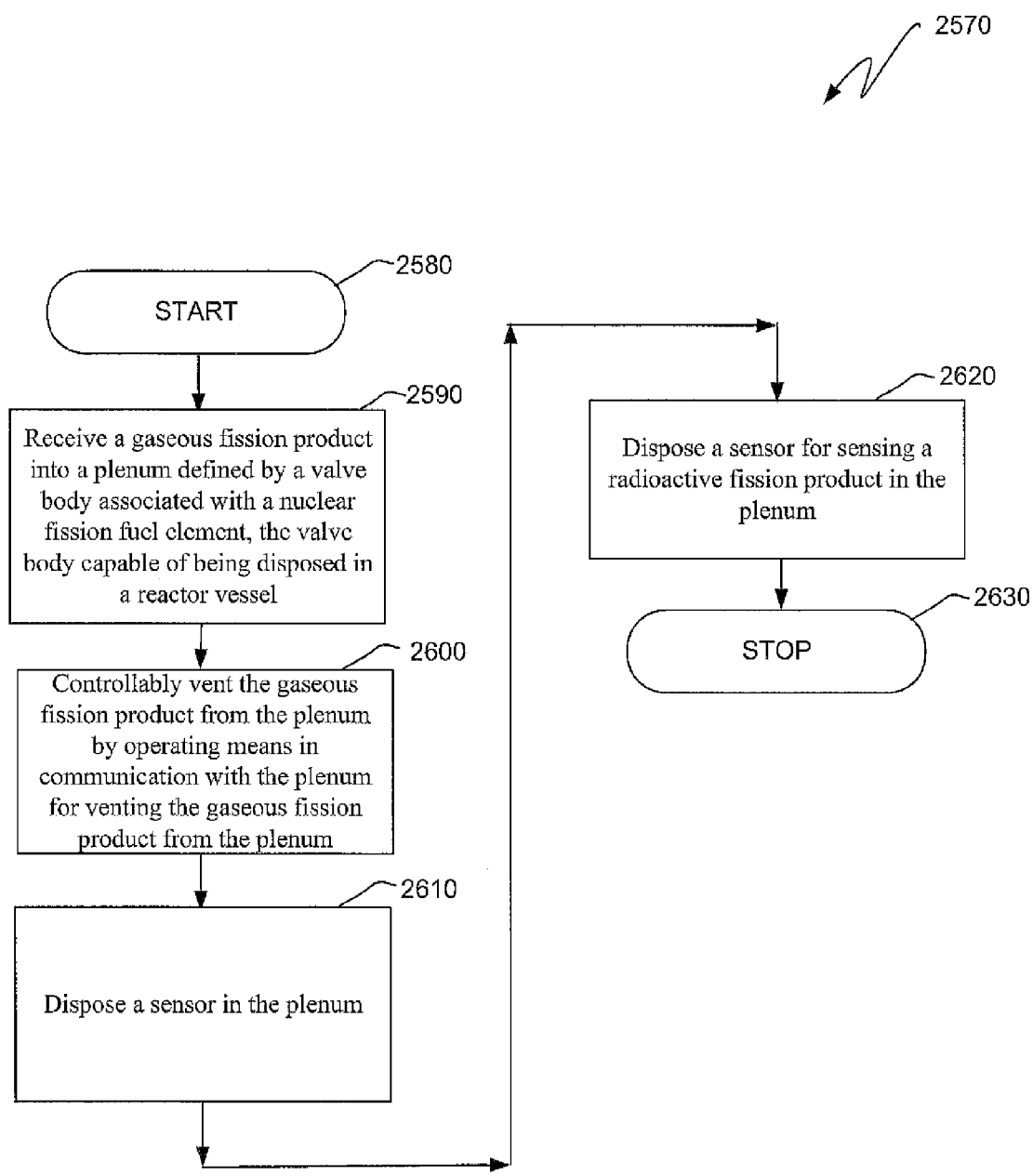

In FIG. 34A, an illustrative method 2570 of operating a nuclear fission reactor starts at a block 2580. At a block 2590, the method comprises receiving a gaseous fission product into a plenum defined by a valve body associated with a nuclear fission fuel element, the valve body capable of being disposed in a reactor vessel. At a block 2600, the gaseous fission product is controllably vented from the plenum by operating means in communication with the plenum for venting the gaseous fission product from the plenum. At a block 2610, a sensor is disposed in the plenum. At a block 2620, a sensor is disposed for sensing a radioactive fission product in the plenum. The method stops at a block 2630.

Figure 34B:
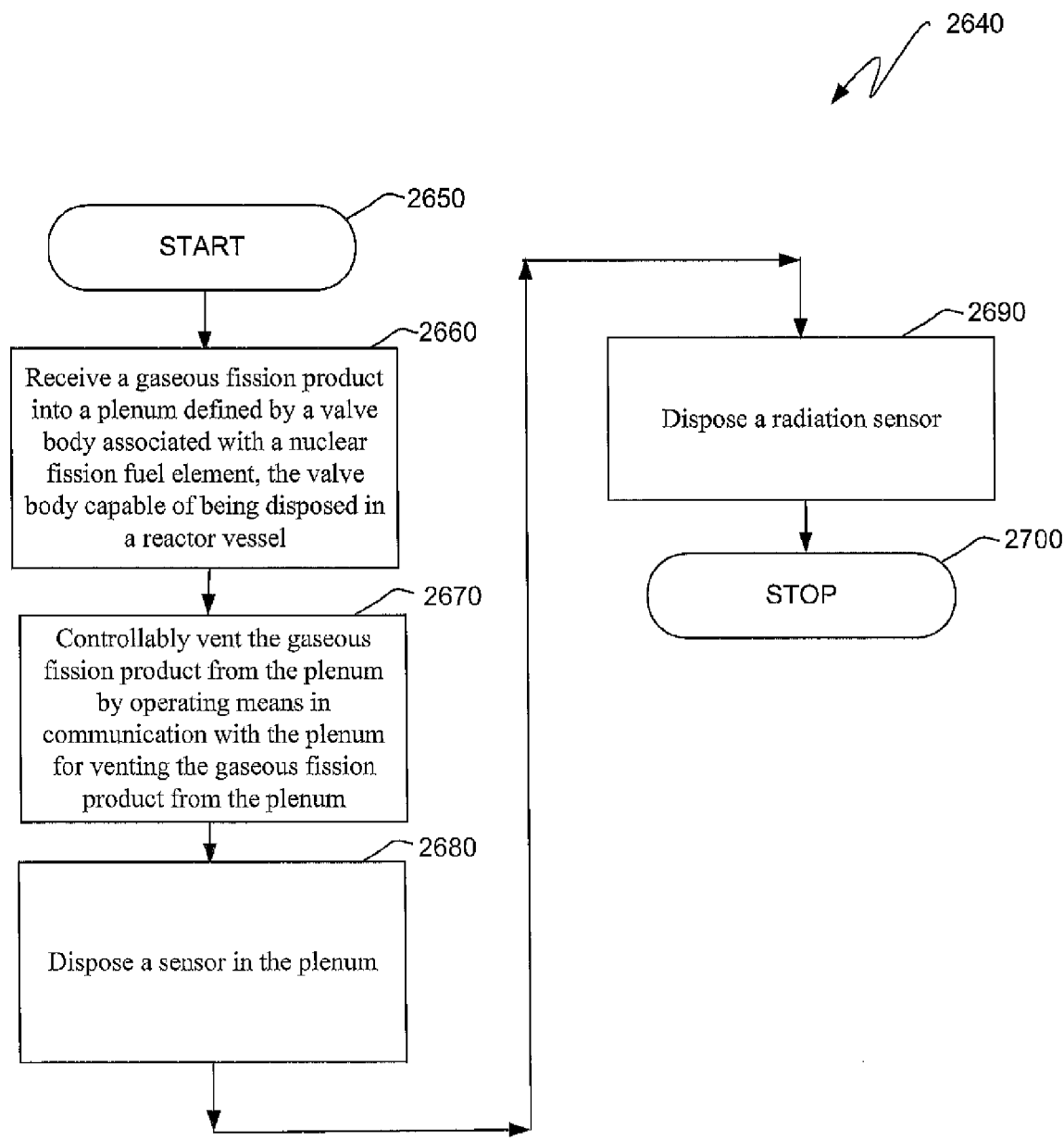

In FIG. 34B, an illustrative method 2640 of operating a nuclear fission reactor starts at a block 2650. At a block 2660, the method comprises receiving a gaseous fission product into a plenum defined by a valve body associated with a nuclear fission fuel element, the valve body capable of being disposed in a reactor vessel. At a block 2670, the gaseous fission product is controllably vented from the plenum by operating means in communication with the plenum for venting the gaseous fission product from the plenum. At a block 2680, a sensor is disposed in the plenum. At a block 2690, a radiation sensor is disposed. The method stops at a block 2700.

Figure 34C:
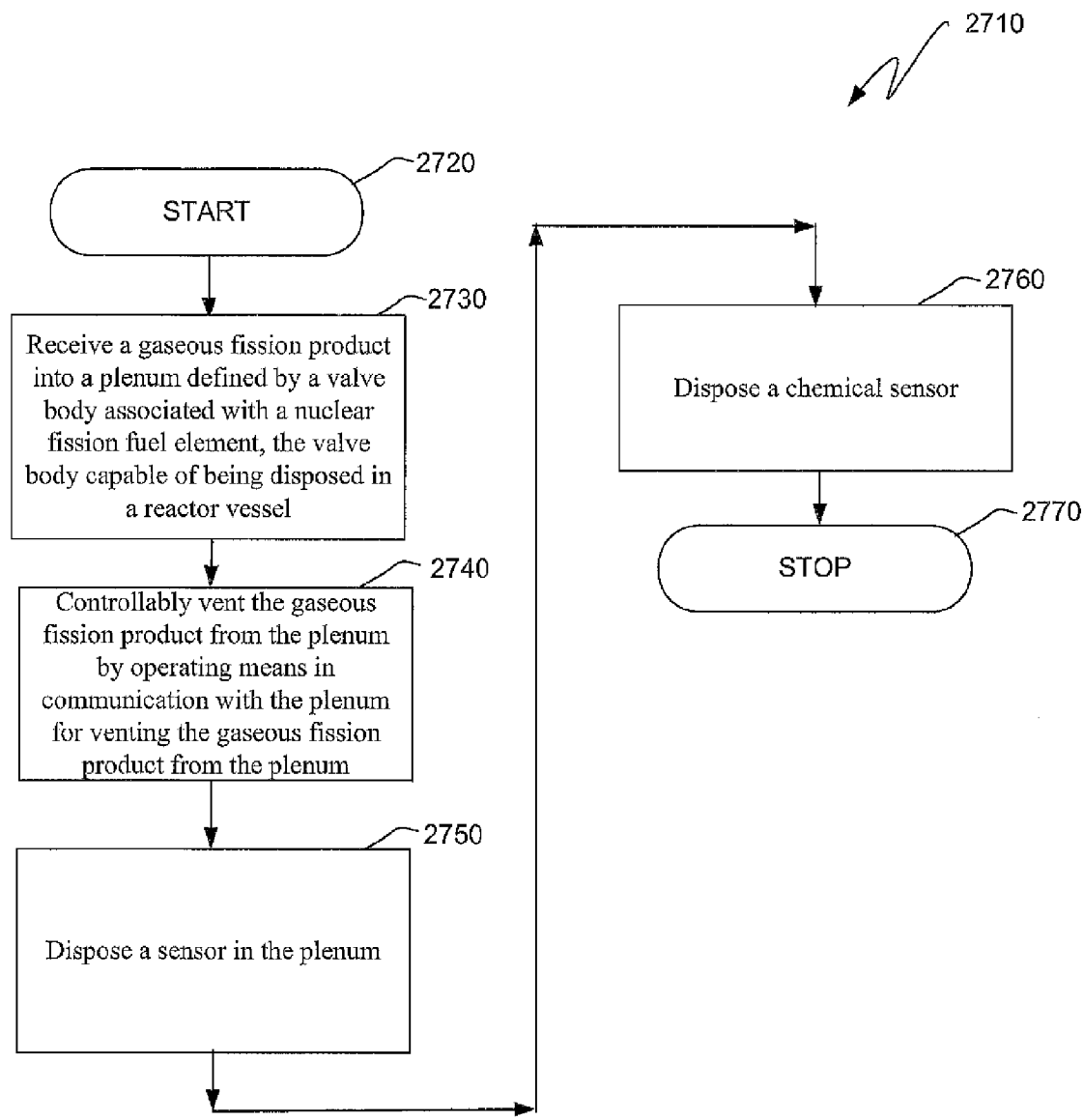

In FIG. 34C, an illustrative method 2710 of operating a nuclear fission reactor starts at a block 2720. At a block 2730, the method comprises receiving a gaseous fission product into a plenum defined by a valve body associated with a nuclear fission fuel element, the valve body capable of being disposed in a reactor vessel. At a block 2740, the gaseous fission product is controllably vented from the plenum by operating means in communication with the plenum for venting the gaseous fission product from the plenum. At a block 2750, a sensor is disposed in the plenum. At a block 2760, a chemical sensor is disposed. The method stops at a block 2770.

Figure 34D:
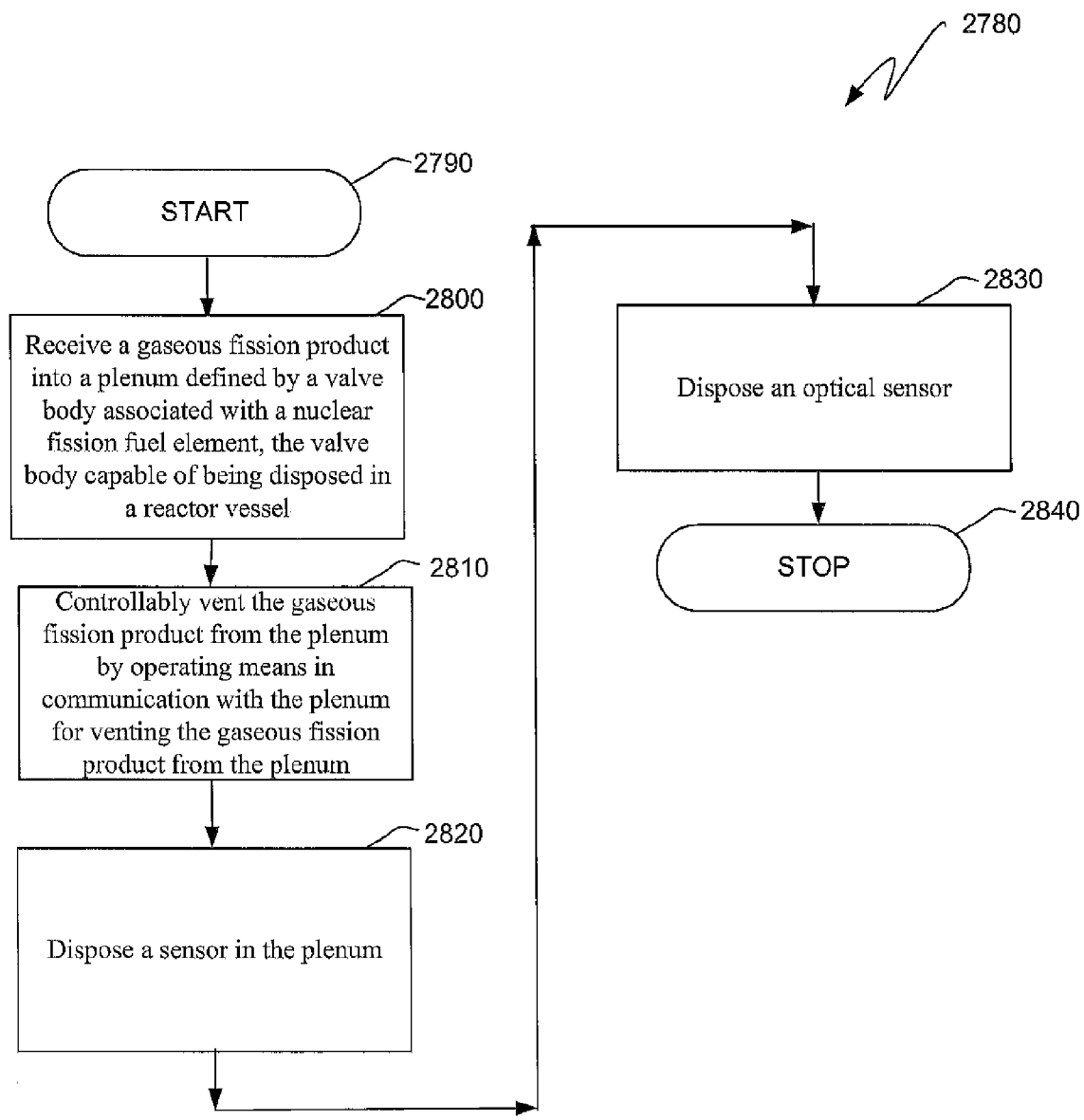

In FIG. 34D, an illustrative method 2780 of operating a nuclear fission reactor starts at a block 2790. At a block 2800, the method comprises receiving a gaseous fission product into a plenum defined by a valve body associated with a nuclear fission fuel element, the valve body capable of being disposed in a reactor vessel. At a block 2810, the gaseous fission product is controllably vented from the plenum by operating means in communication with the plenum for venting the gaseous fission product from the plenum. At a block 2820, a sensor is disposed in the plenum. At a block 2830, an optical sensor is disposed. The method stops at a block 2840.

Figure 34E:
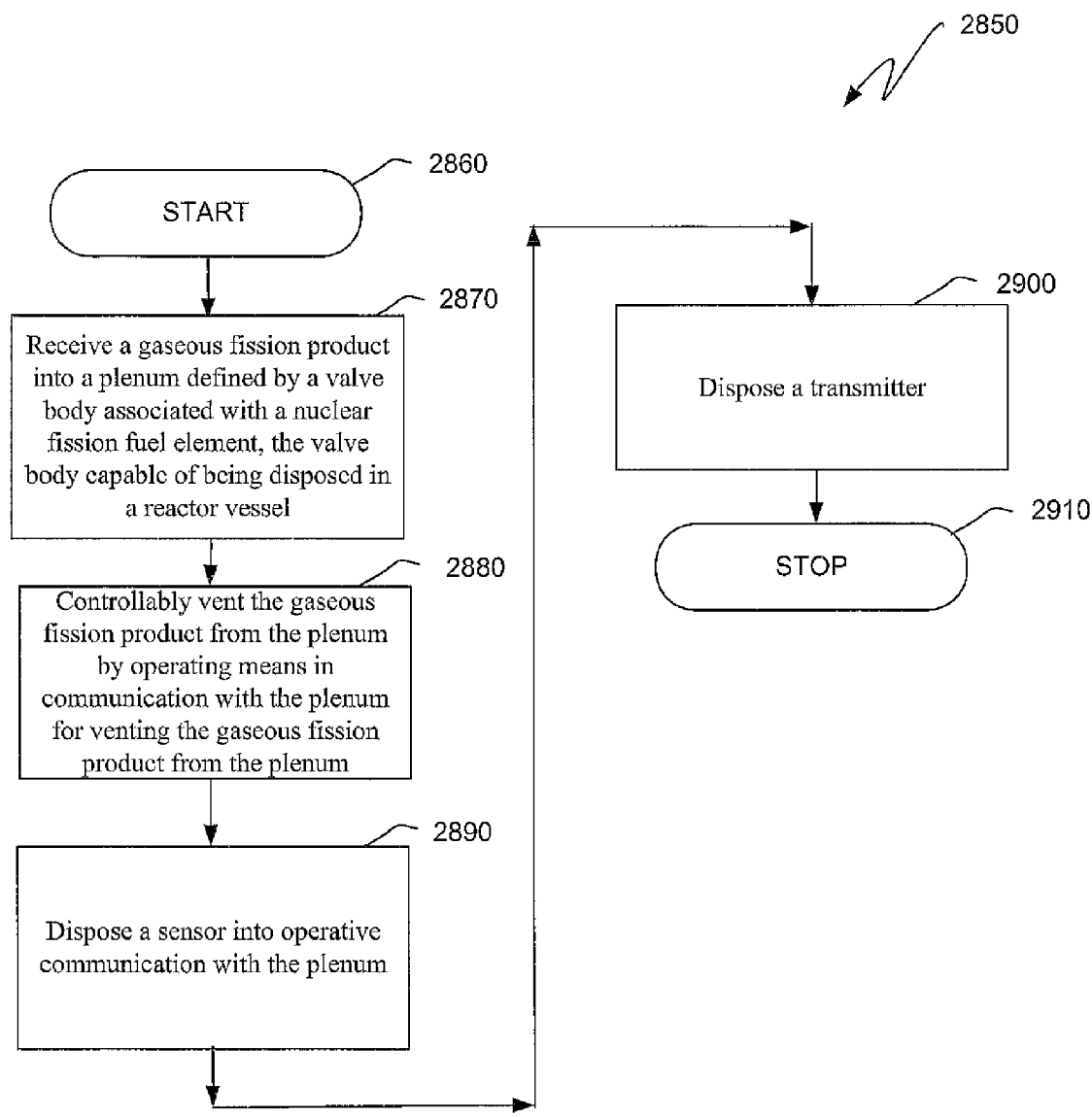

In FIG. 34E, an illustrative method 2850 of operating a nuclear fission reactor starts at a block 2860. At a block 2870, the method comprises receiving a gaseous fission product into a plenum defined by a valve body associated with a nuclear fission fuel element, the valve body capable of being disposed in a reactor vessel. At a block 2880, the gaseous fission product is controllably vented from the plenum by operating means in communication with the plenum for venting the gaseous fission product from the plenum. At a block 2890, a sensor is disposed into operative communication with the plenum. At a block 2900, a transmitter is disposed. The method stops at a block 2910.

Figure 35:
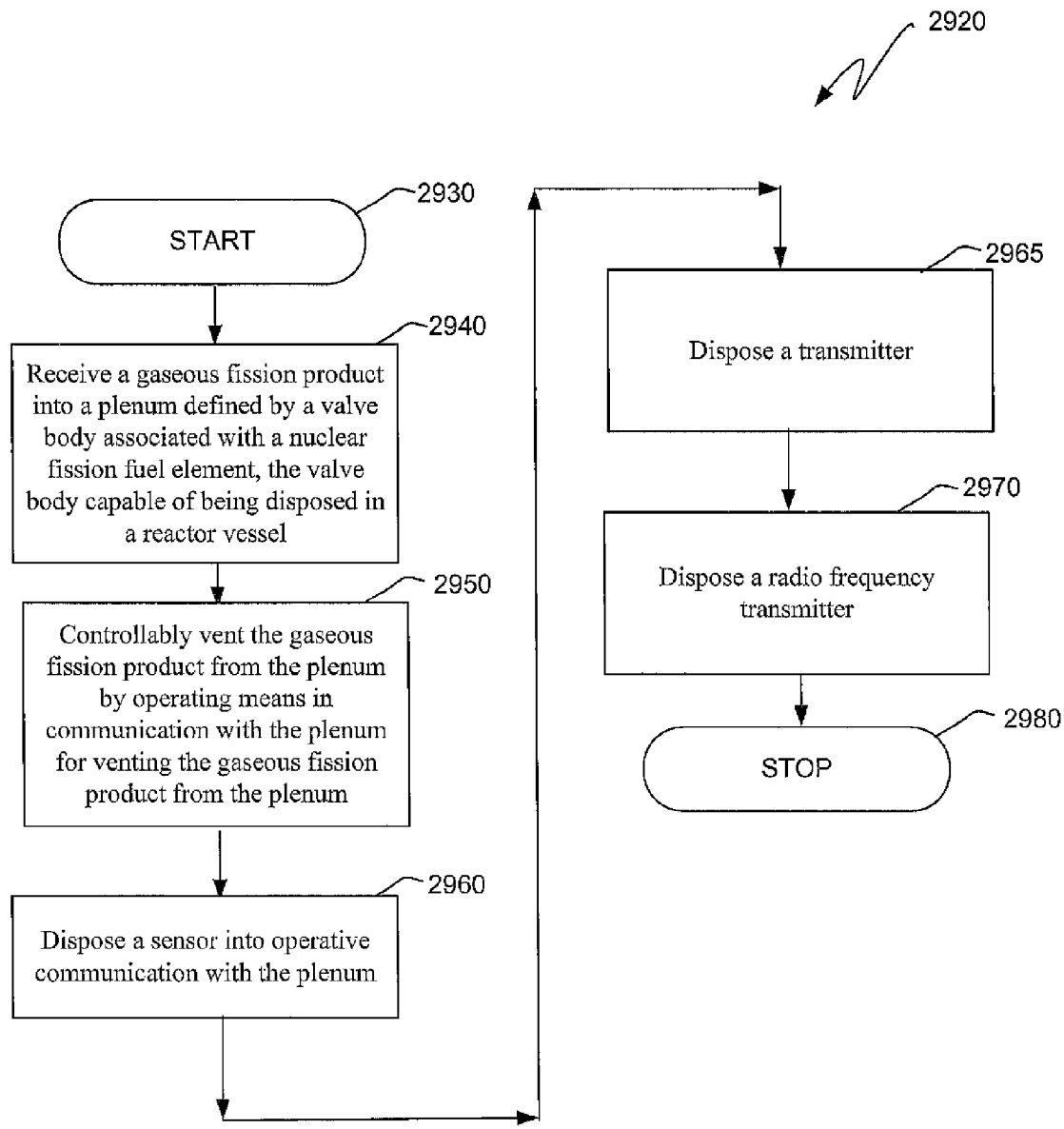

In FIG. 35, an illustrative method 2920 of operating a nuclear fission reactor starts at a block 2930. At a block 2940, the method comprises receiving a gaseous fission product into a plenum defined by a valve body associated with a nuclear fission fuel element, the valve body capable of being disposed in a reactor vessel. At a block 2950, the gaseous fission product is controllably vented from the plenum by operating means in communication with the plenum for venting the gaseous fission product from the plenum. At a block 2960, a sensor is disposed into operative communication with the plenum. At a block 2965, a transmitter is disposed. At a block 2970, a radio frequency transmitter is disposed. The method stops at a block 2980.

Figure 36:
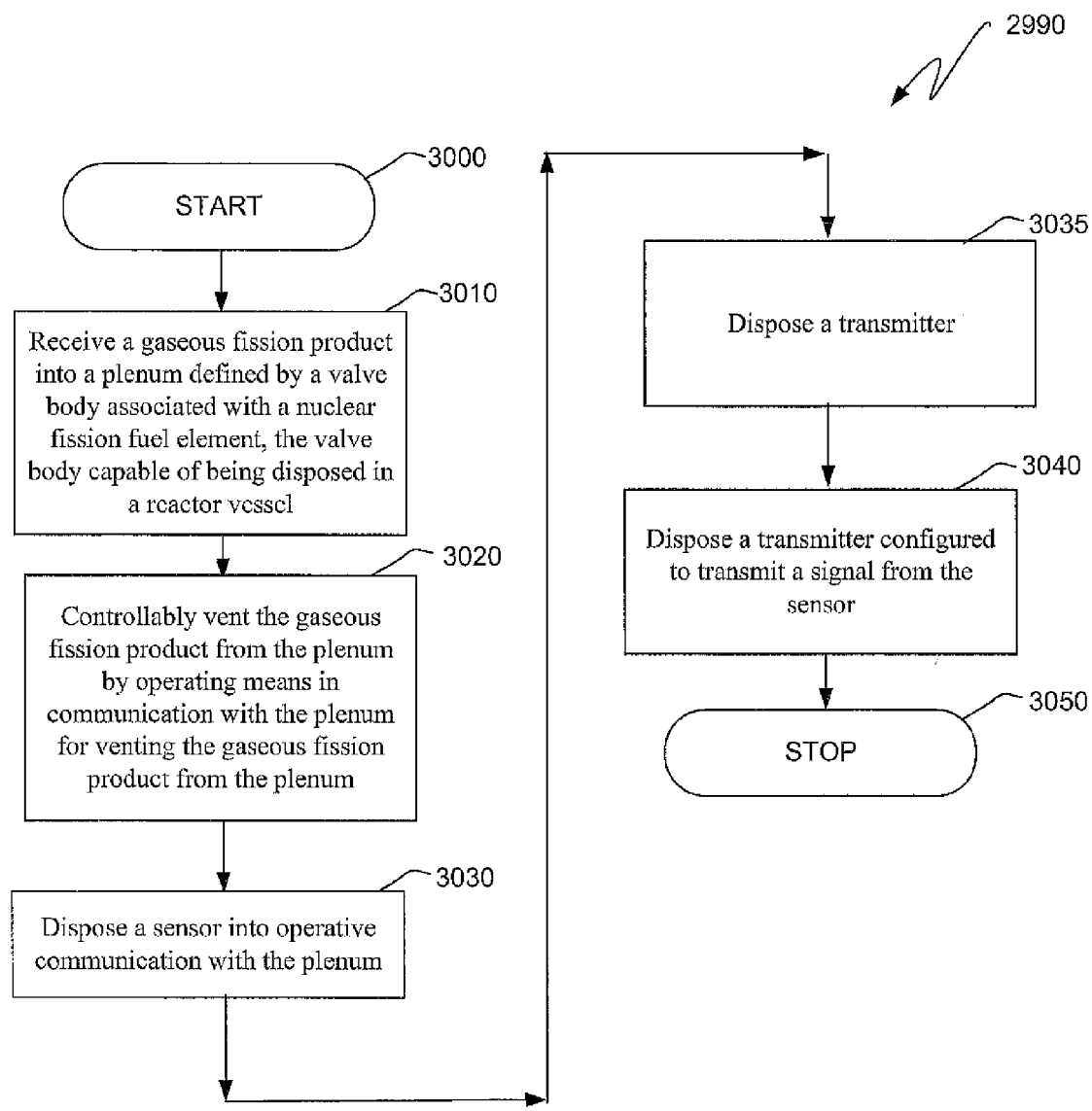

In FIG. 36, an illustrative method 2990 of operating a nuclear fission reactor starts at a block 3000. At a block 3010, the method comprises receiving a gaseous fission product into a plenum defined by a valve body associated with a nuclear fission fuel element, the valve body capable of being disposed in a reactor vessel. At a block 3020, the gaseous fission product is controllably vented from the plenum by operating means in communication with the plenum for venting the gaseous fission product from the plenum. At a block 3030, a sensor is disposed into operative communication with the plenum. At a block 3035, a transmitter is disposed. At a block 3040, a transmitter is disposed that is configured to transmit a signal from the sensor. The method stops at a block 3050.

Figure 37:
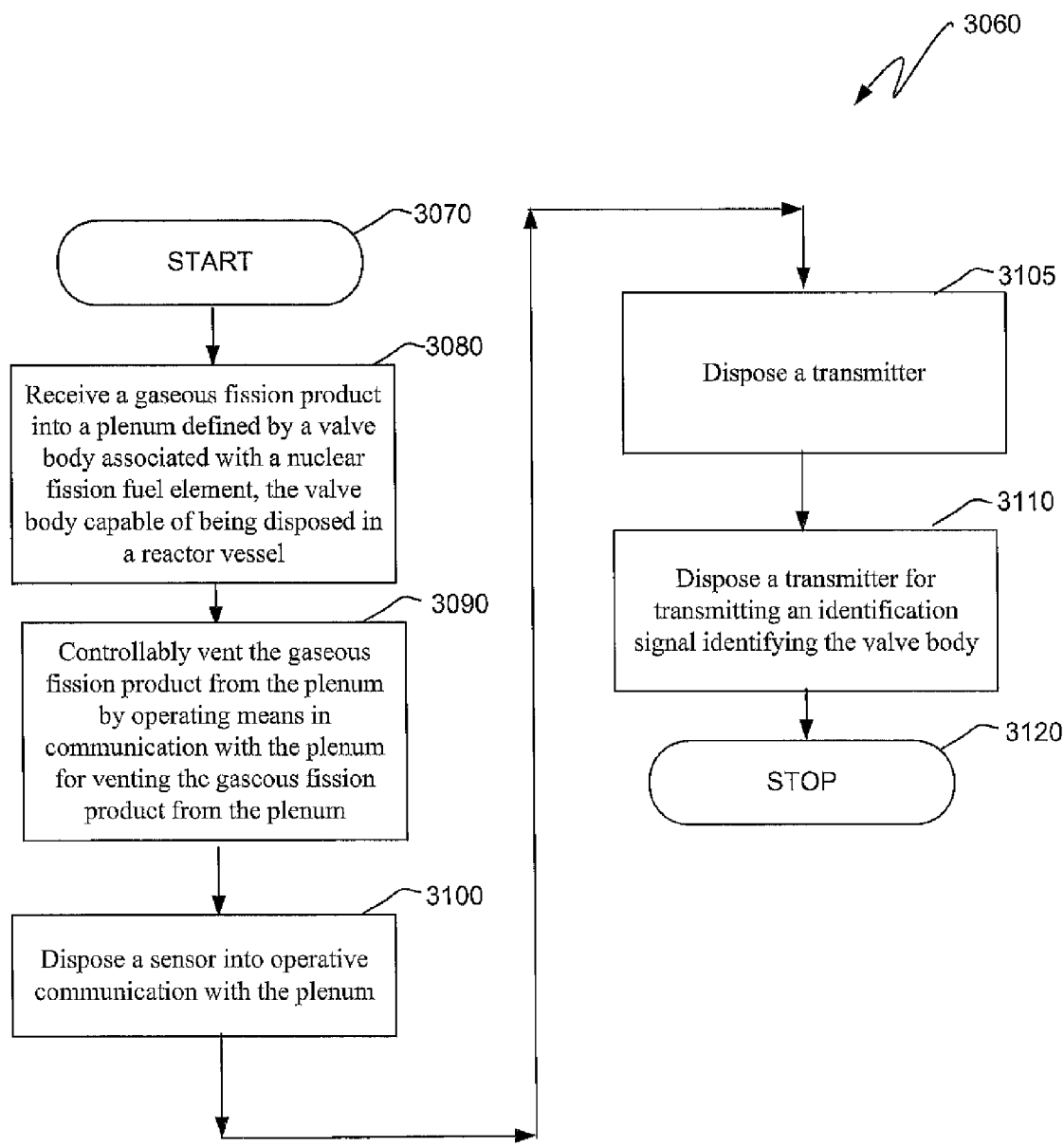

In FIG. 37, an illustrative method 3060 of operating a nuclear fission reactor starts at a block 3070. At a block 3080, the method comprises receiving a gaseous fission product into a plenum defined by a valve body associated with a nuclear fission fuel element, the valve body capable of being disposed in a reactor vessel. At a block 3090, the gaseous fission product is controllably vented from the plenum by operating means in communication with the plenum for venting the gaseous fission product from the plenum. At a block 3100, a sensor is disposed into operative communication with the plenum. At a block 3105, a transmitter is disposed. At a block 3110, a transmitter is disposed for transmitting an identification signal identifying the valve body. The method stops at a block 3120.

Figure 37A:
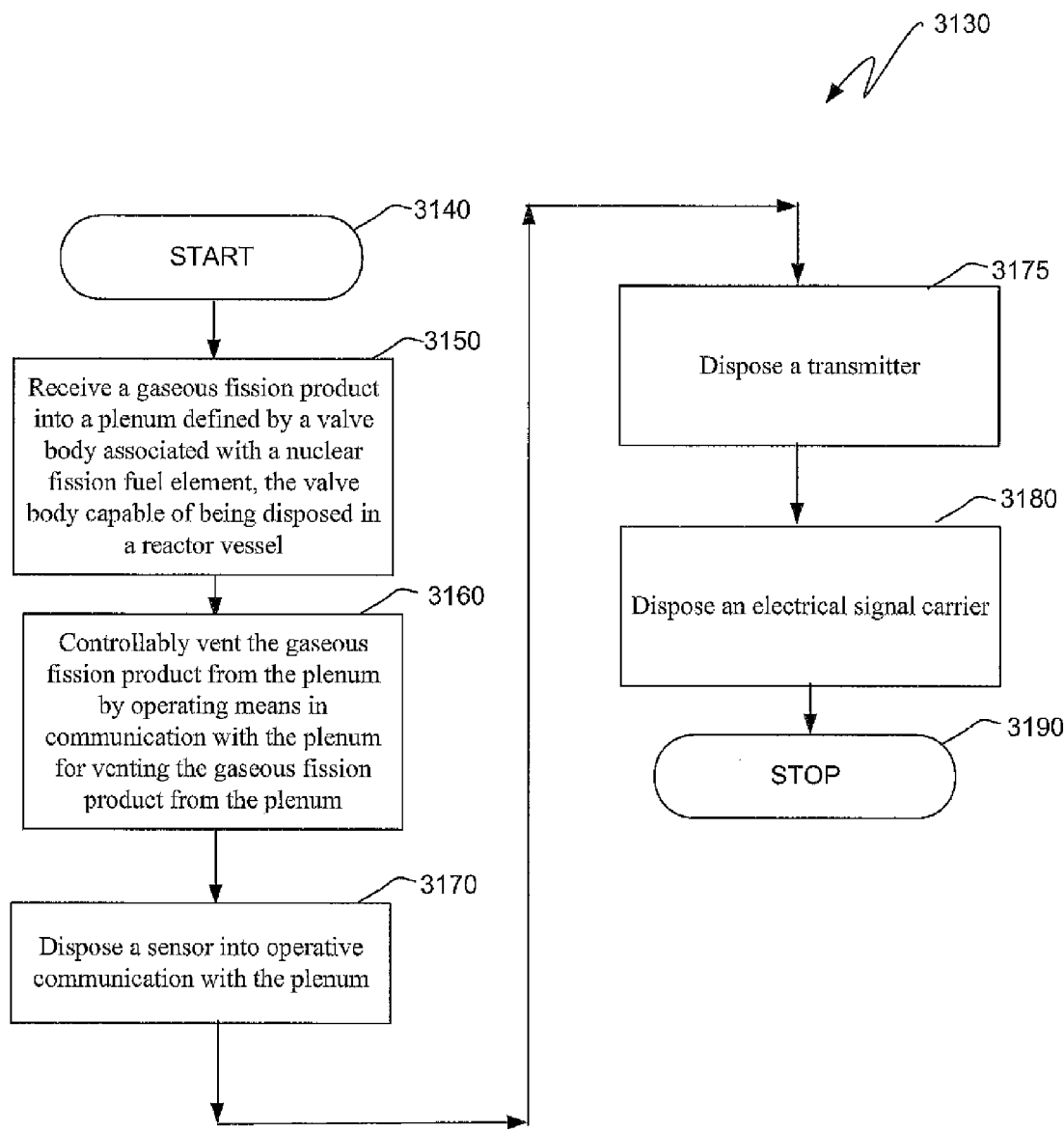

In FIG. 37A, an illustrative method 3130 of operating a nuclear fission reactor starts at a block 3140. At a block 3150, the method comprises receiving a gaseous fission product into a plenum defined by a valve body associated with a nuclear fission fuel element, the valve body capable of being disposed in a reactor vessel. At a block 3160, the gaseous fission product is controllably vented from the plenum by operating means in communication with the plenum for venting the gaseous fission product from the plenum. At a block 3170, a sensor is disposed into operative communication with the plenum. At a block 3175, a transmitter is disposed. At a block 3180, an electrical signal carrier is disposed. The method stops at a block 3190.

Figure 37B:
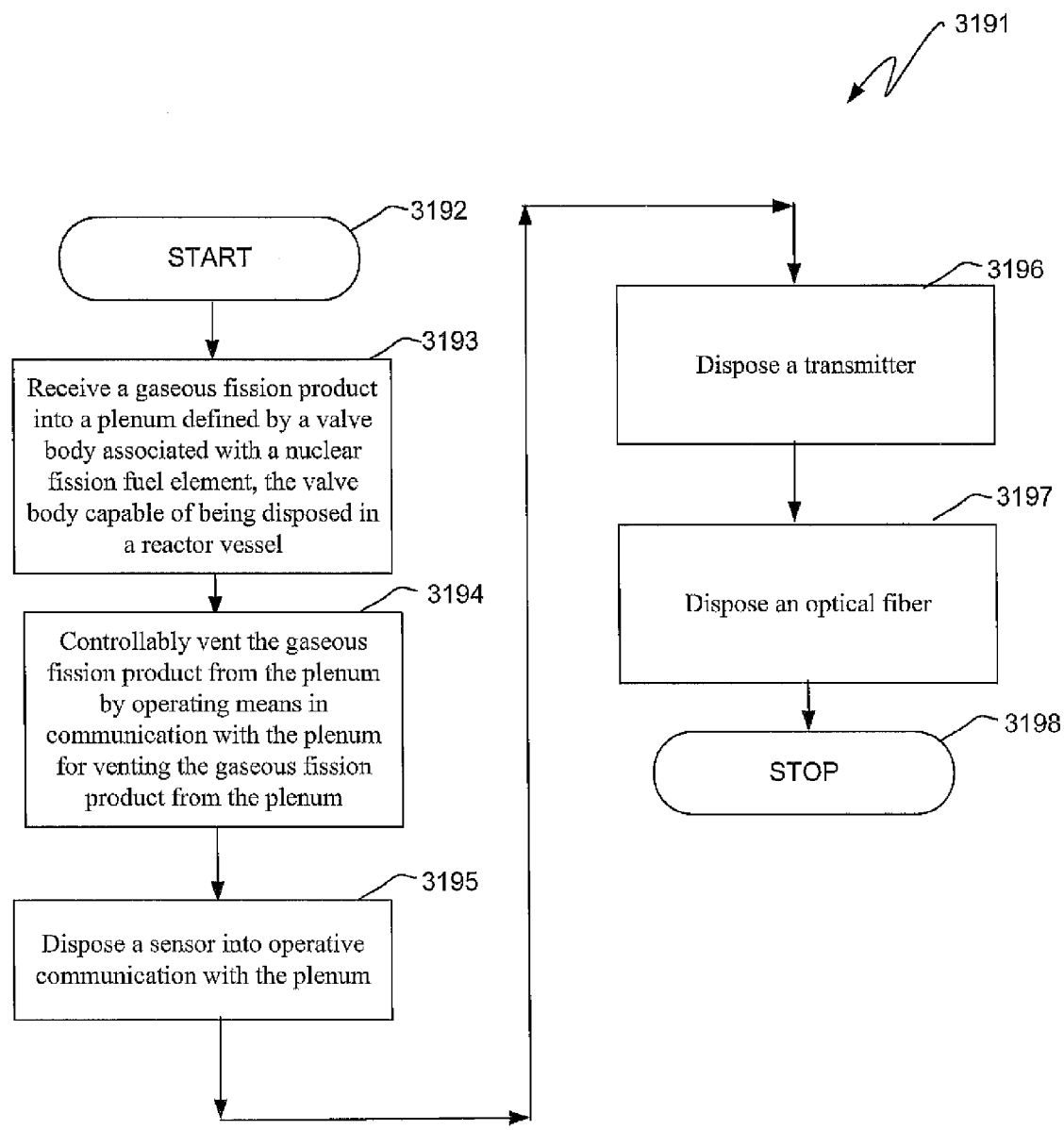

In FIG. 37B, an illustrative method 3191 of operating a nuclear fission reactor starts at a block 3192. At a block 3193, the method comprises receiving a gaseous fission product into a plenum defined by a valve body associated with a nuclear fission fuel element, the valve body capable of being disposed in a reactor vessel. At a block 3194, the gaseous fission product is controllably vented from the plenum by operating means in communication with the plenum for venting the gaseous fission product from the plenum. At a block 3195, a sensor is disposed into operative communication with the plenum. At a block 3196, a transmitter is disposed. At a block 3197, an optical fiber is disposed. The method stops at a block 3198.

Figure 38:
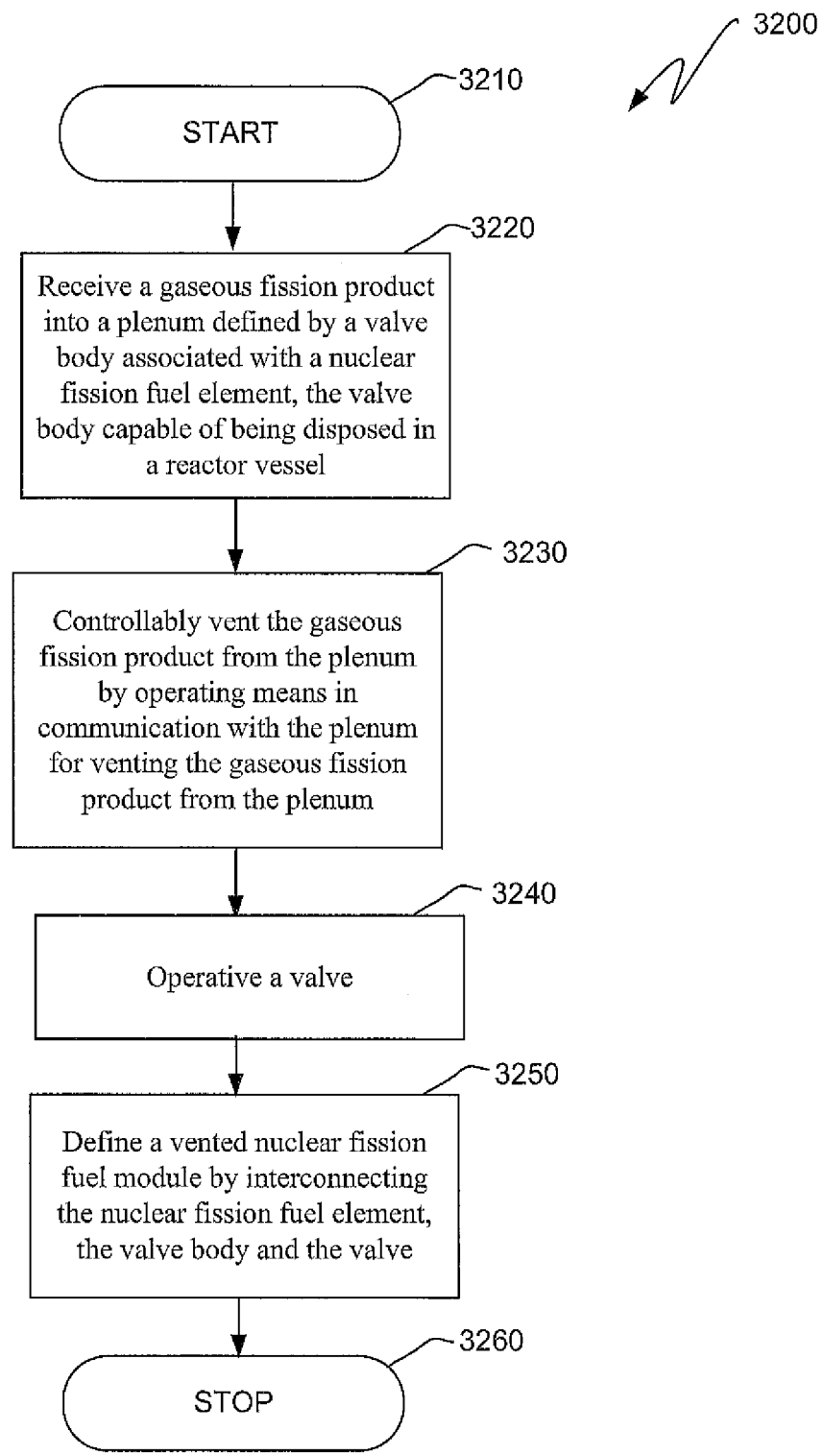

In FIG. 38, an illustrative method 3200 of operating a nuclear fission reactor starts at a block 3210. At a block 3220, the method comprises receiving a gaseous fission product into a plenum defined by a valve body associated with a nuclear fission fuel element, the valve body capable of being disposed in a reactor vessel. At a block 3230, the gaseous fission product is controllably vented from the plenum by operating means in communication with the plenum for venting the gaseous fission product from the plenum. At a block 3240, a valve is operated. At a block 3250, a vented nuclear fission fuel module is defined by interconnecting the nuclear fission fuel element, the valve body and the valve. The method stops at a block 3260.

Figure 39:
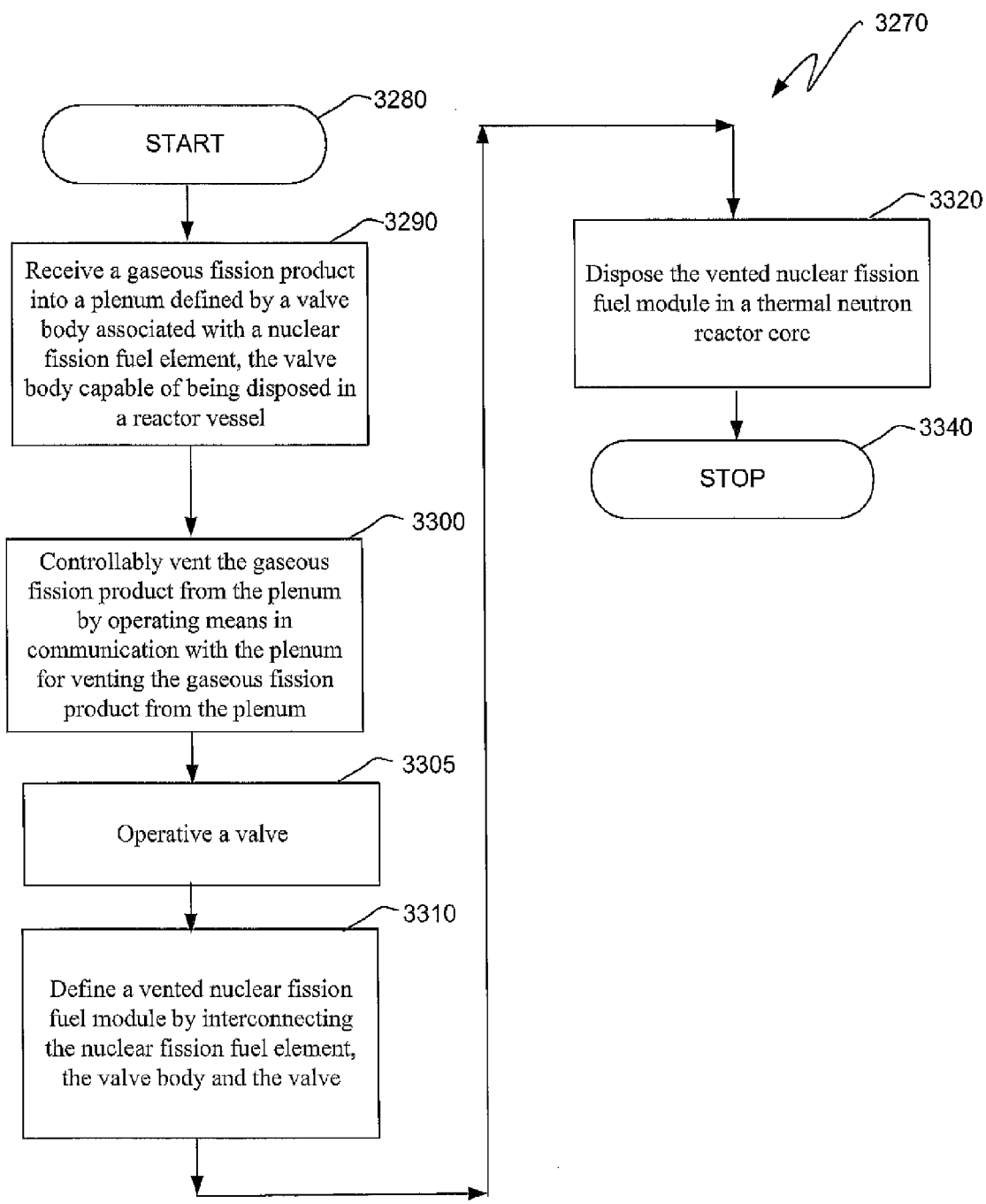

In FIG. 39, an illustrative method 3270 of operating a nuclear fission reactor starts at a block 3280. At a block 3290, the method comprises receiving a gaseous fission product into a plenum defined by a valve body associated with a nuclear fission fuel element, the valve body capable of being disposed in a reactor vessel. At a block 3300, the gaseous fission product is controllably vented from the plenum by operating means in communication with the plenum for venting the gaseous fission product from the plenum. At a block 3305, a valve is operated. At a block 3310, a vented nuclear fission fuel module is defined by interconnecting the nuclear fission fuel element, the valve body and the valve. At a block 3320, the vented nuclear fission fuel module is disposed in a thermal neutron reactor core. The method stops at a block 3340.

Figure 40:
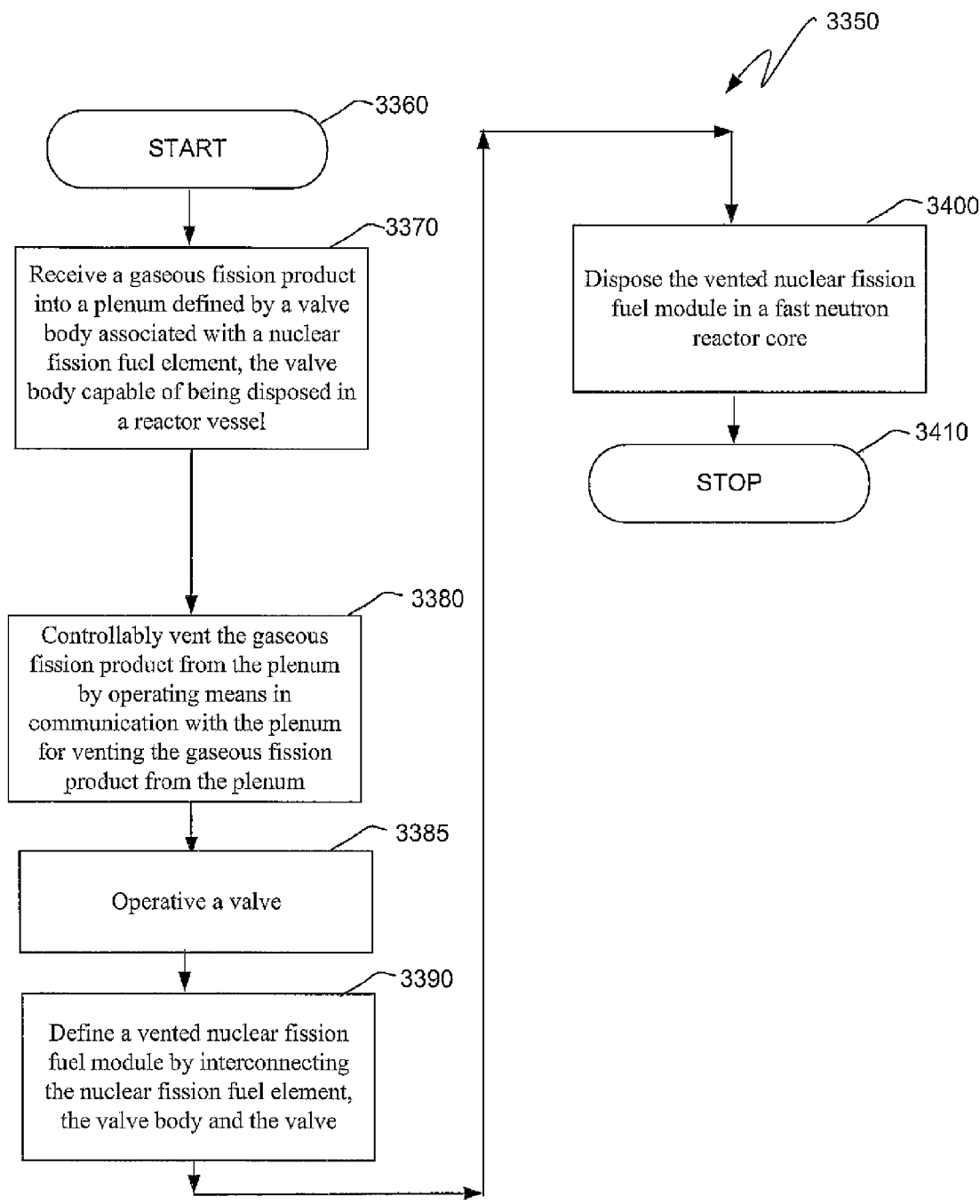

In FIG. 40, an illustrative method 3350 of operating a nuclear fission reactor starts at a block 3360. At a block 3370, the method comprises receiving a gaseous fission product into a plenum defined by a valve body associated with a nuclear fission fuel element, the valve body capable of being disposed in a reactor vessel. At a block 3380, the gaseous fission product is controllably vented from the plenum by operating means in communication with the plenum for venting the gaseous fission product from the plenum. At a block 3385, a valve is operated. At a block 3390, a vented nuclear fission fuel module is defined by interconnecting the nuclear fission fuel element, the valve body and the valve. At a block 3400, the vented nuclear fission fuel module is disposed in a fast neutron reactor core. The method stops at a block 3410.

Figure 41:
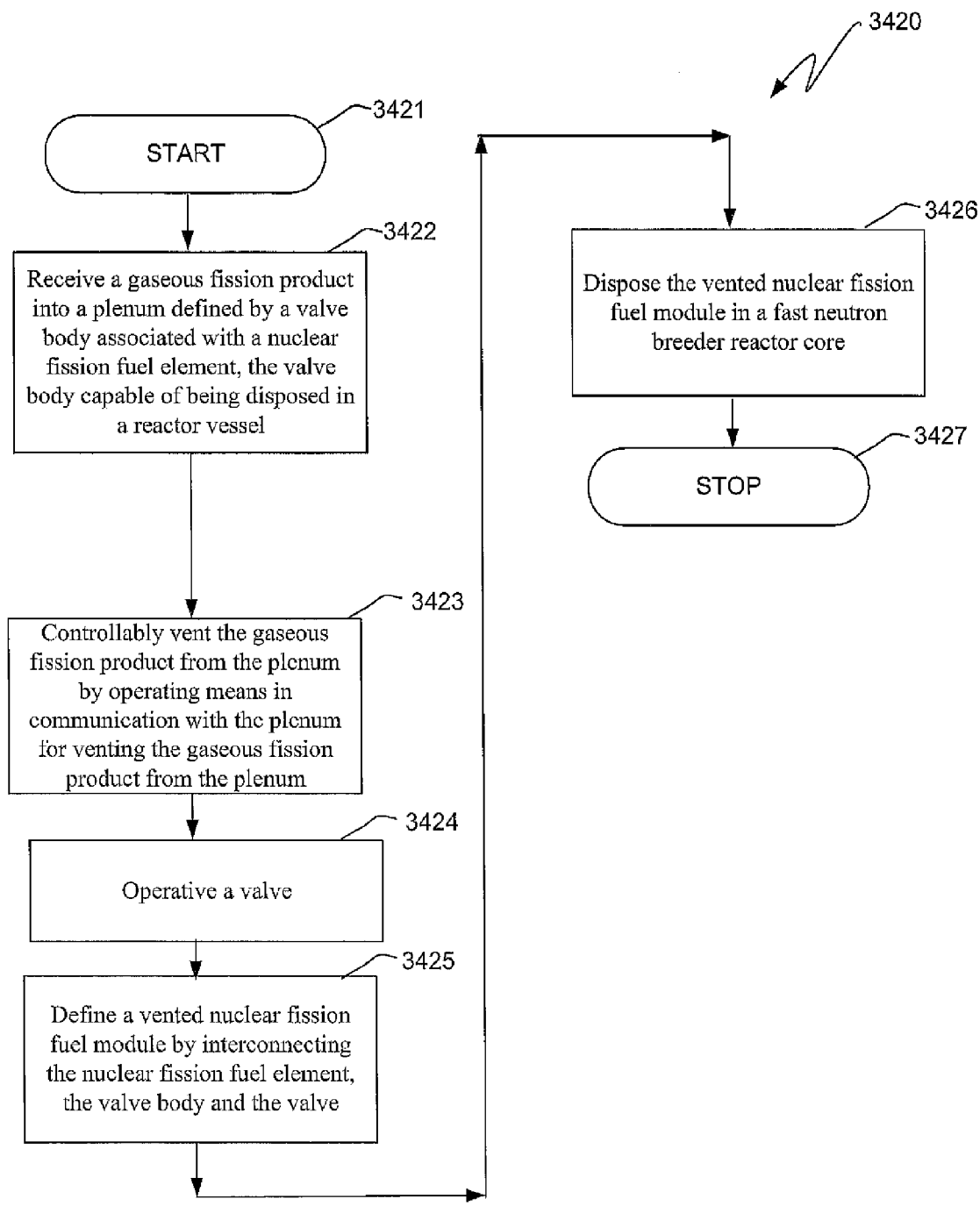

In FIG. 41, an illustrative method 3420 of operating a nuclear fission reactor starts at a block 3421. At a block 3422, the method comprises receiving a gaseous fission product into a plenum defined by a valve body associated with a nuclear fission fuel element, the valve body capable of being disposed in a reactor vessel. At a block 3423, the gaseous fission product is controllably vented from the plenum by operating means in communication with the plenum for venting the gaseous fission product from the plenum. At a block 3424, a valve is operated. At a block 3425, a vented nuclear fission fuel module is defined by interconnecting the nuclear fission fuel element, the valve body and the valve. At a block 3426, the vented nuclear fission fuel module is disposed in a fast neutron breeder reactor core. The method stops at a block 3427.

Figure 42:
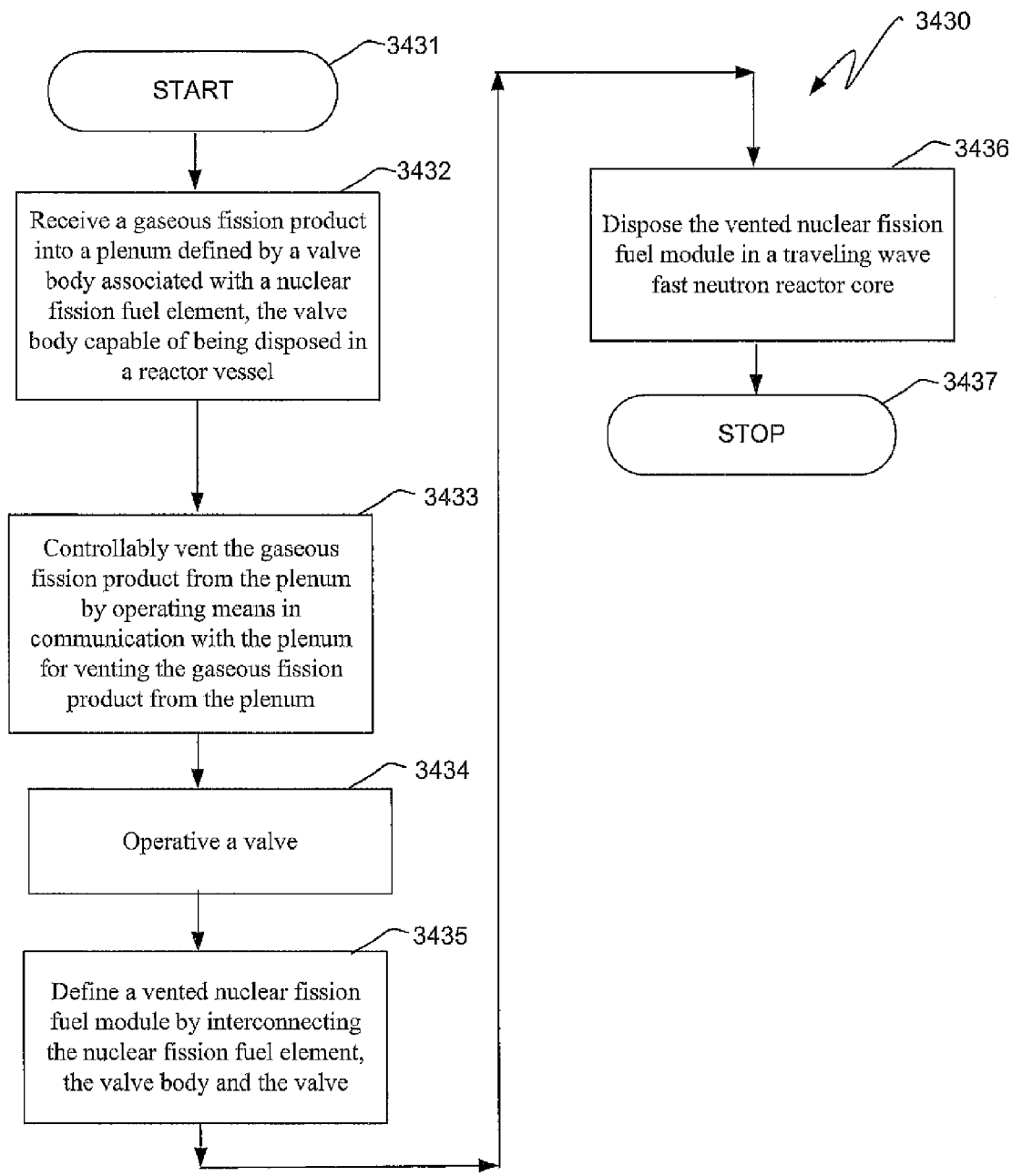

In FIG. 42, an illustrative method 3430 of operating a nuclear fission reactor starts at a block 3431. At a block 3432, the method comprises receiving a gaseous fission product into a plenum defined by a valve body associated with a nuclear fission fuel element, the valve body capable of being disposed in a reactor vessel. At a block 3433, the gaseous fission product is controllably vented from the plenum by operating means in communication with the plenum for venting the gaseous fission product from the plenum. At a block 3434, a valve is operated. At a block 3435, a vented nuclear fission fuel module is defined by interconnecting the nuclear fission fuel element, the valve body and the valve. At a block 3436, the vented nuclear fission fuel module is disposed in a traveling wave fast neutron reactor core. The method stops at a block 3437.

Figure 43:
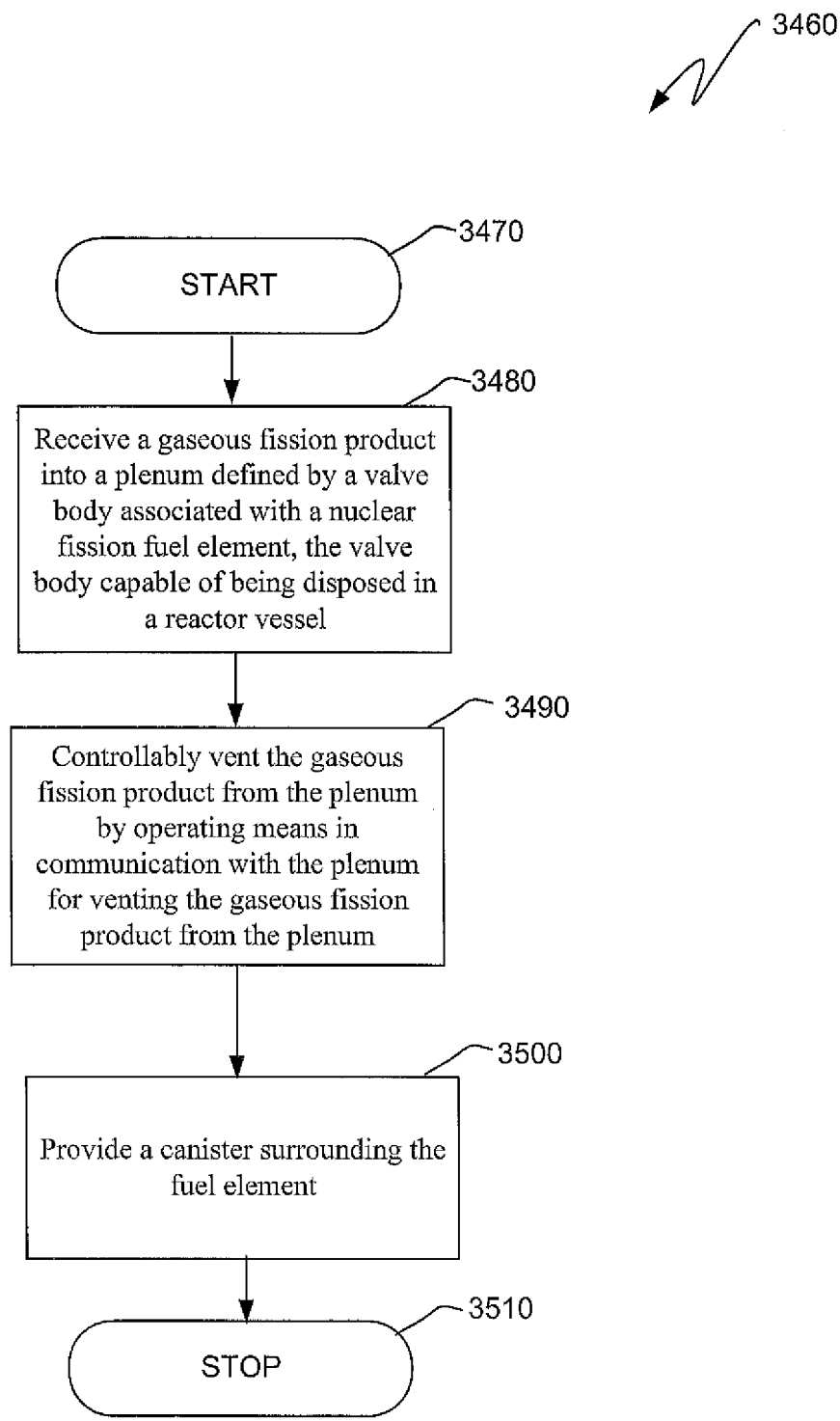

In FIG. 43, an illustrative method 3460 of operating a nuclear fission reactor starts at a block 3470. At a block 3480, the method comprises receiving a gaseous fission product into a plenum defined by a valve body associated with a nuclear fission fuel element, the valve body capable of being disposed in a reactor vessel. At a block 3490, the gaseous fission product is controllably vented from the plenum by operating means in communication with the plenum for venting the gaseous fission product from the plenum. At a block 3500, a canister surrounding the fuel element is provided. The method stops at a block 3510.

Figure 44:
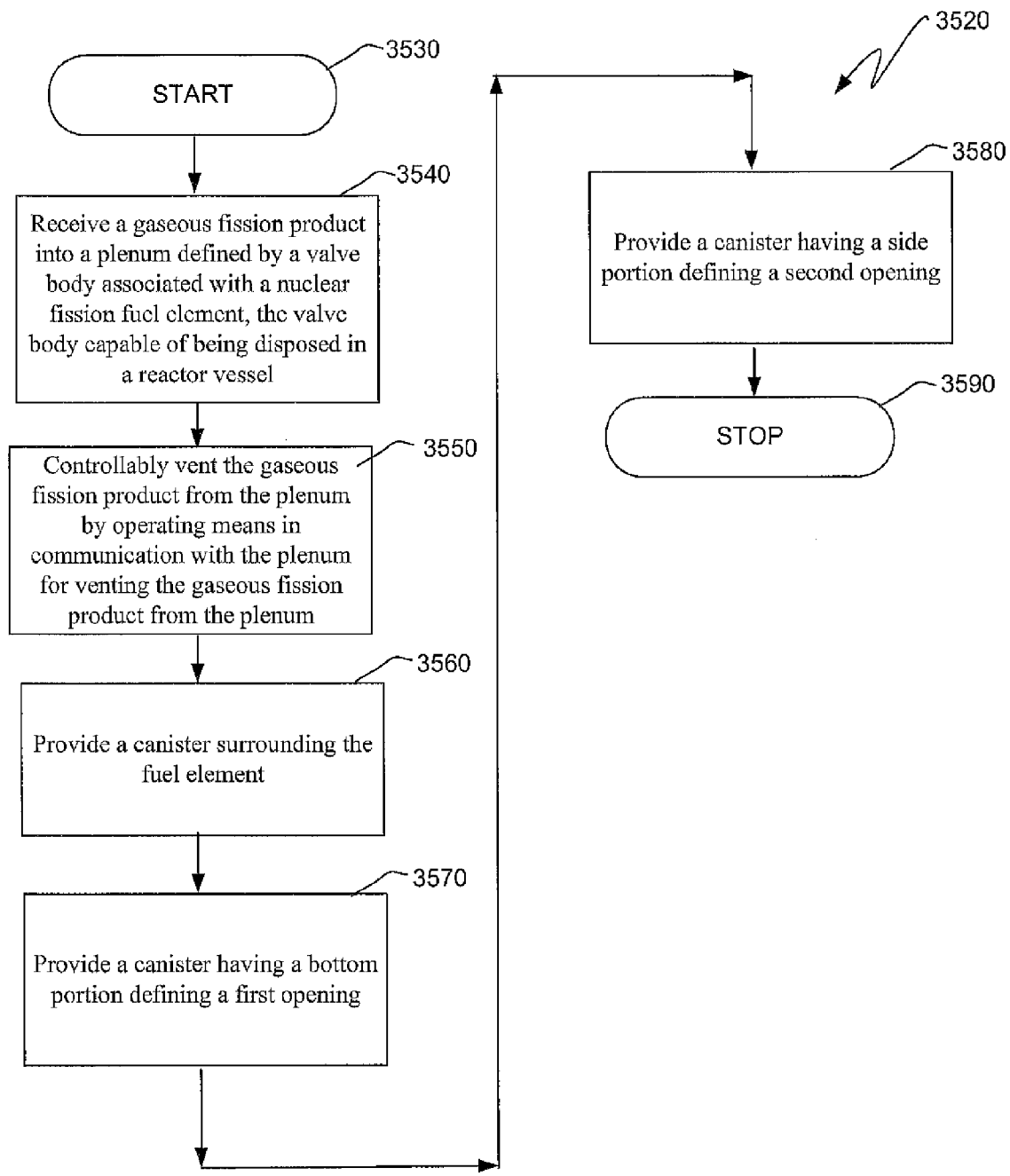

In FIG. 44, an illustrative method 3520 of operating a nuclear fission reactor starts at a block 3530. At a block 3540, the method comprises receiving a gaseous fission product into a plenum defined by a valve body associated with a nuclear fission fuel element, the valve body capable of being disposed in a reactor vessel. At a block 3550, the gaseous fission product is controllably vented from the plenum by operating means in communication with the plenum for venting the gaseous fission product from the plenum. At a block 3560, a canister surrounding the fuel element is provided. At a block 3570 a canister having a bottom portion defining a first opening is provided. At a block 3580, a canister having a side portion defining a second opening is provided. The method stops at a block 3590.

Figure 44A:
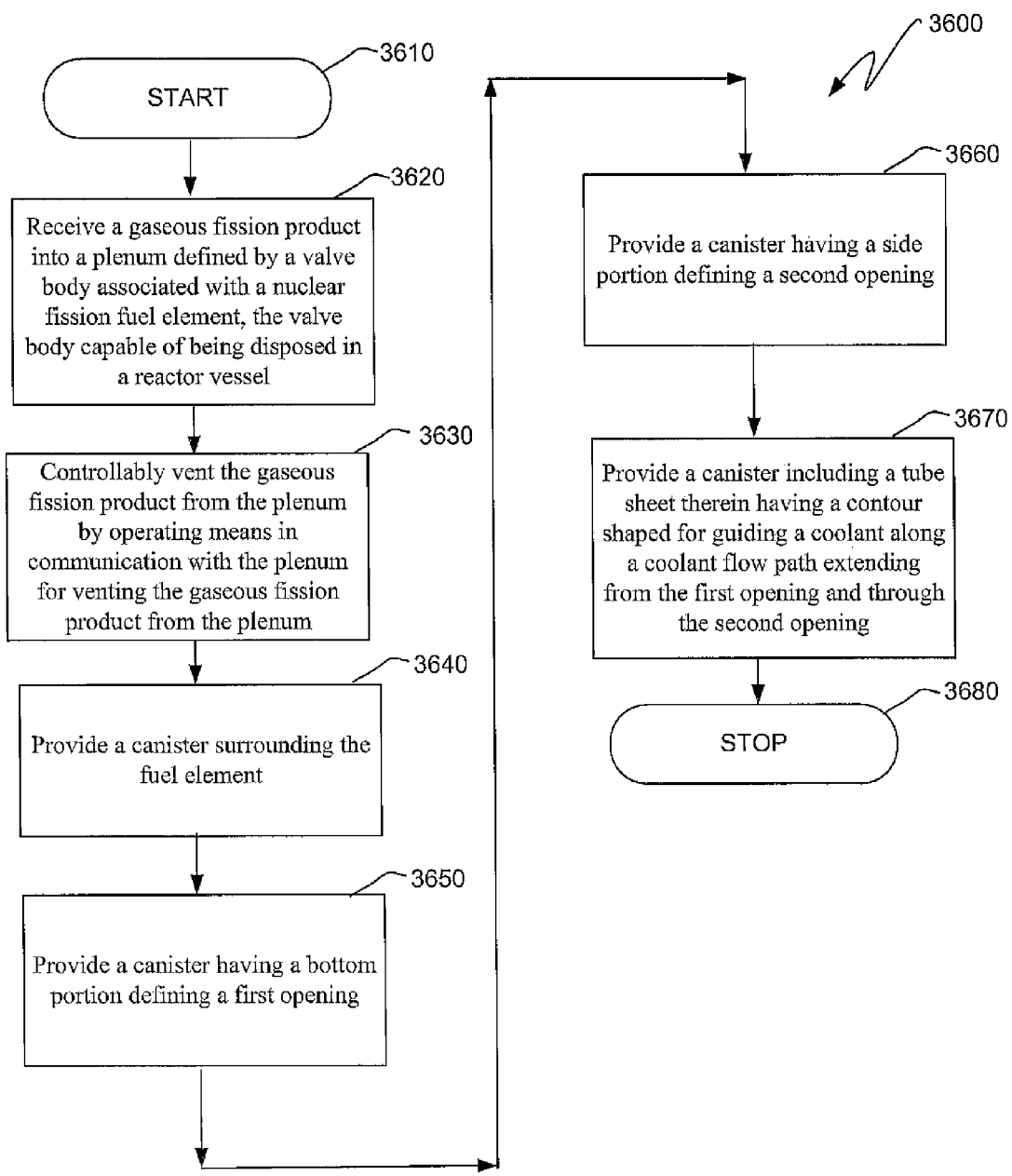

In FIG. 44A, an illustrative method 3600 of operating a nuclear fission reactor starts at a block 3610. At a block 3620, the method comprises receiving a gaseous fission product into a plenum defined by a valve body associated with a nuclear fission fuel element, the valve body capable of being disposed in a reactor vessel. At a block 3630, the gaseous fission product is controllably vented from the plenum by operating means in communication with the plenum for venting the gaseous fission product from the plenum. At a block 3640, a canister surrounding the fuel element is provided. At a block 3650 a canister having a bottom portion defining a first opening is provided. At a block 3660, a canister having a side portion defining a second opening is provided. At a block 3670, a canister is provided including a tube sheet therein having a contour shaped for guiding a coolant along a coolant flow path extending from the first opening and through the second opening. The method stops at a block 3680.

Figure 44B:
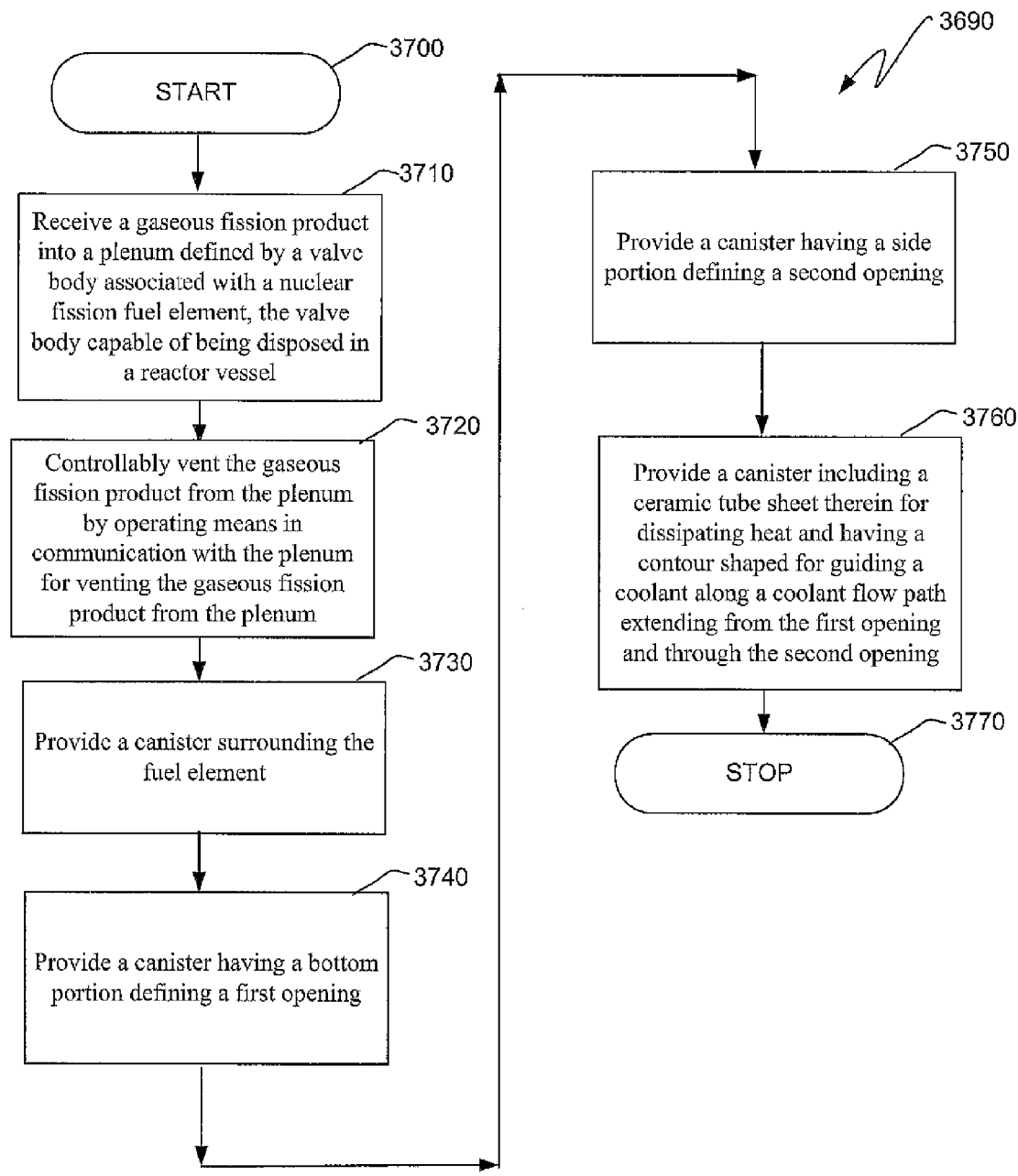

In FIG. 44B, an illustrative method 3690 of operating a nuclear fission reactor starts at a block 3700. At a block 3710, the method comprises receiving a gaseous fission product into a plenum defined by a valve body associated with a nuclear fission fuel element, the valve body capable of being disposed in a reactor vessel. At a block 3720, the gaseous fission product is controllably vented from the plenum by operating means in communication with the plenum for venting the gaseous fission product from the plenum. At a block 3730, a canister surrounding the fuel element is provided. At a block 3740, a canister having a bottom portion defining a first opening is provided. At a block 3750, a canister having a side portion defining a second opening is provided. At a block 3760, a canister is provided including a ceramic tube sheet therein for dissipating heat and having a contour shaped for guiding a coolant along a coolant flow path extending from the first opening and through the second opening. The method stops at a block 3770.

Figure 45:
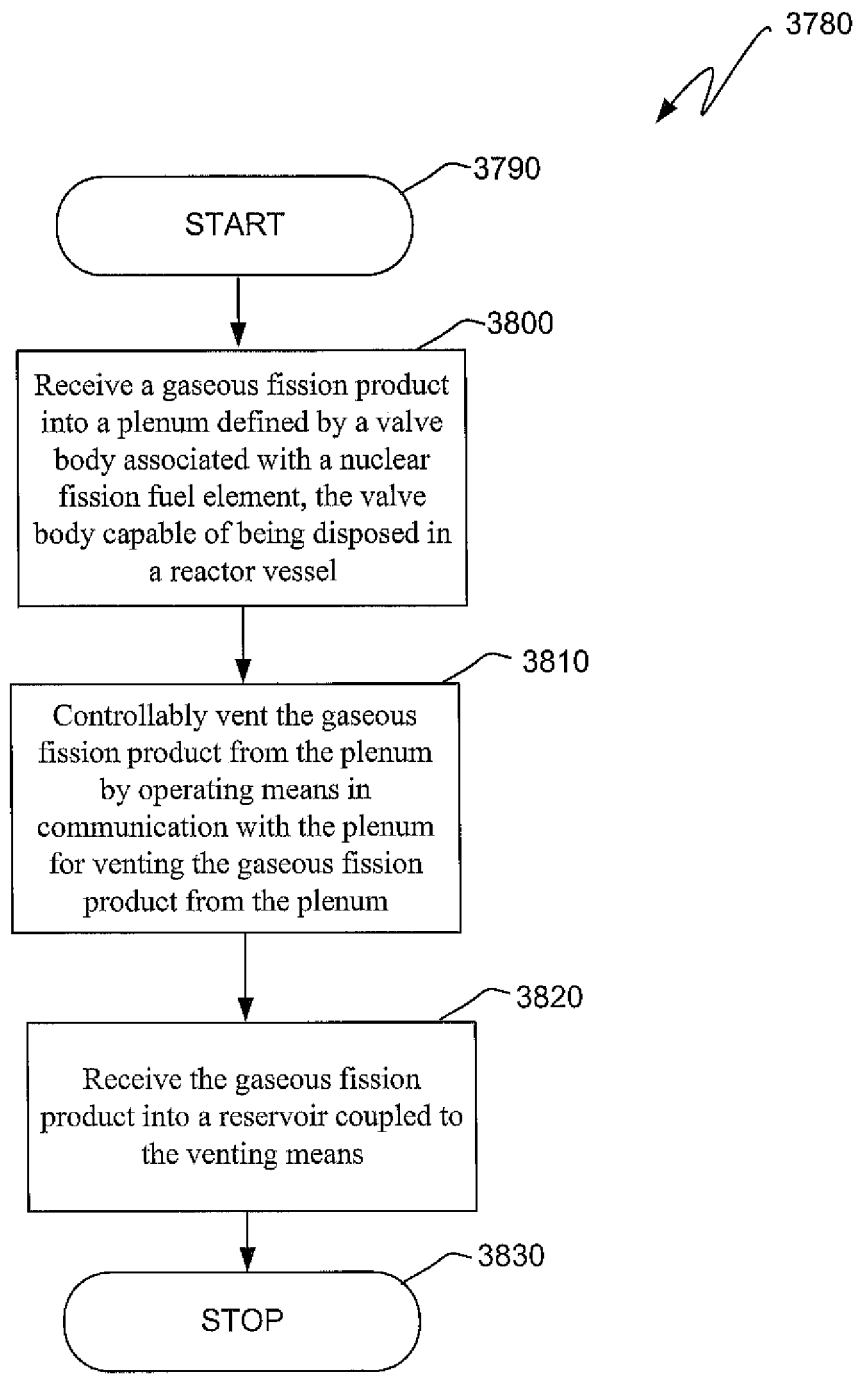

In FIG. 45, an illustrative method 3780 of operating a nuclear fission reactor starts at a block 3790. At a block 3800, the method comprises receiving a gaseous fission product into a plenum defined by a valve body associated with a nuclear fission fuel element, the valve body capable of being disposed in a reactor vessel. At a block 3810, the gaseous fission product is controllably vented from the plenum by operating means in communication with the plenum for venting the gaseous fission product from the plenum. At a block 3820, the gaseous fission product is received into a reservoir coupled to the venting means. The method stops at a block 3830.

Figure 46:
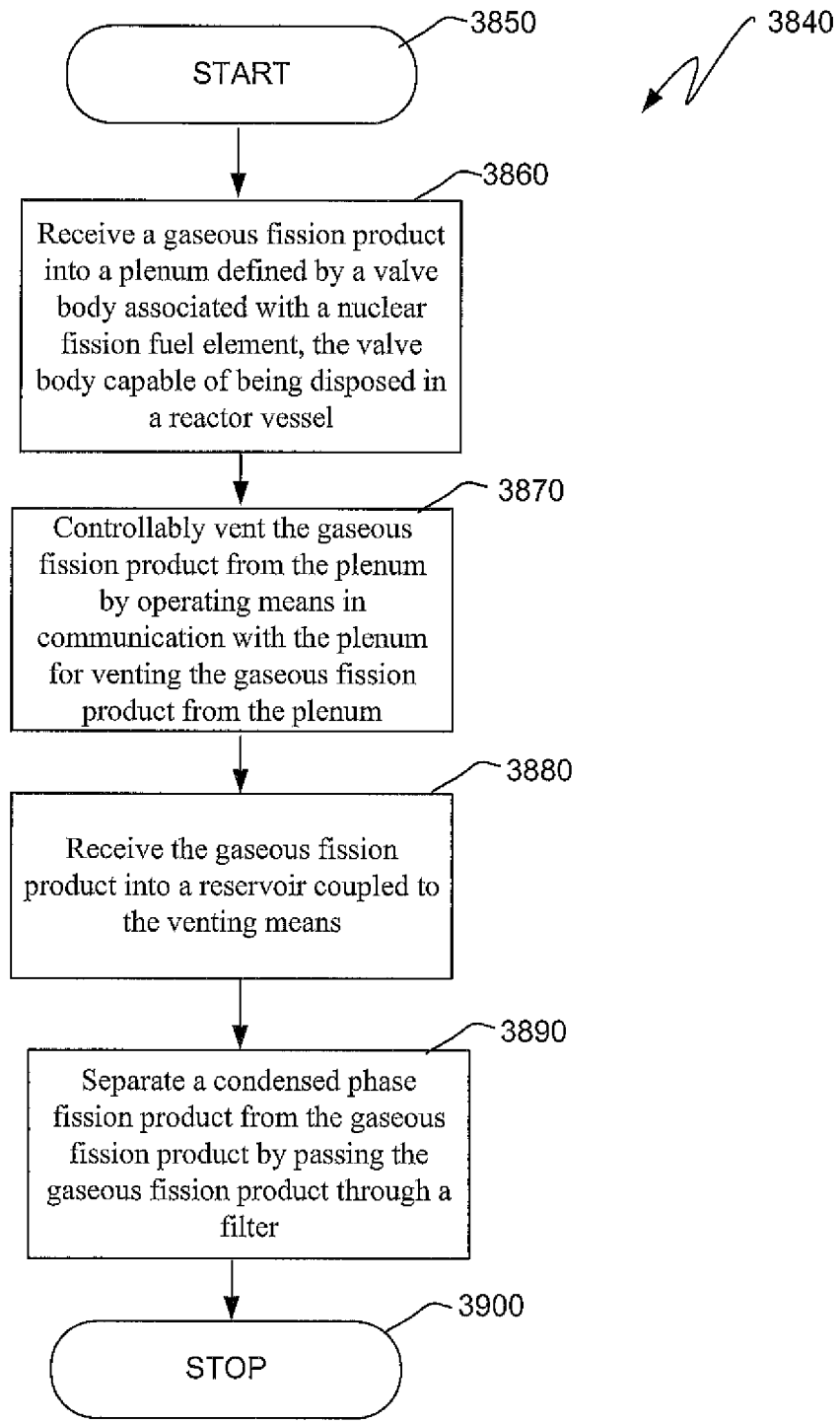

In FIG. 46, an illustrative method 3840 of operating a nuclear fission reactor starts at a block 3850. At a block 3860, the method comprises receiving a gaseous fission product into a plenum defined by a valve body associated with a nuclear fission fuel element, the valve body capable of being disposed in a reactor vessel. At a block 3870, the gaseous fission product is controllably vented from the plenum by operating means in communication with the plenum for venting the gaseous fission product from the plenum. At a block 3880, the gaseous fission product is received into a reservoir coupled to the venting means. At a block 3890, a condensed phase fission product is separated from the gaseous fission product by passing the gaseous fission product through a filter. The method stops at a block 3900.

Figure 46A:
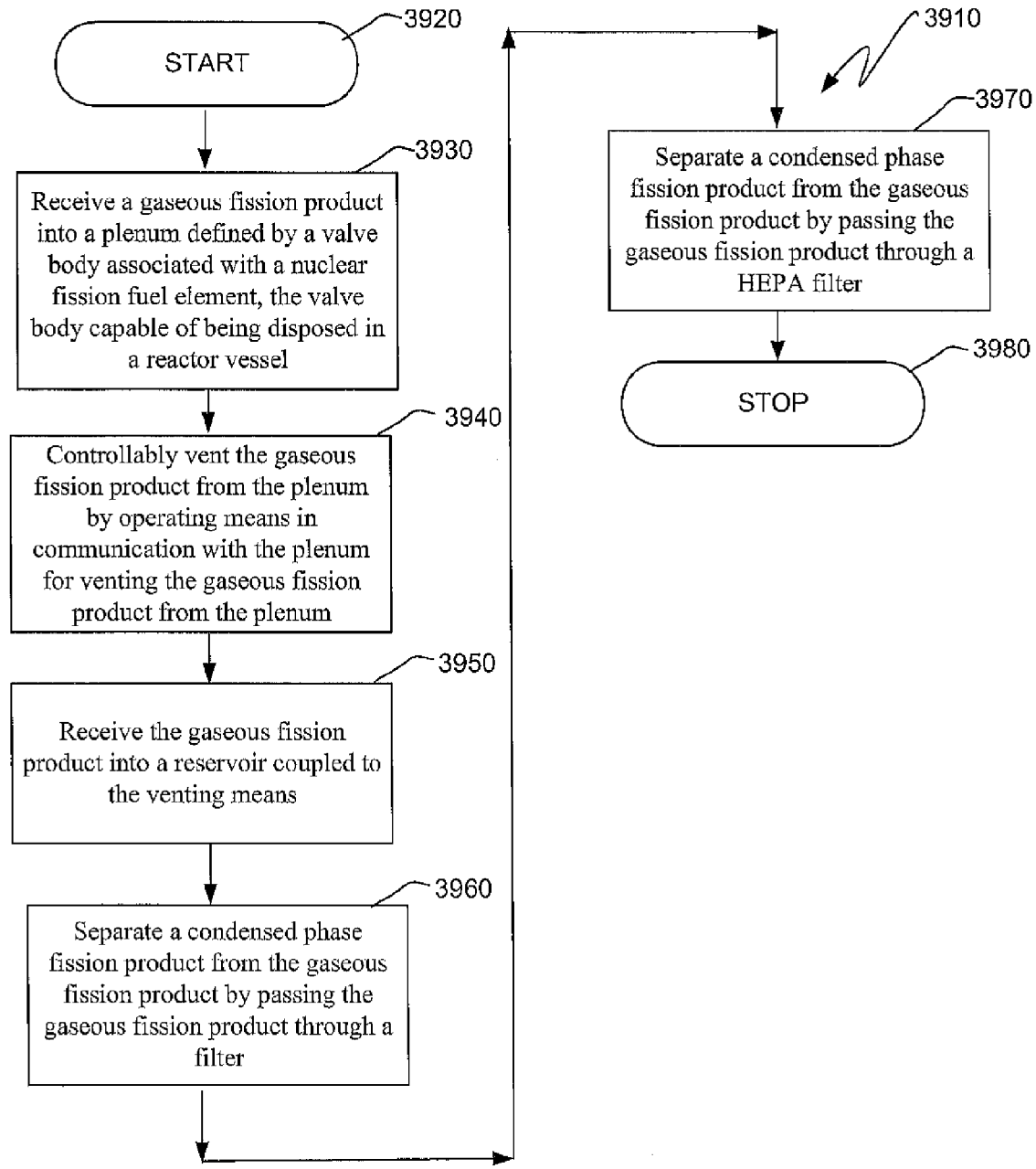

In FIG. 46A, an illustrative method 3910 of operating a nuclear fission reactor starts at a block 3920. At a block 3930, the method comprises receiving a gaseous fission product into a plenum defined by a valve body associated with a nuclear fission fuel element, the valve body capable of being disposed in a reactor vessel. At a block 3940, the gaseous fission product is controllably vented from the plenum by operating means in communication with the plenum for venting the gaseous fission product from the plenum. At a block 3950, the gaseous fission product is received into a reservoir coupled to the venting means. At a block 3960, a condensed phase fission product is separated from the gaseous fission product by passing the gaseous fission product through a filter. At a block 3970, a condensed phase fission product is separated from the gaseous fission product by passing the gaseous fission product through a HEPA filter. The method stops at a block 3980.

Figure 46B:
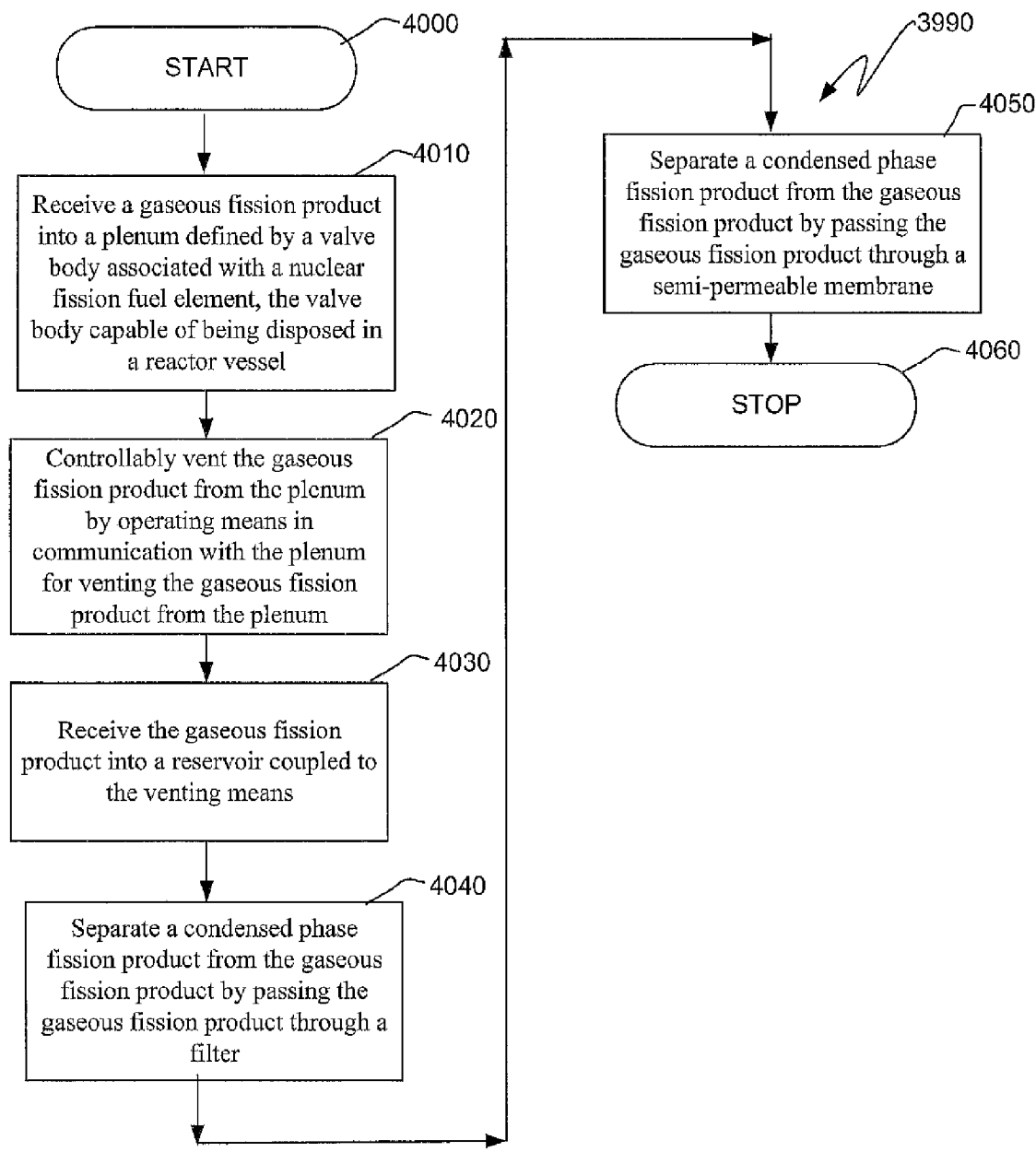

In FIG. 46B, an illustrative method 3990 of operating a nuclear fission reactor starts at a block 4000. At a block 4010, the method comprises receiving a gaseous fission product into a plenum defined by a valve body associated with a nuclear fission fuel element, the valve body capable of being disposed in a reactor vessel. At a block 4020, the gaseous fission product is controllably vented from the plenum by operating means in communication with the plenum for venting the gaseous fission product from the plenum. At a block 4030, the gaseous fission product is received into a reservoir coupled to the venting means. At a block 4040, a condensed phase fission product is separated from the gaseous fission product by passing the gaseous fission product through a filter. At a block 4050, a condensed phase fission product is separated from the gaseous fission product by passing the gaseous fission product through a semi-permeable membrane. The method stops at a block 4060.

Figure 46C:
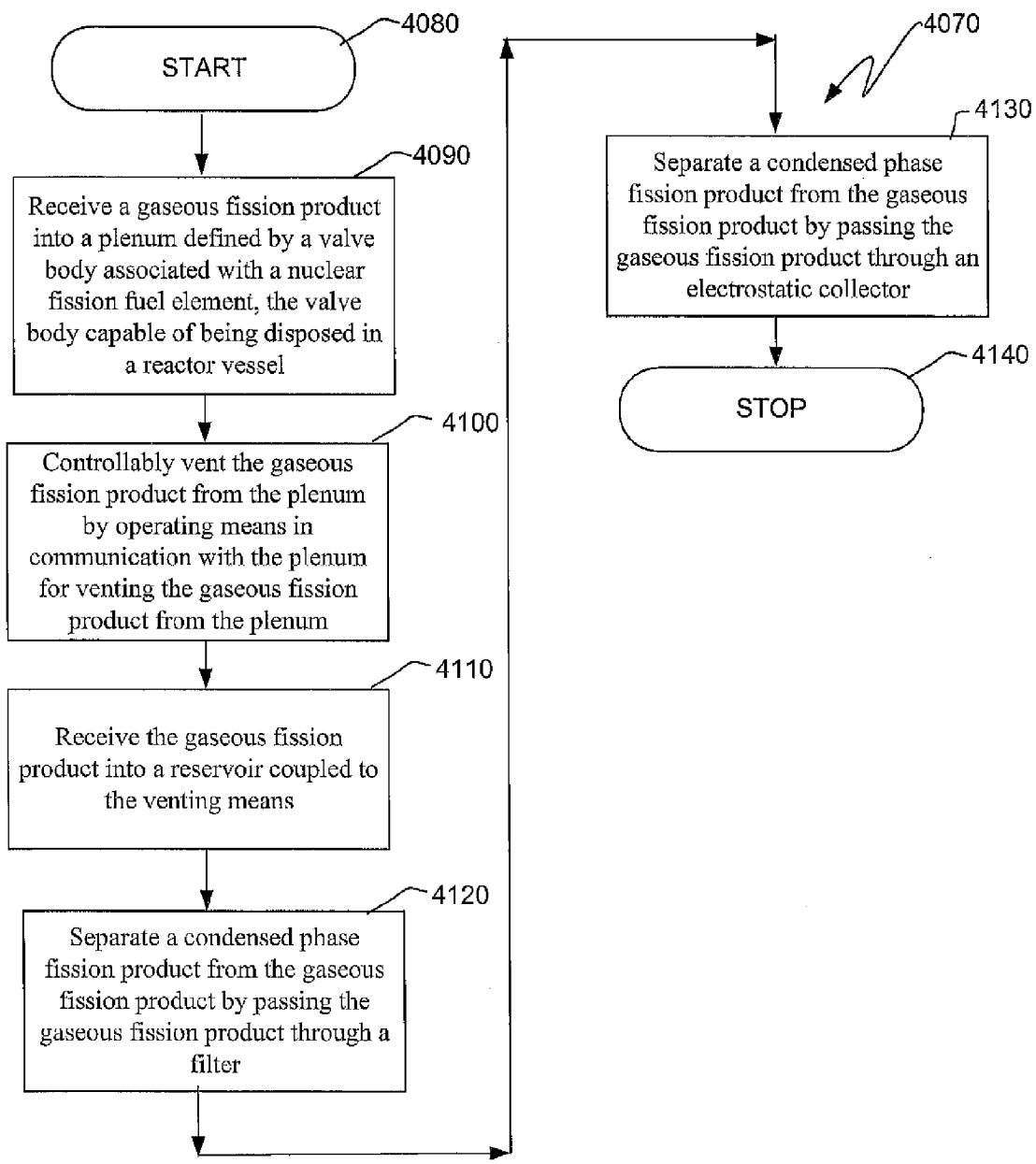

In FIG. 46C, an illustrative method 4070 of operating a nuclear fission reactor starts at a block 4080. At a block 4090, the method comprises receiving a gaseous fission product into a plenum defined by a valve body associated with a nuclear fission fuel element, the valve body capable of being disposed in a reactor vessel. At a block 4100, the gaseous fission product is controllably vented from the plenum by operating means in communication with the plenum for venting the gaseous fission product from the plenum. At a block 4110, the gaseous fission product is received into a reservoir coupled to the venting means. At a block 4120, a condensed phase fission product is separated from the gaseous fission product by passing the gaseous fission product through a filter. At a block 4130, a condensed phase fission product is separated from the gaseous fission product by passing the gaseous fission product through an electrostatic collector. The method stops at a block 4140.

Figure 46D:
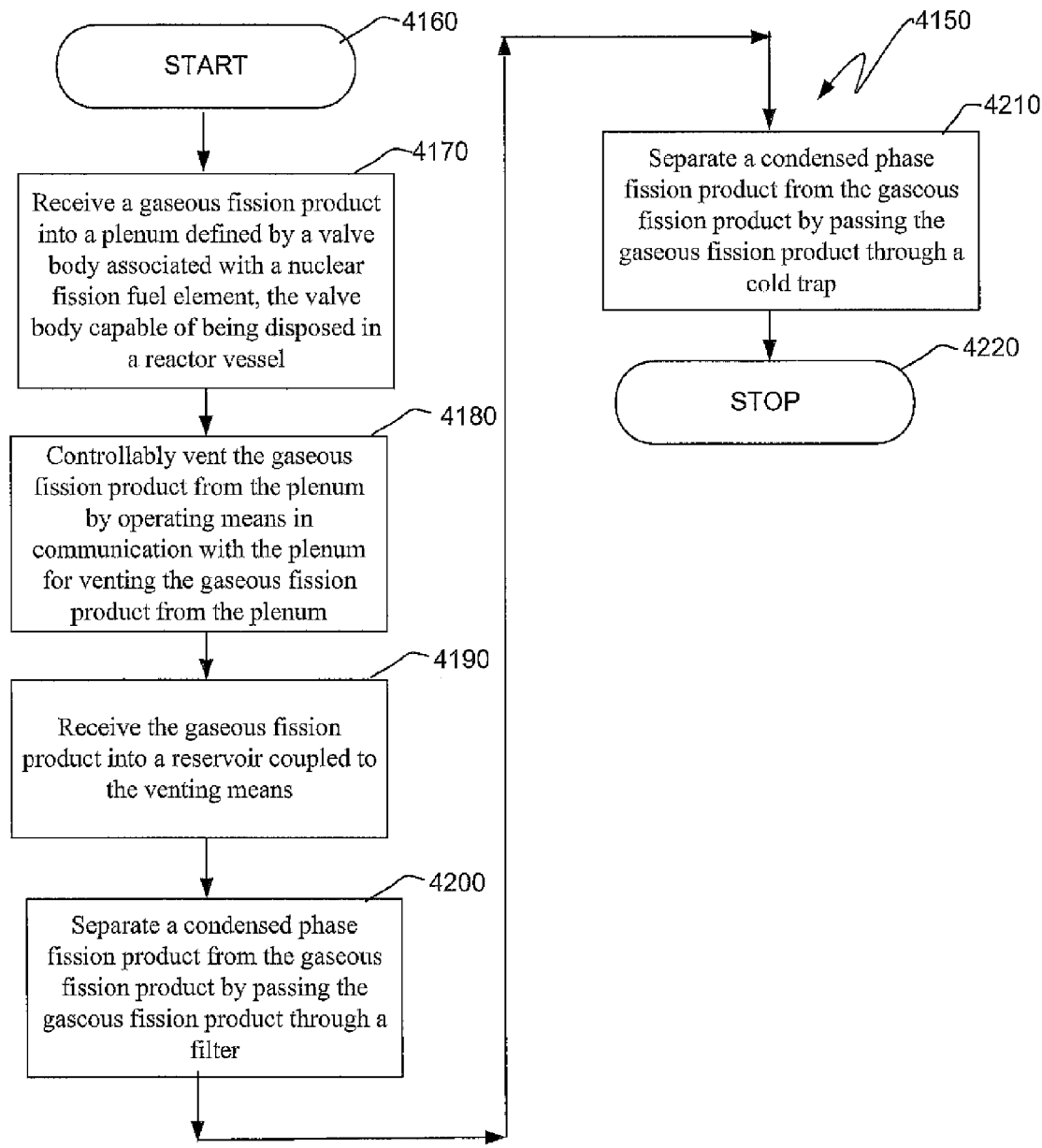

In FIG. 46D, an illustrative method 4150 of operating a nuclear fission reactor starts at a block 4160. At a block 4170, the method comprises receiving a gaseous fission product into a plenum defined by a valve body associated with a nuclear fission fuel element, the valve body capable of being disposed in a reactor vessel. At a block 4180, the gaseous fission product is controllably vented from the plenum by operating means in communication with the plenum for venting the gaseous fission product from the plenum. At a block 4190, the gaseous fission product is received into a reservoir coupled to the venting means. At a block 4200, a condensed phase fission product is separated from the gaseous fission product by passing the gaseous fission product through a filter. At a block 4210, a condensed phase fission product is separated from the gaseous fission product by passing the gaseous fission product through a cold trap. The method stops at a block 4220.

Figure 46E:
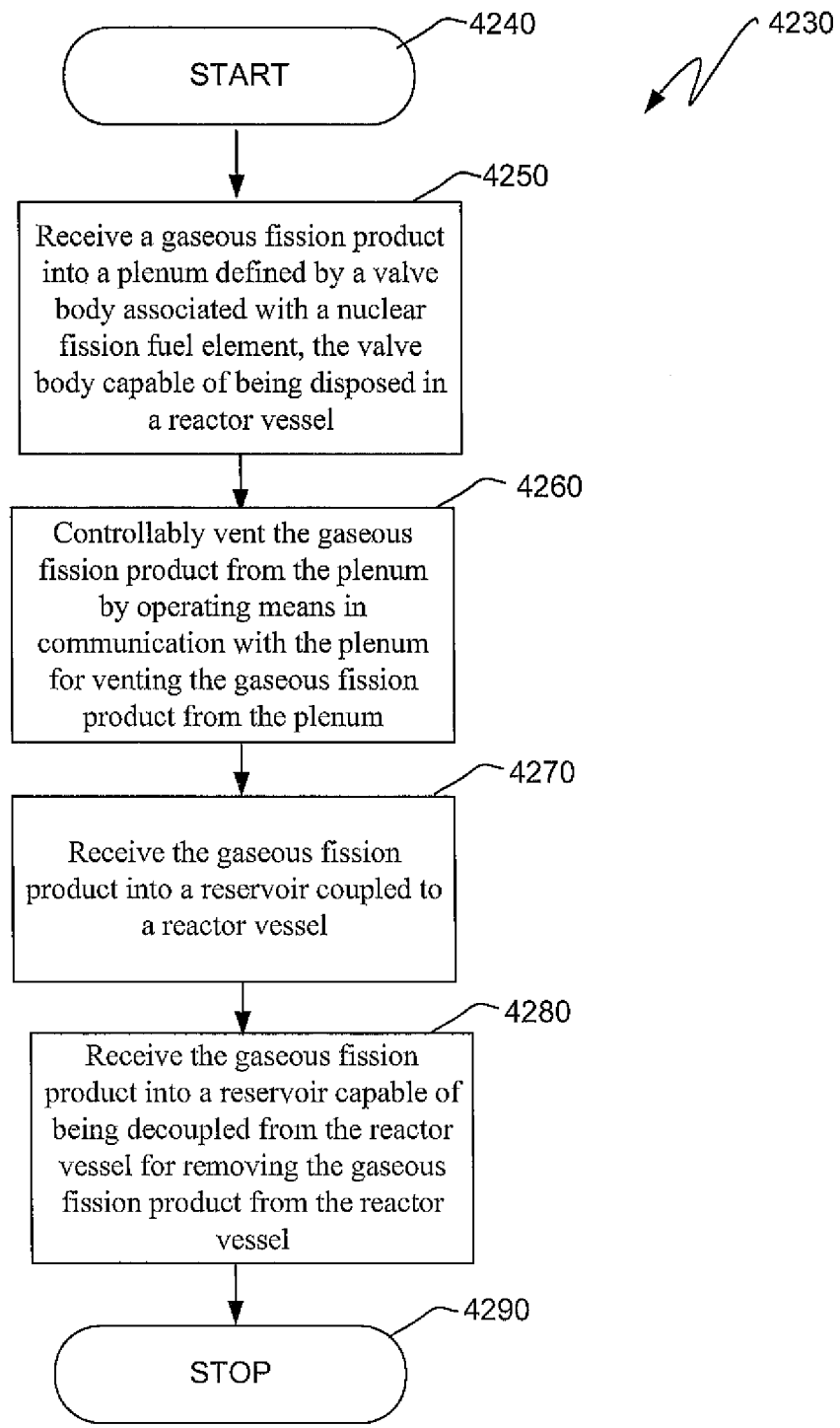

In FIG. 46E, an illustrative method 4230 of operating a nuclear fission reactor starts at a block 4240. At a block 4250, the method comprises receiving a gaseous fission product into a plenum defined by a valve body associated with a nuclear fission fuel element, the valve body capable of being disposed in a reactor vessel. At a block 4260, the gaseous fission product is controllably vented from the plenum by operating means in communication with the plenum for venting the gaseous fission product from the plenum. At a block 4270, the gaseous fission product is received into a reservoir coupled to the valve. At a block 4280, the gaseous fission product is received into a reservoir capable of being decoupled from the reactor vessel for removing the gaseous fission product from the reactor vessel. The method stops at a block 4290.

Figure 46F:
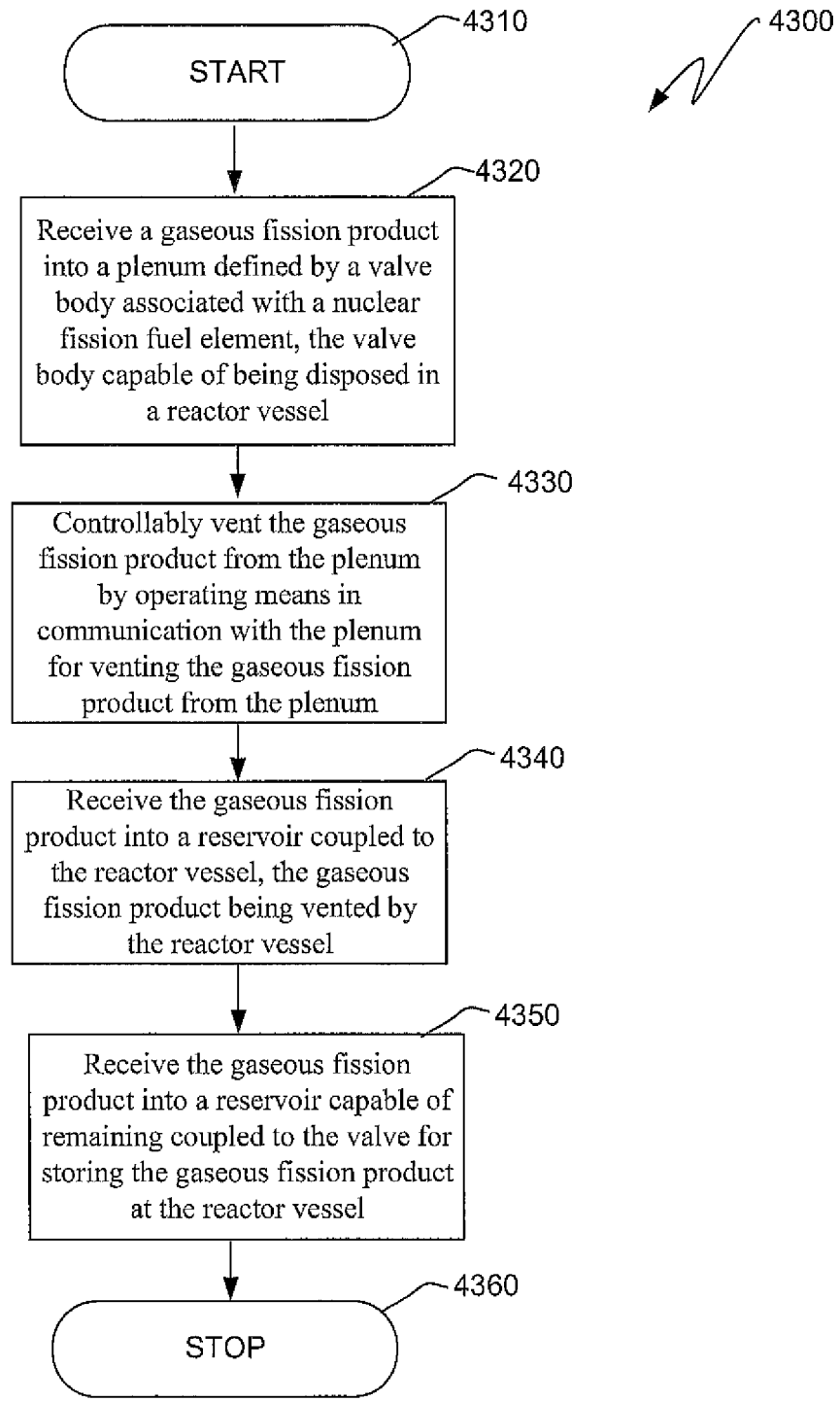

In FIG. 46F, an illustrative method 4300 of operating a nuclear fission reactor starts at a block 4310. At a block 4320, the method comprises receiving a gaseous fission product into a plenum defined by a valve body associated with a nuclear fission fuel element, the valve body capable of being disposed in a reactor vessel. At a block 4330, the gaseous fission product is controllably vented from the plenum by operating means in communication with the plenum for venting the gaseous fission product from the plenum. At a block 4340, the gaseous fission product is received into a reservoir coupled to the reactor vessel, the gaseous fission product being vented by the reactor vessel. At a block 4350, the gaseous fission product is received into a reservoir capable of remaining coupled to the valve for storing the gaseous fission product at the reactor vessel. The method stops at a block 4360.

Figure 46G:
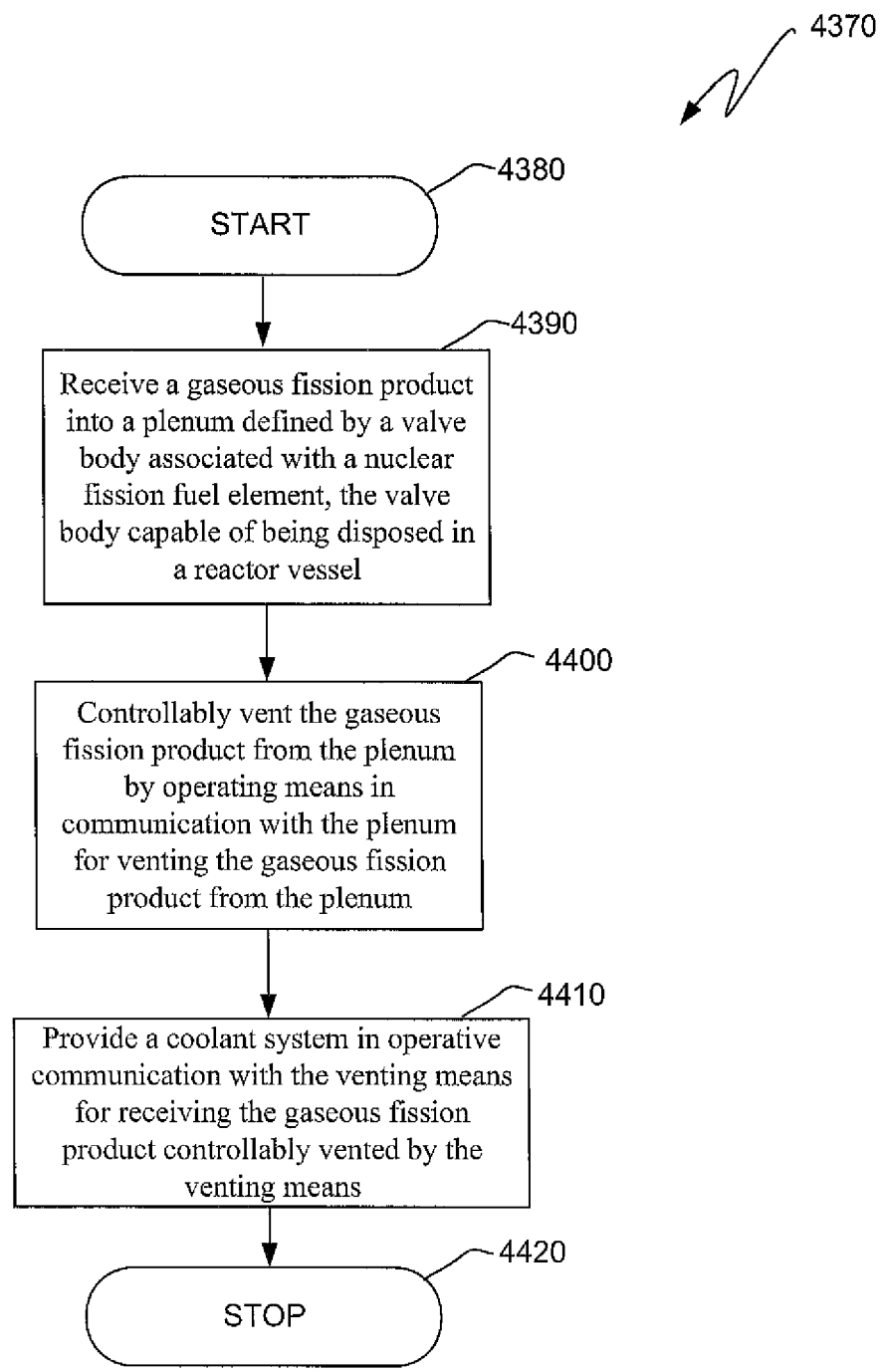

In FIG. 46G, an illustrative method 4370 of operating a nuclear fission reactor starts at a block 4380. At a block 4390, the method comprises receiving a gaseous fission product into a plenum defined by a valve body associated with a nuclear fission fuel element, the valve body capable of being disposed in a reactor vessel. At a block 4400, the gaseous fission product is controllably vented from the plenum by operating means in communication with the plenum for venting the gaseous fission product from the plenum. At a block 4410, a coolant system is provided in operative communication with the venting means for receiving the gaseous fission product controllably vented by the venting means. The method stops at a block 4420.

Figure 46H:
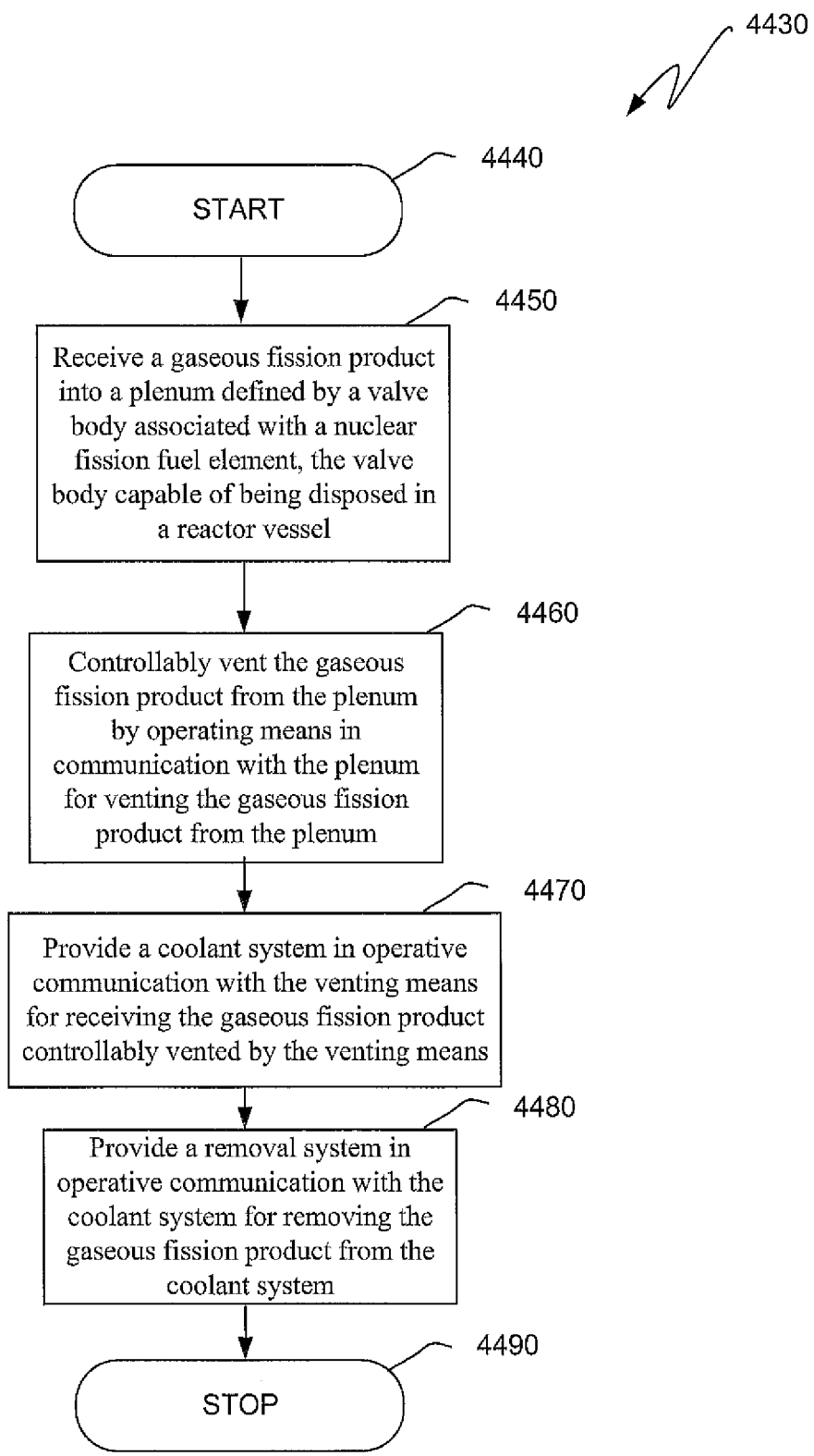

In FIG. 46H, an illustrative method 4430 of operating a nuclear fission reactor starts at a block 4440. At a block 4450, the method comprises receiving a gaseous fission product into a plenum defined by a valve body associated with a nuclear fission fuel element, the valve body capable of being disposed in a reactor vessel. At a block 4460, the gaseous fission product is controllably vented from the plenum by operating means in communication with the plenum for venting the gaseous fission product from the plenum. At a block 4470, a coolant system is provided in operative communication with the venting means for receiving the gaseous fission product controllably vented by the venting means. At a block 4480, a removal system is provided in operative communication with the coolant system for removing the gaseous fission product from the coolant system. The method stops at a block 4490.

Figure 46I:
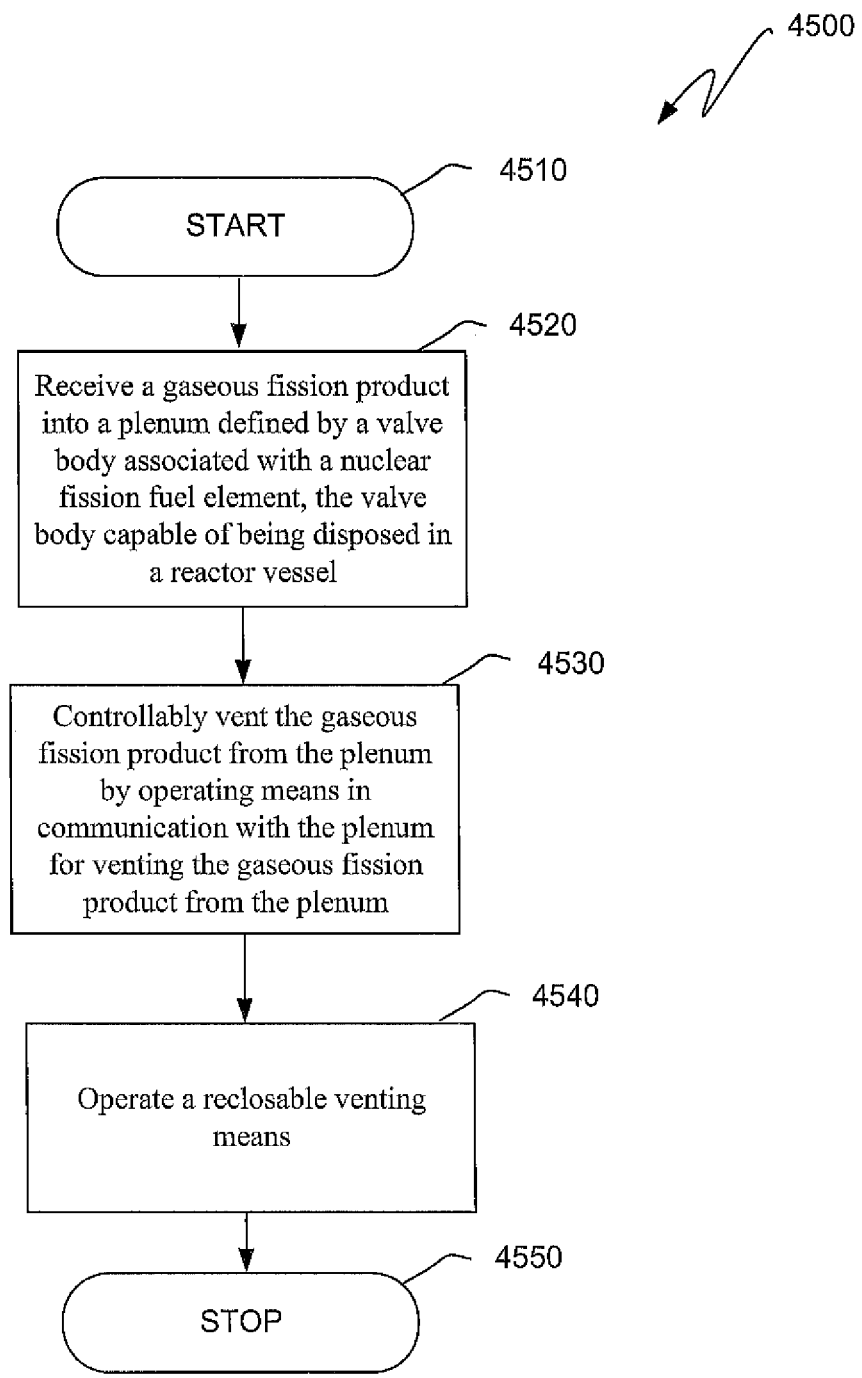

In FIG. 46I, an illustrative method 4500 of operating a nuclear fission reactor starts at a block 4510. At a block 4520, the method comprises receiving a gaseous fission product into a plenum defined by a valve body associated with a nuclear fission fuel element, the valve body capable of being disposed in a reactor vessel. At a block 4530, the gaseous fission product is controllably vented from the plenum by operating means in communication with the plenum for venting the gaseous fission product from the plenum. At a block 4540, a reclosable venting means is operated. The method stops at a block 4550.

Figure 46J:
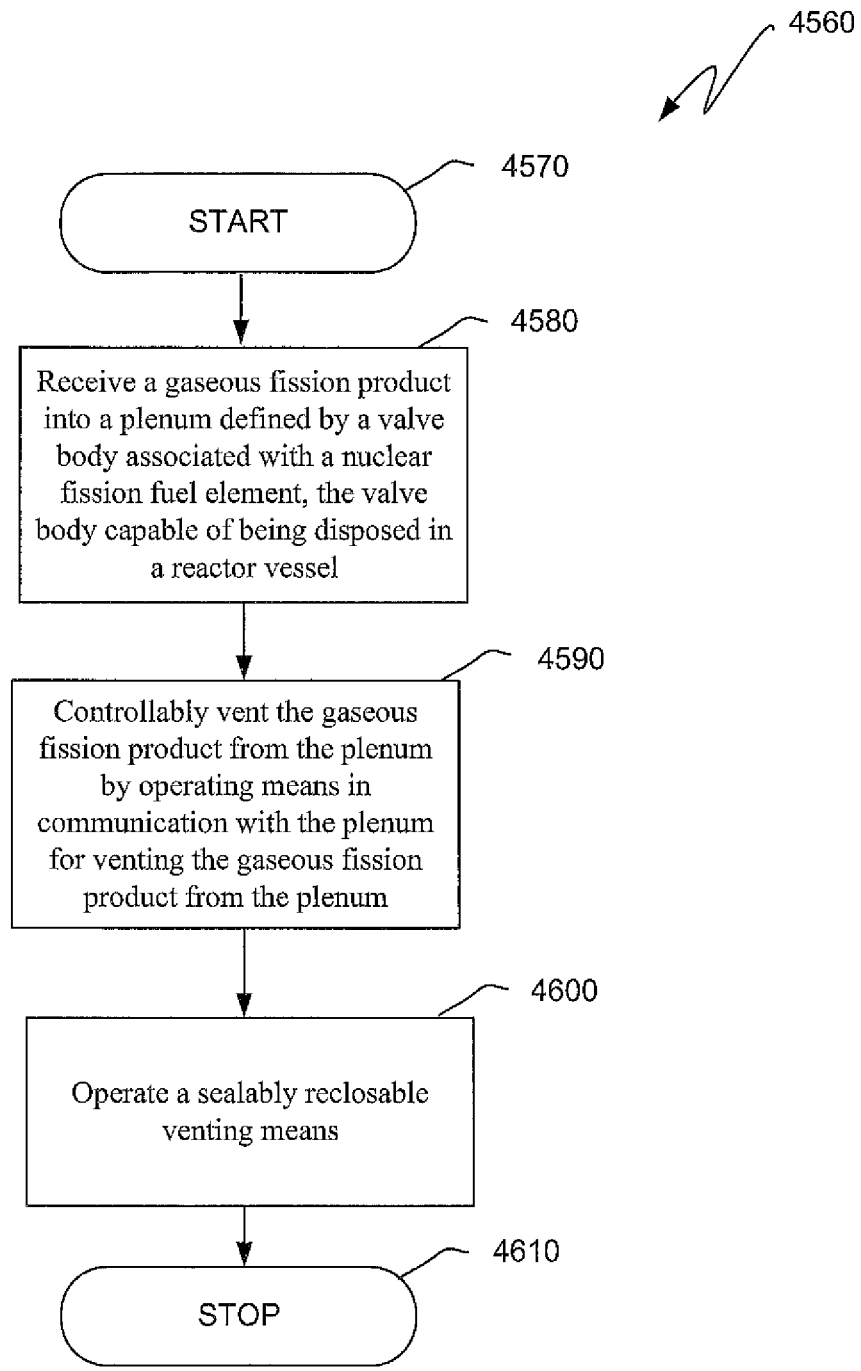

In FIG. 46J, an illustrative method 4560 of operating a nuclear fission reactor starts at a block 4570. At a block 4580, the method comprises receiving a gaseous fission product into a plenum defined by a valve body associated with a nuclear fission fuel element, the valve body capable of being disposed in a reactor vessel. At a block 4590, the gaseous fission product is controllably vented from the plenum by operating means in communication with the plenum for venting the gaseous fission product from the plenum. At a block 4600, a sealably reclosable venting means is operated. The method stops at a block 4610.

Figure 47:
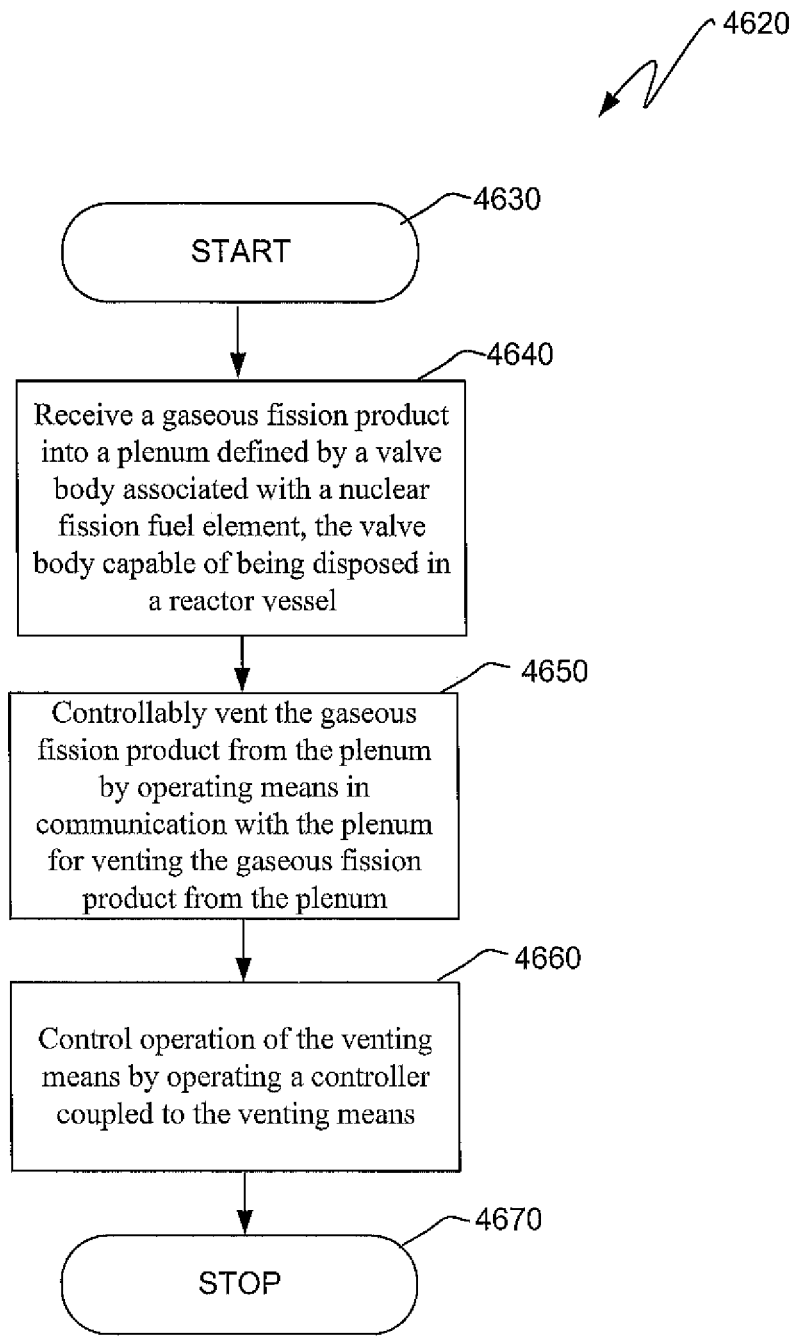

In FIG. 47, an illustrative method 4620 of operating a nuclear fission reactor starts 4630. 4640, the method comprises receiving a gaseous fission product into a plenum defined by a valve body associated with a nuclear fission fuel element, the valve body capable of being disposed in a reactor vessel. 4650, the gaseous fission product is controllably vented from the plenum by operating means in communication with the plenum for venting the gaseous fission product from the plenum. At a block 4660, operation of the venting means is controlled by operating a controller coupled to the venting means. The method stops at a block 4670.

Figure 48:
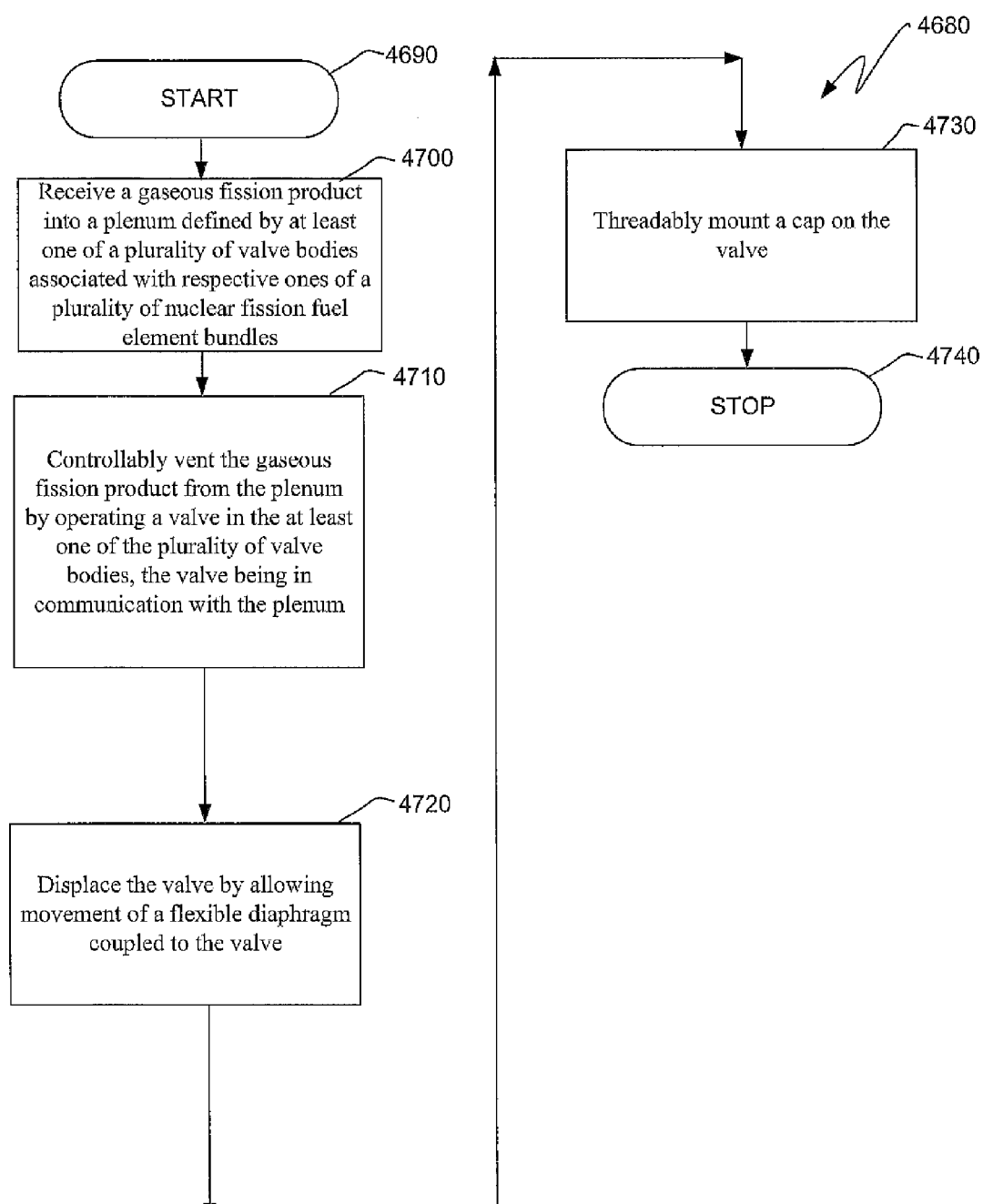

In FIG. 48, an illustrative method 4680 of operating a nuclear fission reactor starts at a block 4690. At a block 4700, the method comprises receiving a gaseous fission product into a plenum defined by at least one of a plurality of valve bodies associated with respective ones of a plurality of nuclear fission fuel element bundles. At a block 4710, the gaseous fission product is controllably vented from the plenum by operating a valve in the at least one of the plurality of valve bodies, the valve being in communication with the plenum. At a block 4720, the valve is displaced by allowing movement of a flexible diaphragm coupled to the valve. At a block 4730, a cap is threadably mounted on the valve. The method stops at a block 4740.

Figure 48A:
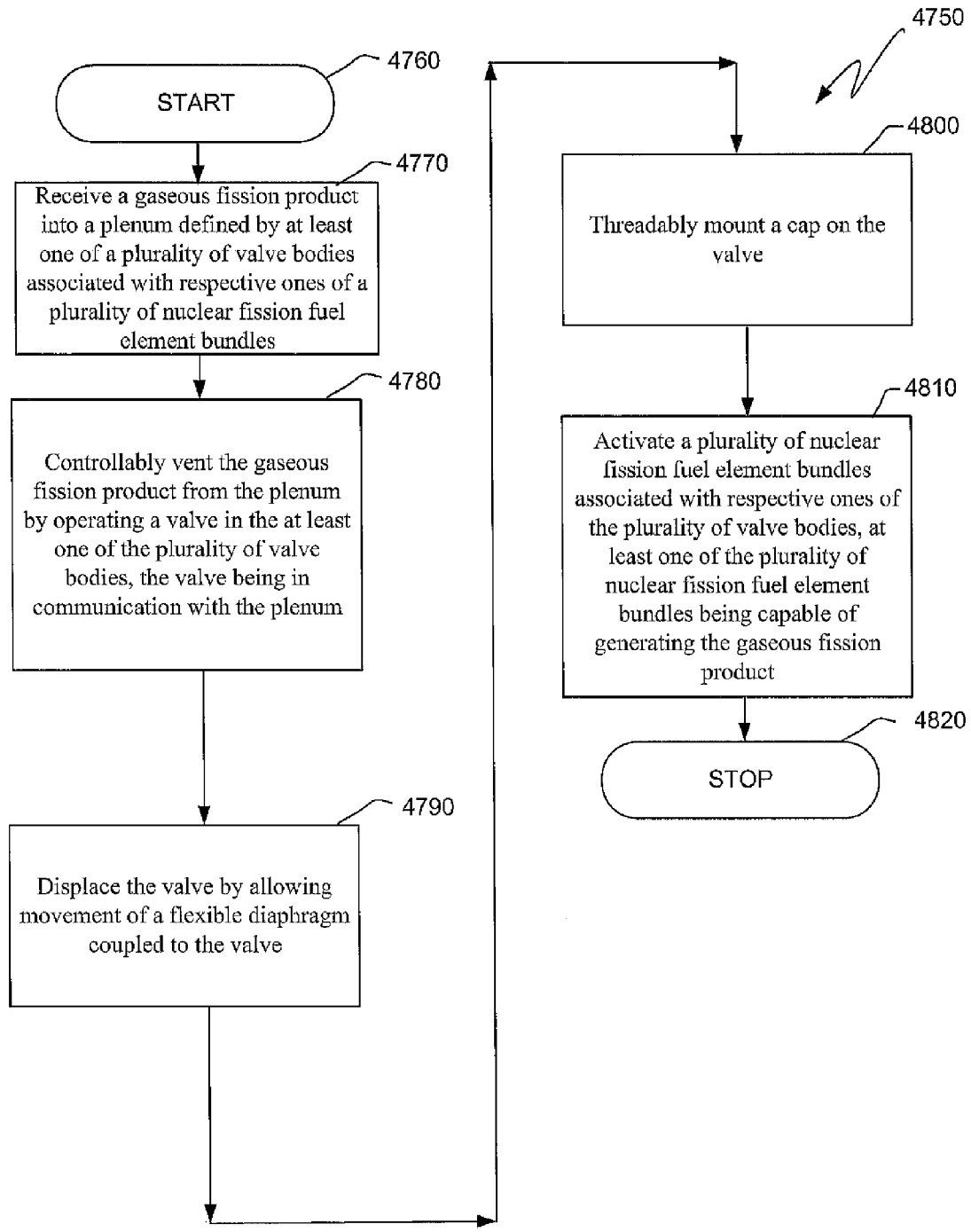

In FIG. 48A, an illustrative method 4750 of operating a nuclear fission reactor starts at a block 4760. At a block 4770, the method comprises receiving a gaseous fission product into a plenum defined by at least one of a plurality of valve bodies associated with respective ones of a plurality of nuclear fission fuel element bundles. At a block 4780, the gaseous fission product is controllably vented from the plenum by operating a valve in the at least one of the plurality of valve bodies, the valve being in communication with the plenum. At a block 4790, the valve is displaced by allowing movement of a flexible diaphragm coupled to the valve. At a block 4880, a flexible diaphragm is coupled to the valve for moving the valve to a closed position. At a block 4800, a cap is threadably mounted on the valve. At a block 4810, a plurality of nuclear fission fuel element bundles associated with respective ones of the plurality of valve bodies are activated, at least one of the plurality of nuclear fission fuel element bundles being capable of generating the gaseous fission product. The method stops at a block 4820.

Figure 48B:
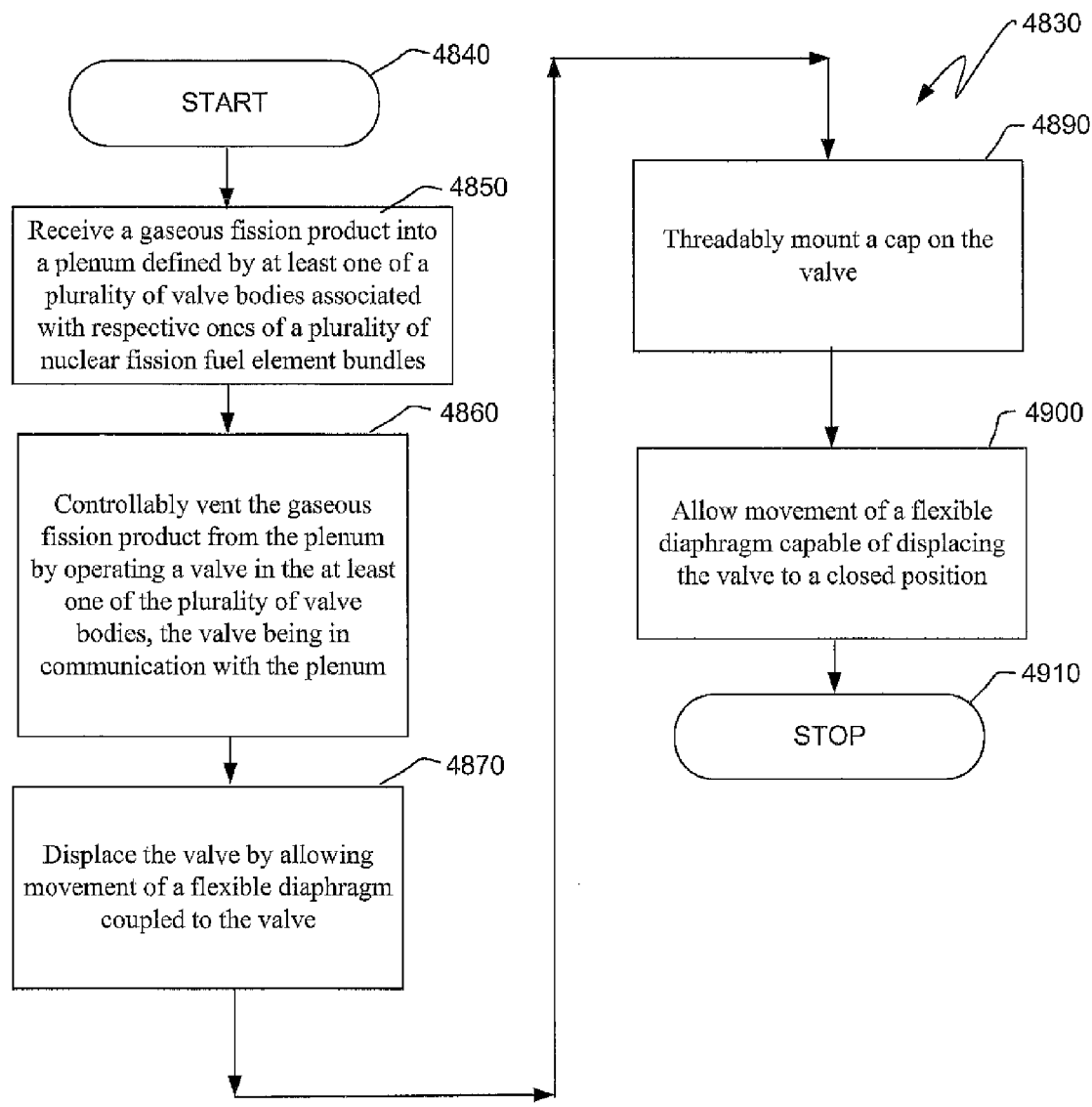

In FIG. 48B, an illustrative method 4830 of operating a nuclear fission reactor starts at a block 4840. At a block 4850, the method comprises receiving a gaseous fission product into a plenum defined by at least one of a plurality of valve bodies associated with respective ones of a plurality of nuclear fission fuel element bundles. At a block 4860, the gaseous fission product is controllably vented from the plenum by operating a valve in the at least one of the plurality of valve bodies, the valve being in communication with the plenum. At a block 4870, the valve is displaced by allowing movement of a flexible diaphragm coupled to the valve. At a block 4890, a cap is threadably mounted on the valve. At a block 4900, movement of a flexible diaphragm capable of displacing the valve to a closed position is allowed. The method stops at a block 4910.

Figure 49:
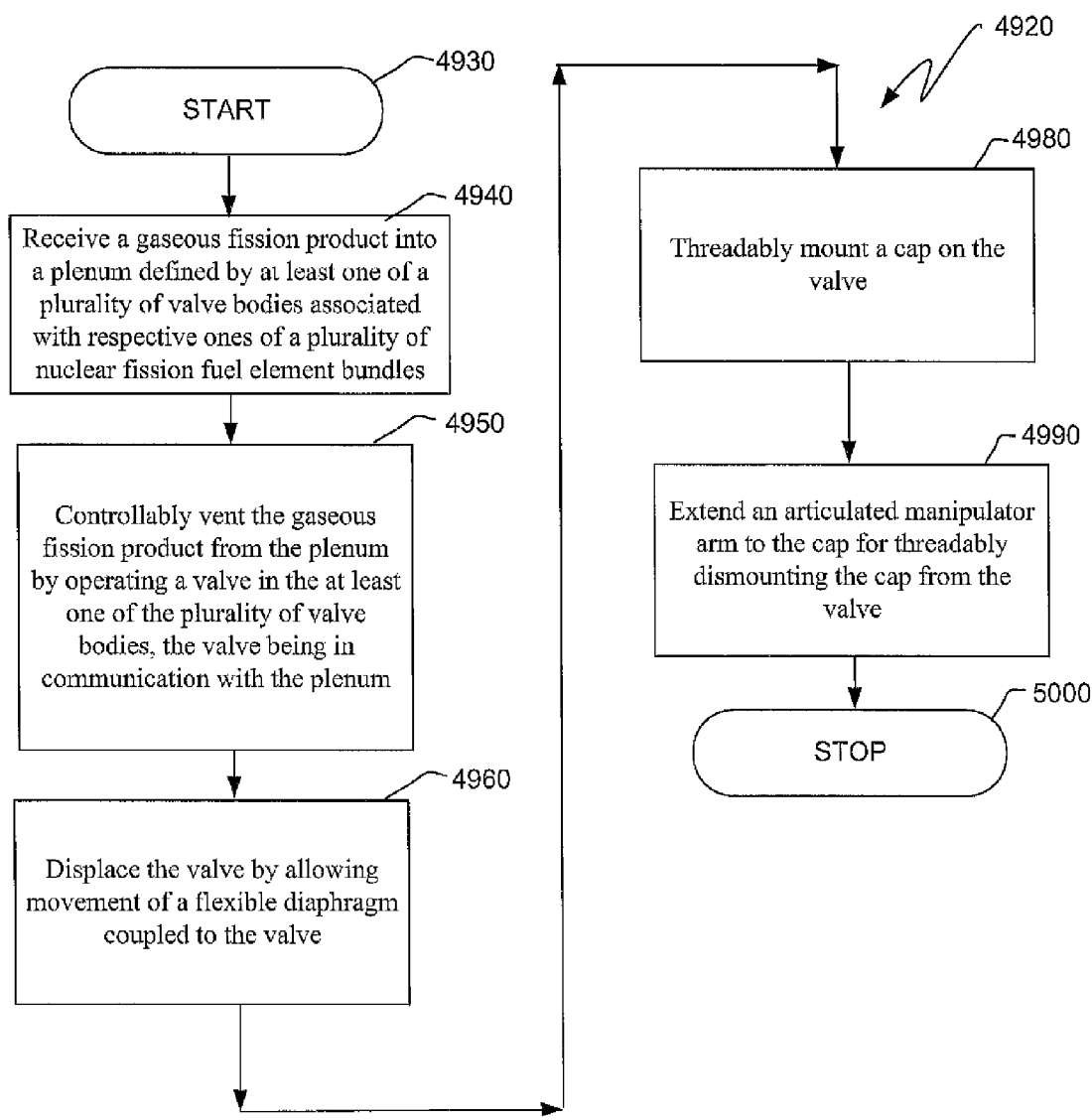

In FIG. 49, an illustrative method 4920 of operating a nuclear fission reactor starts at a block 4930. At a block 4940, the method comprises receiving a gaseous fission product into a plenum defined by at least one of a plurality of valve bodies associated with respective ones of a plurality of nuclear fission fuel element bundles. At a block 4950, the gaseous fission product is controllably vented from the plenum by operating a valve in the at least one of the plurality of valve bodies, the valve being in communication with the plenum. At a block 4960, the valve is displaced by allowing movement of a flexible diaphragm coupled to the valve. At a block 4980, a cap is threadably mounted on the valve. At a block 4990, an articulated manipulator arm is extended to the cap for threadably dismounting the cap from the valve. The method stops at a block 5000.

Figure 50:
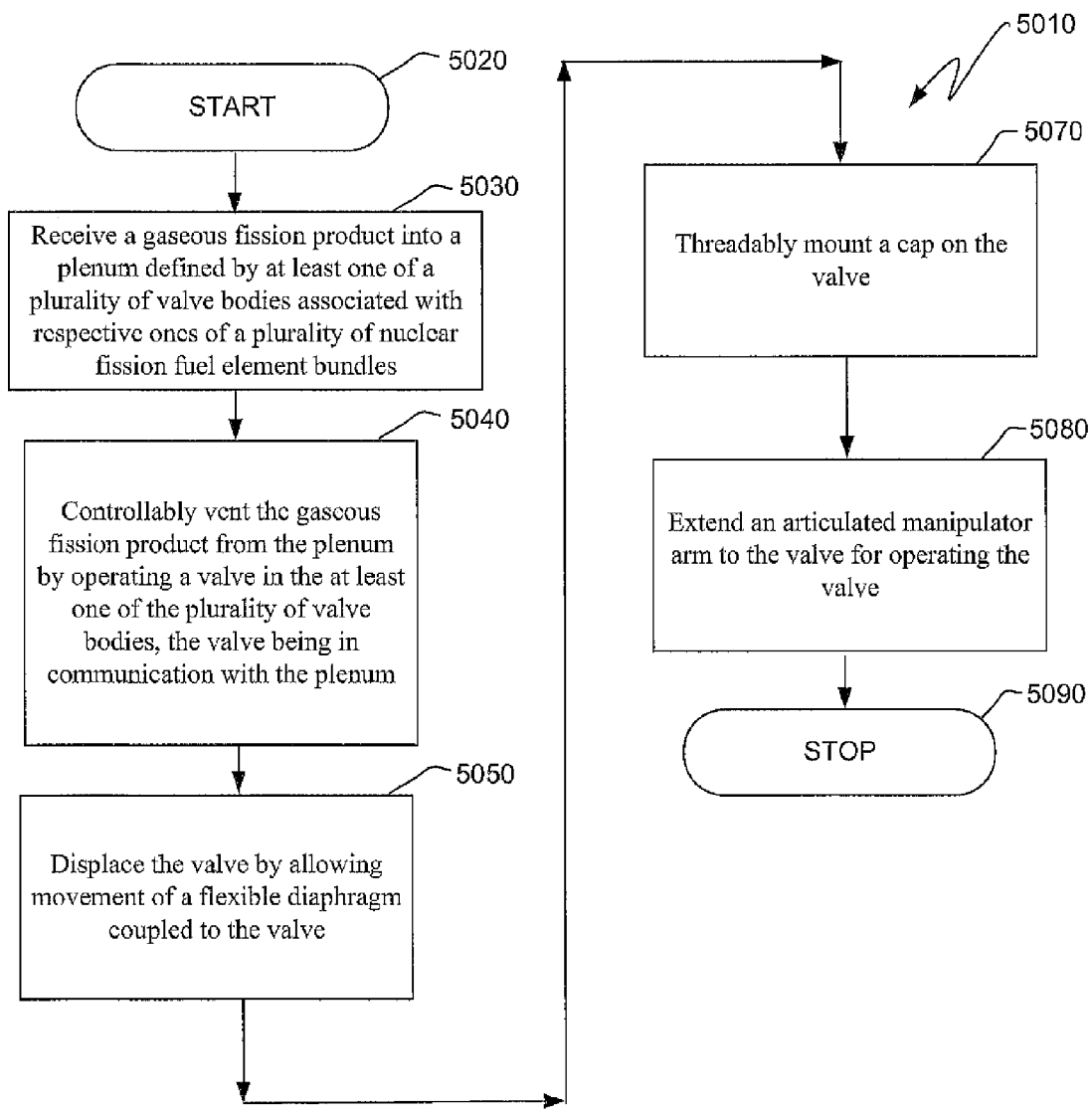

In FIG. 50, an illustrative method 5010 of operating a nuclear fission reactor starts at a block 5020. At a block 5030, the method comprises receiving a gaseous fission product into a plenum defined by at least one of a plurality of valve bodies associated with respective ones of a plurality of nuclear fission fuel element bundles. At a block 5040, the gaseous fission product is controllably vented from the plenum by operating a valve in the at least one of the plurality of valve bodies, the valve being in communication with the plenum. At a block 5050, the valve is displaced by allowing movement of a flexible diaphragm coupled to the valve. At a block 5070, a cap is threadably mounted on the valve. At a block 5080, an articulated manipulator arm is extended to the valve for operating the valve. The method stops at a block 5090.

Figure 50A:
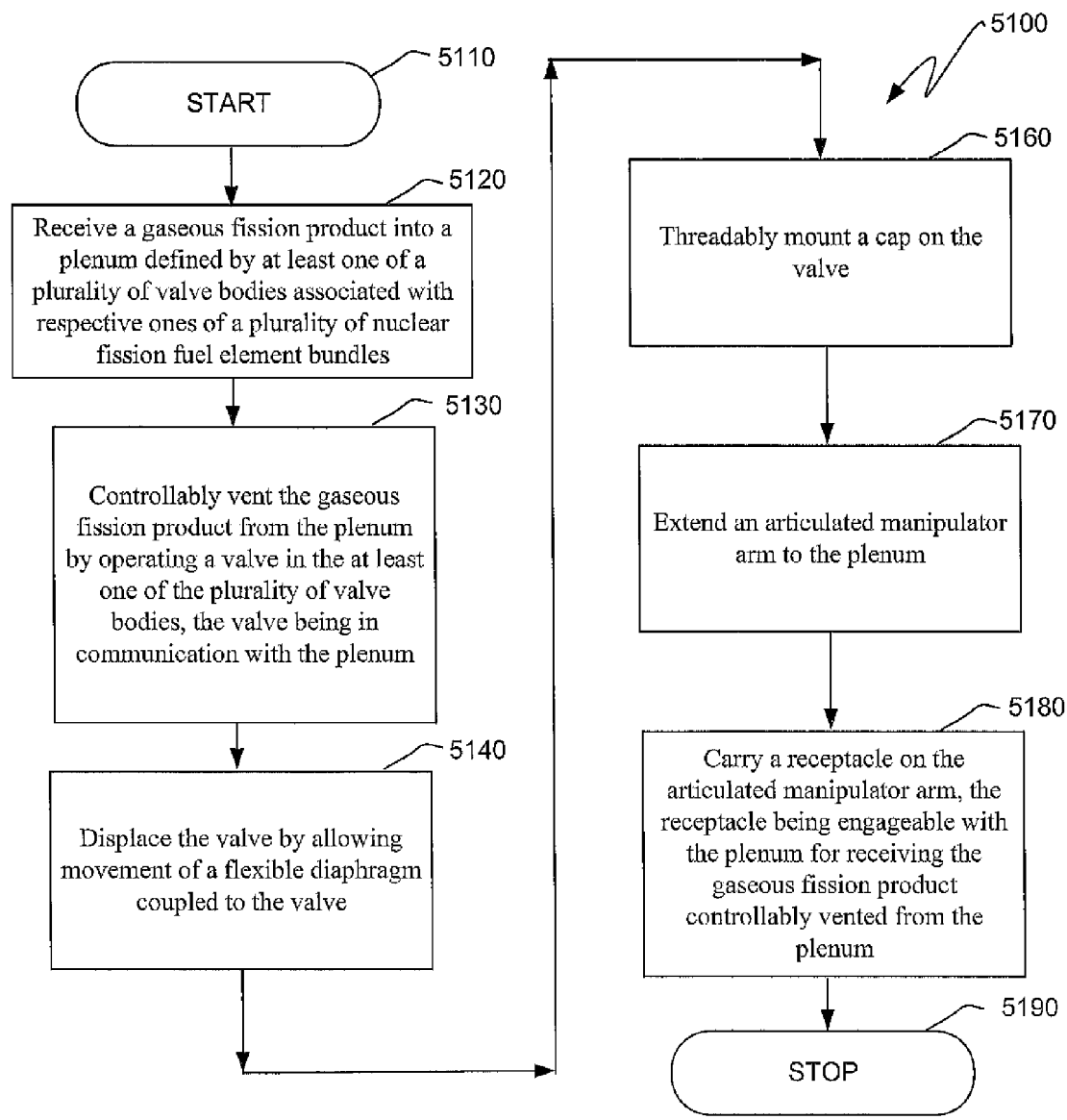

In FIG. 50A, an illustrative method 5100 of operating a nuclear fission reactor starts at a block 5110. At a block 5120, the method comprises receiving a gaseous fission product into a plenum defined by at least one of a plurality of valve bodies associated with respective ones of a plurality of nuclear fission fuel element bundles. At a block 5130, the gaseous fission product is controllably vented from the plenum by operating a valve in the at least one of the plurality of valve bodies, the valve being in communication with the plenum. At a block 5140, the valve is displaced by allowing movement of a flexible diaphragm coupled to the valve. At a block 5160, a cap is threadably mounted on the valve. At a block 5170, an articulated manipulator arm is extended to the plenum. At a block 5180, a receptacle is carried on the articulated manipulator arm, the receptacle being engageable with the plenum for receiving the gaseous fission product controllably vented from the plenum. The method stops at a block 5190.

Figure 51:
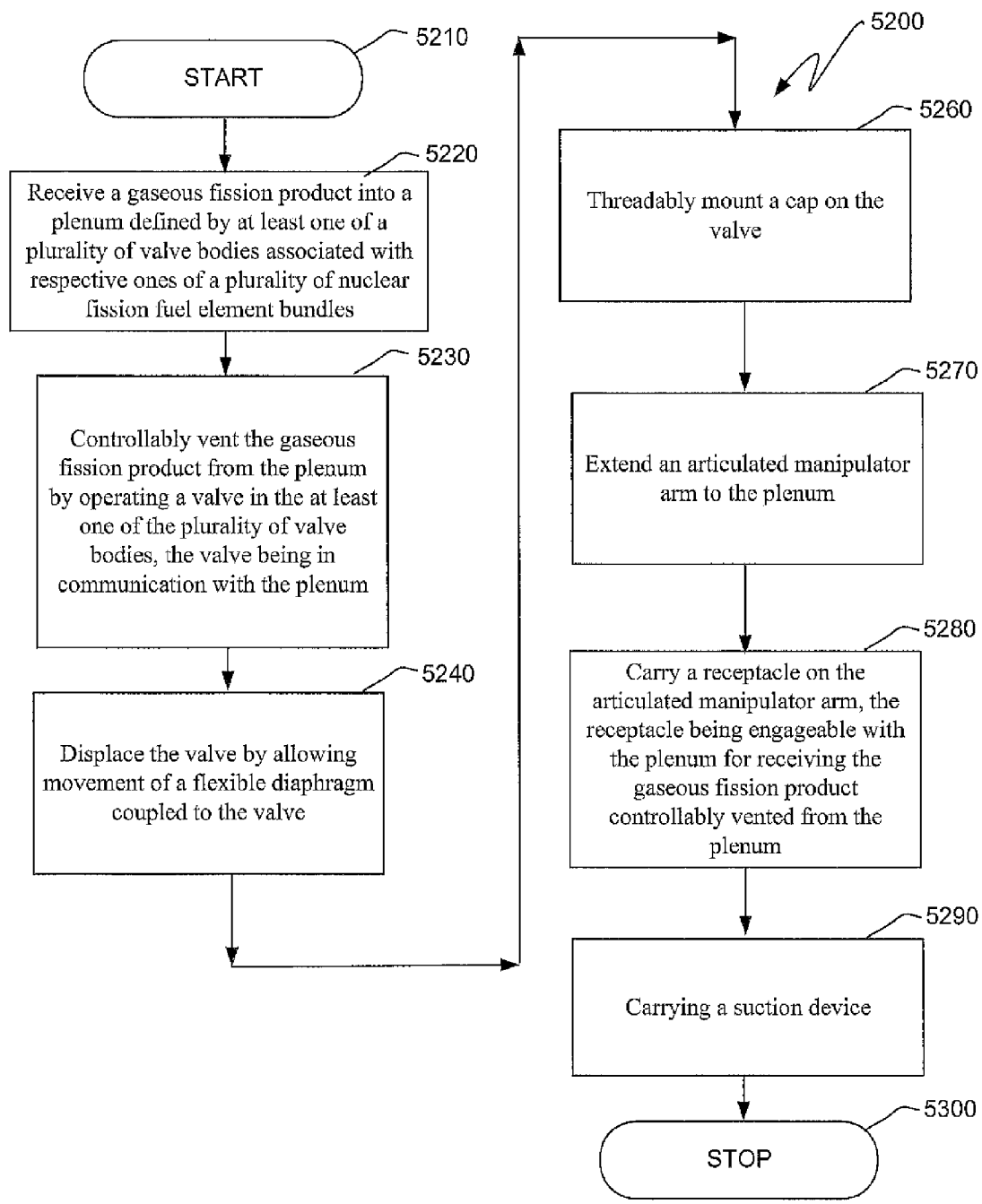

In FIG. 51, an illustrative method 5200 of operating a nuclear fission reactor starts at a block 5210. At a block 5220, the method comprises receiving a gaseous fission product into a plenum defined by at least one of a plurality of valve bodies associated with respective ones of a plurality of nuclear fission fuel element bundles. At a block 5230, the gaseous fission product is controllably vented from the plenum by operating a valve in the at least one of the plurality of valve bodies, the valve being in communication with the plenum. At a block 5240, the valve is displaced by allowing movement of a flexible diaphragm coupled to the valve. At a block 5260, a cap is threadably mounted on the valve. At a block 5270, an articulated manipulator arm is extended to the plenum. At a block 5280, a receptacle is carried on the articulated manipulator arm, the receptacle being engageable with the plenum for receiving the gaseous fission product controllably vented from the plenum. At a block 5290, a suction device is carried. The method stops at a block 5300.

Figure 52:
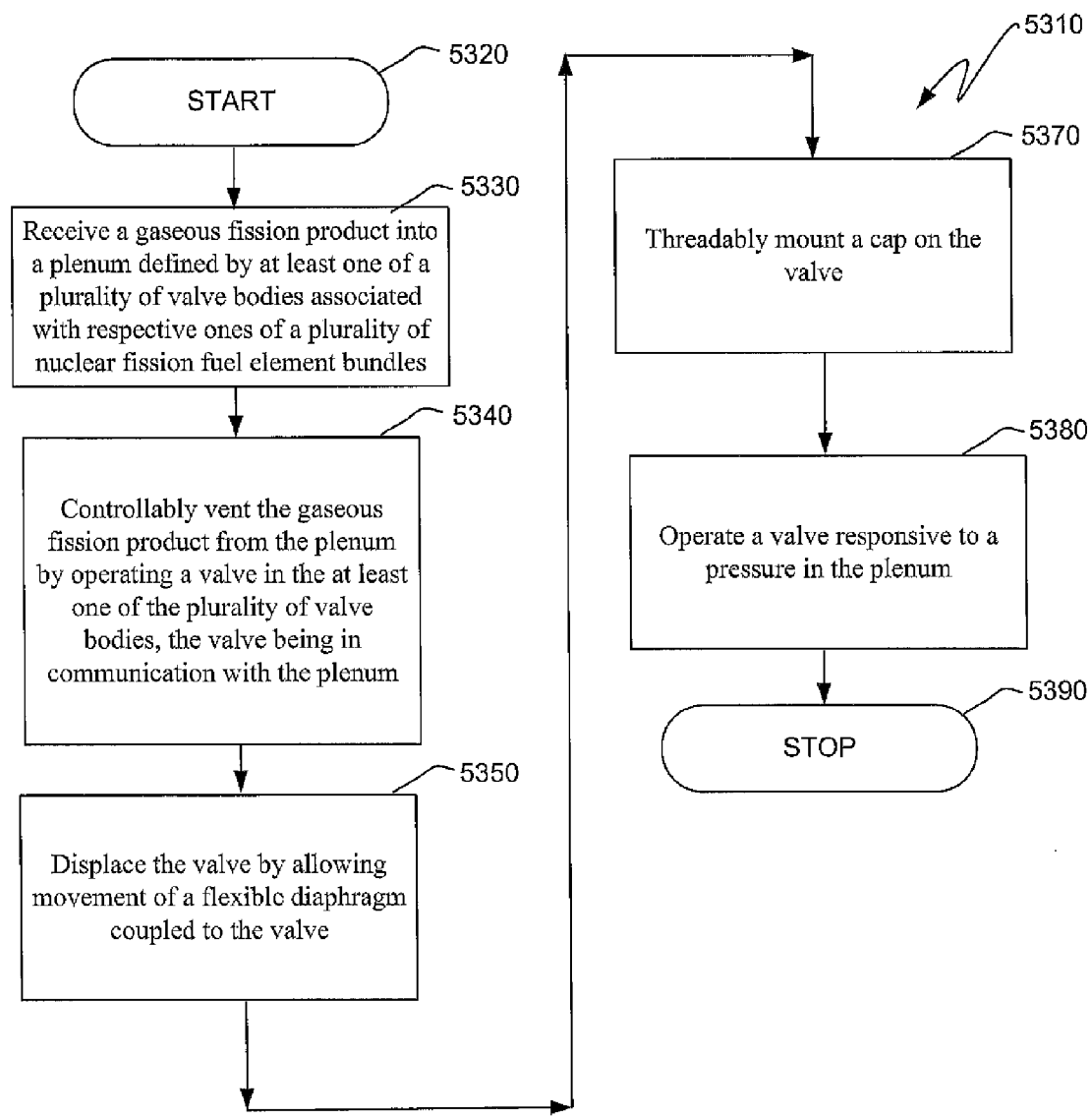

In FIG. 52, an illustrative method 5310 of operating a nuclear fission reactor starts at a block 5320. At a block 5330, the method comprises receiving a gaseous fission product into a plenum defined by at least one of a plurality of valve bodies associated with respective ones of a plurality of nuclear fission fuel element bundles. At a block 5340, the gaseous fission product is controllably vented from the plenum by operating a valve in the at least one of the plurality of valve bodies, the valve being in communication with the plenum. At a block 5350, the valve is displaced by allowing movement of a flexible diaphragm coupled to the valve. At a block 5370, a cap is threadably mounted on the valve. At a block 5380, a valve responsive to a pressure in the plenum is operated. The method stops at a block 5390.

Figure 53:
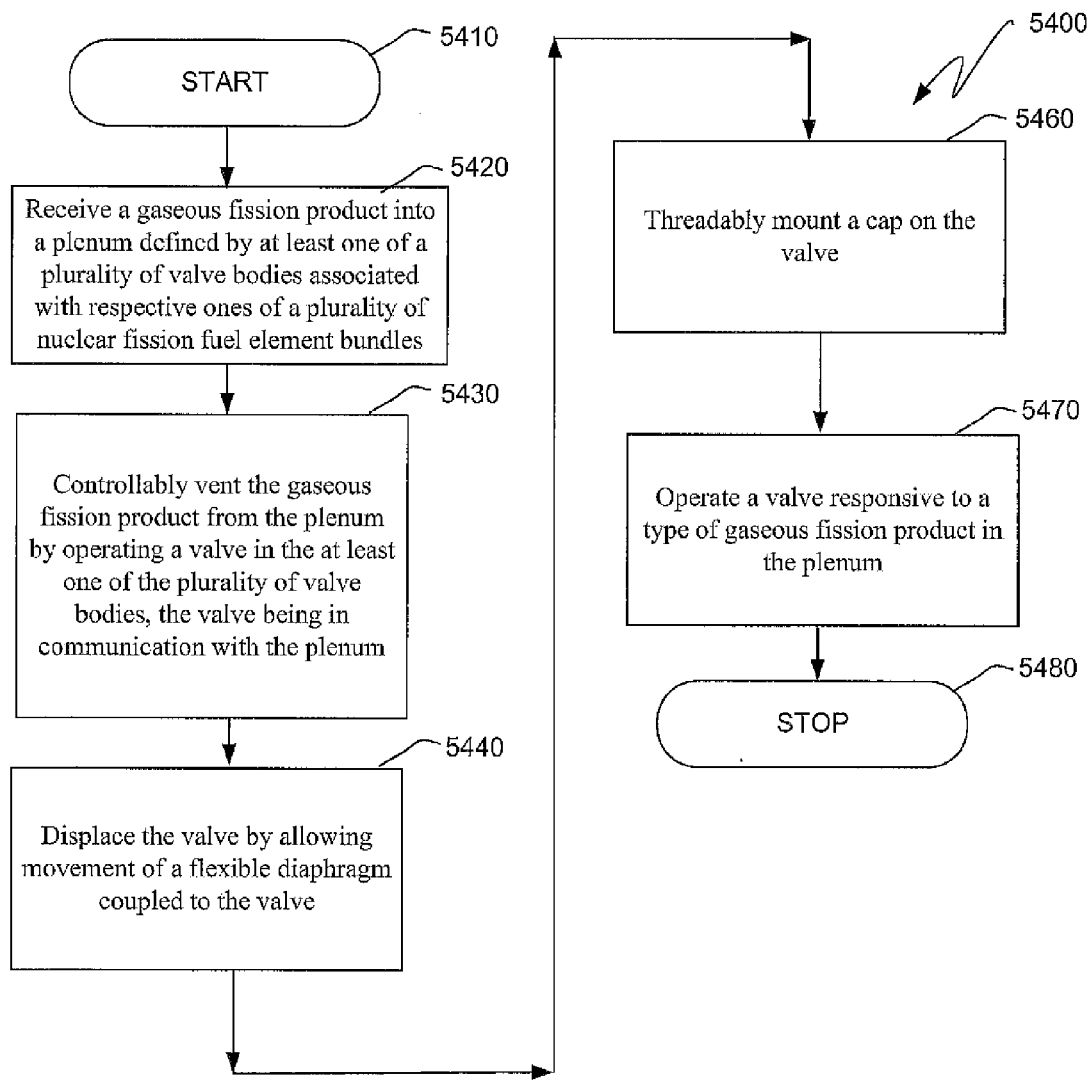

In FIG. 53, an illustrative method 5400 of operating a nuclear fission reactor starts at a block 5410. At a block 5420, the method comprises receiving a gaseous fission product into a plenum defined by at least one of a plurality of valve bodies associated with respective ones of a plurality of nuclear fission fuel element bundles. At a block 5430, the gaseous fission product is controllably vented from the plenum by operating a valve in the at least one of the plurality of valve bodies, the valve being in communication with the plenum. At a block 5440, the valve is displaced by allowing movement of a flexible diaphragm coupled to the valve. At a block 5460, a cap is threadably mounted on the valve. At a block 5470, a valve responsive to a type of gaseous fission product in the plenum is operated. The method stops at a block 5480.

Figure 54:
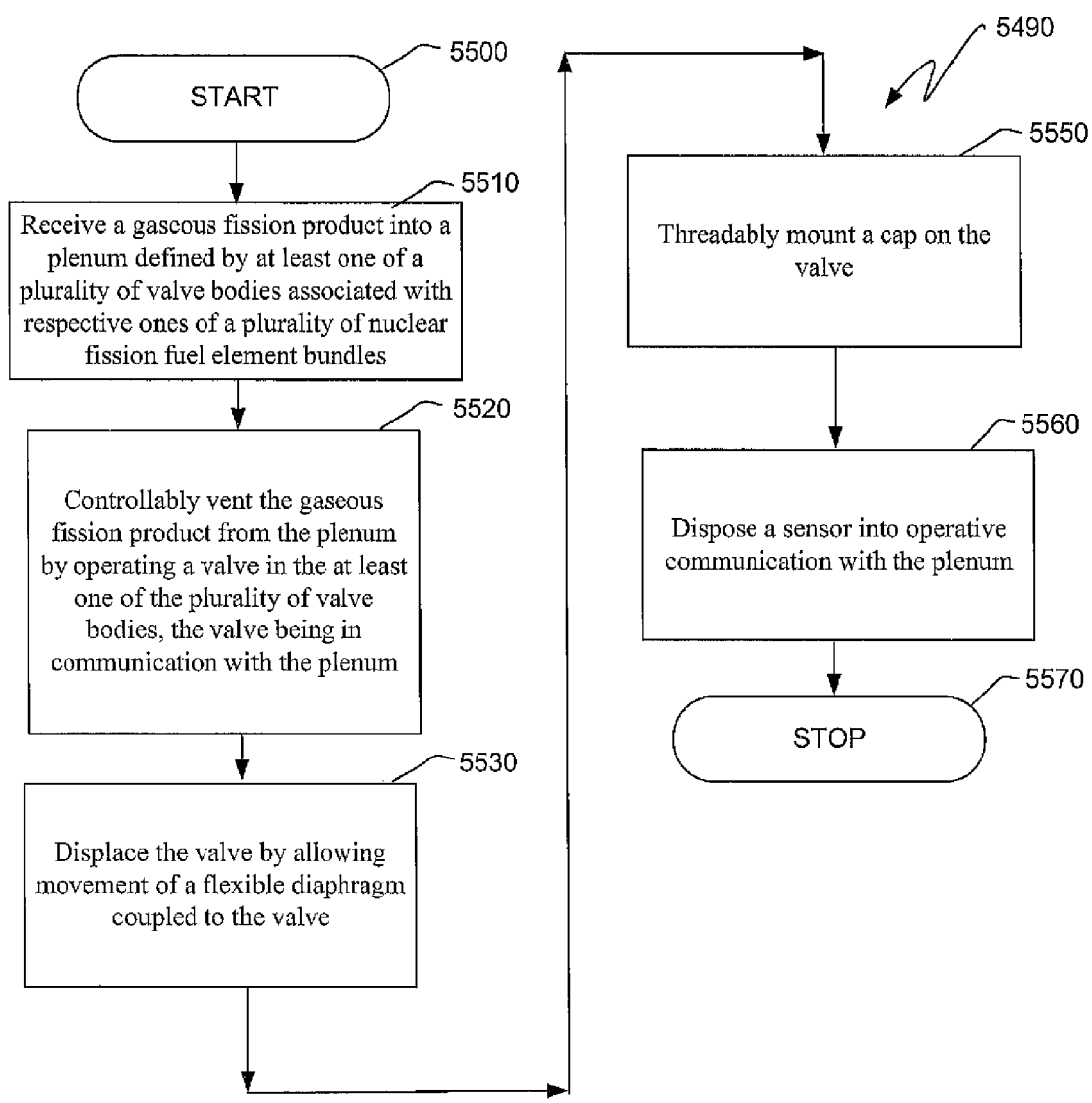

In FIG. 54, an illustrative method 5490 of operating a nuclear fission reactor starts at a block 5500. At a block 5510, the method comprises receiving a gaseous fission product into a plenum defined by at least one of a plurality of valve bodies associated with respective ones of a plurality of nuclear fission fuel element bundles. At a block 5520, the gaseous fission product is controllably vented from the plenum by operating a valve in the at least one of the plurality of valve bodies, the valve being in communication with the plenum. At a block 5530, the valve is displaced by allowing movement of a flexible diaphragm coupled to the valve. At a block 5550, a cap is threadably mounted on the valve. At a block 5560, a sensor is disposed into operative communication with the plenum. The method stops at a block 5570.

Figure 55:
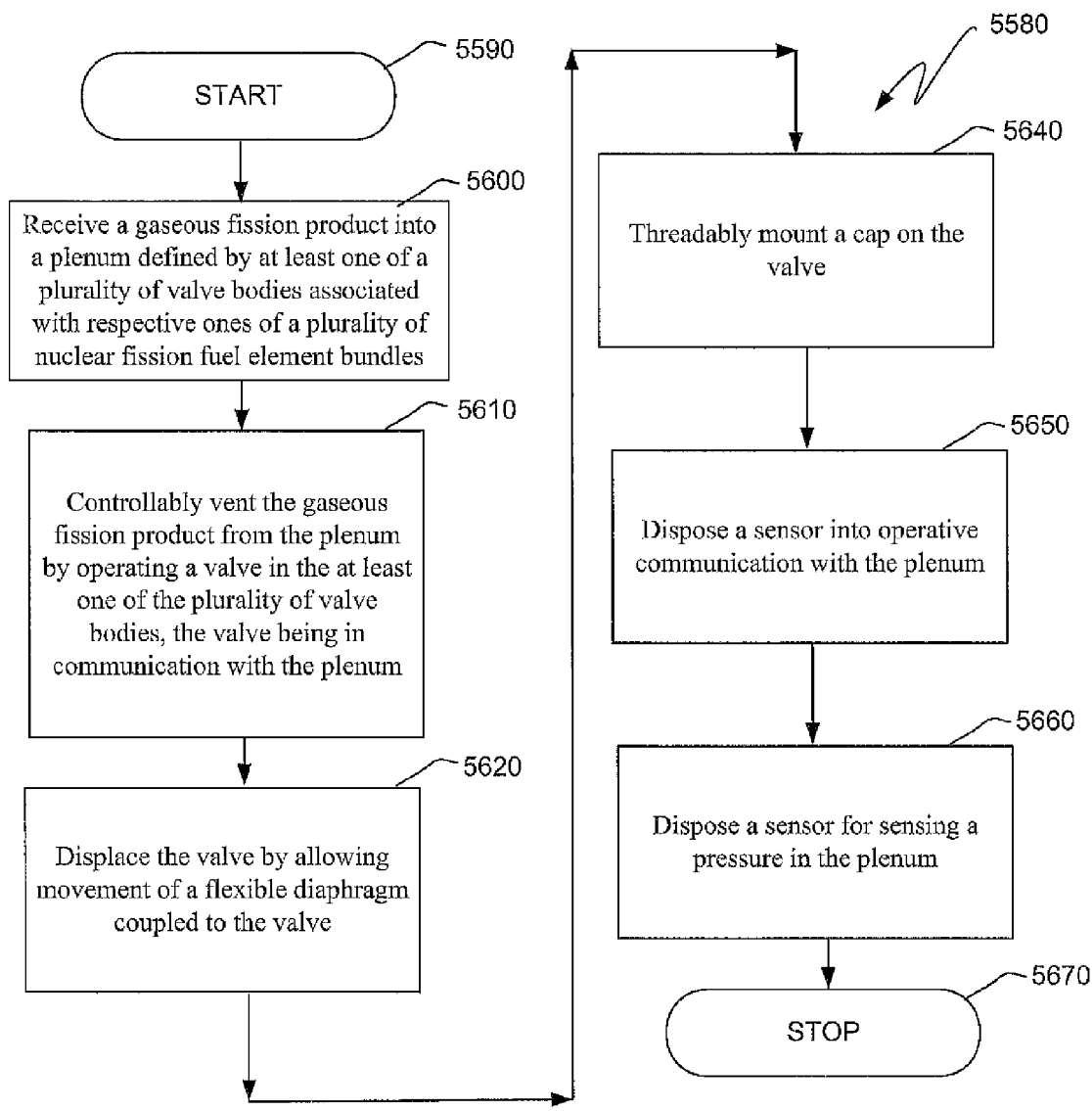

In FIG. 55, an illustrative method 5580 of operating a nuclear fission reactor starts at a block 5590. At a block 5600, the method comprises receiving a gaseous fission product into a plenum defined by at least one of a plurality of valve bodies associated with respective ones of a plurality of nuclear fission fuel element bundles. At a block 5610, the gaseous fission product is controllably vented from the plenum by operating a valve in the at least one of the plurality of valve bodies, the valve being in communication with the plenum. At a block 5620, the valve is displaced by allowing movement of a flexible diaphragm coupled to the valve. At a block 5640, a cap is threadably mounted on the valve. At a block 5650, a sensor is disposed into operative communication with the plenum. At a block 5660, a sensor is disposed for sensing a pressure in the plenum. The method stops at a block 5670.

Figure 56:
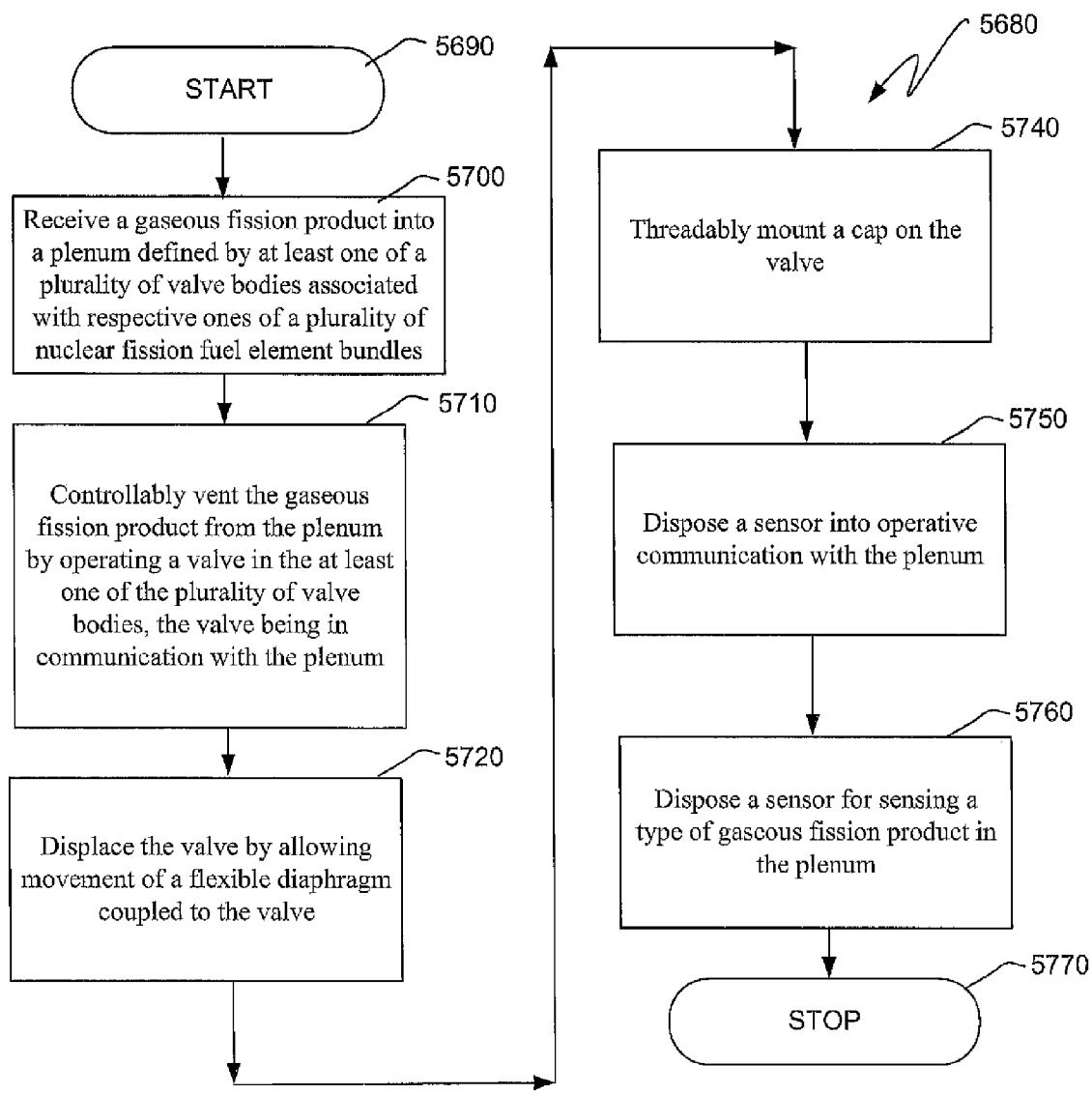

In FIG. 56, an illustrative method 5680 of operating a nuclear fission reactor starts at a block 5690. At a block 5700, the method comprises receiving a gaseous fission product into a plenum defined by at least one of a plurality of valve bodies associated with respective ones of a plurality of nuclear fission fuel element bundles. At a block 5710, the gaseous fission product is controllably vented from the plenum by operating a valve in the at least one of the plurality of valve bodies, the valve being in communication with the plenum. At a block 5720, the valve is displaced by allowing movement of a flexible diaphragm coupled to the valve. At a block 5740, a cap is threadably mounted on the valve. At a block 5750, a sensor is disposed into operative communication with the plenum. At a block 5760, a sensor is disposed for sensing a type of gaseous fission product in the plenum. The method stops at a block 5770.

Figure 56A:
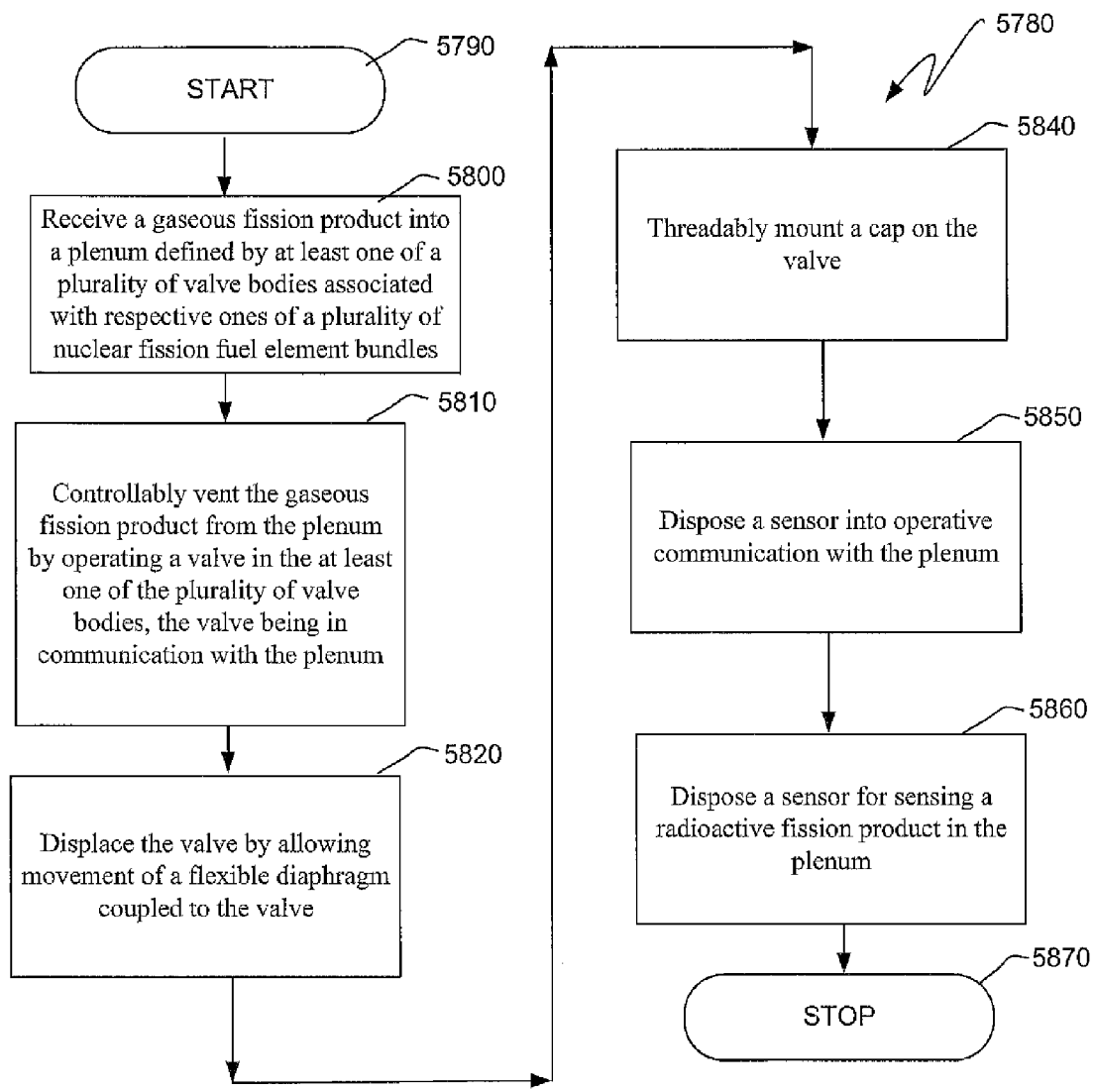

In FIG. 56A, an illustrative method 5780 of operating a nuclear fission reactor starts at a block 5790. At a block 5800, the method comprises receiving a gaseous fission product into a plenum defined by at least one of a plurality of valve bodies associated with respective ones of a plurality of nuclear fission fuel element bundles. At a block 5810, the gaseous fission product is controllably vented from the plenum by operating a valve in the at least one of the plurality of valve bodies, the valve being in communication with the plenum. At a block 5820, the valve is displaced by allowing movement of a flexible diaphragm coupled to the valve. At a block 5840, a cap is threadably mounted on the valve. At a block 5850, a sensor is disposed into operative communication with the plenum. At a block 5860, a sensor is disposed for sensing a radioactive fission product in the plenum. The method stops at a block 5870.

Figure 56B:
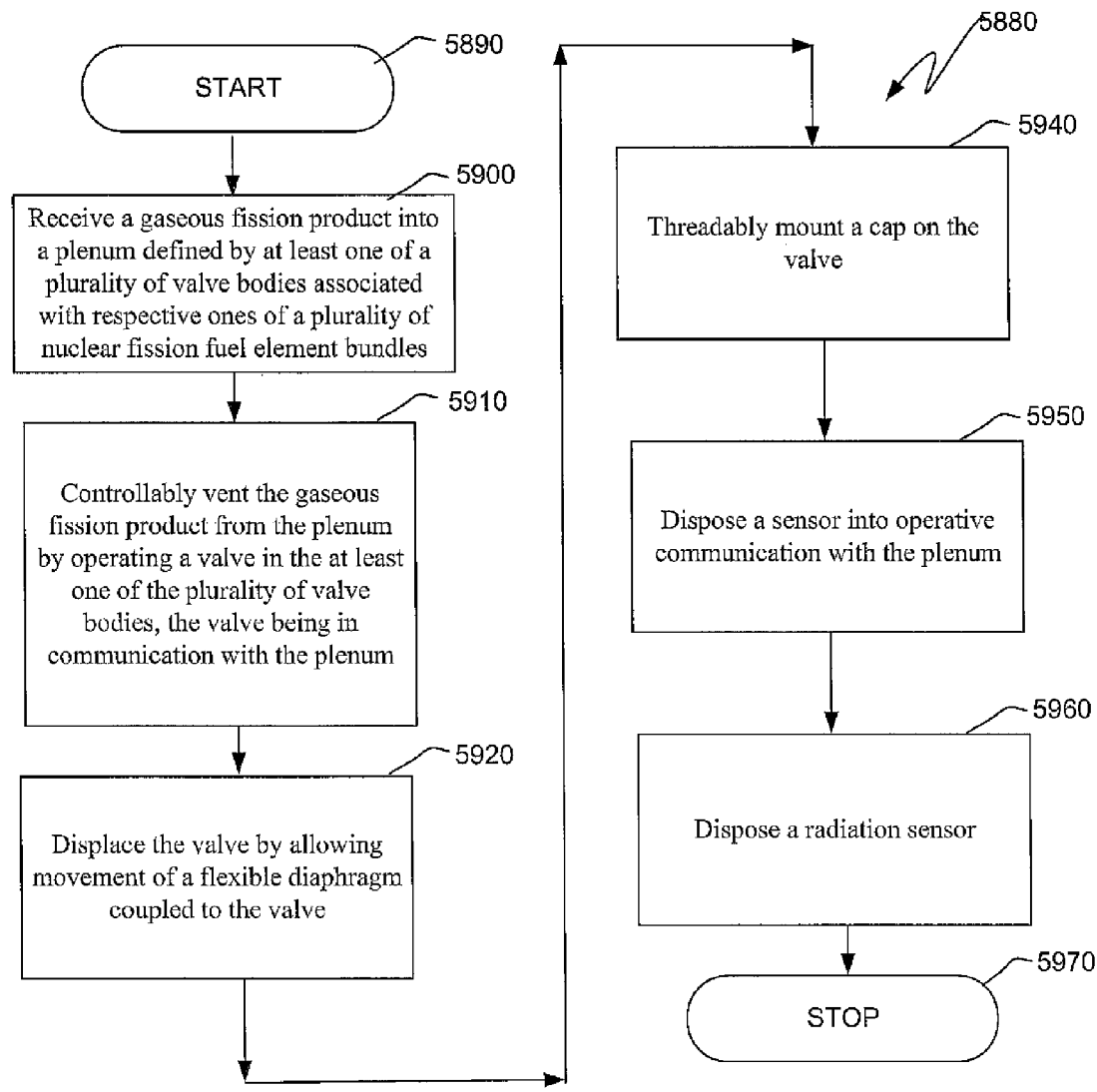

In FIG. 56B, an illustrative method 5880 of operating a nuclear fission reactor starts at a block 5890. At a block 5900, the method comprises receiving a gaseous fission product into a plenum defined by at least one of a plurality of valve bodies associated with respective ones of a plurality of nuclear fission fuel element bundles. At a block 5910, the gaseous fission product is controllably vented from the plenum by operating a valve in the at least one of the plurality of valve bodies, the valve being in communication with the plenum. At a block 5920, the valve is displaced by allowing movement of a flexible diaphragm coupled to the valve. At a block 5940, a cap is threadably mounted on the valve. At a block 5950, a sensor is disposed into operative communication with the plenum. At a block 5960, a radiation sensor is disposed. The method stops at a block 5970.

Figure 56C:
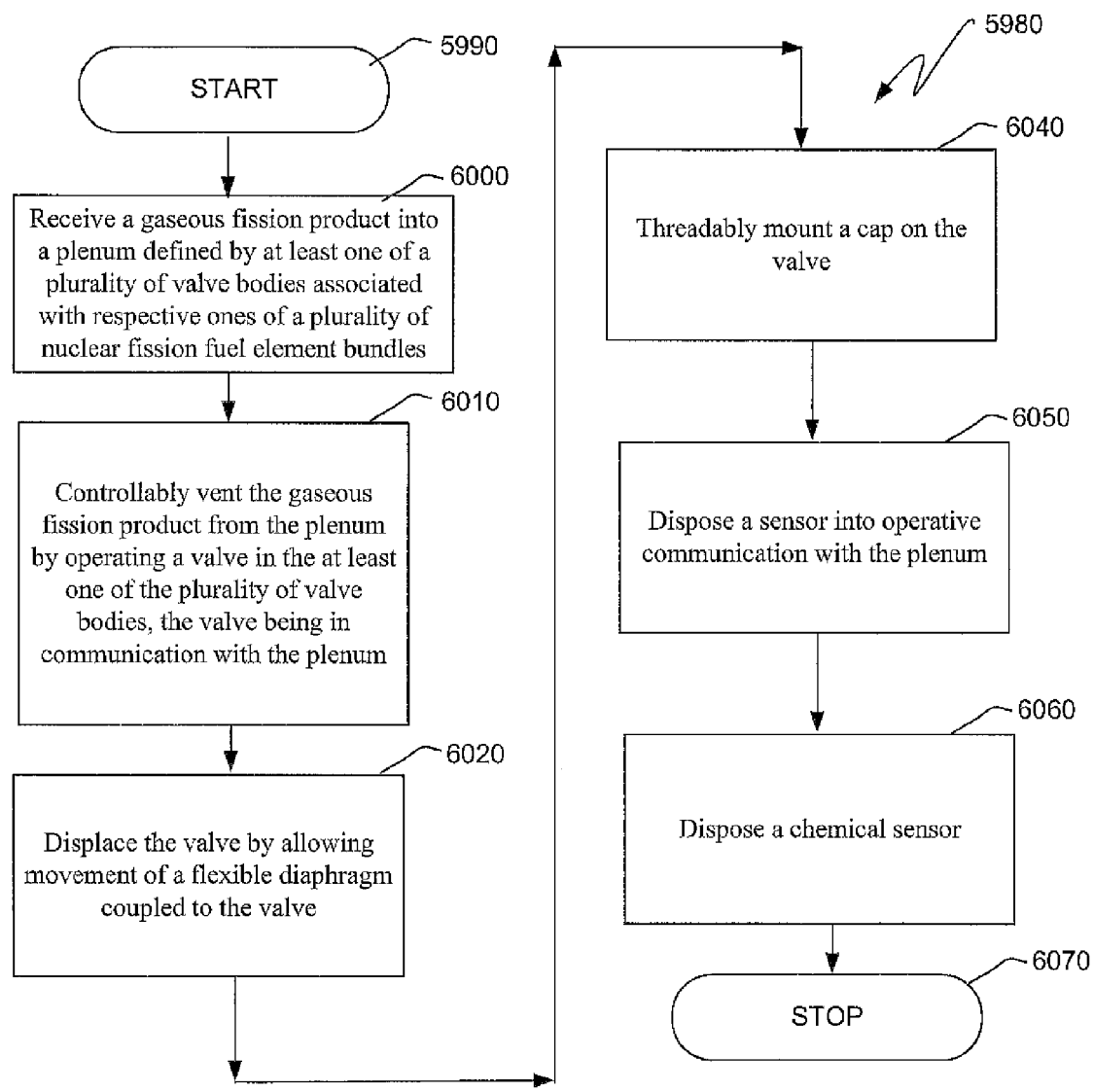

In FIG. 56C, an illustrative method 5980 of operating a nuclear fission reactor starts at a block 5990. At a block 6000, the method comprises receiving a gaseous fission product into a plenum defined by at least one of a plurality of valve bodies associated with respective ones of a plurality of nuclear fission fuel element bundles. At a block 6010, the gaseous fission product is controllably vented from the plenum by operating a valve in the at least one of the plurality of valve bodies, the valve being in communication with the plenum. At a block 6020, the valve is displaced by allowing movement of a flexible diaphragm coupled to the valve. At a block 6040, a cap is threadably mounted on the valve. At a block 6050, a sensor is disposed into operative communication with the plenum. At a block 6060, a chemical sensor is disposed. The method stops at a block 6070.

Figure 56D:
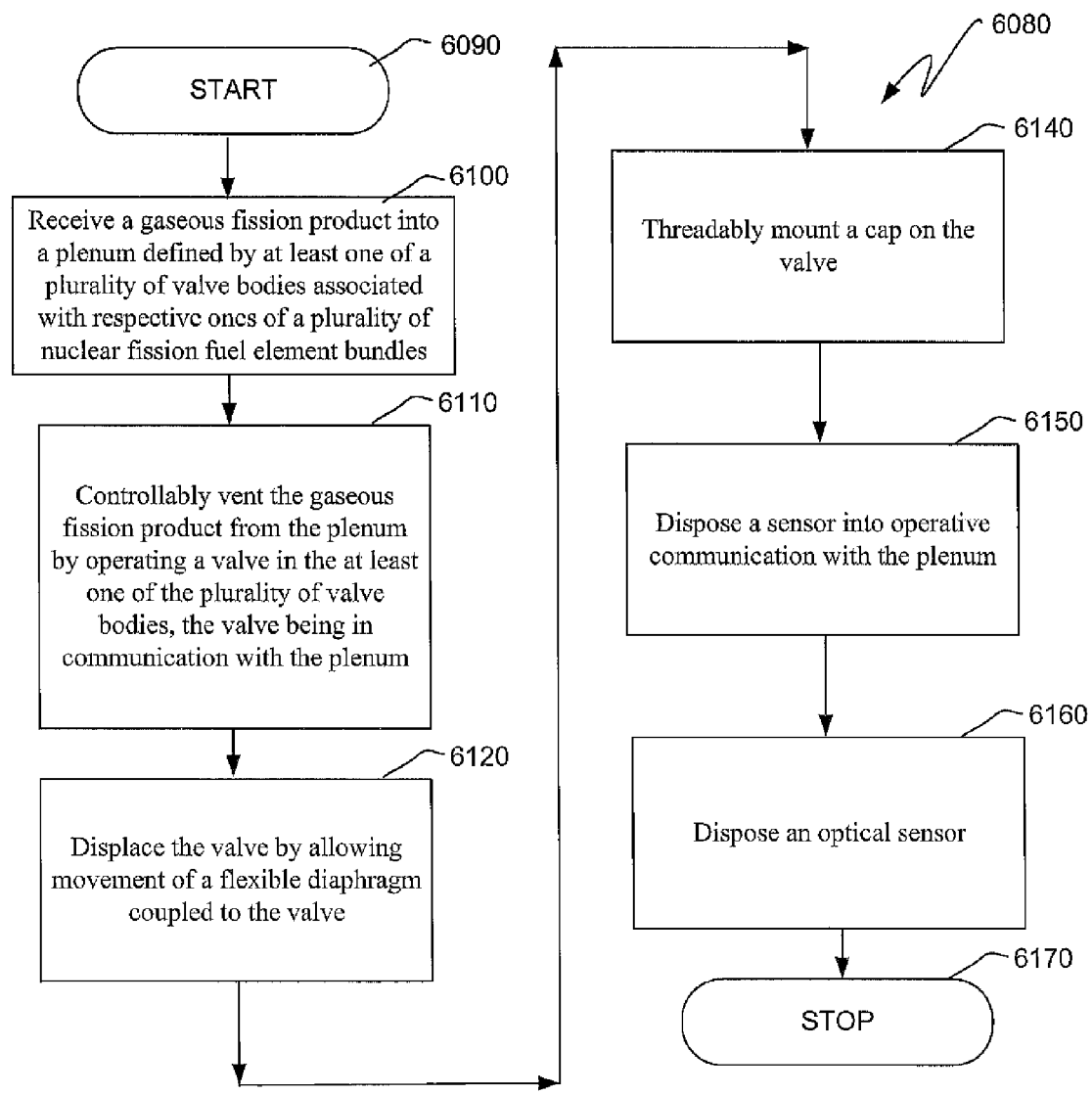

In FIG. 56D, an illustrative method 6080 of operating a nuclear fission reactor starts at a block 6090. At a block 6100, the method comprises receiving a gaseous fission product into a plenum defined by at least one of a plurality of valve bodies associated with respective ones of a plurality of nuclear fission fuel element bundles. At a block 6110, the gaseous fission product is controllably vented from the plenum by operating a valve in the at least one of the plurality of valve bodies, the valve being in communication with the plenum. At a block 6120, the valve is displaced by allowing movement of a flexible diaphragm coupled to the valve. At a block 6140, a cap is threadably mounted on the valve. At a block 6150, a sensor is disposed into operative communication with the plenum. At a block 6160, an optical sensor is disposed. The method stops at a block 6170.

Figure 56E:
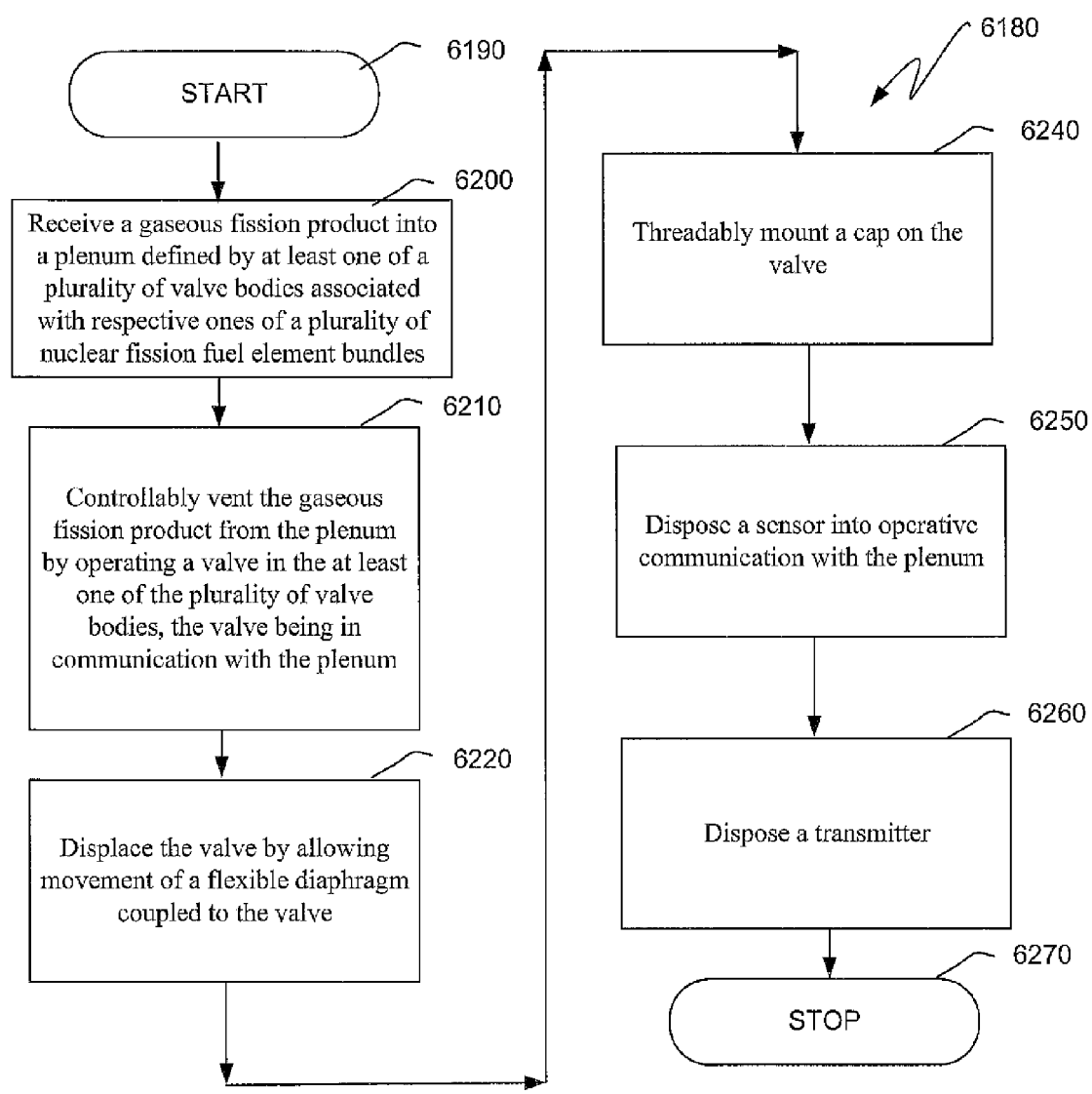

In FIG. 56E, an illustrative method 6180 of operating a nuclear fission reactor starts at a block 6190. At a block 6200, the method comprises receiving a gaseous fission product into a plenum defined by at least one of a plurality of valve bodies associated with respective ones of a plurality of nuclear fission fuel element bundles. At a block 6210, the gaseous fission product is controllably vented from the plenum by operating a valve in the at least one of the plurality of valve bodies, the valve being in communication with the plenum. At a block 6220, the valve is displaced by allowing movement of a flexible diaphragm coupled to the valve. At a block 6240, a cap is threadably mounted on the valve. At a block 6250, a sensor is disposed into operative communication with the plenum. At a block 6260, a transmitter is disposed. The method stops at a block 6270.

Figure 57:
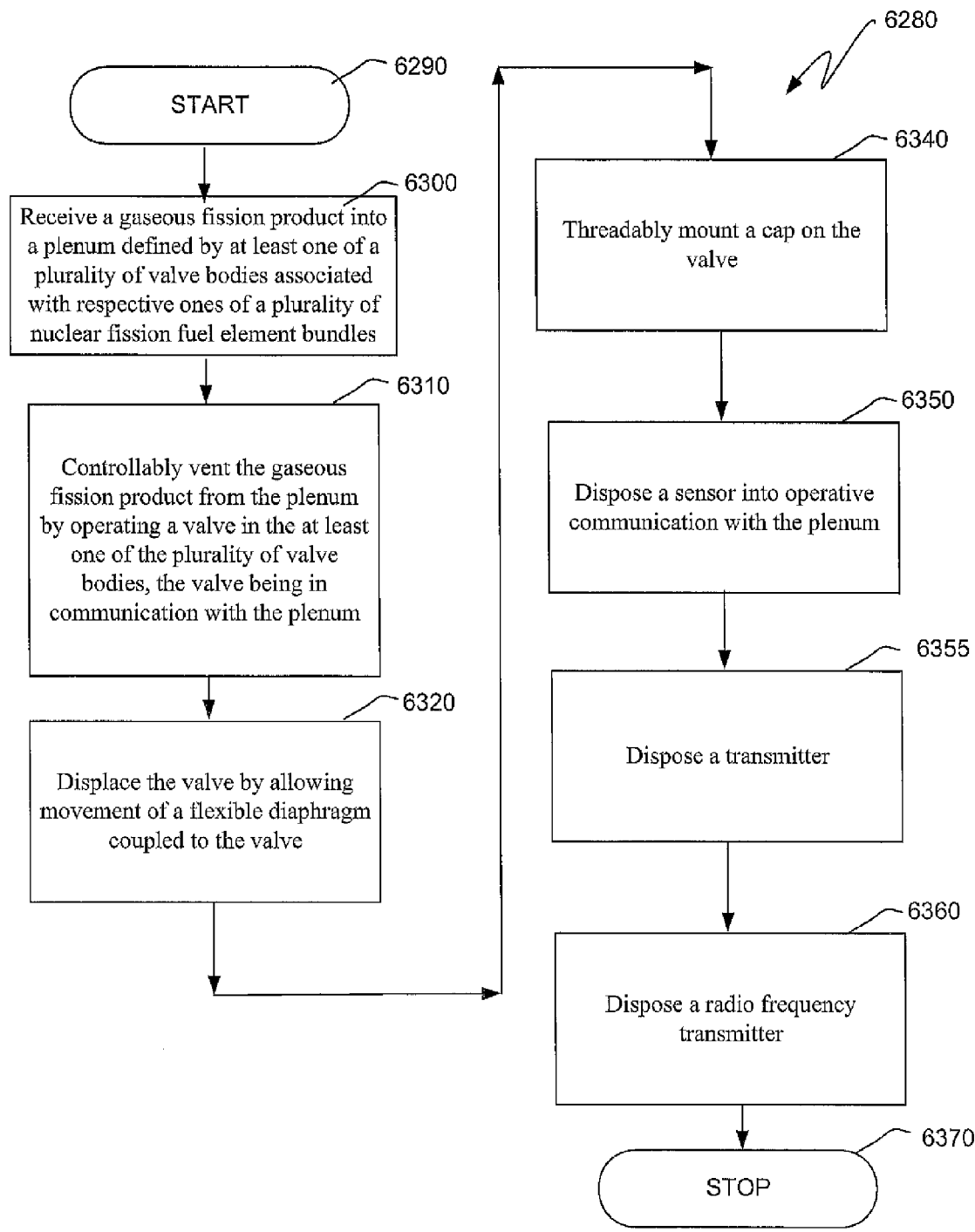

In FIG. 57, an illustrative method 6280 of operating a nuclear fission reactor starts at a block 6290. At a block 6300, the method comprises receiving a gaseous fission product into a plenum defined by at least one of a plurality of valve bodies associated with respective ones of a plurality of nuclear fission fuel element bundles. At a block 6310, the gaseous fission product is controllably vented from the plenum by operating a valve in the at least one of the plurality of valve bodies, the valve being in communication with the plenum. At a block 6320, the valve is displaced by allowing movement of a flexible diaphragm coupled to the valve. At a block 6340, a cap is threadably mounted on the valve. At a block 6350, a sensor is disposed into operative communication with the plenum. At a block 6355, a transmitter is disposed. At a block 6360, a radio frequency transmitter is disposed. The method stops at a block 6370.

Figure 58:
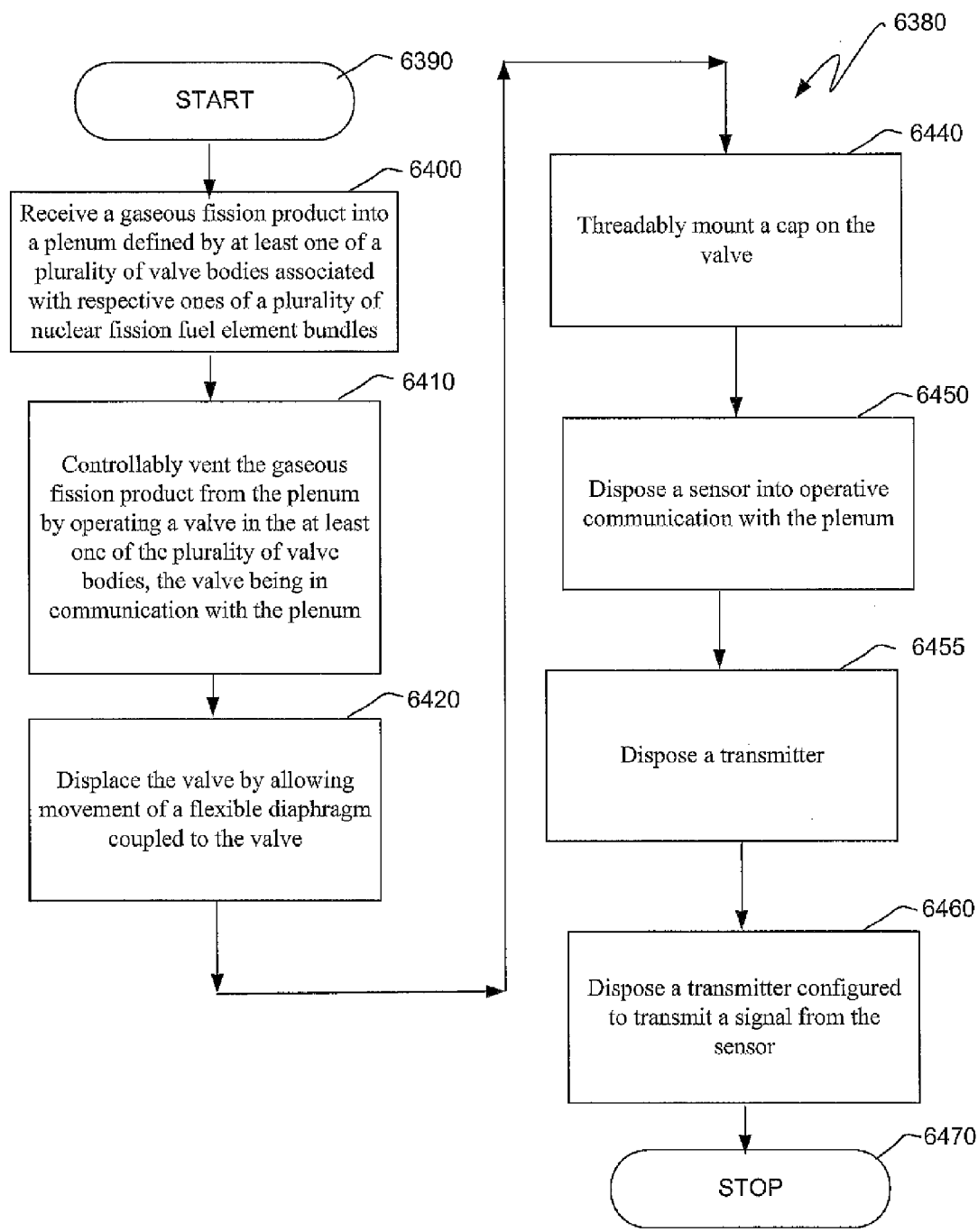

In FIG. 58, an illustrative method 6380 of operating a nuclear fission reactor starts at a block 6390. At a block 6400, the method comprises receiving a gaseous fission product into a plenum defined by at least one of a plurality of valve bodies associated with respective ones of a plurality of nuclear fission fuel element bundles. At a block 6410, the gaseous fission product is controllably vented from the plenum by operating a valve in the at least one of the plurality of valve bodies, the valve being in communication with the plenum. At a block 6420, the valve is displaced by allowing movement of a flexible diaphragm coupled to the valve. At a block 6440, a cap is threadably mounted on the valve. At a block 6450, a sensor is disposed into operative communication with the plenum. At a block 6455, a transmitter is disposed. At a block 6460, a transmitter is disposed that is configured to transmit a signal from the sensor. The method stops at a block 6470.

Figure 59:
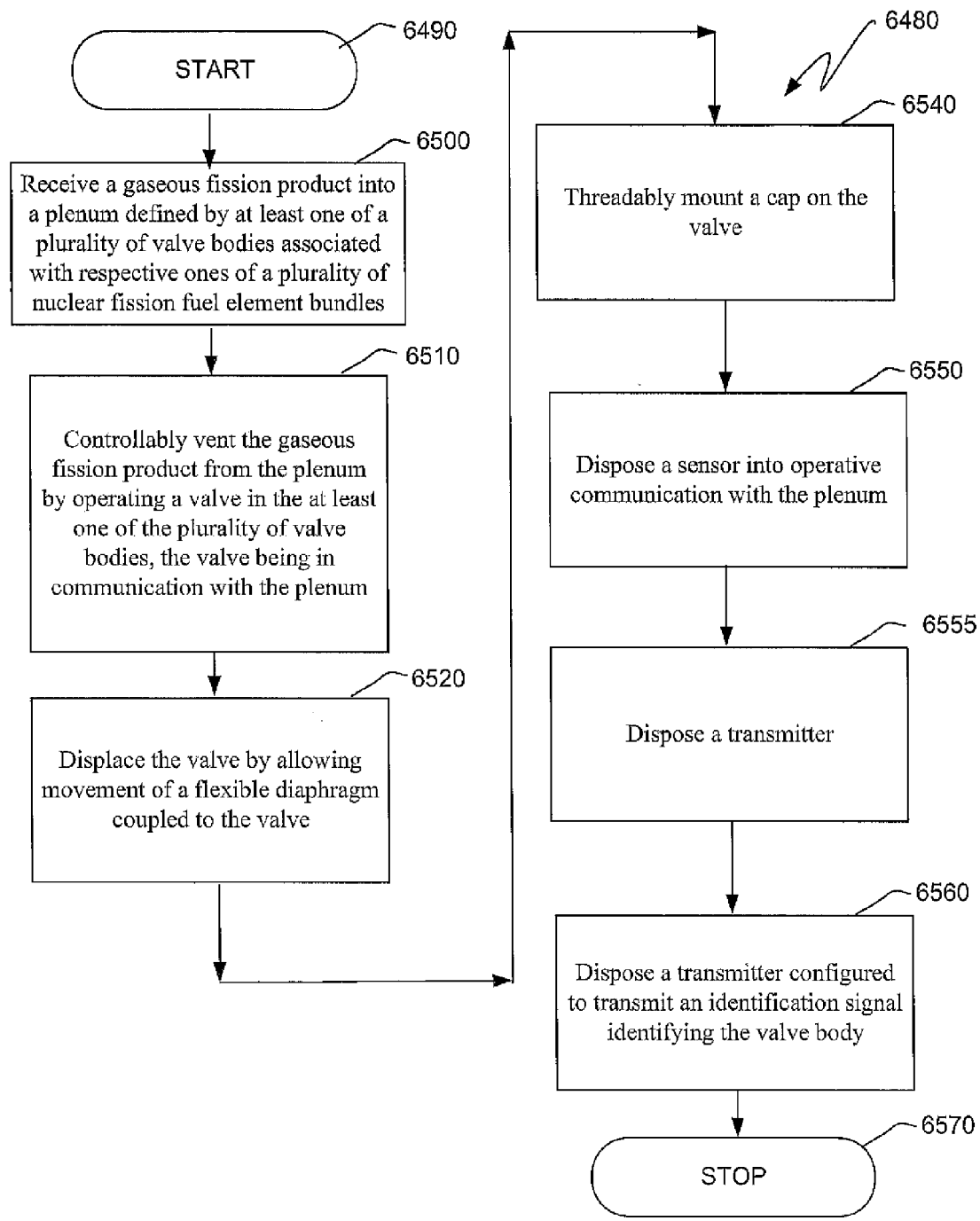

In FIG. 59, an illustrative method 6480 of operating a nuclear fission reactor starts at a block 6490. At a block 6500, the method comprises receiving a gaseous fission product into a plenum defined by at least one of a plurality of valve bodies associated with respective ones of a plurality of nuclear fission fuel element bundles. At a block 6510, the gaseous fission product is controllably vented from the plenum by operating a valve in the at least one of the plurality of valve bodies, the valve being in communication with the plenum. At a block 6520, the valve is displaced by allowing movement of a flexible diaphragm coupled to the valve. At a block 6540, a cap is threadably mounted on the valve. At a block 6550, a sensor is disposed into operative communication with the plenum. At a block 6555, a transmitter is disposed. At a block 6560, a transmitter is disposed that is configured to transmit an identification signal identifying the valve body. The method stops at a block 6570.

Figure 59A:
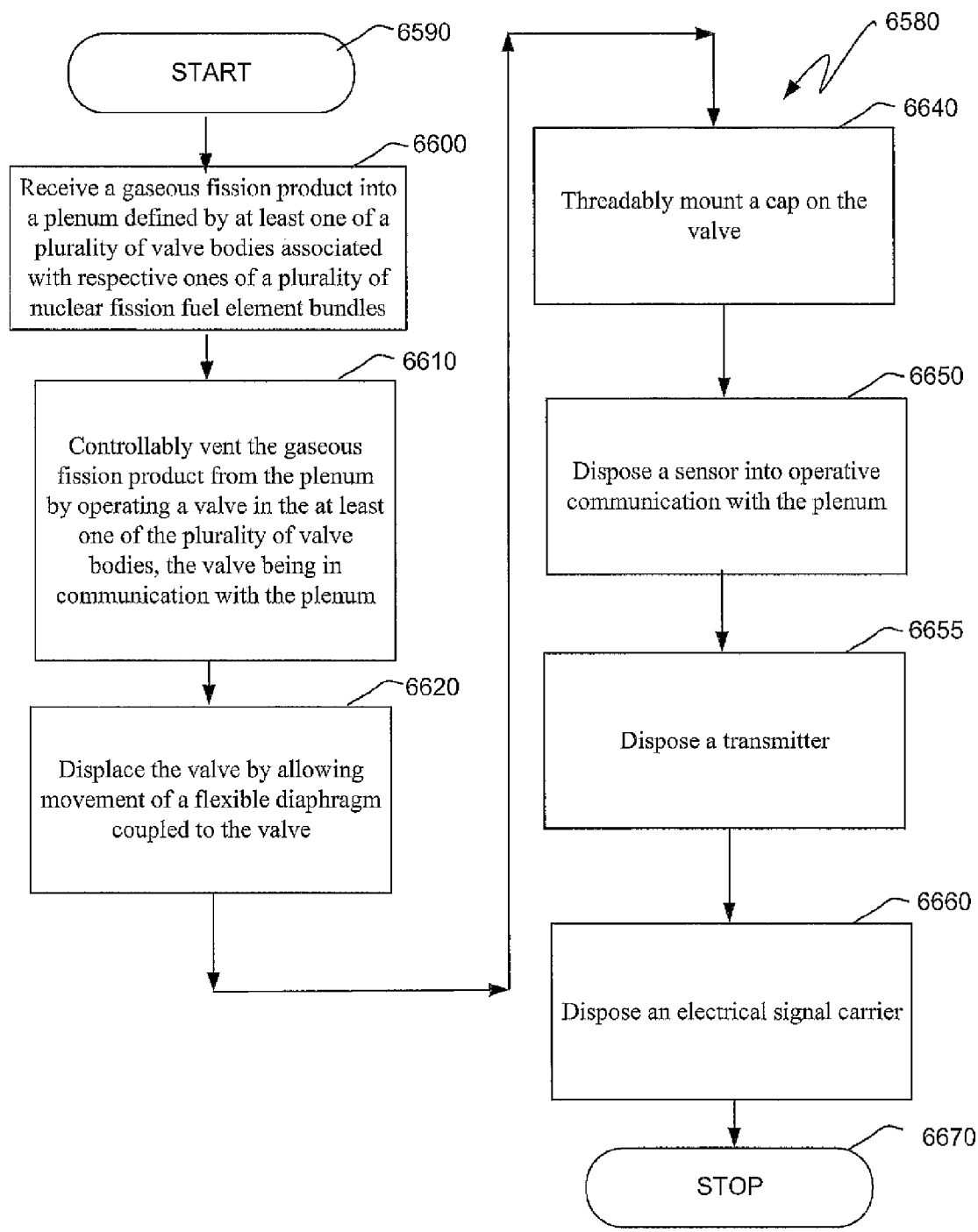

In FIG. 59A, an illustrative method 6580 of operating a nuclear fission reactor starts at a block 6590. At a block 6600, the method comprises receiving a gaseous fission product into a plenum defined by at least one of a plurality of valve bodies associated with respective ones of a plurality of nuclear fission fuel element bundles. At a block 6610, the gaseous fission product is controllably vented from the plenum by operating a valve in the at least one of the plurality of valve bodies, the valve being in communication with the plenum. At a block 6620, the valve is displaced by allowing movement of a flexible diaphragm coupled to the valve. At a block 6640, a cap is threadably mounted on the valve. At a block 6650, a sensor is disposed into operative communication with the plenum. At a block 6655, a transmitter is disposed. At a block 6660, an electrical signal carrier is disposed. The method stops at a block 6670.

Figure 59B:
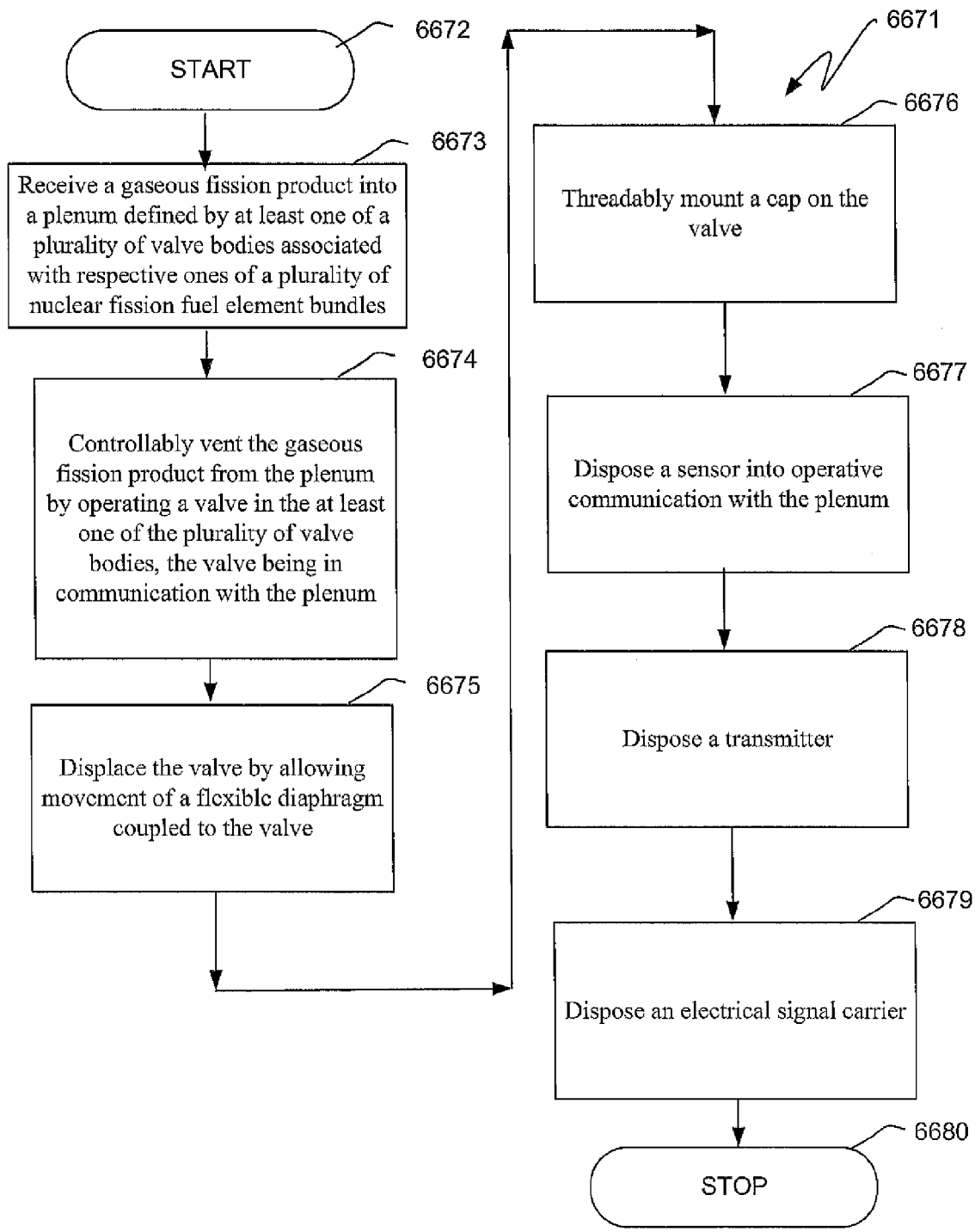

In FIG. 59B, an illustrative method 6671 of operating a nuclear fission reactor starts at a block 6672. At a block 6673, the method comprises receiving a gaseous fission product into a plenum defined by at least one of a plurality of valve bodies associated with respective ones of a plurality of nuclear fission fuel element bundles. At a block 6674, the gaseous fission product is controllably vented from the plenum by operating a valve in the at least one of the plurality of valve bodies, the valve being in communication with the plenum. At a block 6675, the valve is displaced by allowing movement of a flexible diaphragm coupled to the valve. At a block 6676, a cap is threadably mounted on the valve. At a block 6677, a sensor is disposed into operative communication with the plenum. At a block 6678, a transmitter is disposed. At a block 6679, an electrical signal carrier is disposed. The method stops at a block 6680.

Figure 59C:
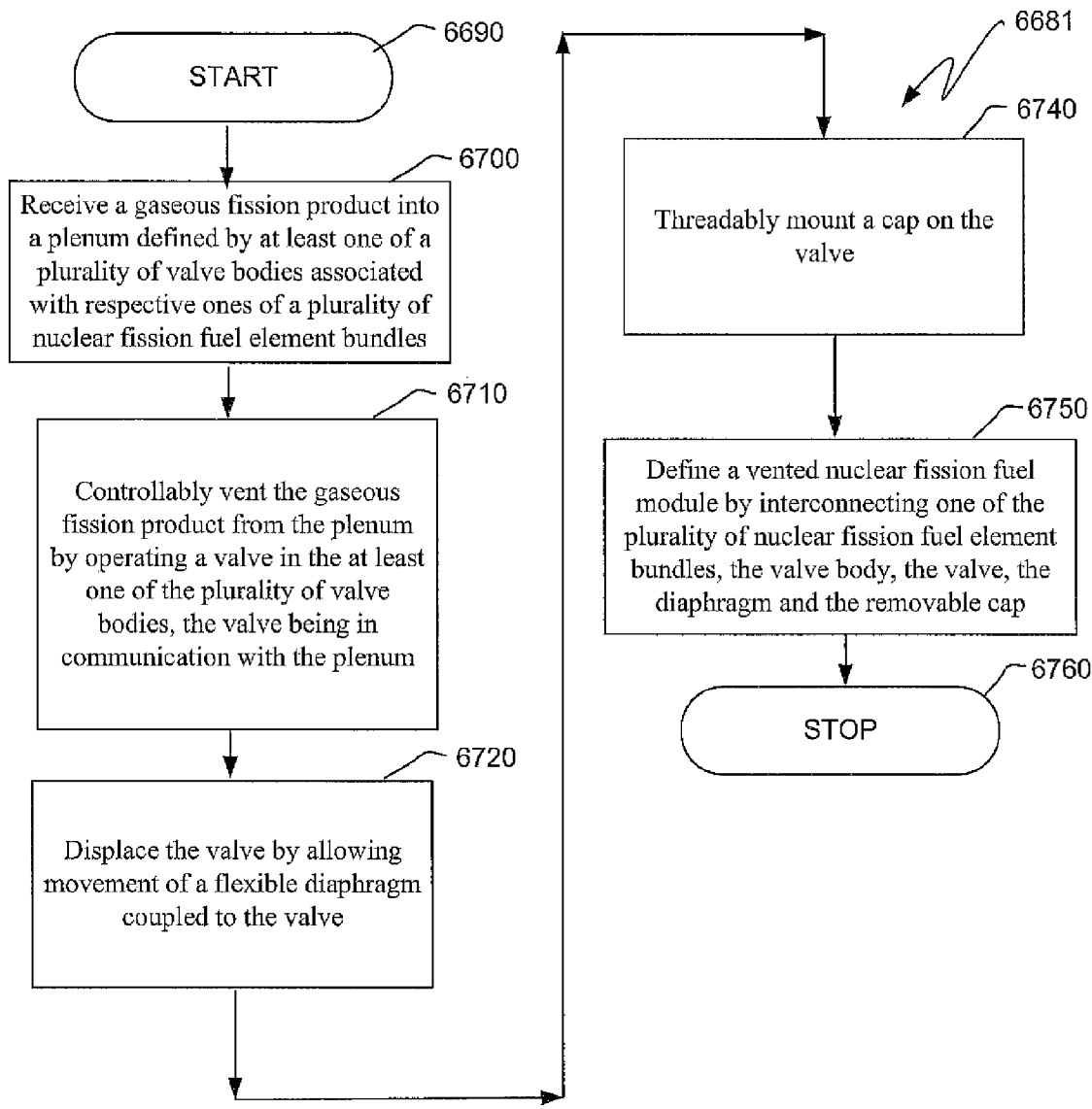

In FIG. 59C, an illustrative method 6681 of operating a nuclear fission reactor starts at a block 6690. At a block 6700, the method comprises receiving a gaseous fission product into a plenum defined by at least one of a plurality of valve bodies associated with respective ones of a plurality of nuclear fission fuel element bundles. At a block 6710, the gaseous fission product is controllably vented from the plenum by operating a valve in the at least one of the plurality of valve bodies, the valve being in communication with the plenum. At a block 6720, the valve is displaced by allowing movement of a flexible diaphragm coupled to the valve. At a block 6740, a cap is threadably mounted on the valve. At a block 6750, a vented nuclear fission fuel module is defined by interconnecting one of the plurality of nuclear fission fuel element bundles, the valve body, the valve, the diaphragm and the removable cap. The method stops at a block 6760.

Figure 60:
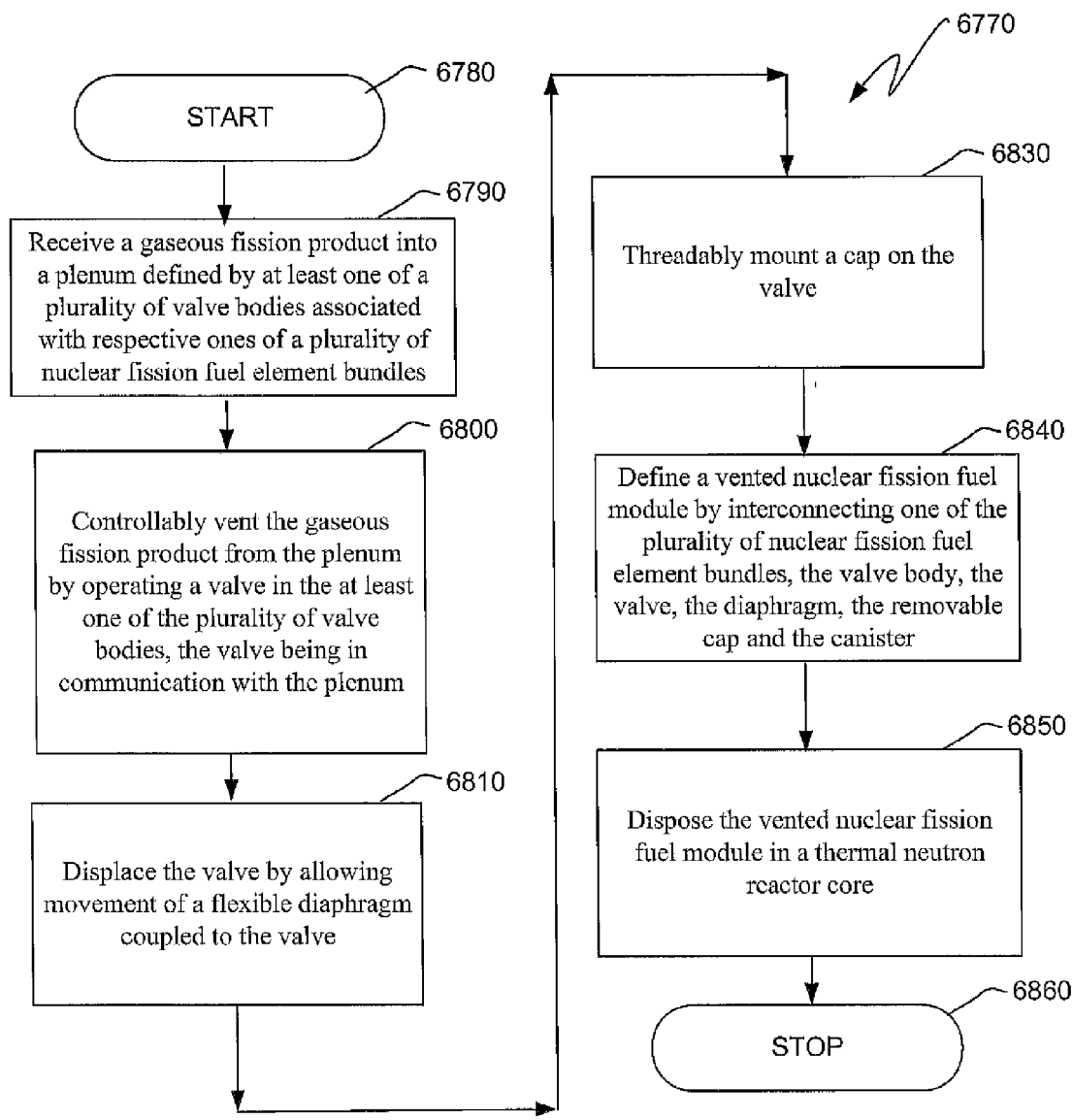

In FIG. 60, an illustrative method 6770 of operating a nuclear fission reactor starts at a block 6780. At a block 6790, the method comprises receiving a gaseous fission product into a plenum defined by at least one of a plurality of valve bodies associated with respective ones of a plurality of nuclear fission fuel element bundles. At a block 6800, the gaseous fission product is controllably vented from the plenum by operating a valve in the at least one of the plurality of valve bodies, the valve being in communication with the plenum. At a block 6810, the valve is displaced by allowing movement of a flexible diaphragm coupled to the valve. At a block 6830, a cap is threadably mounted on the valve. At a block 6840, a vented nuclear fission fuel module is defined by interconnecting one of the plurality of nuclear fission fuel element bundles, the valve body, the valve, the diaphragm and the removable cap. At a block 6850, the vented nuclear fission fuel module is disposed in a thermal neutron reactor core. The method stops at a block 6860.

Figure 61:
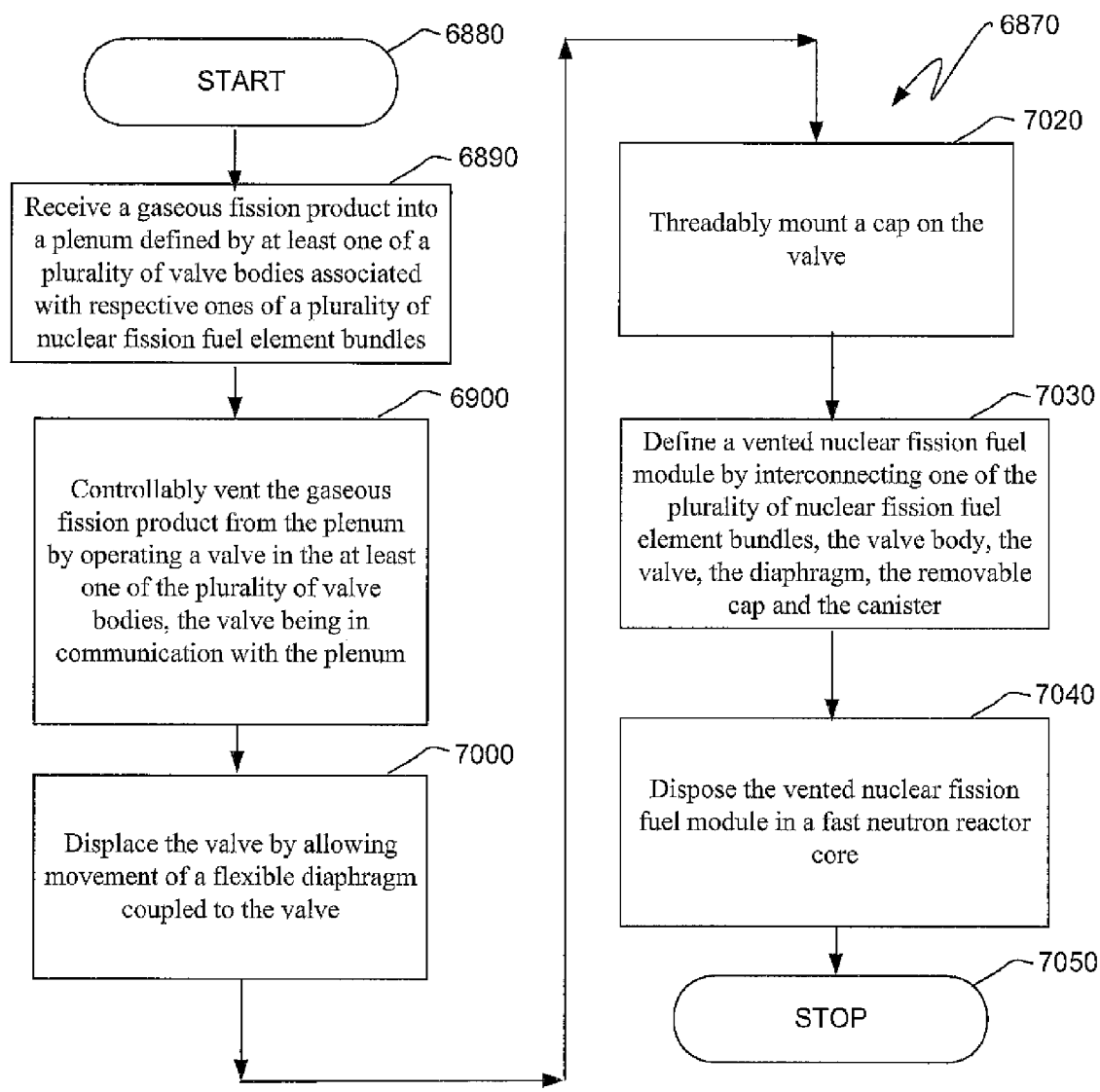

In FIG. 61, an illustrative method 6870 of operating a nuclear fission reactor starts at a block 6880. At a block 6890, the method comprises receiving a gaseous fission product into a plenum defined by at least one of a plurality of valve bodies associated with respective ones of a plurality of nuclear fission fuel element bundles. At a block 6900, the gaseous fission product is controllably vented from the plenum by operating a valve in the at least one of the plurality of valve bodies, the valve being in communication with the plenum. At a block 7000, the valve is displaced by allowing movement of a flexible diaphragm coupled to the valve. At a block 7020, a cap is threadably mounted on the valve. At a block 7030, a vented nuclear fission fuel module is defined by interconnecting one of the plurality of nuclear fission fuel element bundles, the valve body, the valve, the diaphragm and the removable cap. At a block 7040, the vented nuclear fission fuel module is disposed in a fast neutron reactor core. The method stops at a block 7050.

Figure 62:
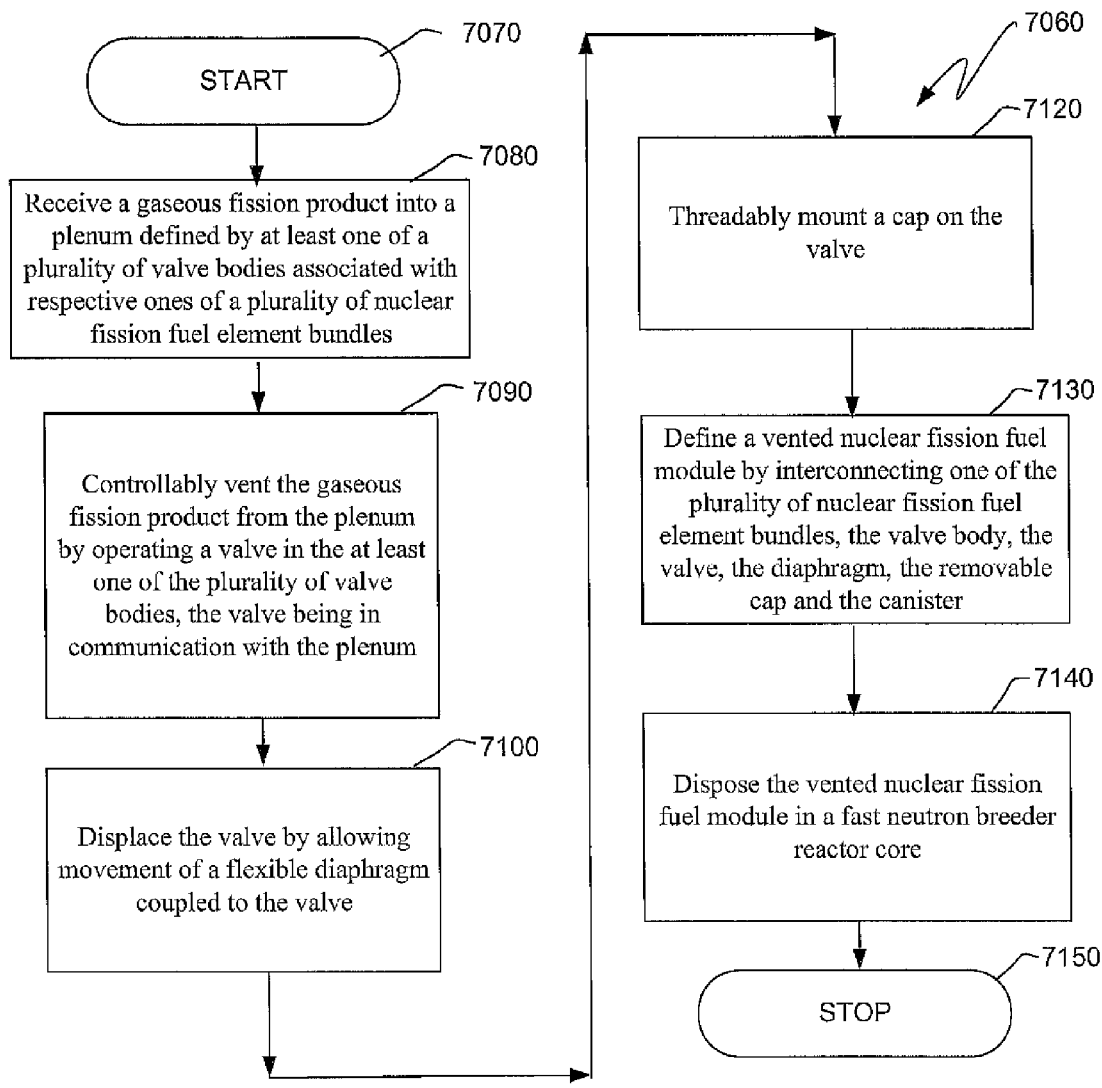

In FIG. 62, an illustrative method 7060 of operating a nuclear fission reactor starts at a block 7070. At a block 7080, the method comprises receiving a gaseous fission product into a plenum defined by at least one of a plurality of valve bodies associated with respective ones of a plurality of nuclear fission fuel element bundles. At a block 7090, the gaseous fission product is controllably vented from the plenum by operating a valve in the at least one of the plurality of valve bodies, the valve being in communication with the plenum. At a block 7100, the valve is displaced by allowing movement of a flexible diaphragm coupled to the valve. At a block 7120, a cap is threadably mounted on the valve. At a block 7130, a vented nuclear fission fuel module is defined by interconnecting one of the plurality of nuclear fission fuel element bundles, the valve body, the valve, the diaphragm and the removable cap. At a block 7140, the vented nuclear fission fuel module is disposed in a fast neutron breeder reactor core. The method stops at a block 7150.

Figure 63:
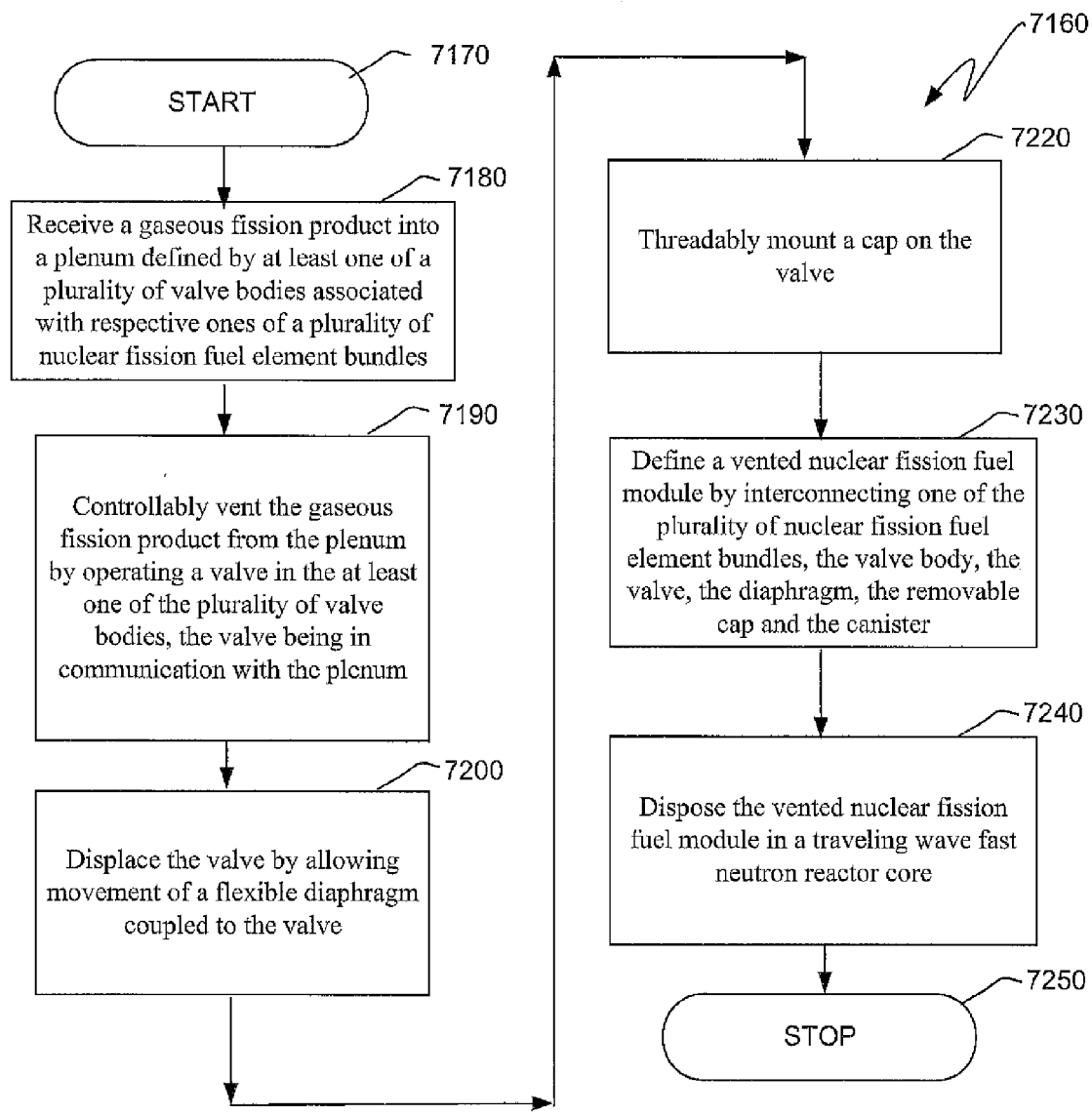

In FIG. 63, an illustrative method 7160 of operating a nuclear fission reactor starts at a block 7170. At a block 7180, the method comprises receiving a gaseous fission product into a plenum defined by at least one of a plurality of valve bodies associated with respective ones of a plurality of nuclear fission fuel element bundles. At a block 7190, the gaseous fission product is controllably vented from the plenum by operating a valve in the at least one of the plurality of valve bodies, the valve being in communication with the plenum. At a block 7200, the valve is displaced by allowing movement of a flexible diaphragm coupled to the valve. At a block 7220, a cap is threadably mounted on the valve. At a block 7230, a vented nuclear fission fuel module is defined by interconnecting one of the plurality of nuclear fission fuel element bundles, the valve body, the valve, the diaphragm and the removable cap. At a block 7240, the vented nuclear fission fuel module is disposed in a traveling wave fast neutron reactor core. The method stops at a block 7250.

Figure 64:
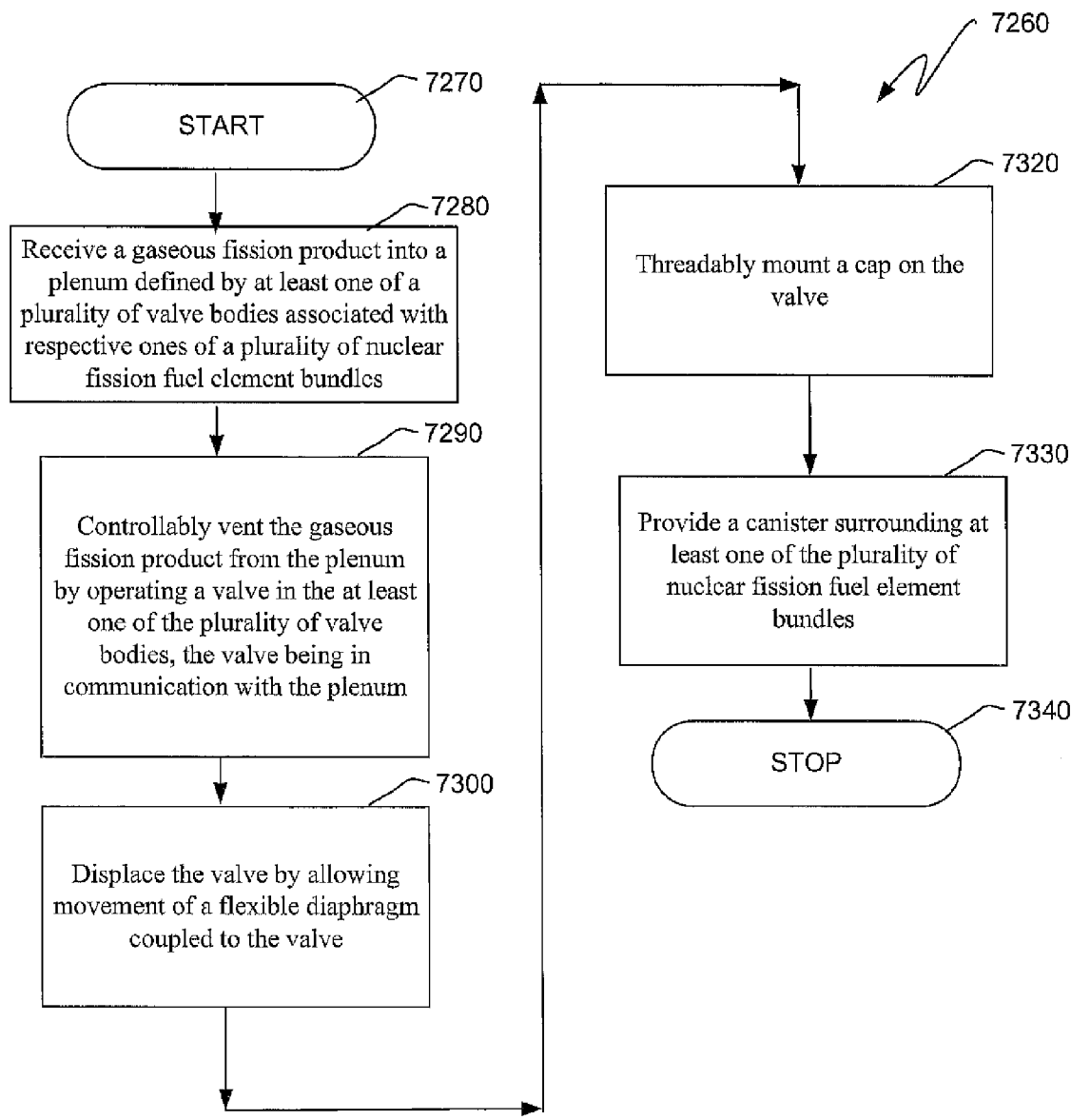

In FIG. 64, an illustrative method 7260 of operating a nuclear fission reactor starts at a block 7270. At a block 7280, the method comprises receiving a gaseous fission product into a plenum defined by at least one of a plurality of valve bodies associated with respective ones of a plurality of nuclear fission fuel element bundles. At a block 7290, the gaseous fission product is controllably vented from the plenum by operating a valve in the at least one of the plurality of valve bodies, the valve being in communication with the plenum. At a block 7300, the valve is displaced by allowing movement of a flexible diaphragm coupled to the valve. At a block 7320, a cap is threadably mounted on the valve. At a block 7330, a canister surrounding at least one of the plurality of nuclear fission fuel element bundles is provided. The method stops at a block 7340.

Figure 65:
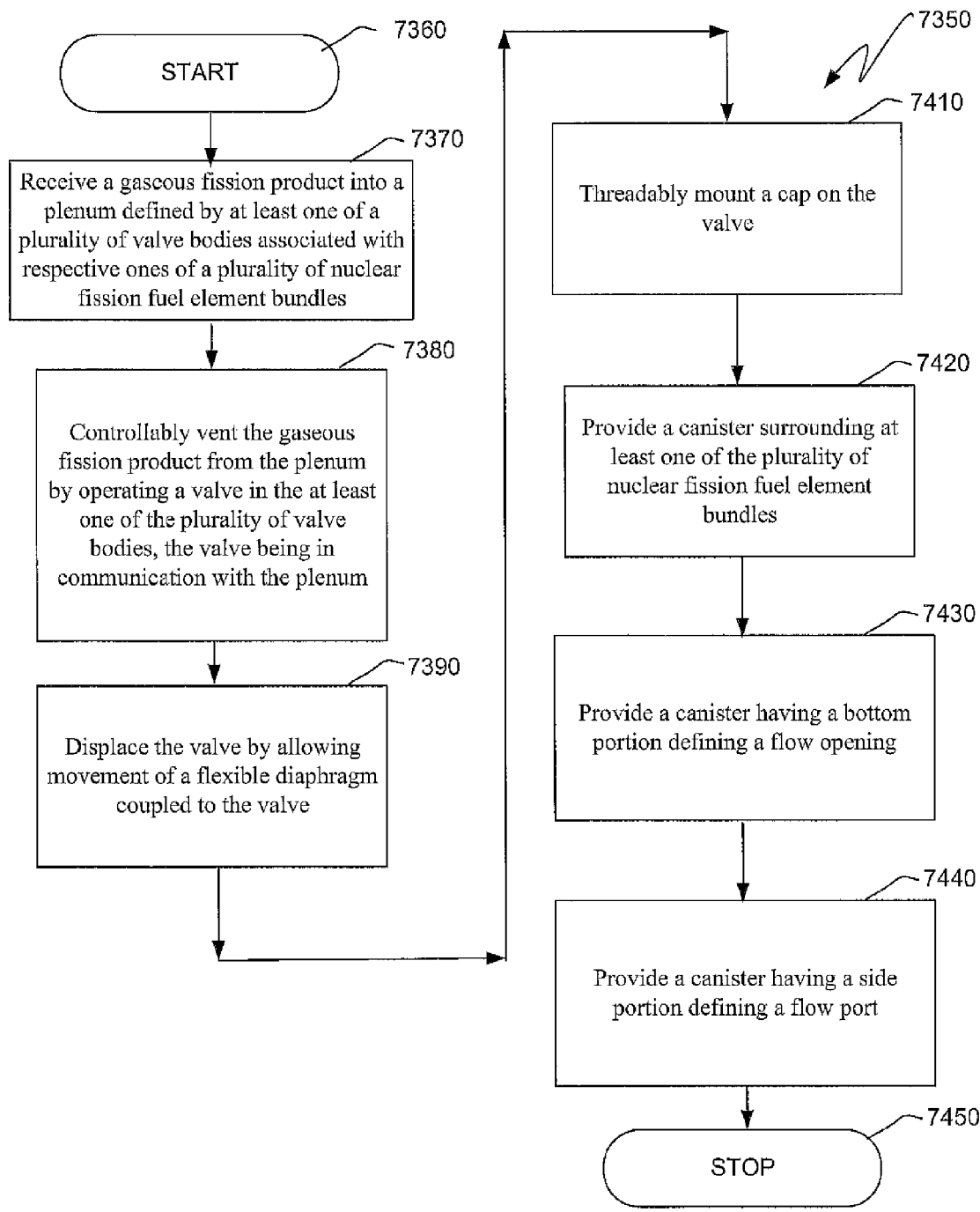

In FIG. 65, an illustrative method 7350 of operating a nuclear fission reactor starts at a block 7360. At a block 7370, the method comprises receiving a gaseous fission product into a plenum defined by at least one of a plurality of valve bodies associated with respective ones of a plurality of nuclear fission fuel element bundles. At a block 7380, the gaseous fission product is controllably vented from the plenum by operating a valve in the at least one of the plurality of valve bodies, the valve being in communication with the plenum. At a block 7390, the valve is displaced by allowing movement of a flexible diaphragm coupled to the valve. At a block 7410, a cap is threadably mounted on the valve. At a block 7420, a canister surrounding at least one of the plurality of nuclear fission fuel element bundles is provided. At a block 7440, a canister having a bottom portion defining a flow opening is provided. At a block 7440, a canister having a side portion defining a flow port is provided. The method stops at a block 7450.

Figure 66:
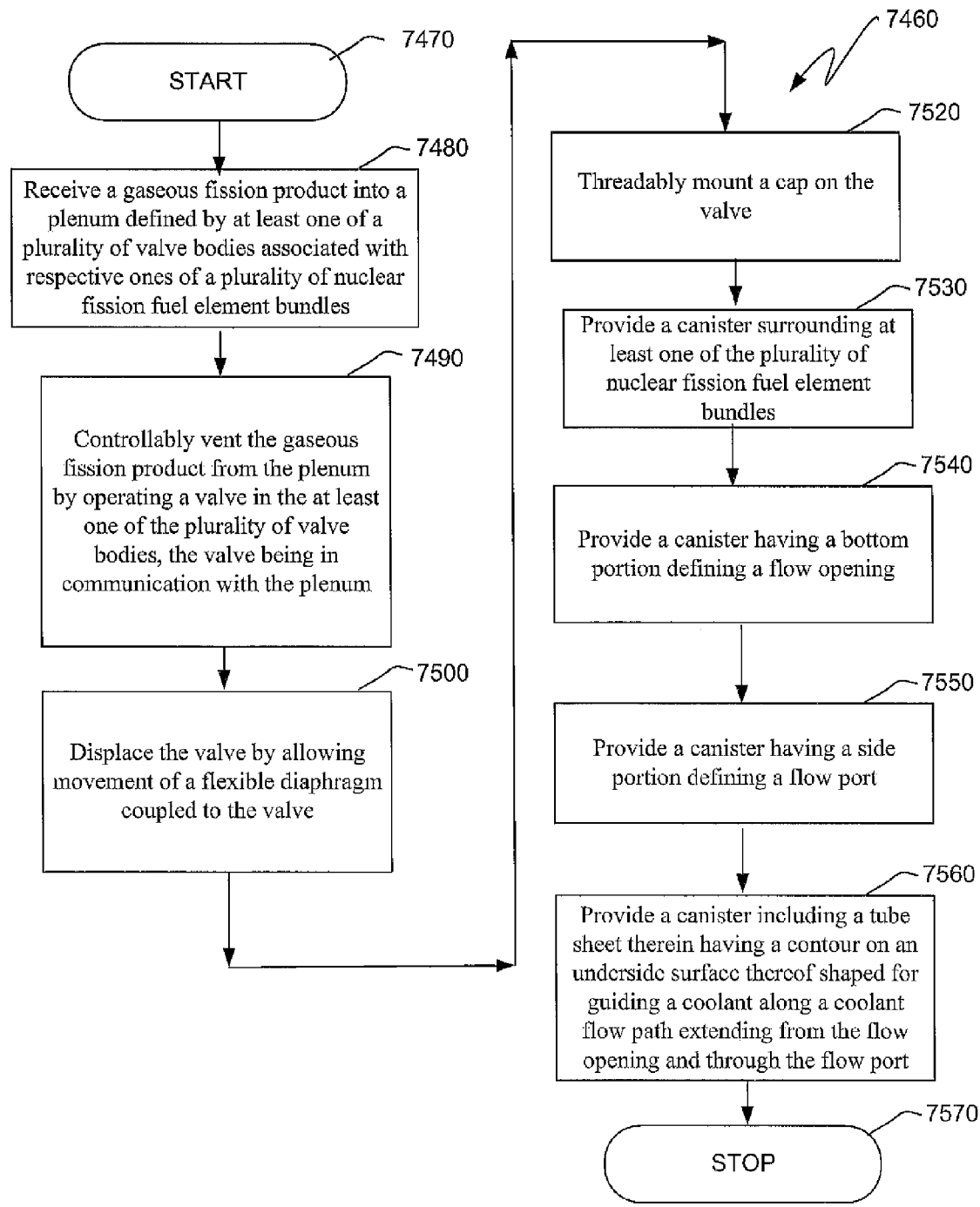

In FIG. 66, an illustrative method 7460 of operating a nuclear fission reactor starts at a block 7470. At a block 7480, the method comprises receiving a gaseous fission product into a plenum defined by at least one of a plurality of valve bodies associated with respective ones of a plurality of nuclear fission fuel element bundles. At a block 7490, the gaseous fission product is controllably vented from the plenum by operating a valve in the at least one of the plurality of valve bodies, the valve being in communication with the plenum. At a block 7500, the valve is displaced by allowing movement of a flexible diaphragm coupled to the valve. At a block 7520, a cap is threadably mounted on the valve. At a block 7530, a canister surrounding at least one of the plurality of nuclear fission fuel element bundles is provided. At a block 7540, a canister having a bottom portion defining a flow opening is provided. At a block 7550, a canister having a side portion defining a flow port is provided. At a block 7560, a canister is provided including a tube sheet therein having a contour on an underside surface thereof shaped for guiding a coolant along a coolant flow path extending from the flow opening and through the flow port. The method stops at a block 7570.

Figure 67:
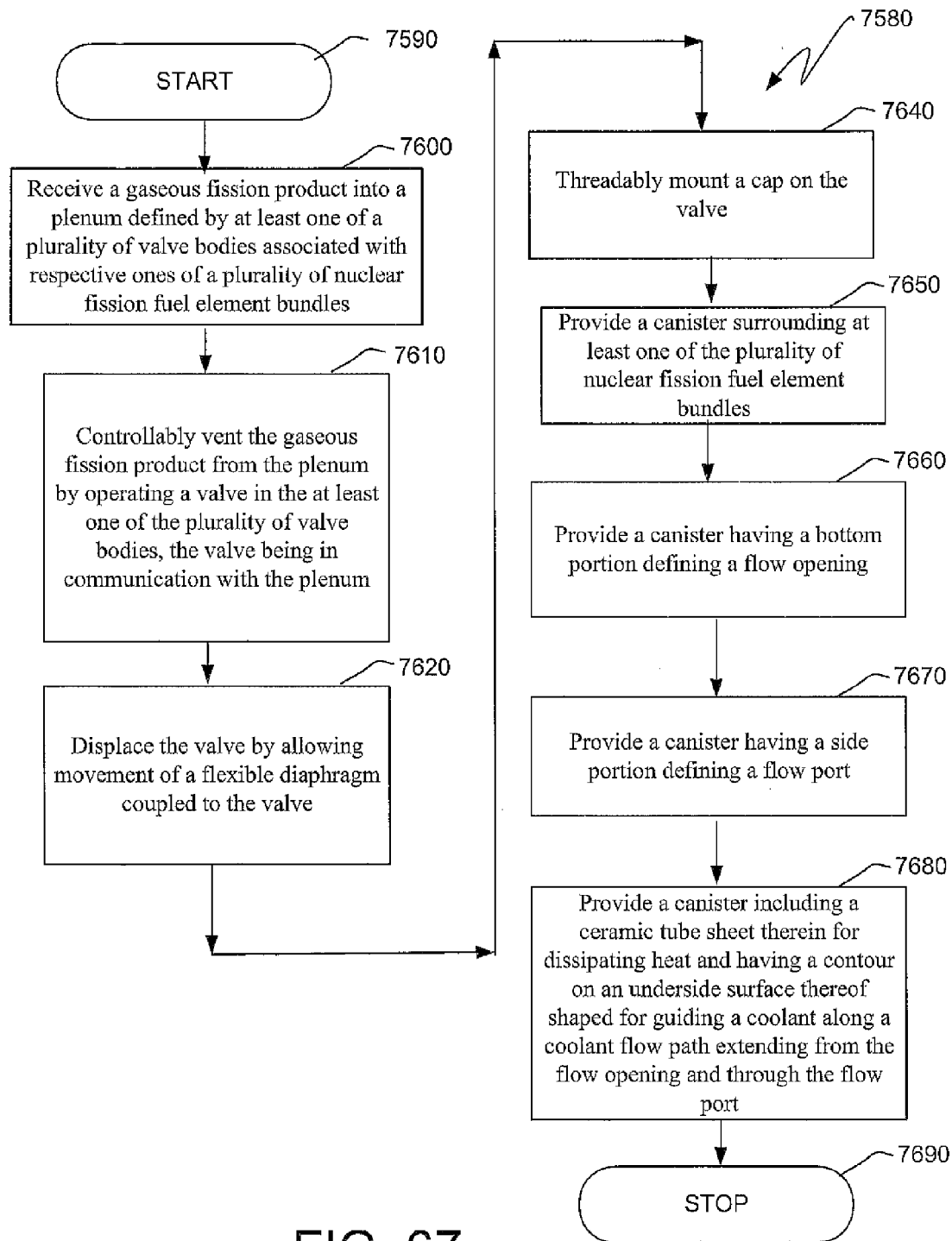

In FIG. 67, an illustrative method 7580 of operating a nuclear fission reactor starts at a block 7590. At a block 7600, the method comprises receiving a gaseous fission product into a plenum defined by at least one of a plurality of valve bodies associated with respective ones of a plurality of nuclear fission fuel element bundles. At a block 7610, the gaseous fission product is controllably vented from the plenum by operating a valve in the at least one of the plurality of valve bodies, the valve being in communication with the plenum. At a block 7620, the valve is displaced by allowing movement of a flexible diaphragm coupled to the valve. At a block 7640, a cap is threadably mounted on the valve. At a block 7650, a canister surrounding at least one of the plurality of nuclear fission fuel element bundles is provided. At a block 7660, a canister having a bottom portion defining a flow opening is provided. At a block 7670, a canister having a side portion defining a flow port is provided. At a block 7680, a canister is provided including a ceramic tube sheet therein having a contour on an underside surface thereof shaped for guiding a coolant along a coolant flow path extending from the flow opening and through the flow port. The method stops at a block 7690.

Figure 68:
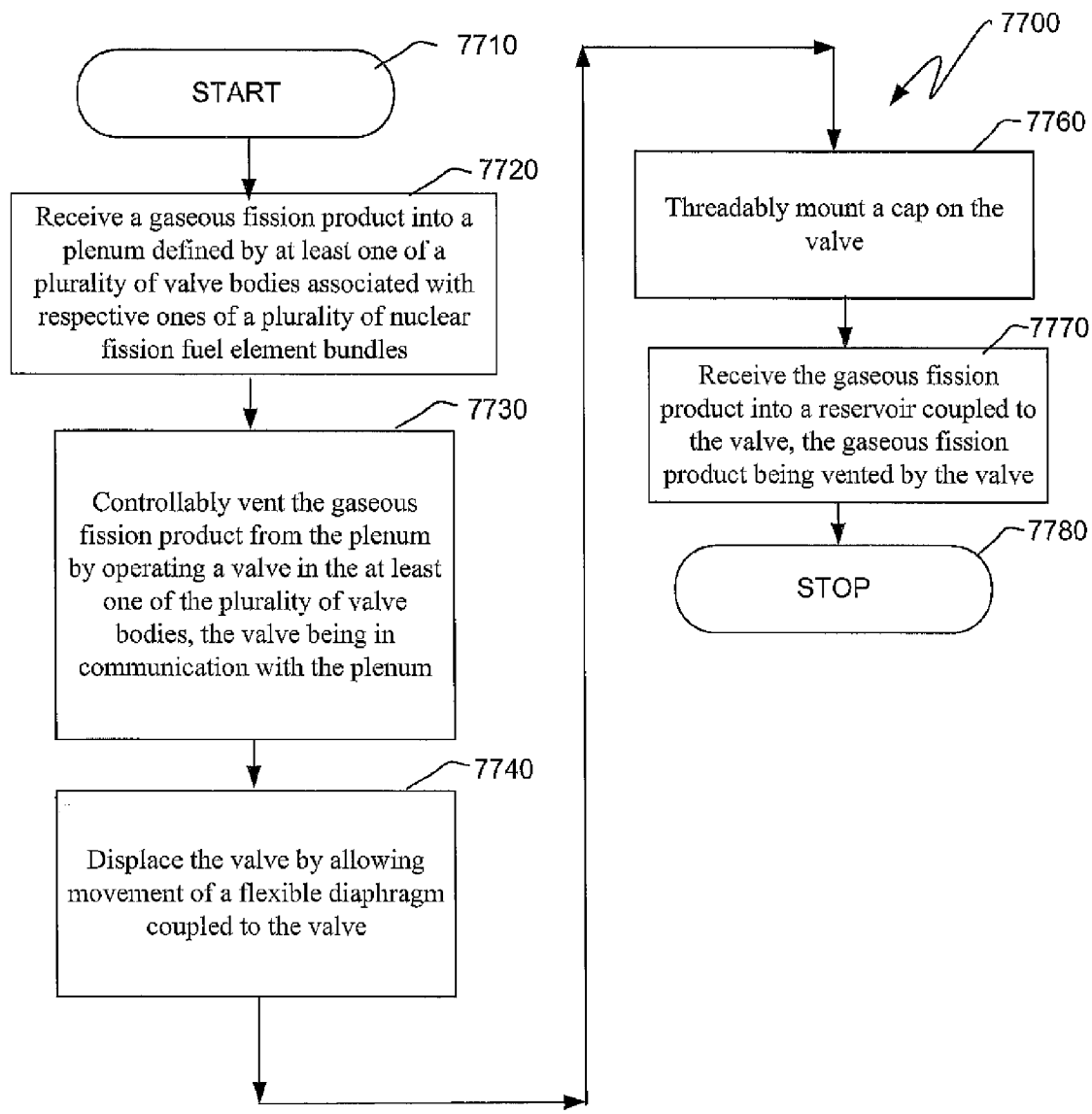

In FIG. 68, an illustrative method 7700 of operating a nuclear fission reactor starts at a block 7710. At a block 7720, the method comprises receiving a gaseous fission product into a plenum defined by at least one of a plurality of valve bodies associated with respective ones of a plurality of nuclear fission fuel element bundles. At a block 7730, the gaseous fission product is controllably vented from the plenum by operating a valve in the at least one of the plurality of valve bodies, the valve being in communication with the plenum. At a block 7740, the valve is displaced by allowing movement of a flexible diaphragm coupled to the valve. At a block 7760, a cap is threadably mounted on the valve. At a block 7770, the gaseous fission product is received into a reservoir coupled to the valve, the gaseous fission product being vented by the valve. The method stops at a block 7780.

Figure 69:
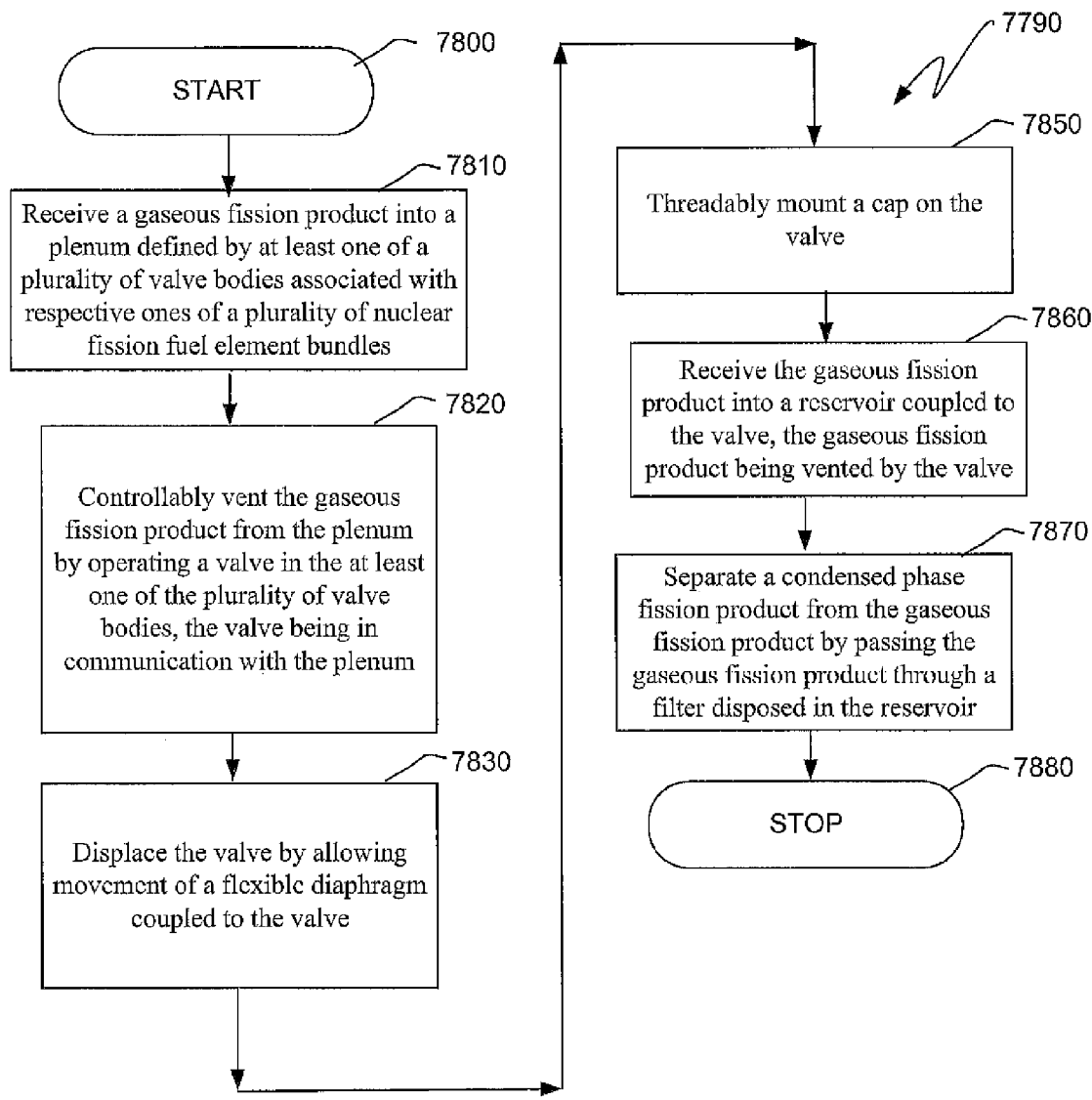

In FIG. 69, an illustrative method 7790 of operating a nuclear fission reactor starts at a block 7800. At a block 7810, the method comprises receiving a gaseous fission product into a plenum defined by at least one of a plurality of valve bodies associated with respective ones of a plurality of nuclear fission fuel element bundles. At a block 7820, the gaseous fission product is controllably vented from the plenum by operating a valve in the at least one of the plurality of valve bodies, the valve being in communication with the plenum. At a block 7830, the valve is displaced by allowing movement of a flexible diaphragm coupled to the valve. At a block 7850, a cap is threadably mounted on the valve. At a block 7860, the gaseous fission product is received into a reservoir coupled to the valve, the gaseous fission product being vented by the valve. At a block 7870, a condensed phase fission product is separated from the gaseous fission product by passing the gaseous fission product through a filter disposed in the reservoir. The method stops at a block 7880.

Figure 70:
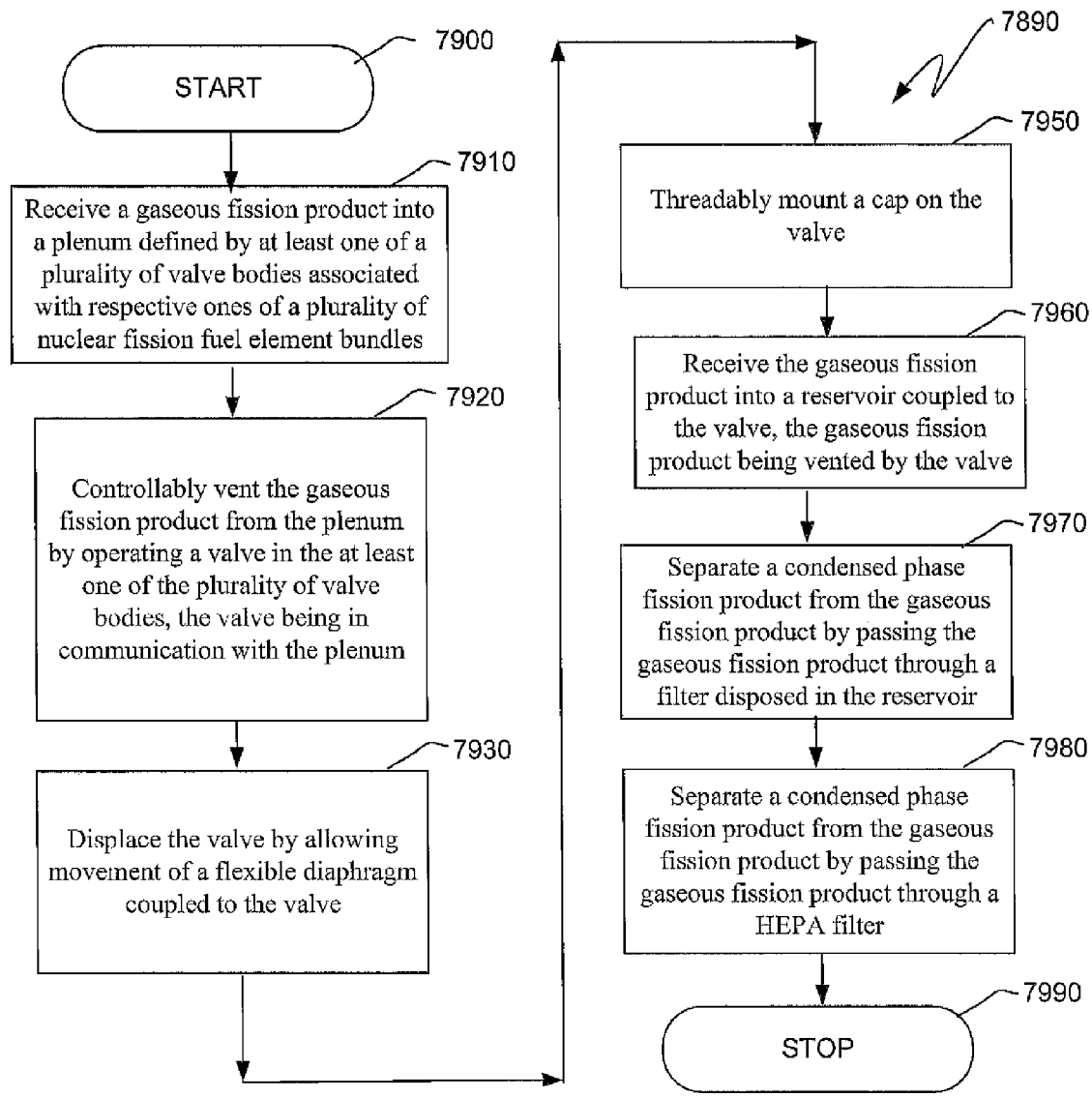

In FIG. 70, an illustrative method 7890 of operating a nuclear fission reactor starts at a block 7900. At a block 7910, the method comprises receiving a gaseous fission product into a plenum defined by at least one of a plurality of valve bodies associated with respective ones of a plurality of nuclear fission fuel element bundles. At a block 7920, the gaseous fission product is controllably vented from the plenum by operating a valve in the at least one of the plurality of valve bodies, the valve being in communication with the plenum. At a block 7930, the valve is displaced by allowing movement of a flexible diaphragm coupled to the valve. At a block 7950, a cap is threadably mounted on the valve. At a block 7960, the gaseous fission product is received into a reservoir coupled to the valve, the gaseous fission product being vented by the valve. At a block 7970, a condensed phase fission product is separated from the gaseous fission product by passing the gaseous fission product through a filter disposed in the reservoir. At a block 7980, a condensed phase fission product is separated from the gaseous fission product by passing the gaseous fission product through a HEPA filter. The method stops at a block 7990.

Figure 70A:
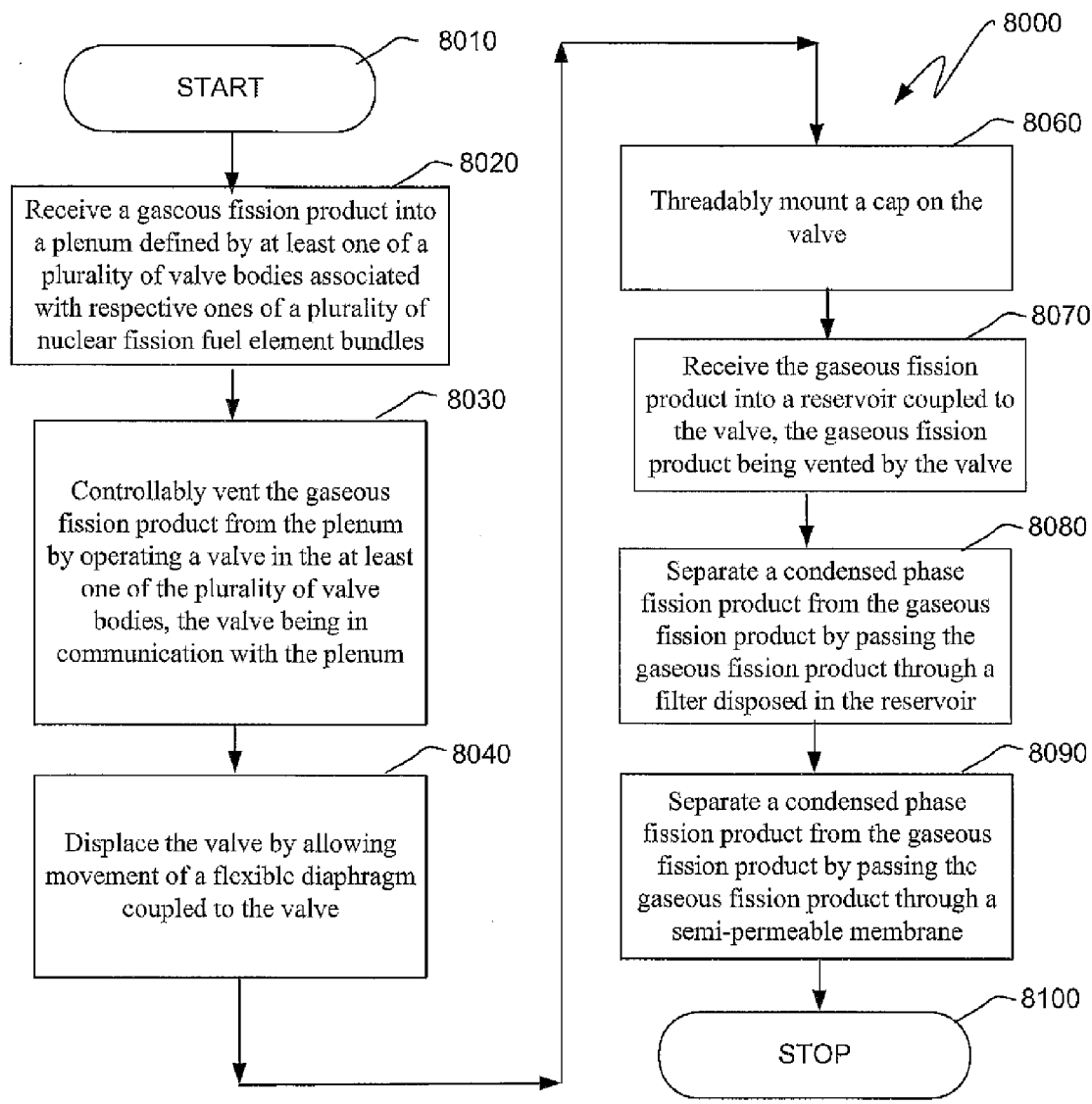

In FIG. 70A, an illustrative method 8000 of operating a nuclear fission reactor starts at a block 8010. At a block 8020, the method comprises receiving a gaseous fission product into a plenum defined by at least one of a plurality of valve bodies associated with respective ones of a plurality of nuclear fission fuel element bundles. At a block 8030, the gaseous fission product is controllably vented from the plenum by operating a valve in the at least one of the plurality of valve bodies, the valve being in communication with the plenum. At a block 8040, the valve is displaced by allowing movement of a flexible diaphragm coupled to the valve. At a block 8060, a cap is threadably mounted on the valve. At a block 8070, the gaseous fission product is received into a reservoir coupled to the valve, the gaseous fission product being vented by the valve. At a block 8080, a condensed phase fission product is separated from the gaseous fission product by passing the gaseous fission product through a filter disposed in the reservoir. At a block 8090, a condensed phase fission product is separated from the gaseous fission product by passing the gaseous fission product through a semi-permeable membrane. The method stops at a block 8100.

Figure 70B:
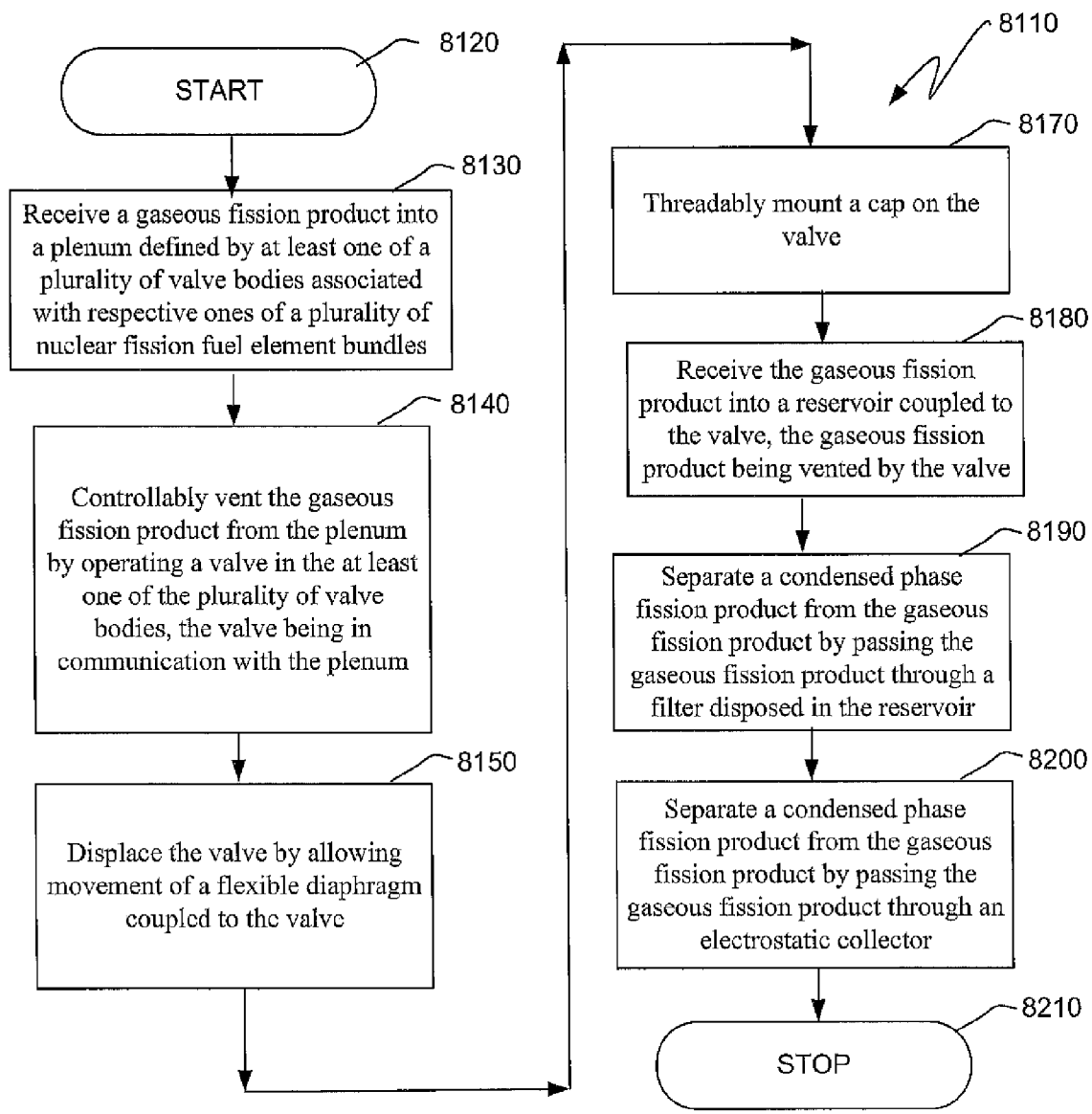

In FIG. 70B, an illustrative method 8110 of operating a nuclear fission reactor starts at a block 8120. At a block 8130, the method comprises receiving a gaseous fission product into a plenum defined by at least one of a plurality of valve bodies associated with respective ones of a plurality of nuclear fission fuel element bundles. At a block 8140, the gaseous fission product is controllably vented from the plenum by operating a valve in the at least one of the plurality of valve bodies, the valve being in communication with the plenum. At a block 8150, the valve is displaced by allowing movement of a flexible diaphragm coupled to the valve. At a block 8170, a cap is threadably mounted on the valve. At a block 8180, the gaseous fission product is received into a reservoir coupled to the valve, the gaseous fission product being vented by the valve. At a block 8190, a condensed phase fission product is separated from the gaseous fission product by passing the gaseous fission product through a filter disposed in the reservoir. At a block 8200, a condensed phase fission product is separated from the gaseous fission product by passing the gaseous fission product through an electrostatic collector. The method stops at a block 8210.

Figure 70C:
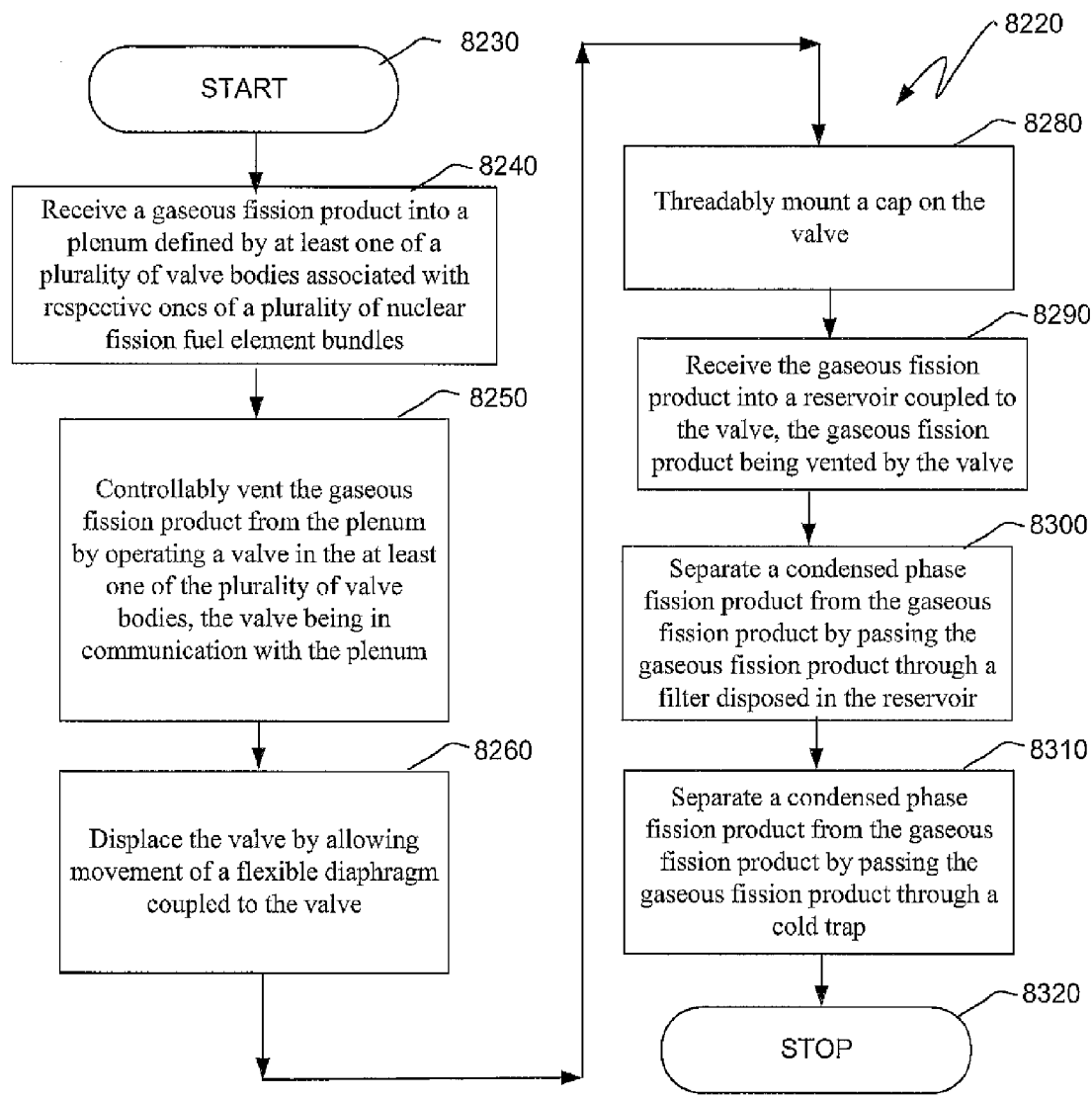

In FIG. 70C, an illustrative method 8220 of operating a nuclear fission reactor starts at a block 8230. At a block 8240, the method comprises receiving a gaseous fission product into a plenum defined by at least one of a plurality of valve bodies associated with respective ones of a plurality of nuclear fission fuel element bundles. At a block 8250, the gaseous fission product is controllably vented from the plenum by operating a valve in the at least one of the plurality of valve bodies, the valve being in communication with the plenum. At a block 8260, the valve is displaced by allowing movement of a flexible diaphragm coupled to the valve. At a block 8280, a cap is threadably mounted on the valve. At a block 8290, the gaseous fission product is received into a reservoir coupled to the valve, the gaseous fission product being vented by the valve. At a block 8300, a condensed phase fission product is separated from the gaseous fission product by passing the gaseous fission product through a filter disposed in the reservoir. At a block 8310, a condensed phase fission product is separated from the gaseous fission product by passing the gaseous fission product through cold trap. The method stops at a block 8320.

Figure 70D:
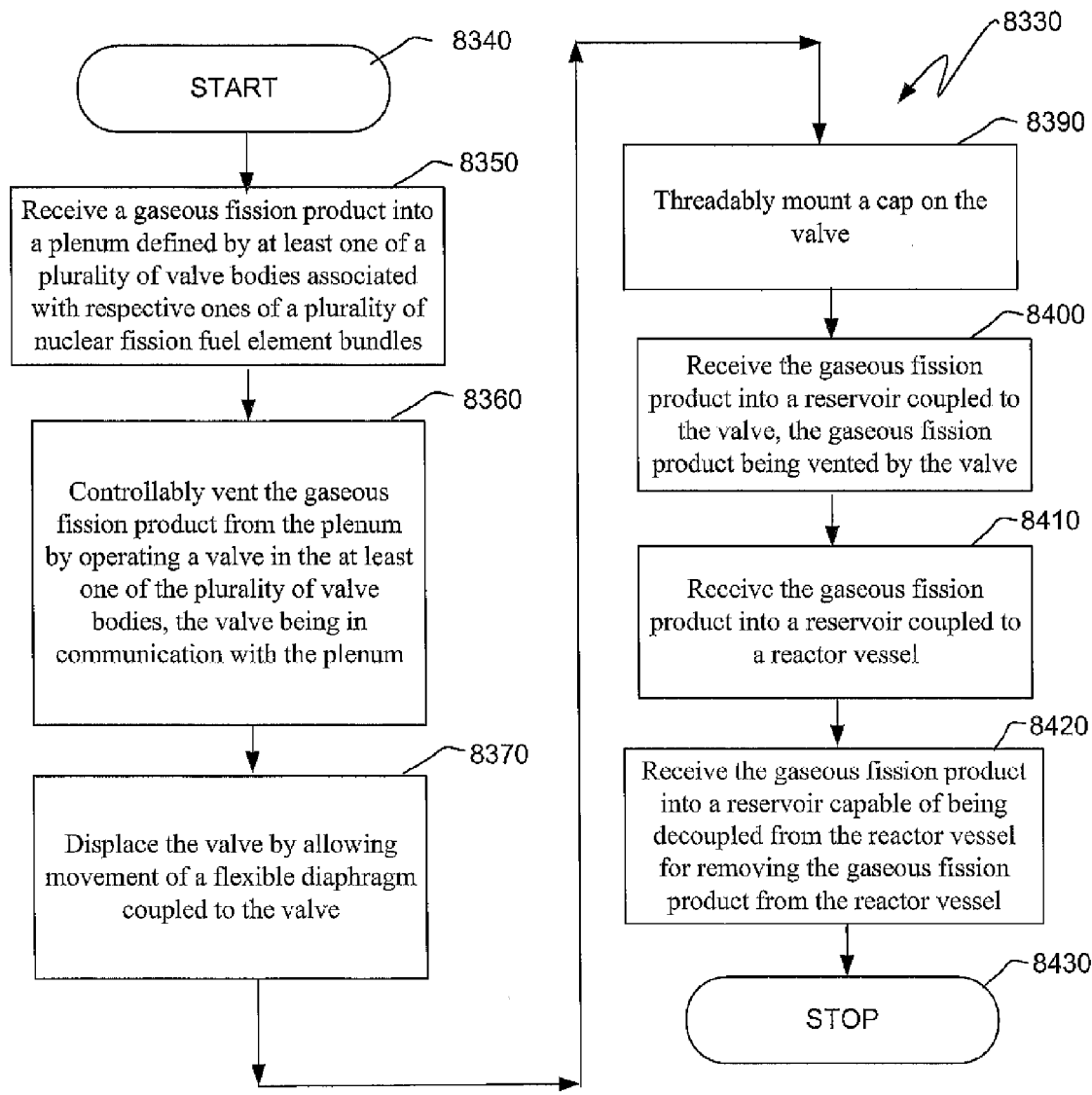

In FIG. 70D, an illustrative method 8330 of operating a nuclear fission reactor starts at a block 8340. At a block 8350, the method comprises receiving a gaseous fission product into a plenum defined by at least one of a plurality of valve bodies associated with respective ones of a plurality of nuclear fission fuel element bundles. At a block 8360, the gaseous fission product is controllably vented from the plenum by operating a valve in the at least one of the plurality of valve bodies, the valve being in communication with the plenum. At a block 8370, the valve is displaced by allowing movement of a flexible diaphragm coupled to the valve. At a block 8390, a cap is threadably mounted on the valve. At a block 8400, the gaseous fission product is received into a reservoir coupled to the valve, the gaseous fission product being vented by the valve. At a block 8410, the gaseous fission product is received into a reservoir coupled to a reactor vessel. At a block 8420, the gaseous fission product is received into a reservoir capable of being decoupled from the reactor vessel for removing the gaseous fission product from the reactor vessel. The method stops at a block 8430.

Figure 70E:
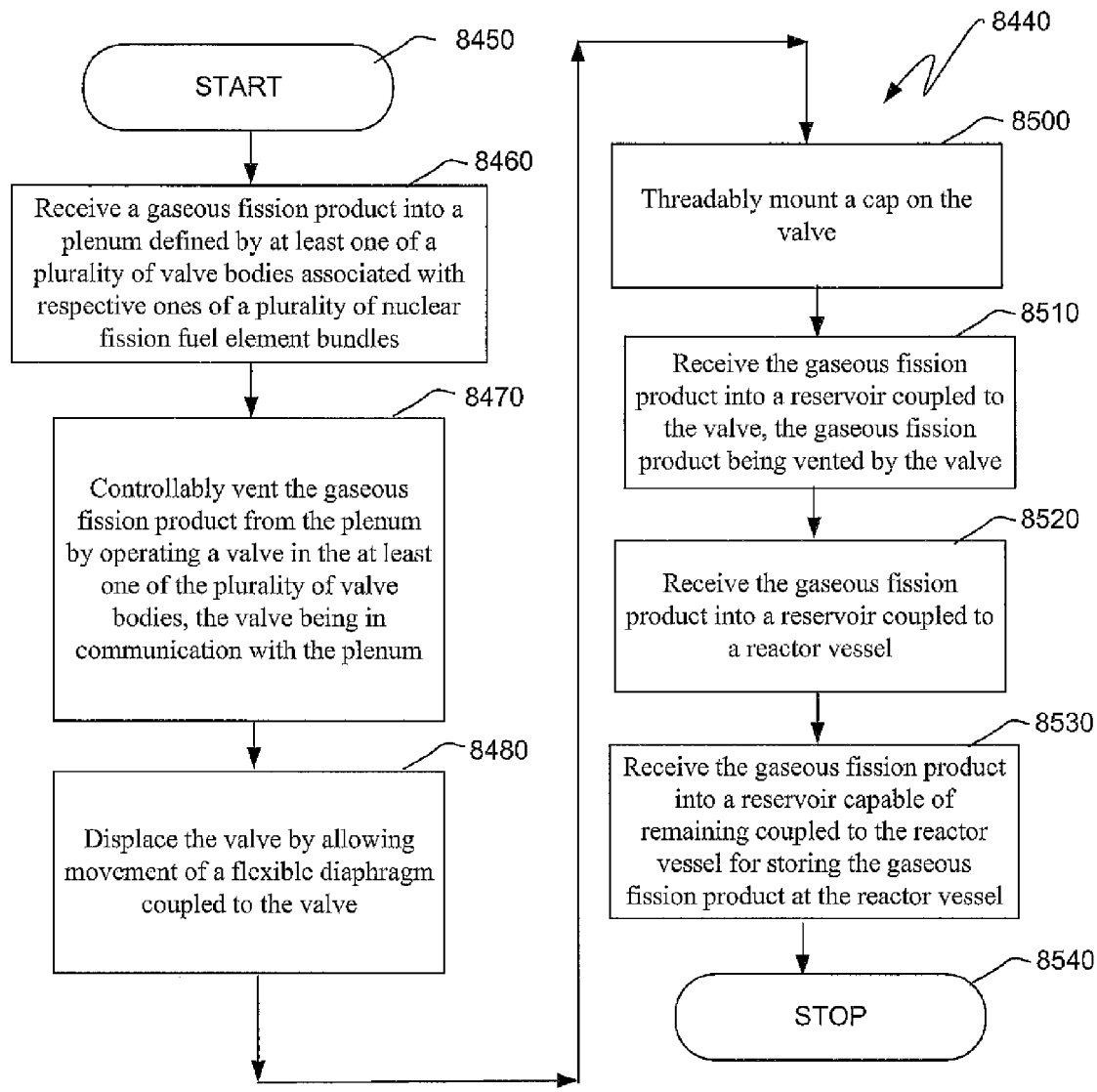

In FIG. 70E, an illustrative method 8440 of operating a nuclear fission reactor starts at a block 8450. At a block 8460, the method comprises receiving a gaseous fission product into a plenum defined by at least one of a plurality of valve bodies associated with respective ones of a plurality of nuclear fission fuel element bundles. At a block 8470, the gaseous fission product is controllably vented from the plenum by operating a valve in the at least one of the plurality of valve bodies, the valve being in communication with the plenum. At a block 8480, the valve is displaced by allowing movement of a flexible diaphragm coupled to the valve. At a block 8500, a cap is threadably mounted on the valve. At a block 8510, the gaseous fission product is received into a reservoir coupled to the valve, the gaseous fission product being vented by the valve. At a block 8520, the gaseous fission product is received into a reservoir coupled to a reactor vessel. At a block 8530, the gaseous fission product is received into a reservoir capable of remaining coupled to the reactor vessel for storing the gaseous fission product at the reactor vessel. The method stops at a block 8540.

Figure 70F:
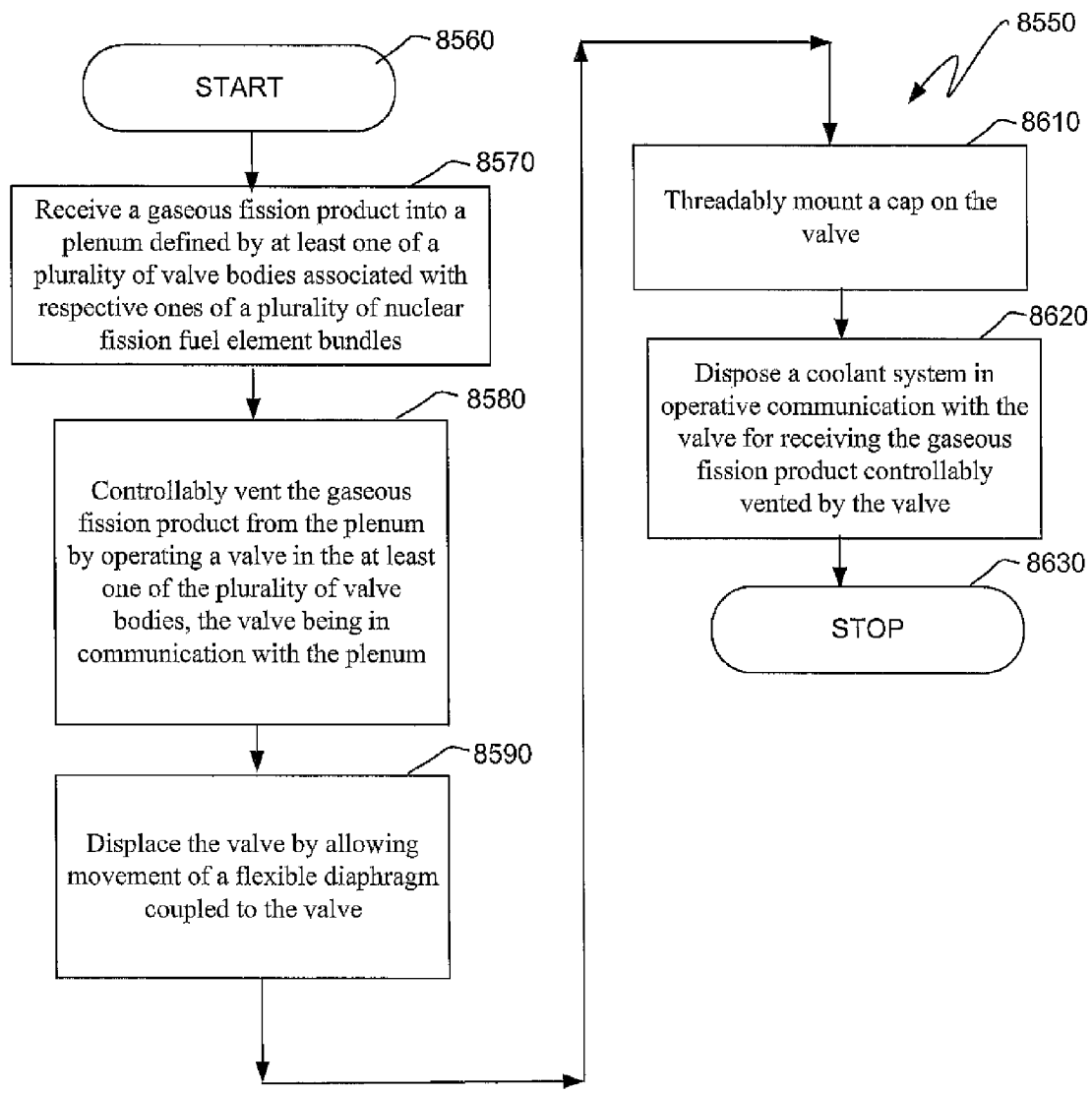

In FIG. 70F, an illustrative method 8550 of operating a nuclear fission reactor starts at a block 8560. At a block 8570, the method comprises receiving a gaseous fission product into a plenum defined by at least one of a plurality of valve bodies associated with respective ones of a plurality of nuclear fission fuel element bundles. At a block 8580, the gaseous fission product is controllably vented from the plenum by operating a valve in the at least one of the plurality of valve bodies, the valve being in communication with the plenum. At a block 8590, the valve is displaced by allowing movement of a flexible diaphragm coupled to the valve. At a block 8610, a cap is threadably mounted on the valve. At a block 8620, a coolant system is disposed in operative communication with the valve for receiving the gaseous fission product controllably vented by the valve. The method stops at a block 8630.

Figure 70G:
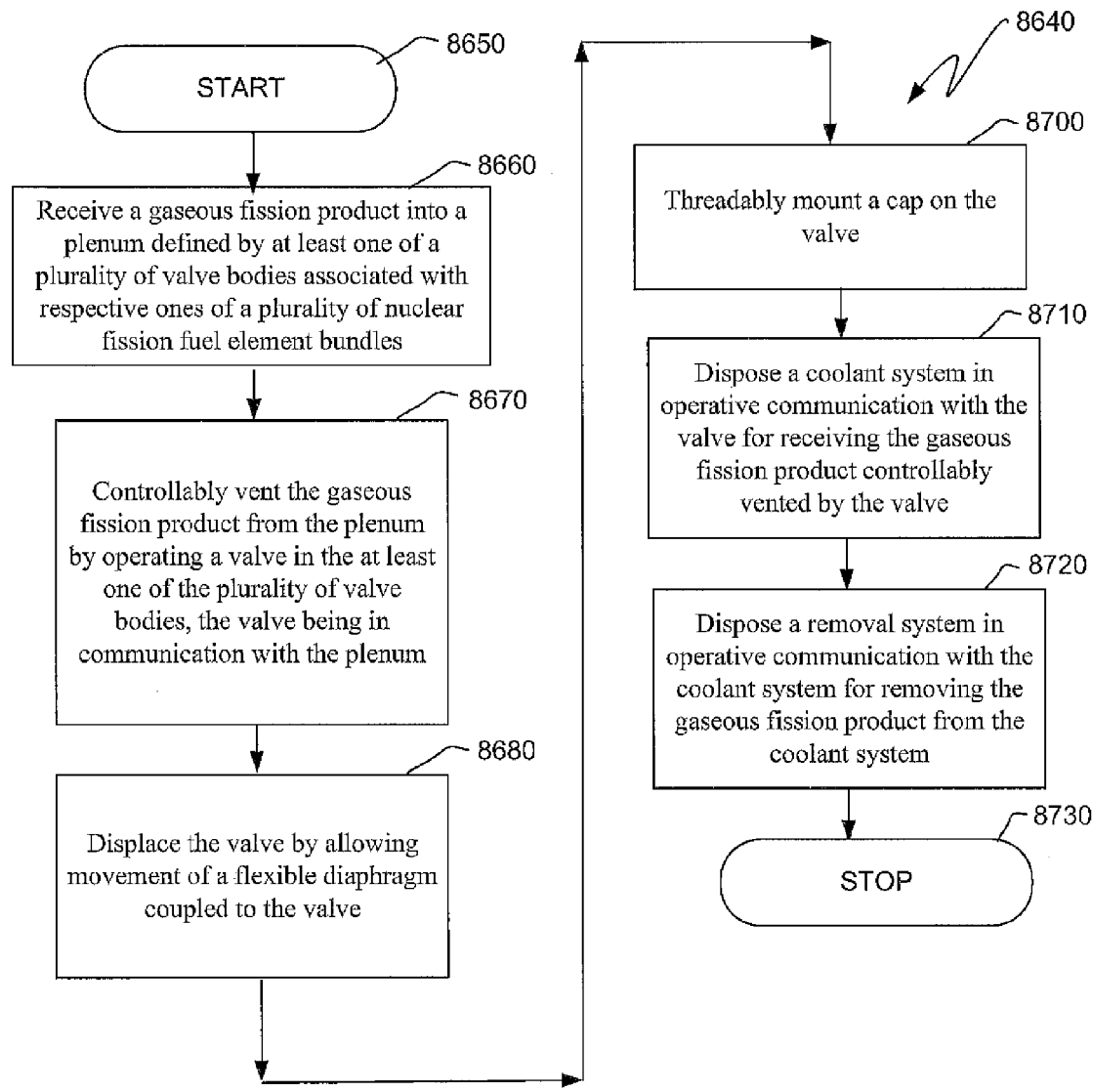

In FIG. 70G, an illustrative method 8640 of operating a nuclear fission reactor starts at a block 8650. At a block 8660, the method comprises receiving a gaseous fission product into a plenum defined by at least one of a plurality of valve bodies associated with respective ones of a plurality of nuclear fission fuel element bundles. At a block 8670, the gaseous fission product is controllably vented from the plenum by operating a valve in the at least one of the plurality of valve bodies, the valve being in communication with the plenum. At a block 8680, the valve is displaced by allowing movement of a flexible diaphragm coupled to the valve. At a block 8700, a cap is threadably mounted on the valve. At a block 8710, a coolant system is disposed in operative communication with the valve for receiving the gaseous fission product controllably vented by the valve. At a block 8720, a removal system is disposed in operative communication with the coolant system for removing the gaseous fission product from the coolant system. The method stops at a block 8730.

Figure 70H:
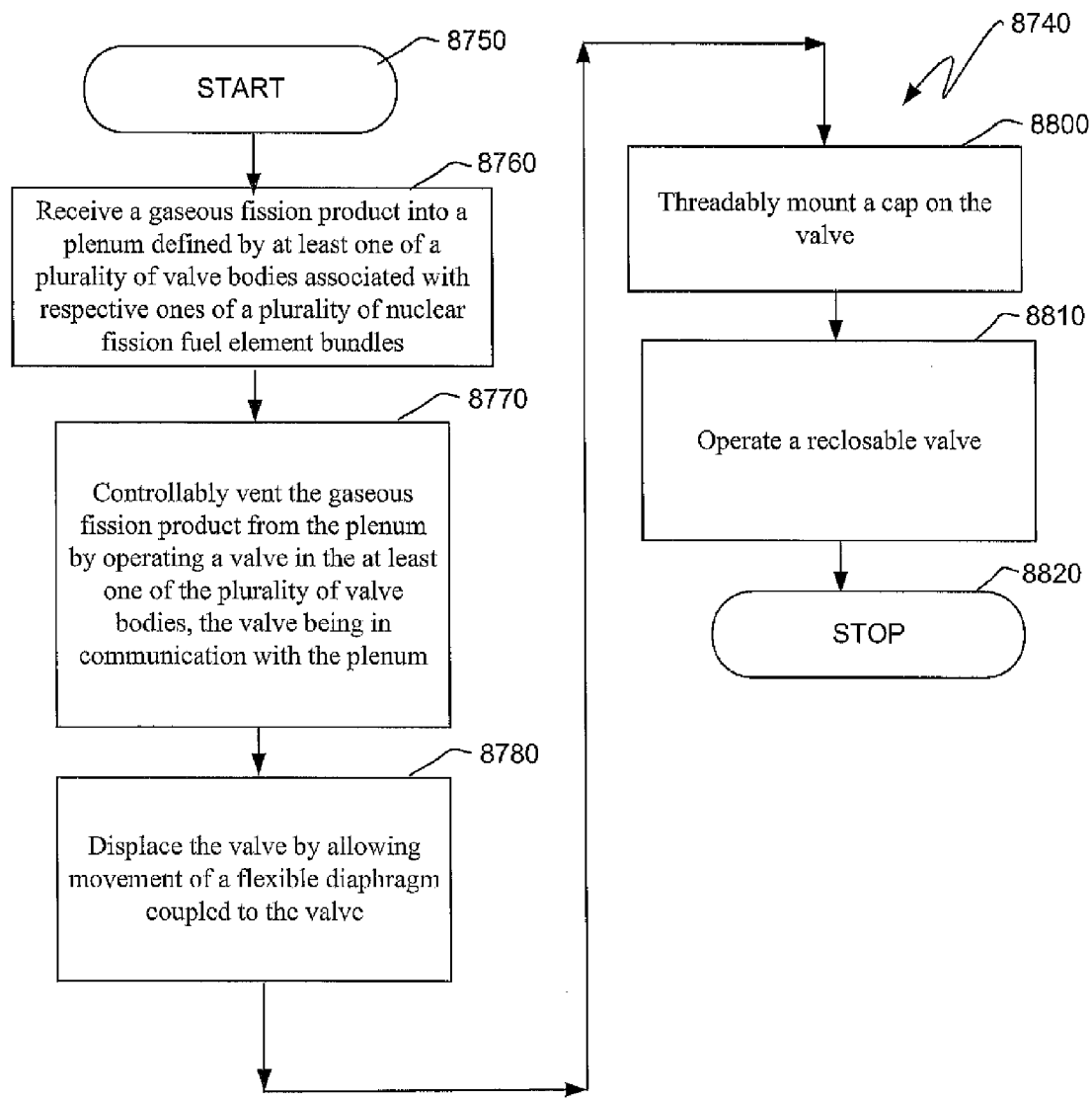

In FIG. 70H, an illustrative method 8740 of operating a nuclear fission reactor starts at a block 8750. At a block 8760, the method comprises receiving a gaseous fission product into a plenum defined by at least one of a plurality of valve bodies associated with respective ones of a plurality of nuclear fission fuel element bundles. At a block 8770, the gaseous fission product is controllably vented from the plenum by operating a valve in the at least one of the plurality of valve bodies, the valve being in communication with the plenum. At a block 8780, the valve is displaced by allowing movement of a flexible diaphragm coupled to the valve. At a block 8800, a cap is threadably mounted on the valve. At a block 8810, a reclosable valve is operated. The method stops at a block 8820.

Figure 70I:
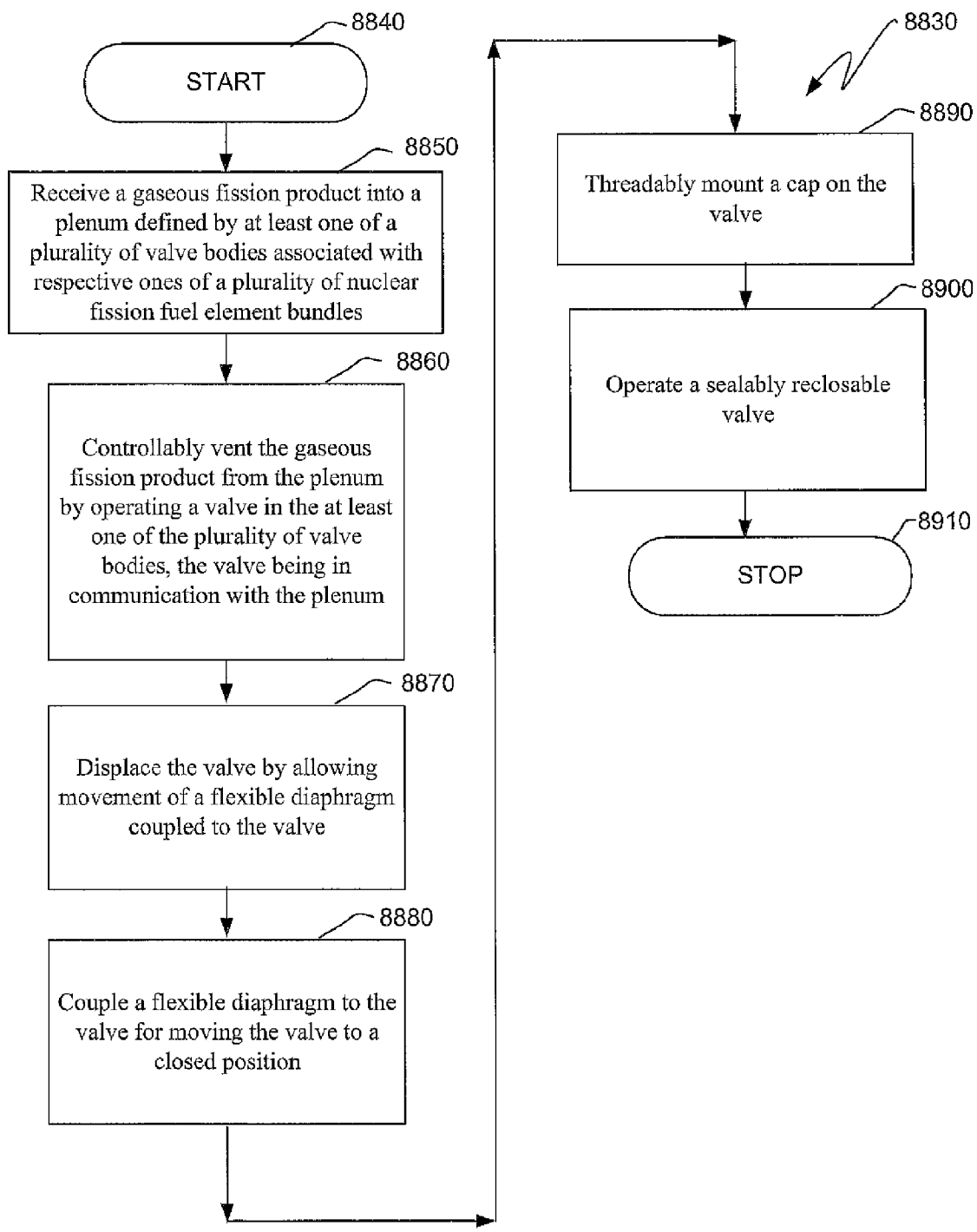

In FIG. 70I, an illustrative method 8830 of operating a nuclear fission reactor starts at a block 8840. At a block 8850, the method comprises receiving a gaseous fission product into a plenum defined by at least one of a plurality of valve bodies associated with respective ones of a plurality of nuclear fission fuel element bundles. At a block 8860, the gaseous fission product is controllably vented from the plenum by operating a valve in the at least one of the plurality of valve bodies, the valve being in communication with the plenum. At a block 8870, the valve is displaced by allowing movement of a flexible diaphragm coupled to the valve. At a block 8890, a cap is threadably mounted on the valve. At a block 8900, a sealably reclosable valve is operated. The method stops at a block 8910.

Figure 71:
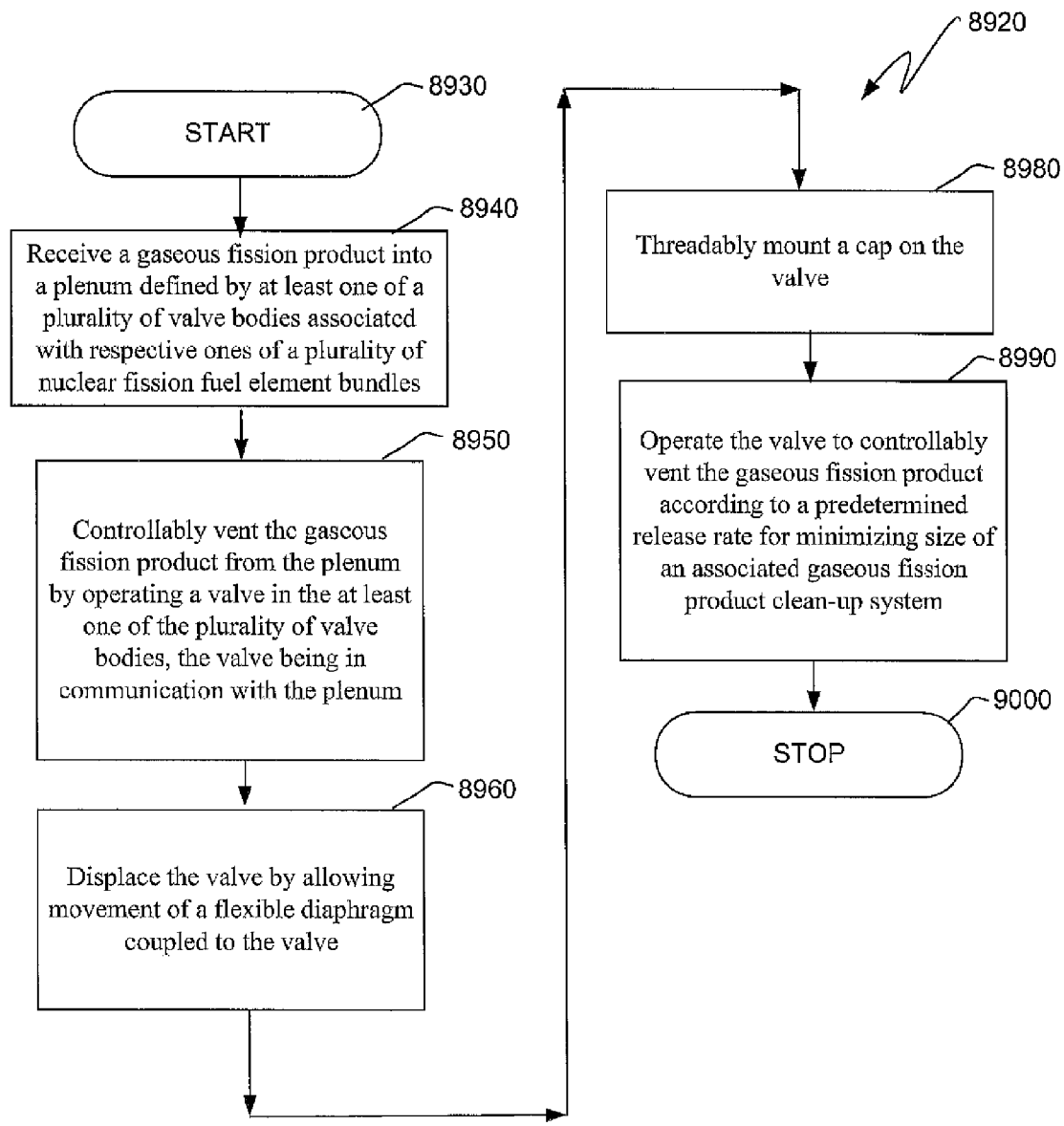

In FIG. 71, an illustrative method 8920 of operating a nuclear fission reactor starts at a block 8930. At a block 8940, the method comprises receiving a gaseous fission product into a plenum defined by at least one of a plurality of valve bodies associated with respective ones of a plurality of nuclear fission fuel element bundles. At a block 8950, the gaseous fission product is controllably vented from the plenum by operating a valve in the at least one of the plurality of valve bodies, the valve being in communication with the plenum. At a block 8960, the valve is displaced by allowing movement of a flexible diaphragm coupled to the valve. At a block 8980, a cap is threadably mounted on the valve. At a block 8990, the valve is operated to controllably vent the gaseous fission product according to a predetermined release rate for minimizing size of an associated gaseous fission product clean-up system. The method stops at a block 9000.

Figure 72:
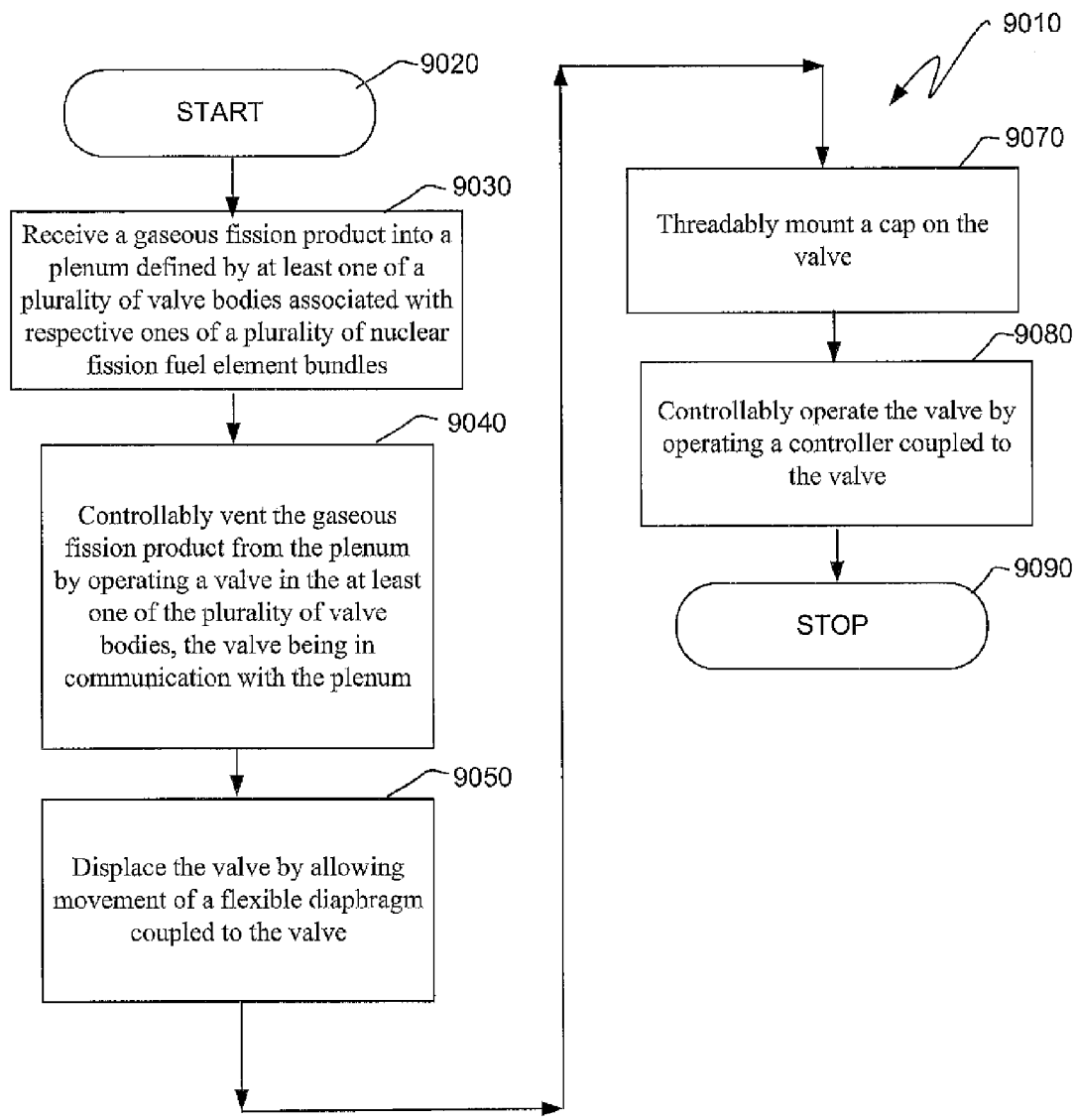

In FIG. 72, an illustrative method 9010 of operating a nuclear fission reactor starts at a block 9020. At a block 9030, the method comprises receiving a gaseous fission product into a plenum defined by at least one of a plurality of valve bodies associated with respective ones of a plurality of nuclear fission fuel element bundles. At a block 9040, the gaseous fission product is controllably vented from the plenum by operating a valve in the at least one of the plurality of valve bodies, the valve being in communication with the plenum. At a block 9050, the valve is displaced by allowing movement of a flexible diaphragm coupled to the valve. At a block 9070, a cap is threadably mounted on the valve. At a block 9080, the valve is operated by operating a controller coupled to the valve. The method stops at a block 9090.

Referring to FIGS. 73-120, illustrative methods are provided for assembling a vented nuclear fission fuel module.

Figure 73:
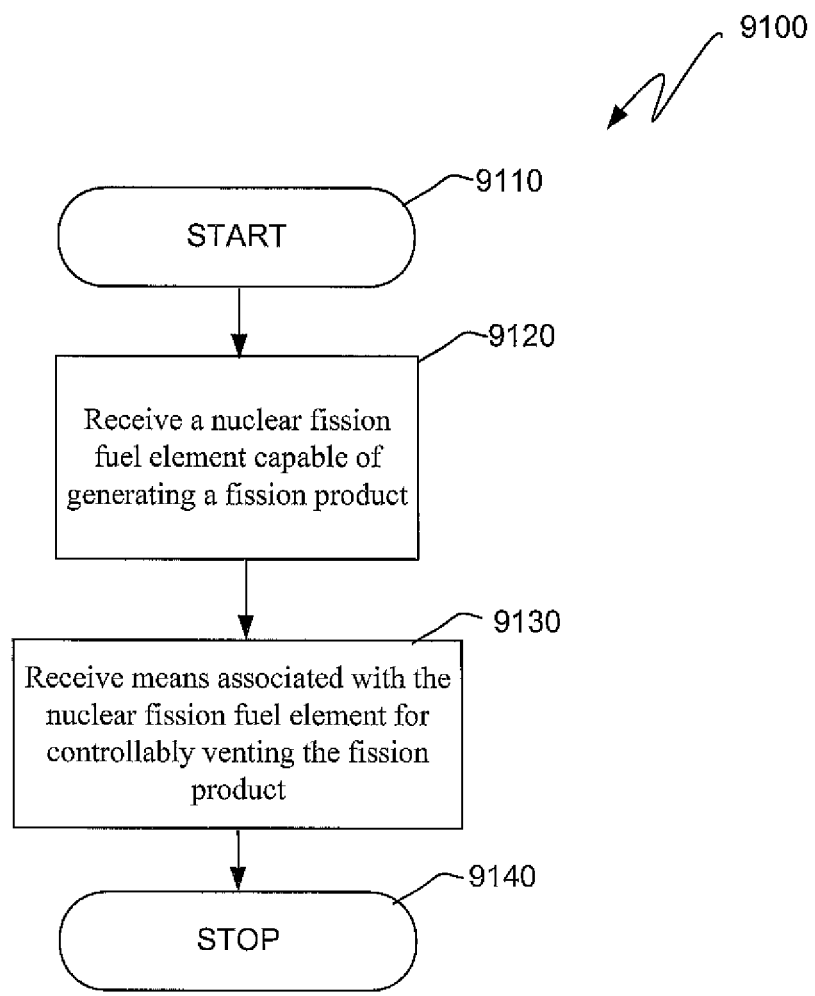
FIGS. 73-120 are flow charts of illustrative methods of assembling the vented nuclear fission fuel module.

Turning now to FIG. 73, an illustrative method 9100 of assembling a vented nuclear fission fuel module starts at a block 9110. At a block 9120, the method comprises receiving a nuclear fission fuel element capable of generating a fission product. At a block 9130, means associated with the nuclear fission fuel element for controllably venting the fission product is received. The method stops at a block 9140.

Figure 74:
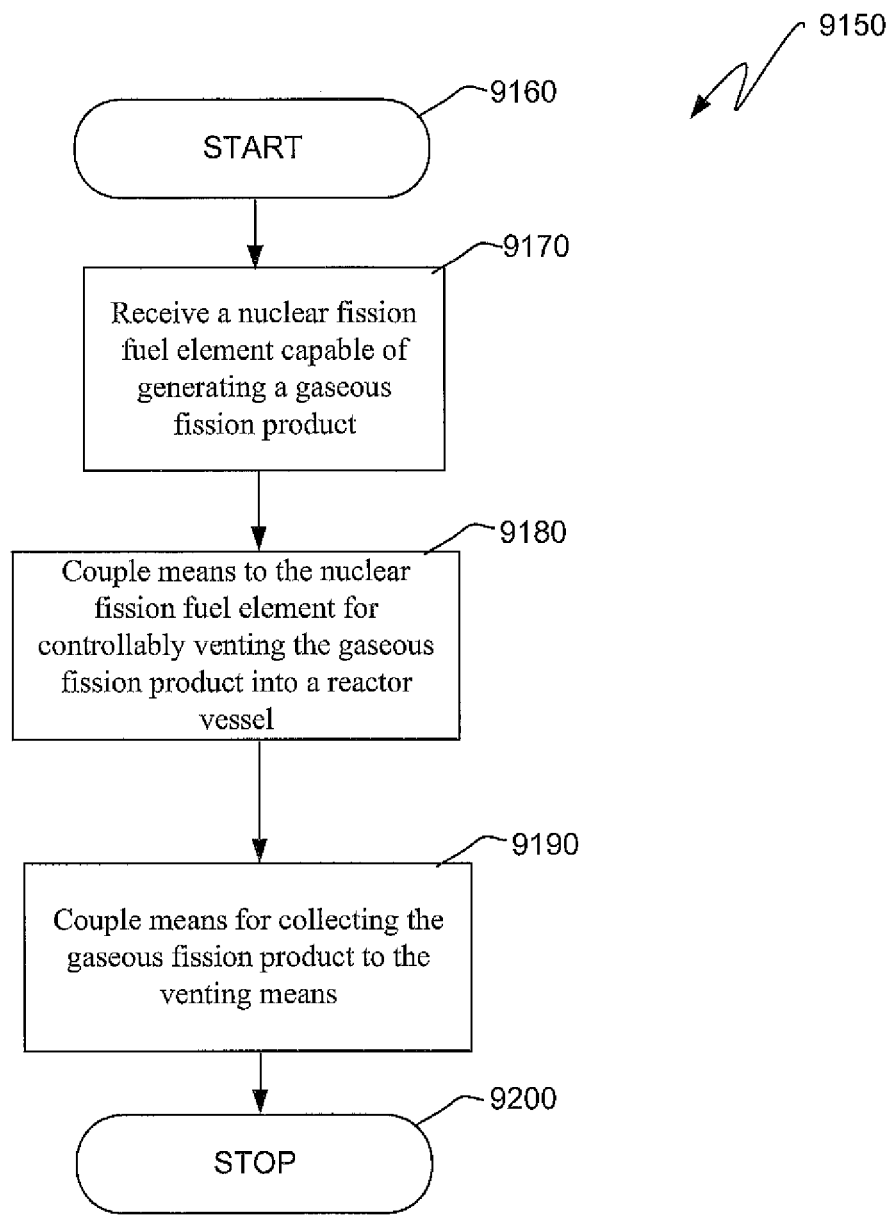

In FIG. 74, an illustrative method 9150 of assembling a vented nuclear fission fuel module starts at a block 9160. At a block 9170, the method comprises receiving a nuclear fission fuel element capable of generating a gaseous fission product. At a block 9180, means is coupled to the nuclear fission fuel element for controllably venting the gaseous fission product into a reactor vessel. At a block 9190, means for collecting the gaseous fission product is coupled to the venting means. The method stops at a block 9200.

Figure 75:
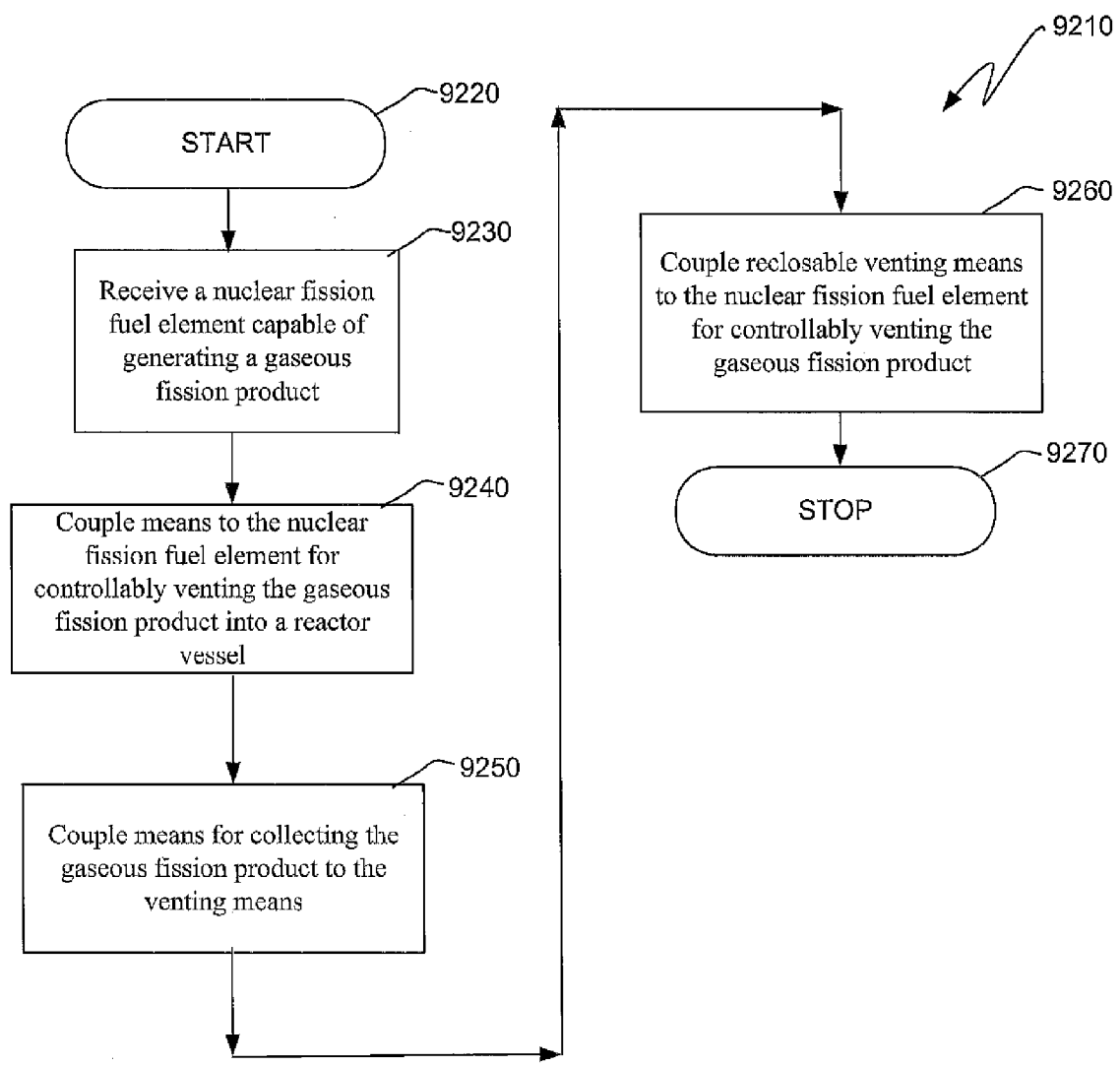

In FIG. 75, an illustrative method 9210 of assembling a vented nuclear fission fuel module starts at a block 9220. At a block 9230, the method comprises receiving a nuclear fission fuel element capable of generating a gaseous fission product. At a block 9240, means is coupled to the nuclear fission fuel element for controllably venting the gaseous fission product into a reactor vessel. At a block 9250, means for collecting the gaseous fission product is coupled to the venting means. At a block 9260, reclosable venting means is coupled to the nuclear fission fuel element for controllably venting the gaseous fission product. The method stops at a block 9270.

Figure 76:
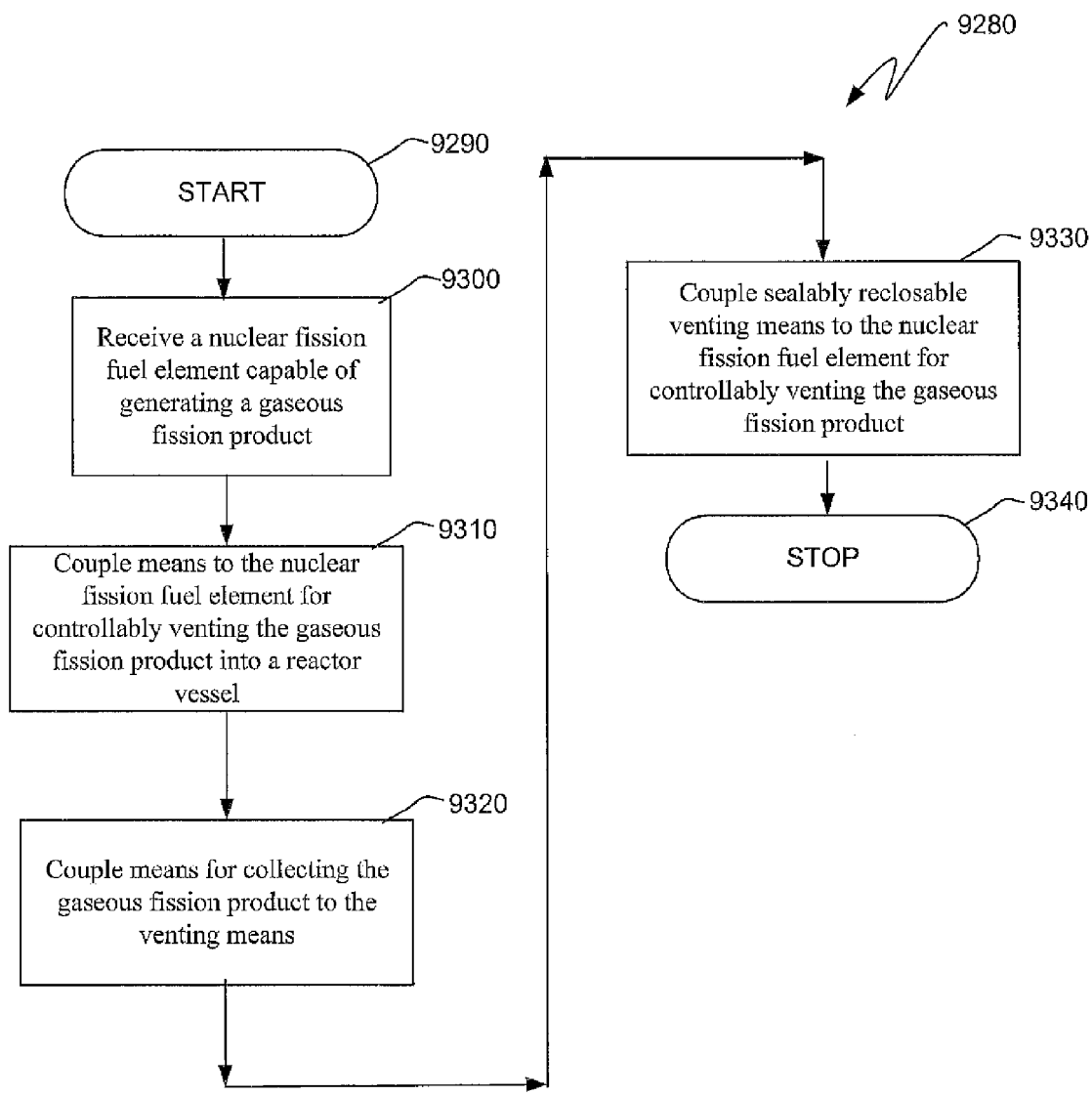

In FIG. 76, an illustrative method 9280 of assembling a vented nuclear fission fuel module starts at a block 9290. At a block 9300, the method comprises receiving a nuclear fission fuel element capable of generating a gaseous fission product. At a block 9310, means is coupled to the nuclear fission fuel element for controllably venting the gaseous fission product into a reactor vessel. At a block 9320, means for collecting the gaseous fission product is coupled to the venting means. At a block 9330, sealably reclosable venting means is coupled to the nuclear fission fuel element for controllably venting the gaseous fission product. The method stops at a block 9340.

Figure 77:
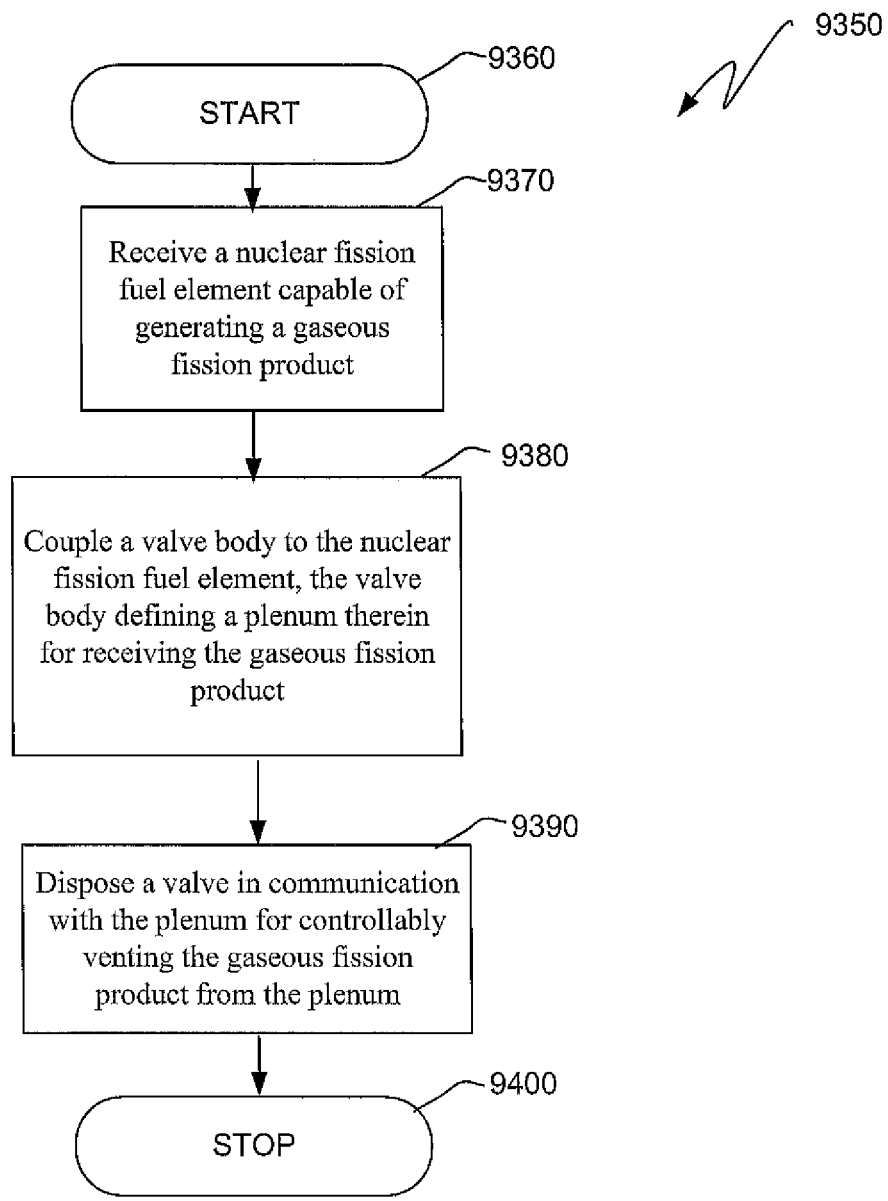

In FIG. 77, an illustrative method 9350 of assembling a vented nuclear fission fuel module starts at a block 9360. At a block 9370, the method comprises receiving a nuclear fission fuel element capable of generating a gaseous fission product. At a block 9380, a valve body is coupled to the nuclear fission fuel element, the valve body defining a plenum therein for receiving the gaseous fission product. At a block 9390, a valve is disposed in communication with the plenum for controllably venting the gaseous fission product from the plenum. The method stops at a block 9400.

Figure 78:
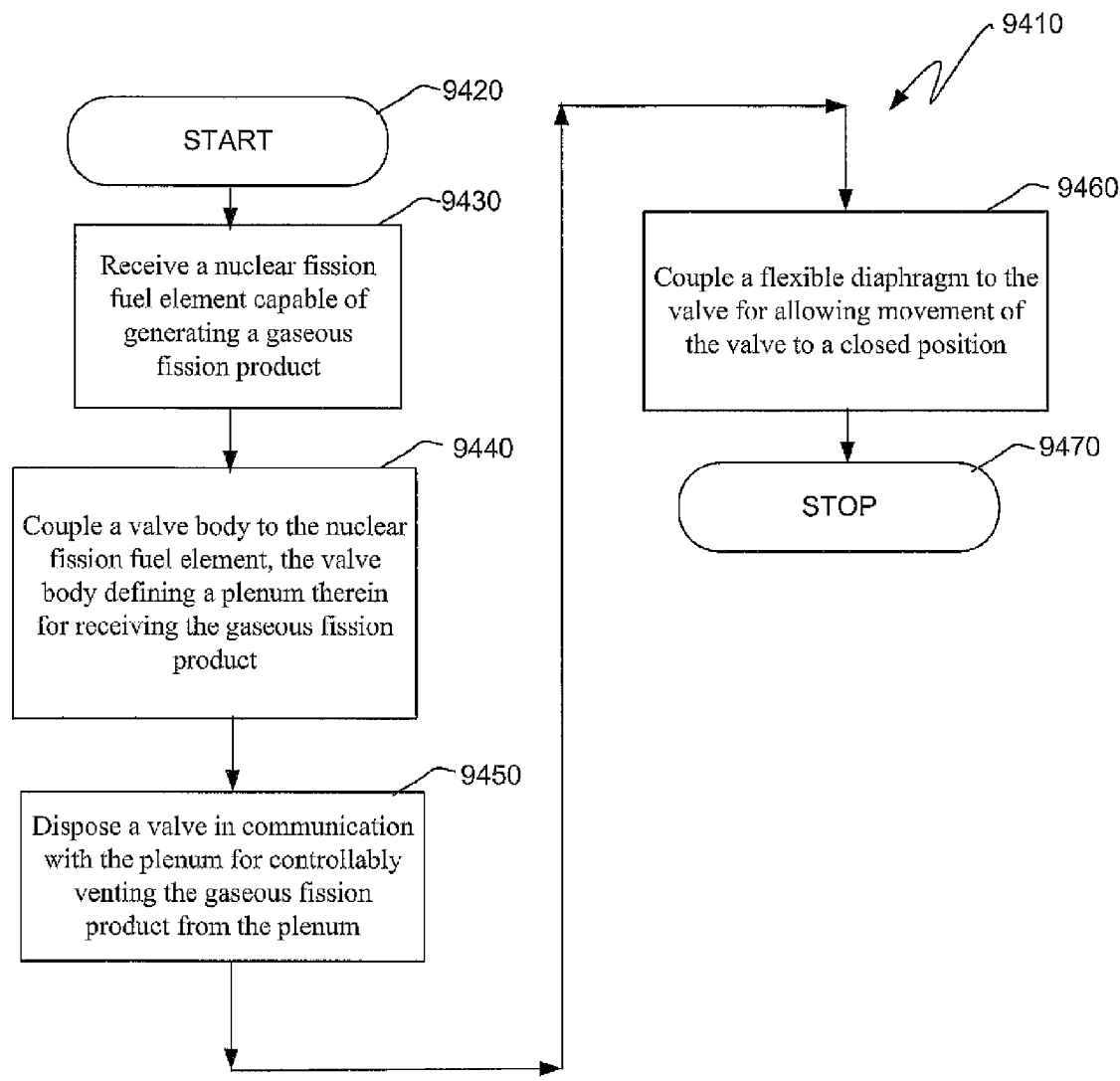

In FIG. 78, an illustrative method 9410 of assembling a vented nuclear fission fuel module starts at a block 9420. At a block 9430, the method comprises receiving a nuclear fission fuel element capable of generating a gaseous fission product. At a block 9440, a valve body is coupled to the nuclear fission fuel element, the valve body defining a plenum therein for receiving the gaseous fission product. At a block 9450, a valve is disposed in communication with the plenum for controllably venting the gaseous fission product from the plenum. At a block 9460, a flexible diaphragm is coupled to the valve for allowing movement of the valve to a closed position. The method stops at a block 9470.

Figure 79:
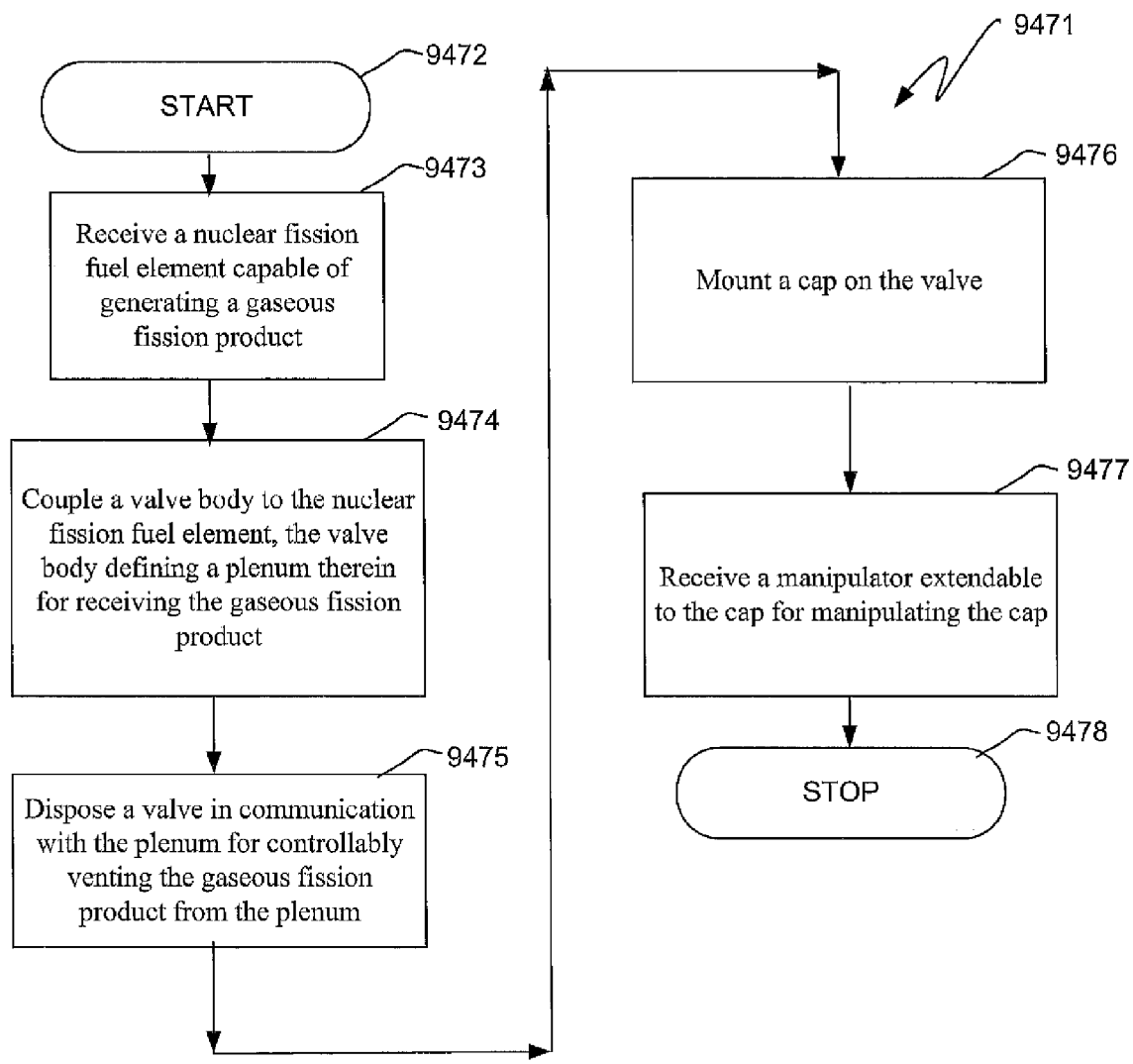

In FIG. 79, an illustrative method 9471 of assembling a vented nuclear fission fuel module starts at a block 9472. At a block 9473, the method comprises receiving a nuclear fission fuel element capable of generating a gaseous fission product. At a block 9474, a valve body is coupled to the nuclear fission fuel element, the valve body defining a plenum therein for receiving the gaseous fission product. At a block 9475, a valve is disposed in communication with the plenum for controllably venting the gaseous fission product from the plenum. At a block 9476, a cap is mounted on the valve. At a block 9477, a manipulator extendable to the cap for manipulating the cap is received. The method stops at a block 9478.

Figure 80:
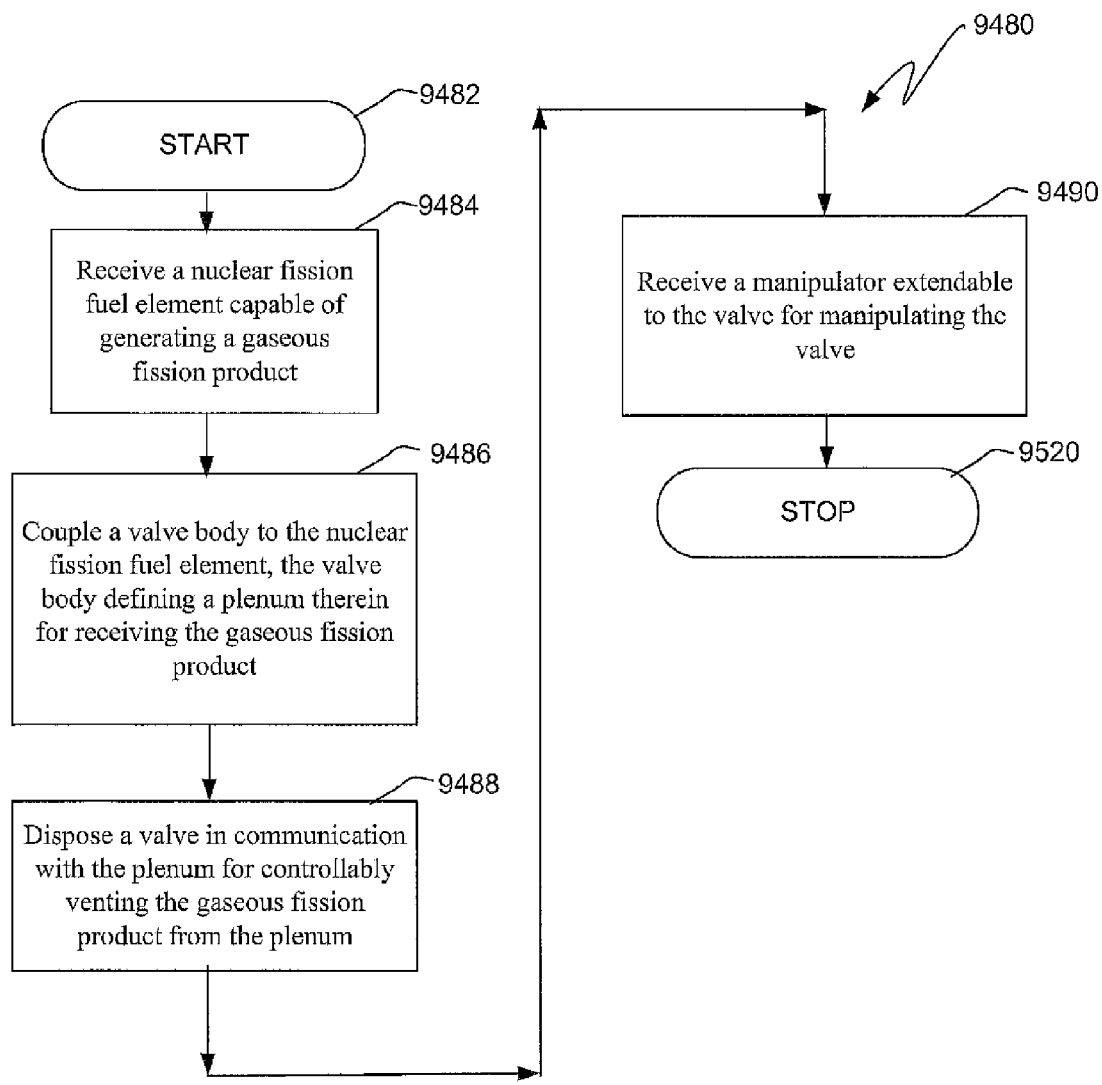

In FIG. 80, an illustrative method 9480 of assembling a vented nuclear fission fuel module starts at a block 9482. At a block 9484, the method comprises receiving a nuclear fission fuel element capable of generating a gaseous fission product. At a block 9486, a valve body is coupled to the nuclear fission fuel element, the valve body defining a plenum therein for receiving the gaseous fission product. At a block 9488, a valve is disposed in communication with the plenum for controllably venting the gaseous fission product from the plenum. At a block 9490, a manipulator extendable to the valve for manipulating the valve is received. The method stops at a block 9520.

Figure 80A:
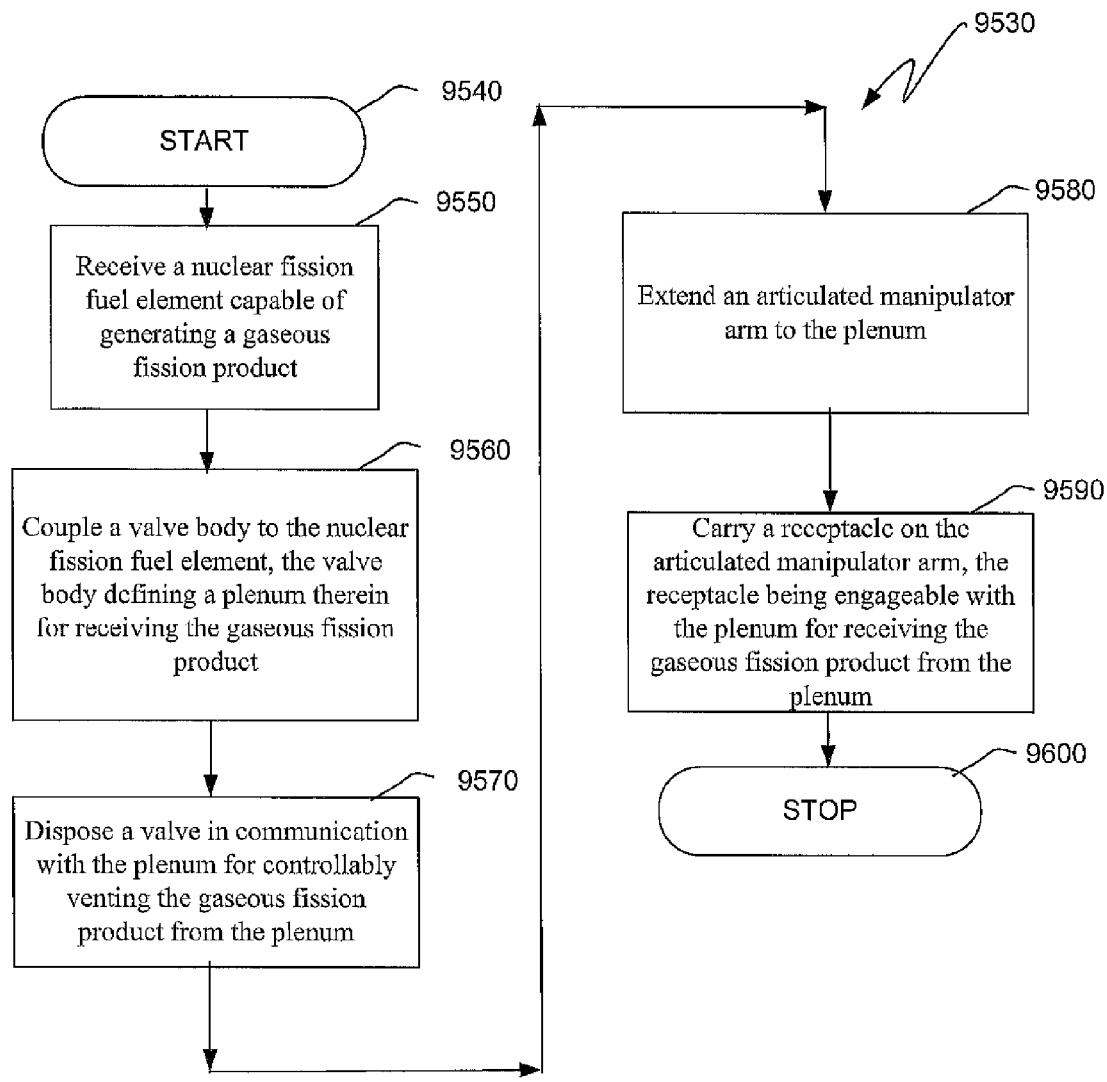

In FIG. 80A, an illustrative method 9530 of assembling a vented nuclear fission fuel module starts at a block 9540. At a block 9550, the method comprises receiving a nuclear fission fuel element capable of generating a gaseous fission product. At a block 9560, a valve body is coupled to the nuclear fission fuel element, the valve body defining a plenum therein for receiving the gaseous fission product. At a block 9570, a valve is disposed in communication with the plenum for controllably venting the gaseous fission product from the plenum. At a block 9580, an articulated manipulator arm is extended to the plenum. At a block 9590, a receptacle is carried on the articulated manipulator arm, the receptacle being engageable with the plenum for receiving the gaseous fission product from the plenum. The method stops at a block 9600.

Figure 81:
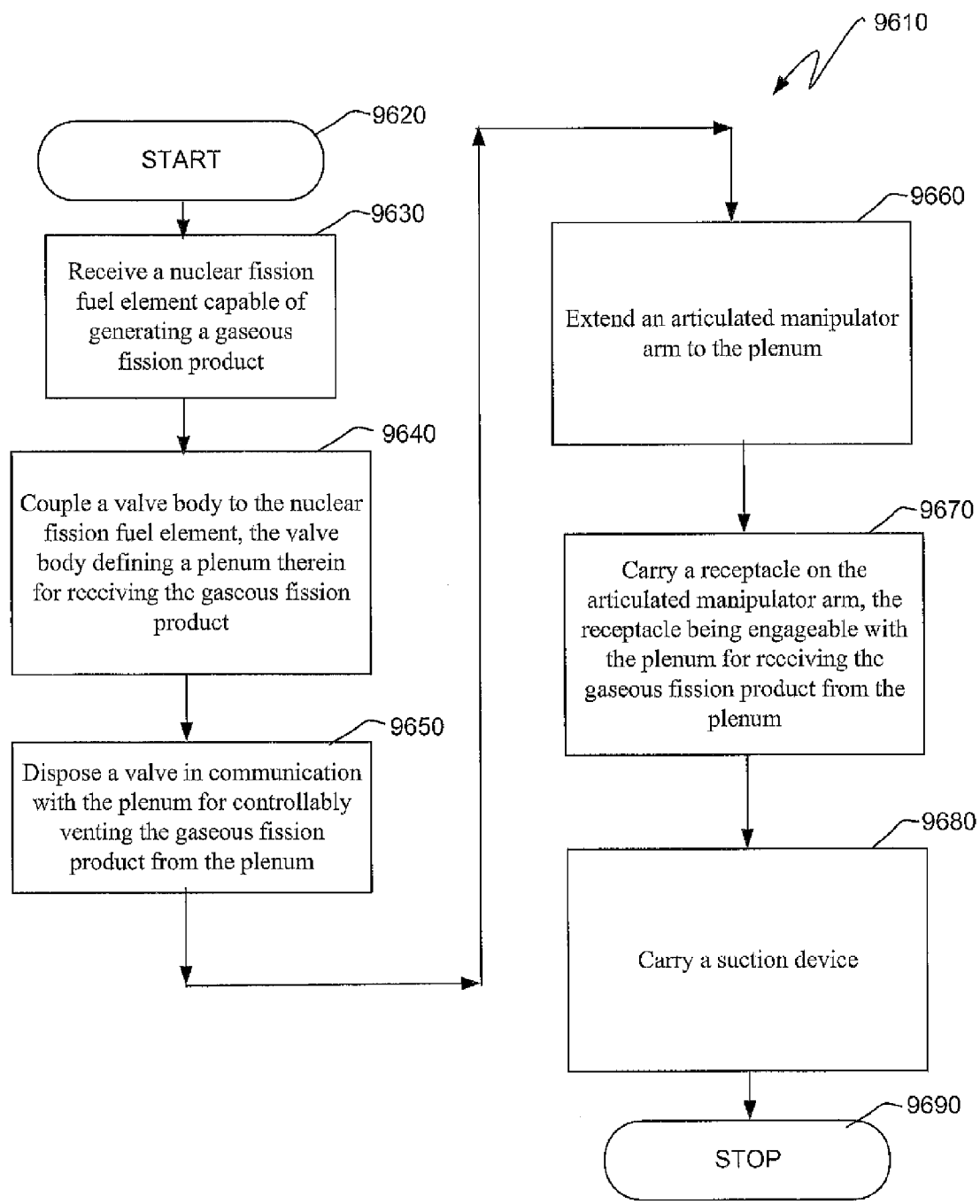

In FIG. 81, an illustrative method 9610 of assembling a vented nuclear fission fuel module starts at a block 9620. At a block 9630, the method comprises receiving a nuclear fission fuel element capable of generating a gaseous fission product. At a block 9640, a valve body is coupled to the nuclear fission fuel element, the valve body defining a plenum therein for receiving the gaseous fission product. At a block 9650, a valve is disposed in communication with the plenum for controllably venting the gaseous fission product from the plenum. At a block 9660, an articulated manipulator arm is extended to the plenum. At a block 9670, a receptacle is carried on the articulated manipulator arm, the receptacle being engageable with the plenum for receiving the gaseous fission product from the plenum. At a block 9680, a suction device is carried. The method stops at a block 9690.

Figure 82:
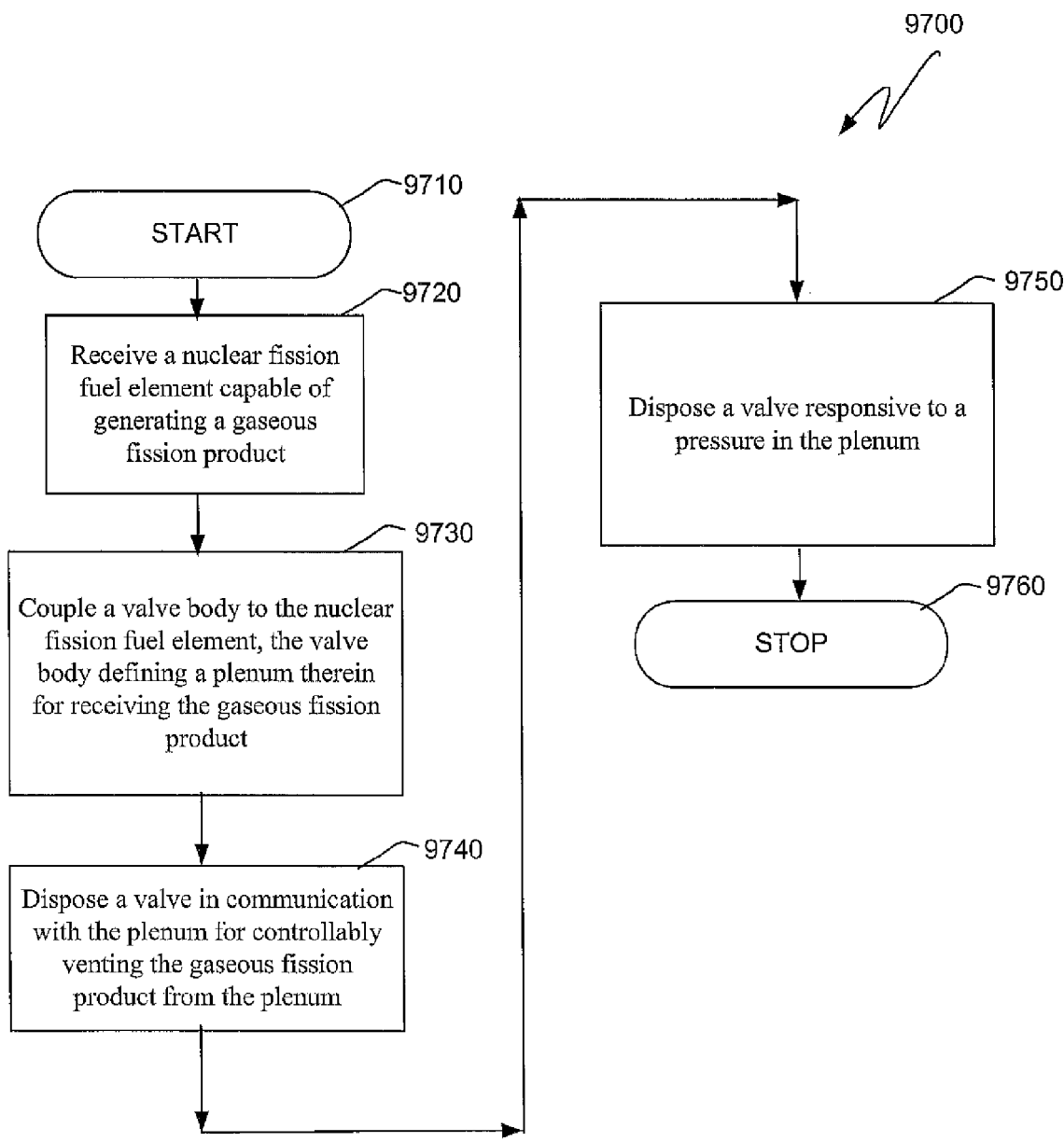

In FIG. 82, an illustrative method 9700 of assembling a vented nuclear fission fuel module starts at a block 9710. At a block 9720, the method comprises receiving a nuclear fission fuel element capable of generating a gaseous fission product. At a block 9730, a valve body is coupled to the nuclear fission fuel element, the valve body defining a plenum therein for receiving the gaseous fission product. At a block 9740, a valve is disposed in communication with the plenum for controllably venting the gaseous fission product from the plenum. At a block 9750, a valve is disposed that is responsive to a pressure in the plenum. The method stops at a block 9760.

Figure 83:
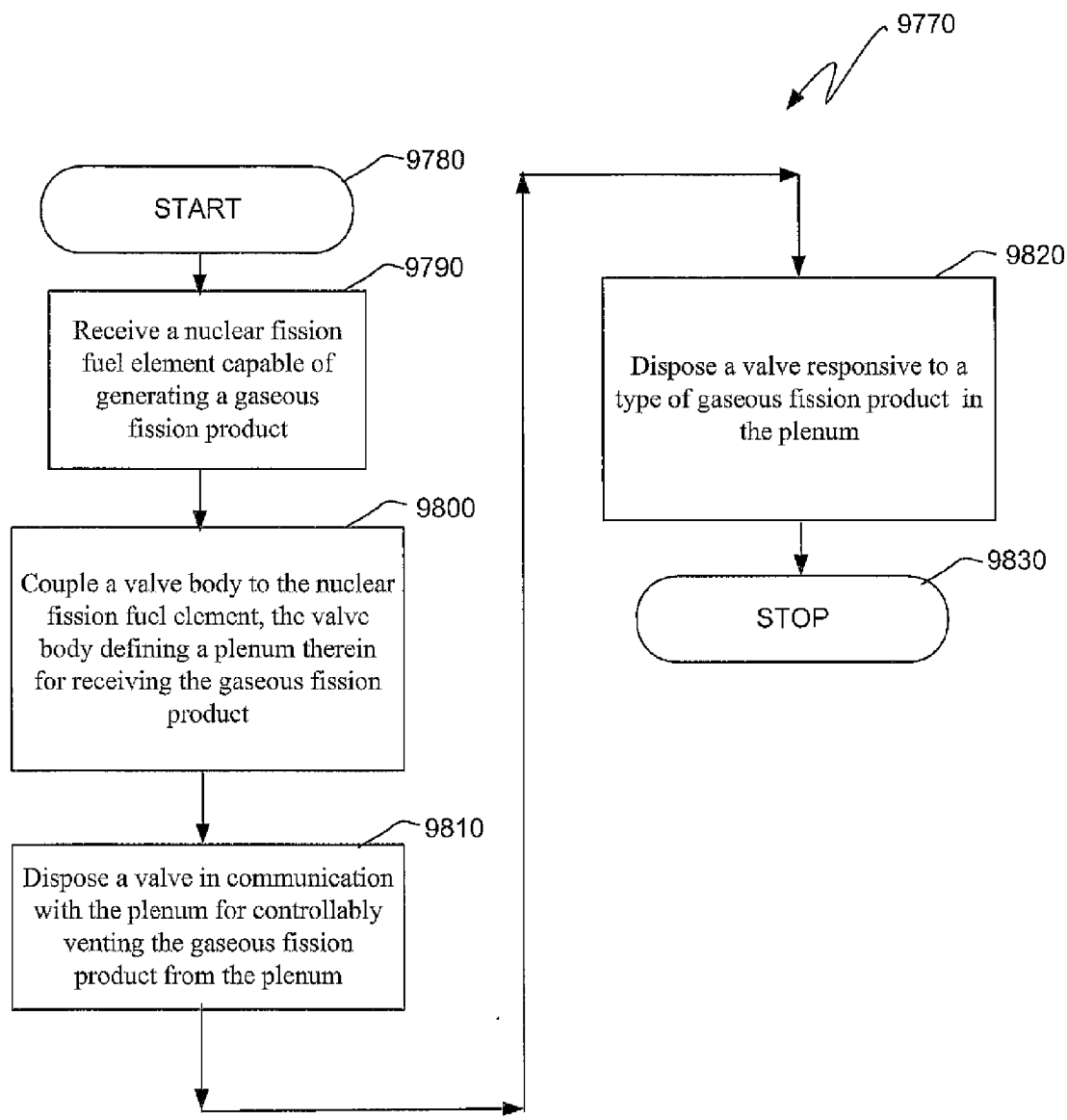

In FIG. 83, an illustrative method 9770 of assembling a vented nuclear fission fuel module starts at a block 9780. At a block 9790, the method comprises receiving a nuclear fission fuel element capable of generating a gaseous fission product. At a block 9800, a valve body is coupled to the nuclear fission fuel element, the valve body defining a plenum therein for receiving the gaseous fission product. At a block 9810, a valve is disposed in communication with the plenum for controllably venting the gaseous fission product from the plenum. At a block 9820, a valve is disposed that is responsive to a type of gaseous fission product in the plenum. The method stops at a block 9830.

Figure 84:
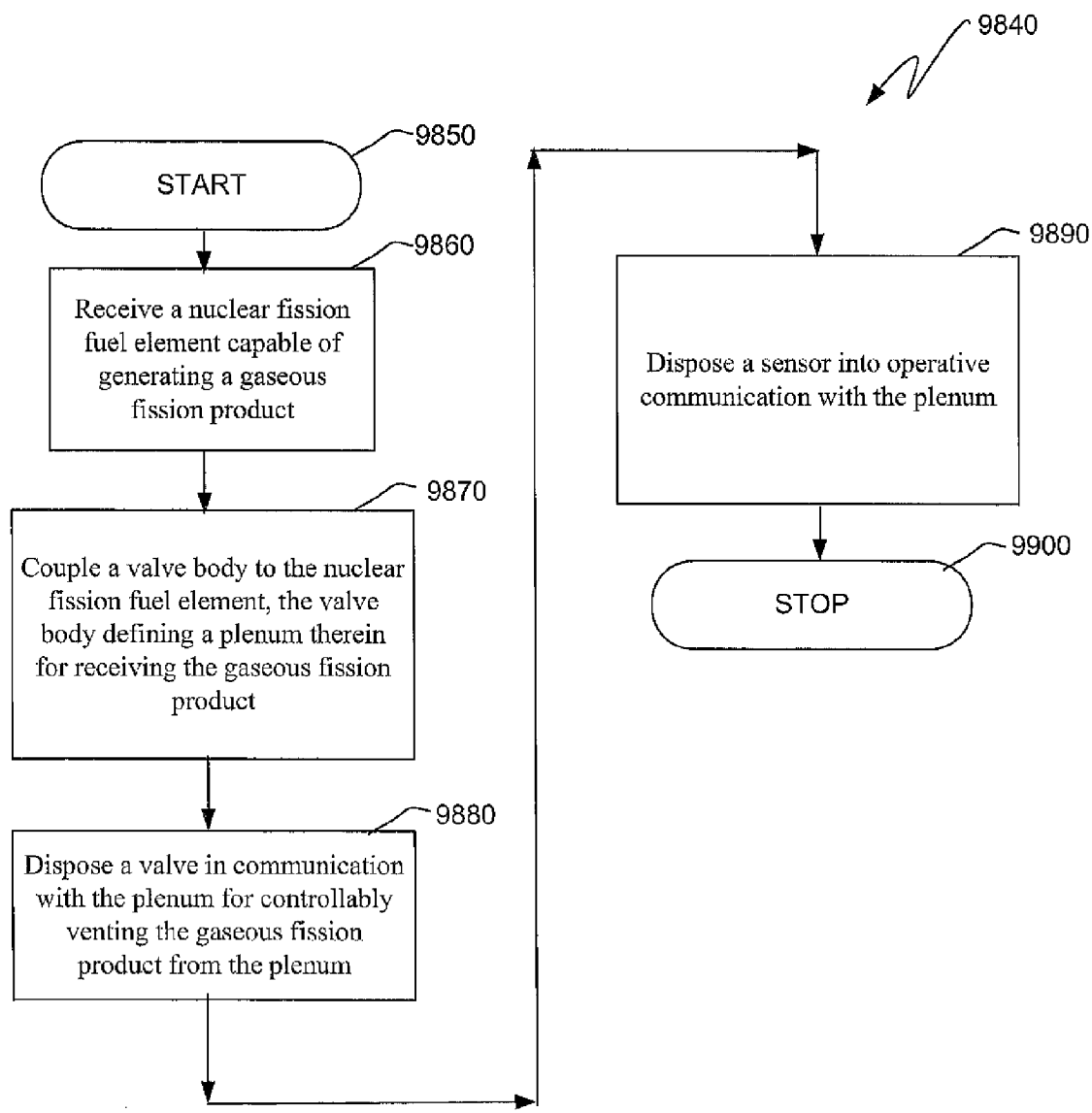

In FIG. 84, an illustrative method 9840 of assembling a vented nuclear fission fuel module starts at a block 9850. At a block 9860, the method comprises receiving a nuclear fission fuel element capable of generating a gaseous fission product. At a block 9870, a valve body is coupled to the nuclear fission fuel element, the valve body defining a plenum therein for receiving the gaseous fission product. At a block 9880, a valve is disposed in communication with the plenum for controllably venting the gaseous fission product from the plenum. At a block 9890, a sensor is disposed into operative communication with the plenum. The method stops at a block 9900.

Figure 85:
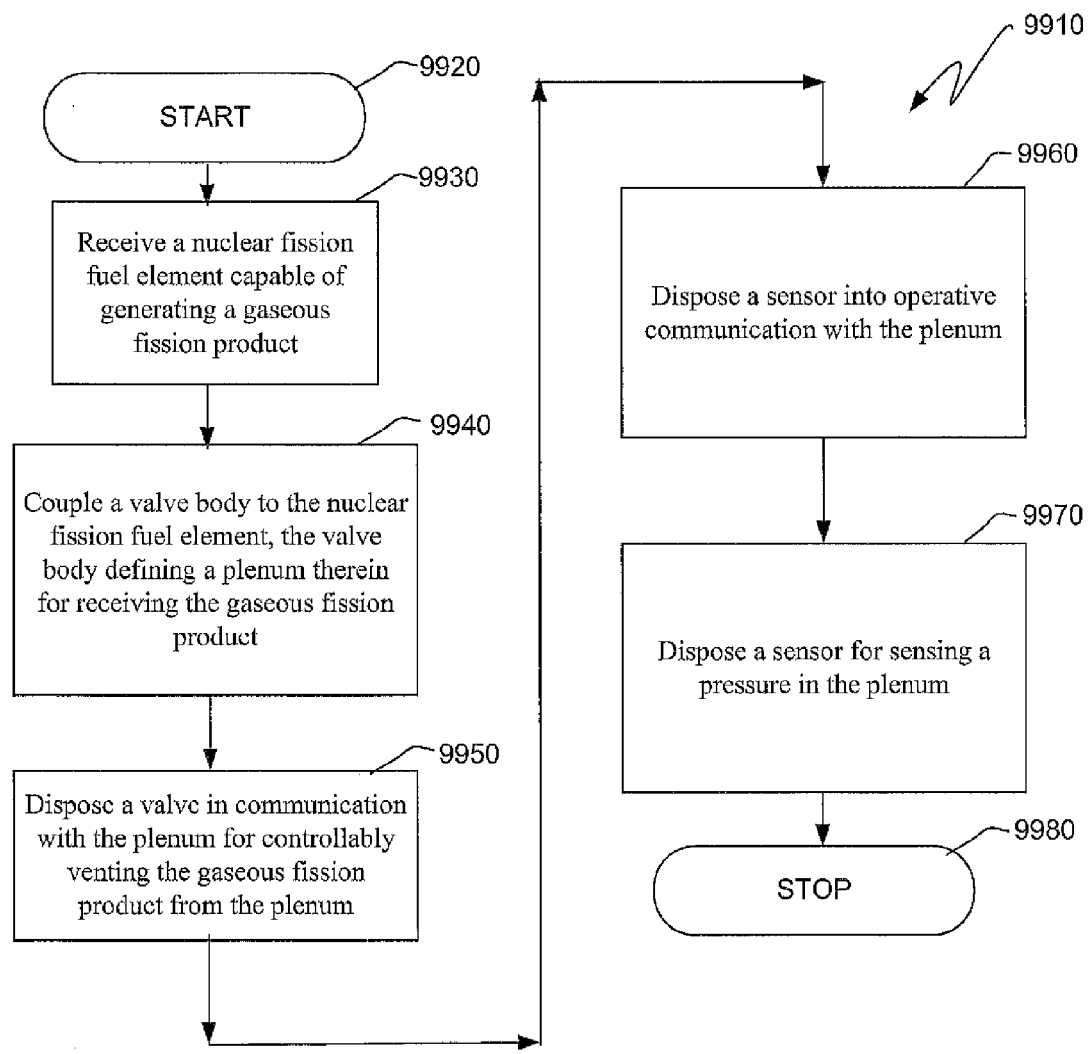

In FIG. 85, an illustrative method 9910 of assembling a vented nuclear fission fuel module starts at a block 9920. At a block 9930, the method comprises receiving a nuclear fission fuel element capable of generating a gaseous fission product. At a block 9940, a valve body is coupled to the nuclear fission fuel element, the valve body defining a plenum therein for receiving the gaseous fission product. At a block 9950, a valve is disposed in communication with the plenum for controllably venting the gaseous fission product from the plenum. At a block 9960, a sensor is disposed into operative communication with the plenum. At a block 9970, a sensor is disposed for sensing a pressure in the plenum. The method stops at a block 9980.

Figure 85A:
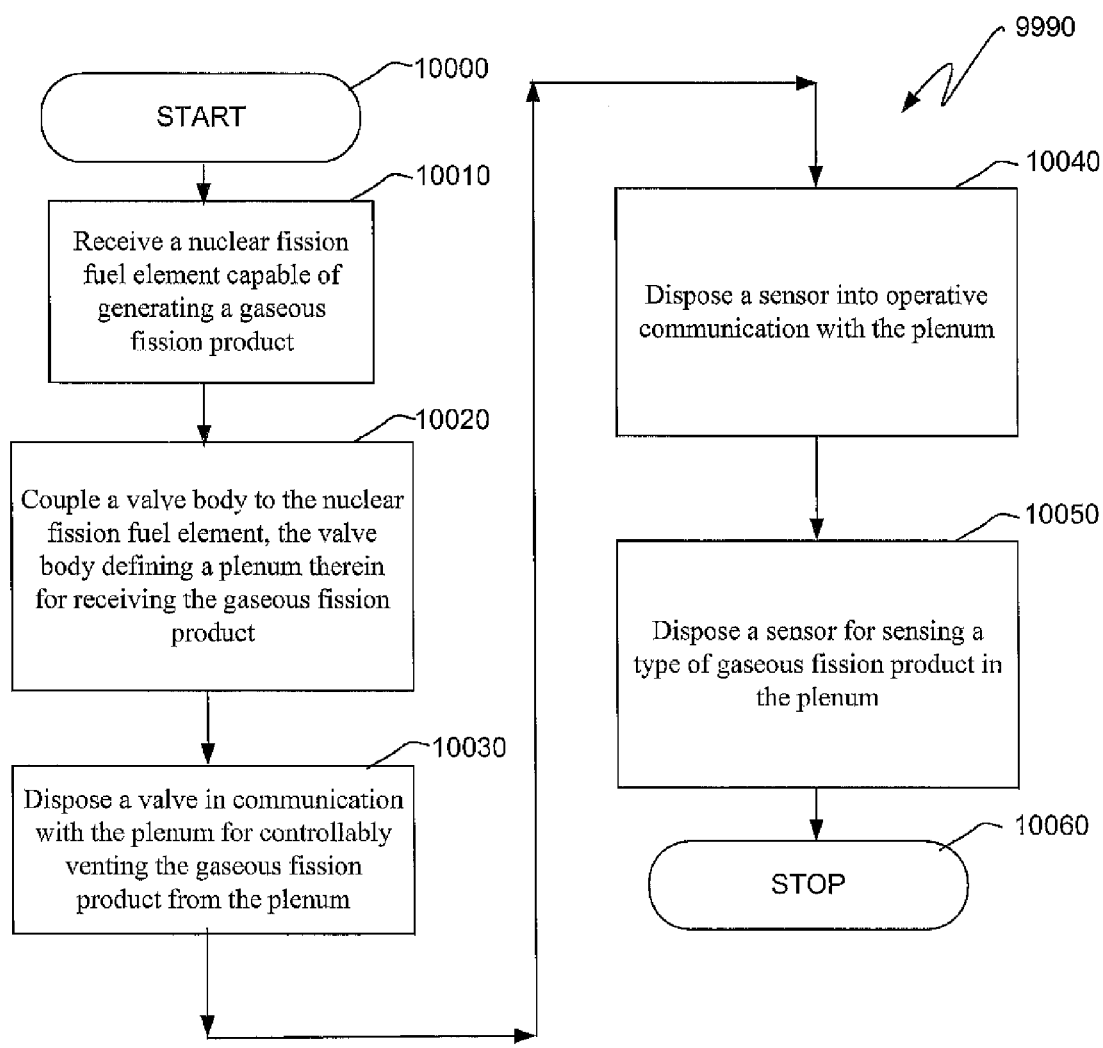

In FIG. 85A, an illustrative method 9990 of assembling a vented nuclear fission fuel module starts at a block 10000. At a block 10010, the method comprises receiving a nuclear fission fuel element capable of generating a gaseous fission product. At a block 10020, a valve body is coupled to the nuclear fission fuel element, the valve body defining a plenum therein for receiving the gaseous fission product. At a block 10030, a valve is disposed in communication with the plenum for controllably venting the gaseous fission product from the plenum. At a block 10040, a sensor is disposed into operative communication with the plenum. At a block 10050, a sensor is disposed for sensing a type of gaseous fission product in the plenum. The method stops at a block 10060.

Figure 85B:
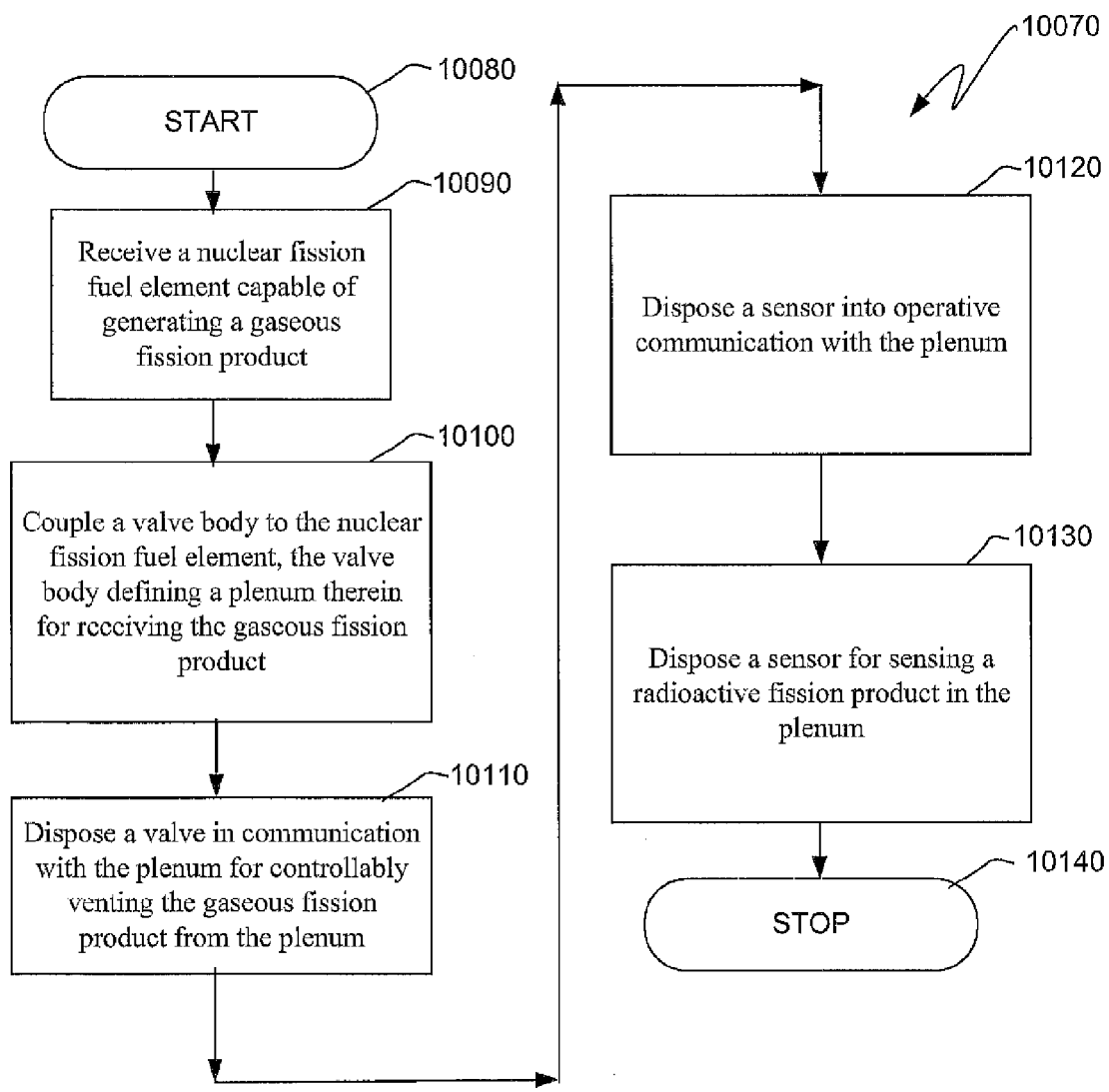

In FIG. 85B, an illustrative method 10070 of assembling a vented nuclear fission fuel module starts at a block 10080. At a block 10090, the method comprises receiving a nuclear fission fuel element capable of generating a gaseous fission product. At a block 10100, a valve body is coupled to the nuclear fission fuel element, the valve body defining a plenum therein for receiving the gaseous fission product. At a block 10110, a valve is disposed in communication with the plenum for controllably venting the gaseous fission product from the plenum. At a block 10120, a sensor is disposed into operative communication with the plenum. At a block 10130, a sensor is disposed for sensing a radioactive fission product in the plenum. The method stops at a block 10140.

Figure 85C:
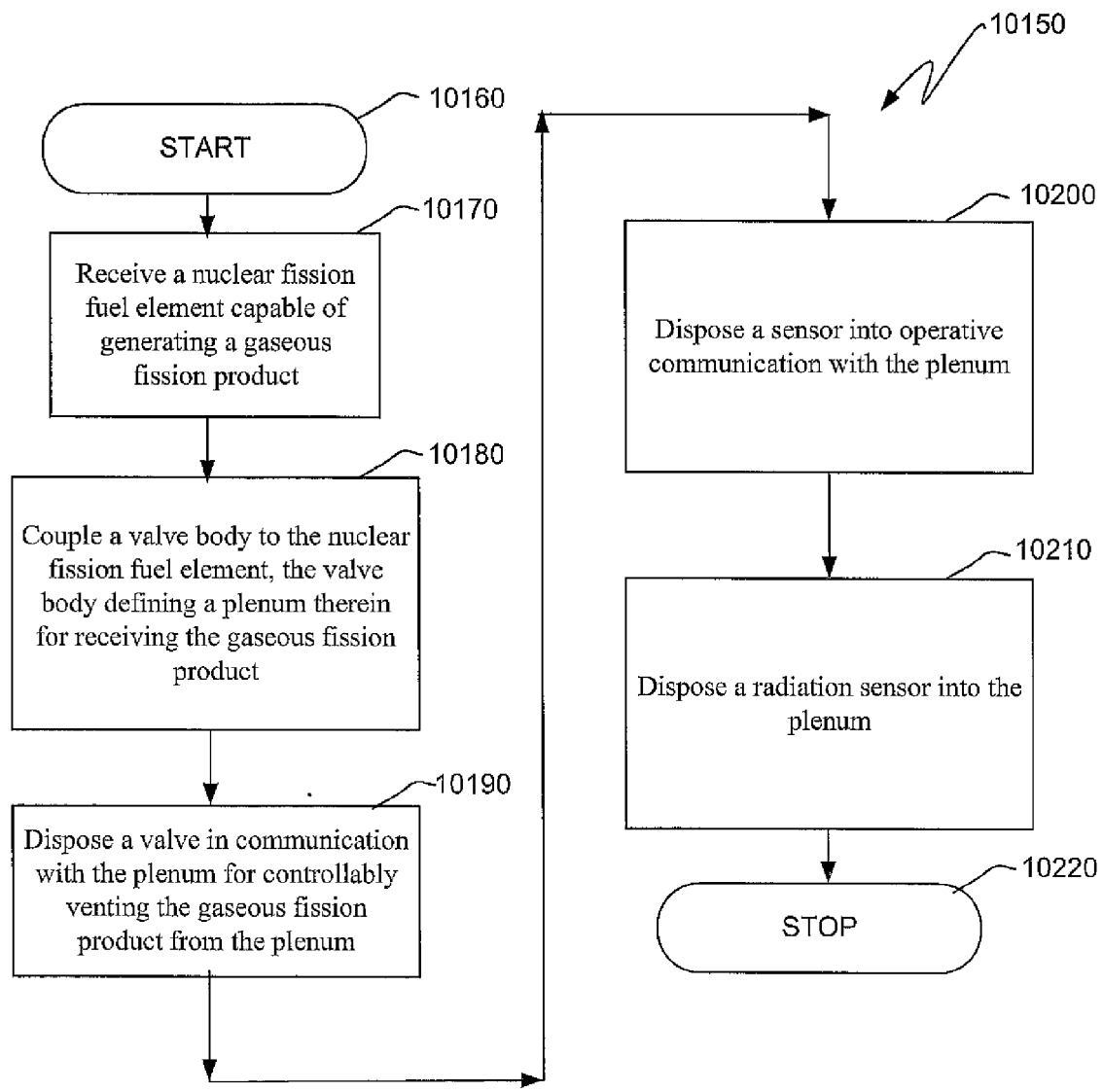

In FIG. 85C, an illustrative method 10150 of assembling a vented nuclear fission fuel module starts at a block 10160. At a block 10170, the method comprises receiving a nuclear fission fuel element capable of generating a gaseous fission product. At a block 10180, a valve body is coupled to the nuclear fission fuel element, the valve body defining a plenum therein for receiving the gaseous fission product. At a block 10190, a valve is disposed in communication with the plenum for controllably venting the gaseous fission product from the plenum. At a block 10200, a sensor is disposed into operative communication with the plenum. At a block 10210, a radiation sensor is disposed into the plenum. The method stops at a block 10220.

Figure 85D:
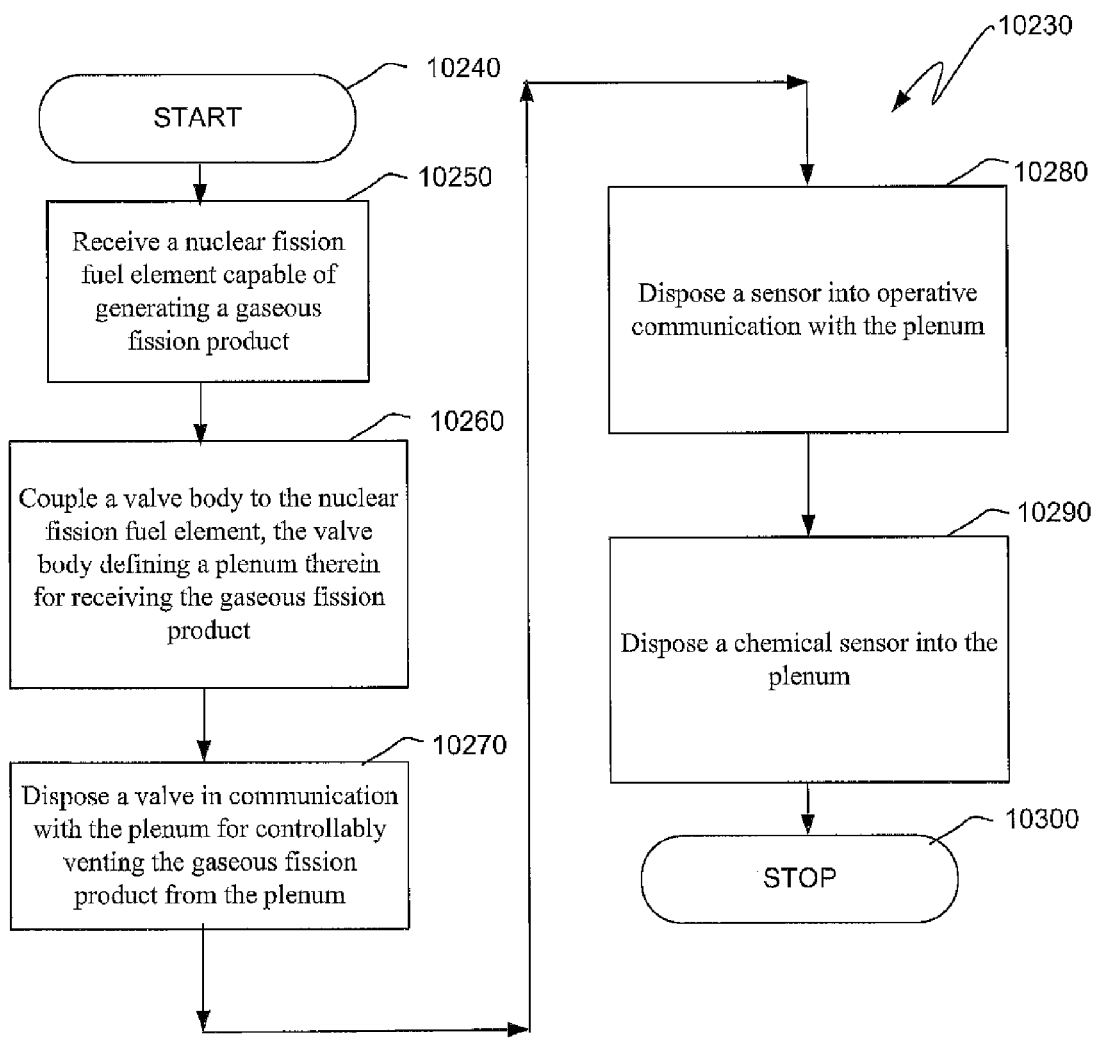

In FIG. 85D, an illustrative method 10230 of assembling a vented nuclear fission fuel module starts at a block 10240. At a block 10250, the method comprises receiving a nuclear fission fuel element capable of generating a gaseous fission product. At a block 10260, a valve body is coupled to the nuclear fission fuel element, the valve body defining a plenum therein for receiving the gaseous fission product. At a block 10270, a valve is disposed in communication with the plenum for controllably venting the gaseous fission product from the plenum. At a block 10280, a sensor is disposed into operative communication with the plenum. At a block 10290, a chemical sensor is disposed into the plenum. The method stops at a block 10300.

Figure 85E:
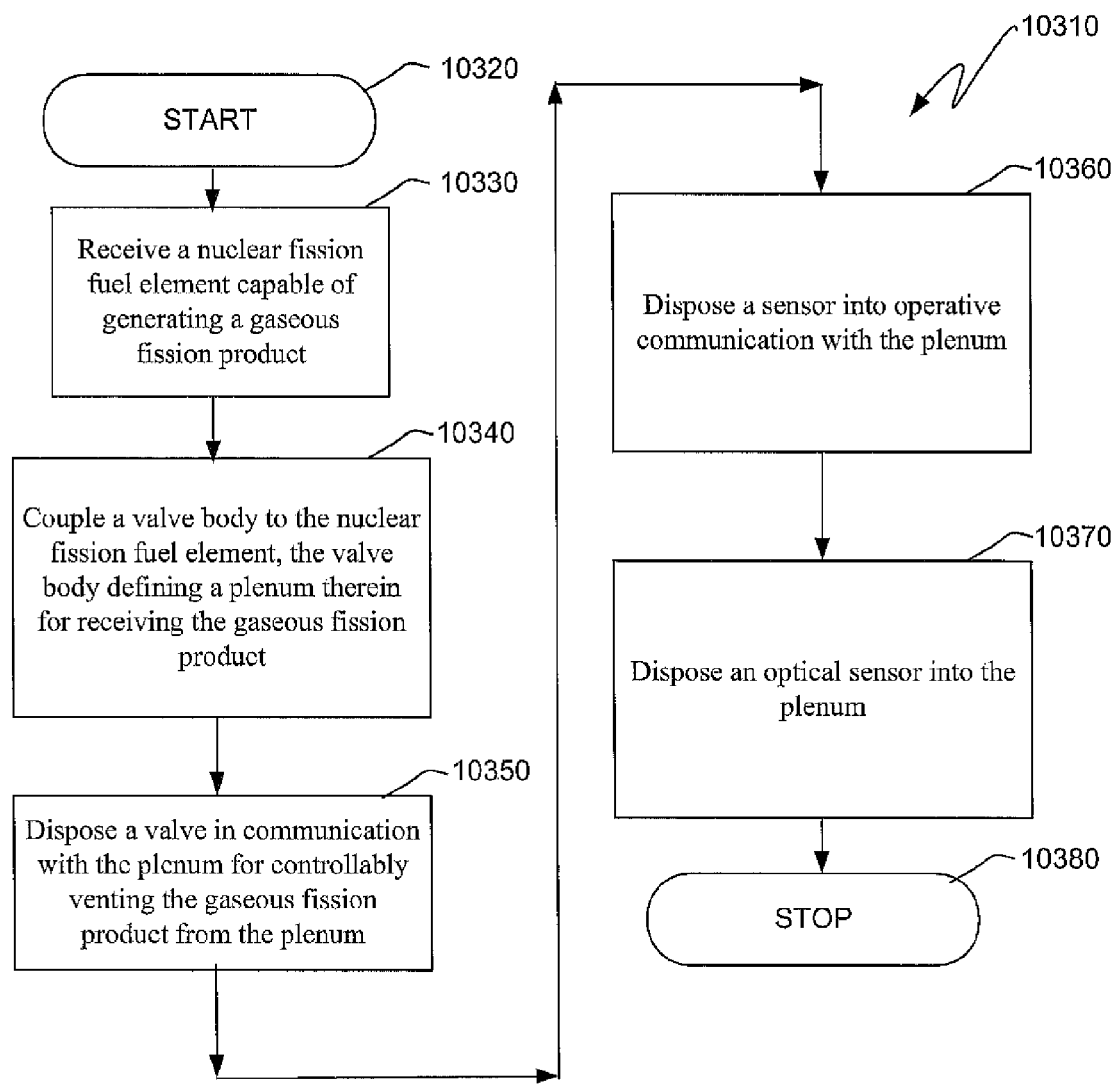

In FIG. 85E, an illustrative method 10310 of assembling a vented nuclear fission fuel module starts at a block 10320. At a block 10330, the method comprises receiving a nuclear fission fuel element capable of generating a gaseous fission product. At a block 10340, a valve body is coupled to the nuclear fission fuel element, the valve body defining a plenum therein for receiving the gaseous fission product. At a block 10350, a valve is disposed in communication with the plenum for controllably venting the gaseous fission product from the plenum. At a block 10360, a sensor is disposed into operative communication with the plenum. At a block 10370, an optical sensor is disposed into the plenum. The method stops at a block 10380.

Figure 85F:
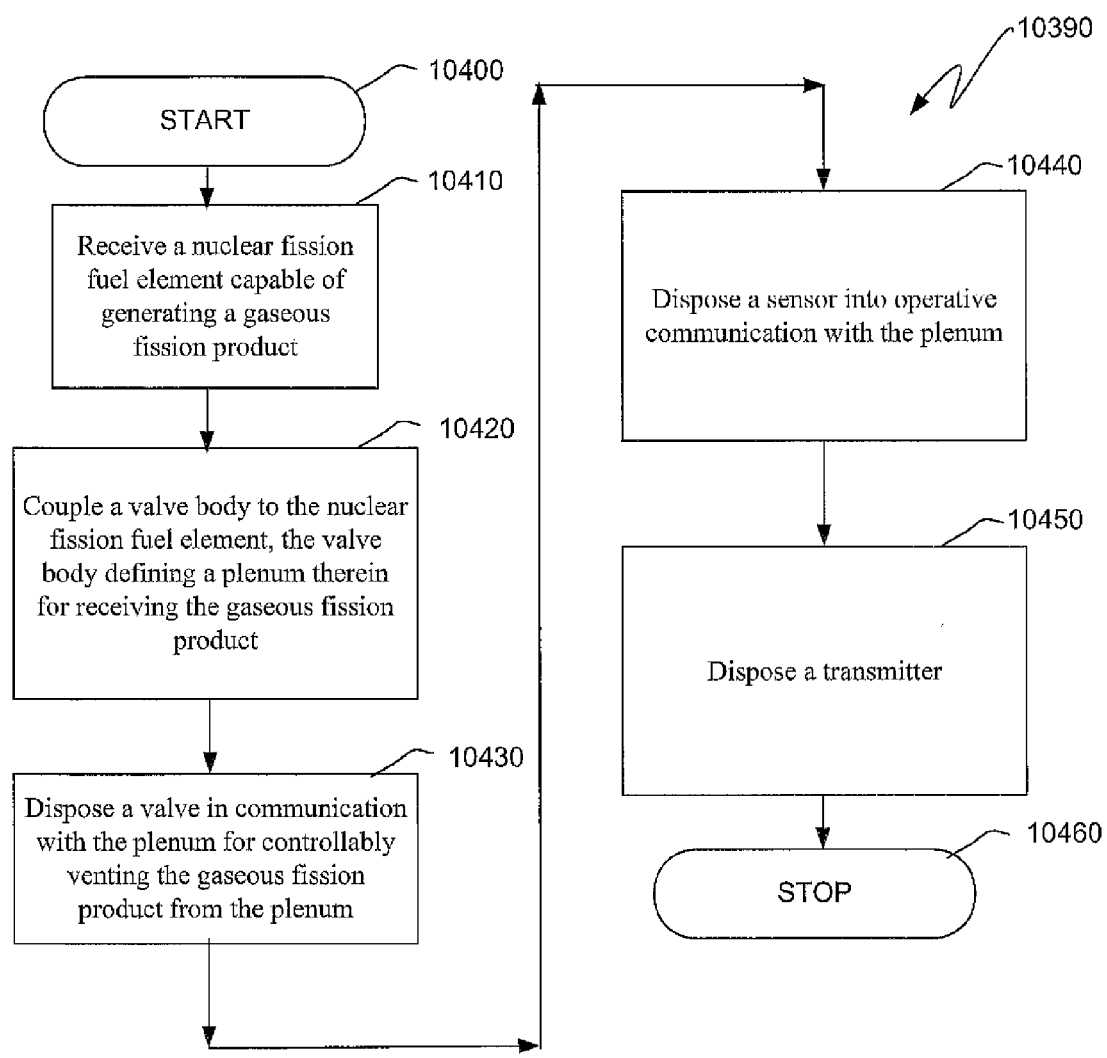

In FIG. 85F, an illustrative method 10390 of assembling a vented nuclear fission fuel module starts at a block 10400. At a block 10410, the method comprises receiving a nuclear fission fuel element capable of generating a gaseous fission product. At a block 10420, a valve body is coupled to the nuclear fission fuel element, the valve body defining a plenum therein for receiving the gaseous fission product. At a block 10430, a valve is disposed in communication with the plenum for controllably venting the gaseous fission product from the plenum. At a block 10440, a sensor is disposed into operative communication with the plenum. At a block 10450, a transmitter is disposed. The method stops at a block 10460.

Figure 86:
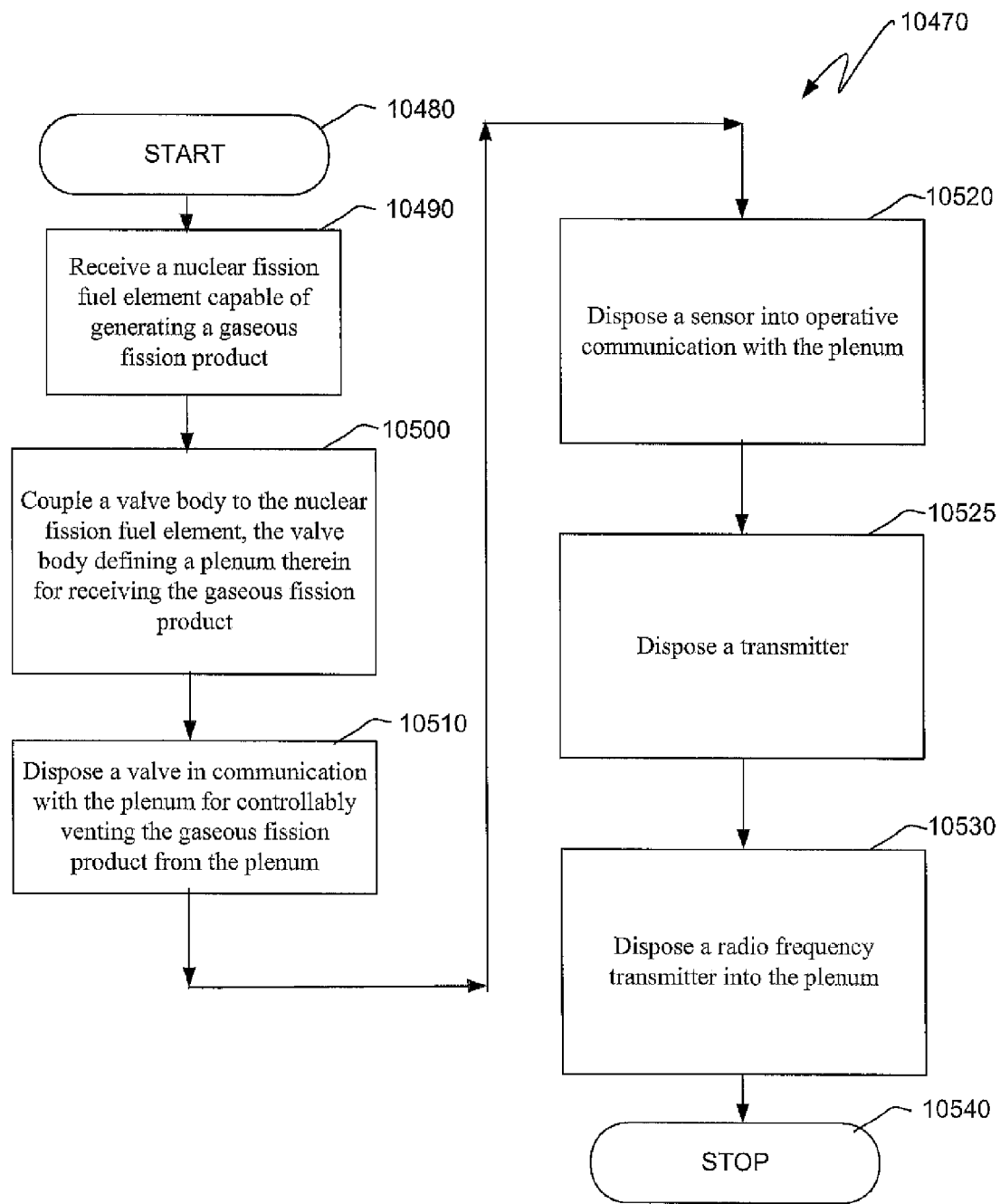

In FIG. 86, an illustrative method 10470 of assembling a vented nuclear fission fuel module starts at a block 10480. At a block 10490, the method comprises receiving a nuclear fission fuel element capable of generating a gaseous fission product. At a block 10500, a valve body is coupled to the nuclear fission fuel element, the valve body defining a plenum therein for receiving the gaseous fission product. At a block 10510, a valve is disposed in communication with the plenum for controllably venting the gaseous fission product from the plenum. At a block 10520, a sensor is disposed into operative communication with the plenum. At a block 10525, a transmitter is disposed. At a block 10530, a radio frequency transmitter is disposed into the plenum. The method stops at a block 10540.

Figure 87:
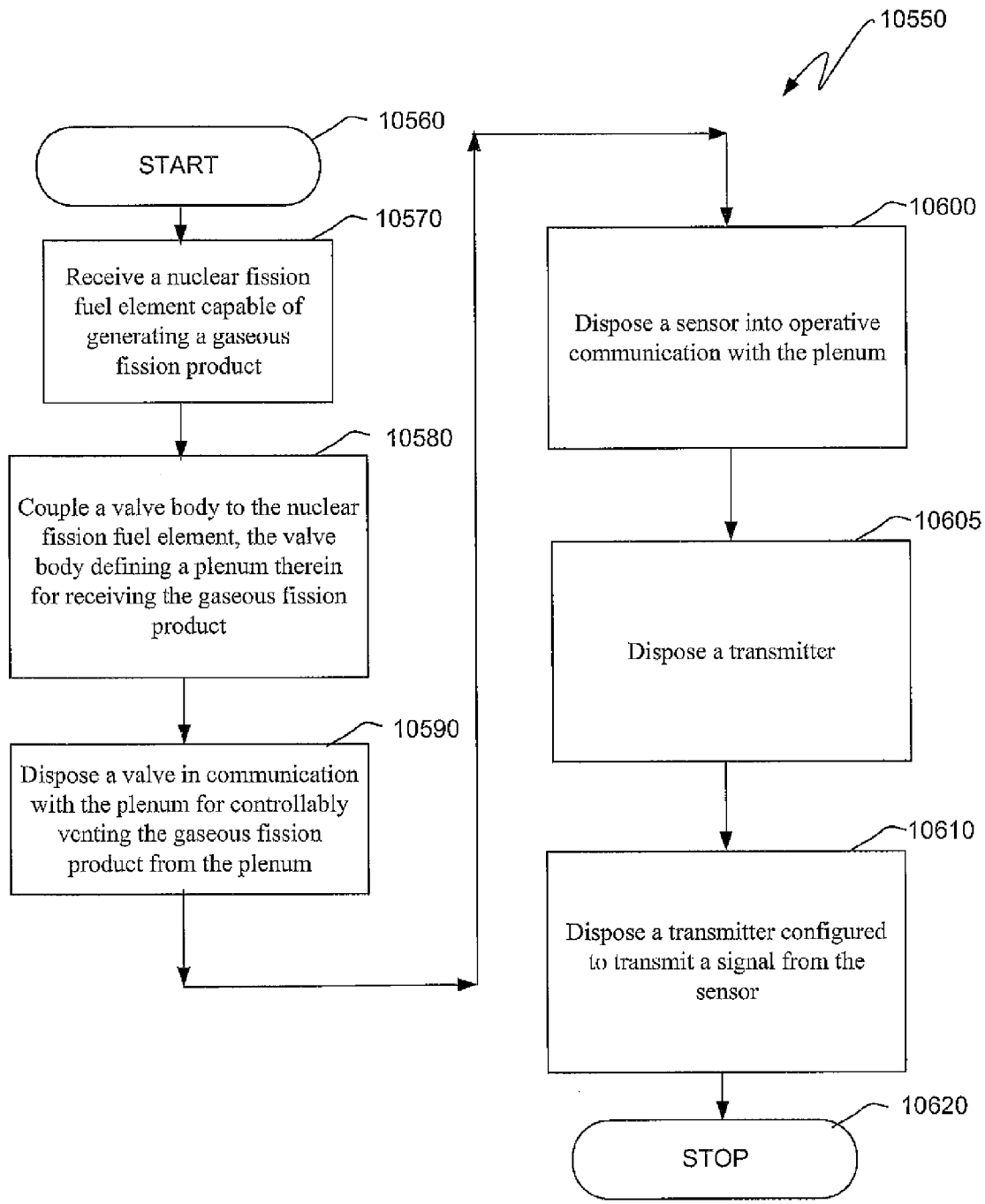

In FIG. 87, an illustrative method 10550 of assembling a vented nuclear fission fuel module starts at a block 10560. At a block 10570, the method comprises receiving a nuclear fission fuel element capable of generating a gaseous fission product. At a block 10580, a valve body is coupled to the nuclear fission fuel element, the valve body defining a plenum therein for receiving the gaseous fission product. At a block 10590, a valve is disposed in communication with the plenum for controllably venting the gaseous fission product from the plenum. At a block 10600, a sensor is disposed into operative communication with the plenum. At a block 10605, a transmitter is disposed. At a block 10610, a transmitter is disposed that is configured to transmit a signal from the sensor. The method stops at a block 10620.

Figure 87A:
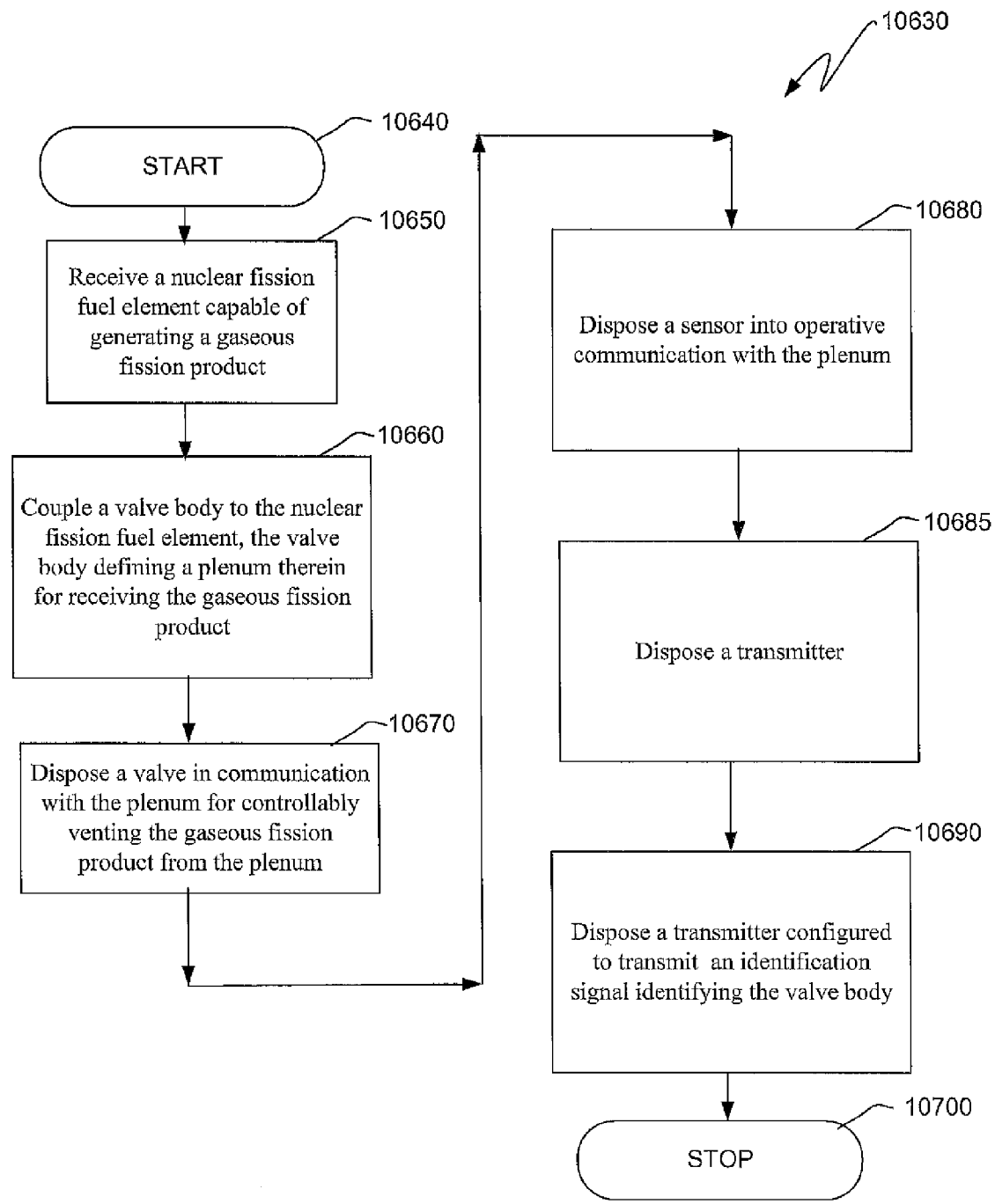

In FIG. 87A, an illustrative method 10630 of assembling a vented nuclear fission fuel module starts at a block 10640. At a block 10650, the method comprises receiving a nuclear fission fuel element capable of generating a gaseous fission product. At a block 10660, a valve body is coupled to the nuclear fission fuel element, the valve body defining a plenum therein for receiving the gaseous fission product. At a block 10670, a valve is disposed in communication with the plenum for controllably venting the gaseous fission product from the plenum. At a block 10680, a sensor is disposed into operative communication with the plenum. At a block 10685, a transmitter is disposed. At a block 10690, a transmitter is disposed that is configured to transmit an identification signal identifying the valve body. The method stops at a block 10700.

Figure 88:
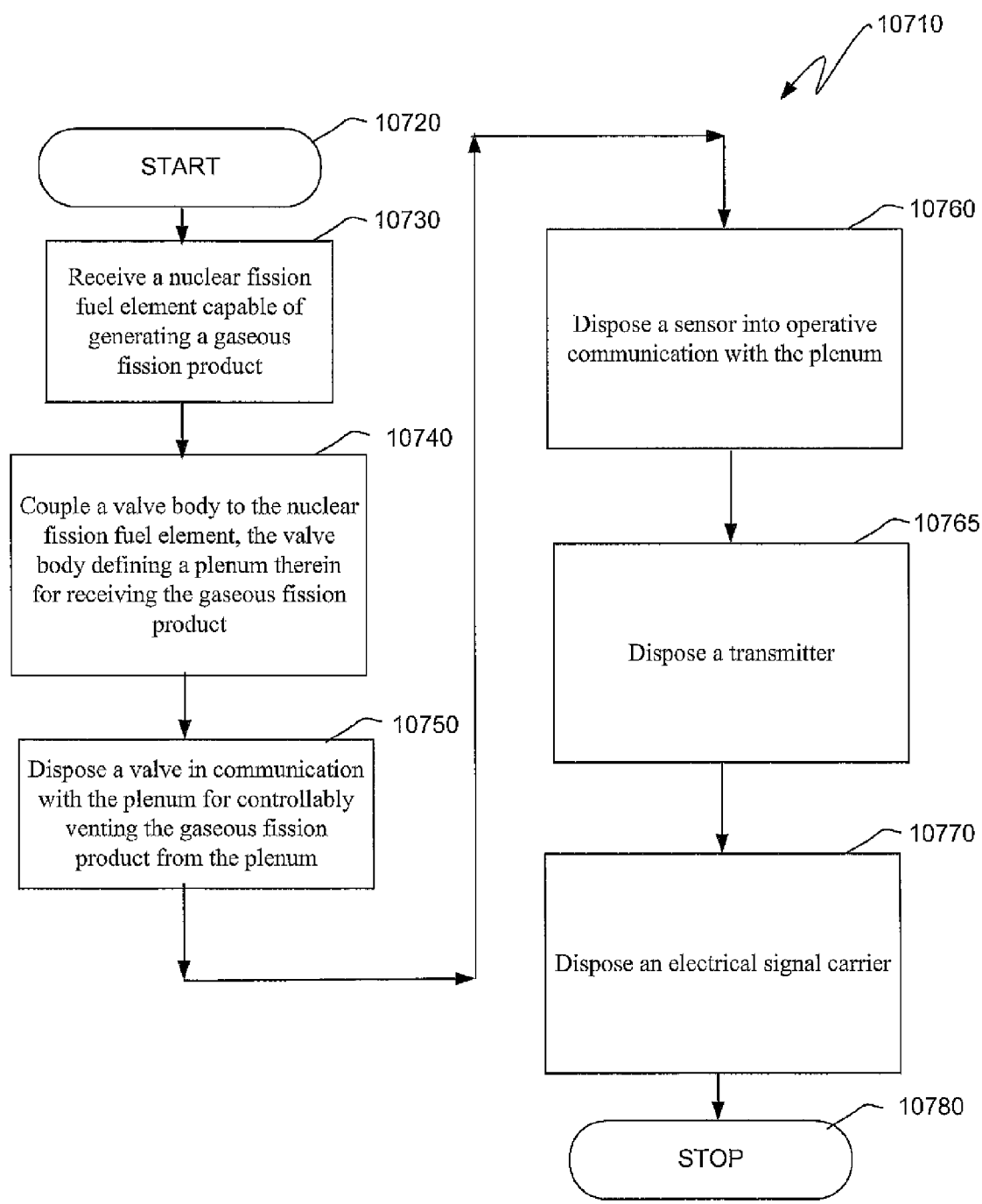

In FIG. 88, an illustrative method 10710 of assembling a vented nuclear fission fuel module starts at a block 10720. At a block 10730, the method comprises receiving a nuclear fission fuel element capable of generating a gaseous fission product. At a block 10740, a valve body is coupled to the nuclear fission fuel element, the valve body defining a plenum therein for receiving the gaseous fission product. At a block 10750, a valve is disposed in communication with the plenum for controllably venting the gaseous fission product from the plenum. At a block 10760, a sensor is disposed into operative communication with the plenum. At a block 10765, a transmitter is disposed. At a block 10770, an electrical signal carrier is disposed. The method stops at a block 10780.

Figure 88A:
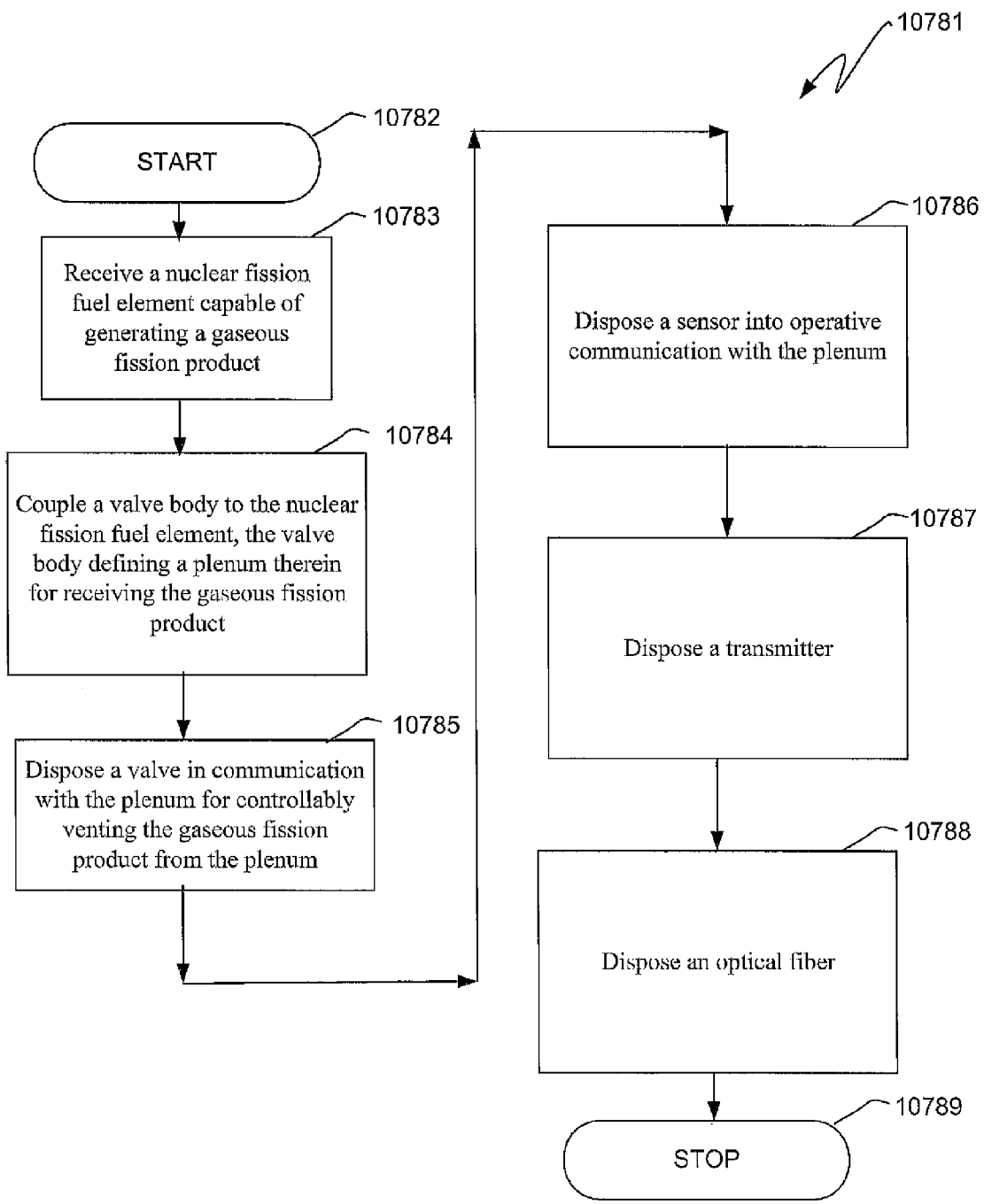

In FIG. 88A, an illustrative method 10781 of assembling a vented nuclear fission fuel module starts at a block 10782. At a block 10783, the method comprises receiving a nuclear fission fuel element capable of generating a gaseous fission product. At a block 10784, a valve body is coupled to the nuclear fission fuel element, the valve body defining a plenum therein for receiving the gaseous fission product. At a block 10785, a valve is disposed in communication with the plenum for controllably venting the gaseous fission product from the plenum. At a block 10786, a sensor is disposed into operative communication with the plenum. At a block 10787, a transmitter is disposed. At a block 10788, an optical fiber is disposed. The method stops at a block 10789.

Figure 89:
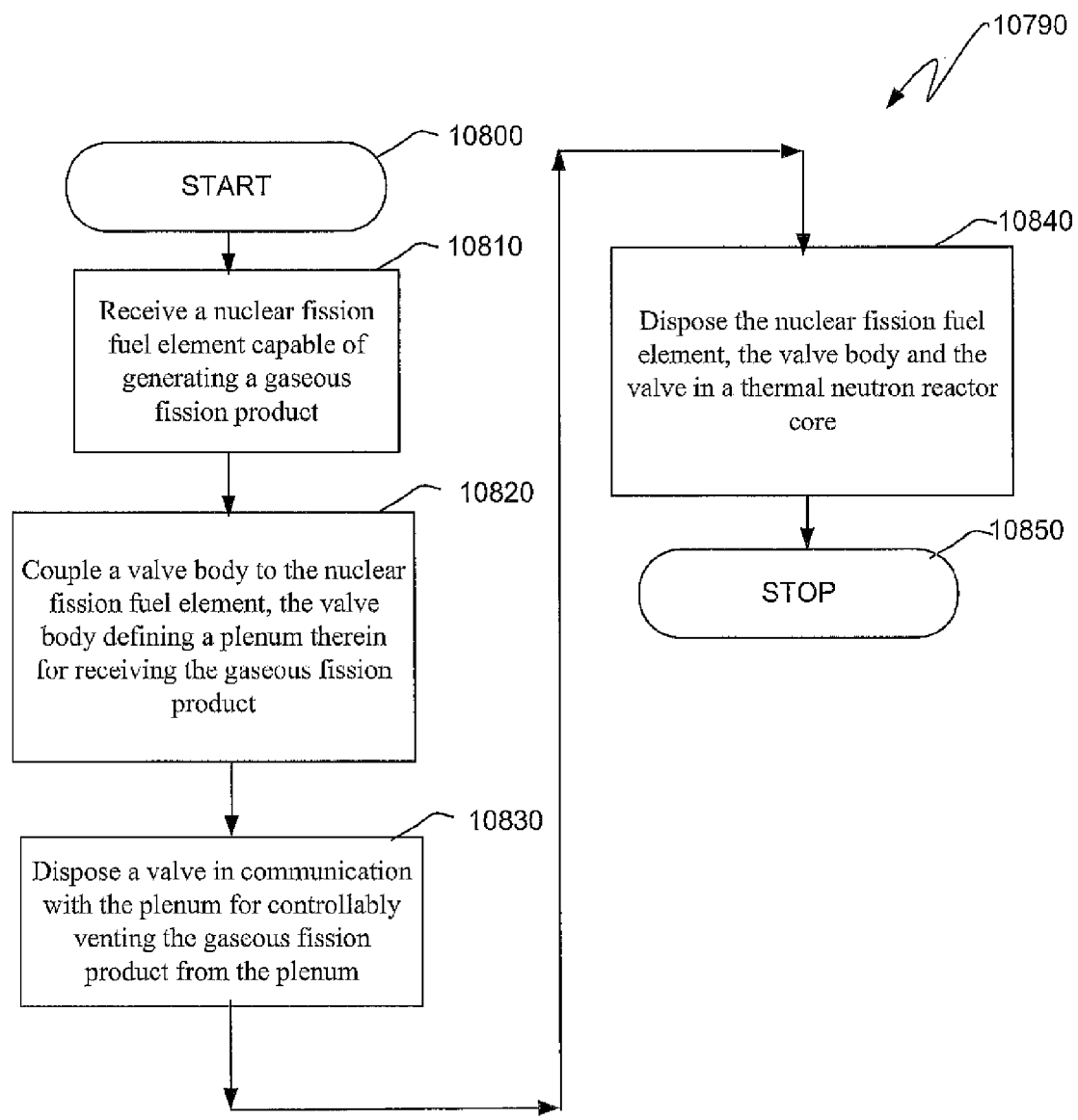

In FIG. 89, an illustrative method 10790 of assembling a vented nuclear fission fuel module starts at a block 10800. At a block 10810, the method comprises receiving a nuclear fission fuel element capable of generating a gaseous fission product. At a block 10820, a valve body is coupled to the nuclear fission fuel element, the valve body defining a plenum therein for receiving the gaseous fission product. At a block 10830, a valve is disposed in communication with the plenum for controllably venting the gaseous fission product from the plenum. At a block 10840, the nuclear fission fuel element, the valve body and the valve are disposed in a thermal neutron reactor core. The method stops at a block 10850.

Figure 90:
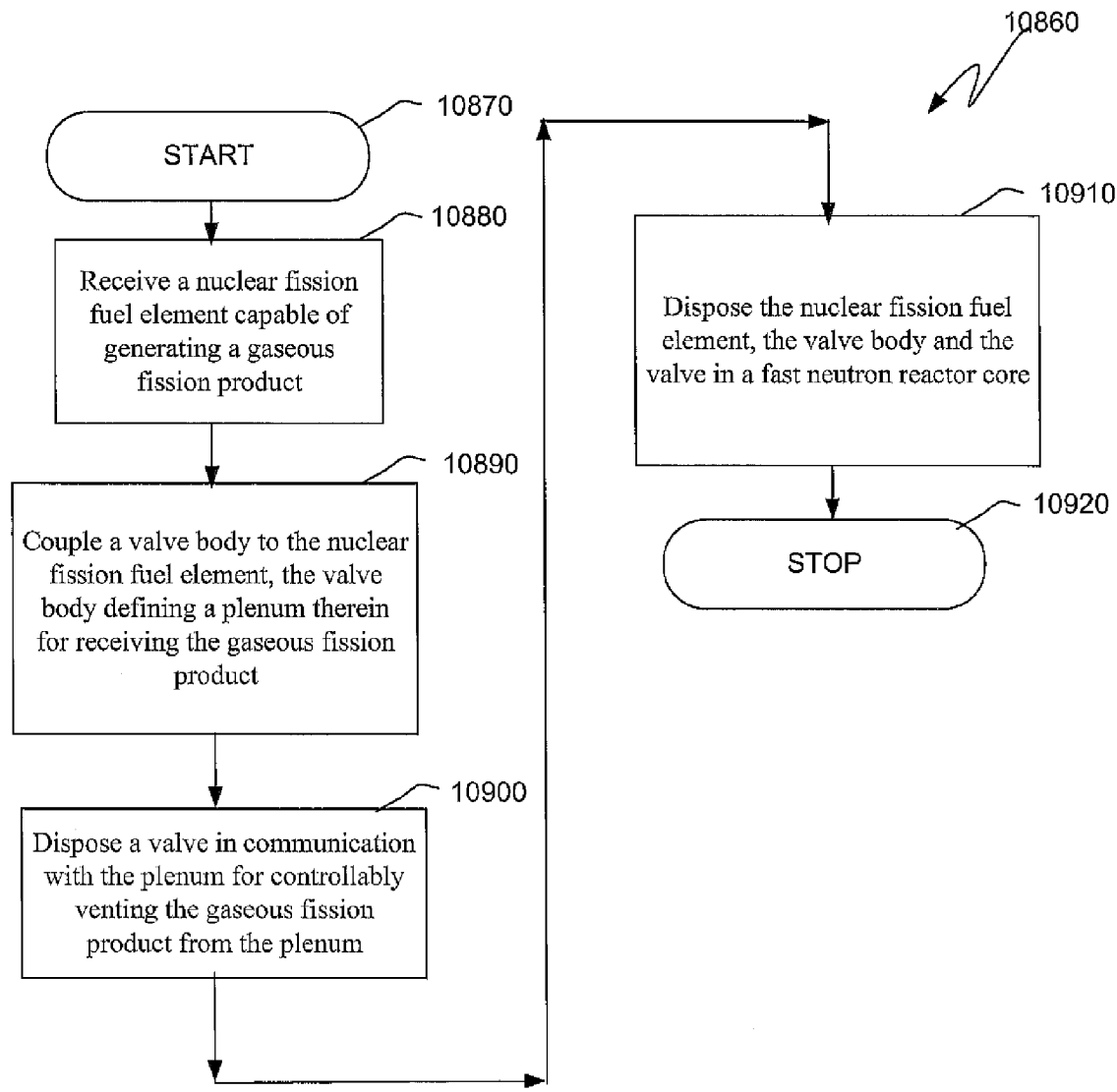

In FIG. 90, an illustrative method 10860 of assembling a vented nuclear fission fuel module starts at a block 10870. At a block 10880, the method comprises receiving a nuclear fission fuel element capable of generating a gaseous fission product. At a block 10890, a valve body is coupled to the nuclear fission fuel element, the valve body defining a plenum therein for receiving the gaseous fission product. At a block 10900, a valve is disposed in communication with the plenum for controllably venting the gaseous fission product from the plenum. At a block 10910, the nuclear fission fuel element, the valve body and the valve are disposed in a fast neutron reactor core. The method stops at a block 10920.

Figure 91:
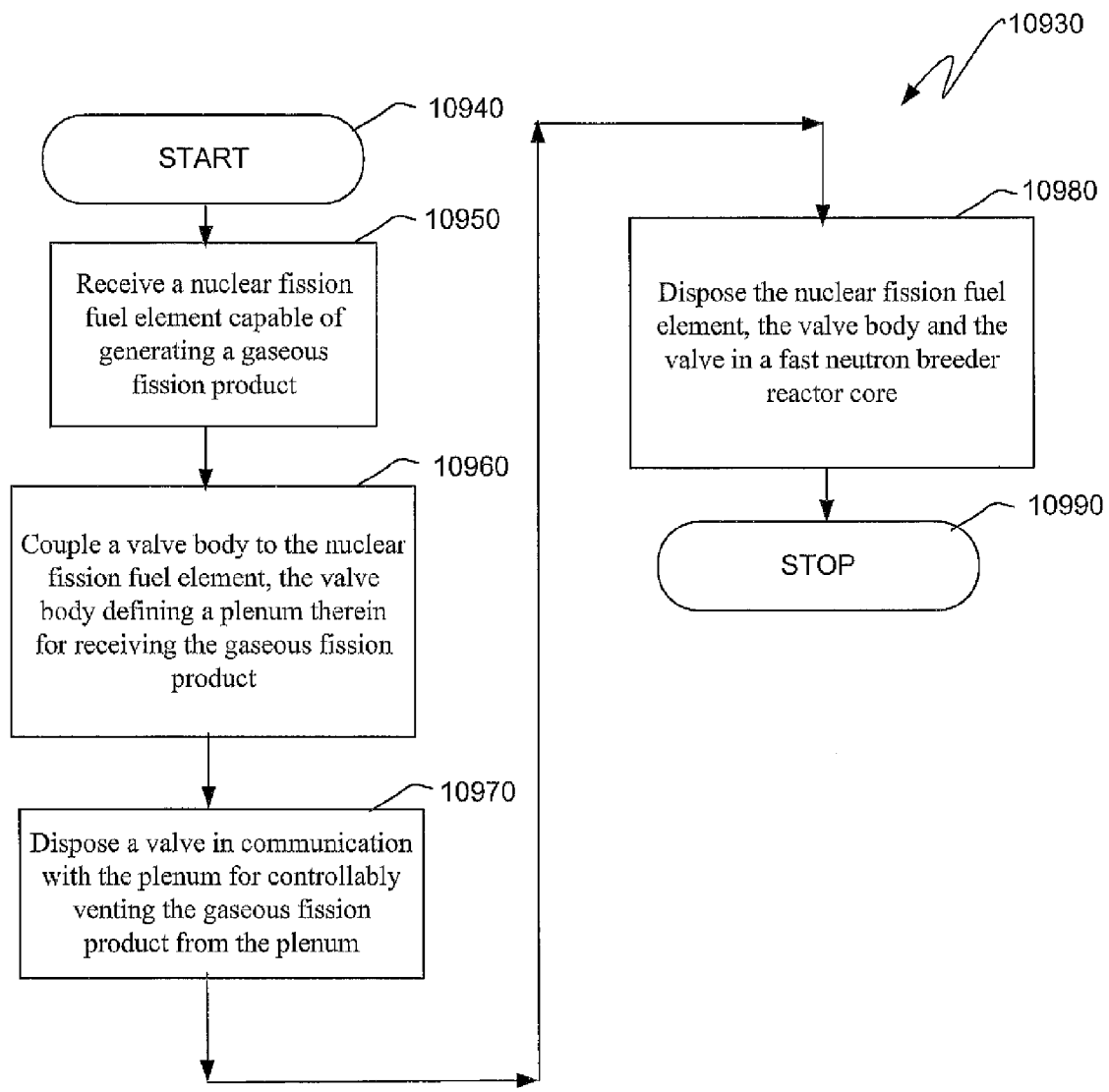

In FIG. 91, an illustrative method 10930 of assembling a vented nuclear fission fuel module starts at a block 10940. At a block 10950, the method comprises receiving a nuclear fission fuel element capable of generating a gaseous fission product. At a block 10960, a valve body is coupled to the nuclear fission fuel element, the valve body defining a plenum therein for receiving the gaseous fission product. At a block 10970, a valve is disposed in communication with the plenum for controllably venting the gaseous fission product from the plenum. At a block 10980, the nuclear fission fuel element, the valve body and the valve are disposed in a fast neutron breeder reactor core. The method stops at a block 10990.

Figure 92:
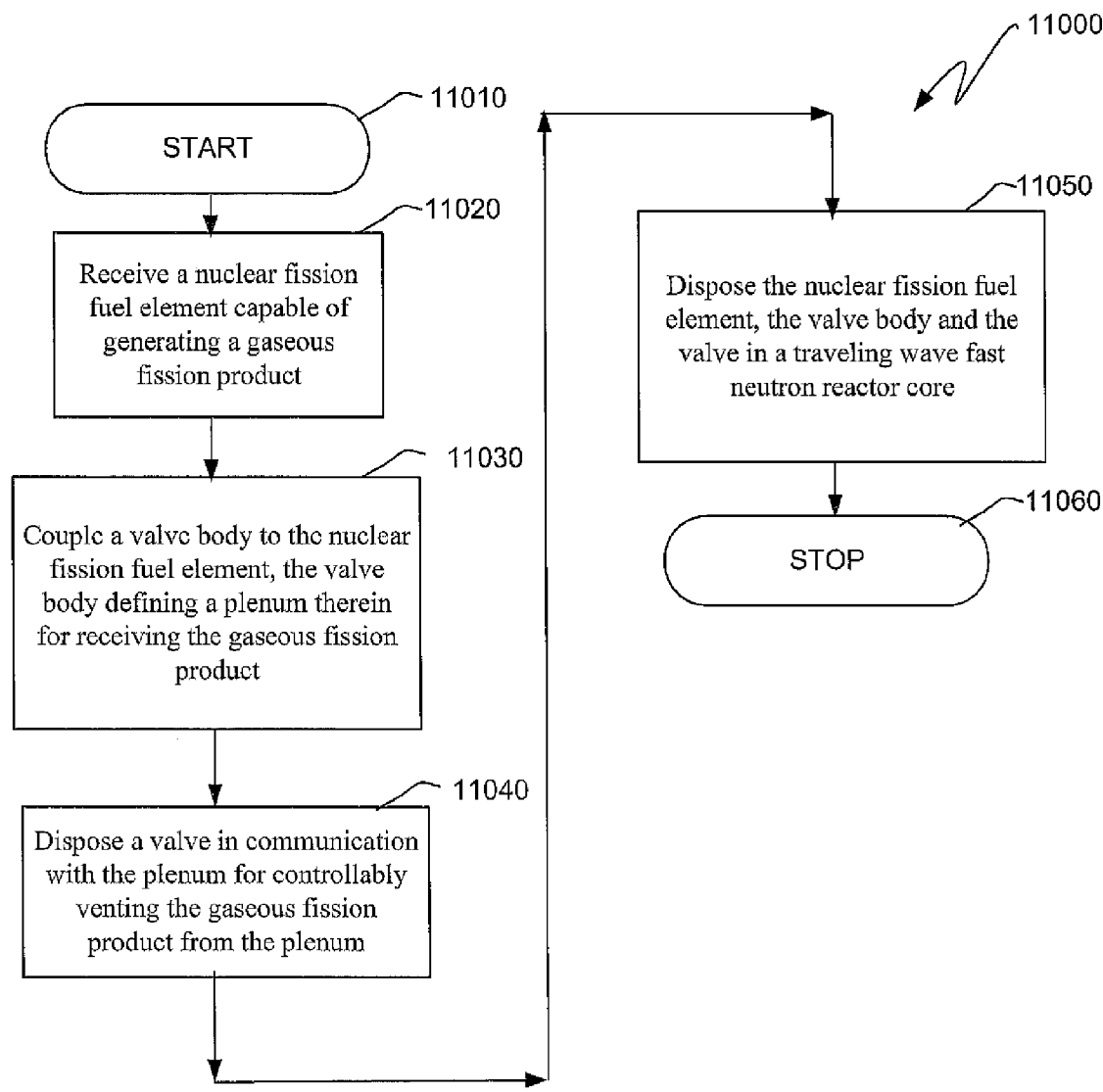

In FIG. 92, an illustrative method 11000 of assembling a vented nuclear fission fuel module starts at a block 11010. At a block 11020, the method comprises receiving a nuclear fission fuel element capable of generating a gaseous fission product. At a block 11030, a valve body is coupled to the nuclear fission fuel element, the valve body defining a plenum therein for receiving the gaseous fission product. At a block 11040, a valve is disposed in communication with the plenum for controllably venting the gaseous fission product from the plenum. At a block 11050, the nuclear fission fuel element, the valve body and the valve are disposed in a traveling wave fast neutron reactor core. The method stops at a block 11060.

Figure 92A:
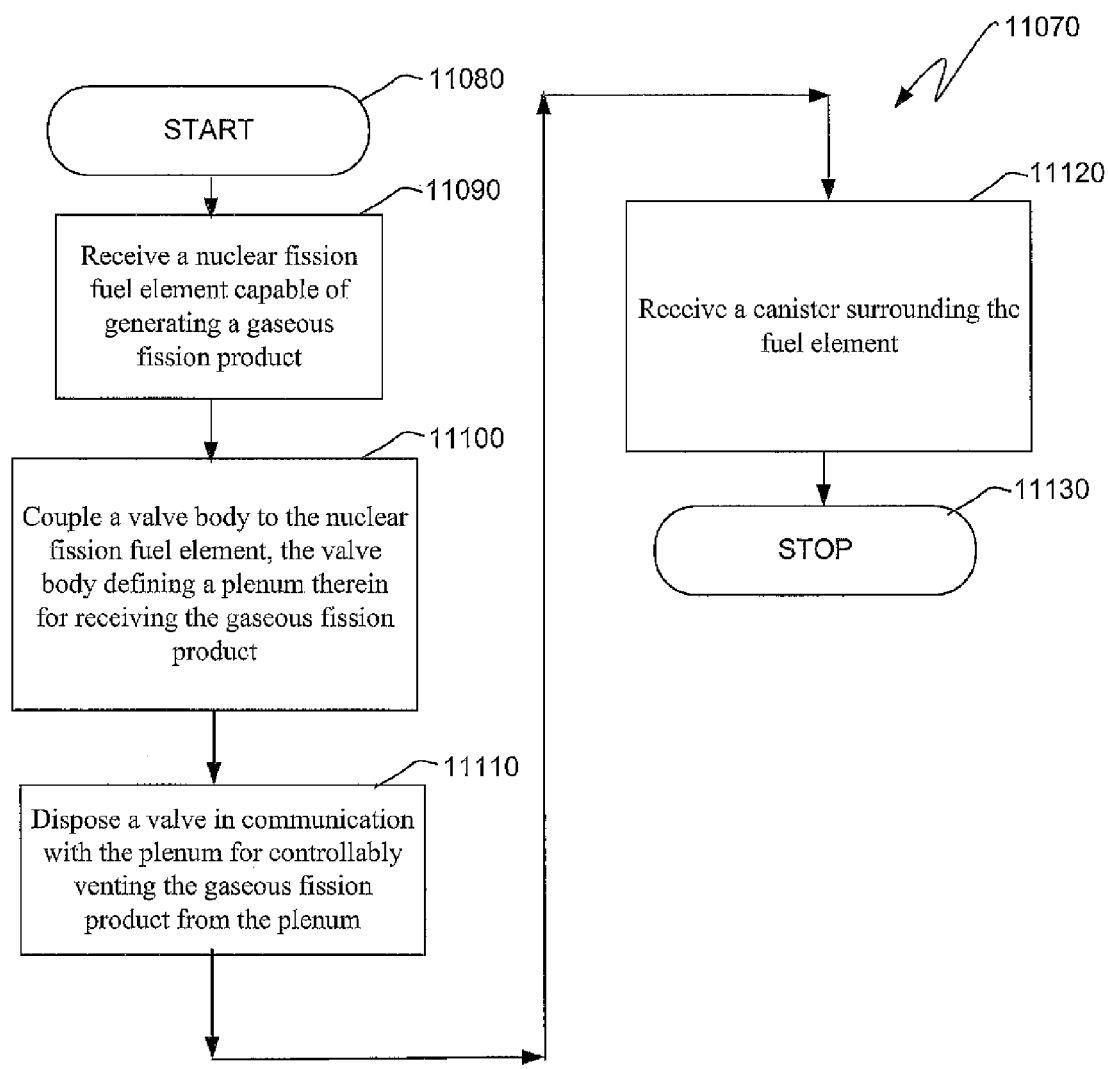

In FIG. 92A, an illustrative method 11070 of assembling a vented nuclear fission fuel module starts at a block 11080. At a block 11090, the method comprises receiving a nuclear fission fuel element capable of generating a gaseous fission product. At a block 11100, a valve body is coupled to the nuclear fission fuel element, the valve body defining a plenum therein for receiving the gaseous fission product. At a block 11110, a valve is disposed in communication with the plenum for controllably venting the gaseous fission product from the plenum. At a block 11120, a canister surrounding the fuel element is received. The method stops at a block 11130.

Figure 93:
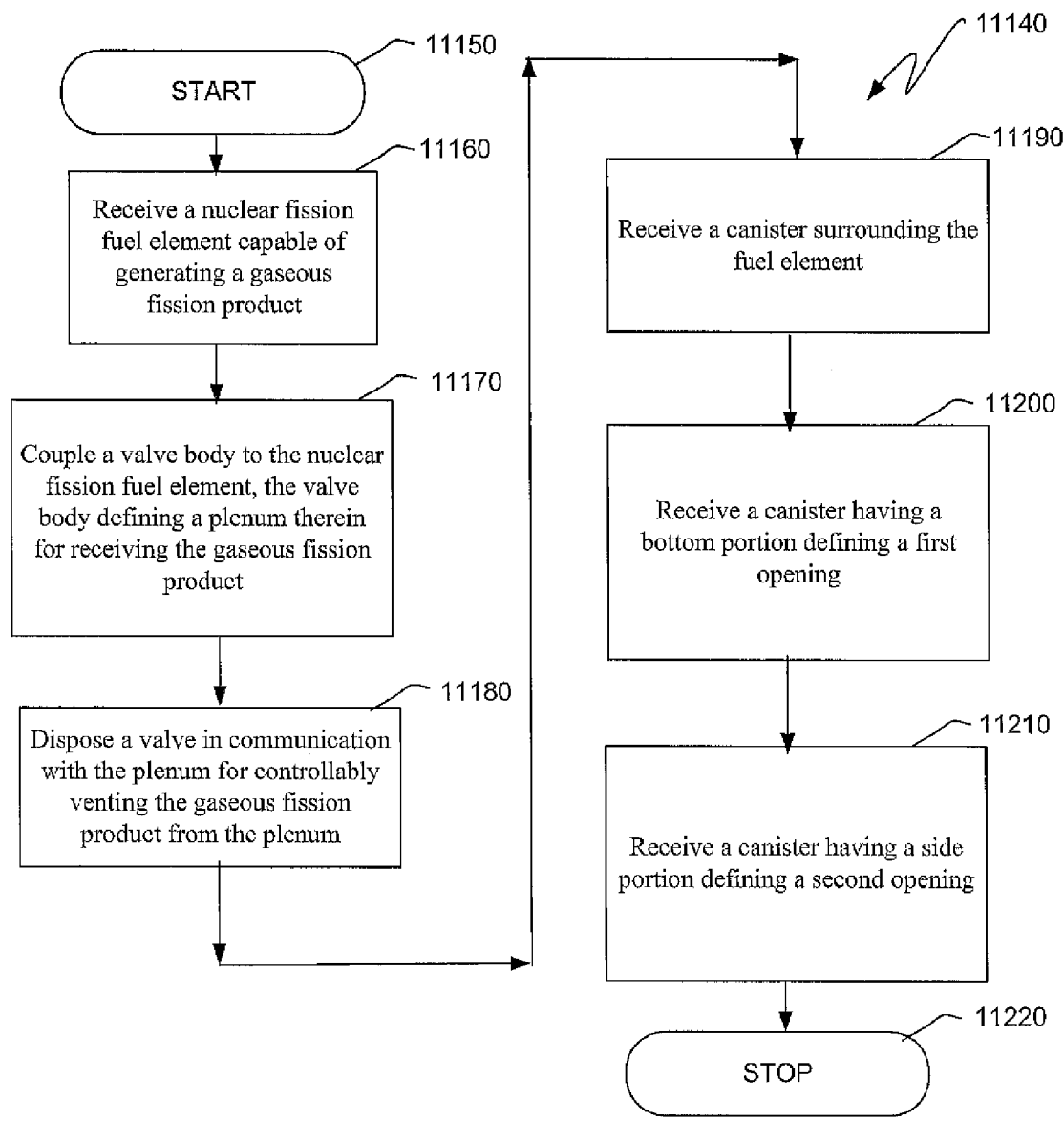

In FIG. 93, an illustrative method 11140 of assembling a vented nuclear fission fuel module starts at a block 11150. At a block 11160, the method comprises receiving a nuclear fission fuel element capable of generating a gaseous fission product. At a block 11170, a valve body is coupled to the nuclear fission fuel element, the valve body defining a plenum therein for receiving the gaseous fission product. At a block 11180, a valve is disposed in communication with the plenum for controllably venting the gaseous fission product from the plenum. At a block 11190, a canister surrounding the fuel element is received. At a block 11200, a canister having a bottom portion defining a first opening is received. At a block 11210, a canister having a side portion defining a second opening is received. The method stops at a block 11220.

Figure 94:
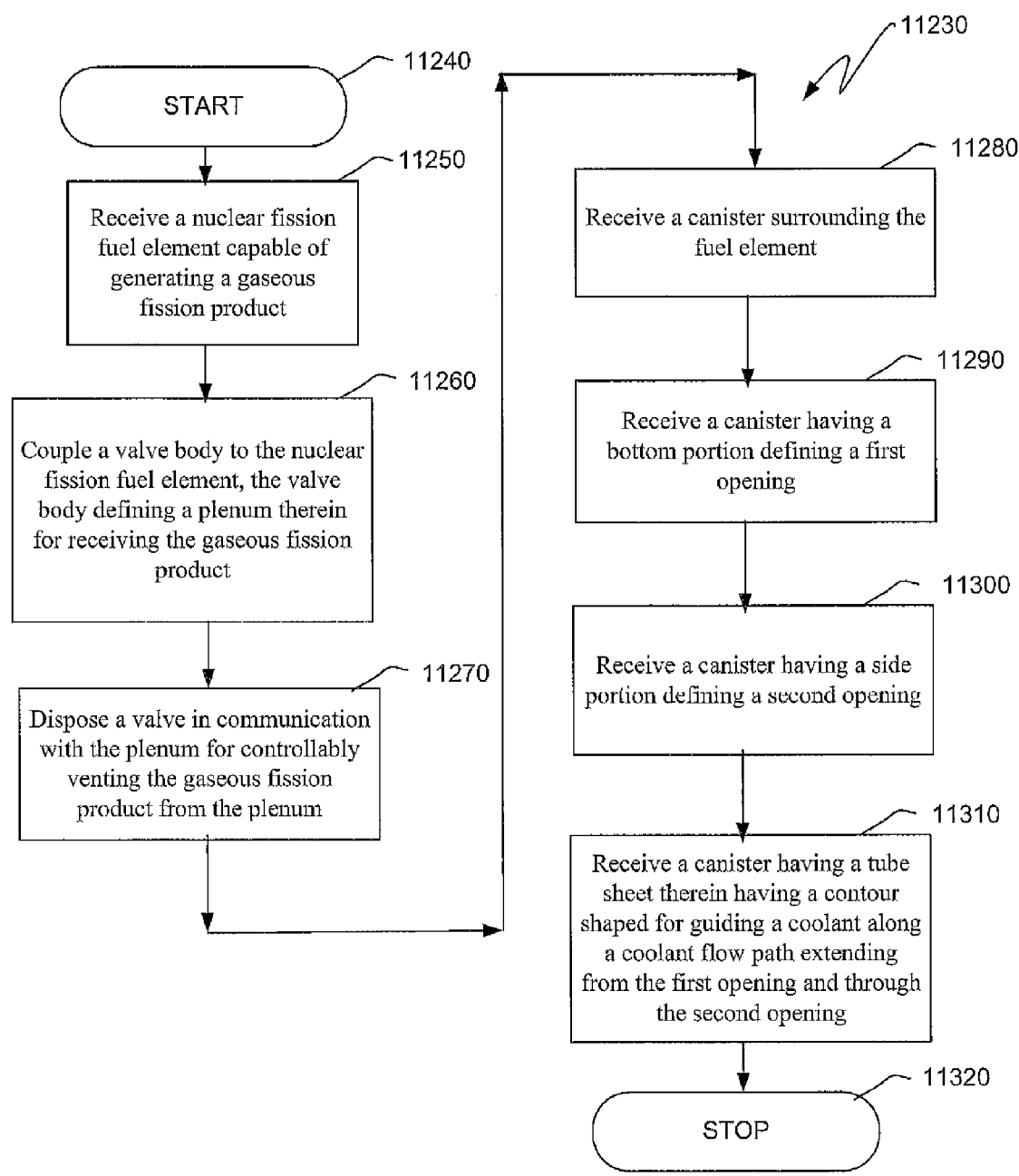

In FIG. 94, an illustrative method 11230 of assembling a vented nuclear fission fuel module starts at a block 11240. At a block 11250, the method comprises receiving a nuclear fission fuel element capable of generating a gaseous fission product. At a block 11260, a valve body is coupled to the nuclear fission fuel element, the valve body defining a plenum therein for receiving the gaseous fission product. At a block 11270, a valve is disposed in communication with the plenum for controllably venting the gaseous fission product from the plenum. At a block 11280, a canister surrounding the fuel element is received. At a block 11290, a canister having a bottom portion defining a first opening is received. At a block 11300, a canister having a side portion defining a second opening is received. At a block 11310, a canister is received having a tube sheet therein having a contour shaped for guiding a coolant along a coolant flow path extending from the first opening and through the second opening. The method stops at a block 11320.

Figure 94A:
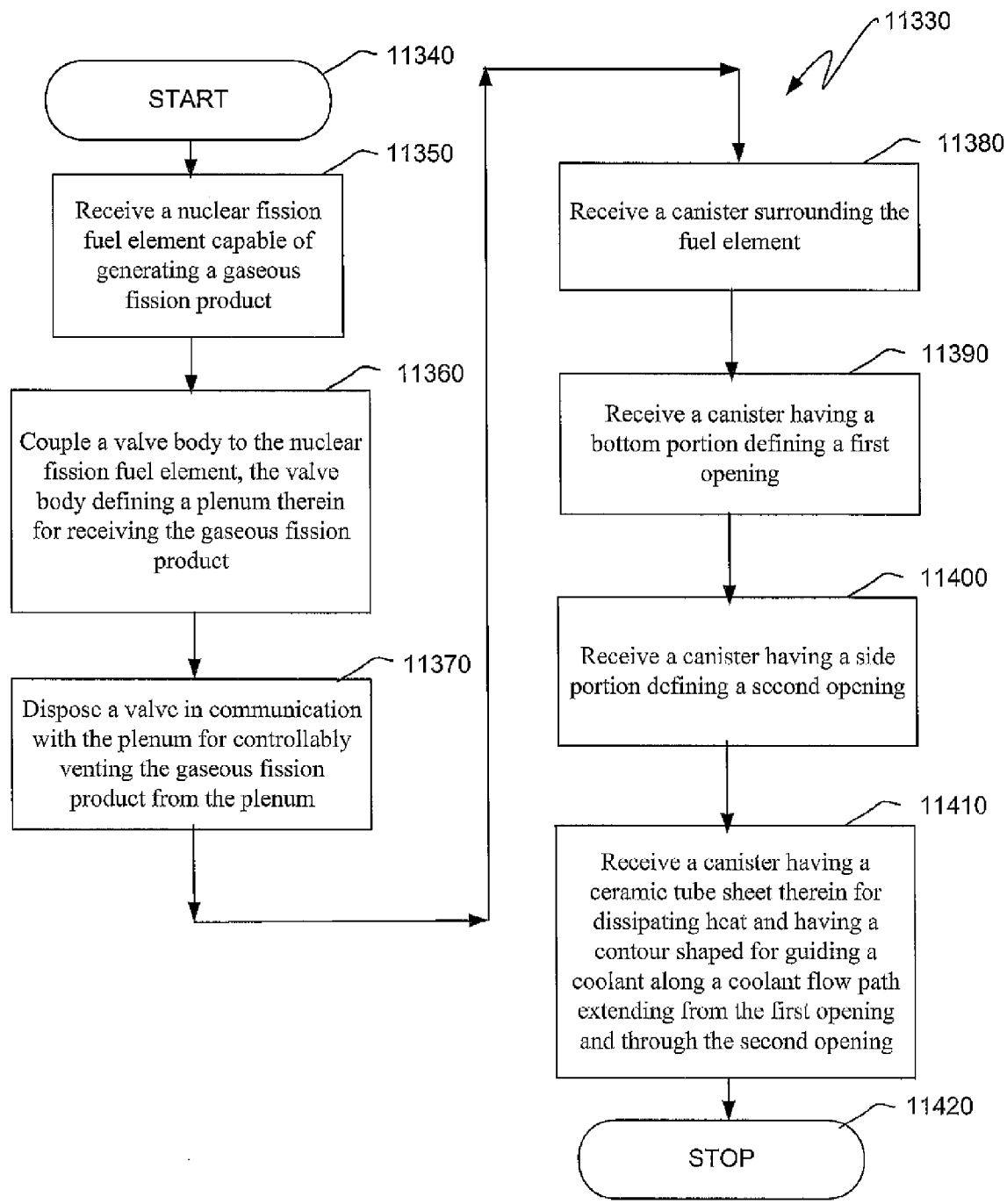

In FIG. 94A, an illustrative method 11330 of assembling a vented nuclear fission fuel module starts at a block 11340. At a block 11350, the method comprises receiving a nuclear fission fuel element capable of generating a gaseous fission product. At a block 11360, a valve body is coupled to the nuclear fission fuel element, the valve body defining a plenum therein for receiving the gaseous fission product. At a block 11370, a valve is disposed in communication with the plenum for controllably venting the gaseous fission product from the plenum. At a block 11380, a canister surrounding the fuel element is received. At a block 11390, a canister having a bottom portion defining a first opening is received. At a block 11400, a canister having a side portion defining a second opening is received. At a block 11410, a canister is received having a ceramic tube sheet therein having a contour shaped for guiding a coolant along a coolant flow path extending from the first opening and through the second opening. The method stops at a block 11420.

Figure 95:
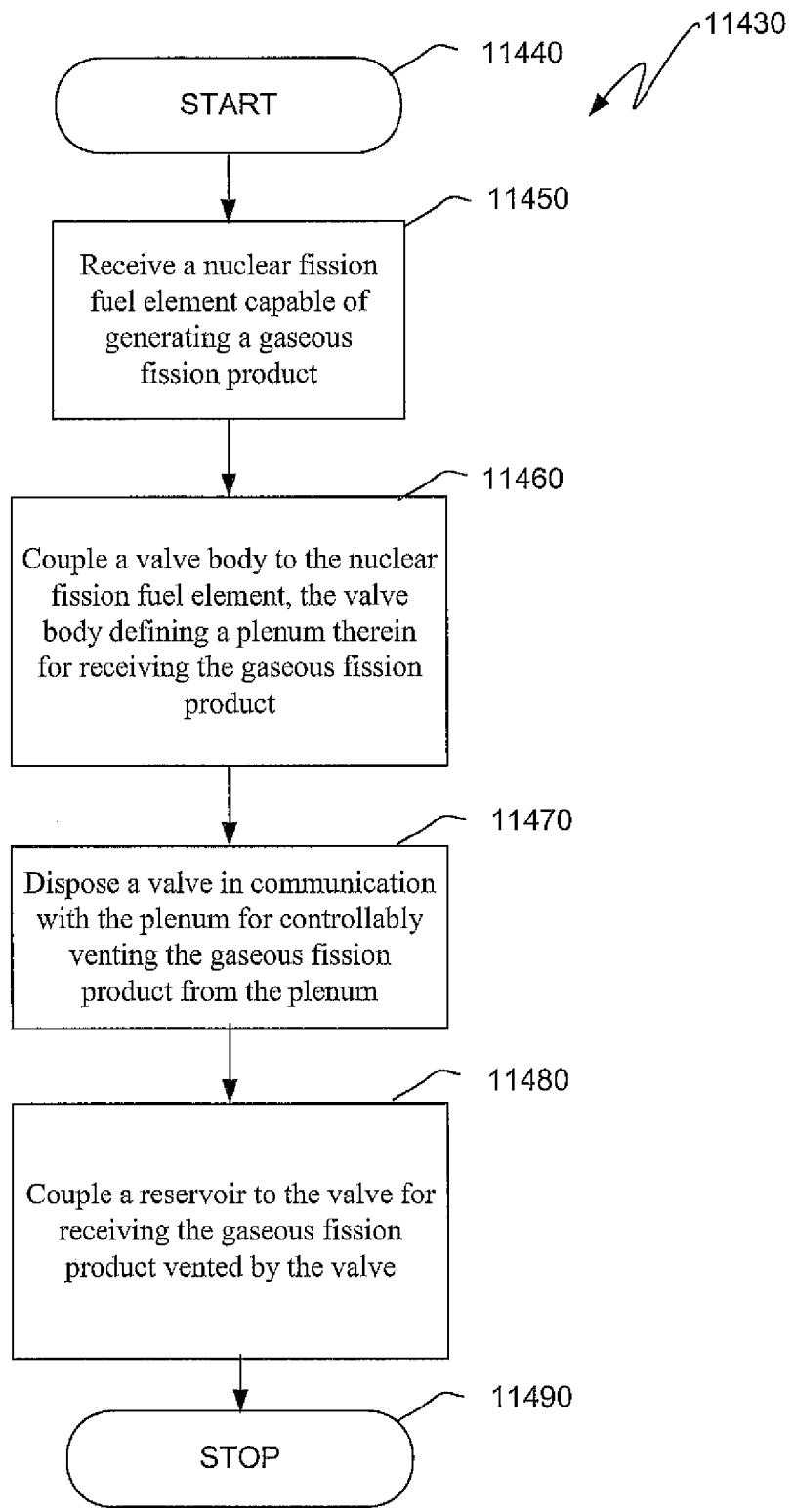

In FIG. 95, an illustrative method 11430 of assembling a vented nuclear fission fuel module starts at a block 11440. At a block 11450, the method comprises receiving a nuclear fission fuel element capable of generating a gaseous fission product. At a block 11460, a valve body is coupled to the nuclear fission fuel element, the valve body defining a plenum therein for receiving the gaseous fission product. At a block 11470, a valve is disposed in communication with the plenum for controllably venting the gaseous fission product from the plenum. At a block 11480, a reservoir is coupled to the valve for receiving the gaseous fission product vented by the valve. The method stops at a block 11490.

Figure 96:
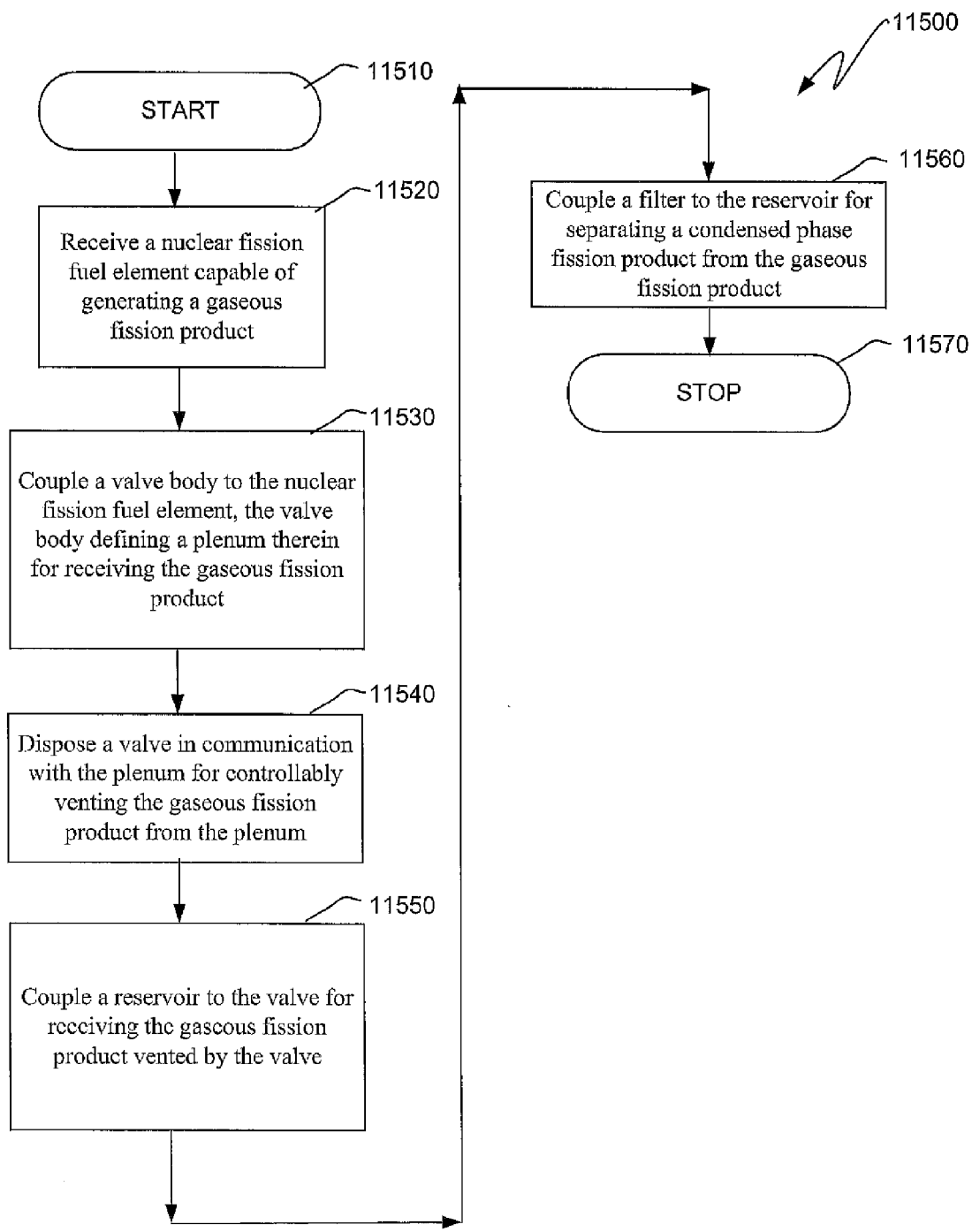

In FIG. 96, an illustrative method 11500 of assembling a vented nuclear fission fuel module starts at a block 11510. At a block 11520, the method comprises receiving a nuclear fission fuel element capable of generating a gaseous fission product. At a block 11530, a valve body is coupled to the nuclear fission fuel element, the valve body defining a plenum therein for receiving the gaseous fission product. At a block 11540, a valve is disposed in communication with the plenum for controllably venting the gaseous fission product from the plenum. At a block 11550, a reservoir is coupled to the valve for receiving the gaseous fission product vented by the valve. At a block 11560, a filter is coupled to the reservoir for separating a condensed phase fission product from the gaseous fission product. The method stops at a block 11570.

Figure 96A:
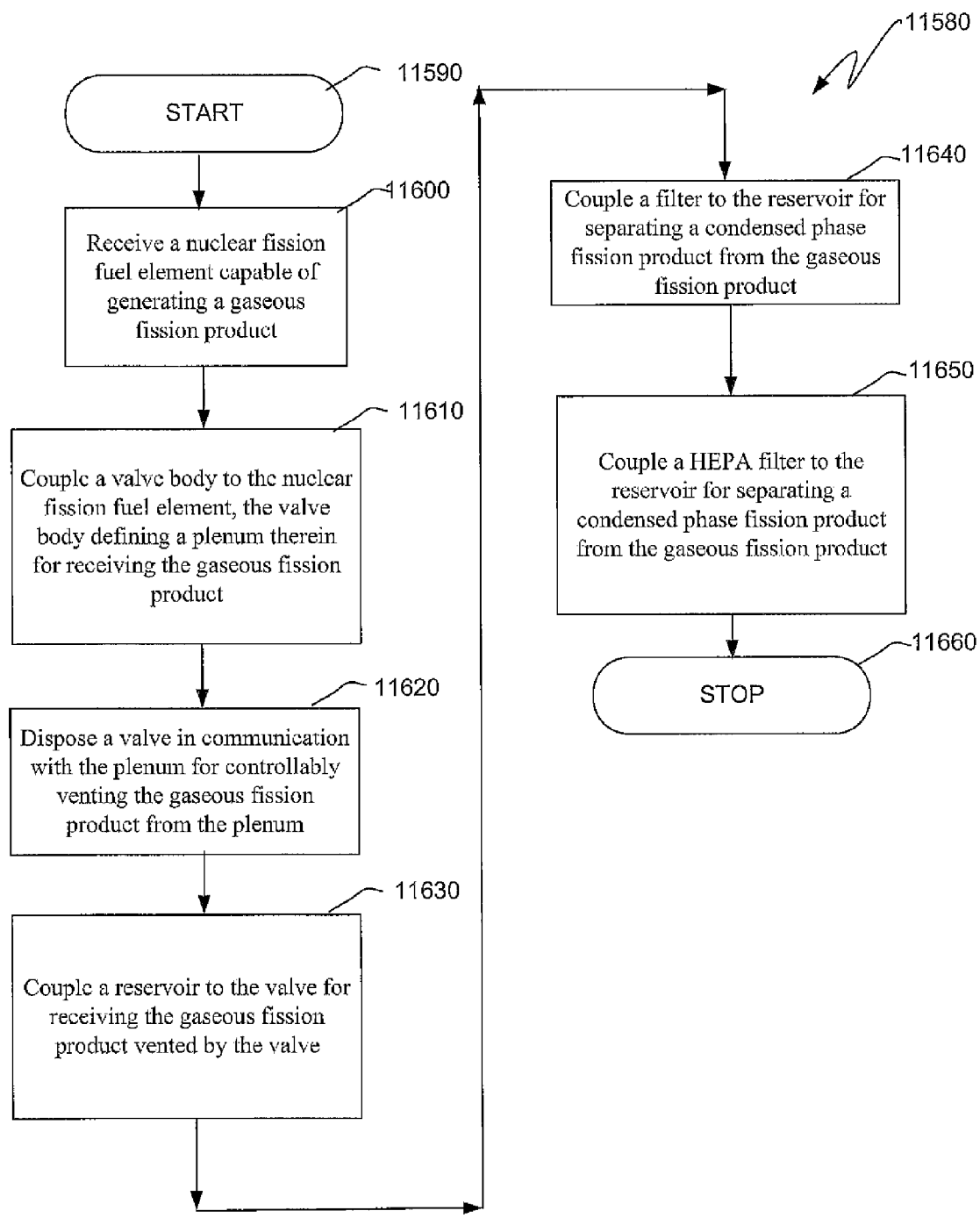

In FIG. 96A, an illustrative method 11580 of assembling a vented nuclear fission fuel module starts at a block 11590. At a block 11600, the method comprises receiving a nuclear fission fuel element capable of generating a gaseous fission product. At a block 11610, a valve body is coupled to the nuclear fission fuel element, the valve body defining a plenum therein for receiving the gaseous fission product. At a block 11620, a valve is disposed in communication with the plenum for controllably venting the gaseous fission product from the plenum. At a block 11630, a reservoir is coupled to the valve for receiving the gaseous fission product vented by the valve. At a block 11640, a filter is coupled to the reservoir for separating a condensed phase fission product from the gaseous fission product. At a block 11650, a HEPA filter is coupled to the reservoir for separating a condensed phase fission product from the gaseous fission product. The method stops at a block 11660.

Figure 96B:
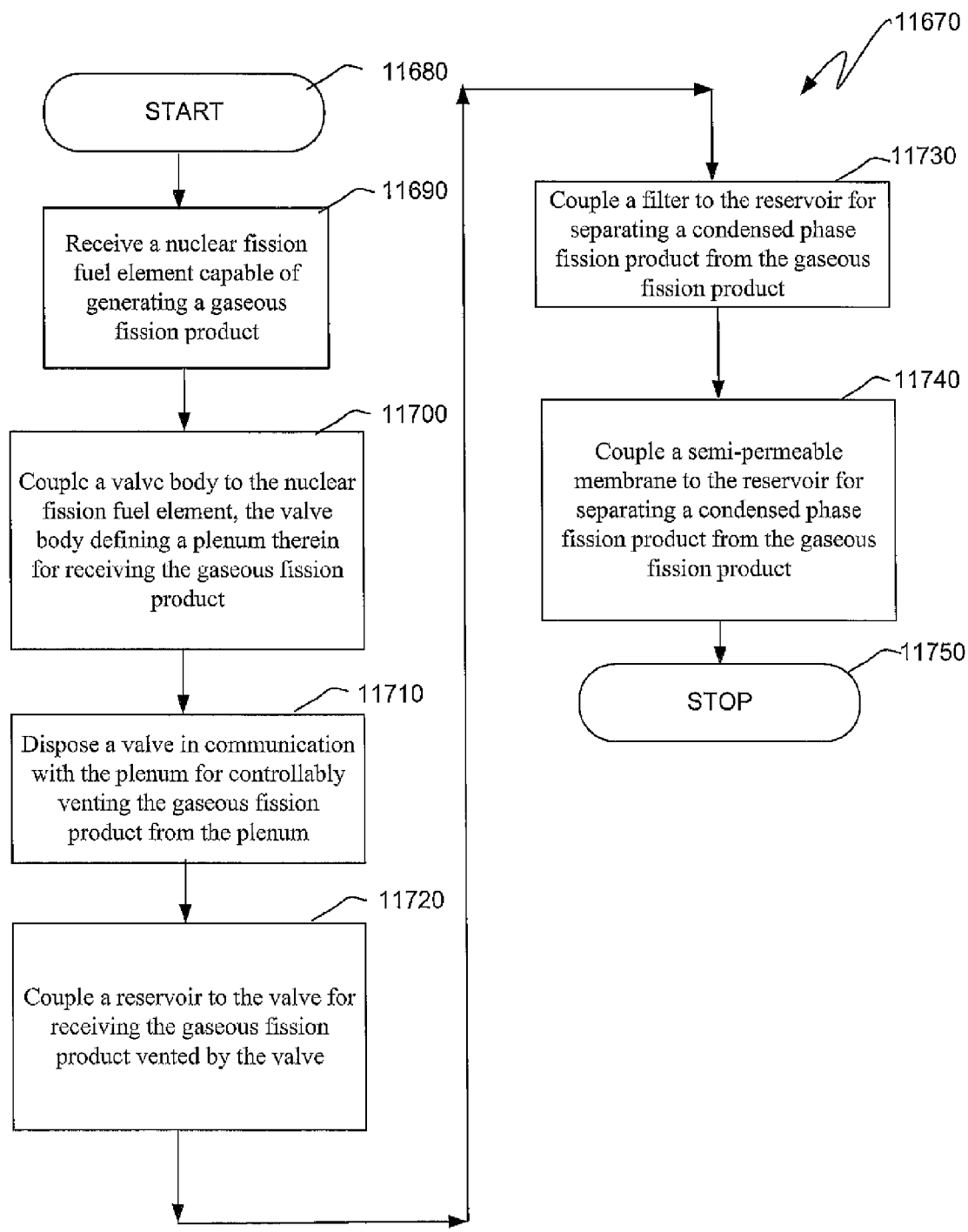

In FIG. 96B, an illustrative method 11670 of assembling a vented nuclear fission fuel module starts at a block 11680. At a block 11690, the method comprises receiving a nuclear fission fuel element capable of generating a gaseous fission product. At a block 11700, a valve body is coupled to the nuclear fission fuel element, the valve body defining a plenum therein for receiving the gaseous fission product. At a block 11710, a valve is disposed in communication with the plenum for controllably venting the gaseous fission product from the plenum. At a block 11720, a reservoir is coupled to the valve for receiving the gaseous fission product vented by the valve. At a block 11730, a filter is coupled to the reservoir for separating a condensed phase fission product from the gaseous fission product. At a block 11740, a semi-permeable membrane is coupled to the reservoir for separating a condensed phase fission product from the gaseous fission product. The method stops at a block 11750.

Figure 96C:
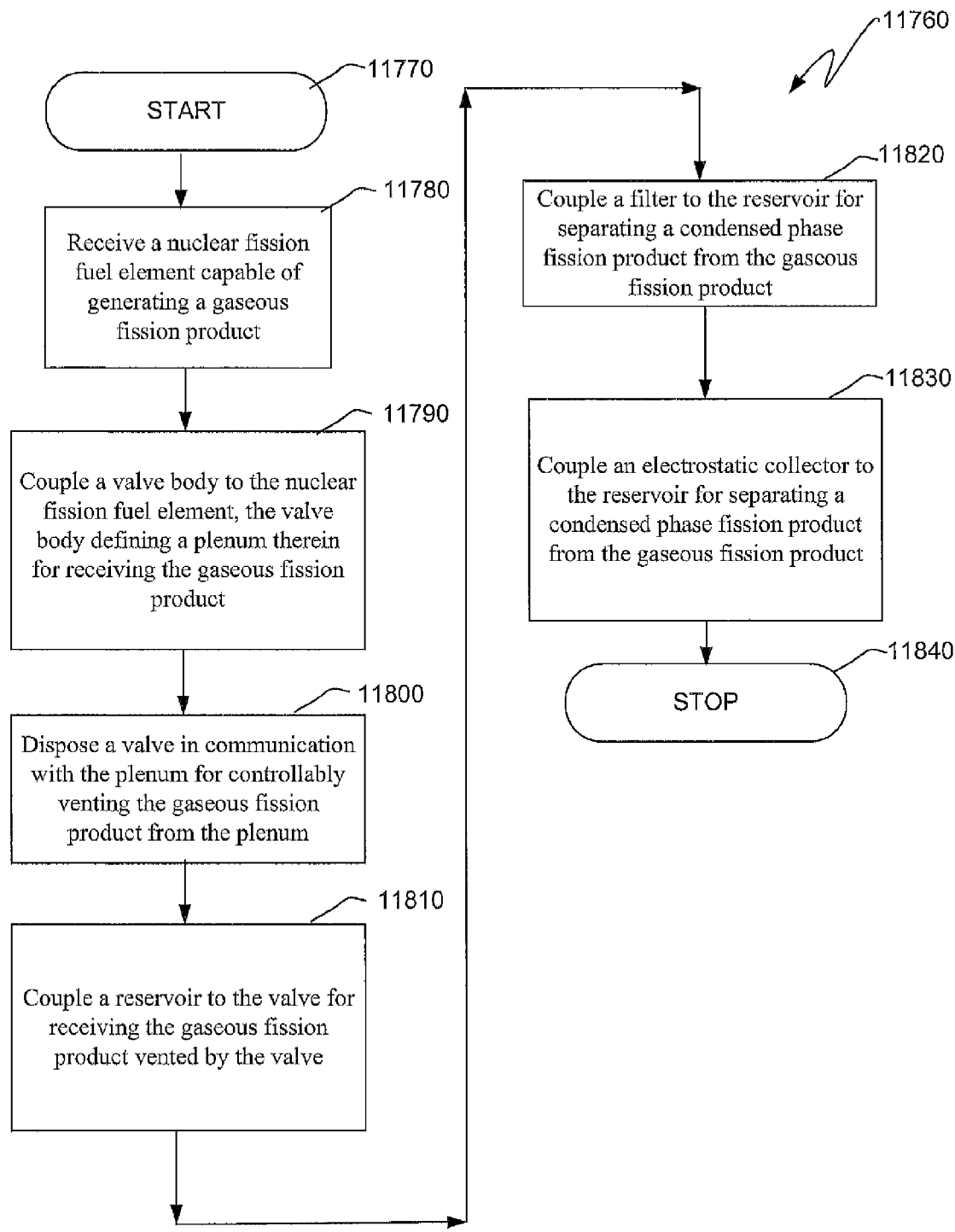

In FIG. 96C, an illustrative method 11760 of assembling a vented nuclear fission fuel module starts at a block 11770. At a block 11780, the method comprises receiving a nuclear fission fuel element capable of generating a gaseous fission product. At a block 11790, a valve body is coupled to the nuclear fission fuel element, the valve body defining a plenum therein for receiving the gaseous fission product. At a block 11800, a valve is disposed in communication with the plenum for controllably venting the gaseous fission product from the plenum. At a block 11810, a reservoir is coupled to the valve for receiving the gaseous fission product vented by the valve. At a block 11820, a filter is coupled to the reservoir for separating a condensed phase fission product from the gaseous fission product. At a block 11830, an electrostatic collector is coupled to the reservoir for separating a condensed phase fission product from the gaseous fission product. The method stops at a block 11840.

Figure 96D:
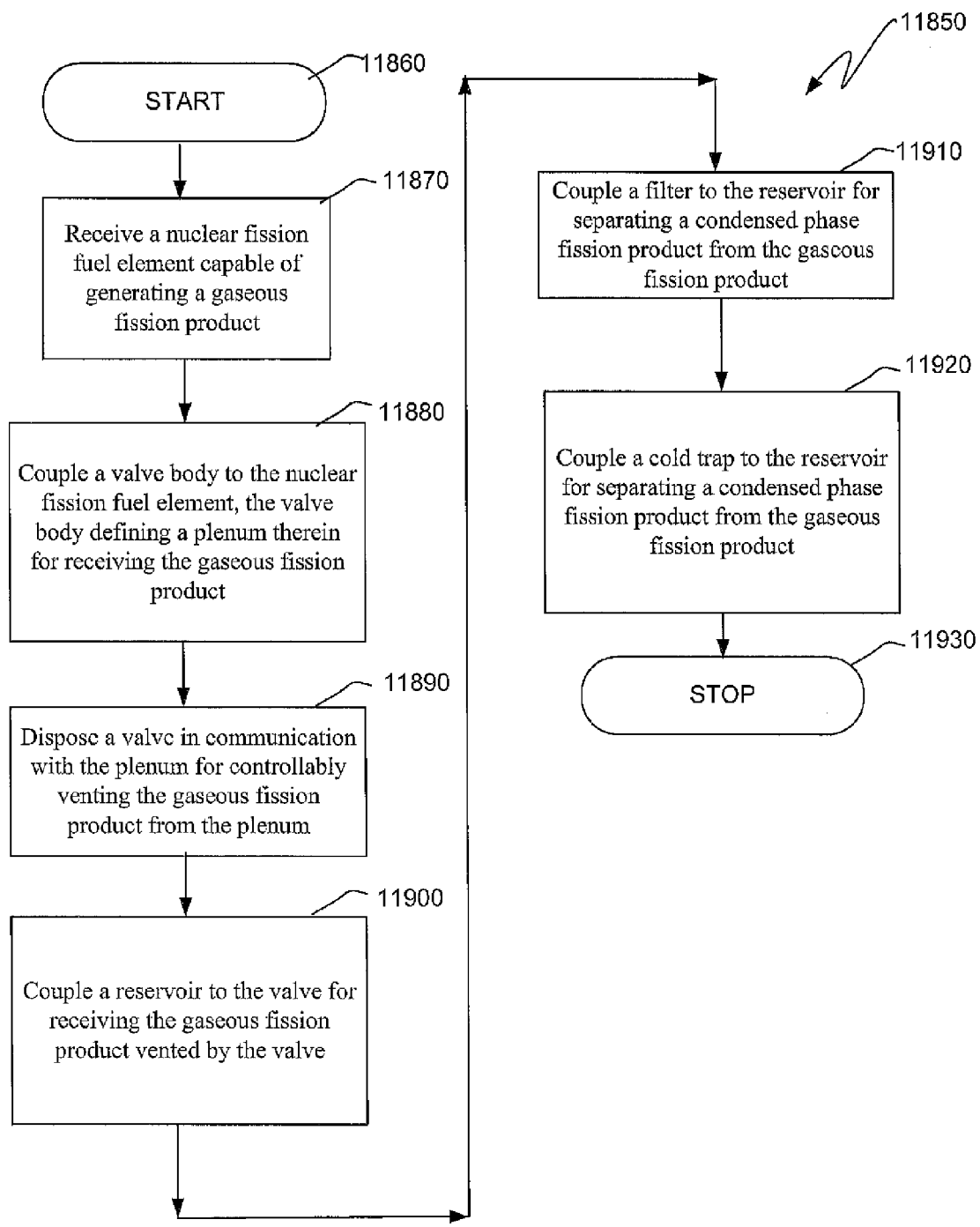

In FIG. 96D, an illustrative method 11850 of assembling a vented nuclear fission fuel module starts at a block 11860. At a block 11870, the method comprises receiving a nuclear fission fuel element capable of generating a gaseous fission product. At a block 11880, a valve body is coupled to the nuclear fission fuel element, the valve body defining a plenum therein for receiving the gaseous fission product. At a block 11890, a valve is disposed in communication with the plenum for controllably venting the gaseous fission product from the plenum. At a block 11900, a reservoir is coupled to the valve for receiving the gaseous fission product vented by the valve. At a block 11910, a filter is coupled to the reservoir for separating a condensed phase fission product from the gaseous fission product. At a block 11920, a cold trap is coupled to the reservoir for separating a condensed phase fission product from the gaseous fission product. The method stops at a block 11930.

Figure 96E:
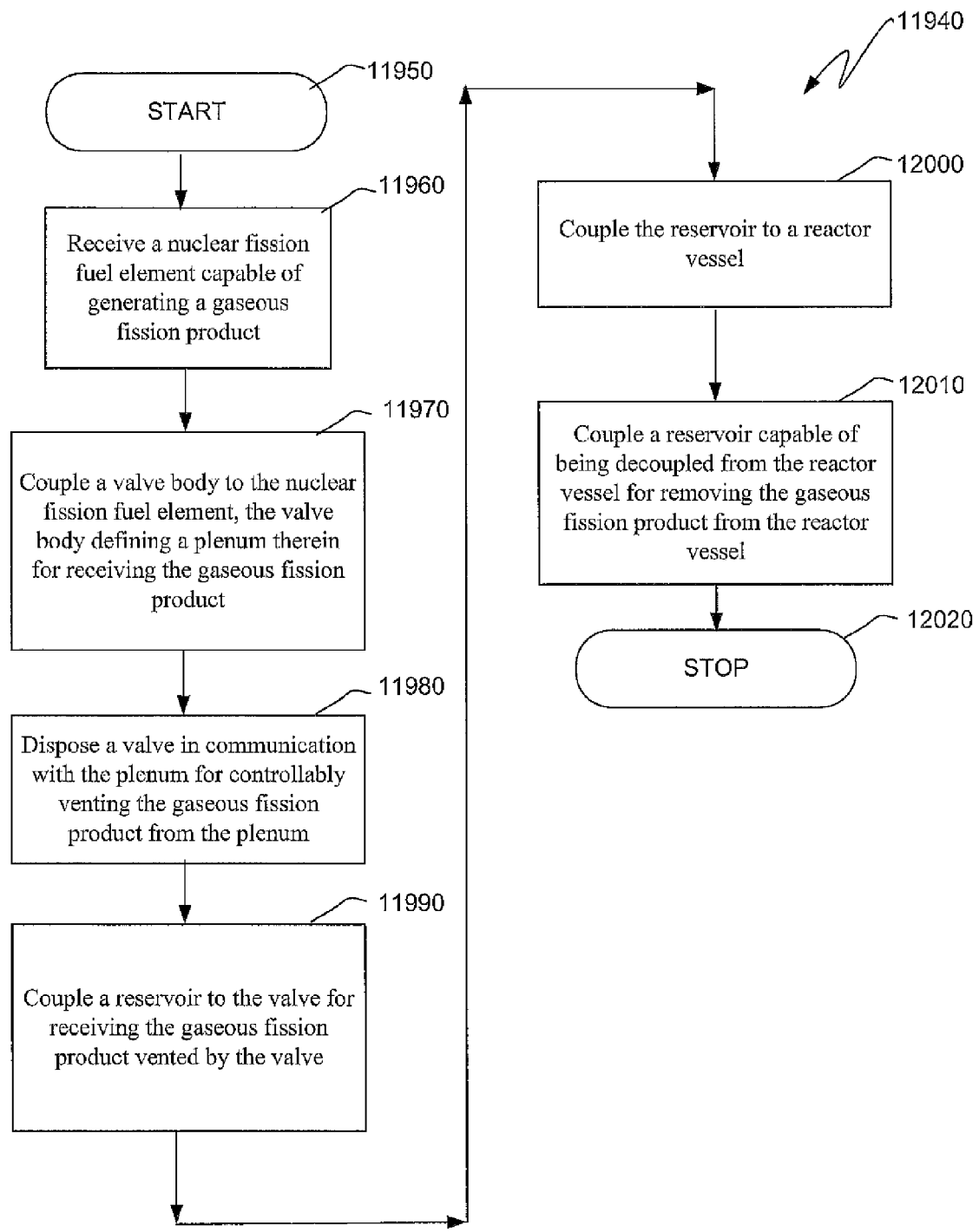

In FIG. 96E, an illustrative method 11940 of assembling a vented nuclear fission fuel module starts at a block 11950. At a block 11960, the method comprises receiving a nuclear fission fuel element capable of generating a gaseous fission product. At a block 11970, a valve body is coupled to the nuclear fission fuel element, the valve body defining a plenum therein for receiving the gaseous fission product. At a block 11980, a valve is disposed in communication with the plenum for controllably venting the gaseous fission product from the plenum. At a block 11990, a reservoir is coupled to the valve for receiving the gaseous fission product vented by the valve. At a block 12000, the reservoir is coupled to a reactor vessel. At a block 12010, a reservoir is coupled that is capable of being decoupled from the reactor vessel for removing the gaseous fission product from the reactor vessel. The method stops at a block 12020.

Figure 96F:
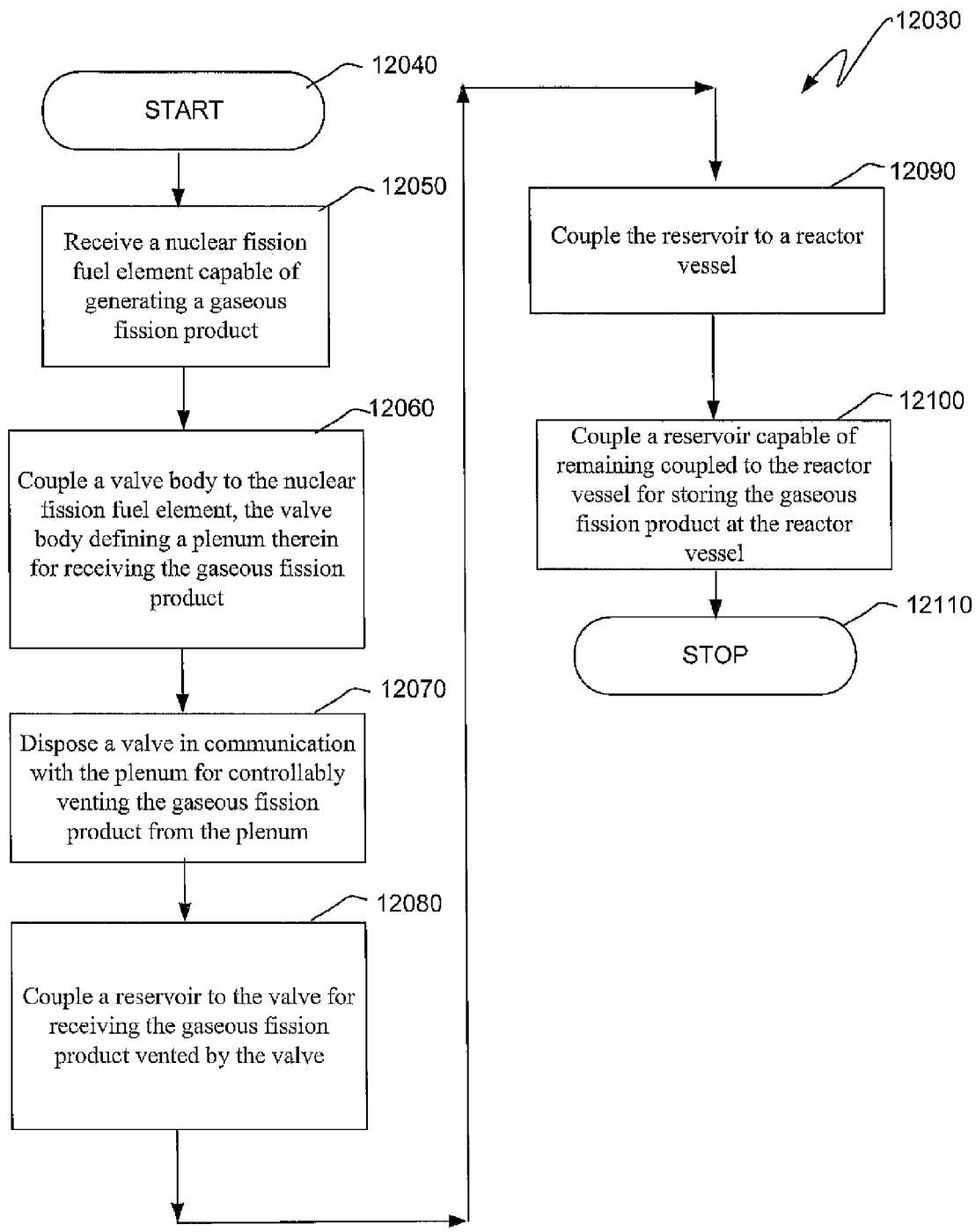

In FIG. 96F, an illustrative method 12030 of assembling a vented nuclear fission fuel module starts at a block 12040. At a block 12050, the method comprises receiving a nuclear fission fuel element capable of generating a gaseous fission product. At a block 12060, a valve body is coupled to the nuclear fission fuel element, the valve body defining a plenum therein for receiving the gaseous fission product. At a block 12070, a valve is disposed in communication with the plenum for controllably venting the gaseous fission product from the plenum. At a block 12080, a reservoir is coupled to the valve for receiving the gaseous fission product vented by the valve. At a block 12090, the reservoir is coupled to a reactor vessel. At a block 12100, a reservoir is coupled that is capable of remaining coupled to the reactor vessel for storing the gaseous fission product at the reactor vessel. The method stops at a block 12110.

Figure 97:
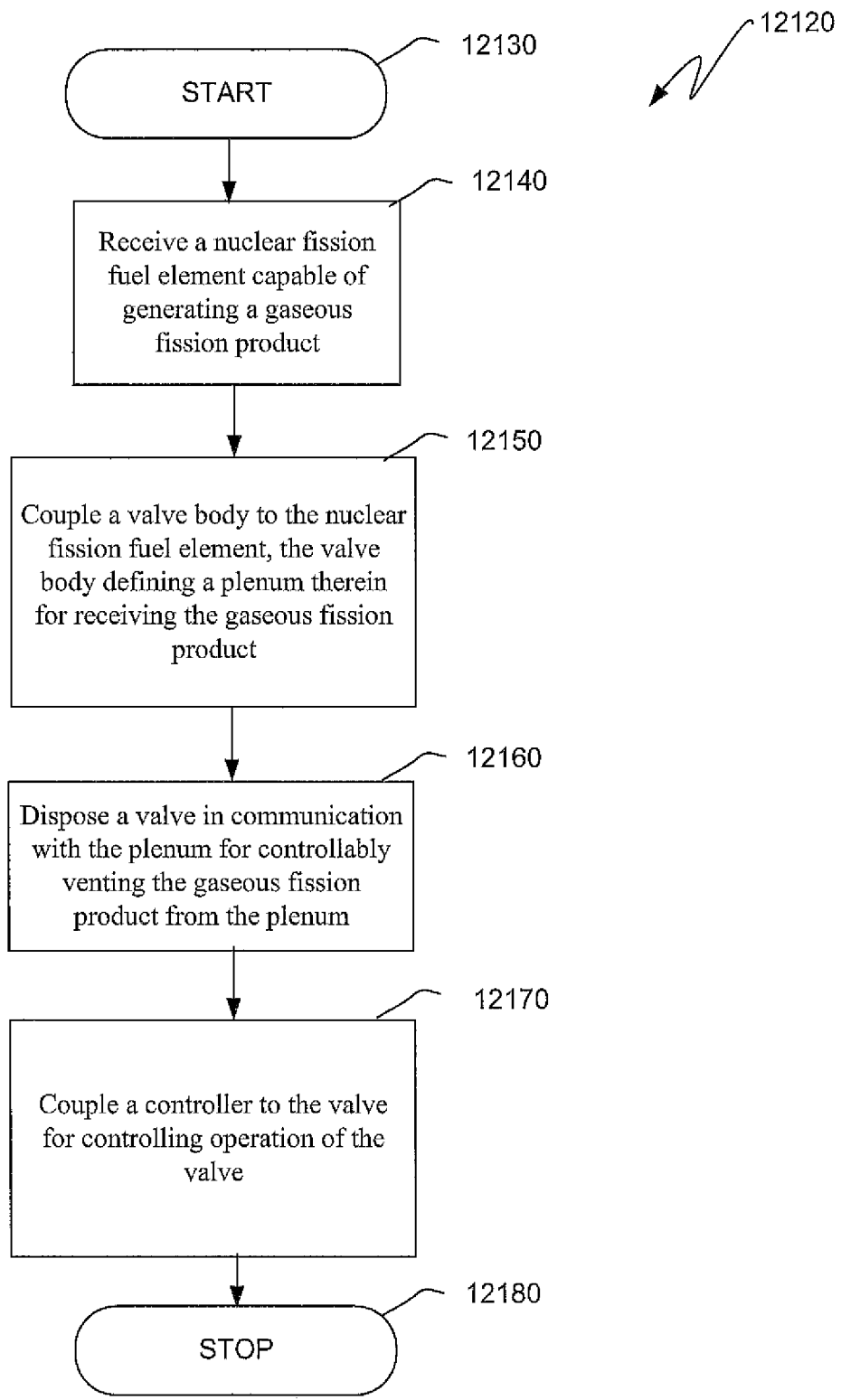

In FIG. 97, an illustrative method 12120 of assembling a vented nuclear fission fuel module starts at a block 12130. At a block 12140, the method comprises receiving a nuclear fission fuel element capable of generating a gaseous fission product. At a block 12150, a valve body is coupled to the nuclear fission fuel element, the valve body defining a plenum therein for receiving the gaseous fission product. At a block 12160, a valve is disposed in communication with the plenum for controllably venting the gaseous fission product from the plenum. At a block 12170, a controller is coupled to the valve for controlling operation of the valve. The method stops at a block 12180.

Figure 98:
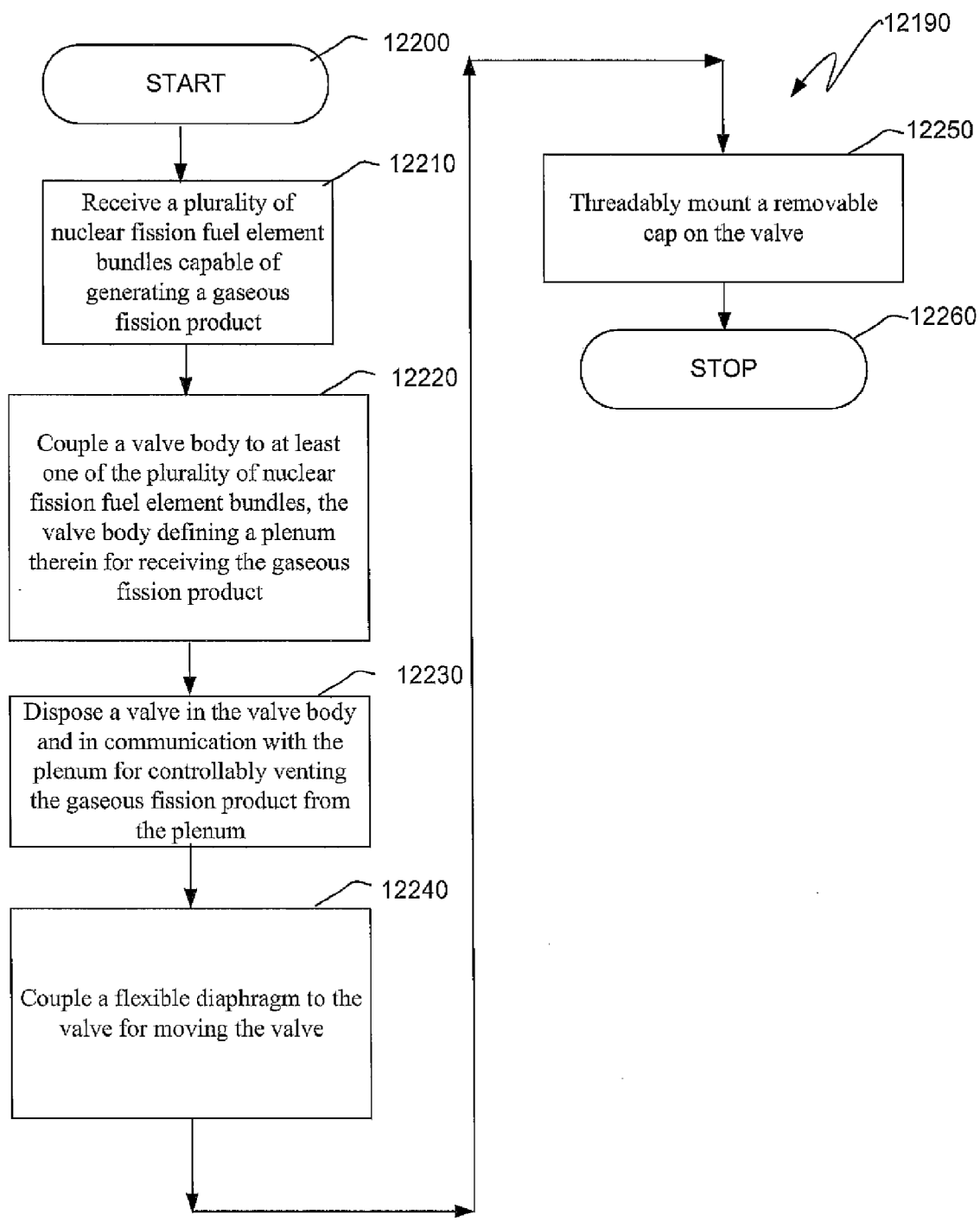

In FIG. 98, an illustrative method 12190 of assembling a vented nuclear fission fuel module starts at a block 12200. At a block 12210, the method comprises receiving a plurality of nuclear fission fuel element bundles capable of generating a gaseous fission product. At a block 12220, a valve body is coupled to at least one of the plurality of nuclear fission fuel element bundles, the valve body defining a plenum therein for receiving the gaseous fission product. At a block 12230, a valve is disposed in the valve body and in communication with the plenum for controllably venting the gaseous fission product from the plenum. At a block 12240, a flexible diaphragm is coupled to the valve for moving the valve. At a block 12250, a removable cap is threadably mounted on the valve. The method stops at block 12260.

Figure 98A:
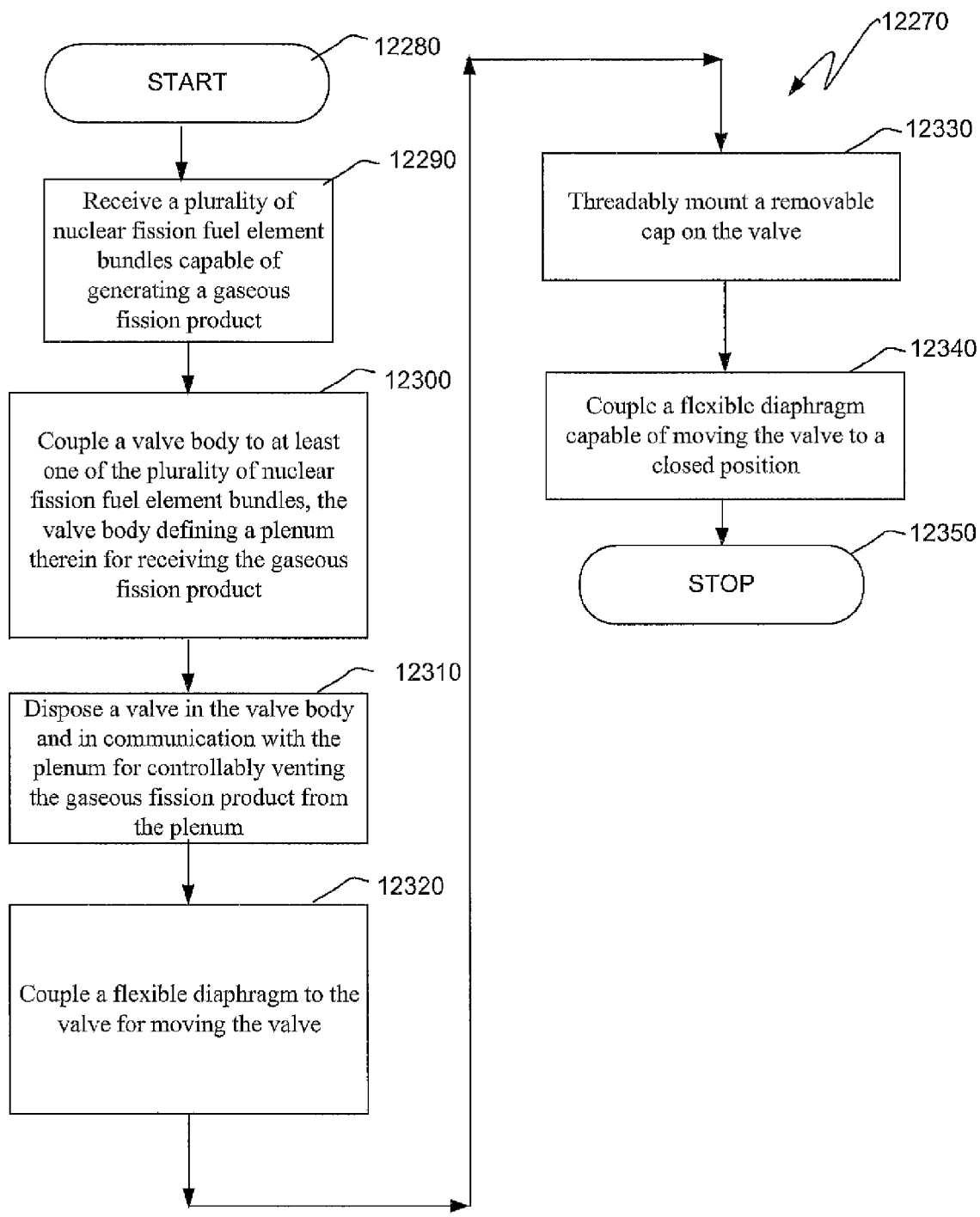

In FIG. 98A, an illustrative method 12270 of assembling a vented nuclear fission fuel module starts at a block 12280. At a block 12290, the method comprises receiving a plurality of nuclear fission fuel element bundles capable of generating a gaseous fission product. At a block 12300, a valve body is coupled to at least one of the plurality of nuclear fission fuel element bundles, the valve body defining a plenum therein for receiving the gaseous fission product. At a block 12310, a valve is disposed in the valve body and in communication with the plenum for controllably venting the gaseous fission product from the plenum. At a block 12320, a flexible diaphragm is coupled to the valve for moving the valve. At a block 12330, a removable cap is threadably mounted on the valve. At a block 12340, a flexible diaphragm is coupled that is capable of moving the valve to a closed position. The method stops at a block 12350.

Figure 99:
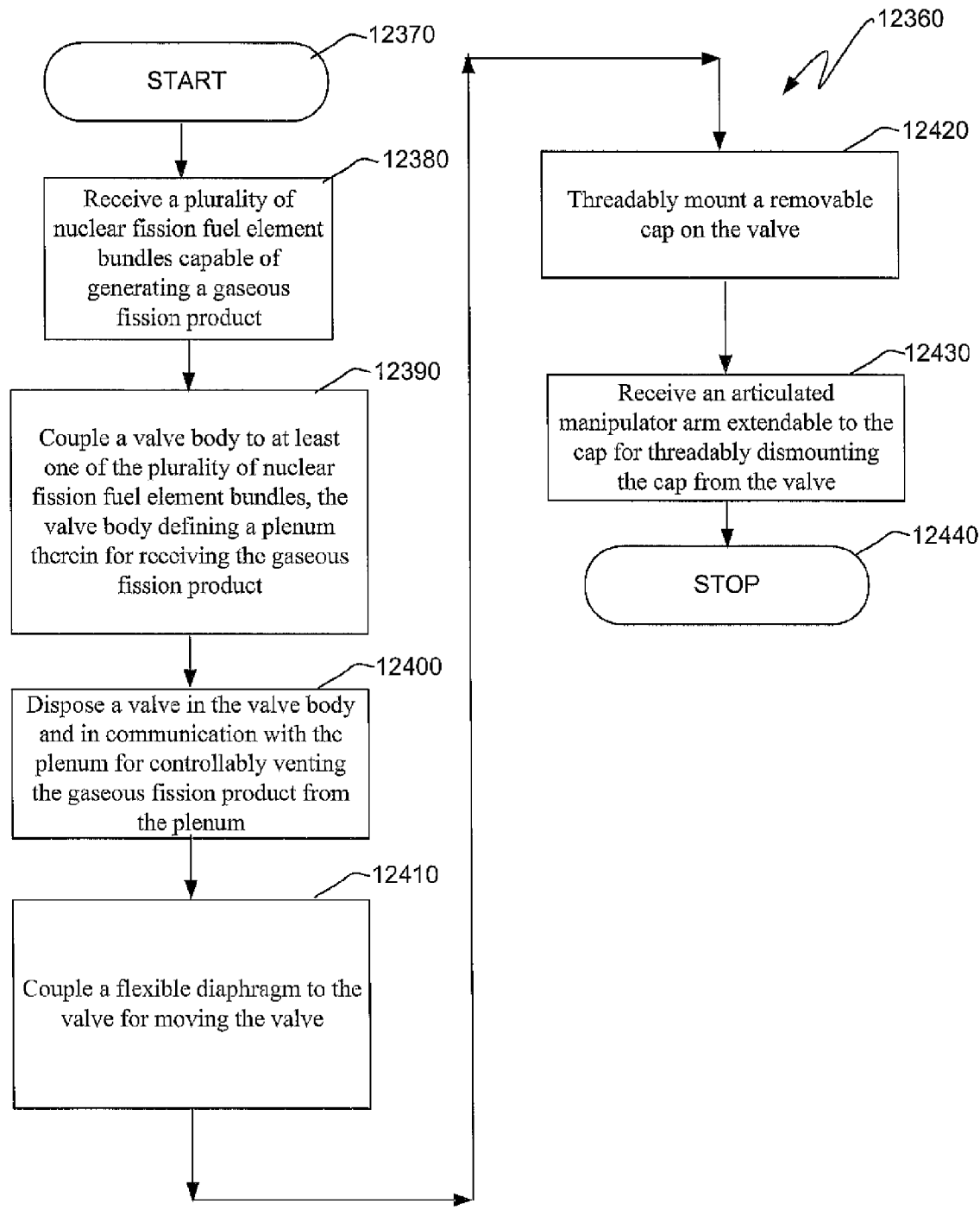

In FIG. 99, an illustrative method 12360 of assembling a vented nuclear fission fuel module starts at a block 12370. At a block 12380, the method comprises receiving a plurality of nuclear fission fuel element bundles capable of generating a gaseous fission product. At a block 12390, a valve body is coupled to at least one of the plurality of nuclear fission fuel element bundles, the valve body defining a plenum therein for receiving the gaseous fission product. At a block 12400, a valve is disposed in the valve body and in communication with the plenum for controllably venting the gaseous fission product from the plenum. At a block 12410, a flexible diaphragm is coupled to the valve for moving the valve. At a block 12420, a removable cap is threadably mounted on the valve. At a block 12430, an articulated manipulator arm is received that is extendable to the cap for threadably dismounting the cap from the valve. The method stops at a block 12440.

Figure 100:
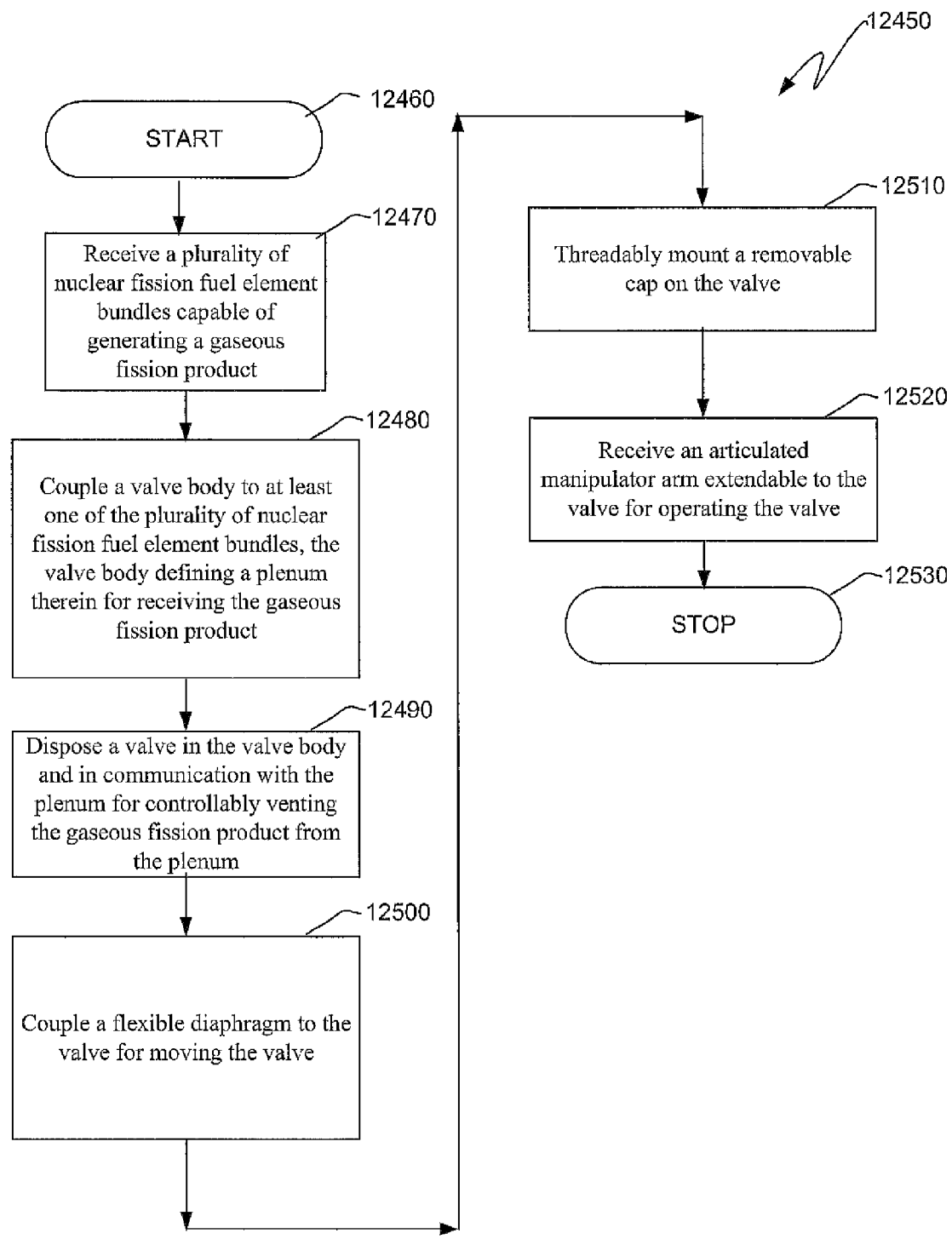

In FIG. 100, an illustrative method 12450 of assembling a vented nuclear fission fuel module starts at a block 12460. At a block 12470, the method comprises receiving a plurality of nuclear fission fuel element bundles capable of generating a gaseous fission product. At a block 12480, a valve body is coupled to at least one of the plurality of nuclear fission fuel element bundles, the valve body defining a plenum therein for receiving the gaseous fission product. At a block 12490, a valve is disposed in the valve body and in communication with the plenum for controllably venting the gaseous fission product from the plenum. At a block 12500, a flexible diaphragm is coupled to the valve for moving the valve. At a block 12510, a removable cap is threadably mounted on the valve. At a block 12520, an articulated manipulator arm is received that is extendable to the valve for operating the valve. The method stops at a block 12530.

Figure 101:
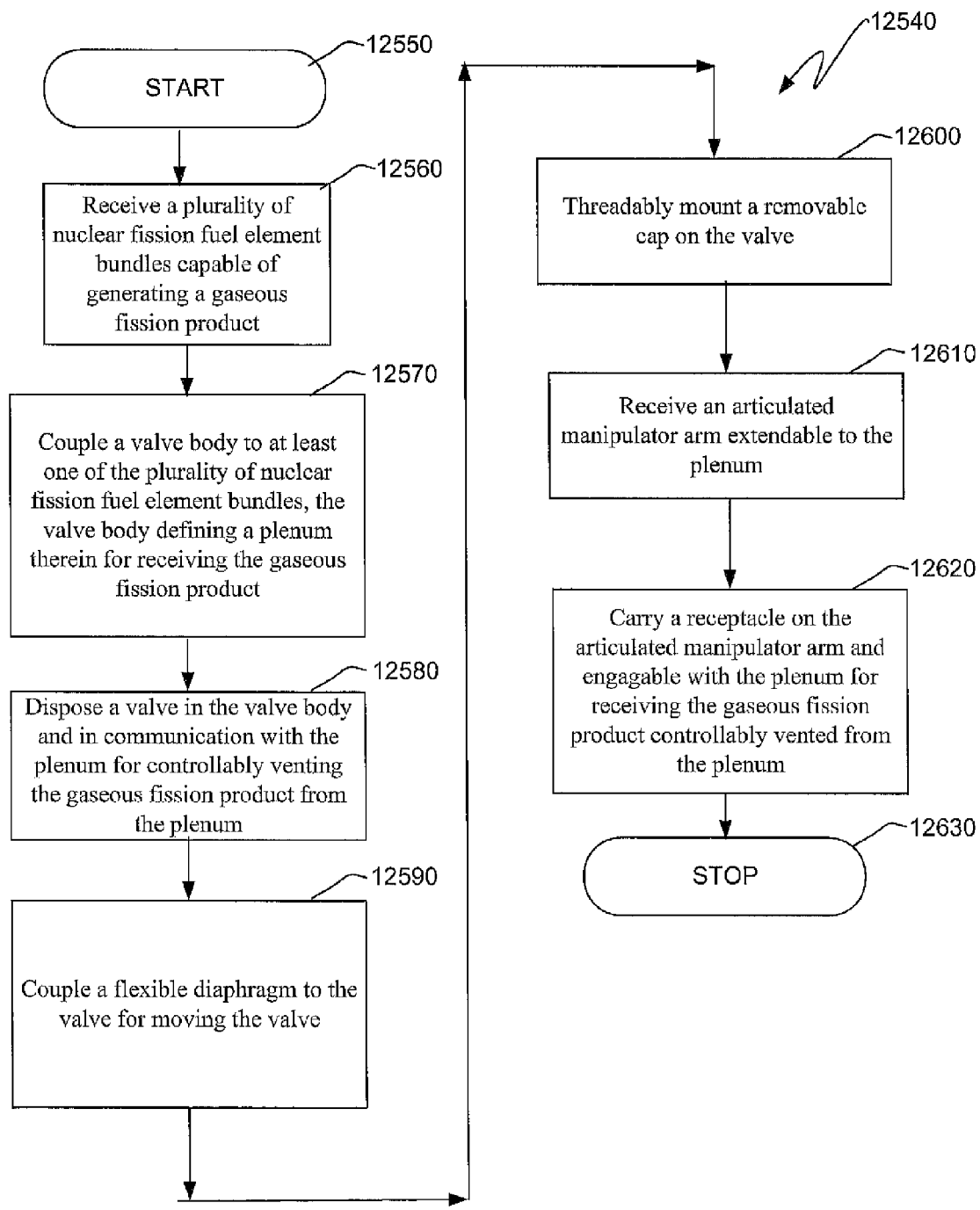

In FIG. 101, an illustrative method 12540 of assembling a vented nuclear fission fuel module starts at a block 12550. At a block 12560, the method comprises receiving a plurality of nuclear fission fuel element bundles capable of generating a gaseous fission product. At a block 12570, a valve body is coupled to at least one of the plurality of nuclear fission fuel element bundles, the valve body defining a plenum therein for receiving the gaseous fission product. At a block 12580, a valve is disposed in the valve body and in communication with the plenum for controllably venting the gaseous fission product from the plenum. At a block 12590, a flexible diaphragm is coupled to the valve for moving the valve. At a block 12600, a removable cap is threadably mounted on the valve. At a block 12610, an articulated manipulator arm is received that is extendable to the plenum. At a block 12620, a receptacle is carried on the articulated manipulator arm and is engageable with the plenum for receiving the gaseous fission product controllably vented from the plenum. The method stops at a block 12630.

Figure 101A:
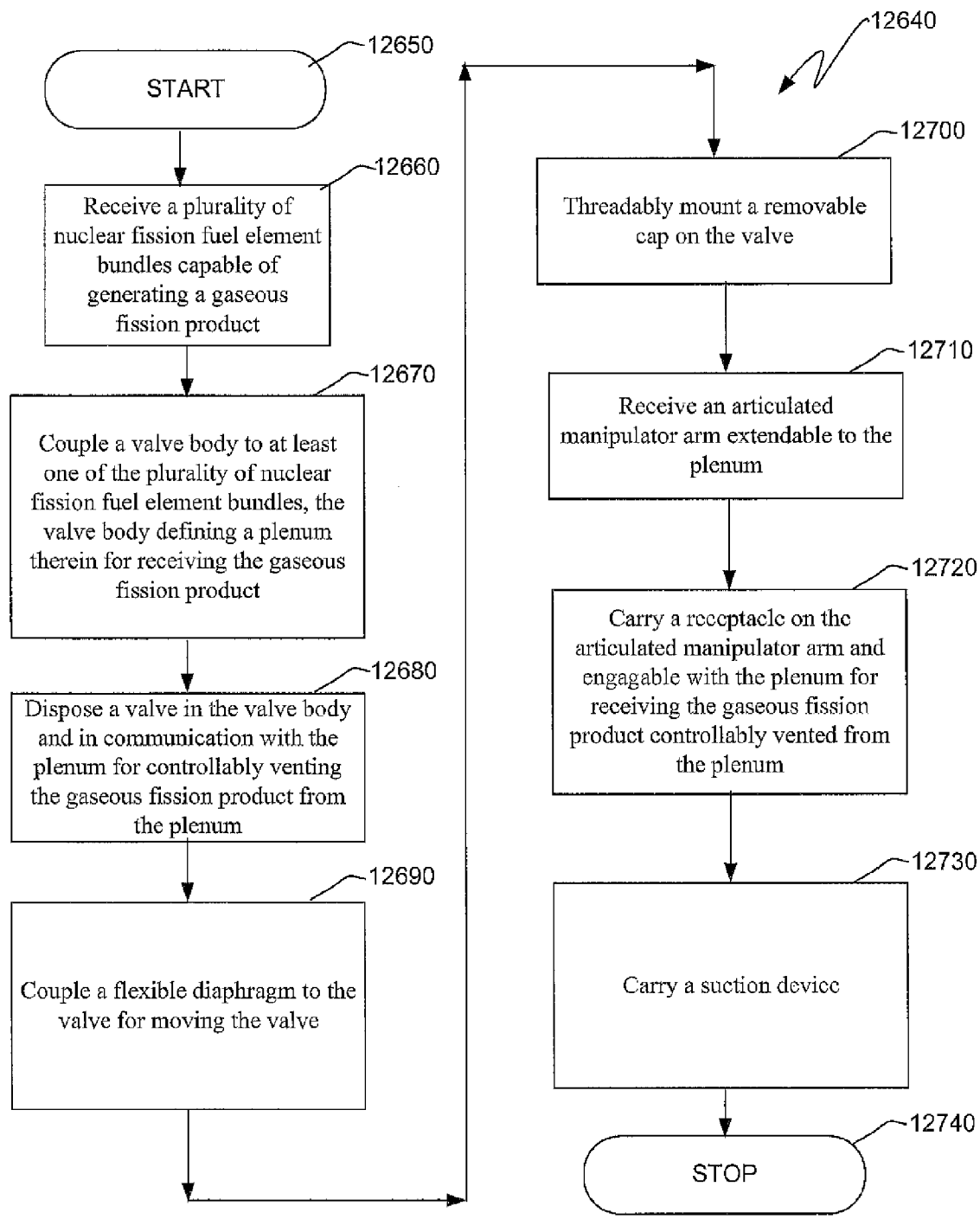

In FIG. 101A, an illustrative method 12640 of assembling a vented nuclear fission fuel module starts at a block 12650. At a block 12660, the method comprises receiving a plurality of nuclear fission fuel element bundles capable of generating a gaseous fission product. At a block 12670, a valve body is coupled to at least one of the plurality of nuclear fission fuel element bundles, the valve body defining a plenum therein for receiving the gaseous fission product. At a block 12680, a valve is disposed in the valve body and in communication with the plenum for controllably venting the gaseous fission product from the plenum. At a block 12690, a flexible diaphragm is coupled to the valve for moving the valve. At a block 12700, a removable cap is threadably mounted on the valve. At a block 12710, an articulated manipulator arm is received that is extendable to the plenum. At a block 12720, a receptacle is carried on the articulated manipulator arm and is engageable with the plenum for receiving the gaseous fission product controllably vented from the plenum. At a block 12730, a suction device is carried. The method stops at a block 12740.

Figure 102:
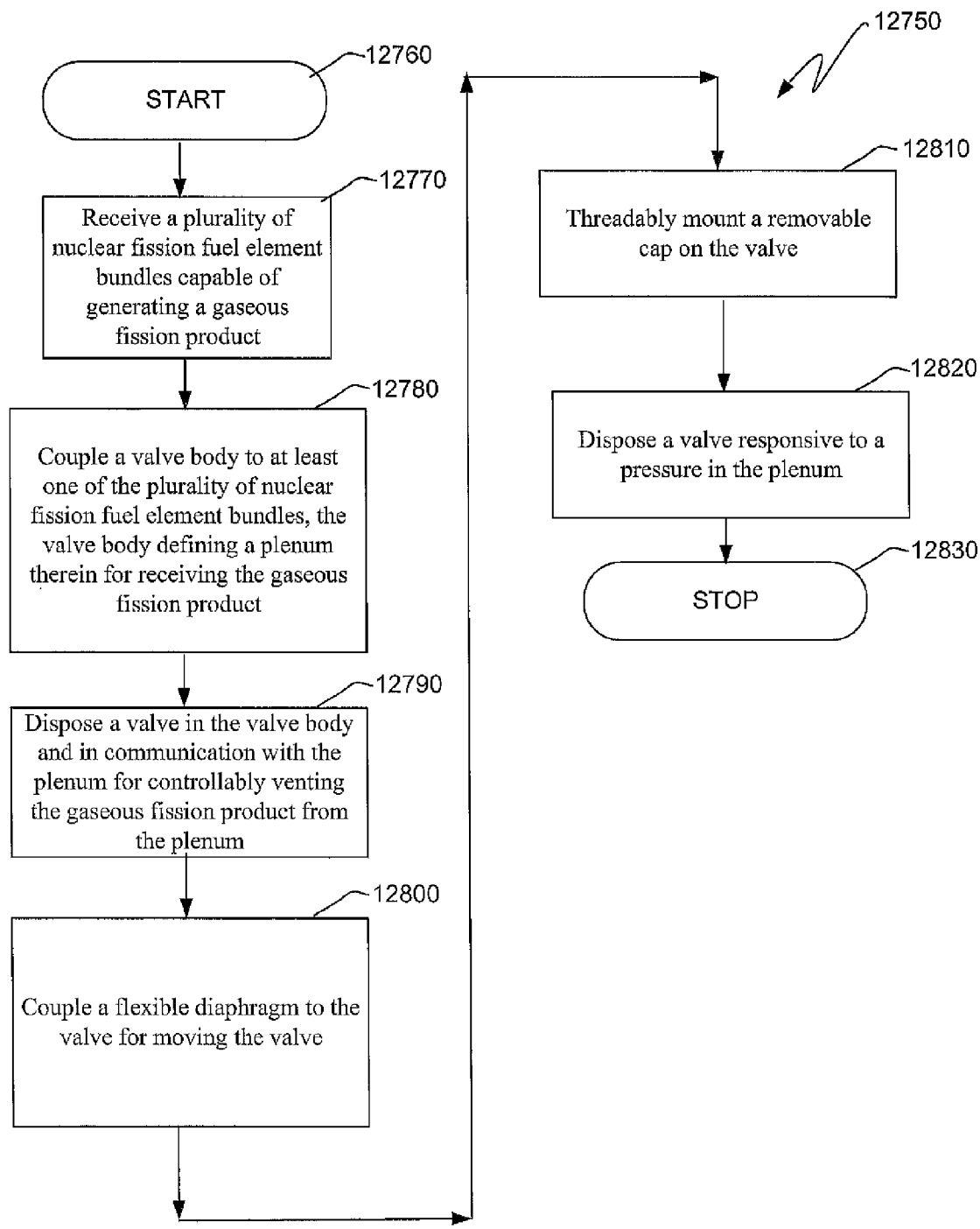

In FIG. 102, an illustrative method 12750 of assembling a vented nuclear fission fuel module starts at a block 12760. At a block 12770, the method comprises receiving a plurality of nuclear fission fuel element bundles capable of generating a gaseous fission product. At a block 12780, a valve body is coupled to at least one of the plurality of nuclear fission fuel element bundles, the valve body defining a plenum therein for receiving the gaseous fission product. At a block 12790, a valve is disposed in the valve body and in communication with the plenum for controllably venting the gaseous fission product from the plenum. At a block 12800, a flexible diaphragm is coupled to the valve for moving the valve. At a block 12810, a removable cap is threadably mounted on the valve. At a block 12820, a valve is disposed that is responsive to a pressure in the plenum. The method stops at a block 12830.

Figure 103:
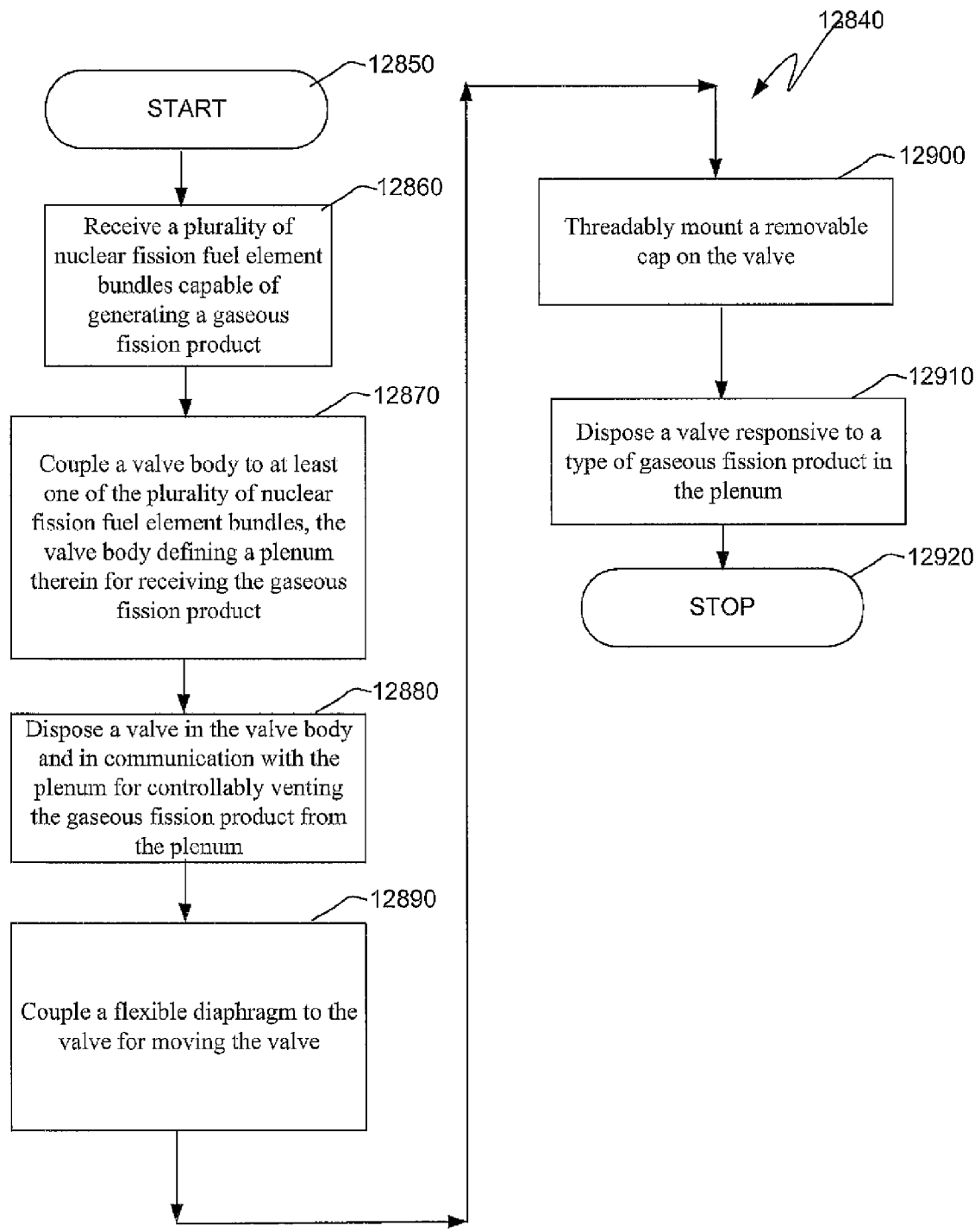

In FIG. 103, an illustrative method 12840 of assembling a vented nuclear fission fuel module starts at a block 12850. At a block 12860, the method comprises receiving a plurality of nuclear fission fuel element bundles capable of generating a gaseous fission product. At a block 12870, a valve body is coupled to at least one of the plurality of nuclear fission fuel element bundles, the valve body defining a plenum therein for receiving the gaseous fission product. At a block 12880, a valve is disposed in the valve body and in communication with the plenum for controllably venting the gaseous fission product from the plenum. At a block 12890, a flexible diaphragm is coupled to the valve for moving the valve. At a block 12900, a removable cap is threadably mounted on the valve. At a block 12910, a valve is disposed that is responsive to a type of gaseous fission product in the plenum. The method stops at a block 12920.

Figure 104:
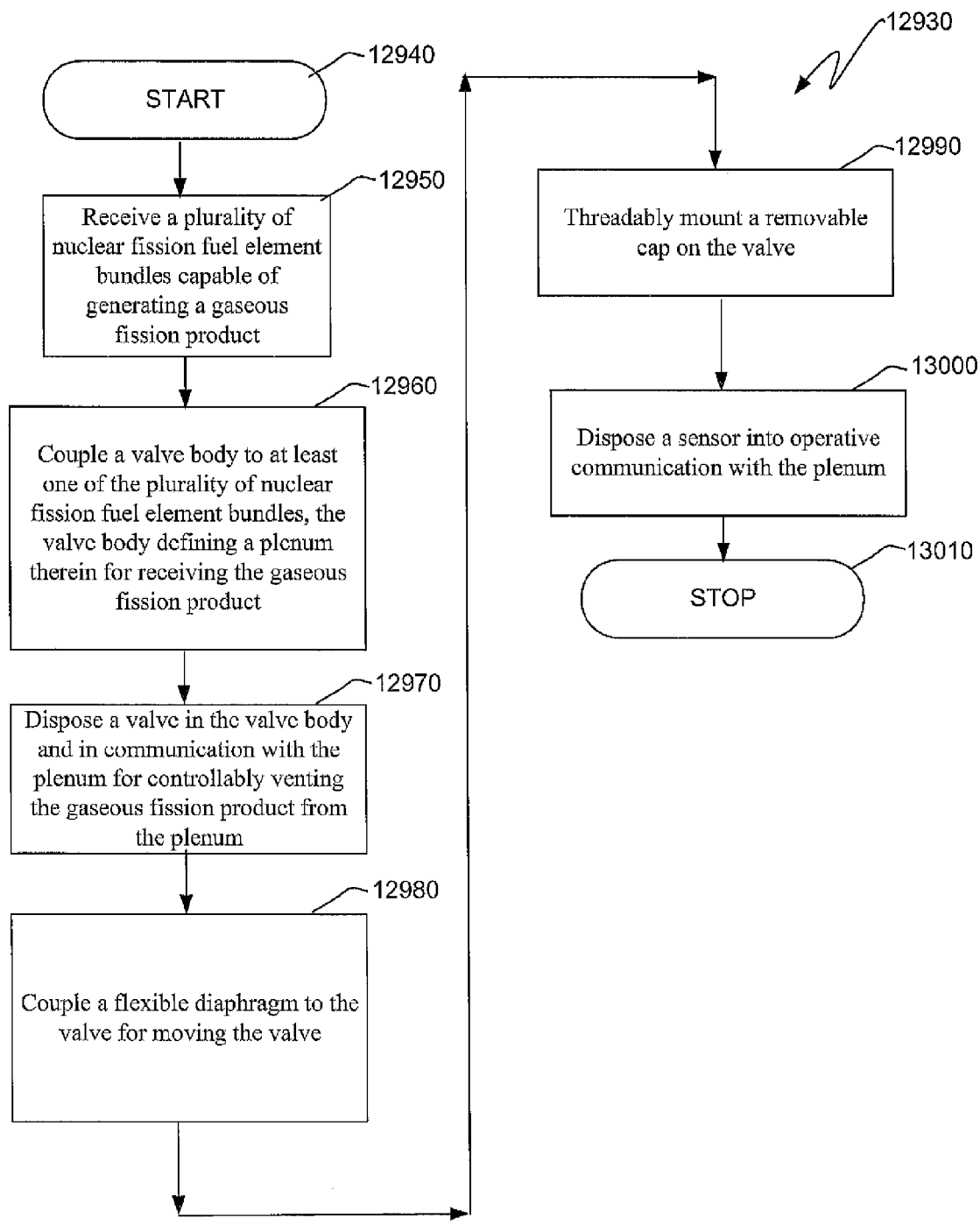

In FIG. 104, an illustrative method 12930 of assembling a vented nuclear fission fuel module starts at a block 12940. At a block 12950, the method comprises receiving a plurality of nuclear fission fuel element bundles capable of generating a gaseous fission product. At a block 12960, a valve body is coupled to at least one of the plurality of nuclear fission fuel element bundles, the valve body defining a plenum therein for receiving the gaseous fission product. At a block 12970, a valve is disposed in the valve body and in communication with the plenum for controllably venting the gaseous fission product from the plenum. At a block 12980, a flexible diaphragm is coupled to the valve for moving the valve. At a block 12990, a removable cap is threadably mounted on the valve. At a block 13000, a sensor is disposed into operative communication with the plenum. The method stops at a block 13010.

Figure 105:
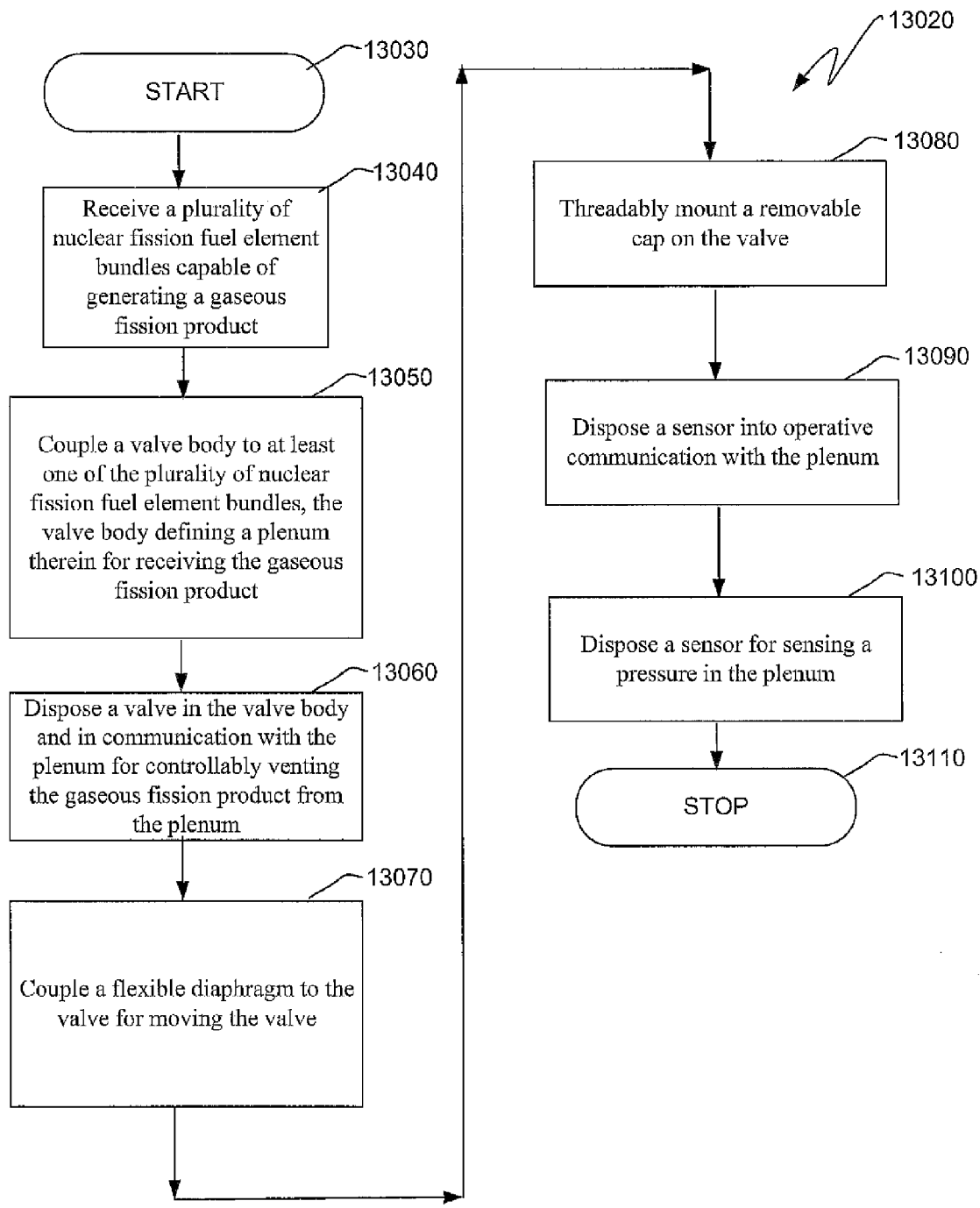

In FIG. 105, an illustrative method 13020 of assembling a vented nuclear fission fuel module starts at a block 13030. At a block 13040, the method comprises receiving a plurality of nuclear fission fuel element bundles capable of generating a gaseous fission product. At a block 13050, a valve body is coupled to at least one of the plurality of nuclear fission fuel element bundles, the valve body defining a plenum therein for receiving the gaseous fission product. At a block 13060, a valve is disposed in the valve body and in communication with the plenum for controllably venting the gaseous fission product from the plenum. At a block 13070, a flexible diaphragm is coupled to the valve for moving the valve. At a block 13080, a removable cap is threadably mounted on the valve. At a block 13090, a sensor is disposed into operative communication with the plenum. At a block 13100, a sensor is disposed for sensing a pressure in the plenum. The method stops at a block 13110.

Figure 106:
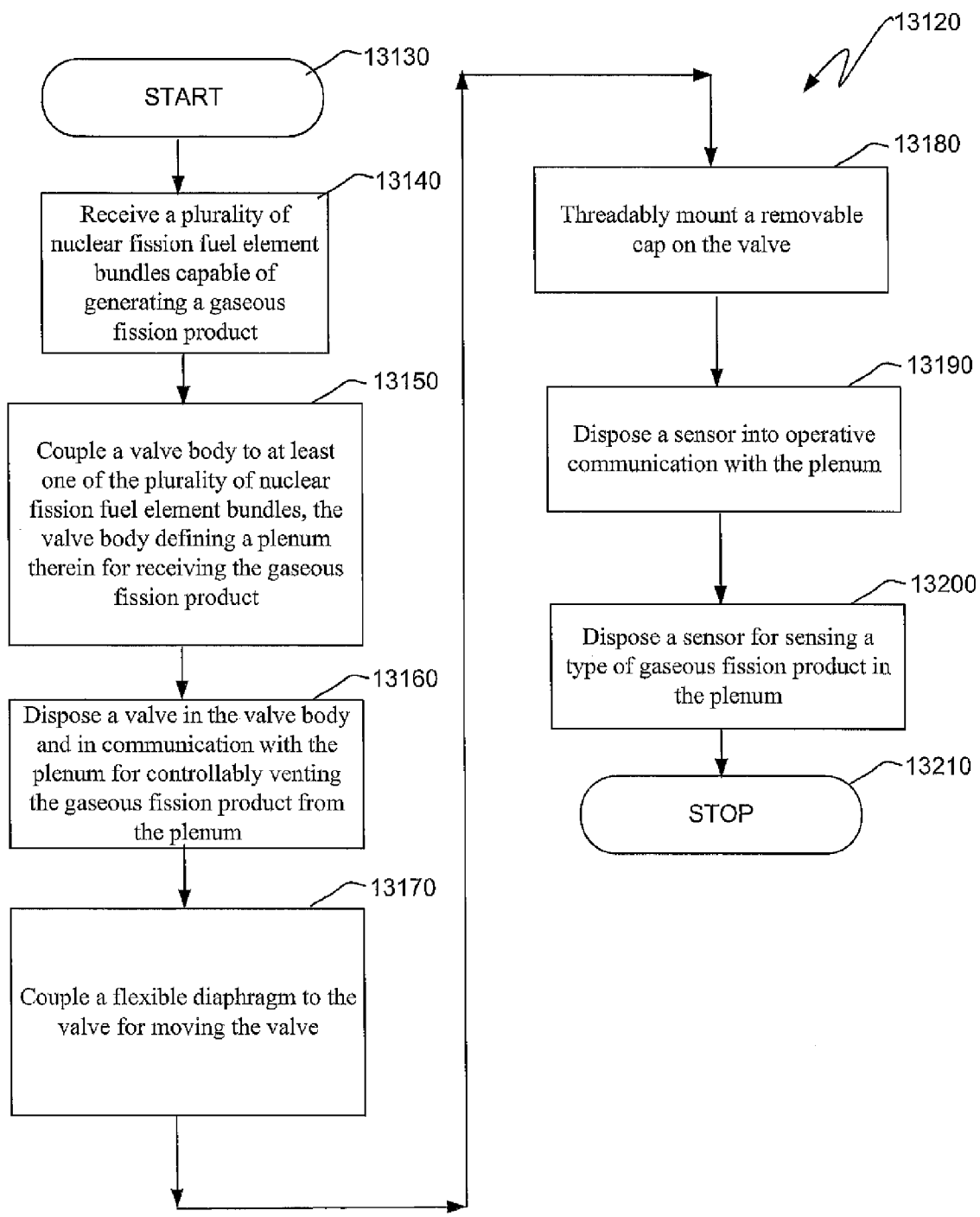

In FIG. 106, an illustrative method 13120 of assembling a vented nuclear fission fuel module starts at a block 13130. At a block 13140, the method comprises receiving a plurality of nuclear fission fuel element bundles capable of generating a gaseous fission product. At a block 13150, a valve body is coupled to at least one of the plurality of nuclear fission fuel element bundles, the valve body defining a plenum therein for receiving the gaseous fission product. At a block 13160, a valve is disposed in the valve body and in communication with the plenum for controllably venting the gaseous fission product from the plenum. At a block 13170, a flexible diaphragm is coupled to the valve for moving the valve. At a block 13180, a removable cap is threadably mounted on the valve. At a block 13190, a sensor is disposed into operative communication with the plenum. At a block 13200, a sensor is disposed for sensing a type of gaseous fission product in the plenum. The method stops at a block 13210.

Figure 106A:
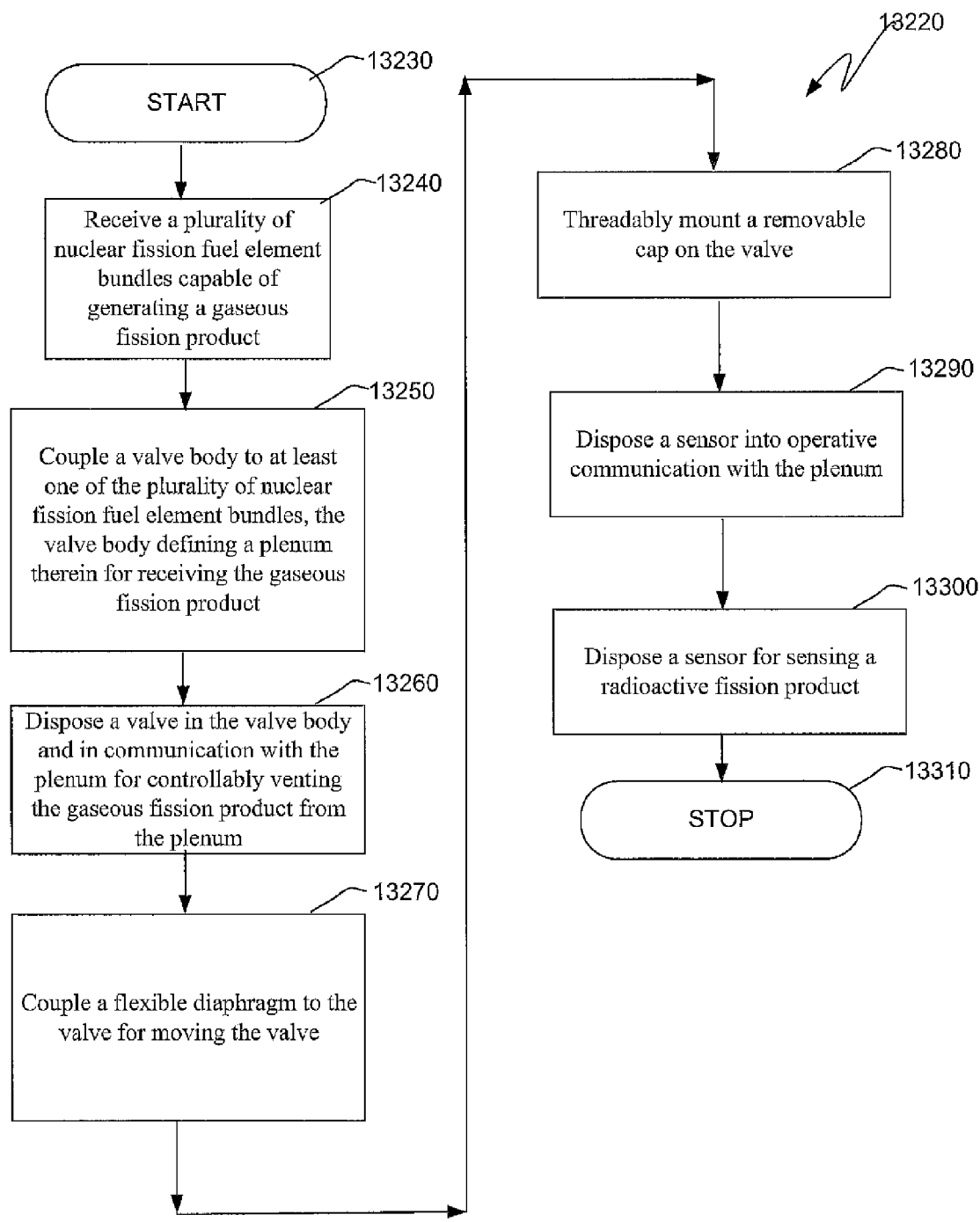

In FIG. 106A, an illustrative method 13220 of assembling a vented nuclear fission fuel module starts at a block 13230. At a block 13240, the method comprises receiving a plurality of nuclear fission fuel element bundles capable of generating a gaseous fission product. At a block 13250, a valve body is coupled to at least one of the plurality of nuclear fission fuel element bundles, the valve body defining a plenum therein for receiving the gaseous fission product. At a block 13260, a valve is disposed in the valve body and in communication with the plenum for controllably venting the gaseous fission product from the plenum. At a block 13270, a flexible diaphragm is coupled to the valve for moving the valve. At a block 13280, a removable cap is threadably mounted on the valve. At a block 13290, a sensor is disposed into operative communication with the plenum. At a block 13300, a sensor is disposed for sensing a radioactive fission product. The method stops at a block 13310.

Figure 106B:
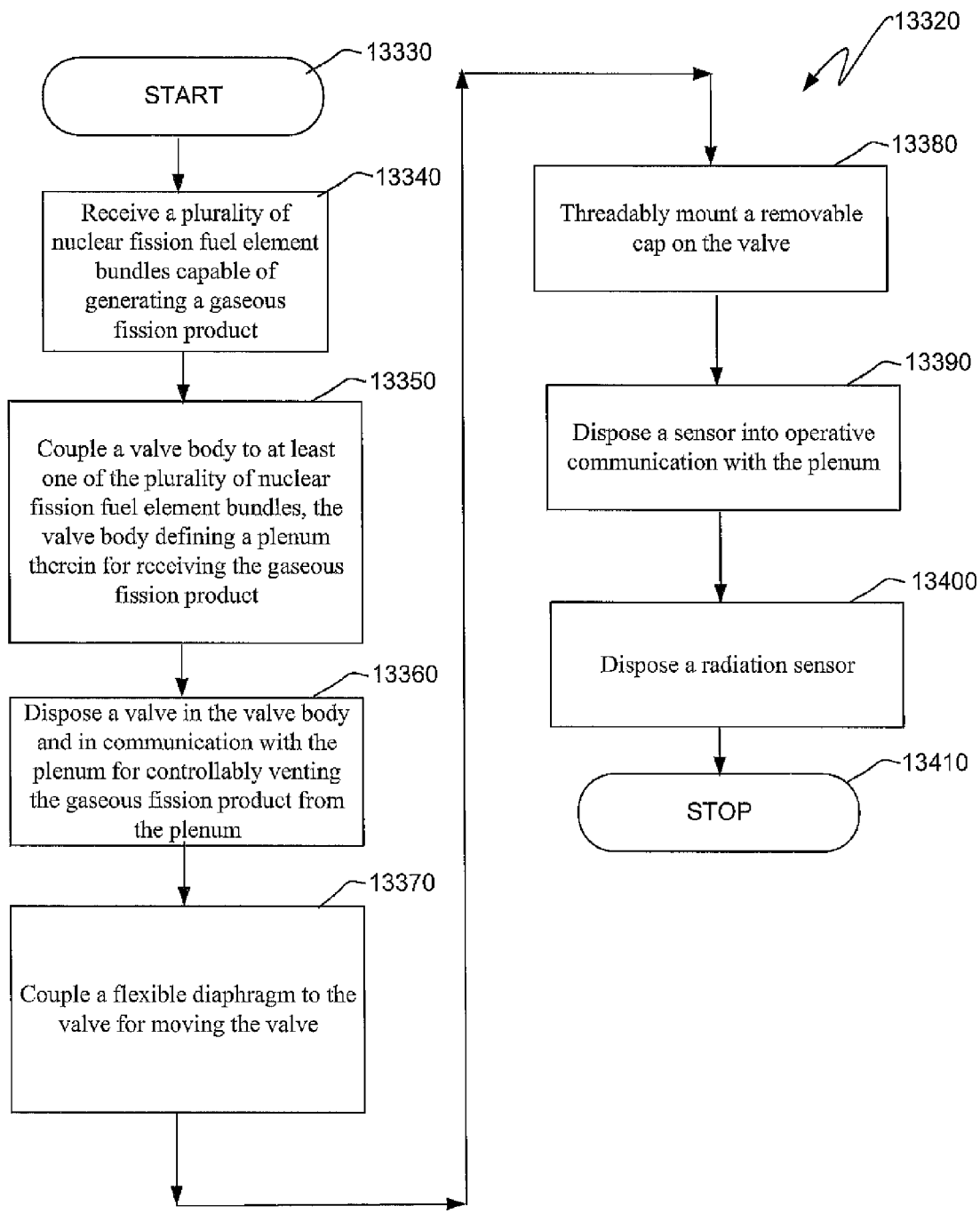

In FIG. 106B, an illustrative method 13320 of assembling a vented nuclear fission fuel module starts at a block 13330. At a block 13340, the method comprises receiving a plurality of nuclear fission fuel element bundles capable of generating a gaseous fission product. At a block 13350, a valve body is coupled to at least one of the plurality of nuclear fission fuel element bundles, the valve body defining a plenum therein for receiving the gaseous fission product. At a block 13360, a valve is disposed in the valve body and in communication with the plenum for controllably venting the gaseous fission product from the plenum. At a block 13370, a flexible diaphragm is coupled to the valve for moving the valve. At a block 13380, a removable cap is threadably mounted on the valve. At a block 13390, a sensor is disposed into operative communication with the plenum. At a block 13400, a radiation sensor is disposed. The method stops at a block 13410.

Figure 106C:
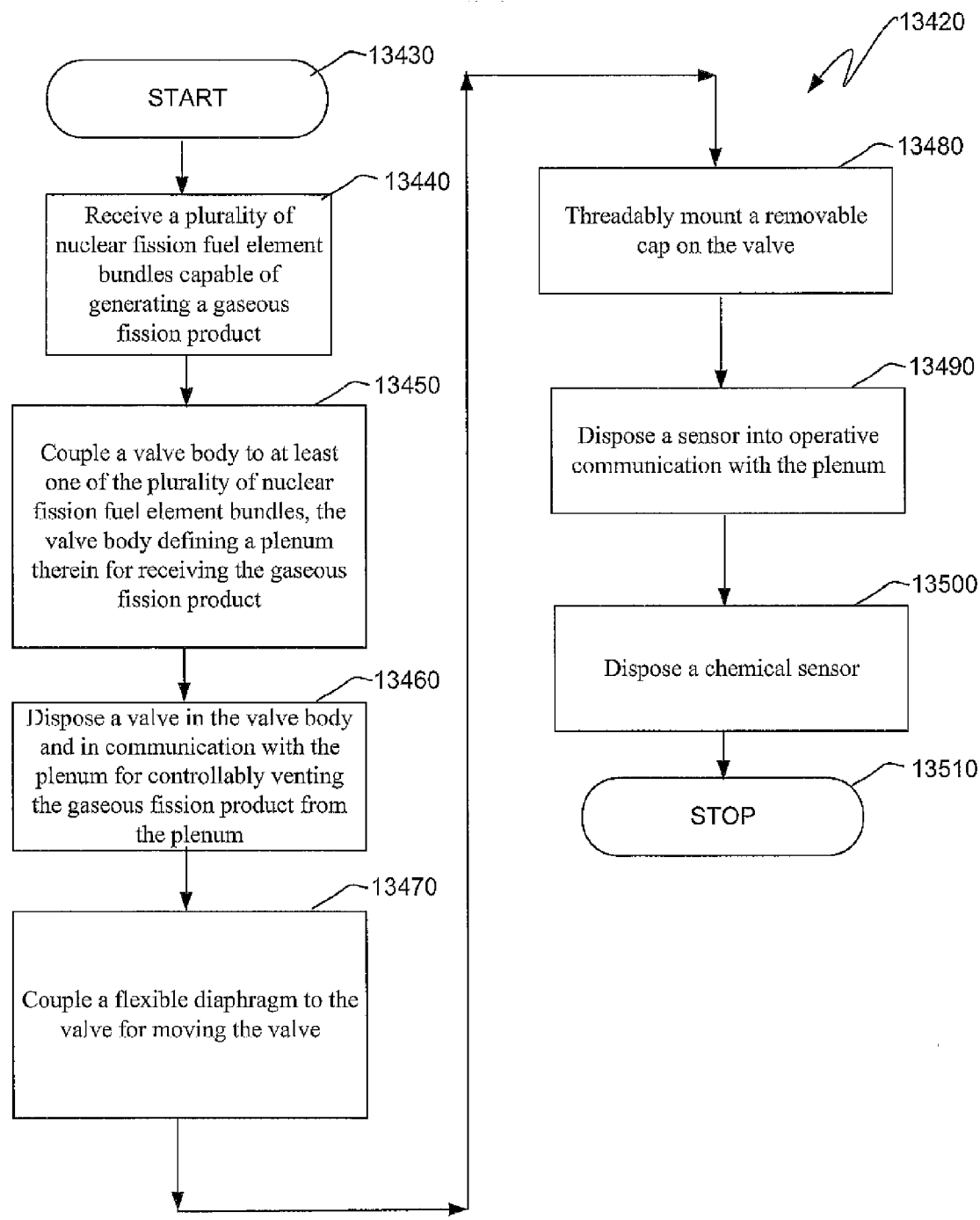

In FIG. 106C, an illustrative method 13420 of assembling a vented nuclear fission fuel module starts at a block 13430. At a block 13440, the method comprises receiving a plurality of nuclear fission fuel element bundles capable of generating a gaseous fission product. At a block 13450, a valve body is coupled to at least one of the plurality of nuclear fission fuel element bundles, the valve body defining a plenum therein for receiving the gaseous fission product. At a block 13460, a valve is disposed in the valve body and in communication with the plenum for controllably venting the gaseous fission product from the plenum. At a block 13470, a flexible diaphragm is coupled to the valve for moving the valve. At a block 13480, a removable cap is threadably mounted on the valve. At a block 13490, a sensor is disposed into operative communication with the plenum. At a block 13500, a chemical sensor is disposed. The method stops at a block 13510.

Figure 106D:
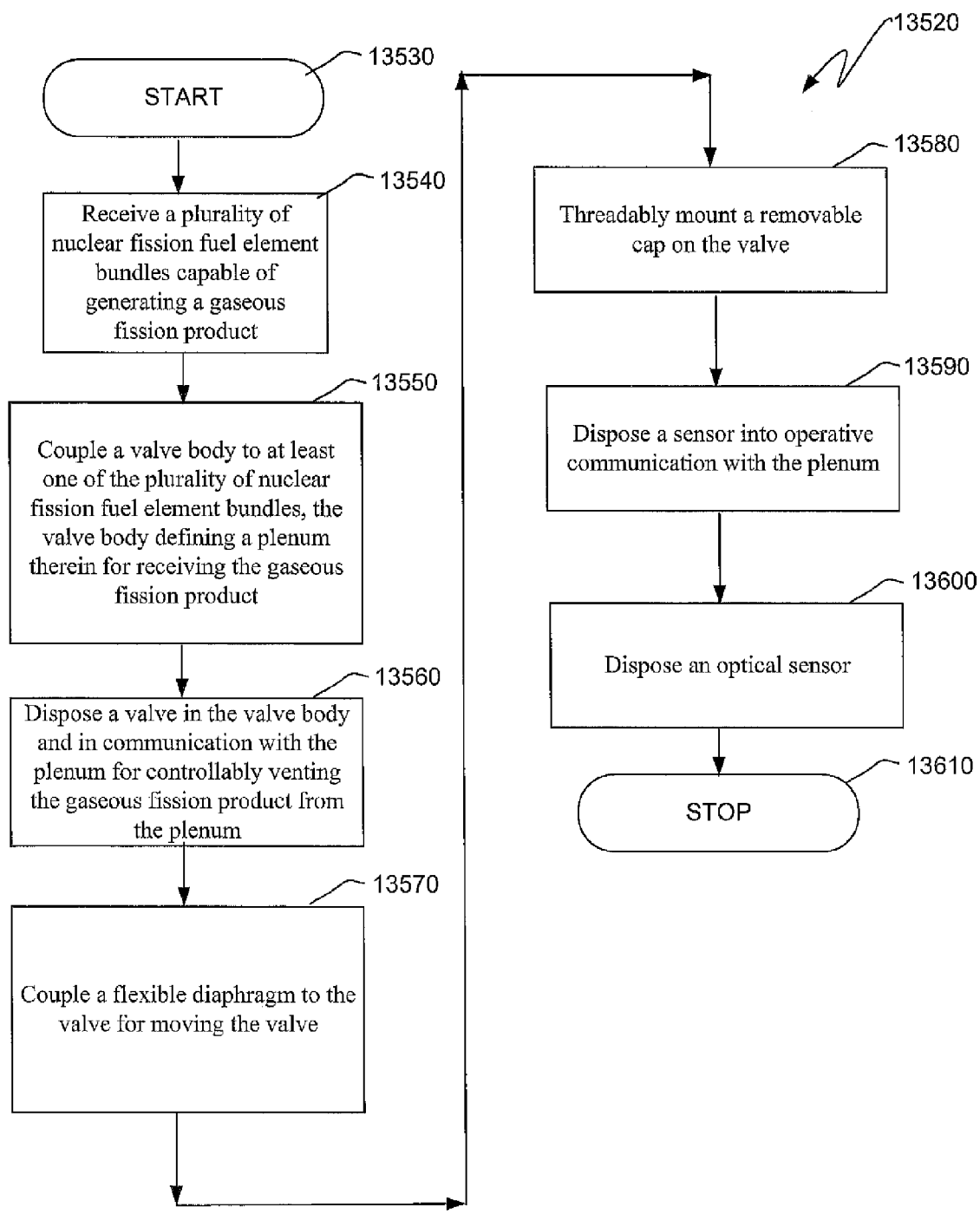

In FIG. 106D, an illustrative method 13520 of assembling a vented nuclear fission fuel module starts at a block 13530. At a block 13540, the method comprises receiving a plurality of nuclear fission fuel element bundles capable of generating a gaseous fission product. At a block 13550, a valve body is coupled to at least one of the plurality of nuclear fission fuel element bundles, the valve body defining a plenum therein for receiving the gaseous fission product. At a block 13560, a valve is disposed in the valve body and in communication with the plenum for controllably venting the gaseous fission product from the plenum. At a block 13570, a flexible diaphragm is coupled to the valve for moving the valve. At a block 13580, a removable cap is threadably mounted on the valve. At a block 13590, a sensor is disposed into operative communication with the plenum. At a block 13600, an optical sensor is disposed. The method stops at a block 13610.

Figure 106E:
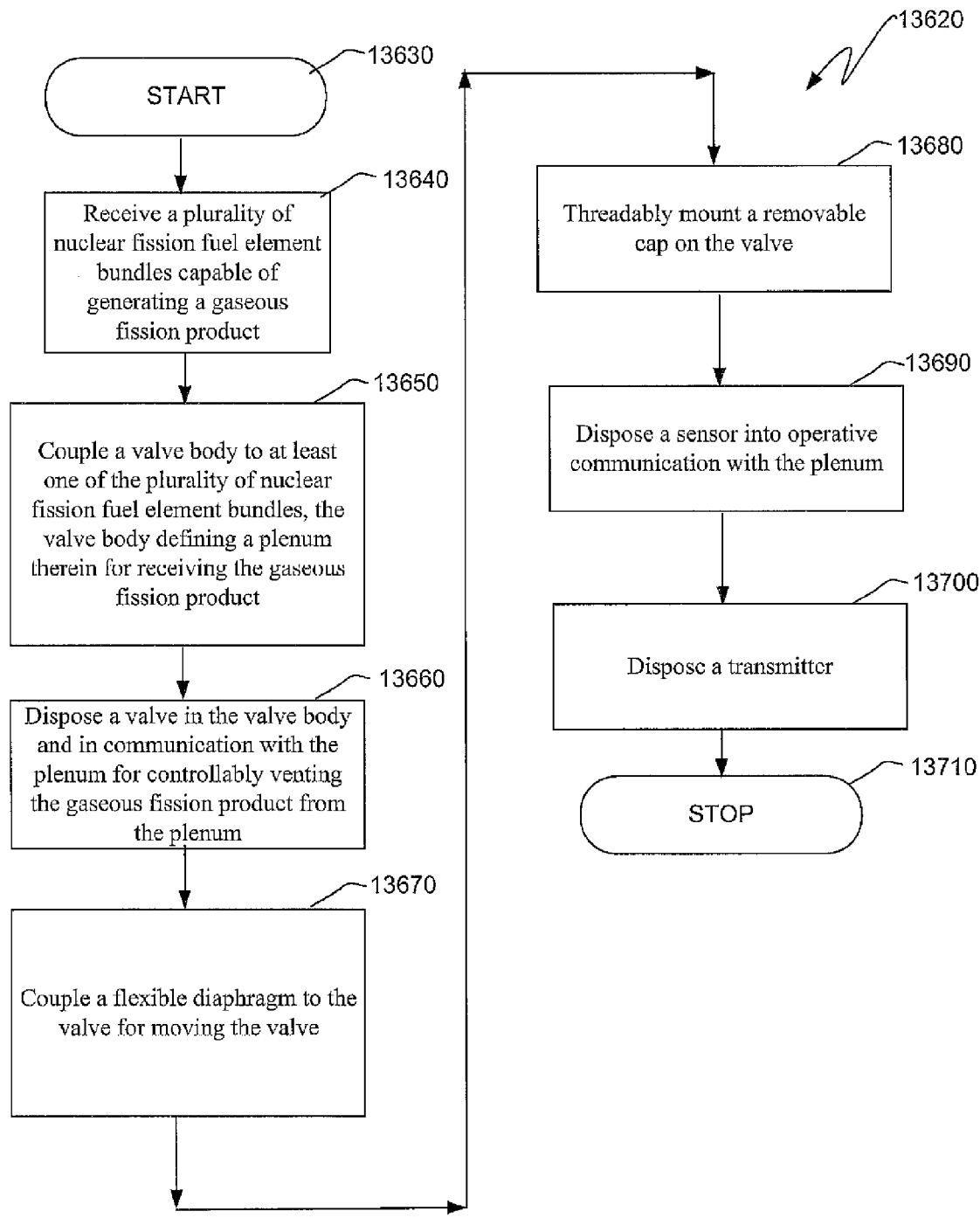

In FIG. 106E, an illustrative method 13620 of assembling a vented nuclear fission fuel module starts at a block 13630. At a block 13640, the method comprises receiving a plurality of nuclear fission fuel element bundles capable of generating a gaseous fission product. At a block 13650, a valve body is coupled to at least one of the plurality of nuclear fission fuel element bundles, the valve body defining a plenum therein for receiving the gaseous fission product. At a block 13660, a valve is disposed in the valve body and in communication with the plenum for controllably venting the gaseous fission product from the plenum. At a block 13670, a flexible diaphragm is coupled to the valve for moving the valve. At a block 13680, a removable cap is threadably mounted on the valve. At a block 13690, a sensor is disposed into operative communication with the plenum. At a block 13700, a transmitter is disposed. The method stops at a block 13710.

Figure 107:
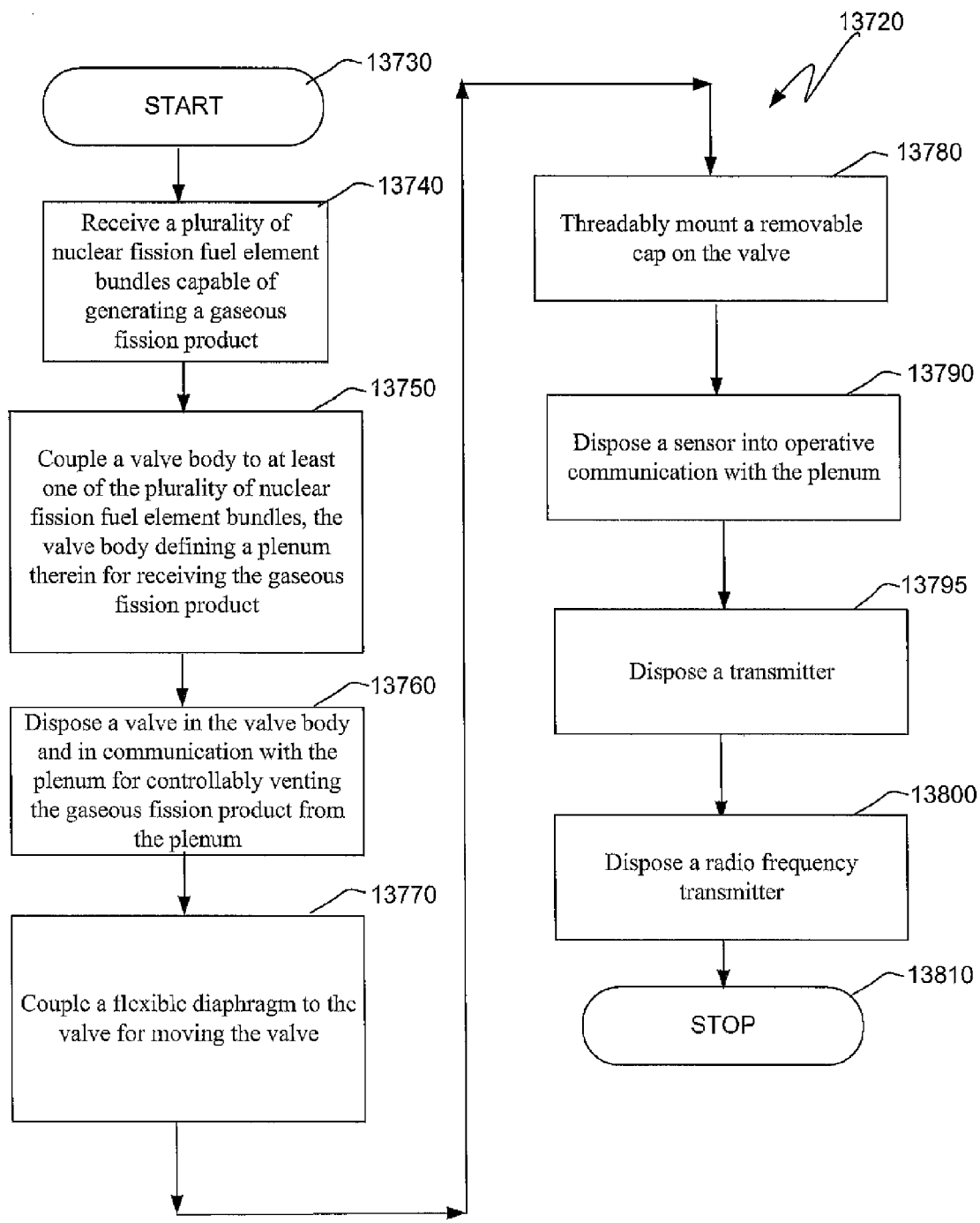

In FIG. 107, an illustrative method 13720 of assembling a vented nuclear fission fuel module starts at a block 13730. At a block 13740, the method comprises receiving a plurality of nuclear fission fuel element bundles capable of generating a gaseous fission product. At a block 13750, a valve body is coupled to at least one of the plurality of nuclear fission fuel element bundles, the valve body defining a plenum therein for receiving the gaseous fission product. At a block 13760, a valve is disposed in the valve body and in communication with the plenum for controllably venting the gaseous fission product from the plenum. At a block 13770, a flexible diaphragm is coupled to the valve for moving the valve. At a block 13780, a removable cap is threadably mounted on the valve. At a block 13790, a sensor is disposed into operative communication with the plenum. At a block 13795, a transmitter is disposed. At a block 13800, a radio frequency transmitter is disposed. The method stops at a block 13810.

Figure 108:
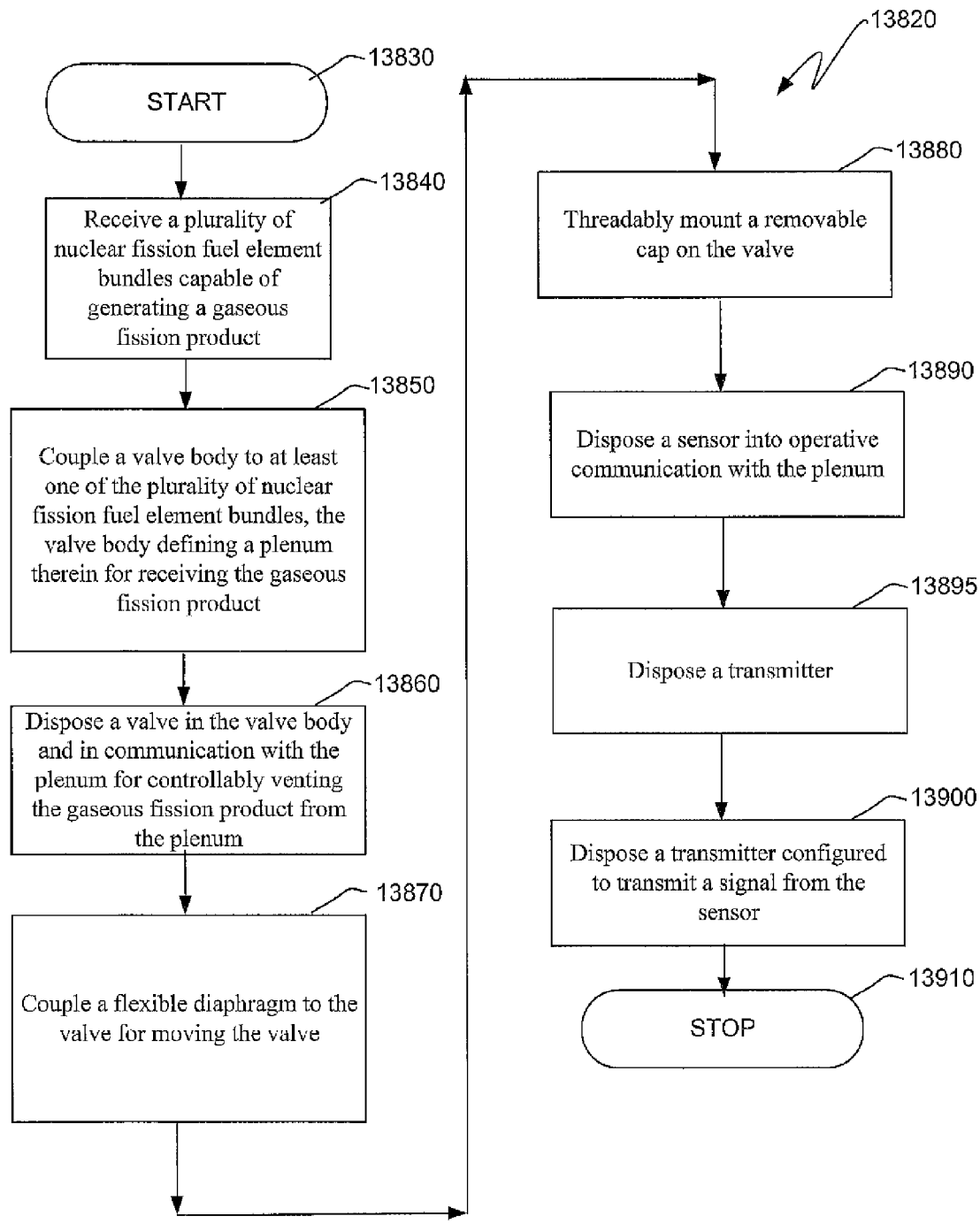

In FIG. 108, an illustrative method 13820 of assembling a vented nuclear fission fuel module starts at a block 13830. At a block 13840, the method comprises receiving a plurality of nuclear fission fuel element bundles capable of generating a gaseous fission product. At a block 13850, a valve body is coupled to at least one of the plurality of nuclear fission fuel element bundles, the valve body defining a plenum therein for receiving the gaseous fission product. At a block 13860, a valve is disposed in the valve body and in communication with the plenum for controllably venting the gaseous fission product from the plenum. At a block 13870, a flexible diaphragm is coupled to the valve for moving the valve. At a block 13880, a removable cap is threadably mounted on the valve. At a block 13890, a sensor is disposed into operative communication with the plenum. At a block 13895, a transmitter is disposed. At a block 13900, a transmitter is disposed that is configured to transmit a signal from the sensor. The method stops at a block 13910.

Figure 109:
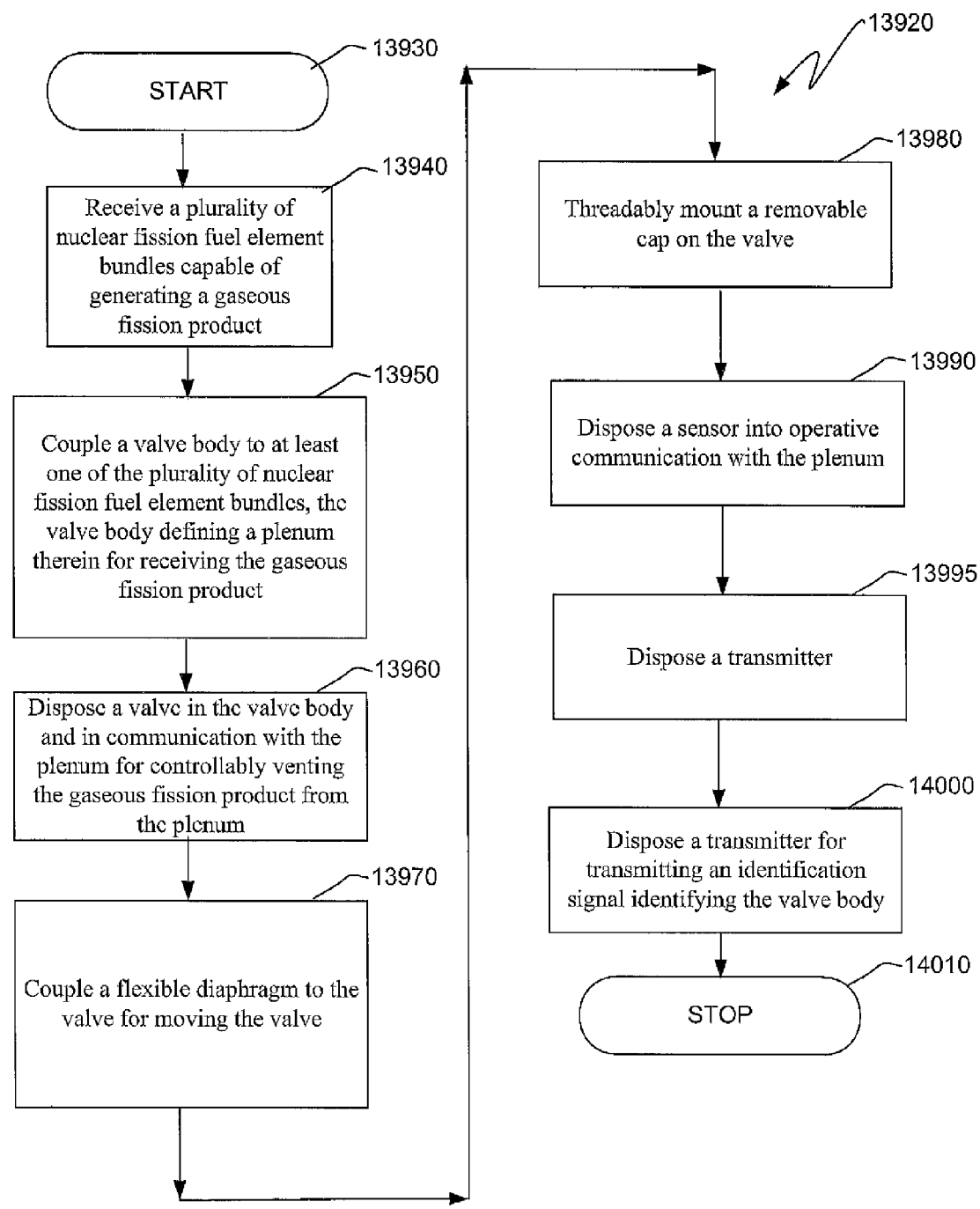

In FIG. 109, an illustrative method 13920 of assembling a vented nuclear fission fuel module starts at a block 13930. At a block 13940, the method comprises receiving a plurality of nuclear fission fuel element bundles capable of generating a gaseous fission product. At a block 13950, a valve body is coupled to at least one of the plurality of nuclear fission fuel element bundles, the valve body defining a plenum therein for receiving the gaseous fission product. At a block 13960, a valve is disposed in the valve body and in communication with the plenum for controllably venting the gaseous fission product from the plenum. At a block 13970, a flexible diaphragm is coupled to the valve for moving the valve. At a block 13980, a removable cap is threadably mounted on the valve. At a block 13990, a sensor is disposed into operative communication with the plenum. At a block 13995, a transmitter is disposed. At a block 14000, a transmitter is disposed that is configured to transmit an identification signal identifying the valve body. The method stops at a block 14010.

Figure 110:
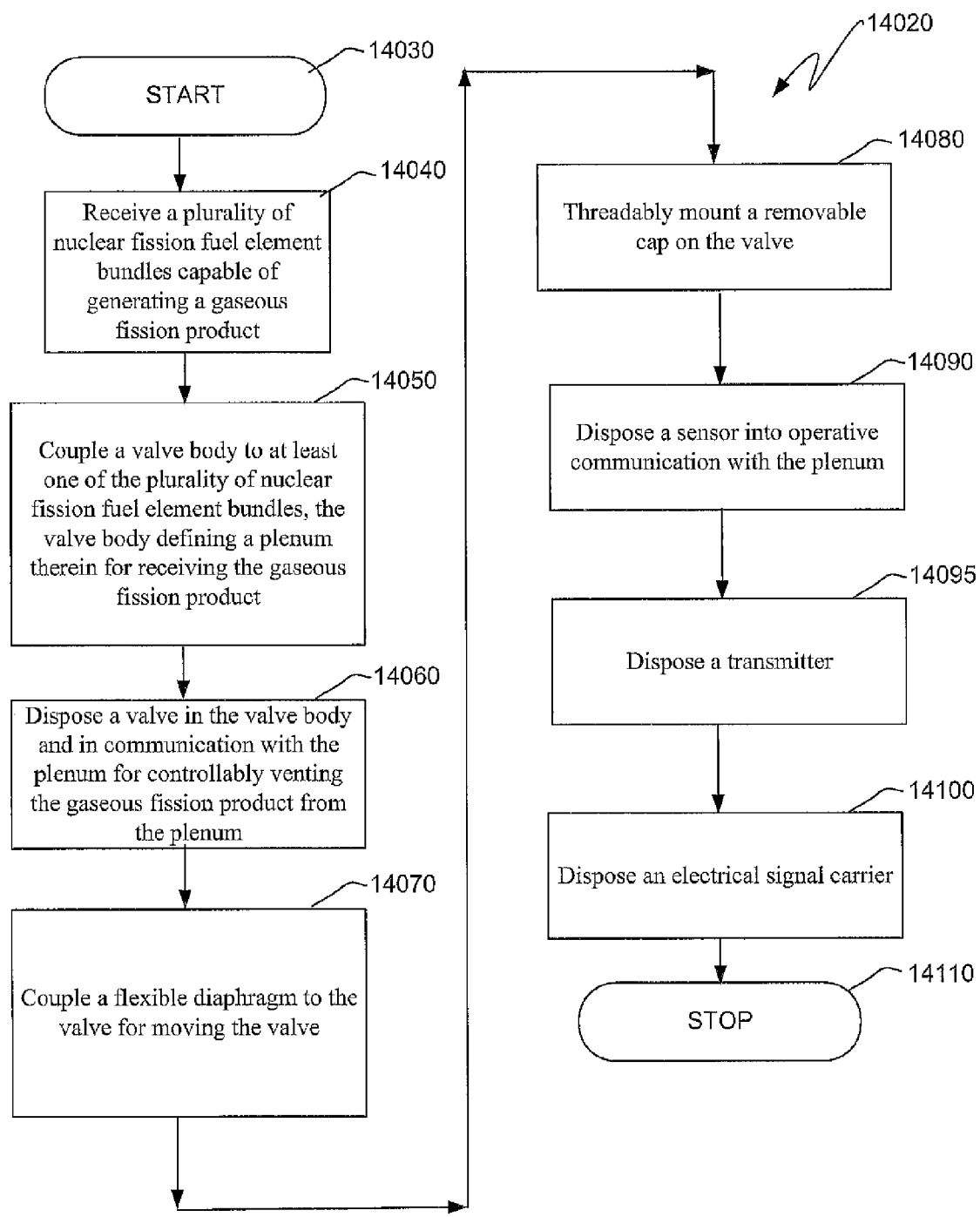

In FIG. 110, an illustrative method 14020 of assembling a vented nuclear fission fuel module starts at a block 14030. At a block 14040, the method comprises receiving a plurality of nuclear fission fuel element bundles capable of generating a gaseous fission product. At a block 14050, a valve body is coupled to at least one of the plurality of nuclear fission fuel element bundles, the valve body defining a plenum therein for receiving the gaseous fission product. At a block 14060, a valve is disposed in the valve body and in communication with the plenum for controllably venting the gaseous fission product from the plenum. At a block 14070, a flexible diaphragm is coupled to the valve for moving the valve. At a block 14080, a removable cap is threadably mounted on the valve. At a block 14090, a sensor is disposed into operative communication with the plenum. At a block 14095, a transmitter is disposed. At a block 14100, an electrical signal carrier is disposed. The method stops at a block 14110.

Figure 110A:
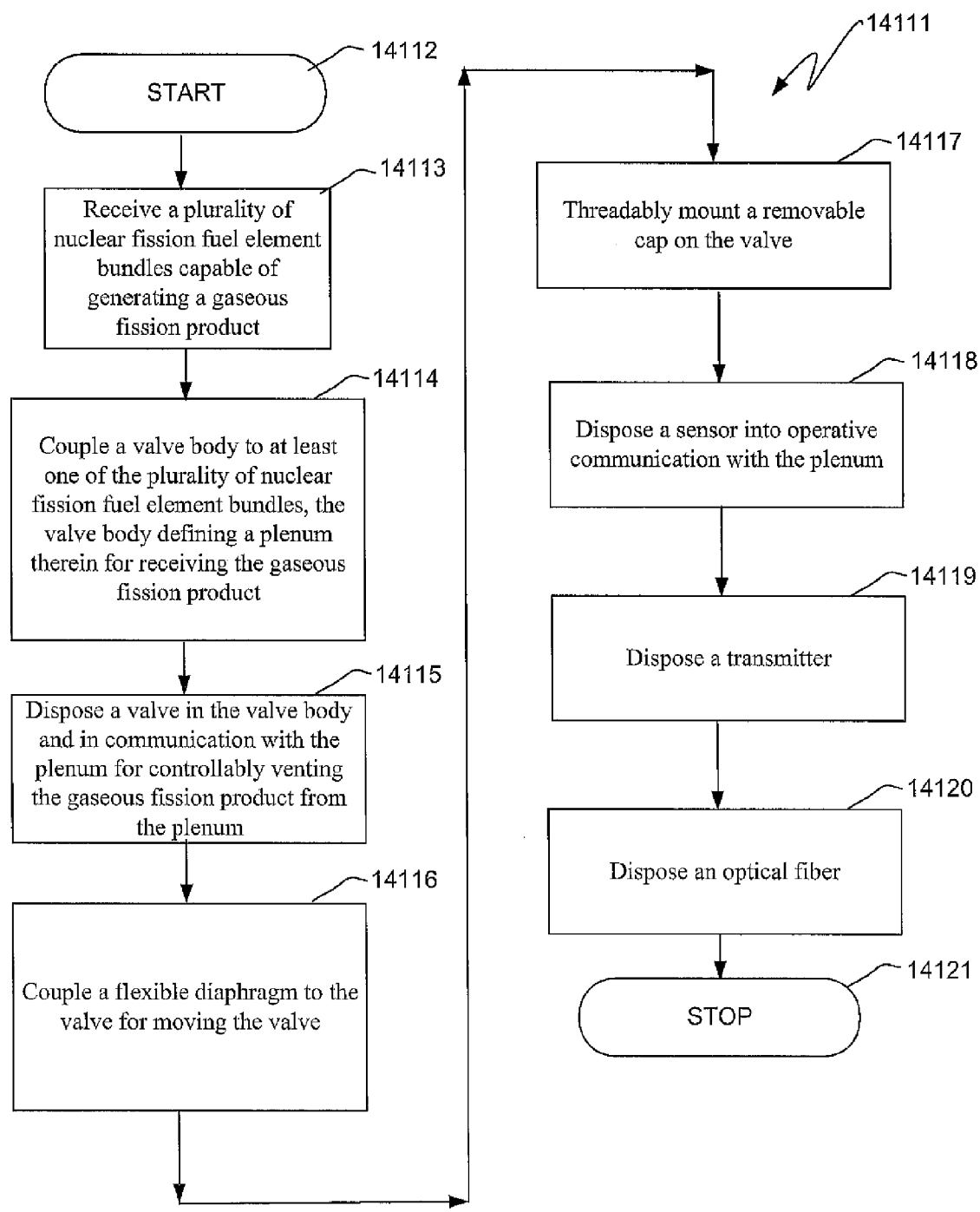

In FIG. 110A, an illustrative method 14111 of assembling a vented nuclear fission fuel module starts at a block 14112. At a block 14113, the method comprises receiving a plurality of nuclear fission fuel element bundles capable of generating a gaseous fission product. At a block 14114, a valve body is coupled to at least one of the plurality of nuclear fission fuel element bundles, the valve body defining a plenum therein for receiving the gaseous fission product. At a block 14115, a valve is disposed in the valve body and in communication with the plenum for controllably venting the gaseous fission product from the plenum. At a block 14116, a flexible diaphragm is coupled to the valve for moving the valve. At a block 14117, a removable cap is threadably mounted on the valve. At a block 14118, a sensor is disposed into operative communication with the plenum. At a block 14119, a transmitter is disposed. At a block 14120, an optical fiber is disposed. The method stops at a block 14121.

Figure 111:
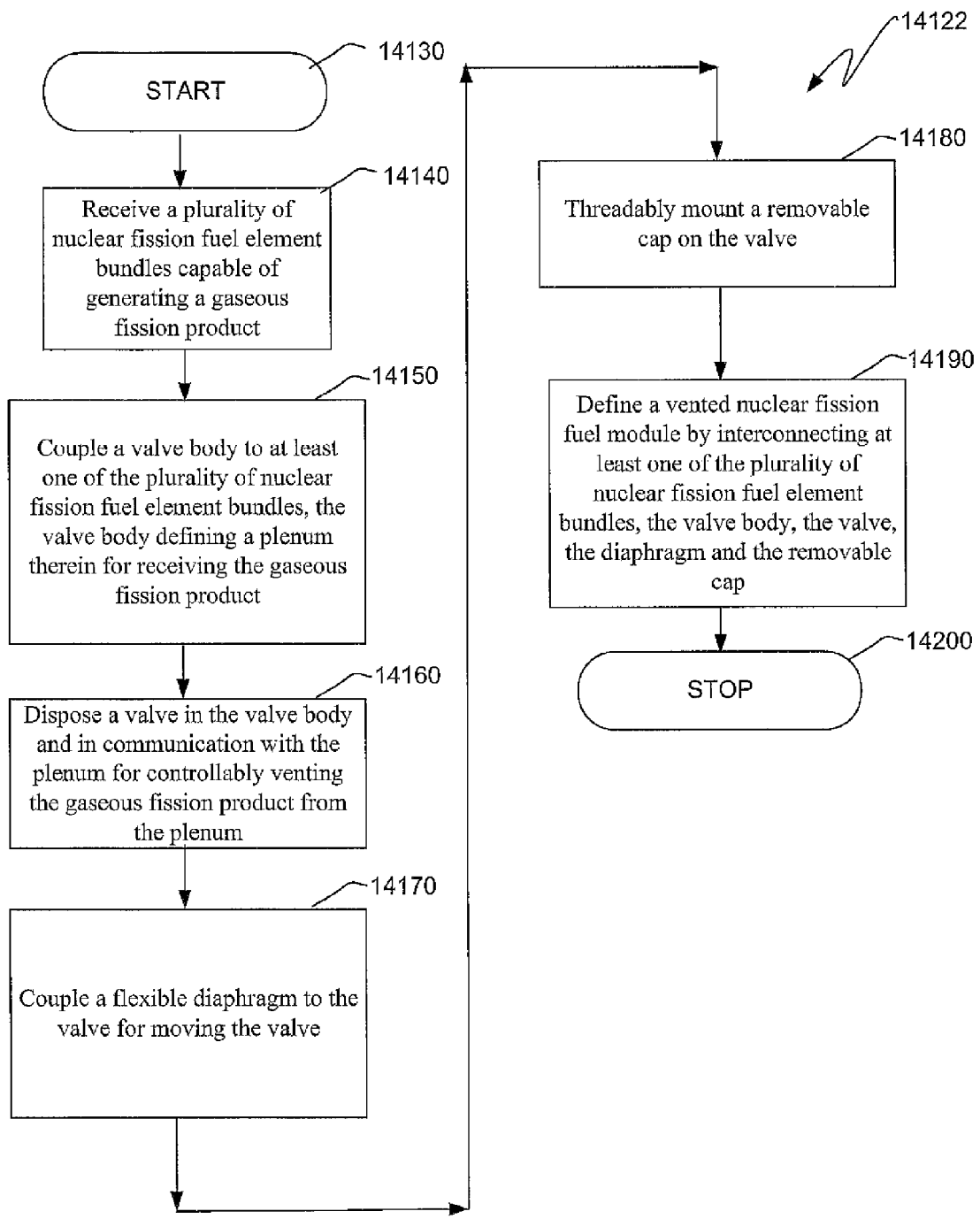

In FIG. 111, an illustrative method 14122 of assembling a vented nuclear fission fuel module starts at a block 14130. At a block 14140, the method comprises receiving a plurality of nuclear fission fuel element bundles capable of generating a gaseous fission product. At a block 14150, a valve body is coupled to at least one of the plurality of nuclear fission fuel element bundles, the valve body defining a plenum therein for receiving the gaseous fission product. At a block 14160, a valve is disposed in the valve body and in communication with the plenum for controllably venting the gaseous fission product from the plenum. At a block 14170, a flexible diaphragm is coupled to the valve for moving the valve. At a block 14180, a removable cap is threadably mounted on the valve. At a block 14190, a vented nuclear fission fuel module is defined by interconnecting at least one of the plurality of nuclear fission fuel element bundles, the valve body, the valve, the diaphragm and the removable cap. The method stops at a block 14200.

Figure 111A:
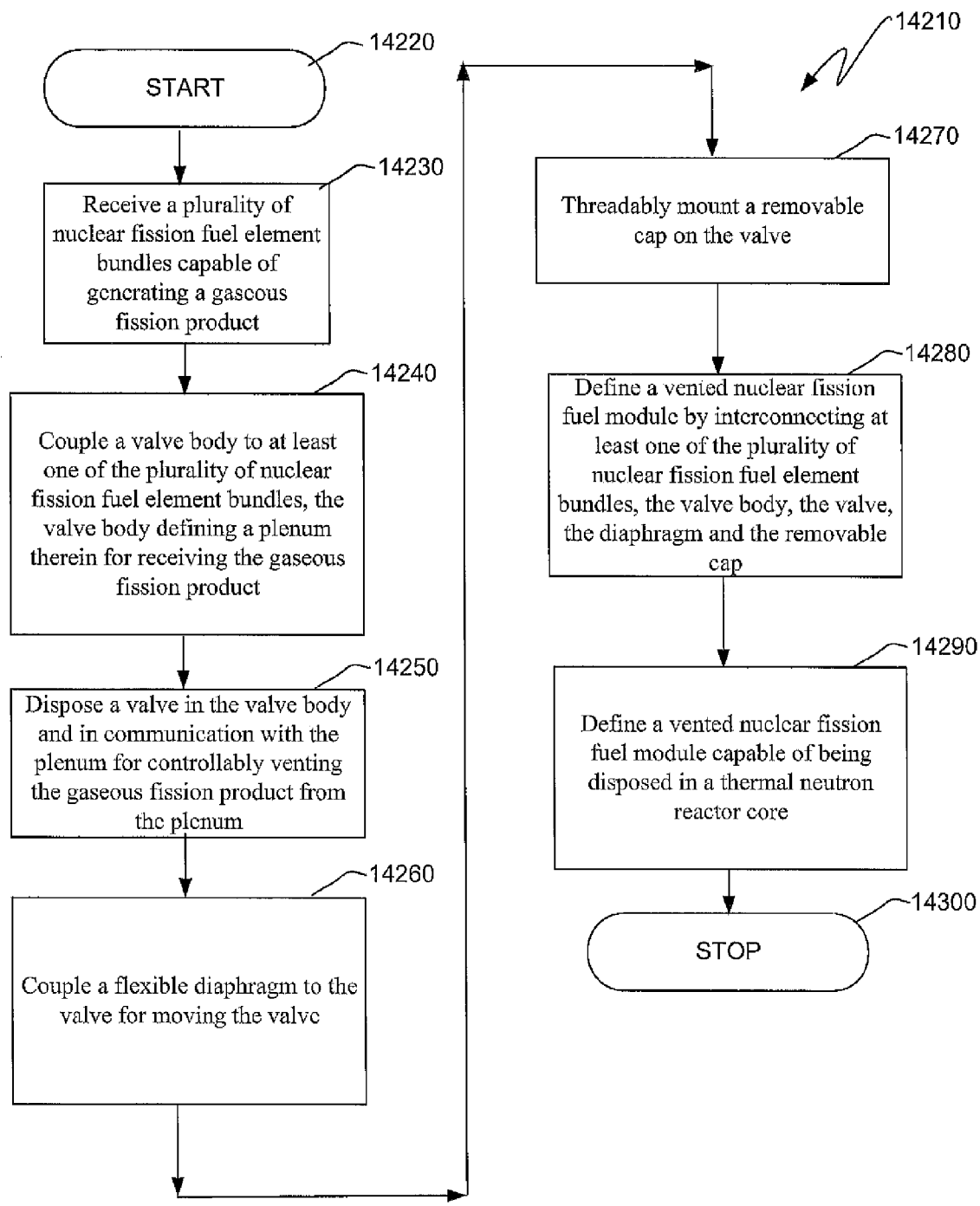

In FIG. 111A, an illustrative method 14210 of assembling a vented nuclear fission fuel module starts at a block 14220. At a block 14230, the method comprises receiving a plurality of nuclear fission fuel element bundles capable of generating a gaseous fission product. At a block 14240, a valve body is coupled to at least one of the plurality of nuclear fission fuel element bundles, the valve body defining a plenum therein for receiving the gaseous fission product. At a block 14250, a valve is disposed in the valve body and in communication with the plenum for controllably venting the gaseous fission product from the plenum. At a block 14260, a flexible diaphragm is coupled to the valve for moving the valve. At a block 14270, a removable cap is threadably mounted on the valve. At a block 14280, a vented nuclear fission fuel module is defined by interconnecting at least one of the plurality of nuclear fission fuel element bundles, the valve body, the valve, the diaphragm and the removable cap. At a block 14290, a vented nuclear fission fuel module is defined that is capable of being disposed in a thermal neutron reactor core. The method stops at a block 14300.

Figure 112:
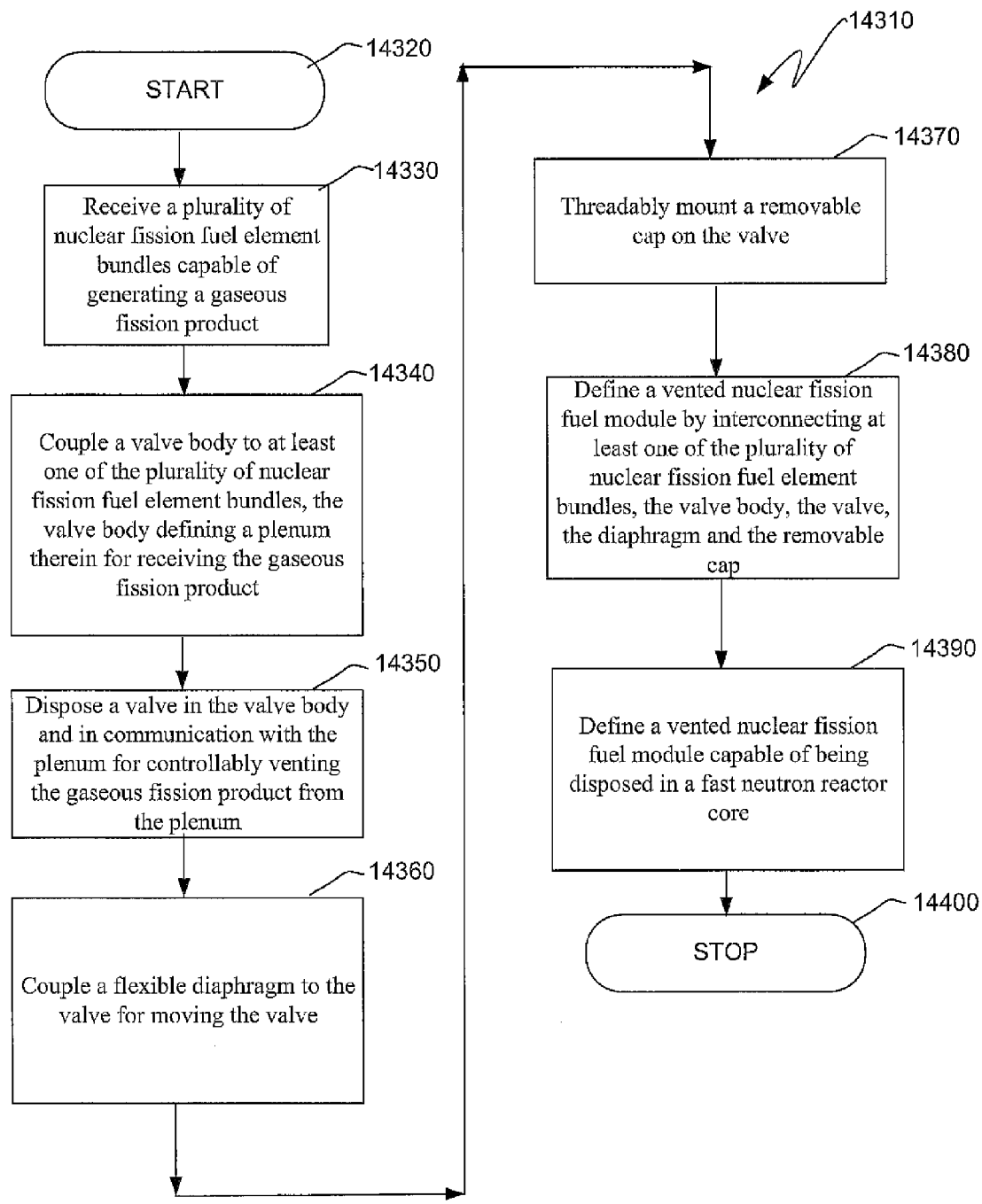

In FIG. 112, an illustrative method 14310 of assembling a vented nuclear fission fuel module starts at a block 14320. At a block 14330, the method comprises receiving a plurality of nuclear fission fuel element bundles capable of generating a gaseous fission product. At a block 14340, a valve body is coupled to at least one of the plurality of nuclear fission fuel element bundles, the valve body defining a plenum therein for receiving the gaseous fission product. At a block 14350, a valve is disposed in the valve body and in communication with the plenum for controllably venting the gaseous fission product from the plenum. At a block 14360, a flexible diaphragm is coupled to the valve for moving the valve. At a block 14370, a removable cap is threadably mounted on the valve. At a block 14380, a vented nuclear fission fuel module is defined by interconnecting at least one of the plurality of nuclear fission fuel element bundles, the valve body, the valve, the diaphragm and the removable cap. At a block 14390, a vented nuclear fission fuel module is defined that is capable of being disposed in a fast neutron reactor core. The method stops at a block 14400.

Figure 113:
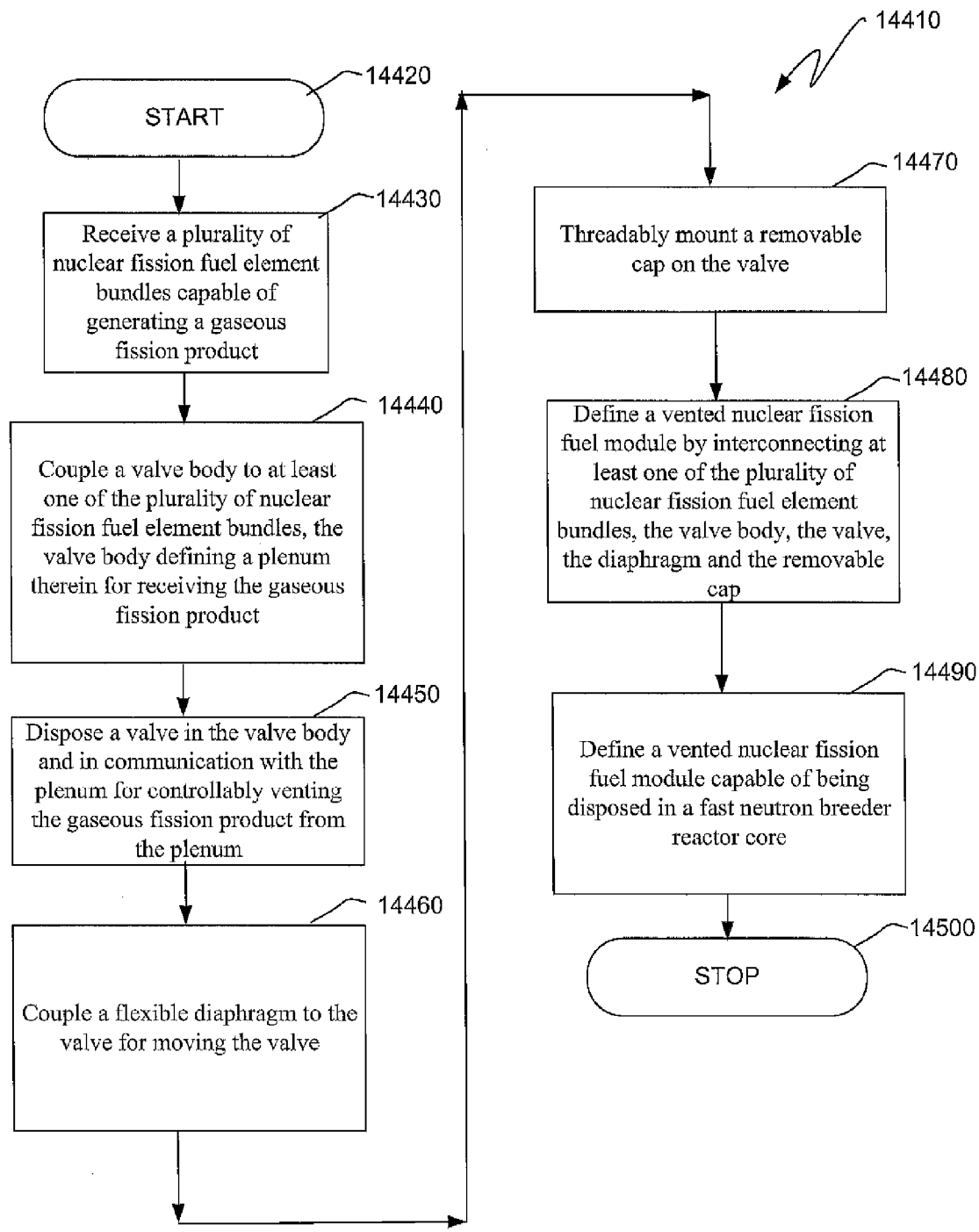

In FIG. 113, an illustrative method 14410 of assembling a vented nuclear fission fuel module starts at a block 14420. At a block 14430, the method comprises receiving a plurality of nuclear fission fuel element bundles capable of generating a gaseous fission product. At a block 14440, a valve body is coupled to at least one of the plurality of nuclear fission fuel element bundles, the valve body defining a plenum therein for receiving the gaseous fission product. At a block 14450, a valve is disposed in the valve body and in communication with the plenum for controllably venting the gaseous fission product from the plenum. At a block 14460, a flexible diaphragm is coupled to the valve for moving the valve. At a block 14470, a removable cap is threadably mounted on the valve. At a block 14480, a vented nuclear fission fuel module is defined by interconnecting at least one of the plurality of nuclear fission fuel element bundles, the valve body, the valve, the diaphragm and the removable cap. At a block 14490, a vented nuclear fission fuel module is defined that is capable of being disposed in a fast neutron breeder reactor core. The method stops at a block 14500.

Figure 114:
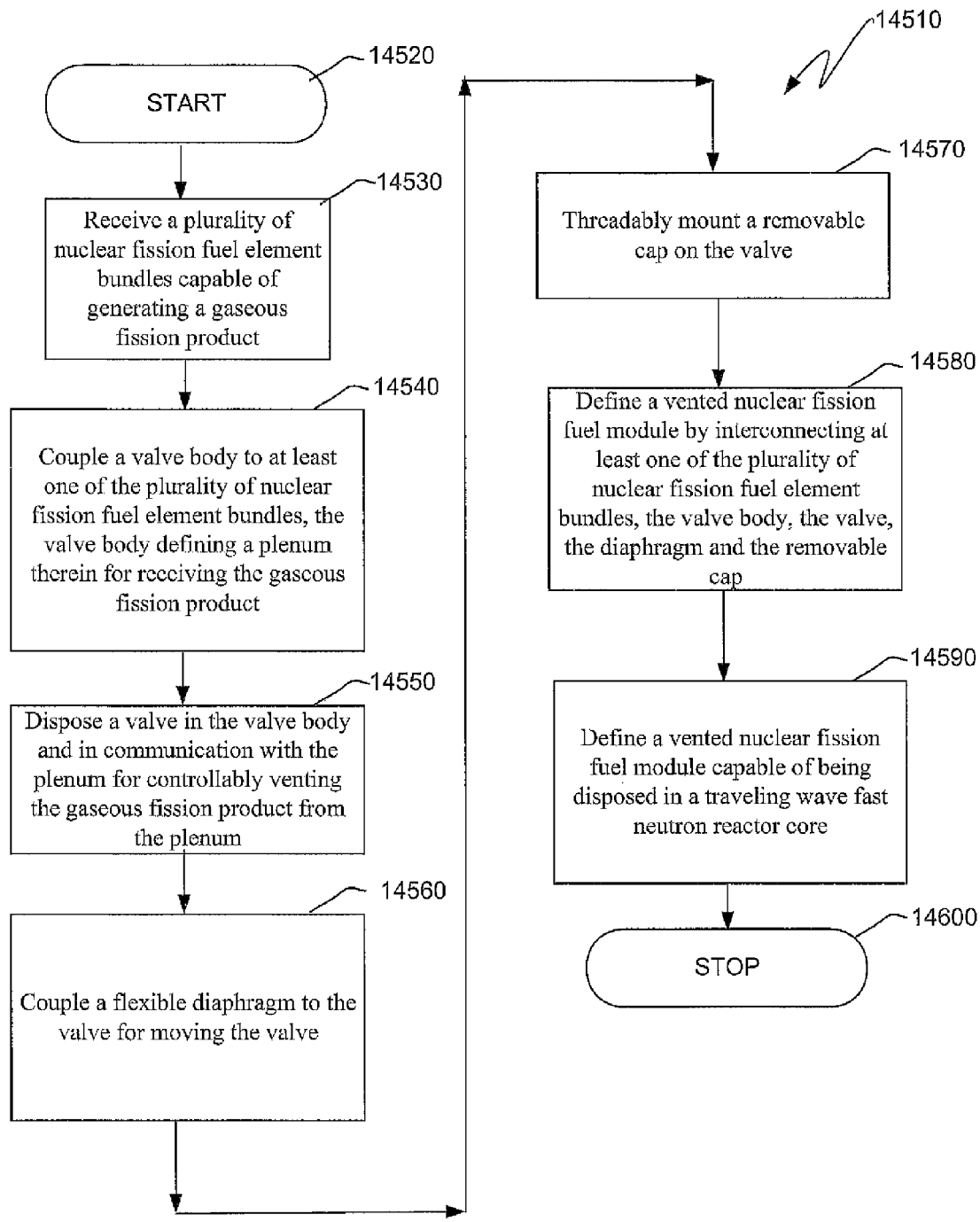

In FIG. 114, an illustrative method 14510 of assembling a vented nuclear fission fuel module starts at a block 14520. At a block 14530, the method comprises receiving a plurality of nuclear fission fuel element bundles capable of generating a gaseous fission product. At a block 14540, a valve body is coupled to at least one of the plurality of nuclear fission fuel element bundles, the valve body defining a plenum therein for receiving the gaseous fission product. At a block 14550, a valve is disposed in the valve body and in communication with the plenum for controllably venting the gaseous fission product from the plenum. At a block 14560, a flexible diaphragm is coupled to the valve for moving the valve. At a block 14570, a removable cap is threadably mounted on the valve. At a block 14580, a vented nuclear fission fuel module is defined by interconnecting at least one of the plurality of nuclear fission fuel element bundles, the valve body, the valve, the diaphragm and the removable cap. At a block 14590, a vented nuclear fission fuel module is defined that is capable of being disposed in a traveling wave fast neutron reactor core. The method stops at a block 14600.

Figure 114A:
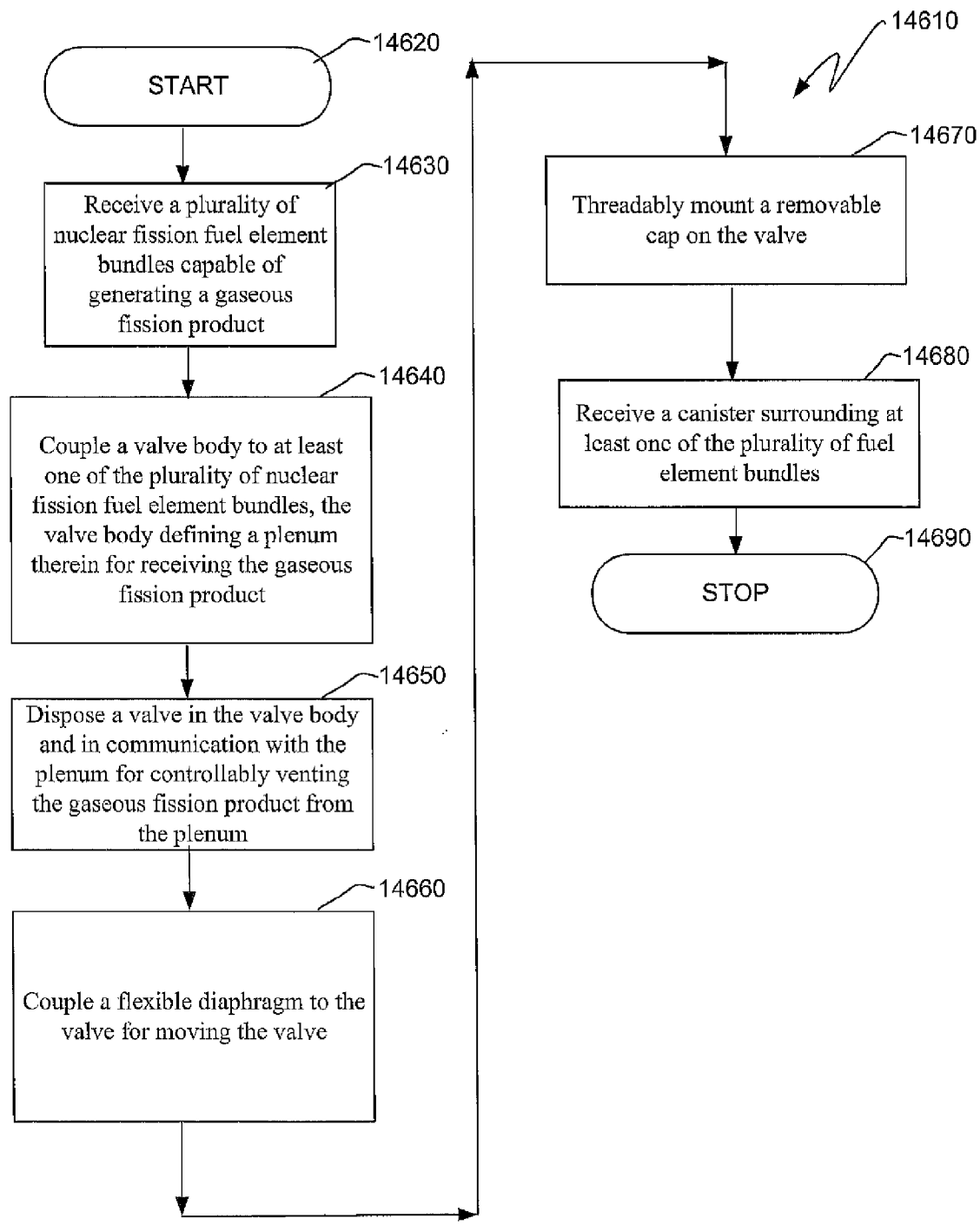

In FIG. 114A, an illustrative method 14610 of assembling a vented nuclear fission fuel module starts at a block 14620. At a block 14630, the method comprises receiving a plurality of nuclear fission fuel element bundles capable of generating a gaseous fission product. At a block 14640, a valve body is coupled to each of the plurality of nuclear fission fuel element bundles, the valve body defining a plenum therein for receiving the gaseous fission product. At a block 14650, a valve is disposed in the valve body and in communication with the plenum for controllably venting the gaseous fission product from the plenum. At a block 14660, a flexible diaphragm is coupled to the valve for moving the valve. At a block 14670, a removable cap is threadably mounted on the valve. At a block 14680, a canister surrounding at least one of the plurality of fuel element bundles is received. The method stops at a block 14690.

Figure 115:
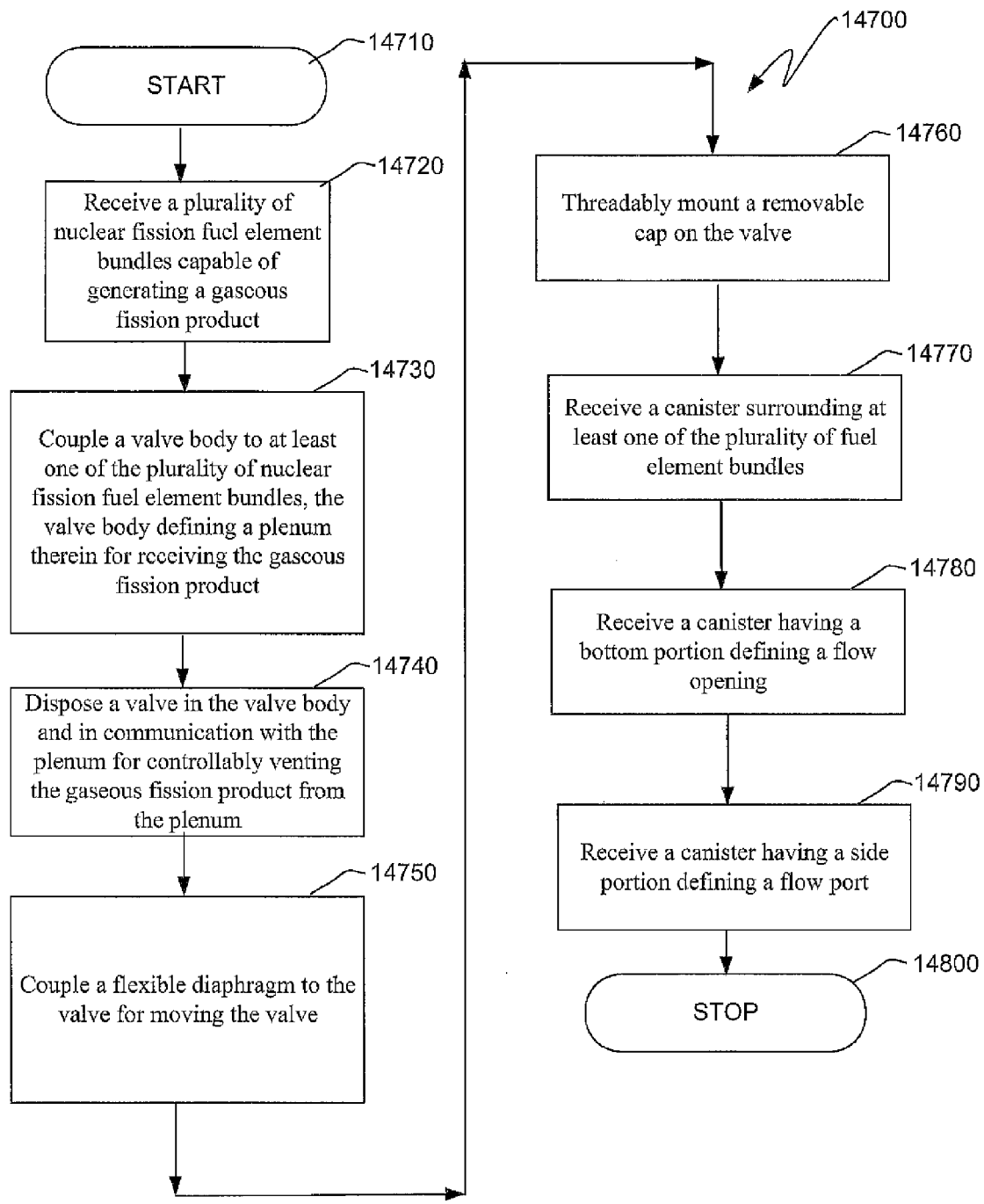

In FIG. 115, an illustrative method 14700 of assembling a vented nuclear fission fuel module starts at a block 14710. At a block 14720, the method comprises receiving a plurality of nuclear fission fuel element bundles capable of generating a gaseous fission product. At a block 14730, a valve body is coupled to each of the plurality of nuclear fission fuel element bundles, the valve body defining a plenum therein for receiving the gaseous fission product. At a block 14740, a valve is disposed in the valve body and in communication with the plenum for controllably venting the gaseous fission product from the plenum. At a block 14750, a flexible diaphragm is coupled to the valve for moving the valve. At a block 14760, a removable cap is threadably mounted on the valve. At a block 14770, a canister surrounding at least one of the plurality of fuel element bundles is received. At a block 14780, a canister having a bottom portion defining a flow opening is received. At a block 14790, a canister having a side portion defining a flow port is received. The method stops at a block 14800.

Figure 116:
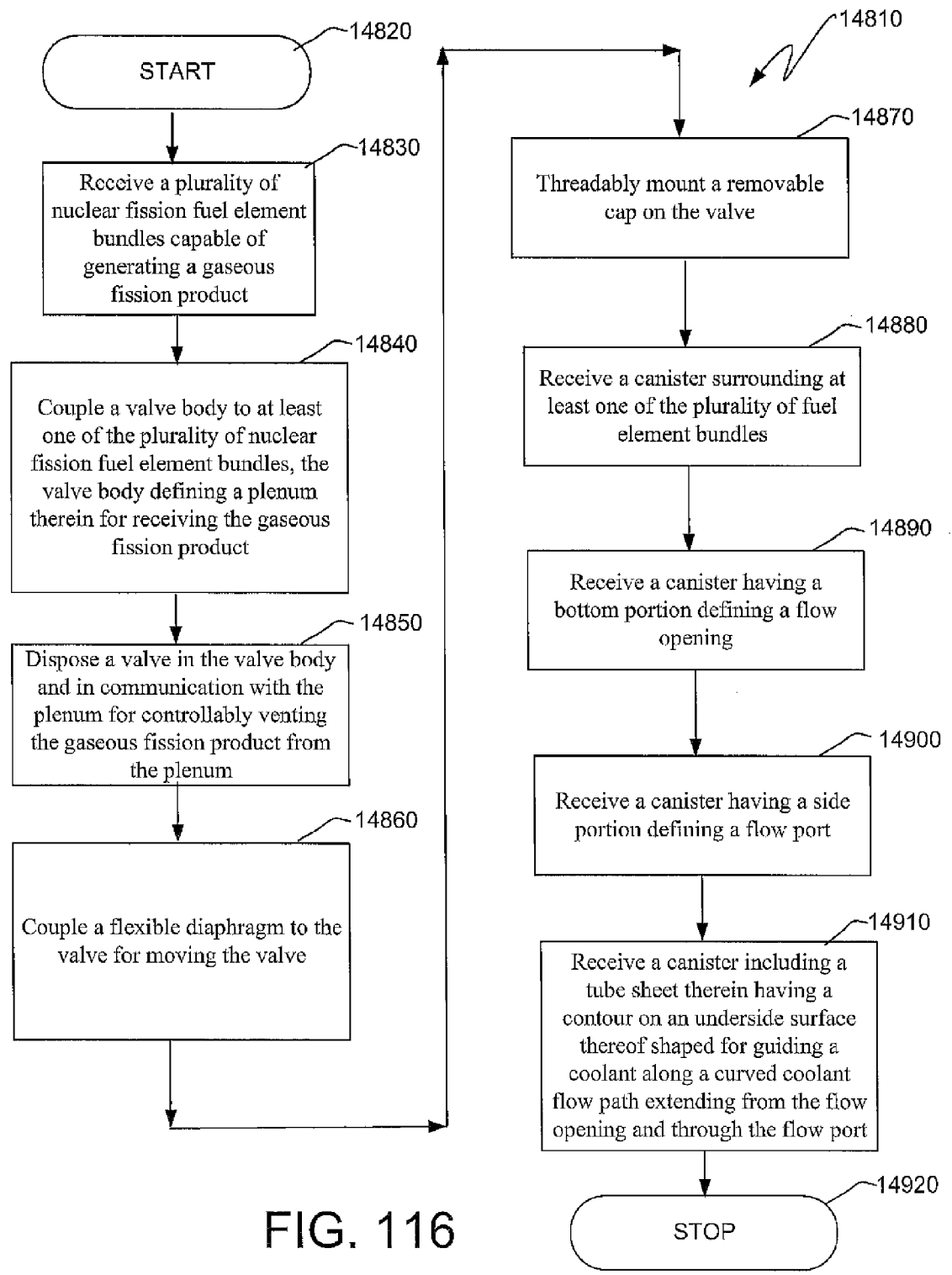

In FIG. 116, an illustrative method 14810 of assembling a vented nuclear fission fuel module starts at a block 14820. At a block 14830, the method comprises receiving a plurality of nuclear fission fuel element bundles capable of generating a gaseous fission product. At a block 14840, a valve body is coupled to at least one of the plurality of nuclear fission fuel element bundles, the valve body defining a plenum therein for receiving the gaseous fission product. At a block 14850, a valve is disposed in the valve body and in communication with the plenum for controllably venting the gaseous fission product from the plenum. At a block 14860, a flexible diaphragm is coupled to the valve for moving the valve. At a block 14870, a removable cap is threadably mounted on the valve. At a block 14880, a canister surrounding at least one of the plurality of fuel element bundles is received. At a block 14890, a canister having a bottom portion defining a flow opening is received. At a block 14900, a canister having a side portion defining a flow port is received. At a block 14910, a canister is received including a tube sheet therein having a contour on an underside surface thereof shaped for guiding a coolant along a curved coolant flow path extending from the flow opening and through the flow port. The method stops at a block 14920.

Figure 116A:
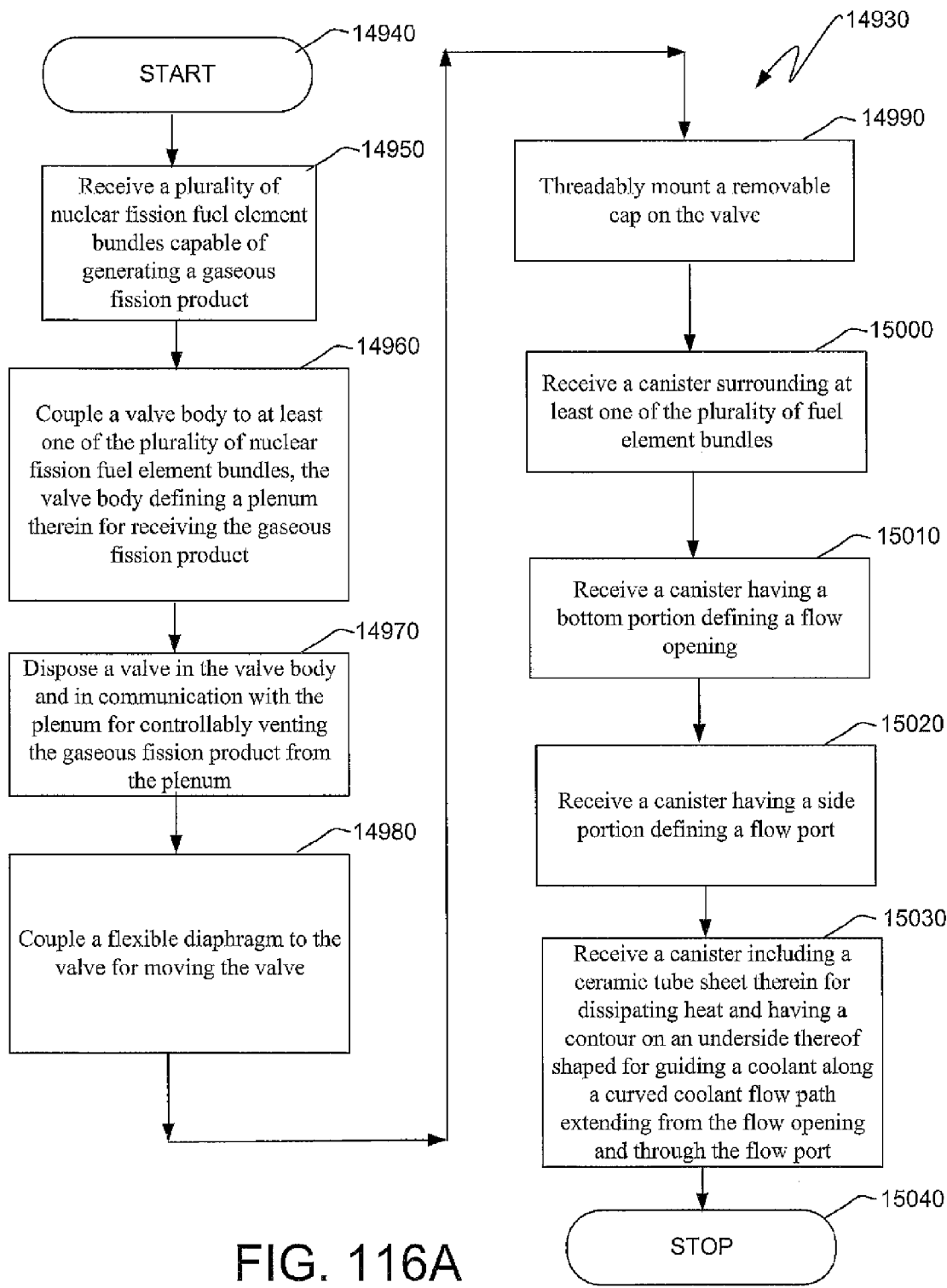

In FIG. 116A, an illustrative method 14930 of assembling a vented nuclear fission fuel module starts at a block 14940. At a block 14950, the method comprises receiving a plurality of nuclear fission fuel element bundles capable of generating a gaseous fission product. At a block 14960, a valve body is coupled to at least one of the plurality of nuclear fission fuel element bundles, the valve body defining a plenum therein for receiving the gaseous fission product. At a block 14970, a valve is disposed in the valve body and in communication with the plenum for controllably venting the gaseous fission product from the plenum. At a block 14980, a flexible diaphragm is coupled to the valve for moving the valve. At a block 14990, a removable cap is threadably mounted on the valve. At a block 15000, a canister surrounding at least one of the plurality of fuel element bundles is received. At a block 15010, a canister having a bottom portion defining a flow opening is received. At a block 15020, a canister having a side portion defining a flow port is received. At a block 15030, a canister is received including a ceramic tube sheet therein for dissipating heat and having a contour on an underside thereof shaped for guiding a coolant along a curved coolant flow path extending from the flow opening and through the flow port extending from the flow opening and through the flow port. The method stops at a block 15040.

Figure 117:
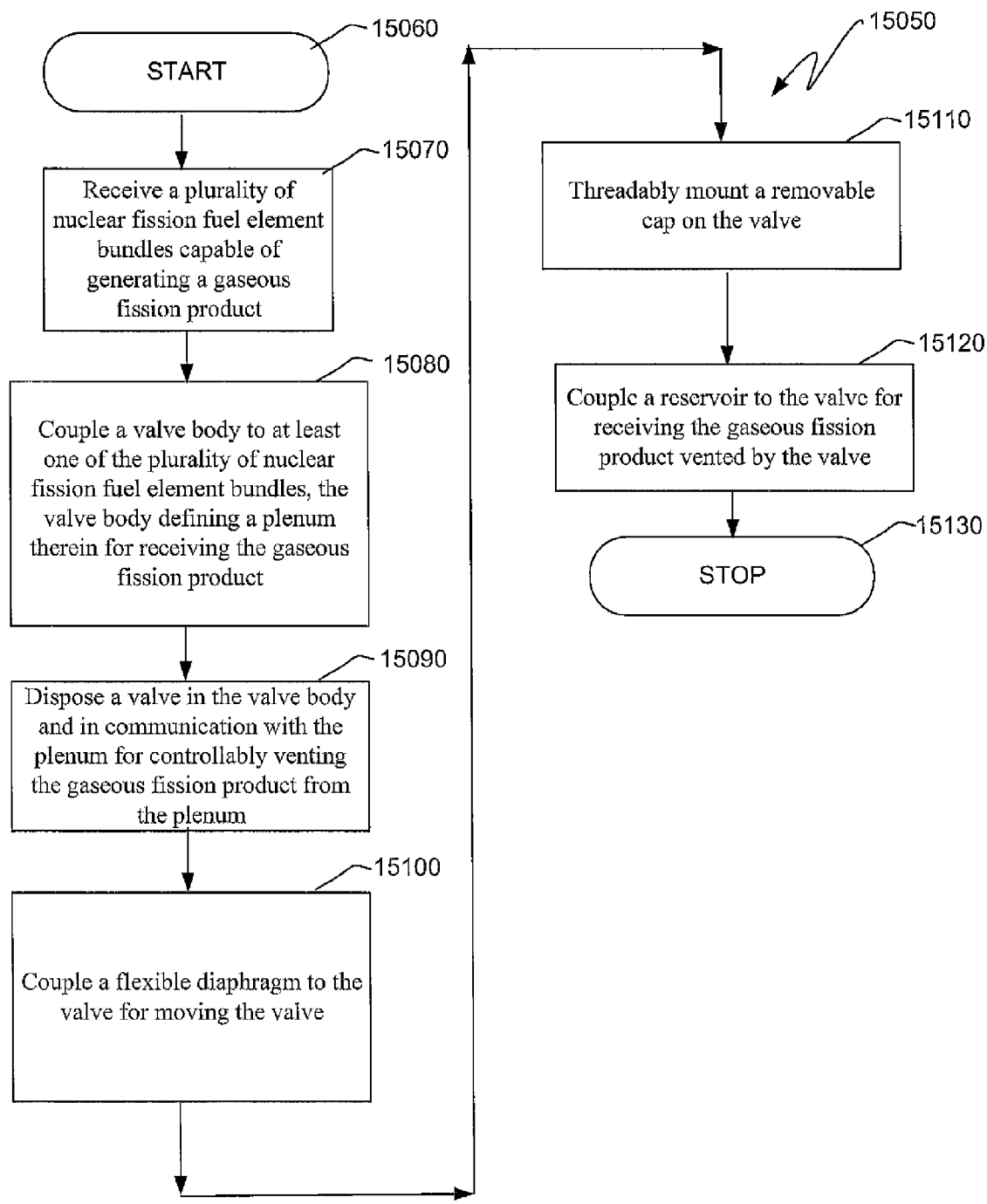

In FIG. 117, an illustrative method 15050 of assembling a vented nuclear fission fuel module starts at a block 15060. At a block 15070, the method comprises receiving a plurality of nuclear fission fuel element bundles capable of generating a gaseous fission product. At a block 15080, a valve body is coupled to at least one of the plurality of nuclear fission fuel element bundles, the valve body defining a plenum therein for receiving the gaseous fission product. At a block 15090, a valve is disposed in the valve body and in communication with the plenum for controllably venting the gaseous fission product from the plenum. At a block 15100, a flexible diaphragm is coupled to the valve for moving the valve. At a block 15110, a removable cap is threadably mounted on the valve. At a block 15120, a reservoir is coupled to the valve for receiving the gaseous fission product vented by the valve. The method stops at a block 15130.

Figure 118:
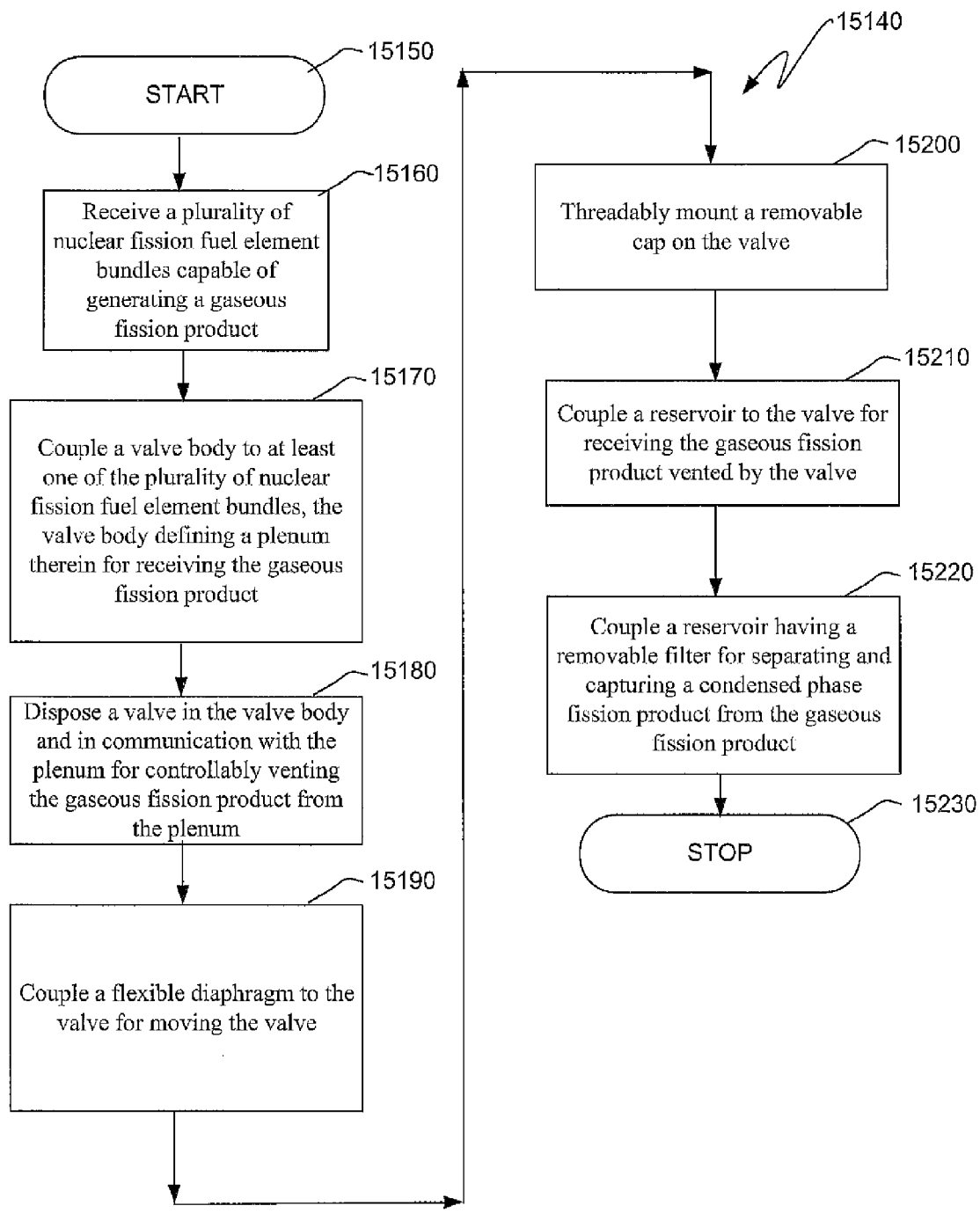

In FIG. 118, an illustrative method 15140 of assembling a vented nuclear fission fuel module starts at a block 15150. At a block 15160, the method comprises receiving a plurality of nuclear fission fuel element bundles capable of generating a gaseous fission product. At a block 15170, a valve body is coupled to at least one of the plurality of nuclear fission fuel element bundles, the valve body defining a plenum therein for receiving the gaseous fission product. At a block 15180, a valve is disposed in the valve body and in communication with the plenum for controllably venting the gaseous fission product from the plenum. At a block 15190, a flexible diaphragm is coupled to the valve for moving the valve. At a block 15200, a removable cap is threadably mounted on the valve. At a block 15210, a reservoir is coupled to the valve for receiving the gaseous fission product vented by the valve. At a block 15220, a reservoir is coupled having a removable filter for separating and capturing a condensed phase fission product from the gaseous fission product. The method stops at a block 15230.

Figure 118A:
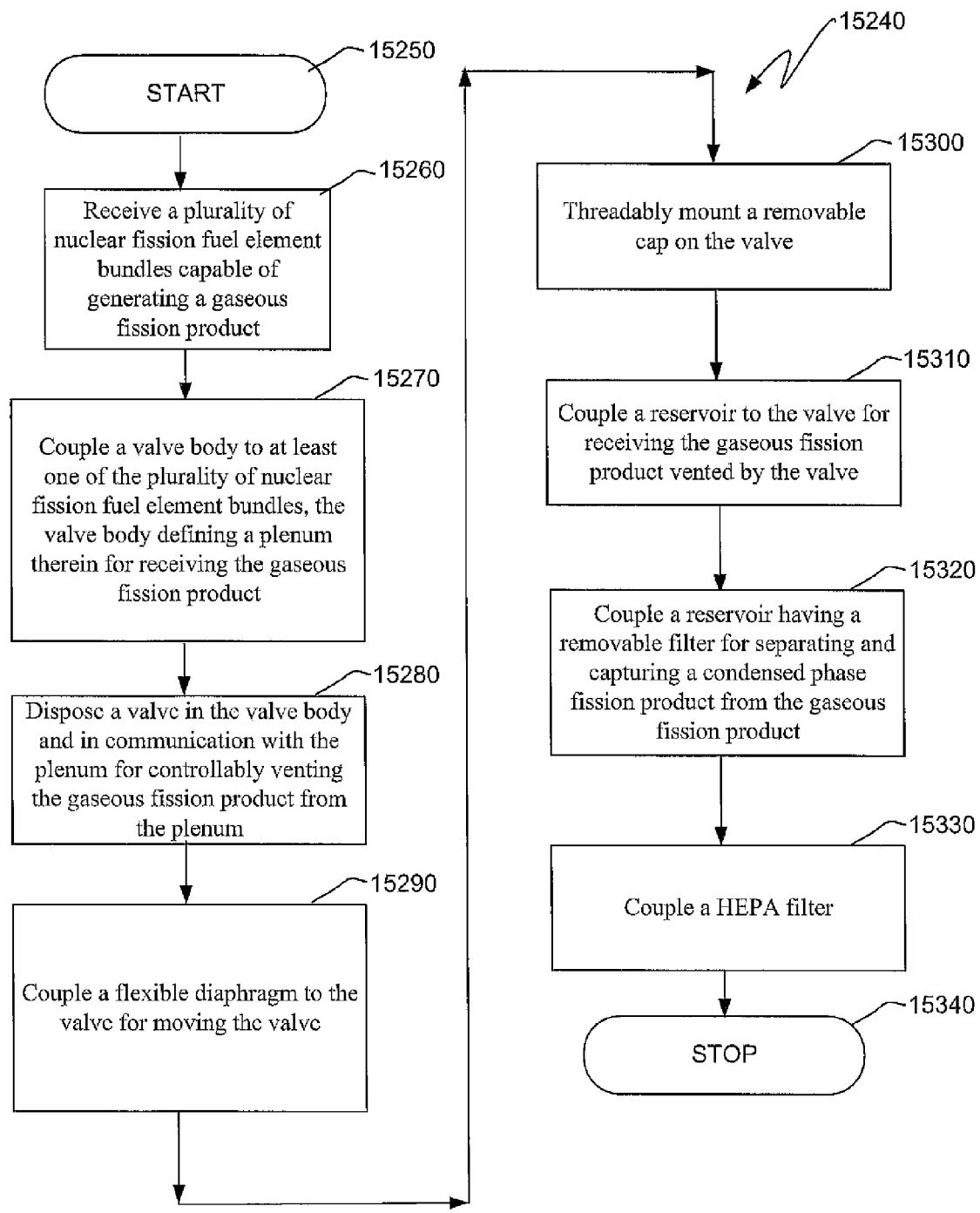

In FIG. 118A, an illustrative method 15240 of assembling a vented nuclear fission fuel module starts at a block 15250. At a block 15260, the method comprises receiving a plurality of nuclear fission fuel element bundles capable of generating a gaseous fission product. At a block 15270, a valve body is coupled to at least one of the plurality of nuclear fission fuel element bundles, the valve body defining a plenum therein for receiving the gaseous fission product. At a block 15280, a valve is disposed in the valve body and in communication with the plenum for controllably venting the gaseous fission product from the plenum. At a block 15290, a flexible diaphragm is coupled to the valve for moving the valve. At a block 15300, a removable cap is threadably mounted on the valve. At a block 15310, a reservoir is coupled to the valve for receiving the gaseous fission product vented by the valve. At a block 15320, a reservoir is coupled having a removable filter for separating and capturing a condensed phase fission product from the gaseous fission product. At a block 15330, a HEPA filter is coupled. The method stops at a block 15340.

Figure 118B:
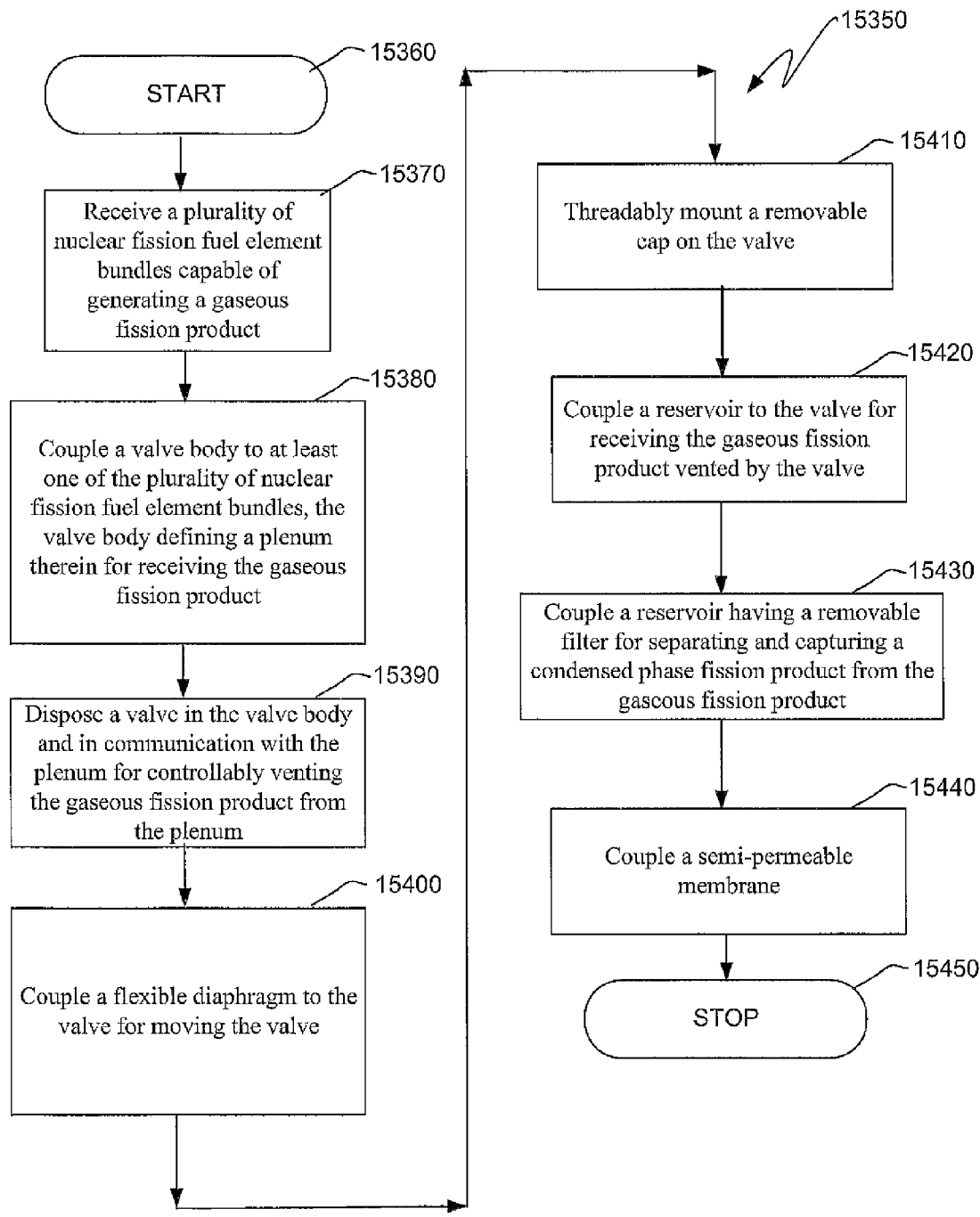

In FIG. 118B, an illustrative method 15350 of assembling a vented nuclear fission fuel module starts at a block 15360. At a block 15370, the method comprises receiving a plurality of nuclear fission fuel element bundles capable of generating a gaseous fission product. At a block 15380, a valve body is coupled to at least one of the plurality of nuclear fission fuel element bundles, the valve body defining a plenum therein for receiving the gaseous fission product. At a block 15390, a valve is disposed in the valve body and in communication with the plenum for controllably venting the gaseous fission product from the plenum. At a block 15400, a flexible diaphragm is coupled to the valve for moving the valve. At a block 15410, a removable cap is threadably mounted on the valve. At a block 15420, a reservoir is coupled to the valve for receiving the gaseous fission product vented by the valve. At a block 15430, a reservoir is coupled having a removable filter for separating and capturing a condensed phase fission product from the gaseous fission product. At a block 15440, a semi-permeable membrane is coupled. The method stops at a block 15450.

Figure 118C:
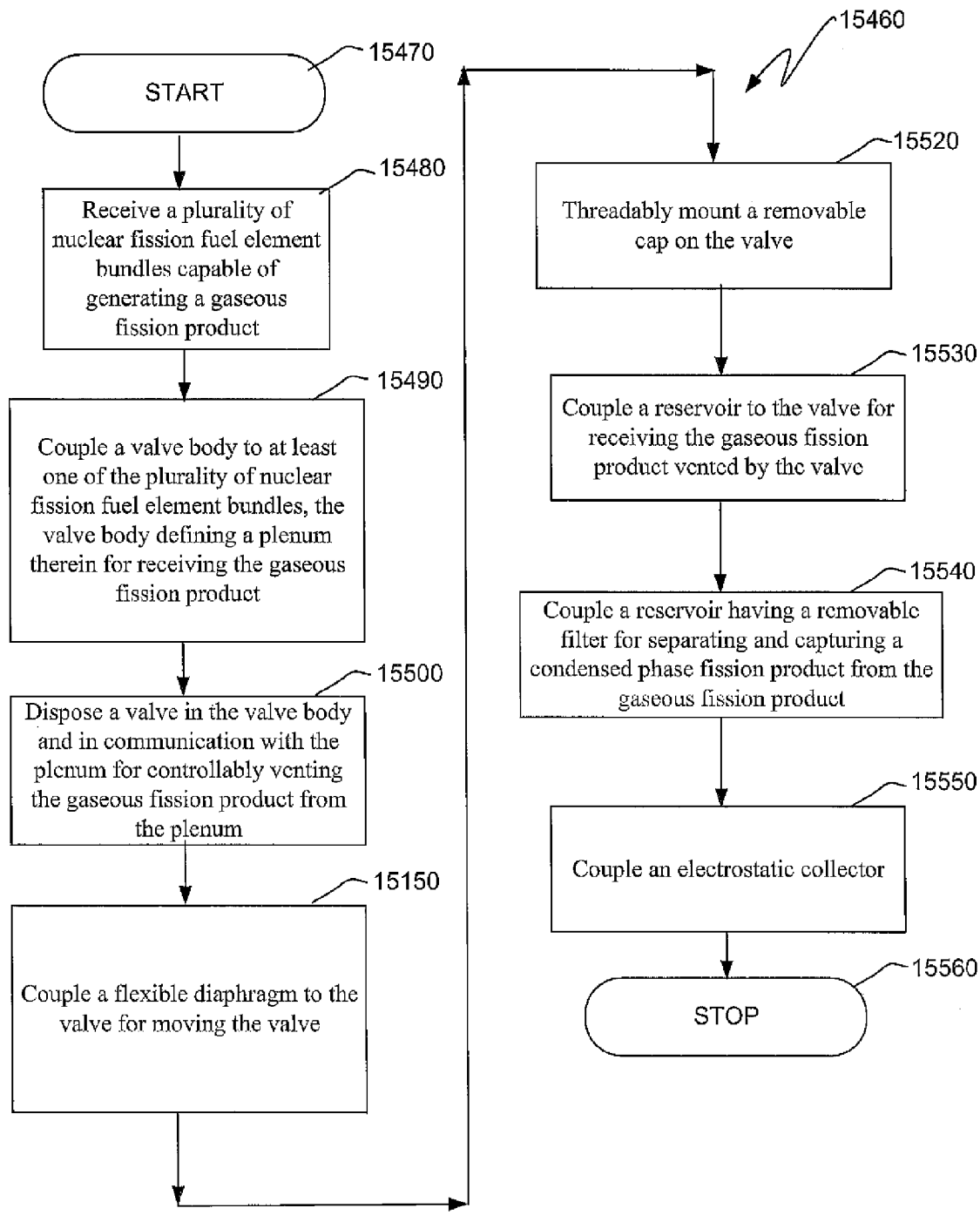

In FIG. 118C, an illustrative method 15460 of assembling a vented nuclear fission fuel module starts at a block 15470. At a block 15480, the method comprises receiving a plurality of nuclear fission fuel element bundles capable of generating a gaseous fission product. At a block 15490, a valve body is coupled to at least one of the plurality of nuclear fission fuel element bundles, the valve body defining a plenum therein for receiving the gaseous fission product. At a block 15500, a valve is disposed in the valve body and in communication with the plenum for controllably venting the gaseous fission product from the plenum. At a block 15510, a flexible diaphragm is coupled to the valve for moving the valve. At a block 15520, a removable cap is threadably mounted on the valve. At a block 15530, a reservoir is coupled to the valve for receiving the gaseous fission product vented by the valve. At a block 15540, a reservoir is coupled having a removable filter for separating and capturing a condensed phase fission product from the gaseous fission product. At a block 15550, an electrostatic collector is coupled. The method stops at a block 15560.

Figure 118D:
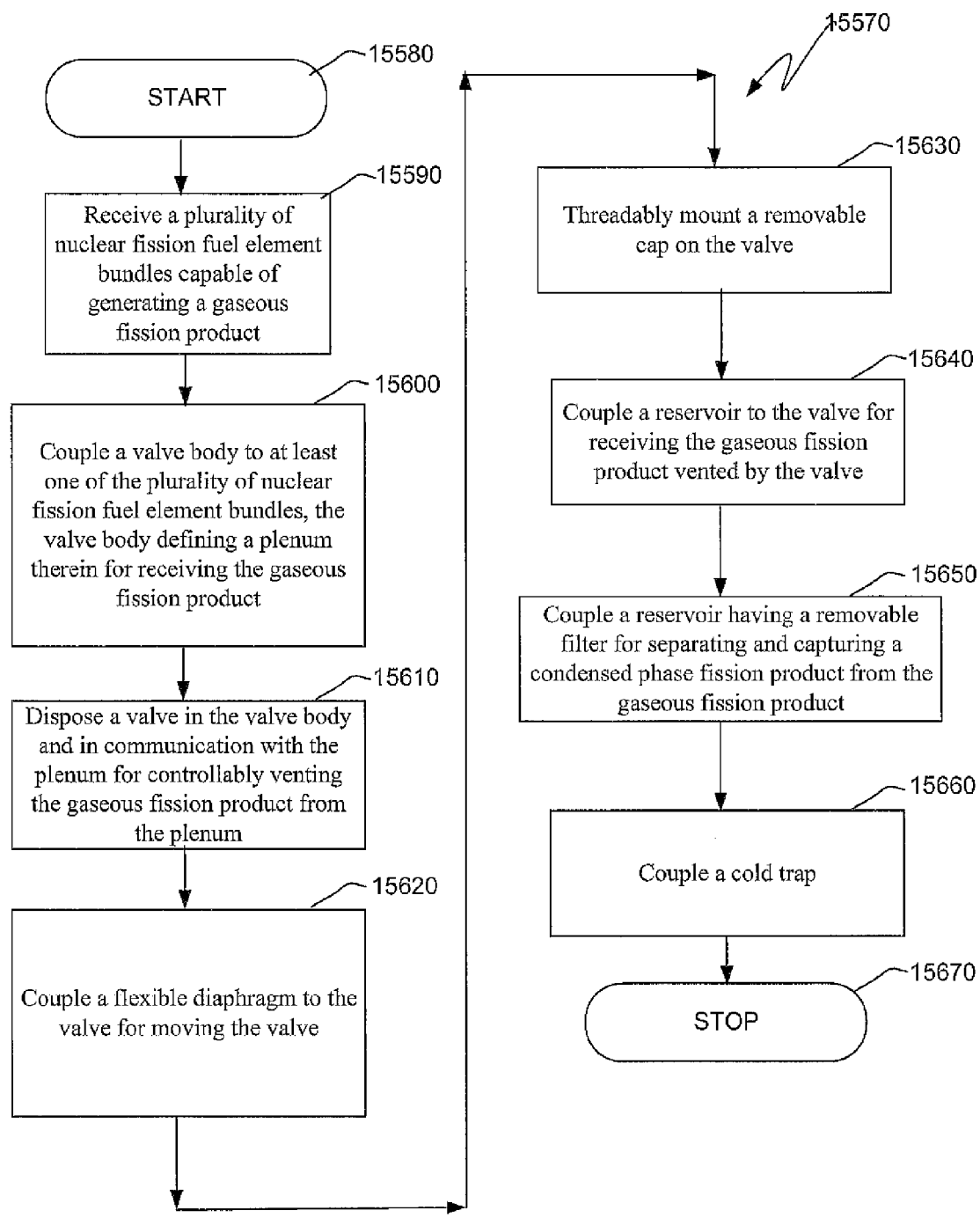

In FIG. 118D, an illustrative method 15570 of assembling a vented nuclear fission fuel module starts at a block 15580. At a block 15590, the method comprises receiving a plurality of nuclear fission fuel element bundles capable of generating a gaseous fission product. At a block 15600, a valve body is coupled to at least one of the plurality of nuclear fission fuel element bundles, the valve body defining a plenum therein for receiving the gaseous fission product. At a block 15610, a valve is disposed in the valve body and in communication with the plenum for controllably venting the gaseous fission product from the plenum. At a block 15620, a flexible diaphragm is coupled to the valve for moving the valve. At a block 15630, a removable cap is threadably mounted on the valve. At a block 15640, a reservoir is coupled to the valve for receiving the gaseous fission product vented by the valve. At a block 15650, a reservoir is coupled having a removable filter for separating and capturing a condensed phase fission product from the gaseous fission product. At a block 15660, a cold trap is coupled. The method stops at a block 15670.

Figure 119:
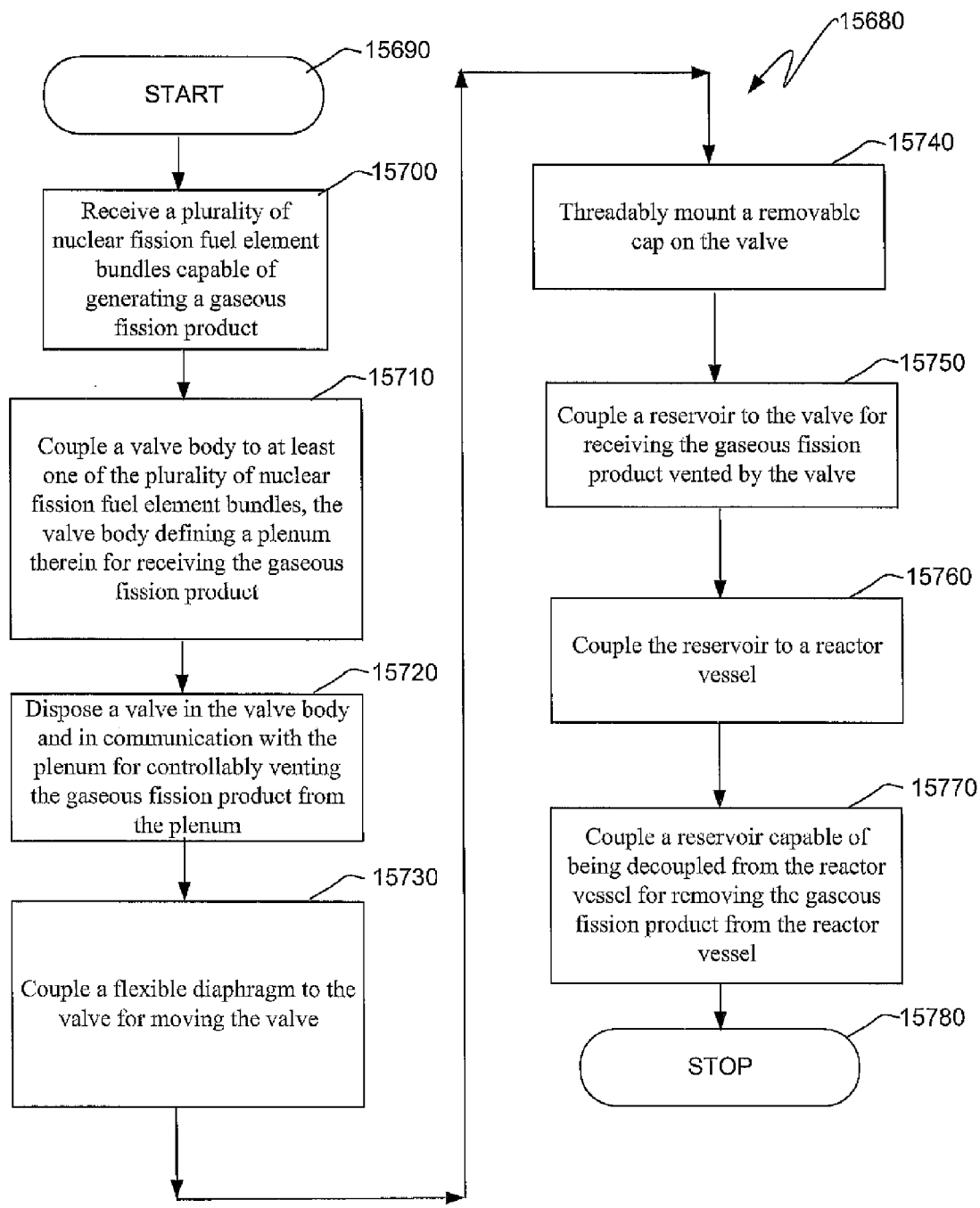

In FIG. 119, an illustrative method 15680 of assembling a vented nuclear fission fuel module starts at a block 15690. At a block 15700, the method comprises receiving a plurality of nuclear fission fuel element bundles capable of generating a gaseous fission product. At a block 15710, a valve body is coupled to at least one of the plurality of nuclear fission fuel element bundles, the valve body defining a plenum therein for receiving the gaseous fission product. At a block 15720, a valve is disposed in the valve body and in communication with the plenum for controllably venting the gaseous fission product from the plenum. At a block 15730, a flexible diaphragm is coupled to the valve for moving the valve. At a block 15740, a removable cap is threadably mounted on the valve. At a block 15750, a reservoir is coupled to the valve for receiving the gaseous fission product vented by the valve. At a block 15760, the reservoir is coupled to a reactor vessel. At a block 15770, a reservoir is coupled that is capable of being decoupled from the reactor vessel for removing the gaseous fission product from the reactor vessel. The method stops at a block 15780.

Figure 119A:
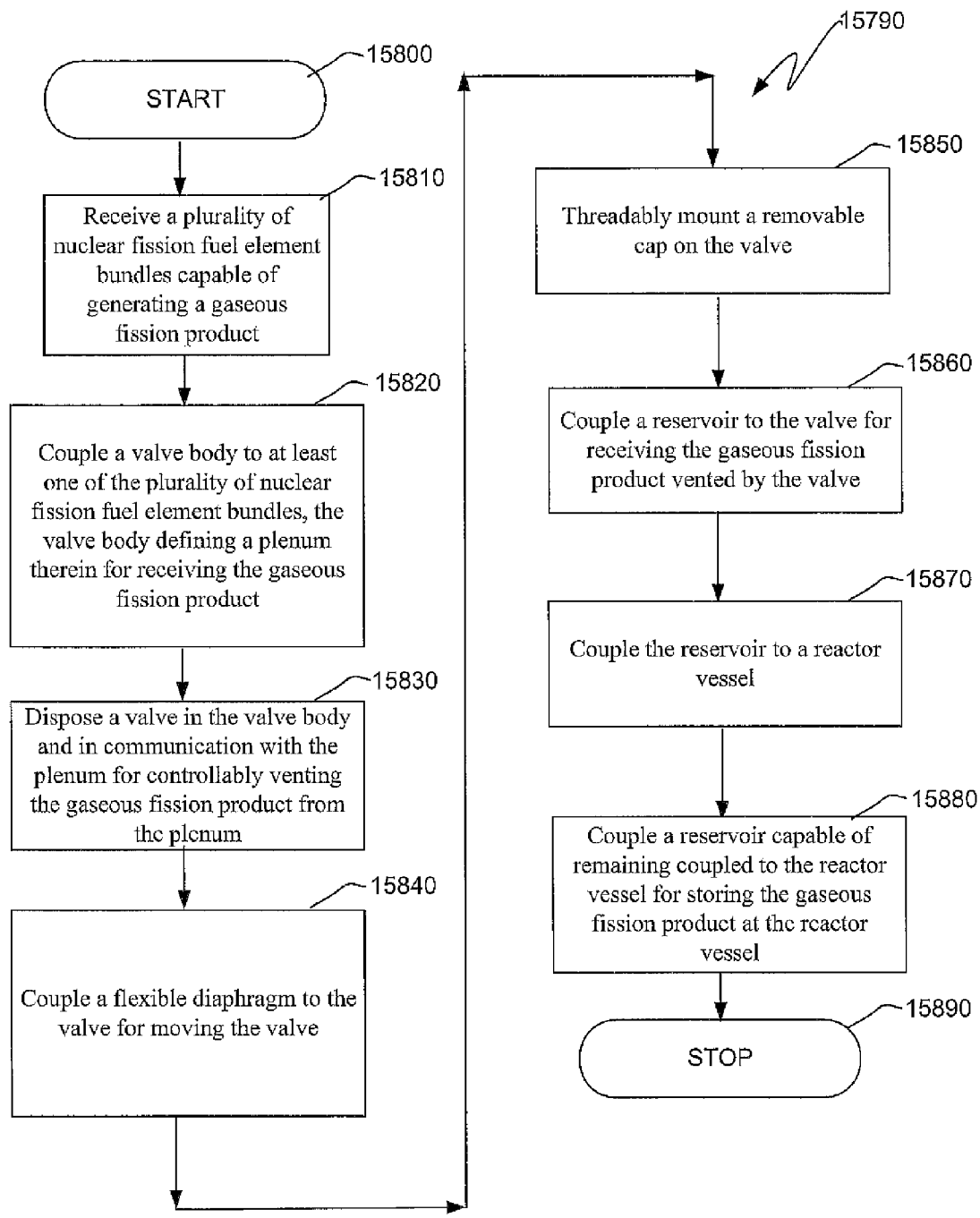

In FIG. 119A, an illustrative method 15790 of assembling a vented nuclear fission fuel module starts at a block 15800. At a block 15810, the method comprises receiving a plurality of nuclear fission fuel element bundles capable of generating a gaseous fission product. At a block 15820, a valve body is coupled to at least one of the plurality of nuclear fission fuel element bundles, the valve body defining a plenum therein for receiving the gaseous fission product. At a block 15830, a valve is disposed in the valve body and in communication with the plenum for controllably venting the gaseous fission product from the plenum. At a block 15840, a flexible diaphragm is coupled to the valve for moving the valve. At a block 15850, a removable cap is threadably mounted on the valve. At a block 15860, a reservoir is coupled to the valve for receiving the gaseous fission product vented by the valve. At a block 15870, the reservoir is coupled to a reactor vessel. At a block 15880, a reservoir is coupled that is capable of remaining coupled to the reactor vessel for storing the gaseous fission product at the reactor vessel. The method stops at a block 15890.

Figure 119B:
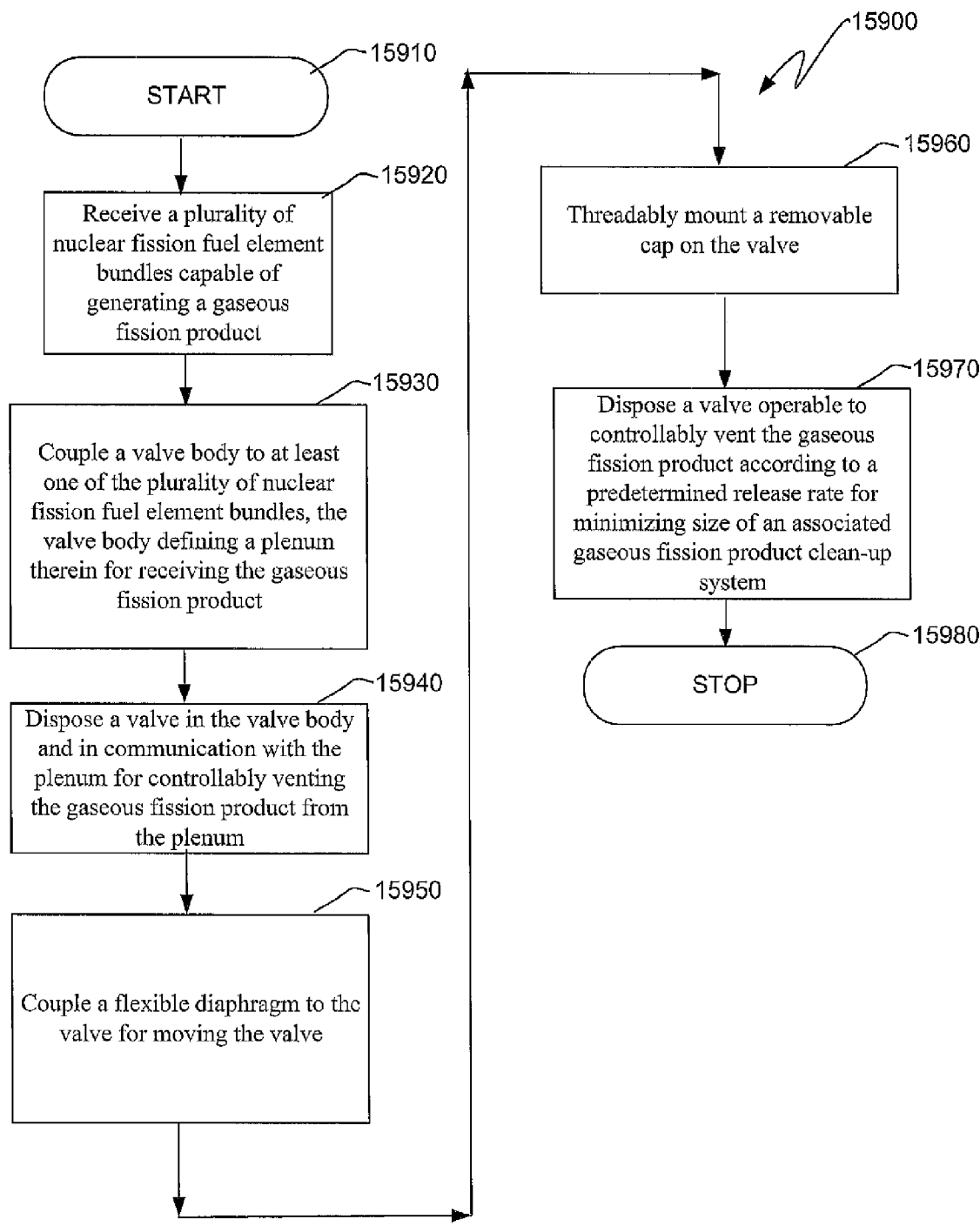

In FIG. 119B, an illustrative method 15900 of assembling a vented nuclear fission fuel module starts at a block 15910. At a block 15920, the method comprises receiving a plurality of nuclear fission fuel element bundles capable of generating a gaseous fission product. At a block 15930, a valve body is coupled to at least one of the plurality of nuclear fission fuel element bundles, the valve body defining a plenum therein for receiving the gaseous fission product. At a block 15940, a valve is disposed in the valve body and in communication with the plenum for controllably venting the gaseous fission product from the plenum. At a block 15950, a flexible diaphragm is coupled to the valve for moving the valve. At a block 15960, a removable cap is threadably mounted on the valve. At a block 15970, a valve is disposed that is operable to controllably vent the gaseous fission product according to a predetermined release rate for minimizing size of an associated gaseous fission product clean-up system. The method stops at a block 15980.

Figure 120:
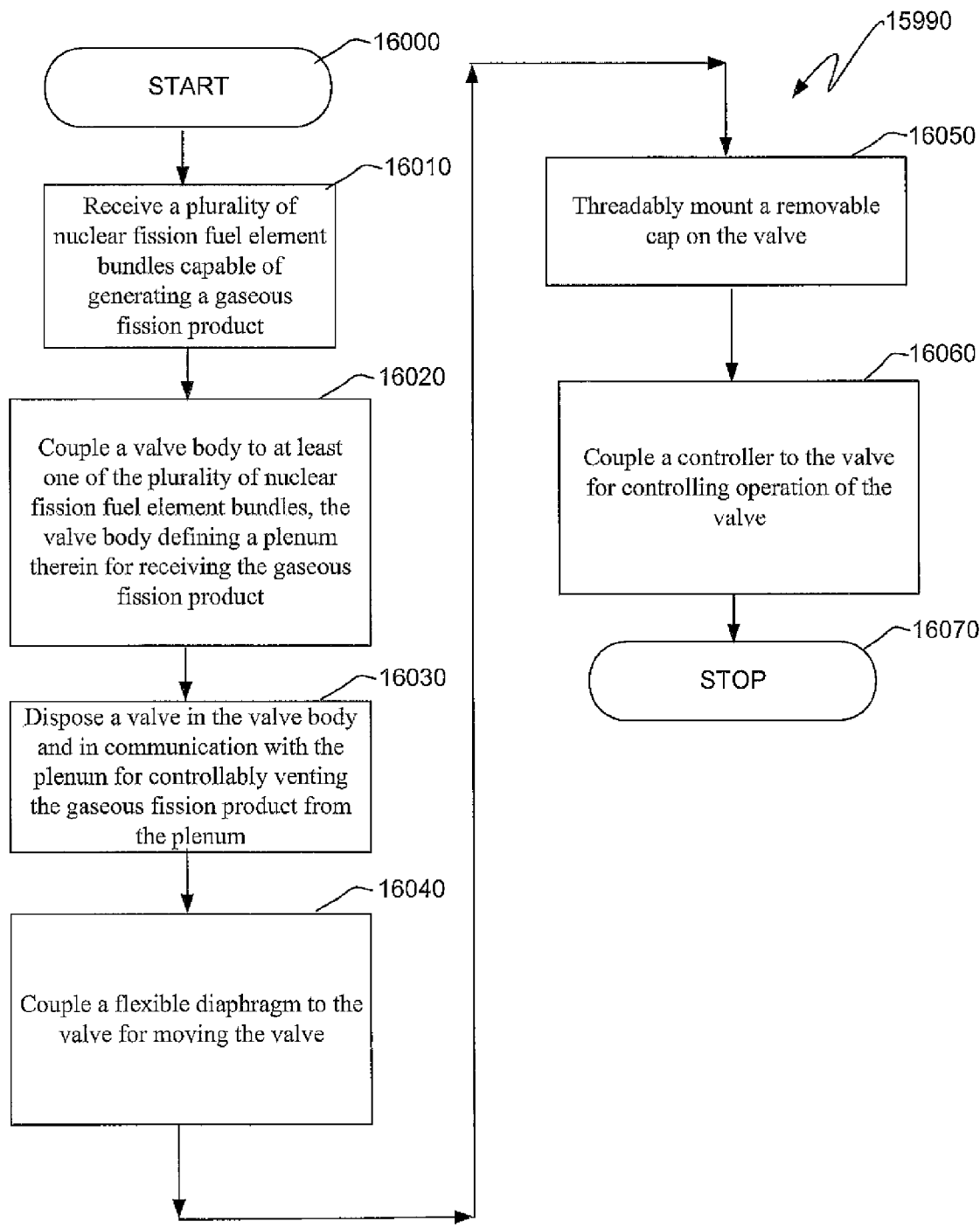

In FIG. 120, an illustrative method 15990 of assembling a vented nuclear fission fuel module starts at a block 16000. At a block 16010, the method comprises receiving a plurality of nuclear fission fuel element bundles capable of generating a gaseous fission product. At a block 16020, a valve body is coupled to at least one of the plurality of nuclear fission fuel element bundles, the valve body defining a plenum therein for receiving the gaseous fission product. At a block 16030, a valve is disposed in the valve body and in communication with the plenum for controllably venting the gaseous fission product from the plenum. At a block 16040, a flexible diaphragm is coupled to the valve for moving the valve. At a block 16050, a removable cap is threadably mounted on the valve. At a block 16060, a controller is coupled to the valve for controlling operation of the valve. The method stops at a block 16070.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific illustrative processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. Moreover, the various aspects and embodiments disclosed herein are for purposes of illustration and are not intended to be limiting, with the true scope and spirit being indicated by the following claims.

What is claimed is:

1. A nuclear fission reactor, comprising:
    a reactor vessel;
    a nuclear fission fuel element received in the reactor vessel and capable of generating a gaseous fission product;
    a valve body associated with said nuclear fission fuel element, said valve body defining a plenum therein for receiving the gaseous fission product; and
    a valve in operative communication with the plenum for controllably venting the gaseous fission product from the plenum, wherein said valve body comprises a flexible diaphragm coupled to said valve for moving said valve to a closed position.

2. The nuclear fission reactor of claim 1, further comprising:
    a cap mounted on said valve; and
    a manipulator extendable to said cap for manipulating said cap.

3. The nuclear fission reactor of claim 1, further comprising a manipulator extendable to said valve for manipulating said valve.

4. The nuclear fission reactor of claim 1, further comprising:
    an articulated manipulator arm extendable to the plenum; and
    a receptacle carried by said articulated manipulator arm and engageable with the plenum for receiving the gaseous fission product controllably vented from the plenum.

5. The nuclear fission reactor of claim 1, wherein said valve is responsive to a parameter chosen from a pressure in the plenum and a type of gaseous fission product in the plenum.

6. The nuclear fission reactor of claim 1, further comprising a sensor in operative communication with the plenum.

7. The nuclear fission reactor of claim 6, wherein said sensor senses a parameter chosen from pressure, a type of gaseous fission product, and a radioactive fission product.

8. The nuclear fission reactor of claim 6, wherein said sensor comprises a sensor chosen from a radiation sensor, a chemical sensor, and an optical sensor.

9. The nuclear fission reactor of claim 6, wherein said sensor comprises a transmitter.

10. The nuclear fission reactor of claim 9, wherein said transmitter is configured to transmit an identification signal identifying said valve body.

11. The nuclear fission reactor of claim 1, further comprising a reactor core chosen from a thermal neutron reactor core, a fast neutron reactor core, a fast neutron breeder reactor core, and a traveling wave fast neutron reactor core.

12. The nuclear fission reactor of claim 1, further comprising a canister surrounding said fuel element.

13. The nuclear fission reactor of claim 12,
    wherein said canister has a bottom portion defining a first opening; and
    wherein said canister has a side portion defining a second opening.

14. The nuclear fission reactor of claim 13, wherein said canister comprises a tube sheet therein having a contour shaped for guiding a coolant along a coolant flow path extending from the first opening and through the second opening.

15. The nuclear fission reactor of claim 13, wherein said canister comprises a ceramic tube sheet therein for dissipating heat and having a contour shaped for guiding a coolant along a coolant flow path extending from the first opening and through the second opening.

16. The nuclear fission reactor of claim 1, further comprising a reservoir coupled to said valve for receiving the gaseous fission product vented by said valve.

17. The nuclear fission reactor of claim 16, wherein said reservoir comprises a filter for separating a condensed phase fission product from the gaseous fission product.

18. The nuclear fission reactor of claim 17, wherein said filter comprises a filter chosen from a HEPA filter, a semipermeable membrane, an electrostatic collector, and a cold trap.

19. The nuclear fission reactor of claim 16,
    wherein said reservoir is capable of being coupled to the reactor vessel; and wherein said reservoir is capable of being decoupled from the reactor vessel for removing the gaseous fission product from the reactor vessel.

20. The nuclear fission reactor of claim 16,
wherein said reservoir is capable of being coupled to the reactor vessel; and
wherein said reservoir is capable of remaining coupled to the reactor vessel for storing the gaseous fission product at the reactor vessel.

21. The nuclear fission reactor of claim 1, further comprising a coolant system in operational communication with said valve for receiving the gaseous fission product controllably vented by said valve.

22. The nuclear fission reactor of claim 21, further comprising a removal system in operational communication with said coolant system for removing the gaseous fission product from said coolant system.

23. The nuclear fission reactor of claim 1, wherein said valve is reclosable.

24. The nuclear fission reactor of claim 1, wherein said valve is sealably reclosable.

25. The nuclear fission reactor of claim 1, further comprising a controller coupled to said valve for controlling operation of said valve.

26. A nuclear fission reactor, comprising:
a reactor vessel;
a plurality of nuclear fission fuel element bundles received in the reactor vessel and capable of generating a gaseous fission product;
a plurality of valve bodies associated with respective ones of said plurality of nuclear fission fuel element bundles, at least one of said plurality of valve bodies defining a plenum therein for receiving the gaseous fission product;
a valve disposed in the at least one of said plurality of valve bodies and in communication with the plenum for controllably venting the gaseous fission product from the plenum;
a flexible diaphragm coupled to said valve for moving said valve; and
a removable cap threadably mounted on said valve.

27. The nuclear fission reactor of claim 26, wherein said flexible diaphragm is capable of moving said valve to a closed position.

28. The nuclear fission reactor of claim 26, further comprising an articulated manipulator arm extendable to said cap for threadably dismounting said cap from said valve.

29. The nuclear fission reactor of claim 26, further comprising an articulated manipulator arm extendable to said valve for operating said valve.

30. The nuclear fission reactor of claim 26, further comprising:
an articulated manipulator arm extendable to the plenum; and
a receptacle carried by said articulated manipulator arm and engageable with the plenum for receiving the gaseous fission product controllably vented from the plenum.

31. The nuclear fission reactor of claim 26, wherein said valve is responsive to a parameter chosen from pressure in the plenum and a type of gaseous fission product in the plenum.

32. The nuclear fission reactor of claim 26, further comprising a sensor in operative communication with the plenum.

33. The nuclear fission reactor of claim 32, wherein said sensor senses a parameter chosen from pressure in the plenum, a type of gaseous fission product in the plenum, and a radioactive fission product in the plenum.

34. The nuclear fission reactor of claim 32, wherein said sensor comprises sensor chosen from a radiation sensor, a chemical sensor, and an optical sensor.

35. The nuclear fission reactor of claim 32, wherein said sensor comprises a transmitter.

36. The nuclear fission reactor of claim 35, wherein said transmitter is configured to transmit an identification signal identifying said valve body.

37. The nuclear fission reactor of claim 26, further comprising a nuclear reactor core chosen from a thermal neutron reactor core, a fast neutron reactor core, a fast neutron breeder reactor core, and a traveling wave fast neutron reactor core.

38. The nuclear fission reactor of claim 26, further comprising a canister surrounding at least one of said plurality of nuclear fission fuel element bundles.

39. The nuclear fission reactor of claim 38,
wherein said canister has a bottom portion defining a flow opening; and
wherein said canister has a side portion defining a flow port.

40. The nuclear fission reactor of claim 39, wherein said canister comprises a tube sheet therein having a contour on an underside surface thereof shaped for guiding a coolant along a curved coolant flow path extending from the flow opening and through the flow port.

41. The nuclear fission reactor of claim 39, wherein said canister comprises a ceramic tube sheet therein for dissipating heat and having a contour on an underside surface thereof shaped for guiding a coolant along a curved coolant flow path extending from the flow opening and through the flow port.

42. The nuclear fission reactor of claim 26, further comprising a reservoir coupled to said valve for receiving the gaseous fission product vented by said valve.

43. The nuclear fission reactor of claim 42, wherein said reservoir comprises a removable filter for separating and capturing a condensed phase fission product from the gaseous fission product.

44. The nuclear fission reactor of claim 43, wherein said filter comprises a filter chosen from a HEPA filter, a semipermeable membrane, an electrostatic collector, and a cold trap.

45. The nuclear fission reactor of claim 42,
wherein said reservoir is coupled to the reactor vessel; and
wherein said reservoir is capable of being decoupled from the reactor vessel for removing the gaseous fission product from the reactor vessel.

46. The nuclear fission reactor of claim 42,
wherein said reservoir is coupled to the reactor vessel; and
wherein said reservoir is capable of remaining coupled to the reactor vessel for storing the gaseous fission product at the reactor vessel.

47. The nuclear fission reactor of claim 26, further comprising a coolant system in operational communication with said valve for receiving the gaseous fission product controllably vented by said valve.

48. The nuclear fission reactor of claim 47, further comprising a removal system in operational communication with said coolant system for removing the gaseous fission product from said coolant system.

49. The nuclear fission reactor of claim 26, wherein said valve is reclosable.

50. The nuclear fission reactor of claim 26, wherein said valve is sealably reclosable.

51. The nuclear fission reactor of claim 26, wherein said valve is operable to controllably vent the gaseous fission product according to a predetermined release rate for minimizing size of an associated gaseous fission product cleanup system.

52. The nuclear fission reactor of claim 26, further comprising a controller coupled to said valve for controlling operation of said valve.

* * * * *